US011429274B2

(12) United States Patent
Missig et al.

(10) Patent No.: US 11,429,274 B2
(45) Date of Patent: Aug. 30, 2022

(54) HANDWRITING ENTRY ON AN ELECTRONIC DEVICE

(71) Applicant: Apple Inc., Cupertino, CA (US)

(72) Inventors: Julian Missig, Burlingame, CA (US); Matan Stauber, San Francisco, CA (US); Guillaume Ardaud, San Francisco, CA (US); Jeffrey Traer Bernstein, San Francisco, CA (US); Marisa Rei Lu, Sunnyvale, CA (US); Jiabao Li, Mountain View, CA (US); Praveen Sharma, San Francisco, CA (US); Christopher D. Soli, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/868,449

(22) Filed: May 6, 2020

(65) Prior Publication Data

US 2020/0356254 A1 Nov. 12, 2020

Related U.S. Application Data

(60) Provisional application No. 62/843,976, filed on May 6, 2019, provisional application No. 62/859,413, filed (Continued)

(51) Int. Cl.

*G06F 3/0488* (2013.01)
*G06F 3/04883* (2022.01)

(Continued)

(52) U.S. Cl.

CPC ...... *G06F 3/04883* (2013.01); *G06F 3/03545* (2013.01); *G06F 3/0485* (2013.01); *G06T 13/80* (2013.01); *G06V 30/333* (2022.01)

(58) Field of Classification Search

CPC ............. G06F 3/04883; G06F 3/03545; G06F 3/0485; G06K 9/00409; G06T 13/80

See application file for complete search history.

(56) References Cited

U.S. PATENT DOCUMENTS

| | | | |
|---|---|---|---|
| 6,323,846 | B1 | 11/2001 | Westerman et al. |
| 6,570,557 | B1 | 5/2003 | Westerman et al. |

(Continued)

FOREIGN PATENT DOCUMENTS

| | | | |
|---|---|---|---|
| TW | 201112040 | A | 4/2011 |
| WO | 2013/169849 | A2 | 11/2013 |
| WO | 2014/105276 | A1 | 7/2014 |

OTHER PUBLICATIONS

International Search Report received for PCT Patent Application No. PCT/US2020/031727, dated Oct. 8, 2020, 10 pages.

(Continued)

*Primary Examiner* — Seth A Silverman
(74) *Attorney, Agent, or Firm* — Kubota & Basol LLP

(57) ABSTRACT

In some embodiments, an electronic device receives handwritten inputs in text entry fields and converts the handwritten inputs into font-based text. In some embodiments, an electronic device selects and deletes text based on inputs from a stylus. In some embodiments, an electronic device inserts text into pre-existing text based on inputs from a stylus. In some embodiments, an electronic device manages the timing of converting handwritten inputs into font-based text. In some embodiments, an electronic device presents a handwritten entry menu. In some embodiments, an electronic device controls the characteristic of handwritten inputs based on selections on the handwritten entry menu. In some embodiments, an electronic device presents autocomplete suggestions. In some embodiments, an electronic device converts handwritten input to font-based text. In (Continued)

some embodiments, an electronic device displays options in a content entry palette.

84 Claims, 197 Drawing Sheets

Related U.S. Application Data on Jun. 10, 2019, provisional application No. 63/020,496, filed on May 5, 2020.

(51) Int. Cl.

| | |
|---|---|
| ***G06F 3/0354*** | (2013.01) |
| ***G06F 3/0485*** | (2022.01) |
| ***G06T 13/80*** | (2011.01) |
| ***G06V 30/32*** | (2022.01) |

(56) References Cited

U.S. PATENT DOCUMENTS 6,677,932 B1 1/2004 Westerman
7,614,008 B2 11/2009 Ording
7,633,076 B2 12/2009 Huppi et al.
7,653,883 B2 1/2010 Hotelling et al.
7,657,849 B2 2/2010 Chaudhri et al.
7,663,607 B2 2/2010 Hotelling et al.
7,844,914 B2 11/2010 Andre et al.
7,957,762 B2 6/2011 Herz et al.
8,006,002 B2 8/2011 Kalayjian et al.
8,239,784 B2 8/2012 Hotelling et al.
8,279,180 B2 10/2012 Hotelling et al.
8,381,135 B2 2/2013 Hotelling et al.
8,479,122 B2 7/2013 Hotelling et al.
9,348,458 B2 5/2016 Hotelling et al.
9,933,937 B2 4/2018 Lemay et al.
10,168,899 B1 1/2019 Feiszli et al.
2002/0015024 A1 2/2002 Westerman et al.
2002/0107885 A1* 8/2002 Brooks ................. G06F 40/174 715/224
2003/0214539 A1 11/2003 Iwema et al.
2005/0190059 A1 9/2005 Wehrenberg
2006/0017692 A1 1/2006 Wehrenberg et al.
2006/0033724 A1 2/2006 Chaudhri et al.
2006/0071910 A1* 4/2006 Kim .................... G06F 3/04883 345/173
2006/0197753 A1 9/2006 Hotelling
2009/0161958 A1* 6/2009 Markiewicz ....... G06K 9/00436 382/186
2010/0107099 A1 4/2010 Frazier et al.
2010/0293460 A1 11/2010 Budelli
2012/0032925 A1* 2/2012 Sekiya ..................... G06K 9/22 345/175
2012/0229471 A1 9/2012 Takai
2013/0046544 A1 2/2013 Kay et al.
2014/0019855 A1* 1/2014 Kim ....................... G06Q 10/10 715/268
2014/0108976 A1 4/2014 Steiner et al.
2014/0194162 A1 7/2014 Maxim
2014/0219564 A1 8/2014 Demiya
2015/0058718 A1* 2/2015 Kim .................... G06F 3/03545 715/268
2015/0082217 A1 3/2015 Tumwattana
2015/0205398 A1 7/2015 Le
2015/0221106 A1 8/2015 Winnemoeller et al.
2017/0091153 A1 3/2017 Thimbleby
2017/0109032 A1 4/2017 MÉlinand et al.
2018/0121074 A1 5/2018 Peron et al.
2018/0129391 A1 5/2018 Files et al.
2018/0335932 A1 11/2018 Fa
2020/0401796 A1 12/2020 Chateigner
2021/0349606 A1 11/2021 Chang et al.
2021/0349627 A1 11/2021 Chang et al.

OTHER PUBLICATIONS

Invitation to Pay Additional Fees received for PCT Patent Application No. PCT/US2020/031727, dated Aug. 17, 2020, 26 pages.
Non-Final Office Action received for U.S. Appl. No. 17/031,678, dated Jul. 8, 2021, 26 pages.
Final Office Action received for U.S. Appl. No. 17/031,678, dated Jan. 10, 2022, 30 pages.
Non-Final Office Action received for U.S. Appl. No. 17/031,844, dated Dec. 3, 2021, 29 pages.
International Search Report received for International Application No. PCT/US2021/031866, dated Nov. 8, 2021, 7 pages.

* cited by examiner

FIG. 10AAA

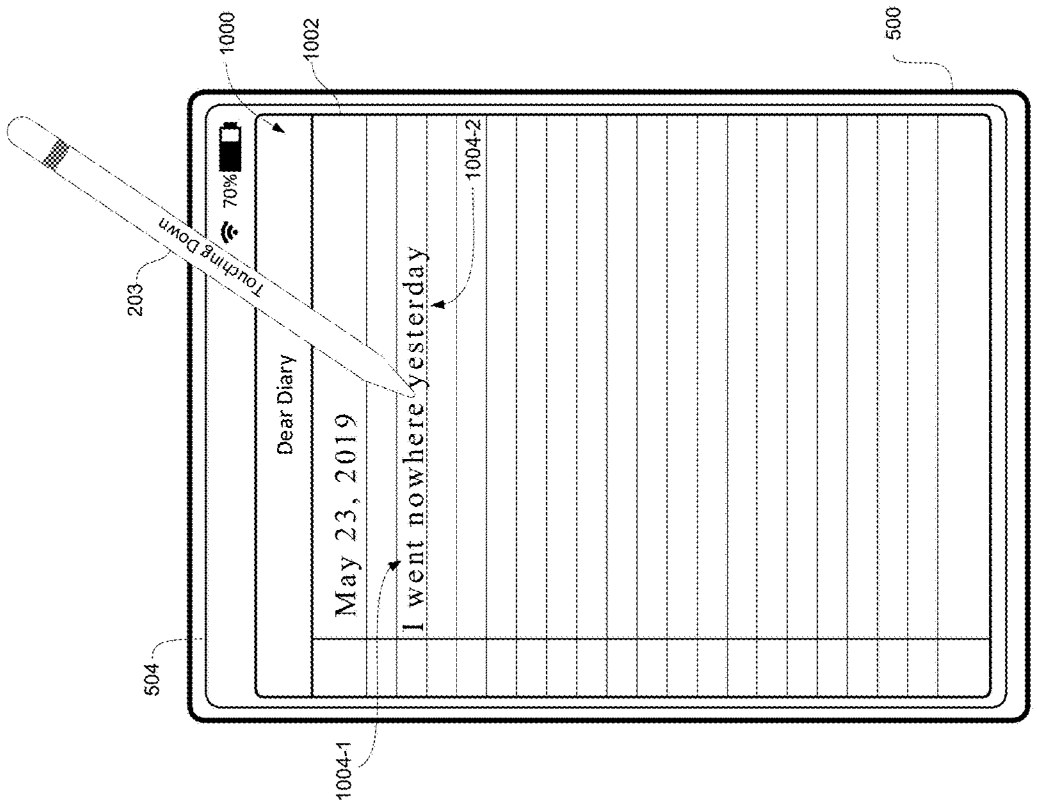
FIG. 10CCC
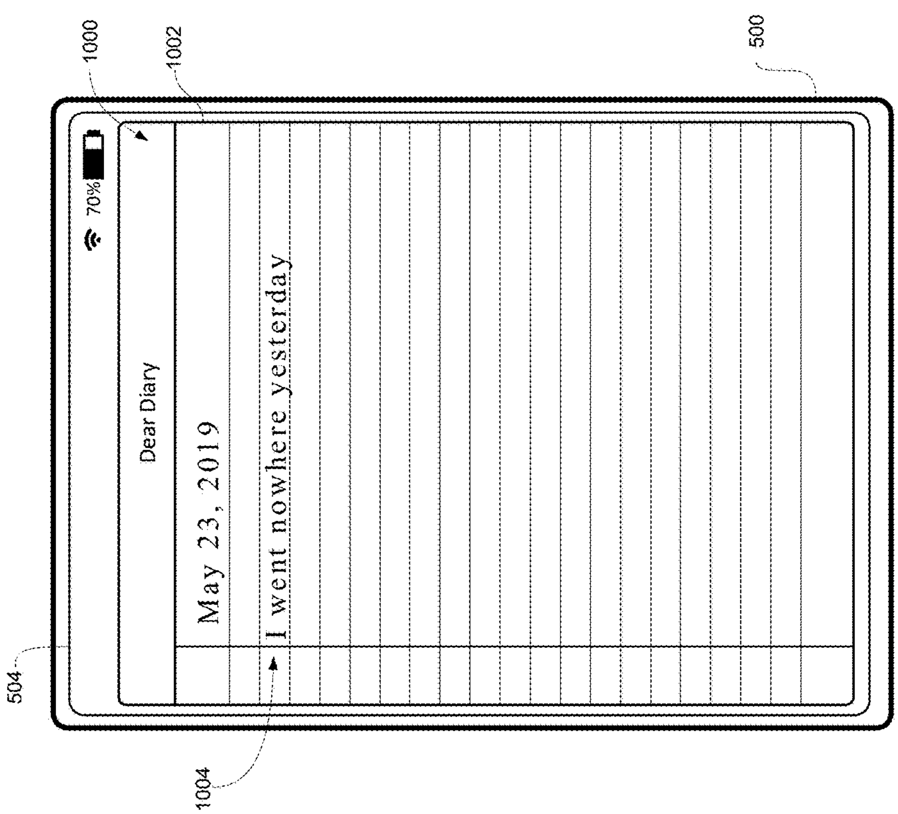
FIG. 10BBB

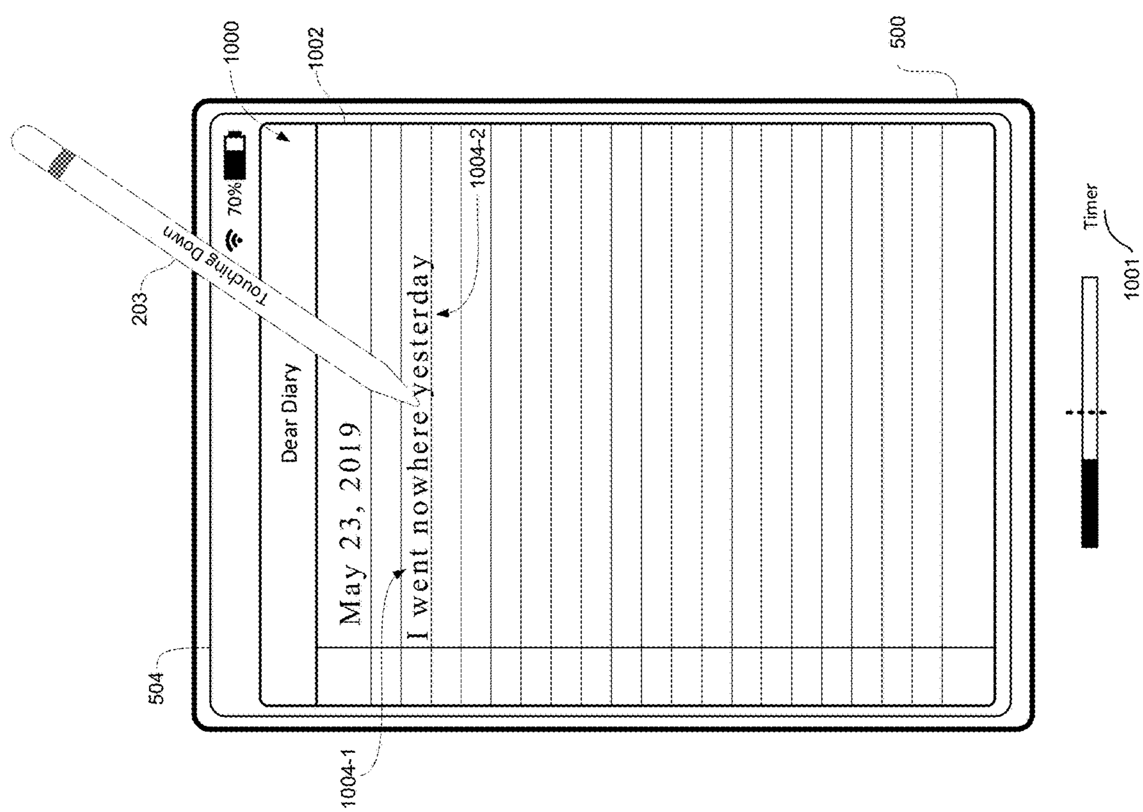
FIG. 10DDD
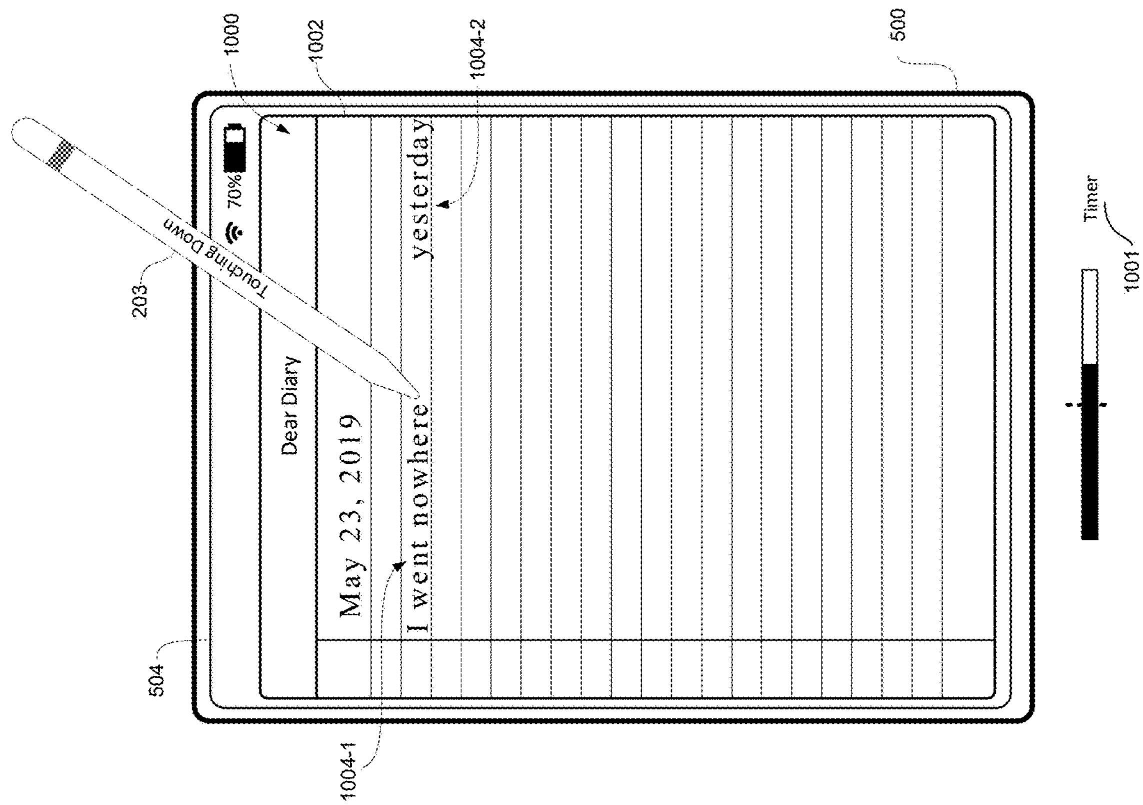
FIG. 10EEE

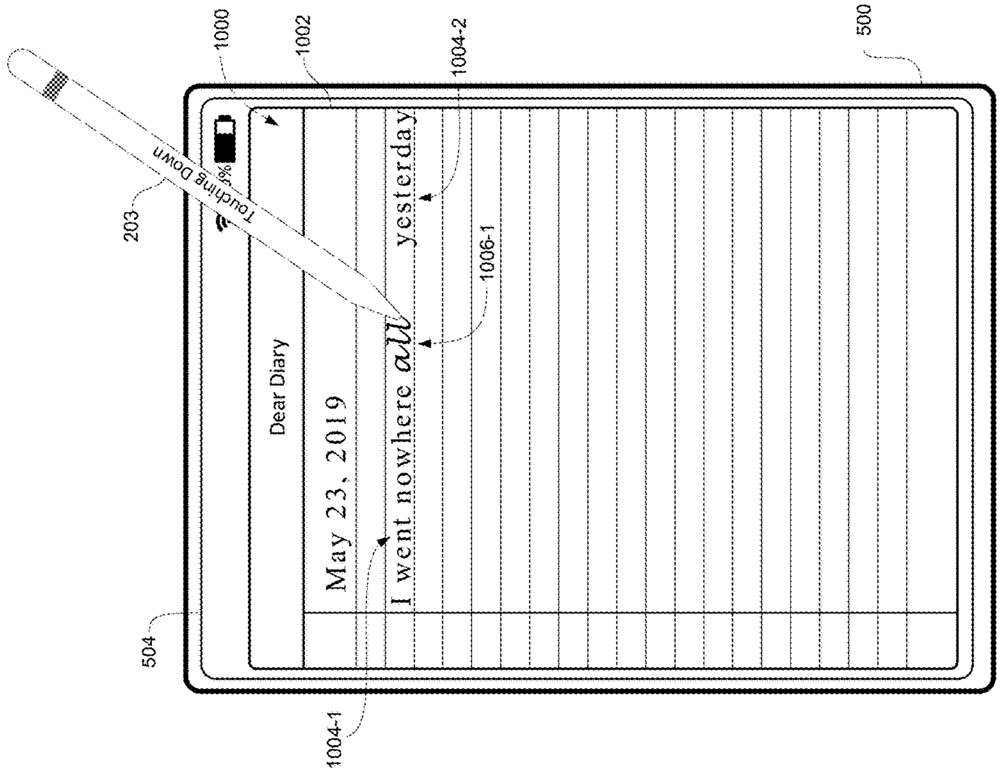
FIG. 10GGG
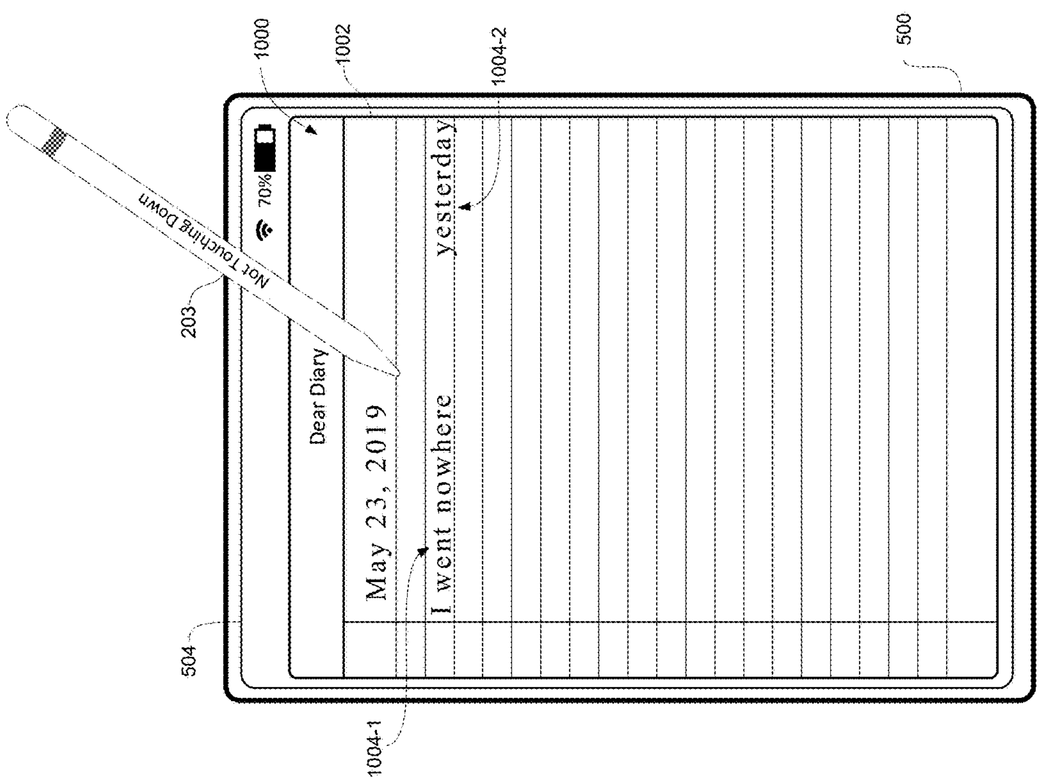
FIG. 10FFF

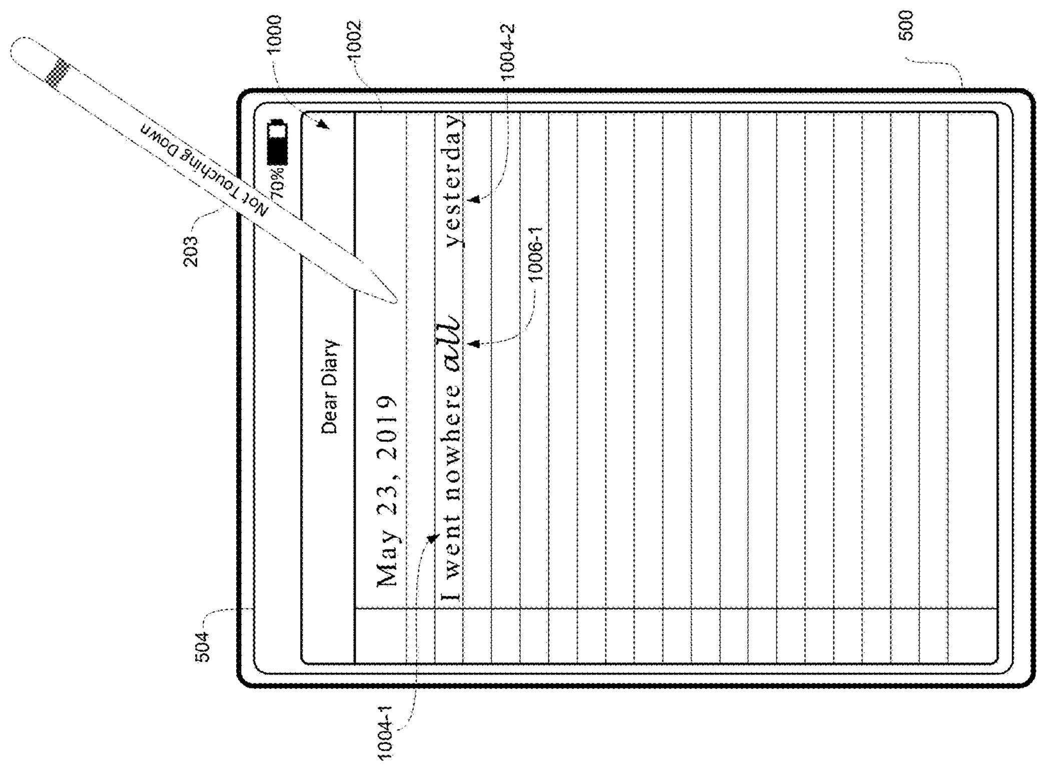
FIG. 10HHH
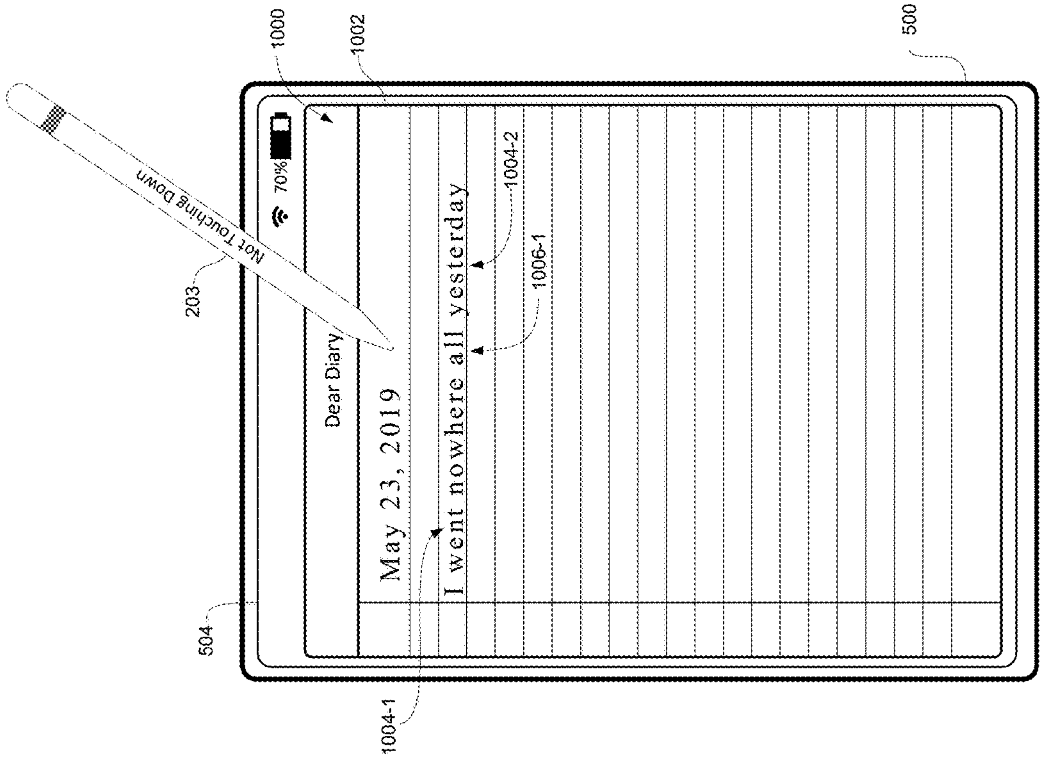
FIG. 10III

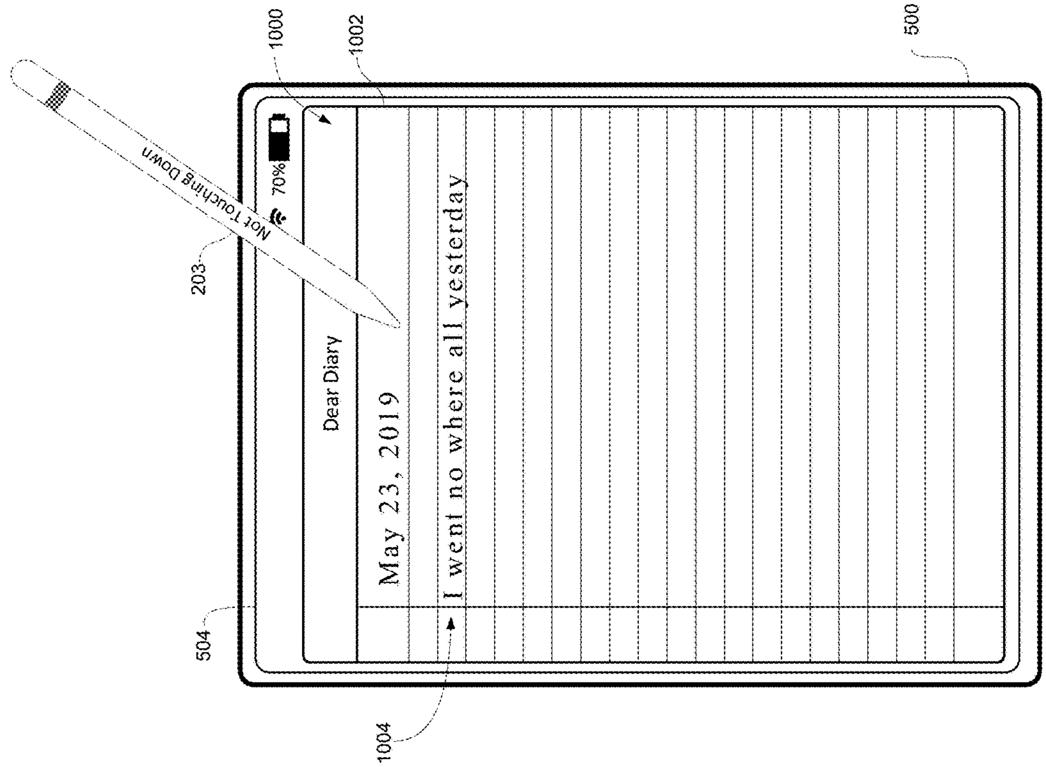
FIG. 10KKK
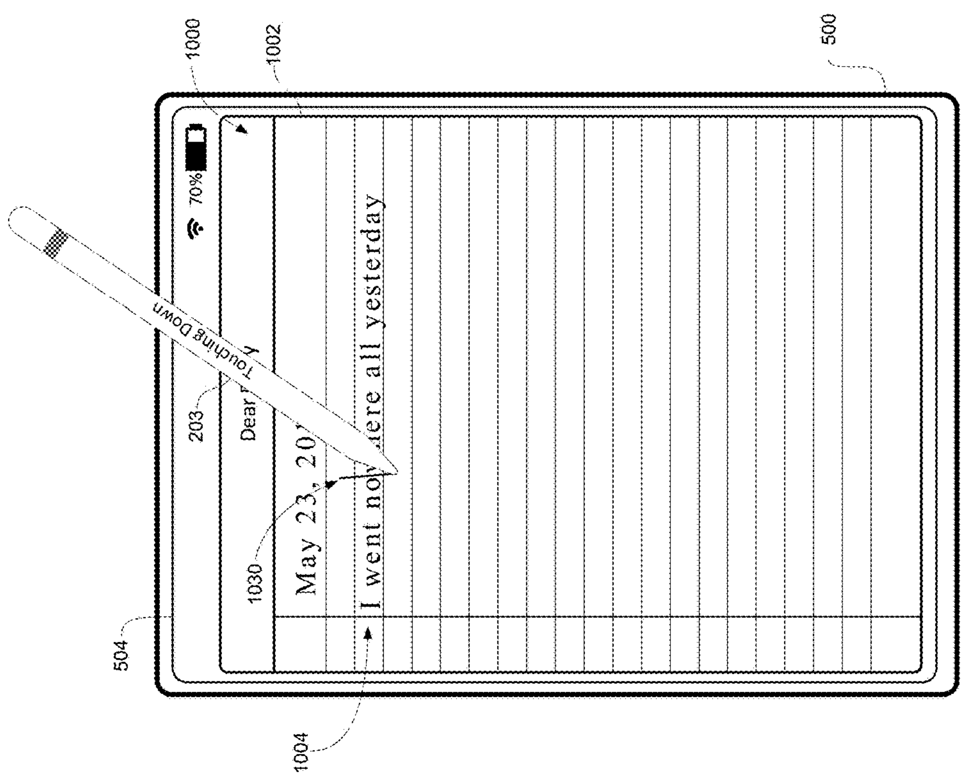
FIG. 10JJJ

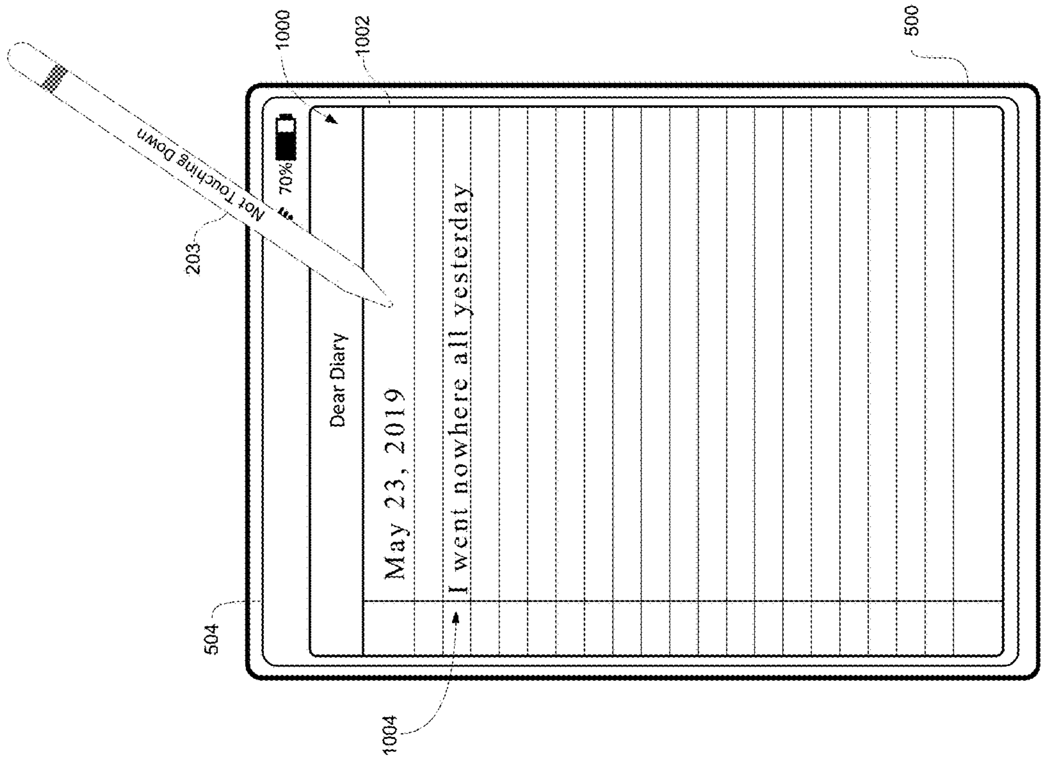
FIG. 10MMM
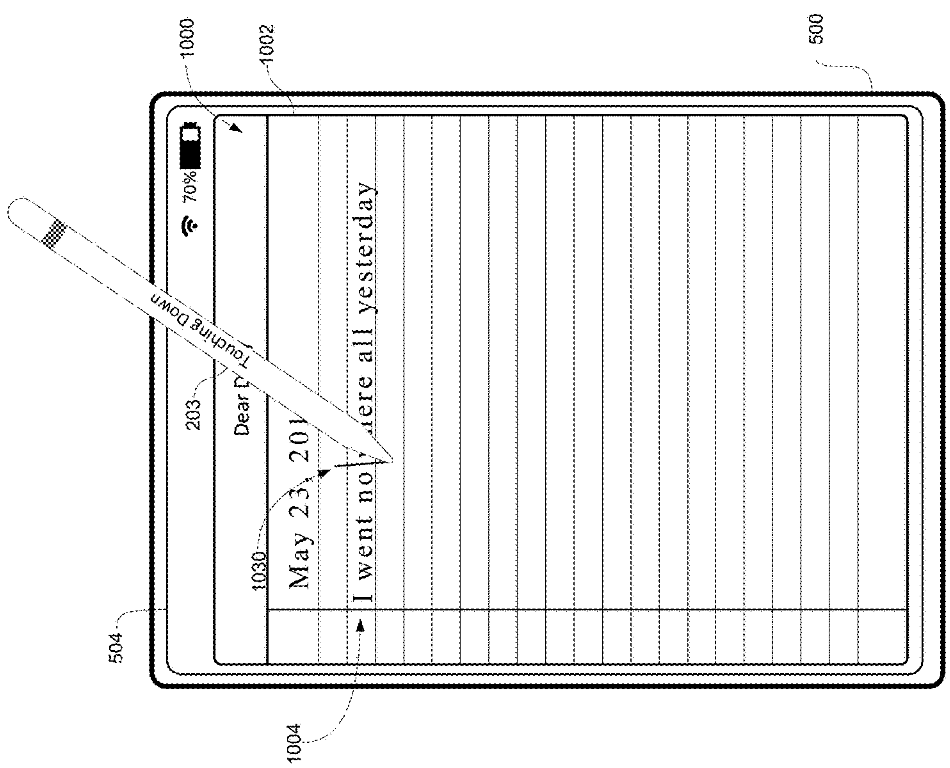
FIG. 10LLL

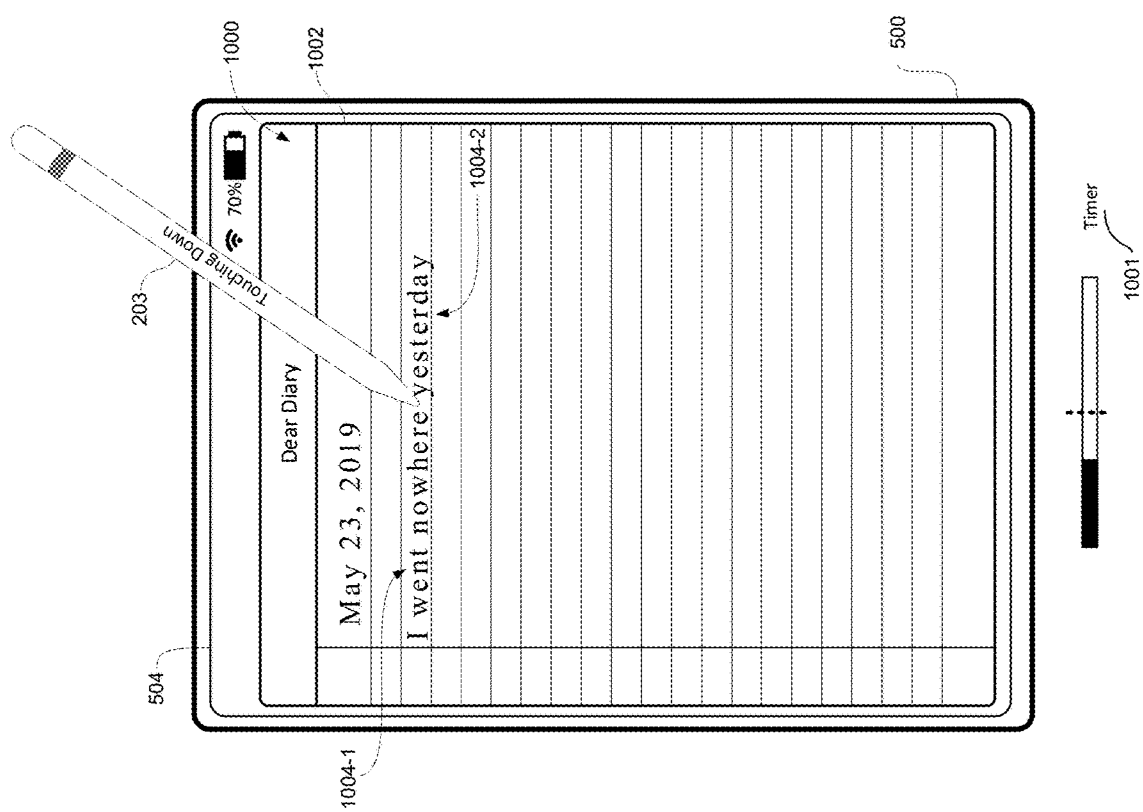
FIG. 10NNN
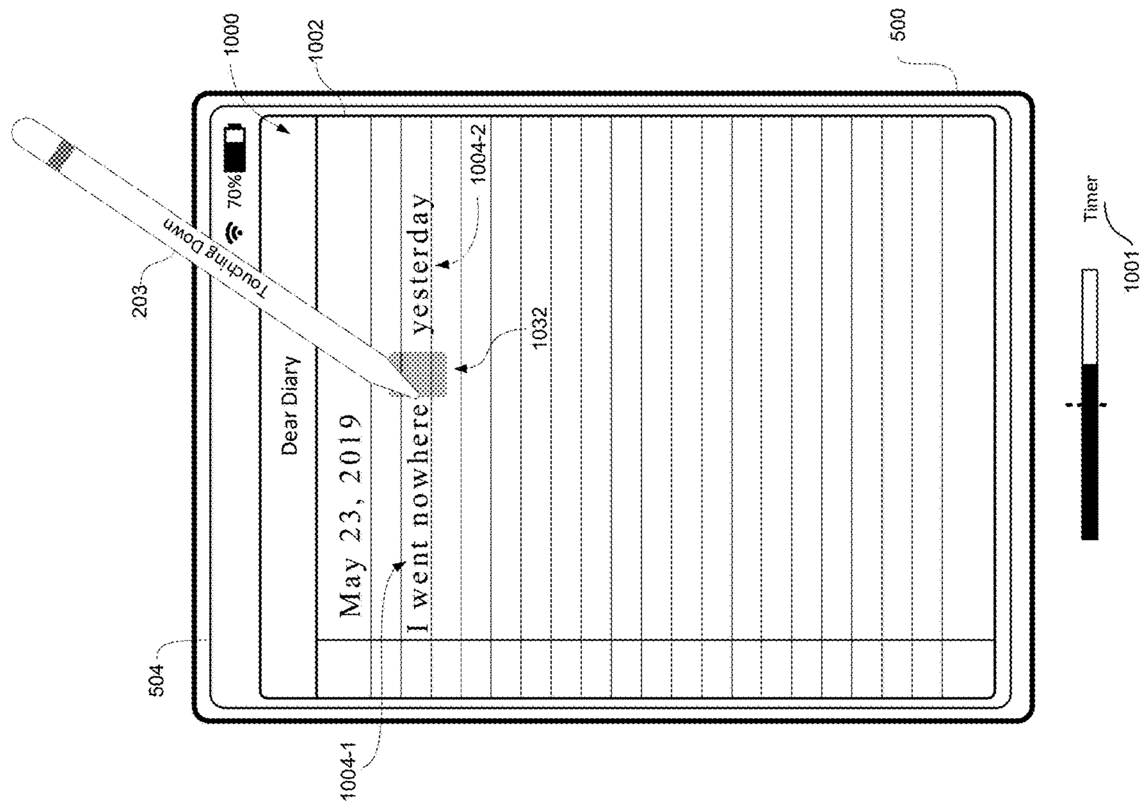
FIG. 10OOO

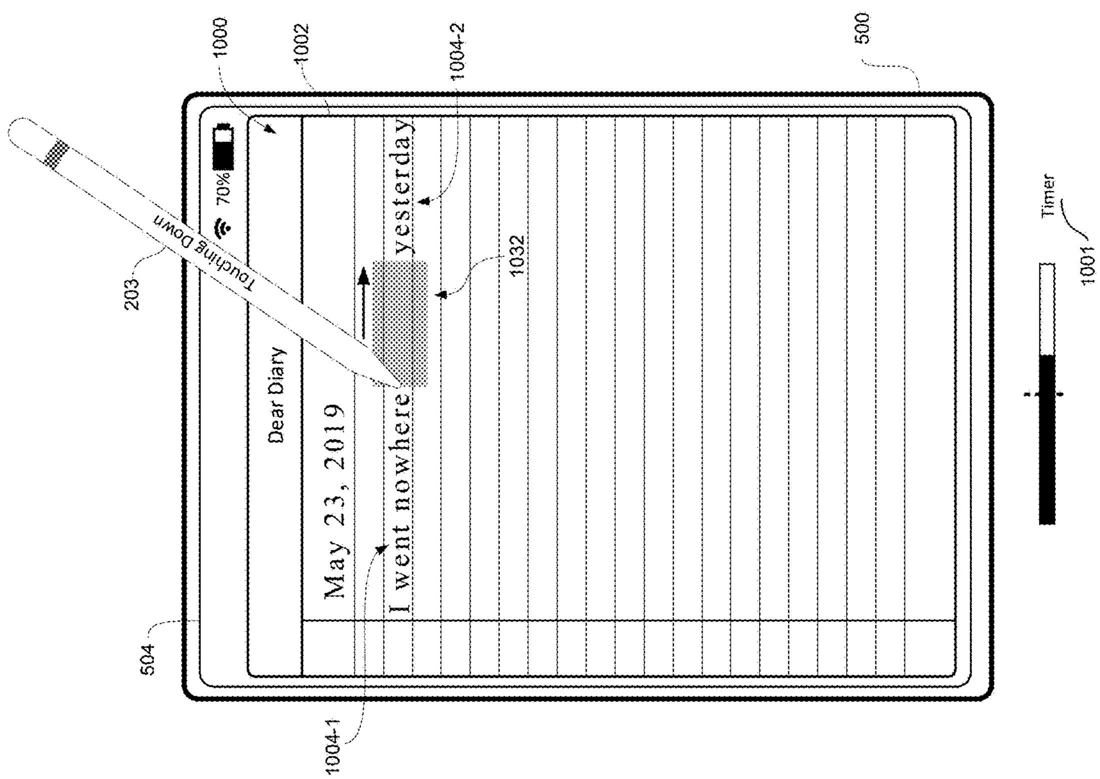
FIG. 10PPP
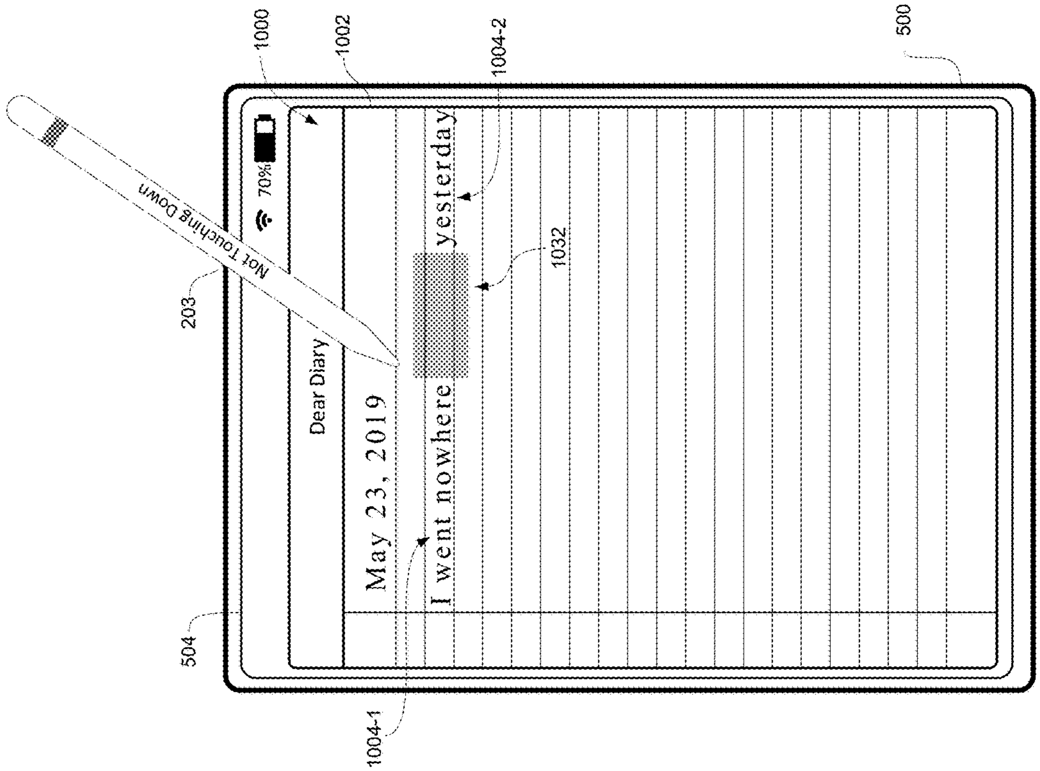
FIG. 10QQQ

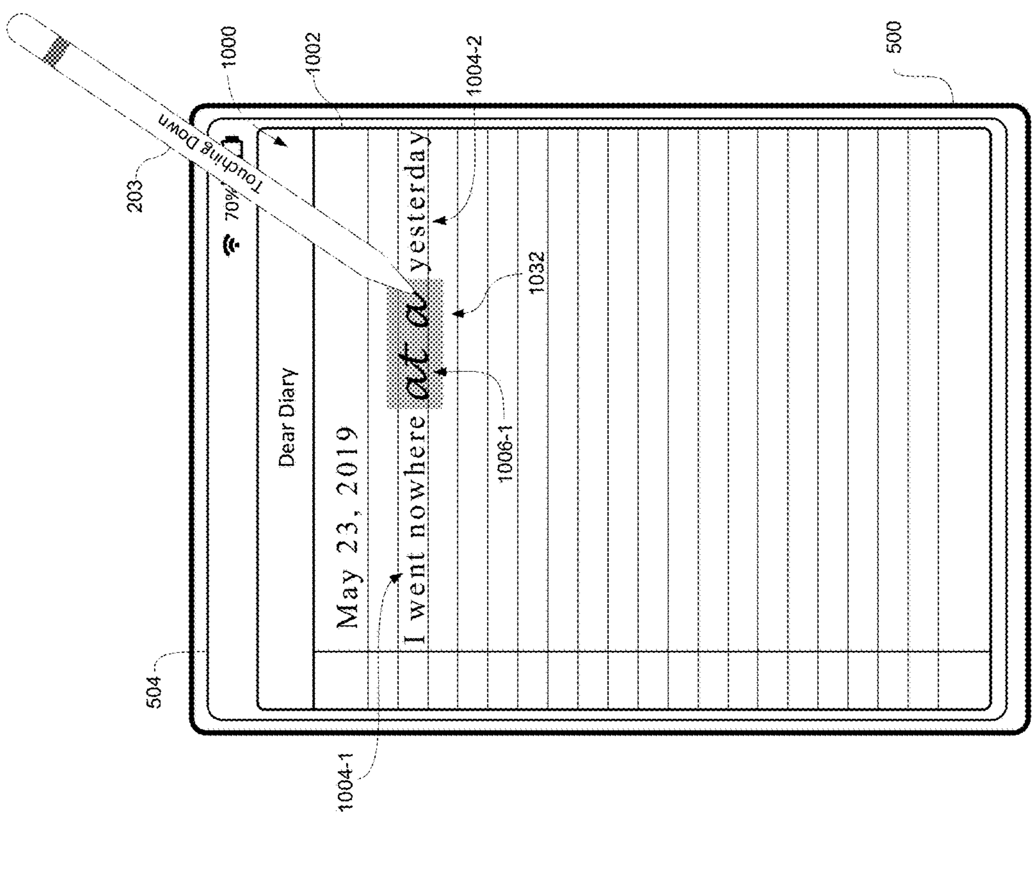
FIG. 10RRR
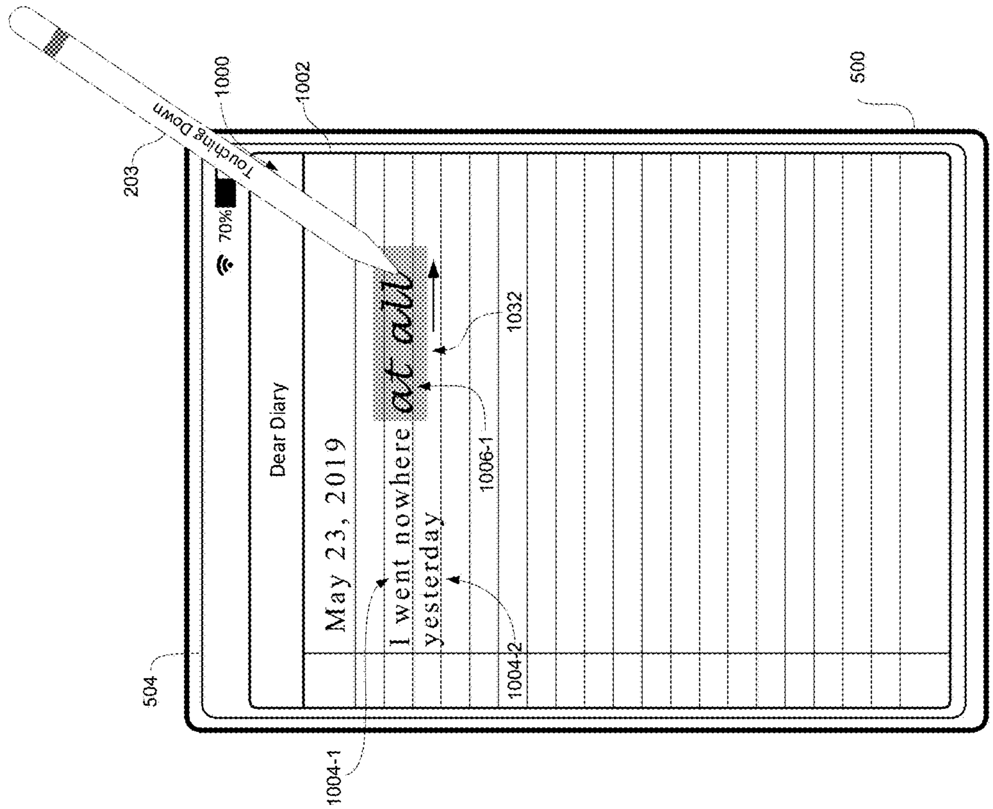
FIG. 10SSS

HANDWRITING ENTRY ON AN ELECTRONIC DEVICE

CROSS REFERENCE TO RELATED APPLICATIONS

This application claims the benefit of U.S. Provisional Patent Application No. 62/843,976, filed May 6, 2019, U.S. Provisional Patent Application No. 62/859,413, filed Jun. 10, 2019, and U.S. Provisional Patent Application No. 63/020,496 filed May 5, 2020, the contents of which are hereby incorporated by reference in their entireties for all purposes.

FIELD OF THE DISCLOSURE

This relates generally to electronic devices that accept handwritten inputs, and user interactions with such devices.

BACKGROUND

User interaction with electronic devices has increased significantly in recent years. These devices can be devices such as computers, tablet computers, televisions, multimedia devices, mobile devices, and the like.

In some circumstances, users wish to input text on an electronic device or otherwise interact with an electronic device with a stylus. In some circumstances, users wish to use a stylus or other handwriting device to handwrite desired text onto the touch screen display of the electronic device. Enhancing these interactions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY

Some embodiments described in this disclosure are directed to receiving handwritten inputs in text entry fields and converting the handwritten inputs into font-based text. Some embodiments described in this disclosure are directed to selecting and deleting text using a stylus. Some embodiments of the disclosure are directed to inserting text into pre-existing text using a stylus. Some embodiments of the disclosure are directed to managing the timing of converting handwritten inputs into font-based text. Some embodiments of the disclosure are directed to presenting, on an electronic device, a handwritten entry menu. Some embodiments of the disclosure are directed to controlling the characteristic of handwritten inputs based on selections on the handwritten entry menu. Some embodiments of the disclosure are directed to presenting autocomplete suggestions. Some embodiments of the disclosure are directed to converting handwritten input to font-based text. Some embodiments of the disclosure are directed to displaying options in a content entry palette.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1B:
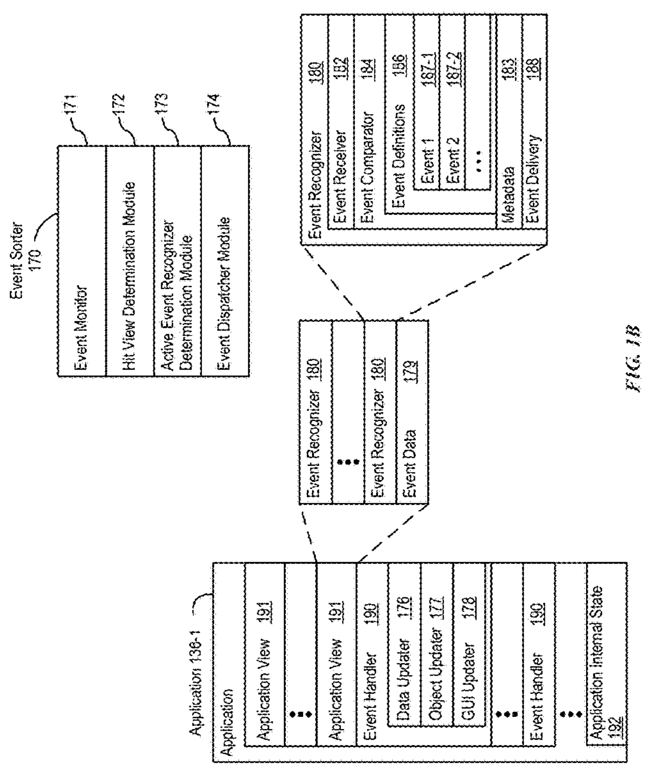
FIG. 1B is a block diagram illustrating exemplary components for event handling in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods for receiving and interpreting handwritten inputs (e.g., from a stylus or other handwriting input device). Such techniques can reduce the cognitive burden on a user who uses such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
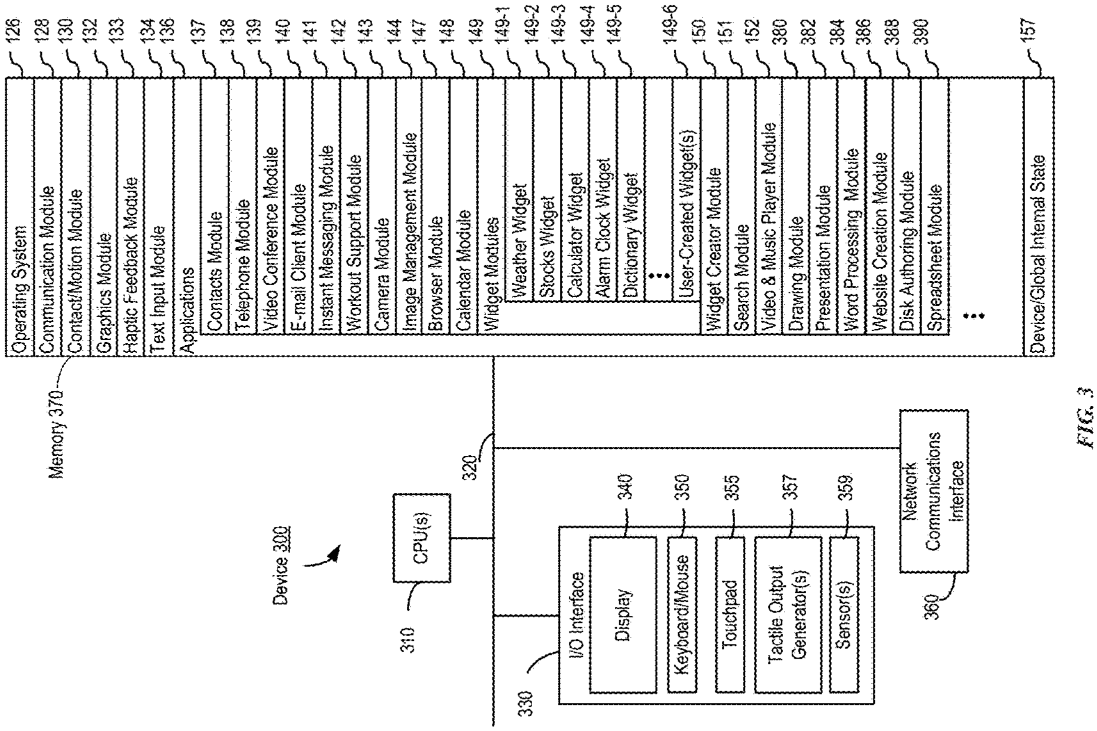
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;

Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1A:
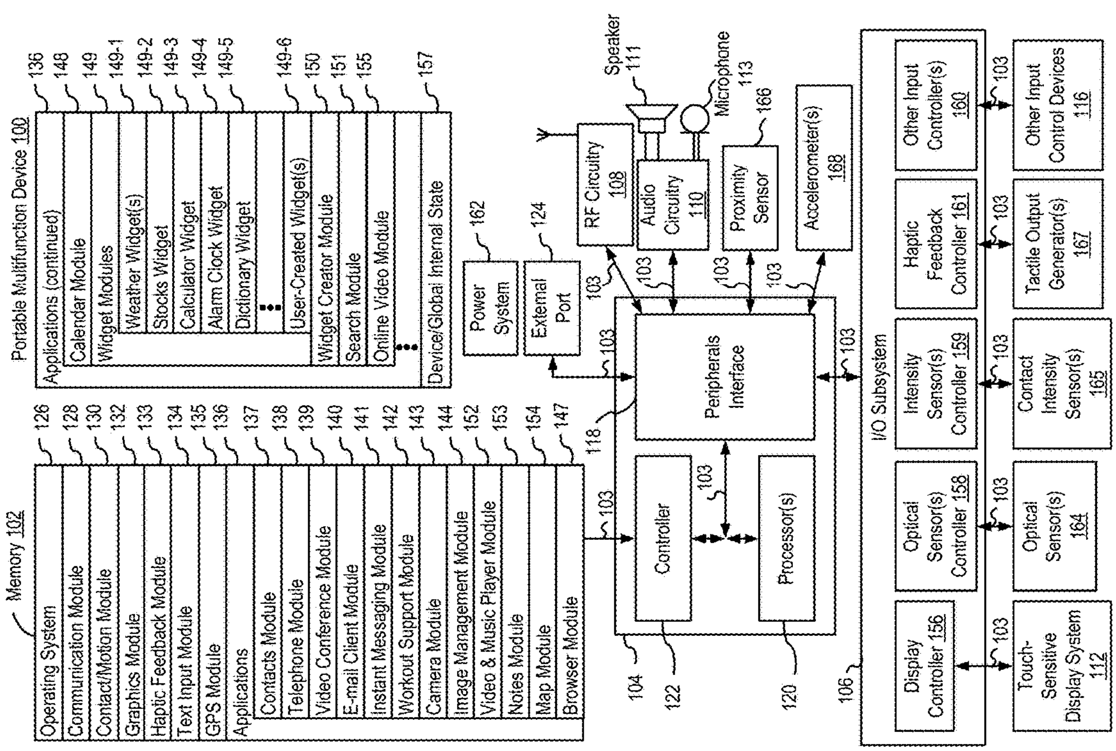
FIG. 1A is a block diagram illustrating a portable multifunction device with a touch-sensitive display in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
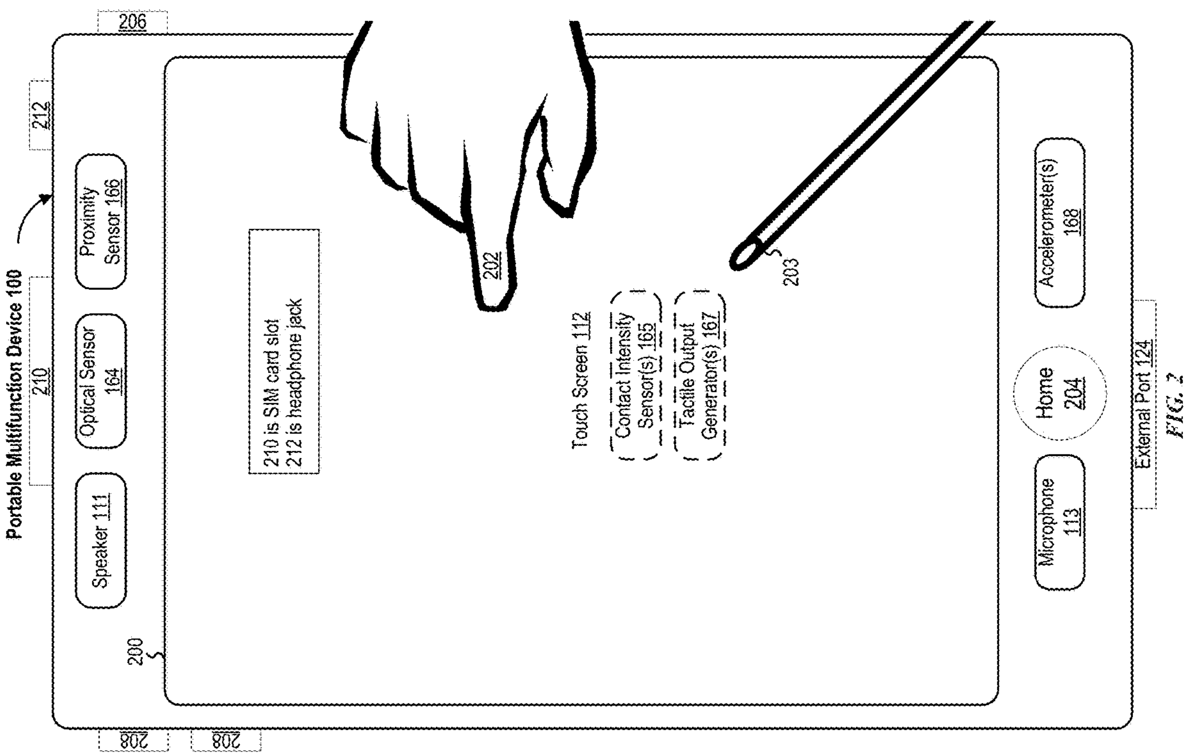
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

In some embodiments, stylus 203 is an active device and includes one or more electronic circuitry. For example, stylus 203 includes one or more sensors, and one or more communication circuitry (such as communication module 128 and/or RF circuitry 108). In some embodiments, stylus 203 includes one or more processors and power systems (e.g., similar to power system 162). In some embodiments, stylus 203 includes an accelerometer (such as accelerometer 168), magnetometer, and/or gyroscope that is able to determine the position, angle, location, and/or other physical characteristics of stylus 203 (e.g., such as whether the stylus is placed down, angled toward or away from a device, and/or near or far from a device). In some embodiments, stylus 203 is in communication with an electronic device (e.g., via communication circuitry, over a wireless communication protocol such as Bluetooth) and transmits sensor data to the electronic device. In some embodiments, stylus 203 is able to determine (e.g., via the accelerometer or other sensors) whether the user is holding the device. In some embodiments, stylus 203 can accept tap inputs (e.g., single tap or double tap) on stylus 203 (e.g., received by the accelerometer or other sensors) from the user and interpret the input as a command or request to perform a function or change to a different input mode.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4B:
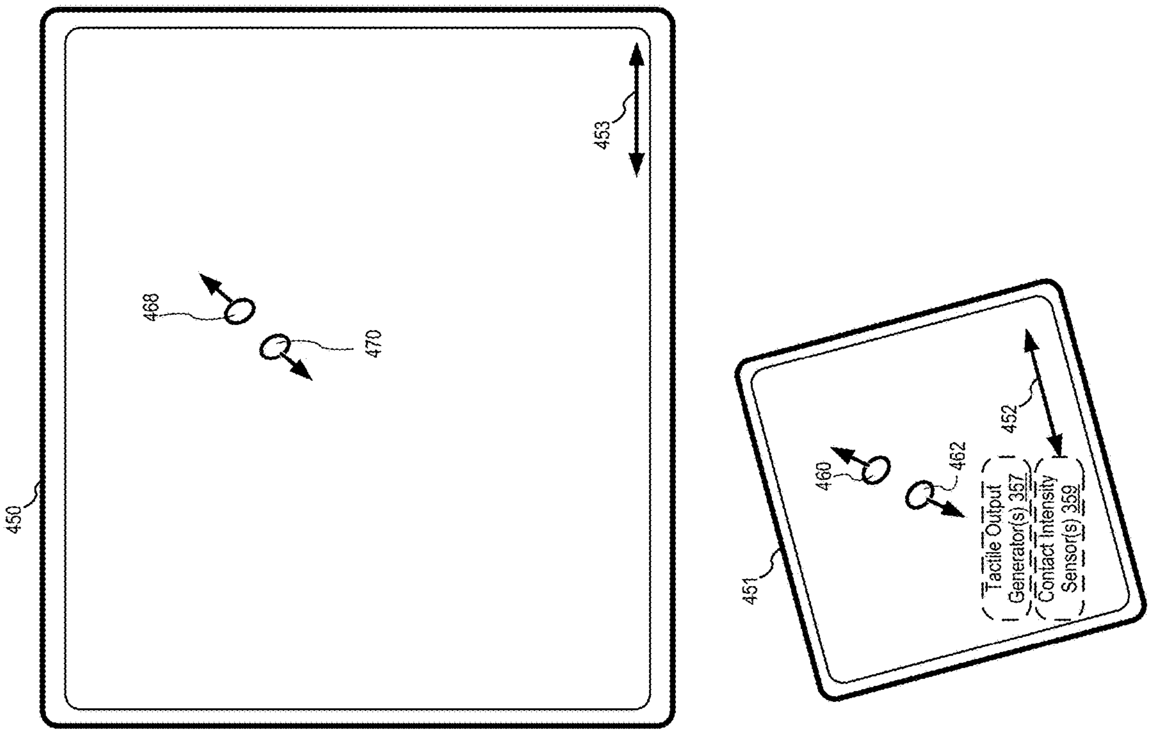
FIG. 4B illustrates an exemplary user interface for a multifunction device with a touch-sensitive surface that is separate from the display in accordance with some embodiments.
Figure 4A:
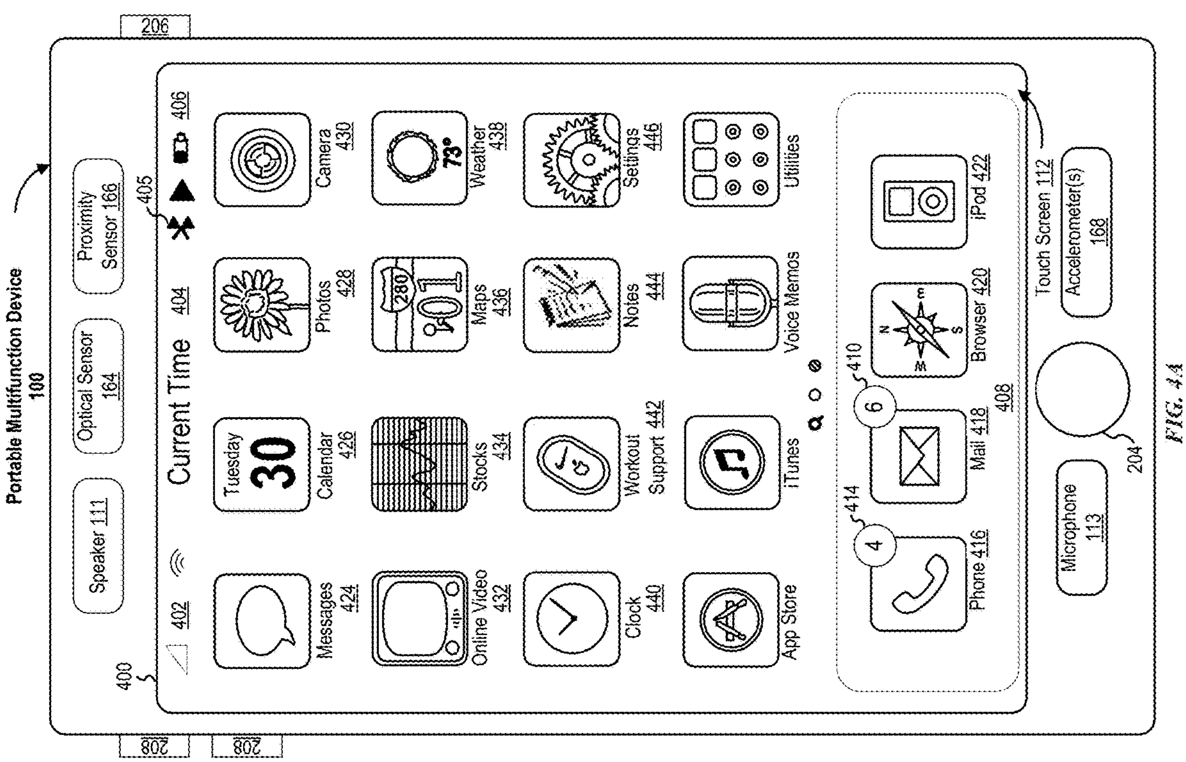
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5B:
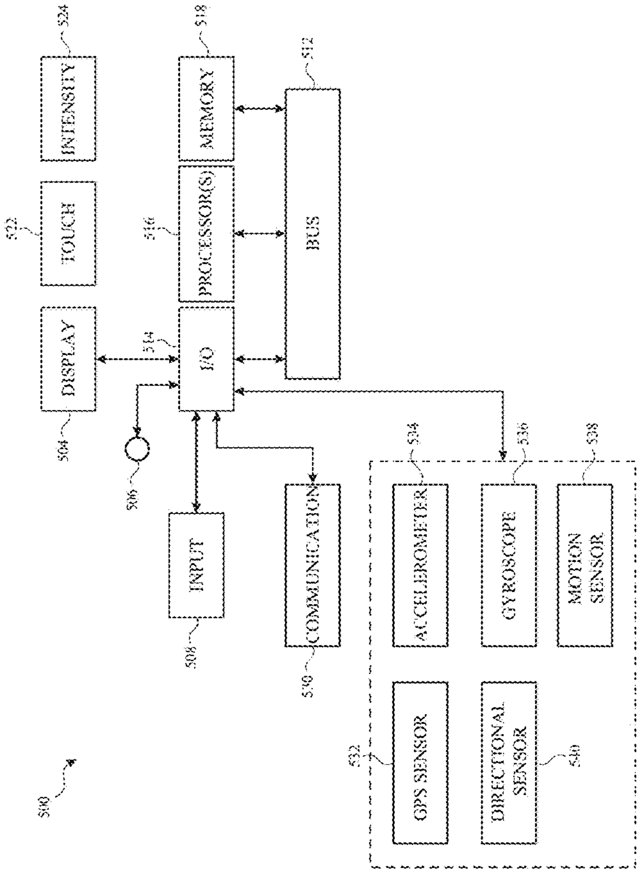
FIG. 5B is a block diagram illustrating a personal electronic device in accordance with some embodiments.
Figure 5A:
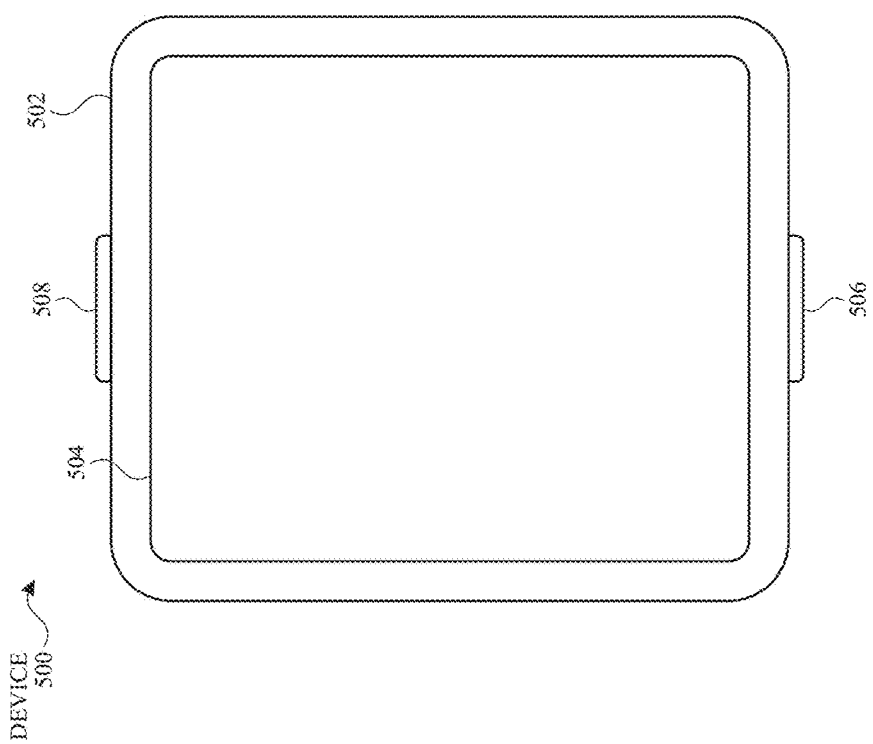
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, 1300, 1500, 1600, 1800, 2000, and 2200 (FIGS. 7, 9, 11, 13, 15, 16, 18, 20, 22). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5D:
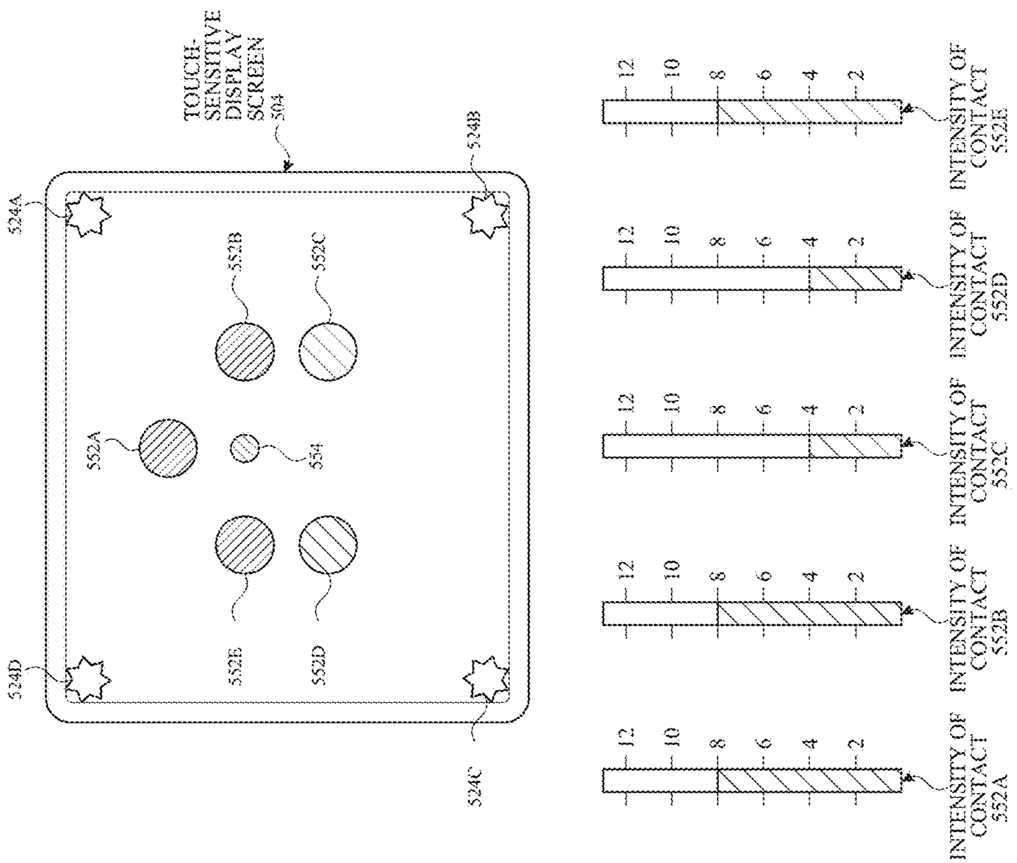
FIGS. 5C-5D illustrate exemplary components of a personal electronic device having a touch-sensitive display and intensity sensors in accordance with some embodiments.
Figure 5C:
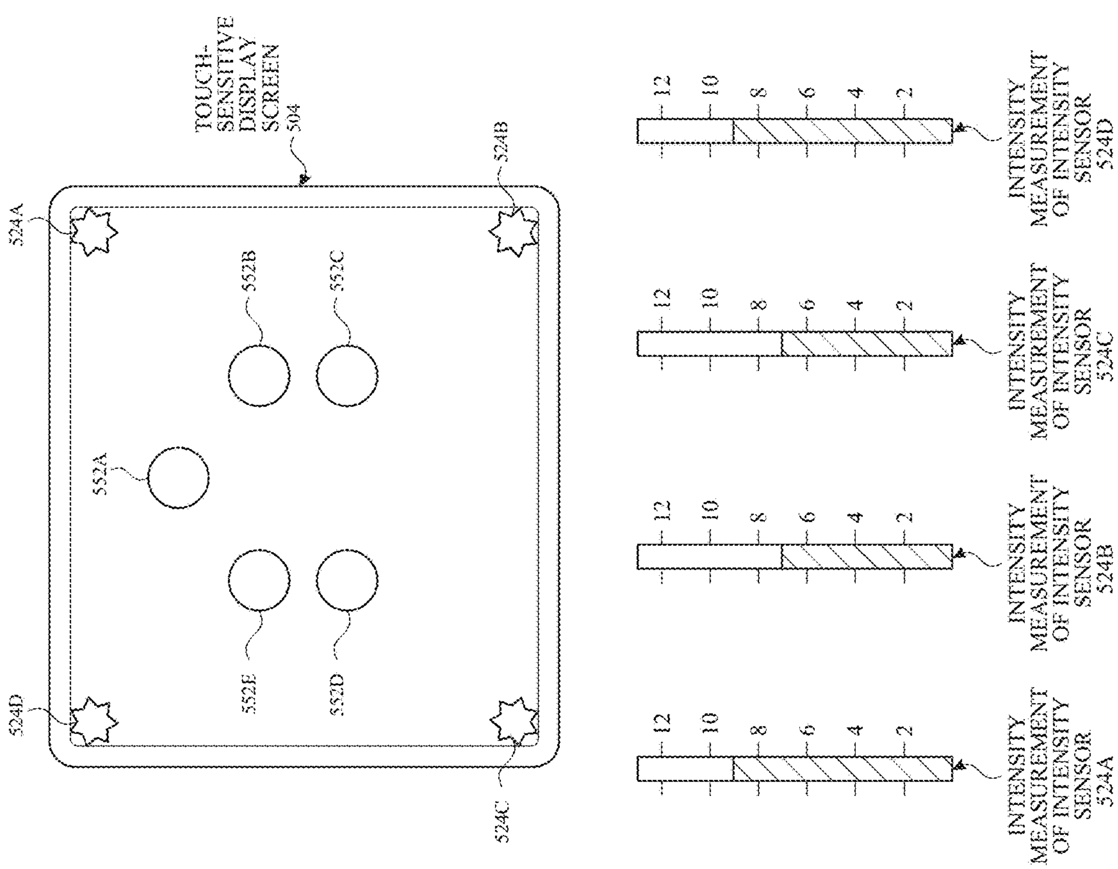

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, Ij=A·(Dj/

ΣDi), where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5F:
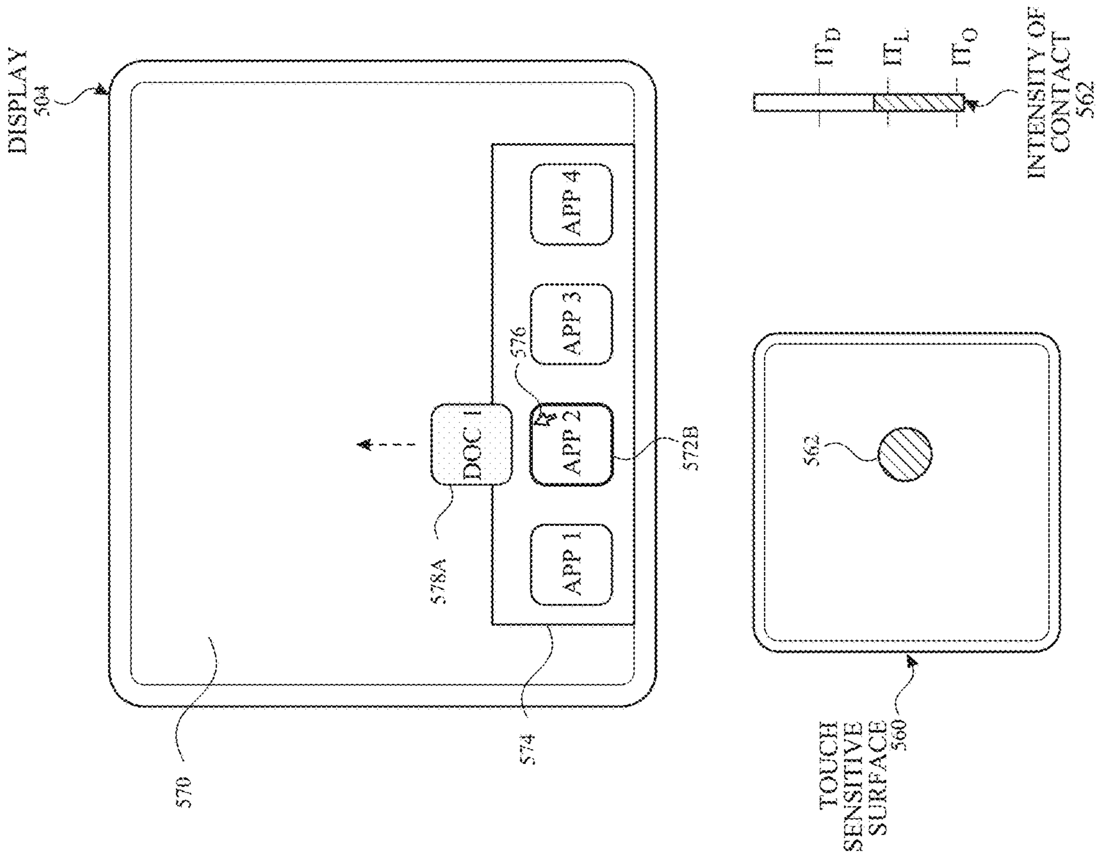
FIGS. 5E-5H illustrate exemplary components and user interfaces of a personal electronic device in accordance with some embodiments.
Figure 5E:
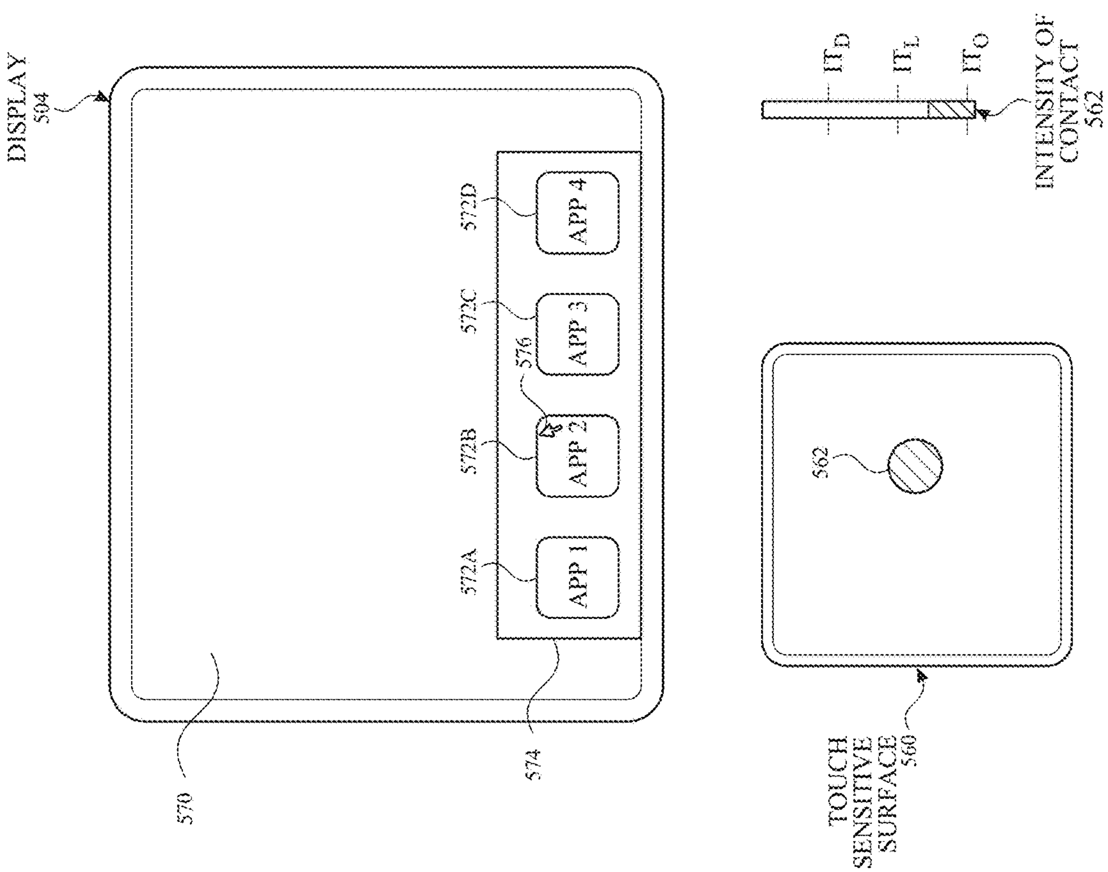
Figure 5H:
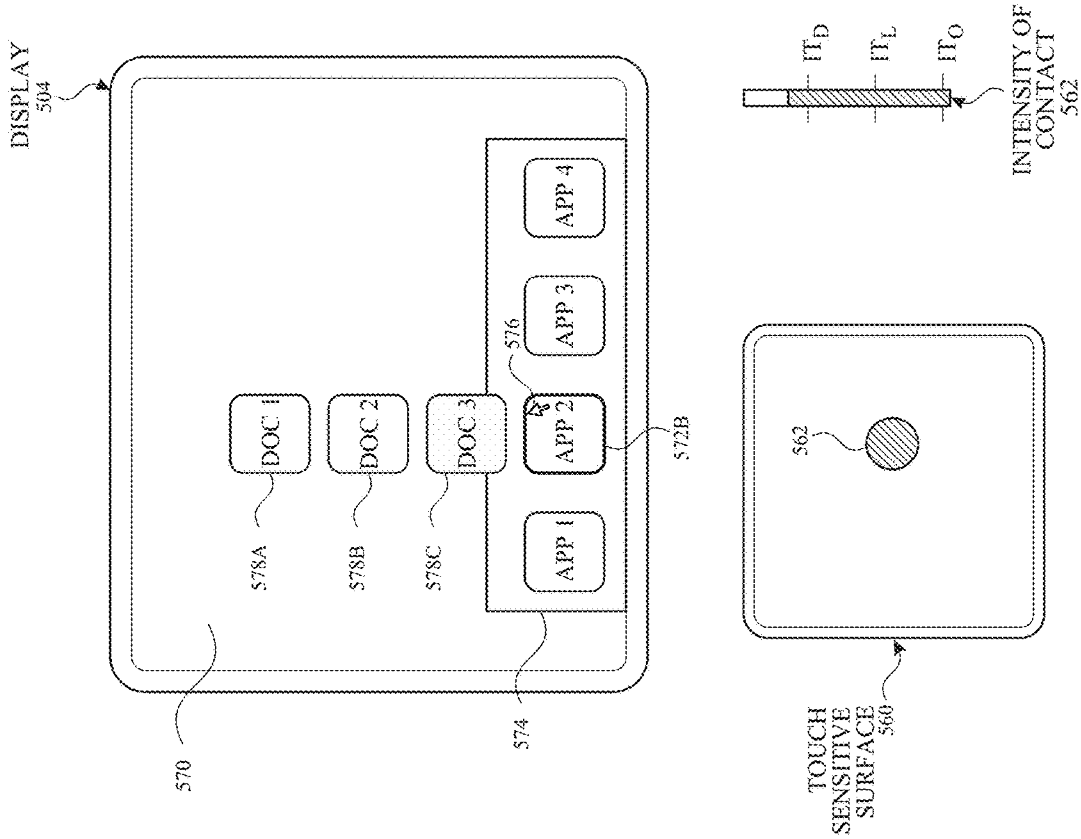

FIGS. 5E-5H illustrate detection of a gesture that includes a press input that corresponds to an increase in intensity of a contact 562 from an intensity below a light press intensity threshold (e.g., "ITL") in FIG. 5E, to an intensity above a deep press intensity threshold (e.g., "ITD") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "ITD"). Contact 562 is maintained on touch-sensitive surface 560. In response to the detection of the gesture, and in accordance with contact 562 having an intensity that goes above the deep press intensity threshold (e.g., "ITD") during the gesture, reduced-scale representations 578A-578C (e.g., thumbnails) of recently opened documents for App 2 are displayed, as shown in FIGS. 5F-5I. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

Figure 5G:
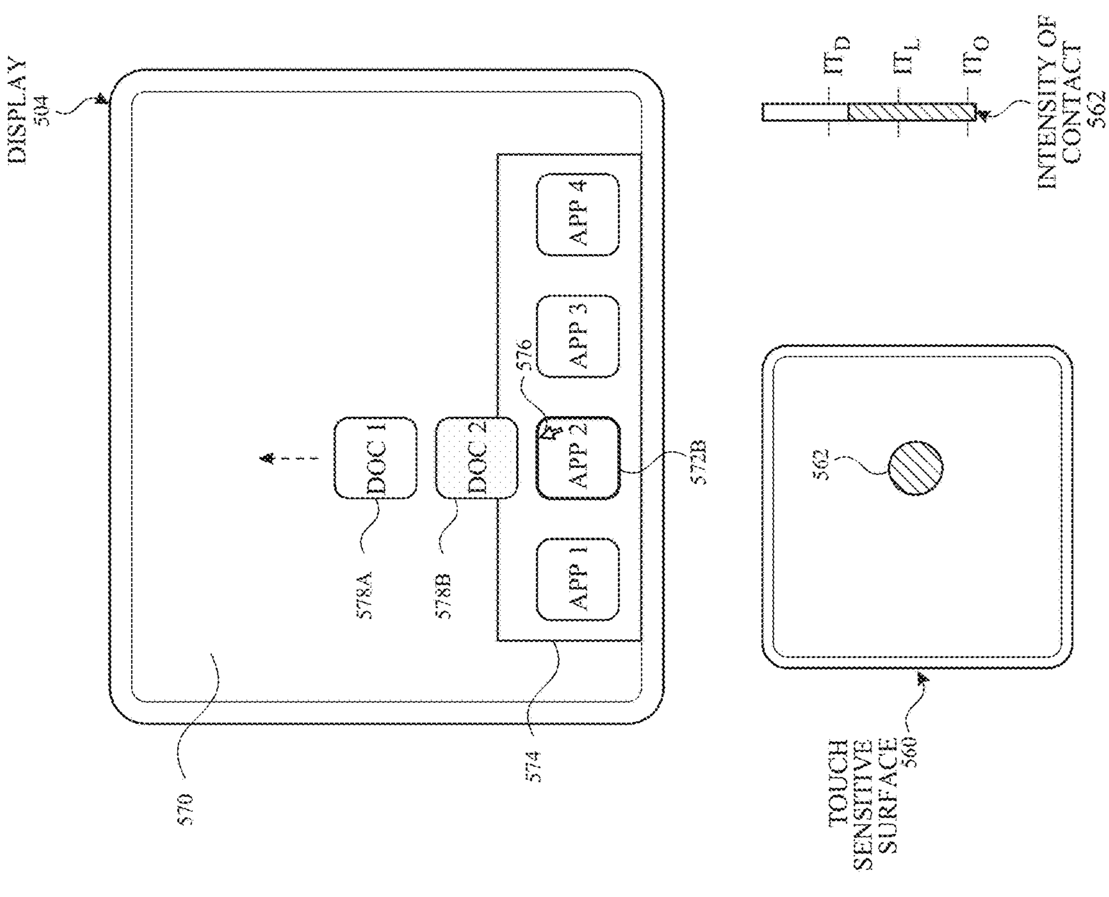

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITD"). In some embodiments, the intensity, on which the progress of the animation is based, is the characteristic intensity of the contact. The operations described with reference to FIGS. 5E-5H can be performed using an electronic device similar or identical to device 100, 300, or 500.

Figure 5I:
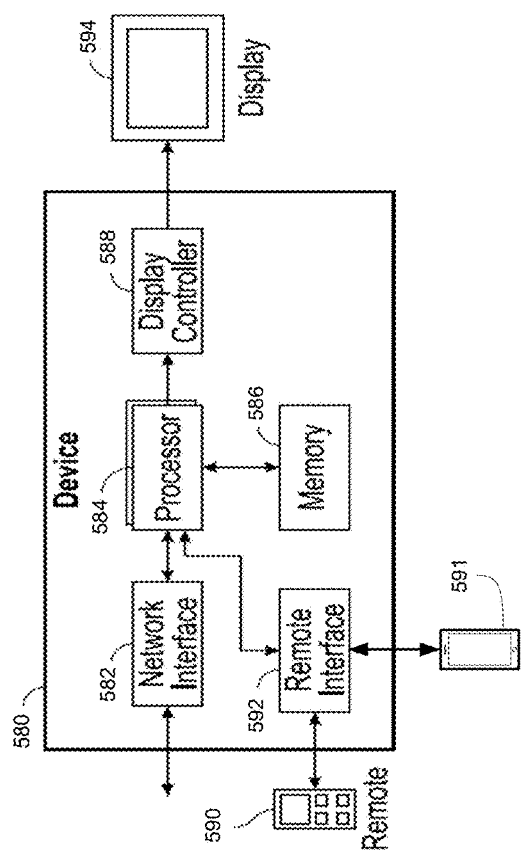
FIG. 5I illustrates a block diagram of an exemplary architectures for devices according to some embodiments of the disclosure.

FIG. 5I illustrates a block diagram of an exemplary architecture for the device 580 according to some embodiments of the disclosure. In the embodiment of FIG. 5I, media or other content is optionally received by device 580 via network interface 582, which is optionally a wireless or wired connection. The one or more processors 584 optionally execute any number of programs stored in memory 586 or storage, which optionally includes instructions to perform one or more of the methods and/or processes described herein (e.g., methods 700, 900, 1100, 1300, 1500, 1600, 1800, 2000, and 2200).

In some embodiments, display controller 588 causes the various user interfaces of the disclosure to be displayed on display 594. Further, input to device 580 is optionally provided by remote 590 via remote interface 592, which is optionally a wireless or a wired connection. In some embodiments, input to device 580 is provided by a multifunction device 591 (e.g., a smartphone) on which a remote control application is running that configures the multifunction device to simulate remote control functionality, as will be described in more detail below. In some embodiments, multifunction device 591 corresponds to one or more of device 100 in FIGS. 1A and 2, device 300 in FIG. 3, and device 500 in FIG. 5A. It is understood that the embodiment of FIG. 5I is not meant to limit the features of the device of the disclosure, and that other components to facilitate other features described in the disclosure are optionally included in the architecture of FIG. 5I as well. In some embodiments, device 580 optionally corresponds to one or more of multifunction device 100 in FIGS. 1A and 2, device 300 in FIG. 3, and device 500 in FIG. 5A; network interface 582 optionally corresponds to one or more of RF circuitry 108, external port 124, and peripherals interface 118 in FIGS. 1A and 2, and network communications interface 360 in FIG. 3; processor 584 optionally corresponds to one or more of processor(s) 120 in FIG. 1A and CPU(s) 310 in FIG. 3; display controller 588 optionally corresponds to one or more of display controller 156 in FIG. 1A and I/O interface 330 in FIG. 3; memory 586 optionally corresponds to one or more of memory 102 in FIG. 1A and memory 370 in FIG. 3; remote interface 592 optionally corresponds to one or more of peripherals interface 118, and I/O subsystem 106 (and/or its components) in FIG. 1A, and I/O interface 330 in FIG. 3; remote 590 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 594 optionally corresponds to one or more of touch-sensitive display system 112 in FIGS. 1A and 2, and display 340 in FIG. 3.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

USER INTERFACES AND ASSOCIATED PROCESSES

Converting Handwritten Inputs to Text

Users interact with electronic devices in many different manners, including entering text into the electronic device. In some embodiments, an electronic device provides a virtual keyboard (e.g., soft keyboard) which mimics the layout of a physical keyboard and allows a user to select the letters to input. The embodiments described below provide ways in which an electronic device accepts handwritten inputs from a handwriting input device (e.g., a stylus) and converts the handwritten input into font-based text (e.g., computer text, digital text, etc.). Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
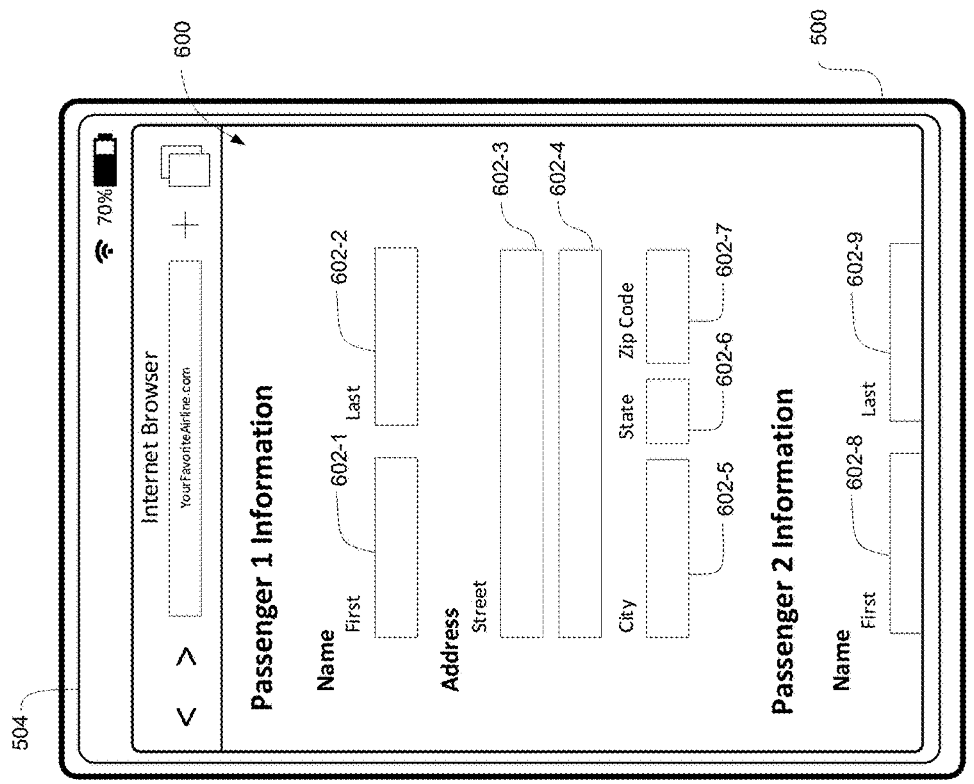
FIGS. 6A-6YY illustrate exemplary ways in which an electronic device converts handwritten inputs into font-based text in accordance with some embodiments.
Figure 6C:
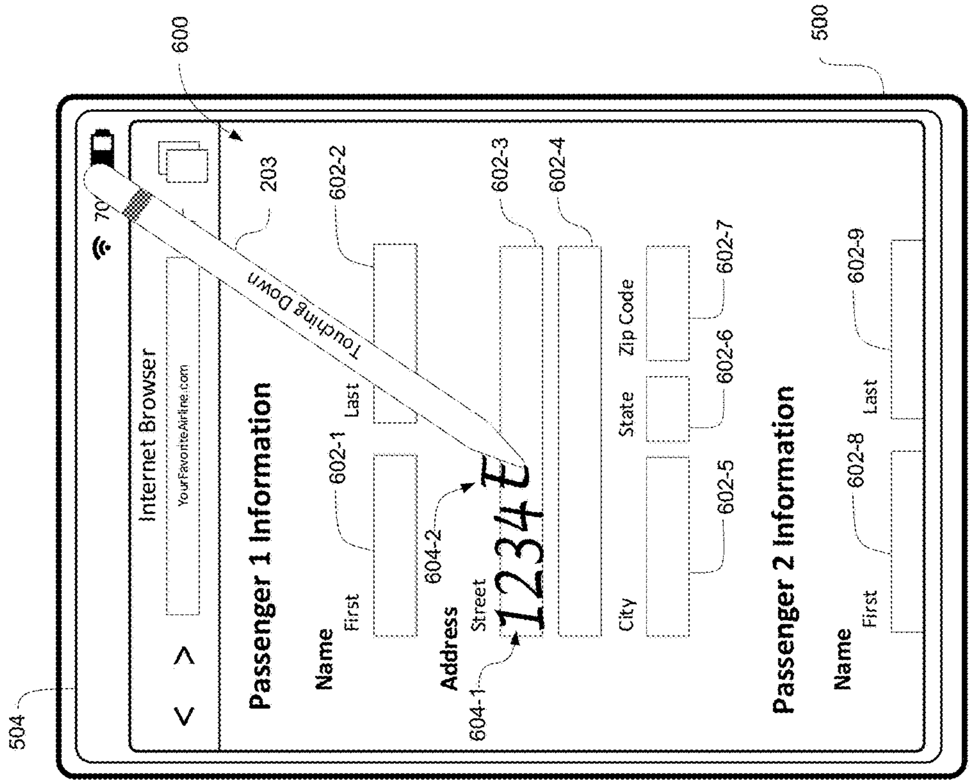
Figure 6B:
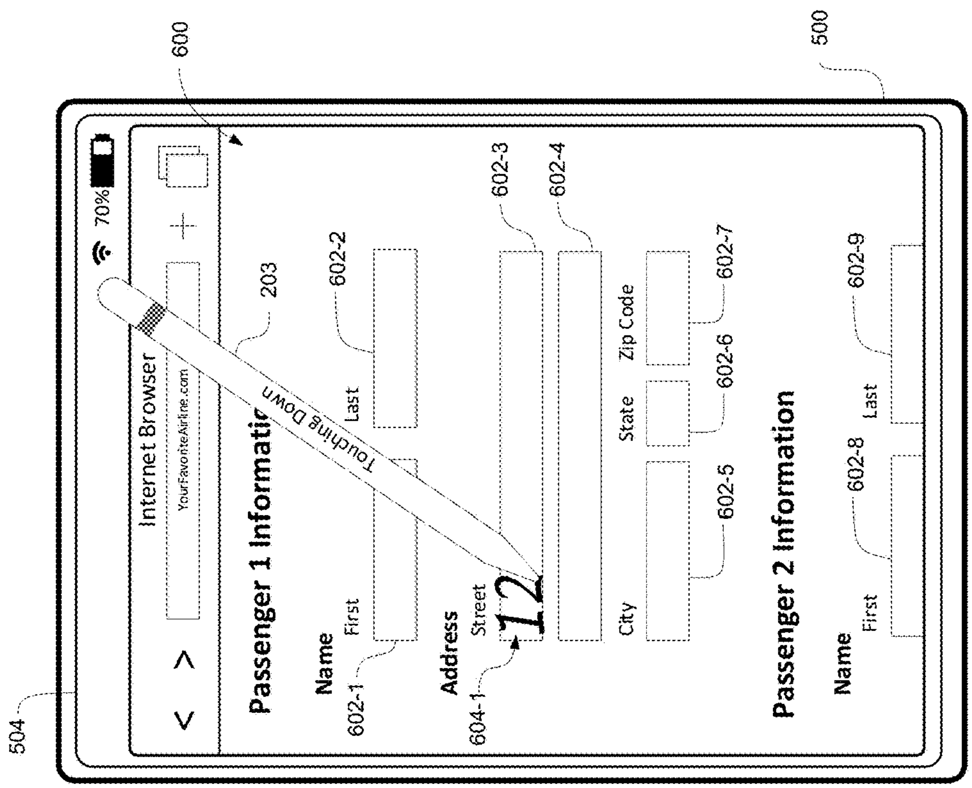
Figure 6E:
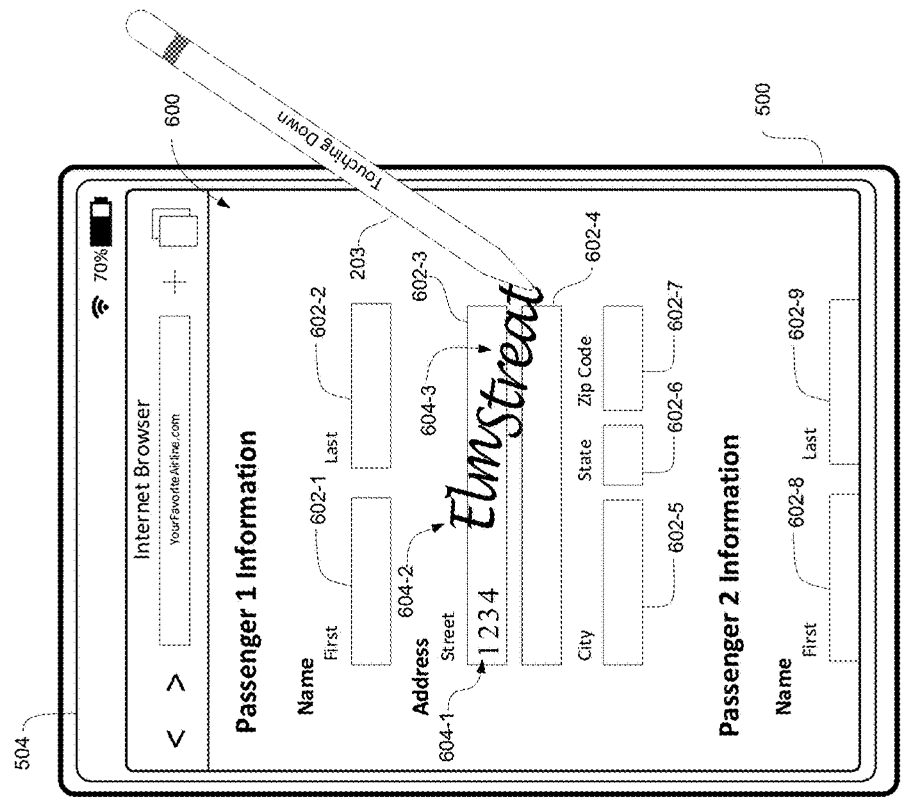
Figure 6D:
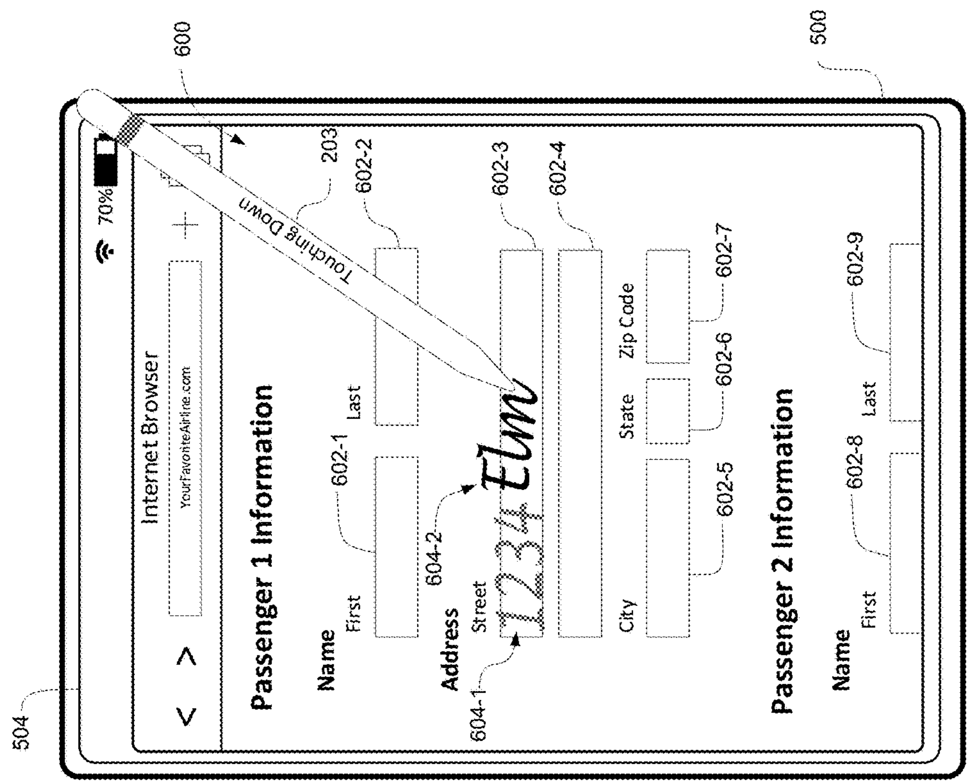
Figure 6G:
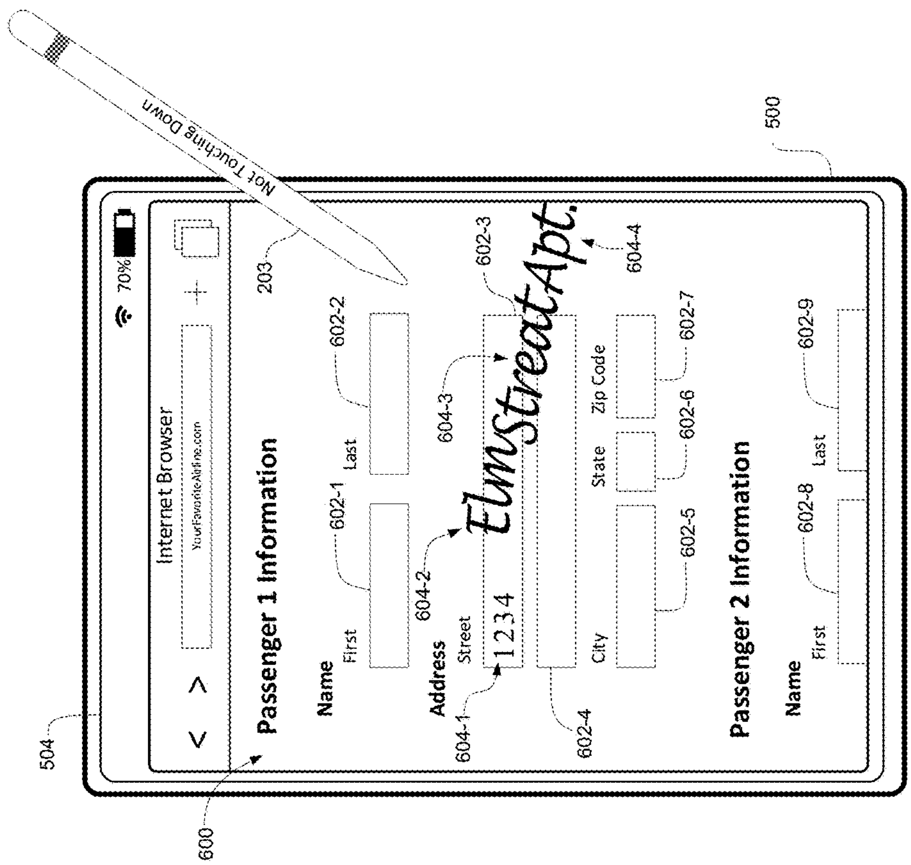
Figure 6F:
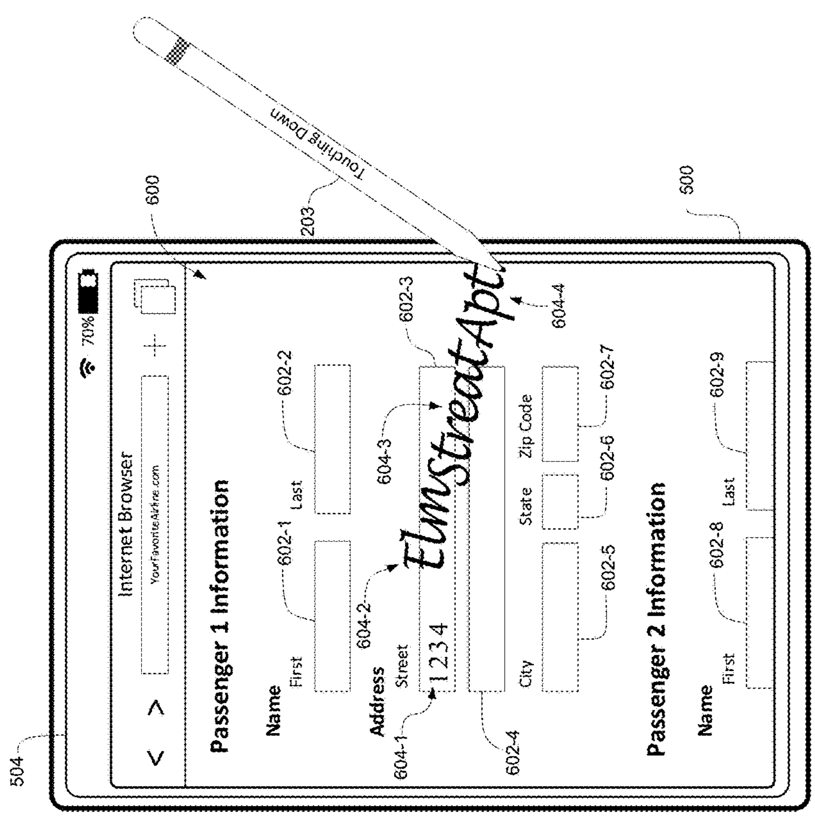
Figure 6I:
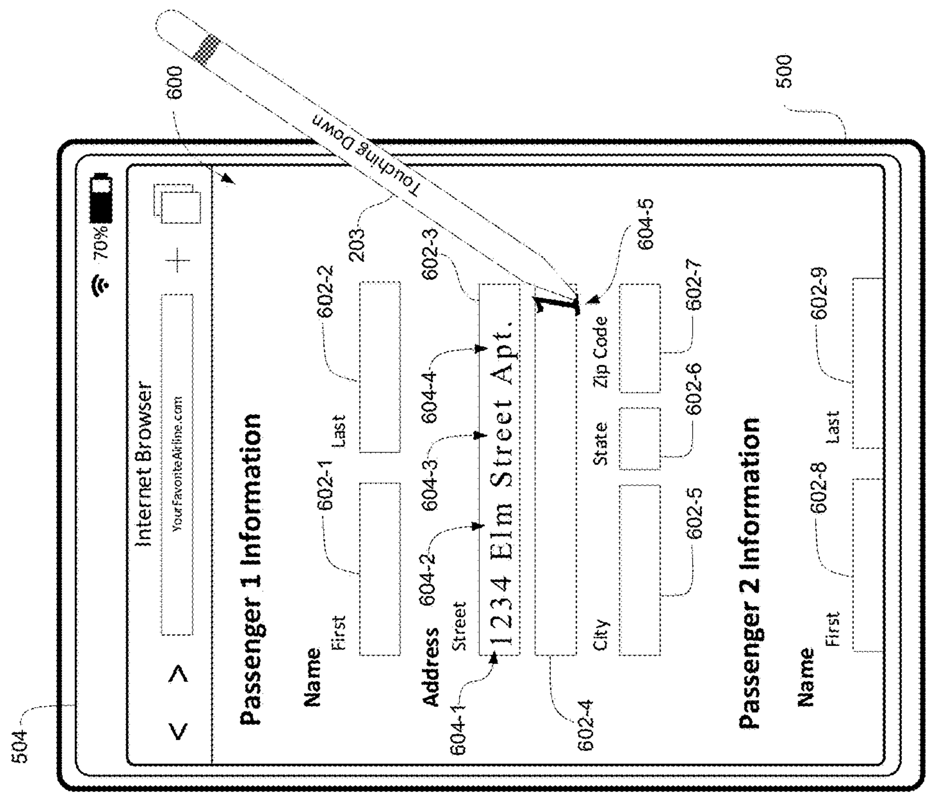
Figure 6H:
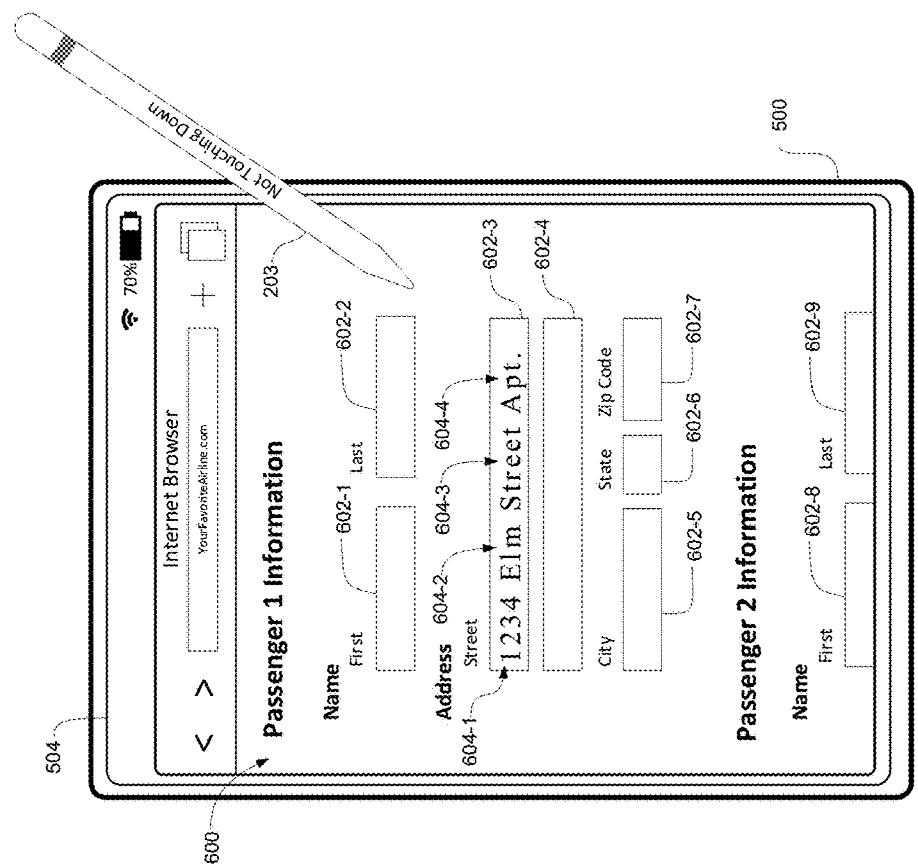
Figure 6K:
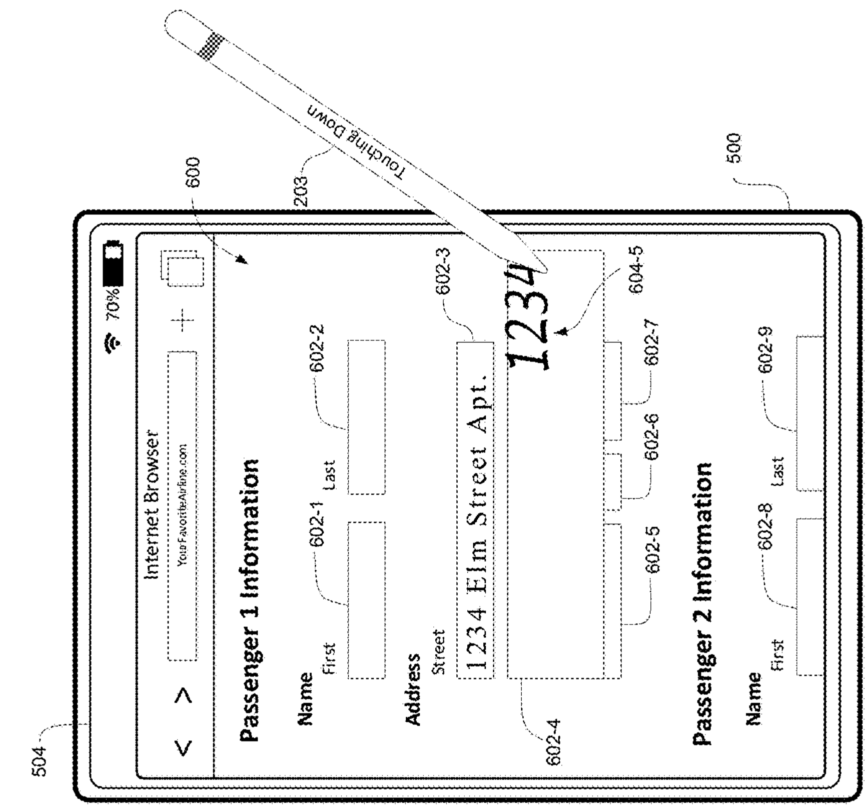
Figure 6J:
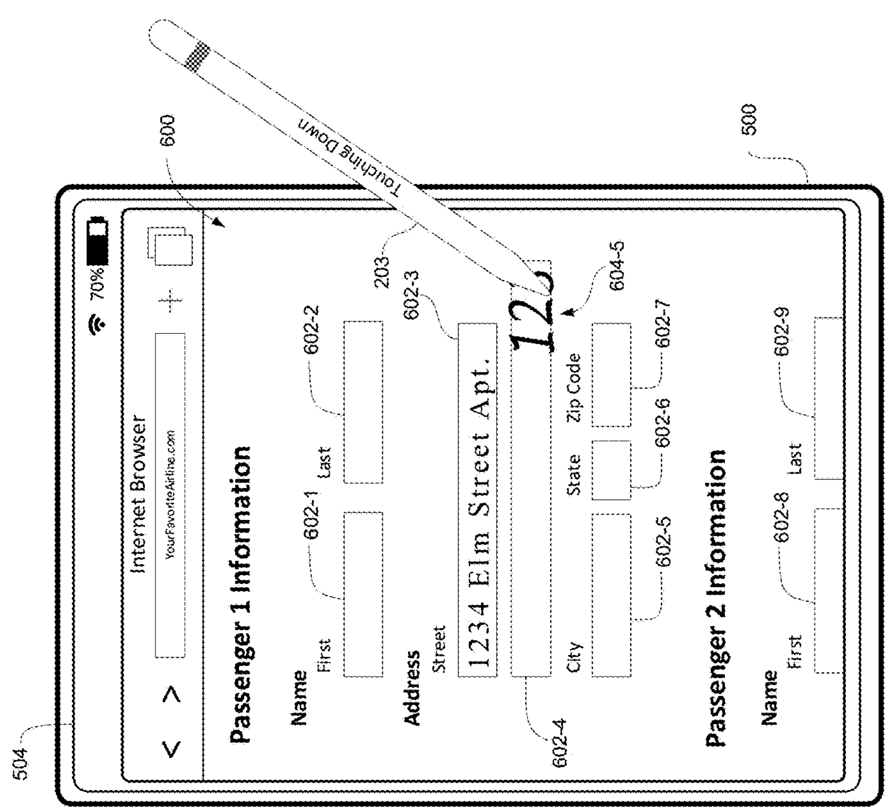
Figure 6M:
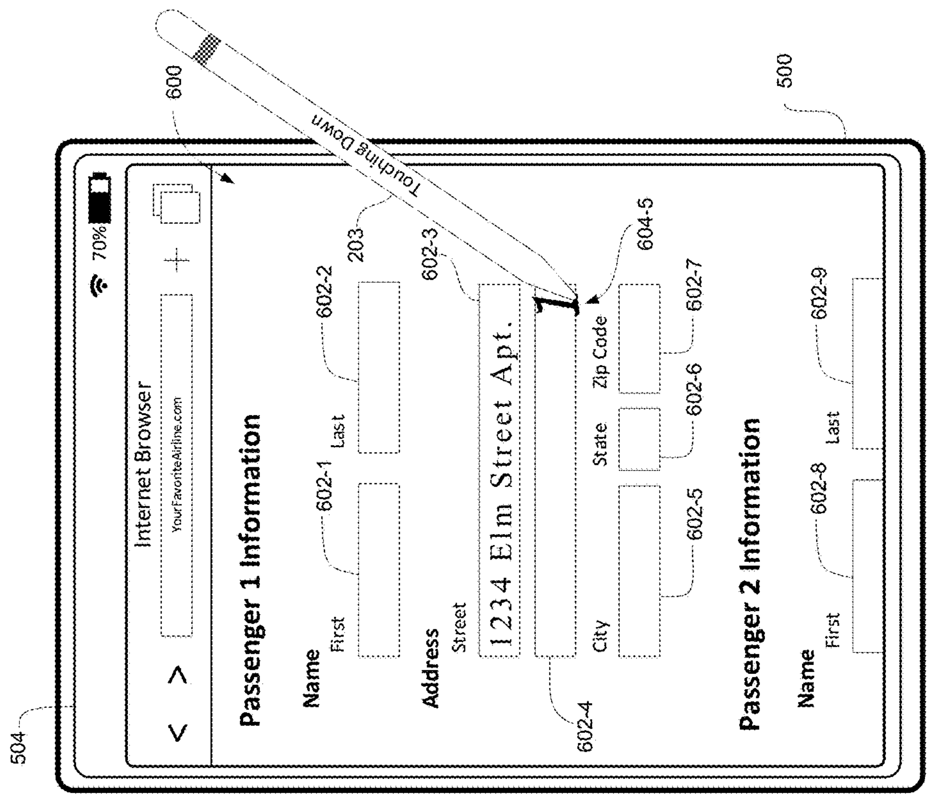
Figure 6L:
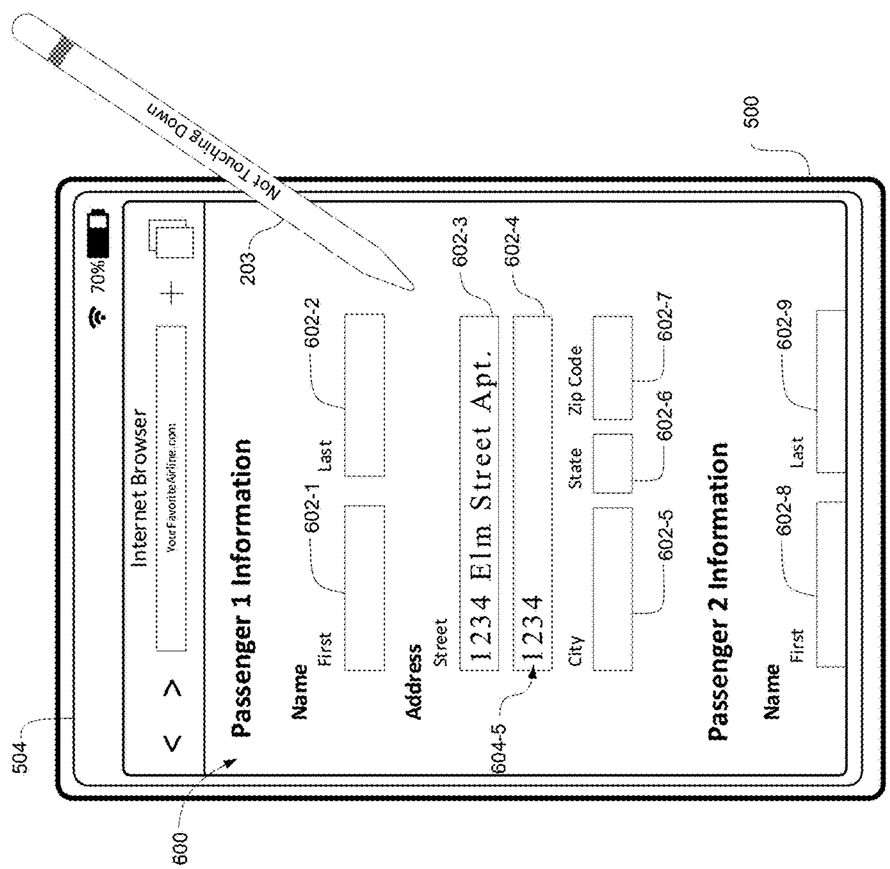
Figure 6O:
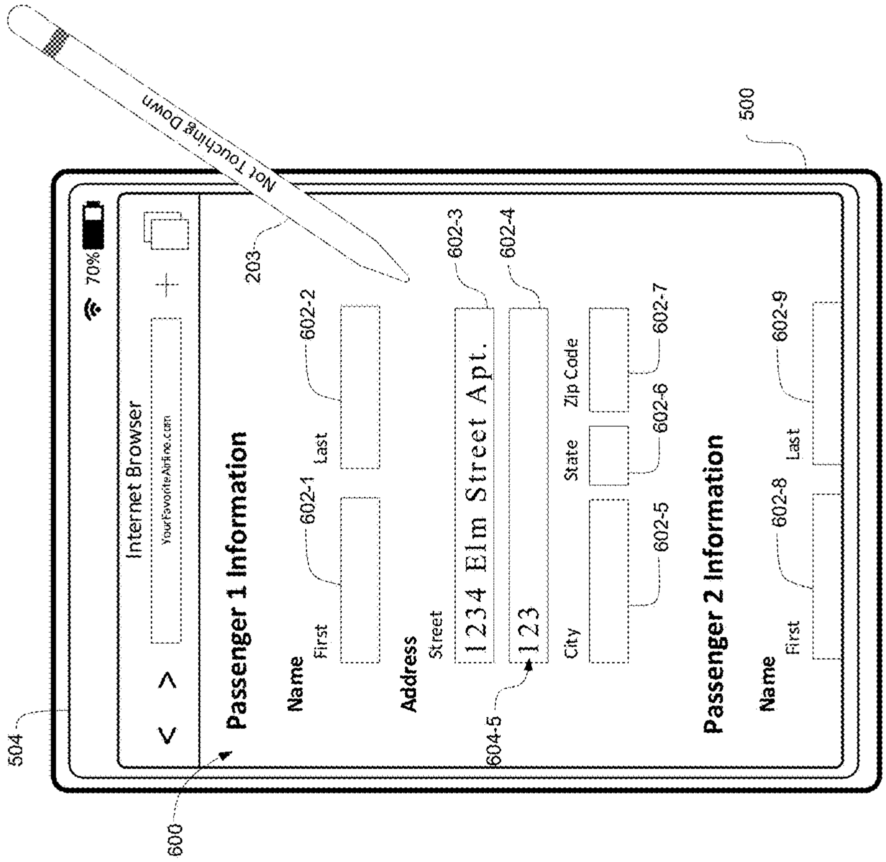
Figure 6N:
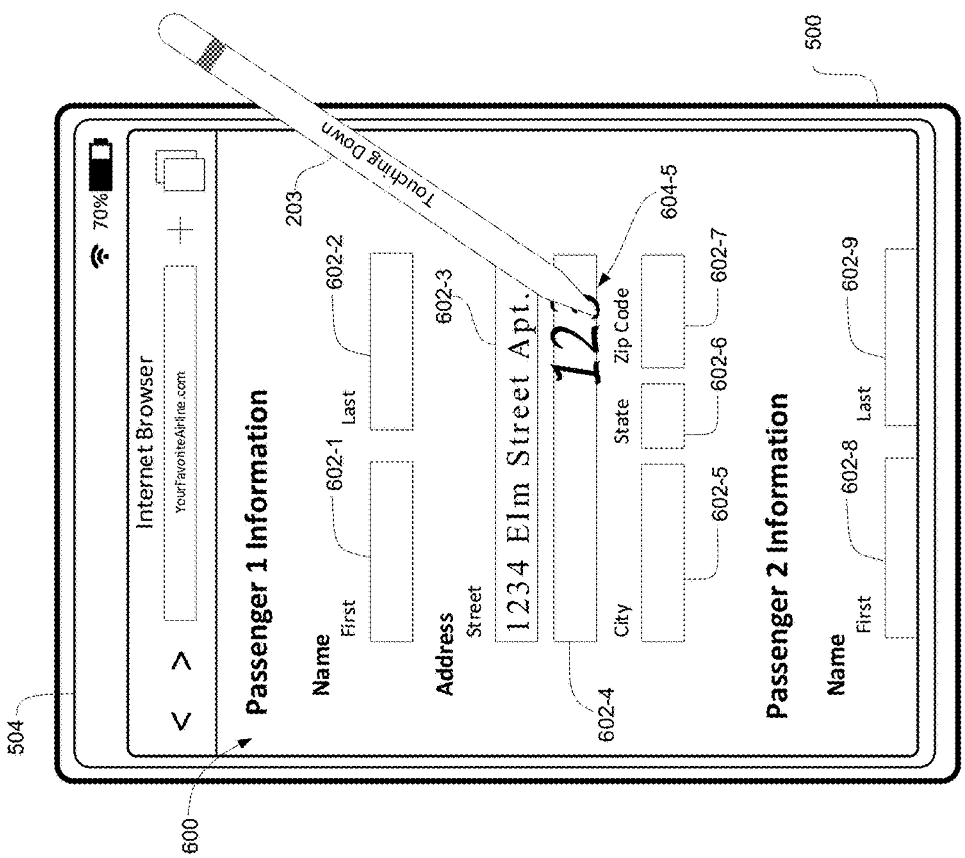
Figure 6Q:
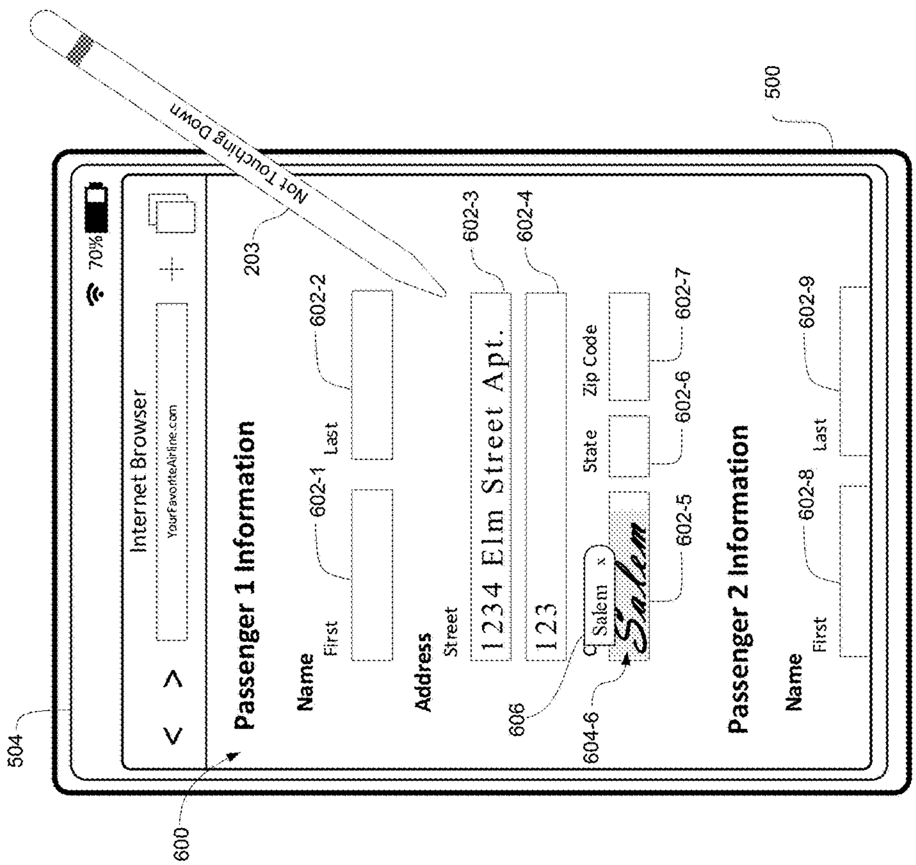
Figure 6P:
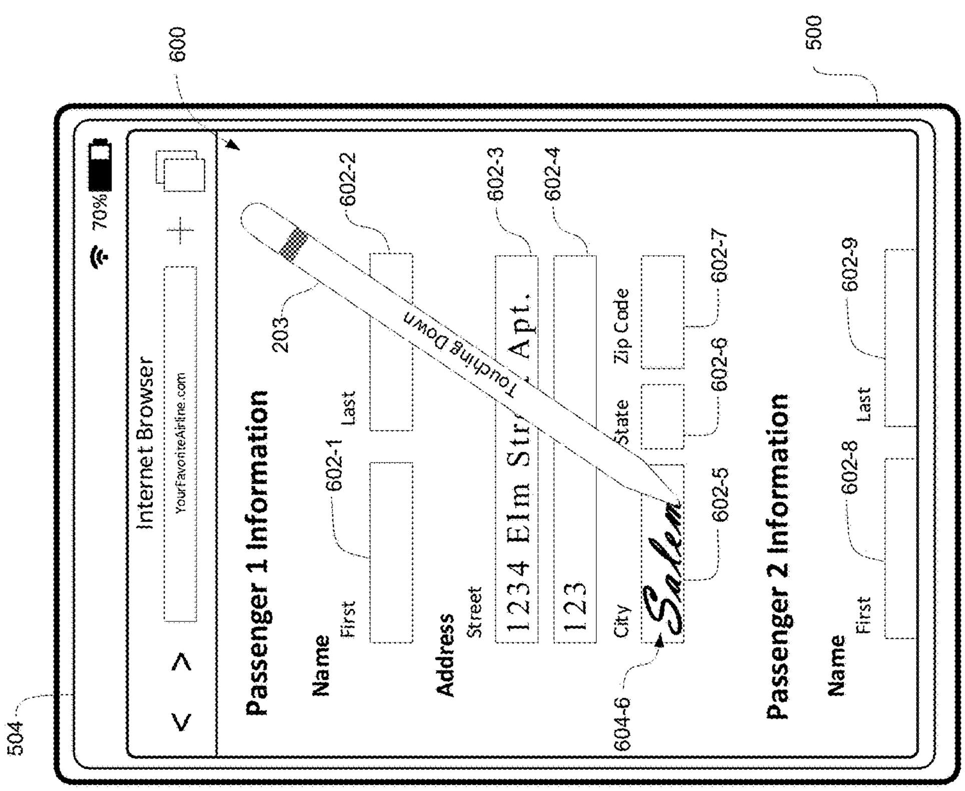
Figure 6S:
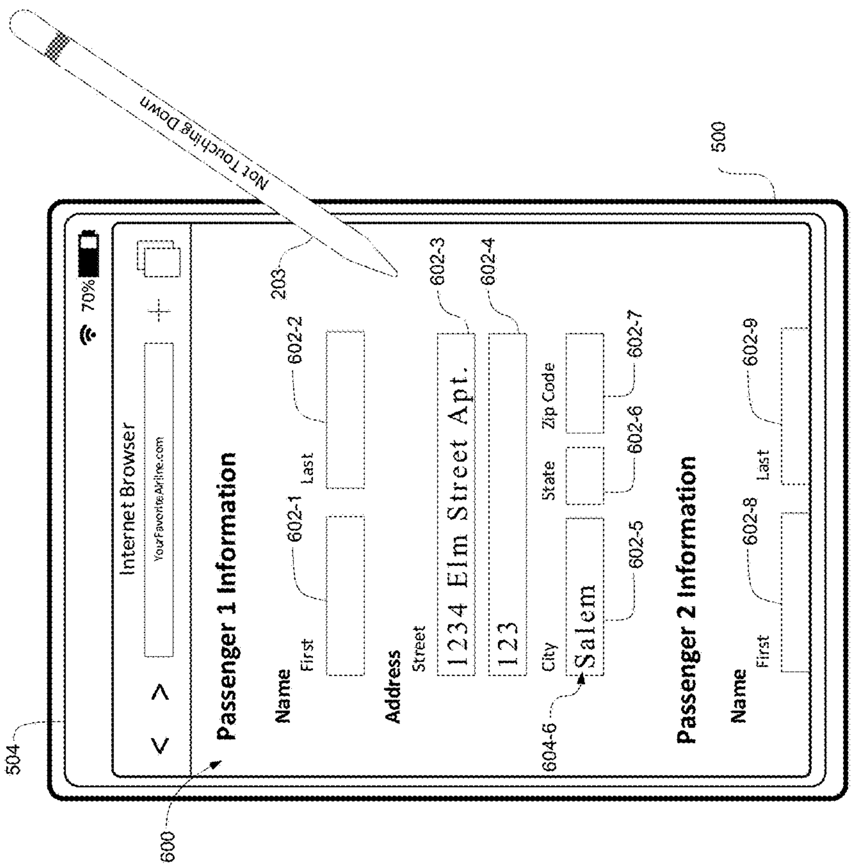
Figure 6R:
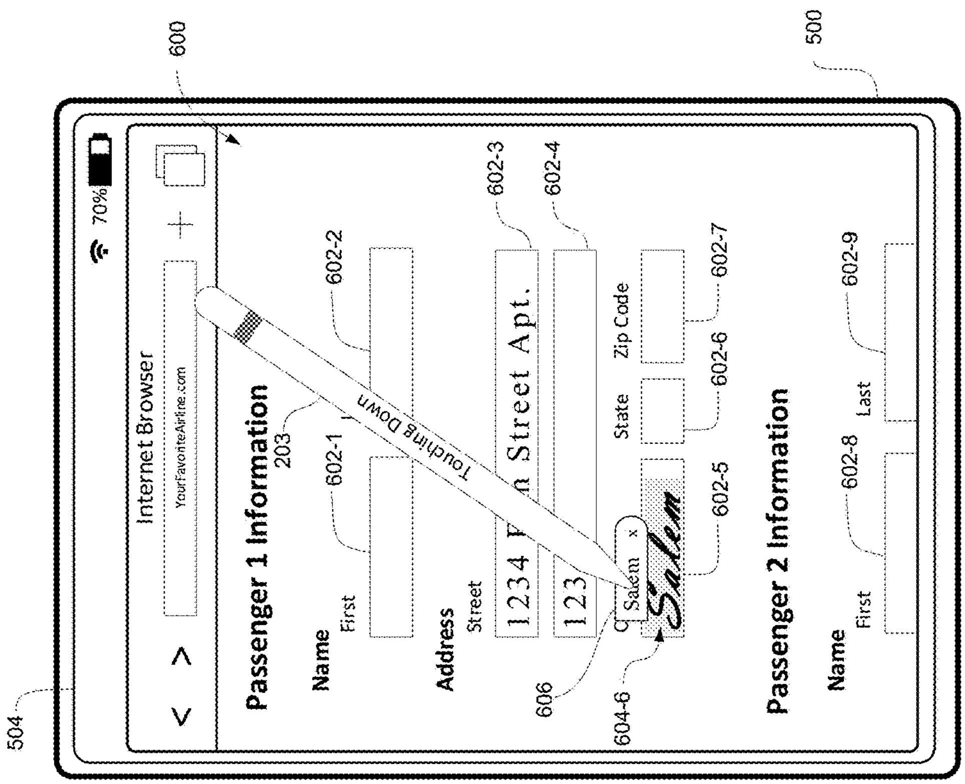
Figure 6T:
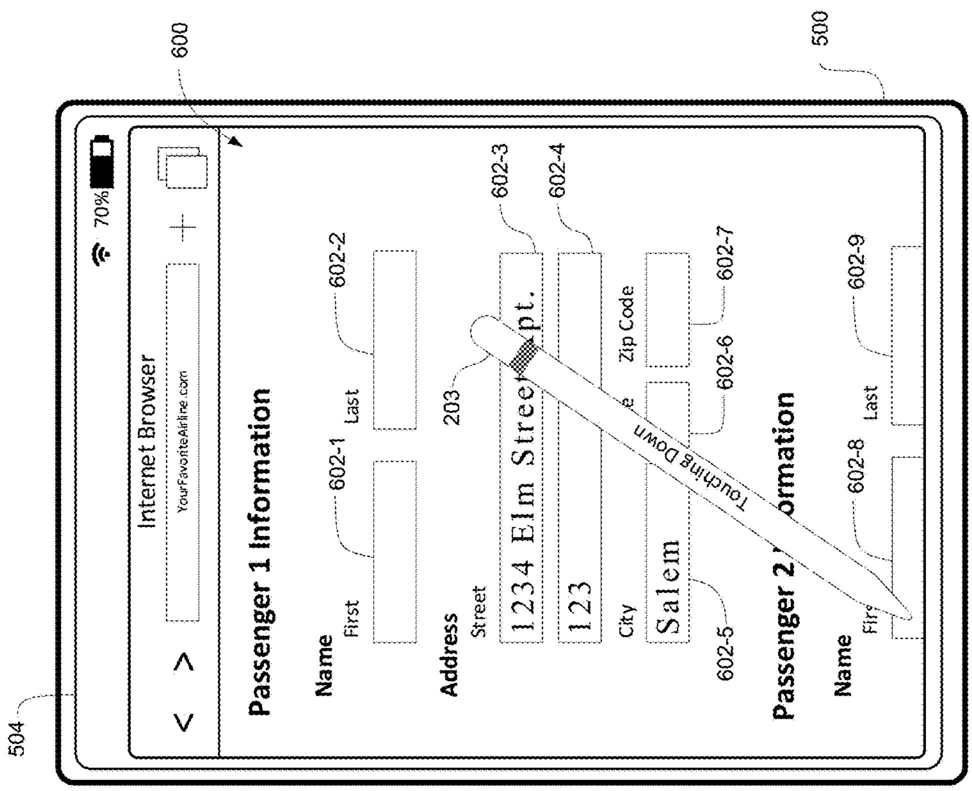
Figure 6U:
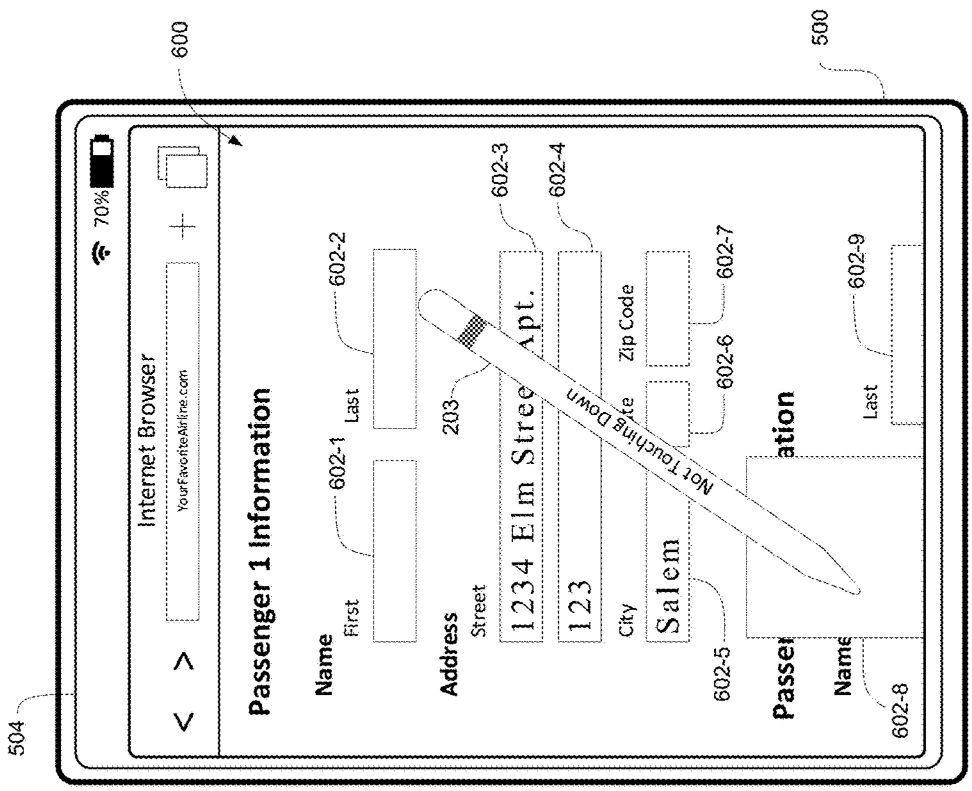
Figure 6W:
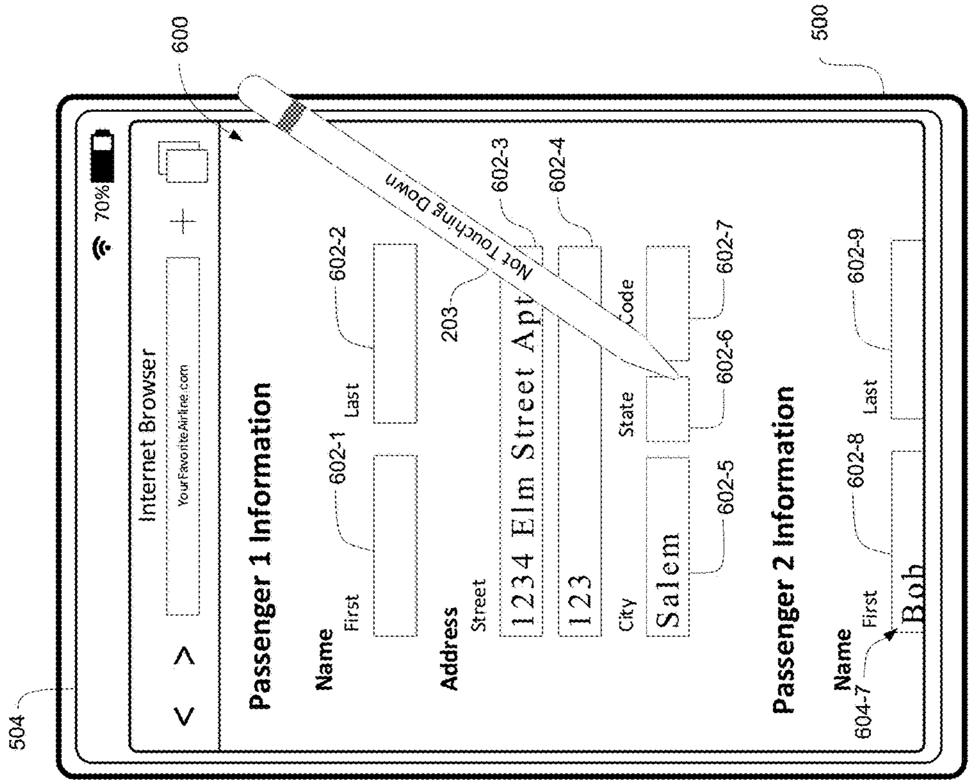
Figure 6V:
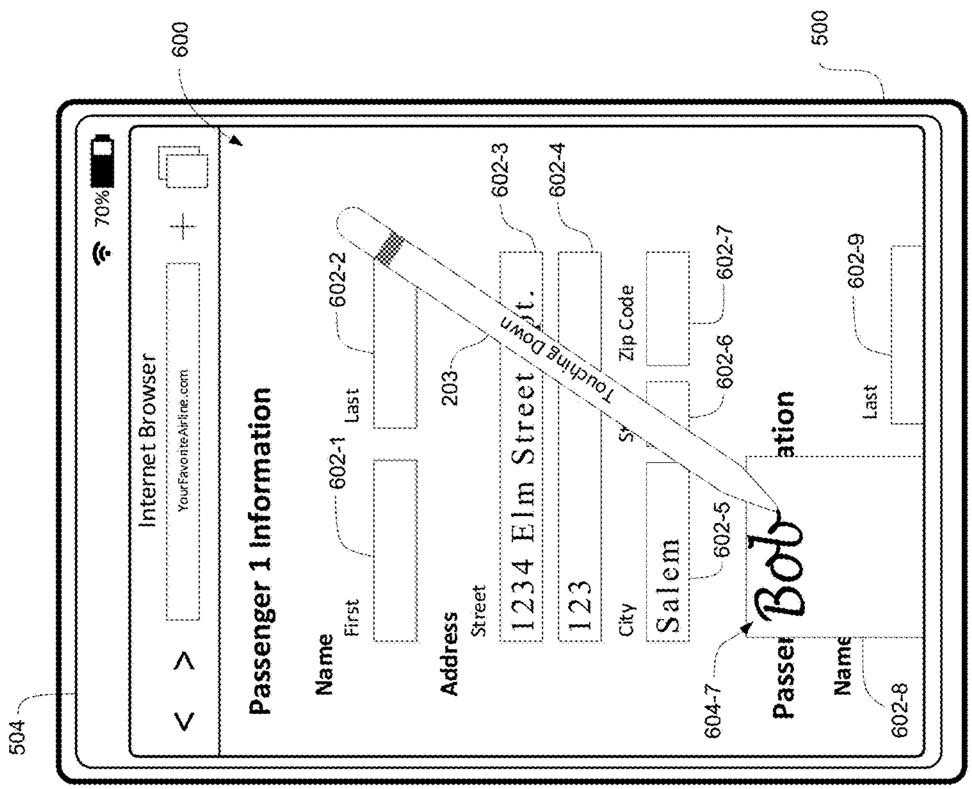
Figure 6Y:
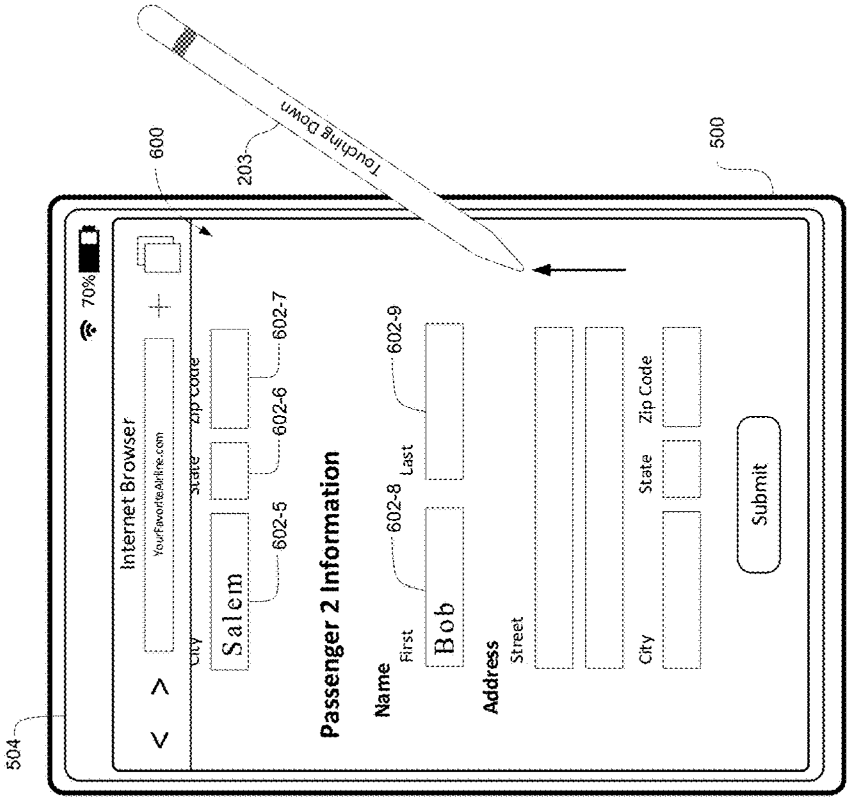

FIGS. 6A-6YY illustrate exemplary ways in which an electronic device converts handwritten inputs into font-based text. The embodiments in these figures are used to illustrate the processes described below, including the processes described with reference to FIGS. 7A-7I.

FIGS. 6A-6YY illustrate operation of the electronic device 500 converting handwritten inputs into font-based text. FIG. 6A illustrates an exemplary device 500 that includes touch screen 504. As shown in FIG. 6A, the electronic device 500 presents user interface 600. In some embodiments, user interface 600 is any user interface that includes one or more text entry fields (e.g., text entry regions). In some embodiments, a text entry field (e.g., text entry region) is a user interface element in which a user is able to enter text (e.g., letters, characters, words, etc.). For example, a text entry field can be a text field on a form, the URL entry element on a browser, login fields, etc. In other words, any user interface element in which a user is able to enter text and is able to edit, delete, copy, cut, etc. or perform any other text-based operations. It is understood that a text entry field (e.g., text entry region) is not limited to a user interface element that only accepts text, but one that is also able to accept and display audio and/or visual media.

In some embodiments, as shown in FIG. 6A, user interface 600 is of an internet browser application that is displaying (e.g., navigated to) a passenger information entry user interface (e.g., for purchasing airplane tickets). It is understood that the examples shown in FIG. 6A-6YY are exemplary and should not be considered limiting to only the user interfaces and/or applications illustrated. In some embodiments, user interface 600 includes text entry fields 602-1 to 602-9 in which a user is able to enter text to populate the respective text entry fields (e.g., information for two passengers).

In FIG. 6B, a user input is received (e.g., detected) on touch screen 504 from stylus 203. As shown in FIG. 6B, stylus 203 is touching down on touch screen 504. In some embodiments, stylus 203 touches down on touch screen 504 to provide handwritten input 604-1. For example, as shown in FIG. 6B, handwritten input 604-1 is of the characters "12". In some embodiments, if a handwritten input is performed entirely within a text entry field, then the handwritten input is interpreted as a request to enter text within the respective text entry field. In some embodiments, if the handwritten is performed a threshold area around the boundary of a text entry field, then the handwritten input is still interpreted as a request to enter text within the respective text entry field. In some embodiments, text entry fields have a margin of error or tolerance such that handwritten input that is slightly outside of the literal boundary of the text entry field (e.g., 1 mm, 2 mm, 3 mm, 5 mm, 3 points, 6 points, 12 points, etc.) will still be considered to be a request to input text within the respective text entry field. In some embodiments, handwritten input that begins outside of the boundary of the text entry field but enters into the boundary of the text entry field is considered to be a request to input text within the respective text entry field. In some embodiments, handwritten input that has a majority of strokes within a text entry field is considered to be a request to input text within the respective text entry field. In some embodiments, handwritten inputs that begin in a text entry field but extends outside of a text entry field and optionally into another text entry field is still considered to be a request to input text within the respective text entry field (e.g., and not the other text entry field). In some embodiments, providing a margin of error or tolerance around the boundary of text entry fields allows the system to accept handwriting inputs that are not perfectly within a text entry field (e.g., larger than the text entry field, "misses" the text entry field, or unintentionally extends beyond the boundary of a text entry field).

As shown in FIG. 6B, handwritten input 604-1 is directed at text entry field 602-3. In some embodiments, handwritten input 604-1 began slightly outside of text entry field 602-3 (e.g., but within the margin of error or tolerance of text entry field 602-3) and/or optionally has a majority of strokes within the boundary of text entry field 602-3. Thus, in some embodiments, handwritten input 602-1 is interpreted to be a request to enter the characters "12" into text entry field 602-3.

In FIG. 6C, the user continues handwritten input 604-1 and writes "1234" into text entry field 602-3. In some embodiments, the user further provides handwritten input 604-2 corresponding to an "E". In some embodiments, handwritten input 604-2 began outside of the boundary of text entry field 602-3, but a majority of handwritten input 604-2 is inside the boundary of 602-3 such that handwritten input 604-2 is considered to a request to enter text into text entry field 602-3. In some embodiments, whether a handwritten input is considered to be a request to enter text into a particular text entry field is based on analysis of each letter (e.g., whether each letter is considered to be directed at a respective text entry field), each word (e.g., whether each word as a whole is considered to be directed at a respective text entry field), or the entire sequence of handwritten input (e.g., whether the entire sequence from initial touch-down to when the handwritten input pauses for a threshold amount of time (e.g., 0.5 seconds, 1 second, 2 seconds, 3 seconds, 5 seconds) or terminates is considered to be directed at a respective text entry field).

In FIG. 6D, the user continues handwritten 604-2 and writes “Elm” into text entry field 602-3. In some embodiments, after a threshold amount of time (e.g., 0.5 seconds, 1 second, 2 seconds, 3 seconds, 5 seconds) has passed since the user entered handwritten input 604-1 (e.g., “1234”). In some embodiments, after the threshold amount of time, device 600 determines that handwritten input 604-1 corresponds to the characters “1234”. In other words, device 600 analyzes handwritten input 604-1 and recognizes the user’s writing as the characters “1234.” In some embodiments, handwritten input 604-1 changes color and/or opacity to indicate that handwritten input 604-1 is recognizes by device 500 and/or that handwritten input 604-1 will be converted to font-based text (e.g., computer text, digital text). For example, handwritten input 604-1 becomes grey when or as handwritten input 604-1 is being converted into font-based text. In some embodiments, the change in color and/or opacity is part of the animation of converting handwritten input 604-1 to font-based text (e.g., the handwritten input becomes grey for a short time, such as 0.2 seconds, 0.3 seconds, 0.5 seconds, 1 second, during the animation of converting handwritten input into font-based text). In some embodiments, as the handwritten input is received, an animation is displayed of the handwritten input changing colors and/or opacity (e.g., such as an ink drying effect) similar to the ink-drying animation described below with respect to method 2000 (e.g., and/or described with respect to FIGS. 19B-19I). In some embodiments, the animation of the ink-drying effect is performed while handwritten input is received (e.g., optionally before the device begins the process for converting the handwritten input into font-based text). In some embodiments, the animation of the ink-drying effect is performed as the handwritten input is converted into font-based text (e.g., as a part of the animation of the handwritten input converting into font-based text).

In FIG. 6E, the user inputs handwritten input 604-3 corresponding to the word “Streat”. In some embodiments, handwritten input 604-3 began inside the boundary of text entry field 602-3 and terminates outside of the boundary of text entry field 602-3 and enters into the boundary of text entry field 602-4. In some embodiments, even though handwritten input 604-3 exits the boundary of text entry field 602-3 and enters into the boundary of text entry field 602-4, handwritten input 604-3 is considered to be a request to enter text into text entry field 602-3 (e.g., directed to text entry field 602-3).

In some embodiments, handwritten input 604-1 is converted to font-based text. In some embodiments, font-based text is text that is entered when using a traditional text entry system such as a physical keyboard or soft keyboard. In some embodiments, the text is formatted using a particular font style. For example, the font-based text is Times New Roman with 12 point size or Axial with 10 point size, etc. In some embodiments, handwritten input 604-3 is converted after a threshold amount of delay (e.g., 0.5 seconds, 1 second, 2 seconds, 3 seconds, 5 seconds). In some embodiments, handwritten input 604-3 is converted after the visual characteristics of handwritten input 604-3 is modified to indicate that handwritten input 604-3 will be converted (e.g., as described in FIG. 6D). In some embodiments, the visual characteristics of handwritten input 604-3 are not changed before converting.

In some embodiments, the size of the handwritten input after it has been converted is the default font size for the text entry field. In some embodiments, the size of the handwritten input changes before handwritten input is converted into font-based text. In some embodiments, the size of the font-based text matches the size of the handwritten input and then the size of the font-based text is changed to match the default size for the text entry field (e.g., the size is changed after an animation changing the handwriting input to the font-based text). In some embodiments, the size changes during the animation from handwriting input to font-based text. In some embodiments, the animation of converting handwriting input to font-based text comprises morphing the handwriting input to font-based text. In some embodiments, the handwriting input is disassembled (e.g., into pieces or particles) and re-assembled as the font-based text (e.g., such as described below with respect to method 2000). In some embodiments, the handwriting input dissolves or fades out and the font-based text dissolves-in or fades in. In some embodiments, the handwriting input moves toward the final location of the font-based text (e.g., aligns itself with the text entry region or any pre-existing text) while dissolving and the font-based text concurrently appears while moving toward the final location. Thus, in some embodiments, the handwriting input and the font-based text can be simultaneously displayed on the display during at least part of the animation (e.g., to reduce the animation time).

In FIG. 6F, the user inputs handwritten input 604-4 corresponding to the letters “Apt.”. In some embodiments, handwritten input 604-4 is completely outside of any text entry field (e.g., both text entry field 604-3 and 602-4). In some embodiments, handwritten input 604-4 is performed in quick succession after handwritten input 604-3 such that it is considered to be in the same sequence of handwritten inputs as handwritten input 604-3 (e.g., 0.25 seconds, 0.5 seconds, 1 second, 2 seconds, 5 seconds after the writing of handwriting input 604-3). In some embodiments, because handwritten input 604-4 is considered to be within the same sequence of inputs as handwritten input 604-3, handwritten input 604-4 is also considered to be a request to enter text into text entry field 602-3 (e.g., directed to text entry field 602-3).

FIG. 6G illustrates the user lifting off stylus 203 from contacting touch screen 504 after completing writing handwritten input 602-4 to 604-4. In some embodiments, in response to liftoff of stylus 203 from touch screen 504 for a threshold amount of time (e.g., 0.5 seconds, 1 second, 2 seconds, 3 seconds, 5 seconds), device 500 analyzes, interprets, and converts the handwritten inputs into font-based text, as shown in FIG. 6H. As shown in FIG. 6H, each of the converted handwritten inputs 604-2 to 604-4 are entered into text entry field 602-3 and is visually aligned with text entry field 602-3 and optionally with converted handwritten input 604-1.

In FIG. 6I, after lifting off stylus 203 from touch screen 504 for a threshold amount of time (e.g., 0.5 seconds, 1 second, 2 seconds, 3 seconds, 5 seconds), the user continues to input handwritten input 604-5. However, because the user has paused handwritten input, any further handwritten inputs are no longer considered to be within the same sequence of handwritten inputs as handwritten input 604-3 and handwritten input 604-4. Thus, in the example illustrated in FIG. 6I, further handwritten inputs, such as handwritten input 604-5, are analyzed in isolation to determine what text entry field the handwritten input is directed to (e.g., in this case, text entry field 602-4).

In FIG. 6J, in some embodiments, when a user enters handwritten input 604-5 near or at the end of text entry field 602-4 (e.g., within 1 mm, 2 mm, 3 mm, etc.), text entry field 602-4 will expand horizontally to accommodate further handwritten inputs. For example, after the user writes the "1" character, text entry field 602-4 optionally expands to provide room for the user to write the "2" character, etc. Alternatively, in some embodiments, after the user writes the "1" character, text entry field 602-4 does not expand; but after the user writes the "2" character outside of text entry field 602-4, then text entry field 602-4 will expand to encompass the "2" character.

In FIG. 6K, the user continues entry of handwritten input 604-5 to write "1234". In some embodiments, because handwritten input 604-5 has reached the end of touch screen 504 such that text entry field 602-4 cannot further expand horizontally, then text entry field 602-4 expands vertically to provide the user with an extra line to continue entering handwritten inputs, as shown in FIG. 6K.

In some embodiments, after the user lifts off stylus 203 from touch screen 504 for a threshold amount of time (e.g., 0.5 seconds, 1 second, 2 seconds, 3 seconds, 5 seconds), then device 500 analyzes, interprets, and converts the handwritten inputs into font-based text (e.g., handwritten input 604-5). In some embodiments, as described above, handwritten input 604-5 is entered into text entry field 602-4 instead of text entry field 602-3 because the user paused handwritten input for a threshold amount of time (e.g., 0.5 seconds, 1 second, 2 seconds, 3 seconds, 5 seconds) such that handwritten input 604-5 is not considered a continuation of handwritten input 604-3 or handwritten input 604-5 (e.g., which would optionally merit the handwritten input to be entered into text entry field 602-3). In some embodiments, concurrently with or after handwritten input 604-5 is converted into font-based text, text entry field 602-4 returns to its original size.

FIG. 6M-6O illustrate an alternative method in which device 500 provides extra space for continued handwritten input when the handwritten input approaches or reaches the end of a text entry field. In FIG. 6M, the user provides handwritten input 604-5 at or near the end of text entry field 602-4. In some embodiments, as shown in FIG. 6N, handwritten input 604-5 is shifted leftwards away from the end of text entry field 602-4 to provide the user with room to continue inputting handwritten inputs. In some embodiments, handwritten input 604-5 is shifted leftwards after the user completes writing a letter (e.g., after a short lift-off of 0.2 seconds, 0.4 seconds, 0.6 seconds, 1 second, 2 seconds, etc.). In some embodiments, shifting the handwritten input leftwards is performed concurrently with expanding the text entry field. In some embodiments, after the user lifts off stylus 203 from touch screen 504 for a threshold amount of time (e.g., 0.5 seconds, 1 second, 2 seconds, 3 seconds, 5 seconds), then device 500 converts handwritten input 604-5 into font-based text, as shown in FIG. 6O.

In FIG. 6P, handwritten input 604-6 is detected (e.g., received) on touch screen 504 at text entry field 602-5. In some embodiments, handwritten input 604-6 is difficult to recognize. For example, the confidence of device 500 in the written letters in handwritten input 604-6 is below a threshold confidence (e.g., 25% confidence, 50% confidence, 75% confidence, etc.). In some embodiments, if the confidence of the letters written by the user is below a threshold confidence level, then a pop-up is displayed to the user with the proposed font-based text, as shown in FIG. 6Q.

In some embodiments, pop-up 606 is displayed above handwritten input 604-6 or otherwise within the vicinity of handwritten input 604-6 (e.g., within 5 mm, 1 cm, 1.5 cm, 3 cm, etc.). In some embodiments, the word or letters associated with pop-up 606 are highlighted. In some embodiments, pop-up 606 includes the highest confidence interpretation of handwritten input 604-6 (e.g., "Salem"). In some embodiments, pop-up 606 includes more than one potential interpretation of handwritten input 604-6 (e.g., corresponding to one or more selectable options). In some embodiment, pop-up 606 is selectable to cause the conversion of handwritten input 604-6 into the selected interpretation (e.g., as opposed to converting after a threshold time delay or other time-based heuristic). In some embodiments, pop-up 606 is displayed after the user has lifted off stylus 203 from touch screen 504 and device 600 has had a chance to analyze and interpret the entire handwritten sequence (e.g., the entire word, the entire sentence, the sequence of letters, etc.). In some embodiments, pop-up 606 is displayed at any time while the user is performing handwritten input and is updated as the user writes additional letters that is recognized by device 500. For example, pop-up 606 optionally initially appears after the user has written "Sa" and displays "Sa". In such examples, after the user writes "1", then pop-up 606 is updated to display "Sal". In some embodiments, after the user writes "em", then pop-up 606 is updated to display "Salem" (e.g., in some embodiments, the pop-up is updated with new letters after each letter or after several letters). In some embodiments, pop-up 606 is displayed regardless of the confidence level of the interpretation of the handwritten input (e.g., pop-up 606 is optionally always displayed and provides the user a method in which to "accept" the suggested font-based text and cause conversion of handwritten input into the suggested font-based text without regard to timers that are being used to determine when to convert handwritten text into font-based text). In some embodiments, pop-up 606 includes a selectable option to reject the suggestion or otherwise dismiss pop-up 606. In some embodiments, dismissing the pop-up or rejecting the suggestion does not cause handwritten input 604-6 to never be converted. In some embodiments, dismissing the pop-up or rejecting the suggestion causes handwritten input 604-6 to not be converted at that point in time, but handwritten input 604-6 is still optionally converted at a later point in time based on other heuristics, such as the timer-based conversion heuristics.

As shown in FIG. 6R, device 500 detects a tap on touch screen 504 from stylus 203 selecting pop-up 606. In some embodiments, in response to the user input selecting pop-up 606 (e.g., selecting the selectable option corresponding to the suggested font-based text "Salem"), device 500 replaces handwritten input 604-6 with font-based text, as shown in FIG. 6S. In some embodiments, as discussed above, replacing (e.g., converting) handwritten input into font-based text optionally includes changing the size and/or shape of the handwritten input, optionally includes performing an animation converting the handwritten input into font-based text, and optionally includes aligning the font-based text with the text entry field (e.g., text entry field 602-5) or optionally aligning the font-based text with any pre-existing text in the text entry field (optionally in a manner similar to the process described below with respect to method 2000).

In some embodiments, based on the confidence level of device 500 in the written letters in handwritten input 604-6, the converted font-based text is placed in displayed in different locations in the text entry field. For example, if the confidence level of device 500 is below a threshold level (e.g., 25% confidence, 50% confidence, 75% confidence, etc.), then the converted font-based text is not aligned with any pre-existing text or the text entry field. Instead, in some embodiments, the converted font-based text is left in the same position as the original handwritten input indicating to the user that device 500 is not confident in the conversion. In some embodiments, if the confidence level is above the threshold level, then the converted font-based text is aligned with any pre-existing text in the text entry field or left-aligned with the text entry field (e.g., if there is no pre-existing text).

FIG. 6T-6W illustrate an embodiment in which a text entry field extends its boundaries to provide for a more comfortable or natural writing position based on the location of the text entry field on the display. In FIG. 6T, a user input is detected from stylus 203 touching down on touch screen 504 at text entry field 602-8 (e.g., a tap input, a long press input (e.g., tap-and-hold), etc.). In some embodiments, text entry field 602-8 is located at or near the bottom of touch screen 504 (e.g., bottom third, bottom half, bottom quarter, etc.). In some embodiments, handwriting into the bottom of touch screen 504 with stylus 203 is awkward because the user has little to no surface upon which to rest the user's palm when handwriting. Thus, in some embodiments, device 500 determines that, based on the location of the text entry field with which the user is interacting, the text entry field should be extended upwards so that the user is able to provide handwritten inputs in a less uncomfortable location. Thus, as shown in FIG. 6U, in response to receiving the input tapping on or selecting text entry field 602-8, the boundaries of text entry field 602-8 are extended vertically upwards. In some embodiments, text entry field 602-8 is extended to the halfway point of the screen, the two-thirds point of the screen, etc. In some embodiments, text entry field 602-8 extends horizontally as well as vertically.

In FIG. 6V, user input is received from stylus 203 providing handwritten input 604-7 writing the words "Bob" into extended text entry field 602-8. In some embodiments, the determination of whether the handwritten input is directed to or corresponds to a request to enter text into extended text entry field 602-8 are the same as the determinations for entering text into non-extended text entry fields. In some embodiments, after completing writing handwritten input 604-7 (e.g., lift-off of stylus 203 and/or detection of no further handwritten inputs for a threshold amount of time (e.g., 0.5 seconds, 1 second, 2 seconds, 3 seconds, 5 seconds)), handwritten input 604-7 is converted into font-based text and text entry field 602-8 returns to its original size and shape (e.g., concurrently with the conversion, after the conversion, or before the conversion), as shown in FIG. 6W.

Figure 6X:
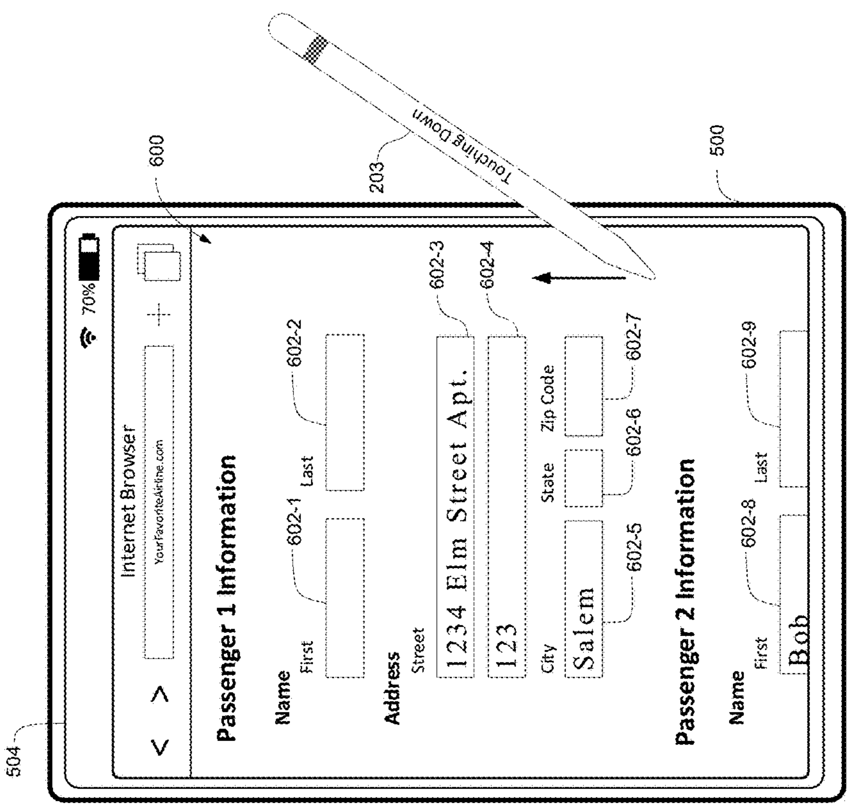

In FIG. 6X, a user input from stylus 203 is detected on touch screen 504 outside of the boundaries of any text entry field. In some embodiments, if the user input does not satisfy any of the criteria for determining that the user input is directed at or a request to enter text into a text entry field, then the user input is not considered to be handwritten text entry. In some embodiments, if the user input is not handwritten text entry, then gestures performed by the user input are not displayed on the screen. In some embodiments, when the user is performing handwritten text entry, the user's handwriting of the letters and words appear on screen at the location and at the time that the input is received. By contrast, in some embodiments, when the user is not performing handwritten text entry, the user's gestures do not appear on the screen. Similarly, in some embodiments, the user input is interpreted as a non-text-entry command or non-text-entry gesture based on the element that the user is interacting with and the characteristics of the input. For example, in FIG. 6X, device 500 detects that the user has begun an upward scrolling input (e.g., touch-down on touch screen 504 by stylus 203 and while continuously touching touch screen 504, moving upwards). In some embodiments, in response to the upward scrolling input from stylus 203, user interface 600 is scrolled upwards in accordance with the movement of the scrolling input, as shown in FIG. 6Y. As shown in FIG. 6X-6Y, the user's upward gesture while touching down on touch screen 504 is not displayed on touch screen 504 (e.g., as opposed to when the user is performing text input using stylus 203).

Figure 6Z:
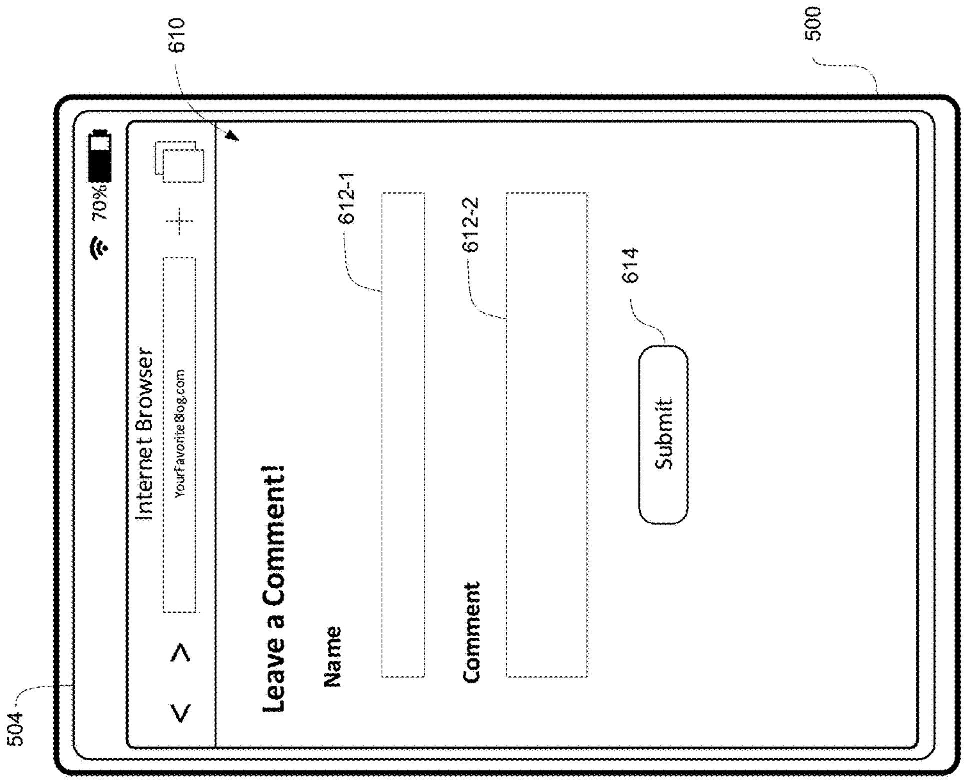
Figure 6A:
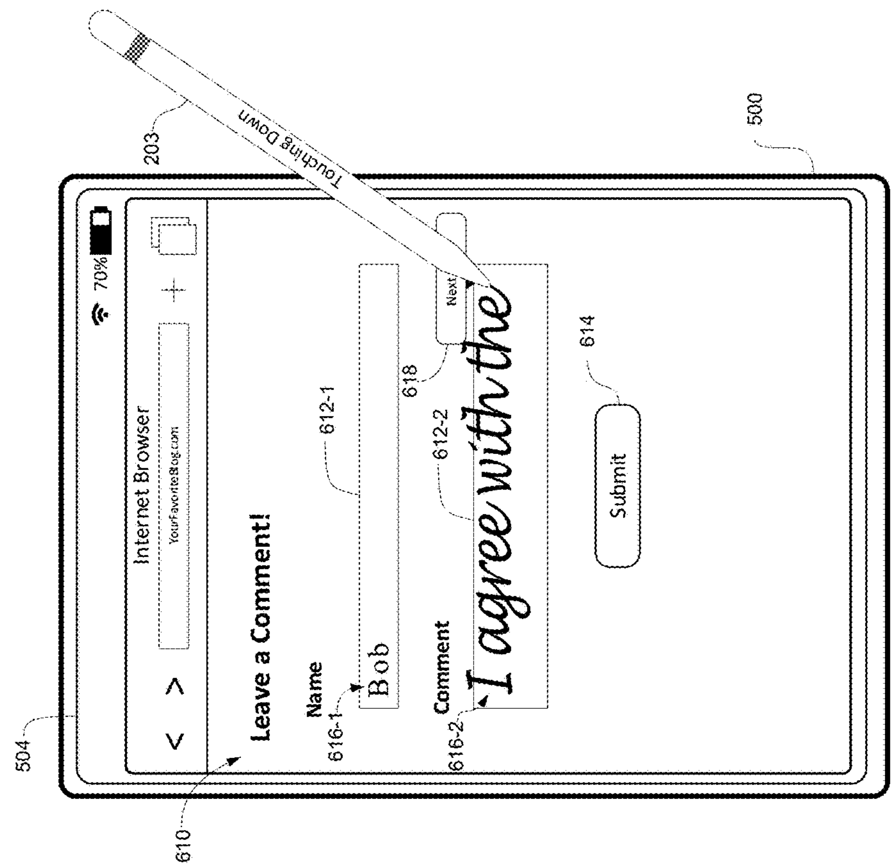
Figure 6C:
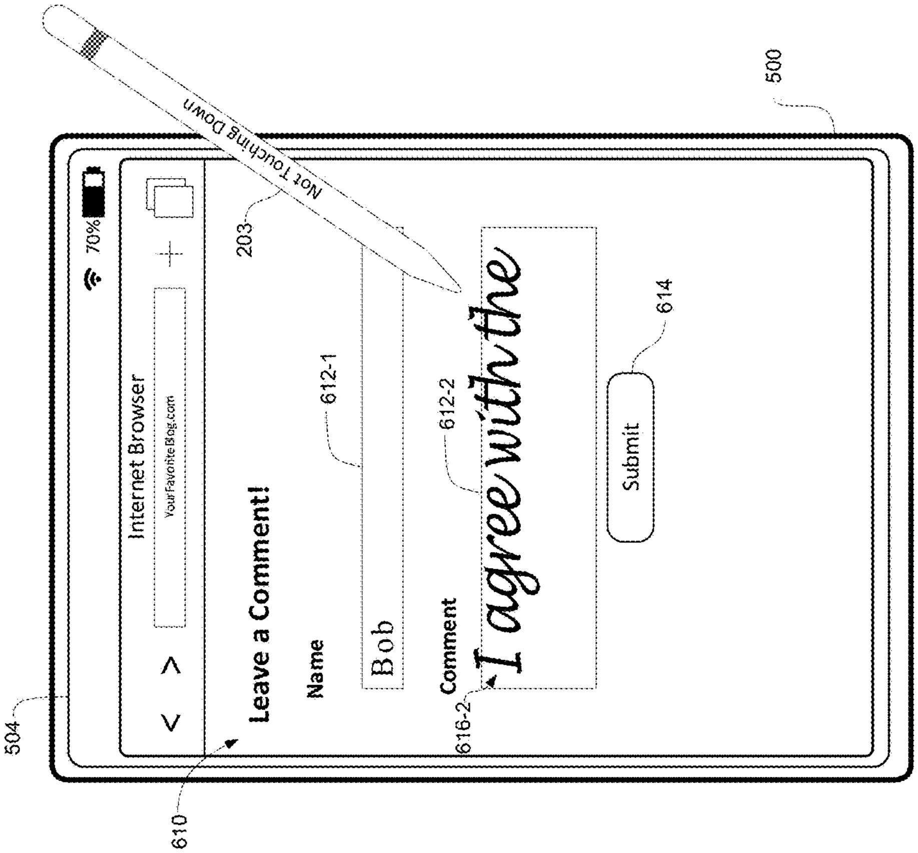
Figure 6B:
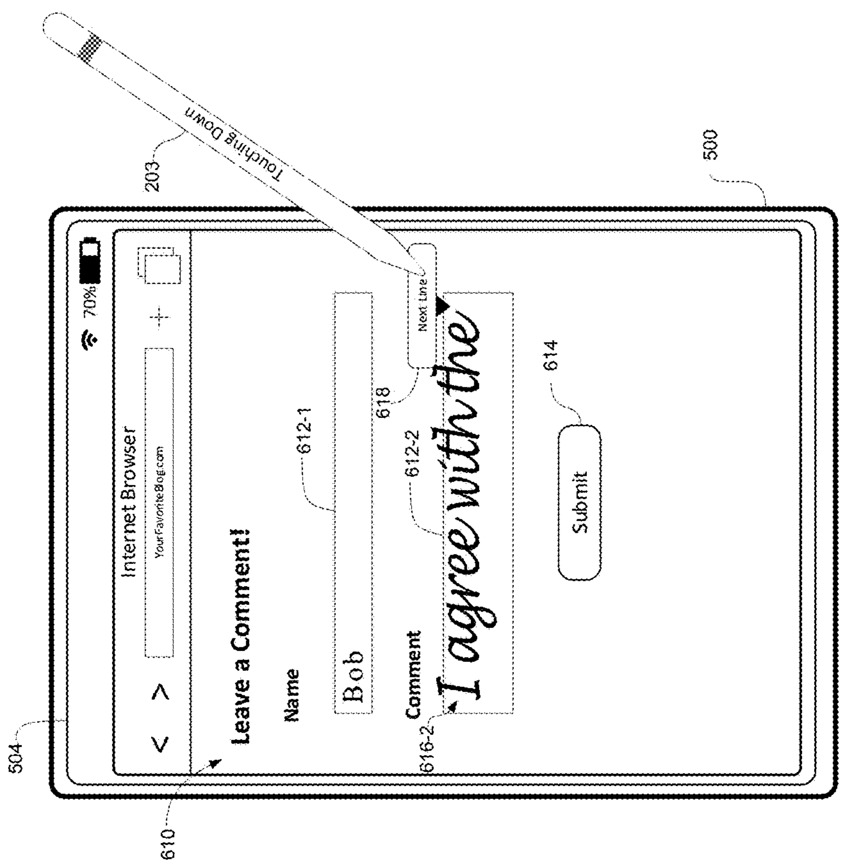
Figure 6E:
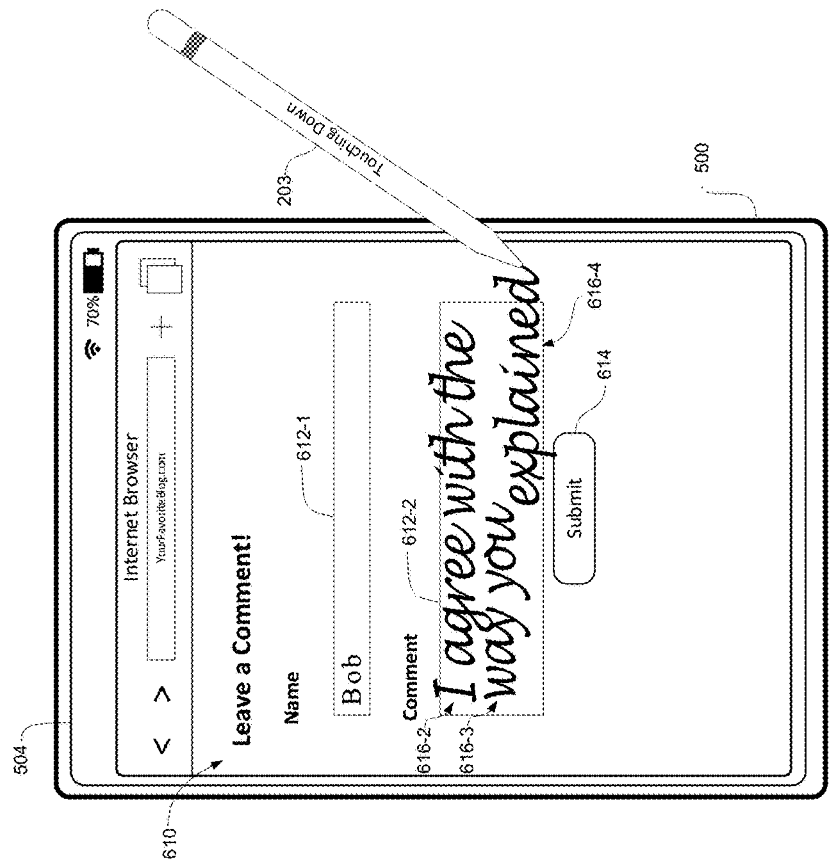
Figure 6D:
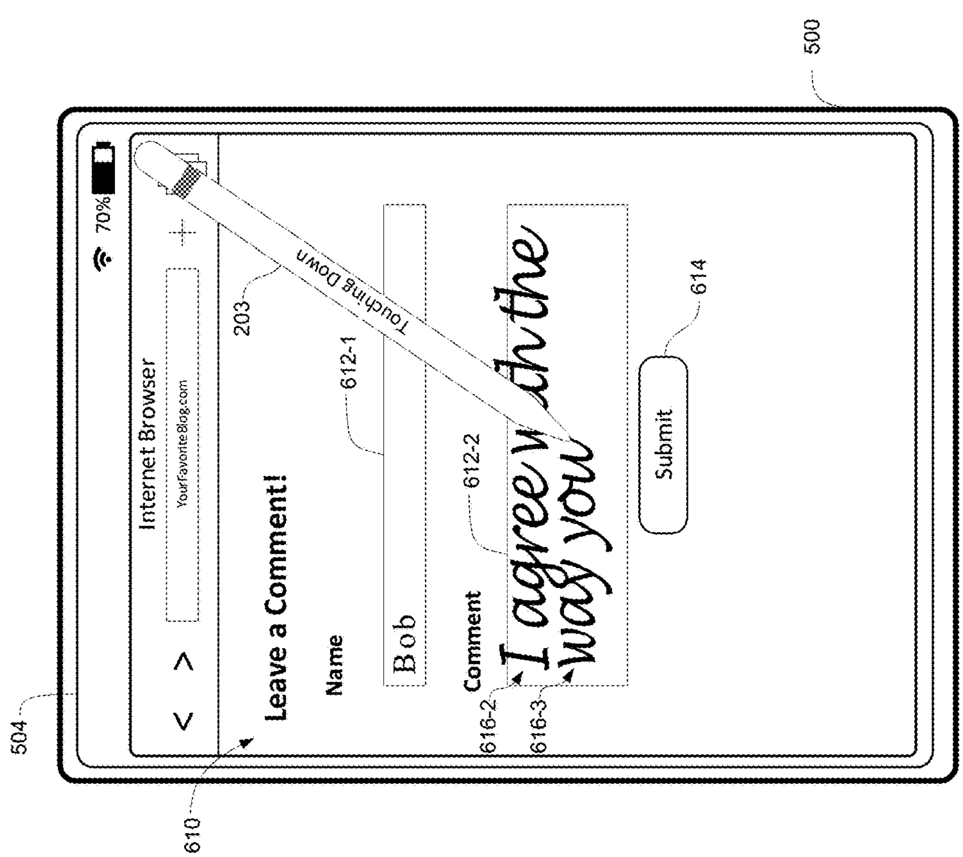
Figure 6G:
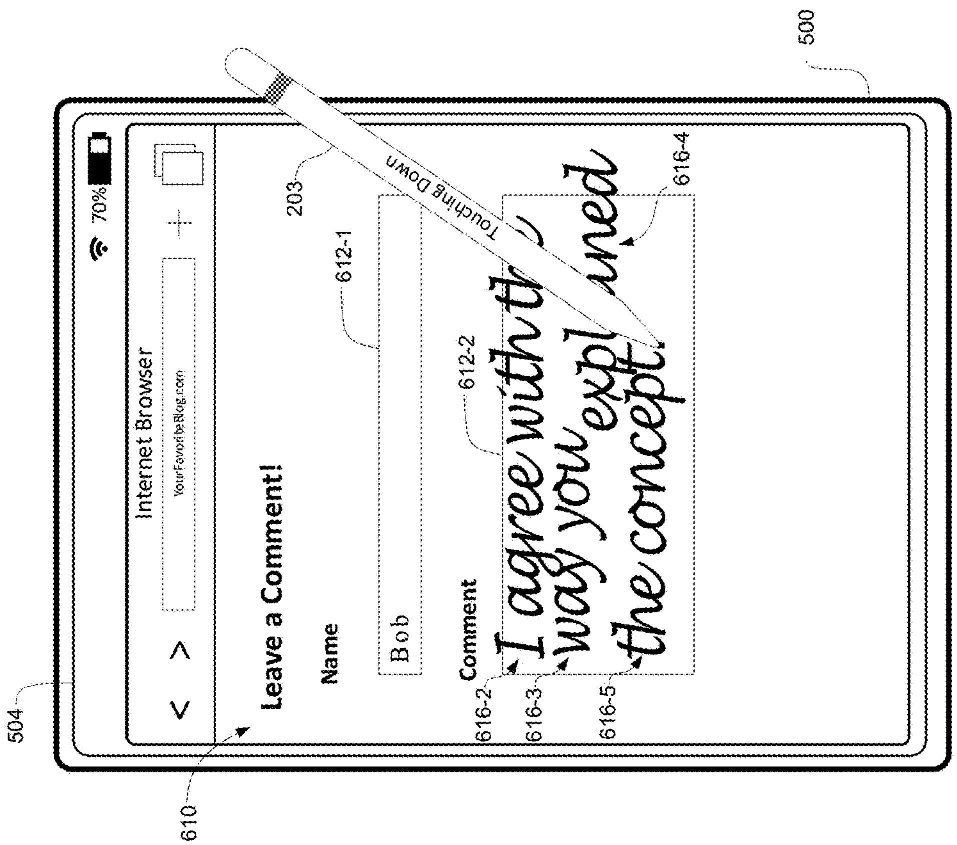
Figure 6F:
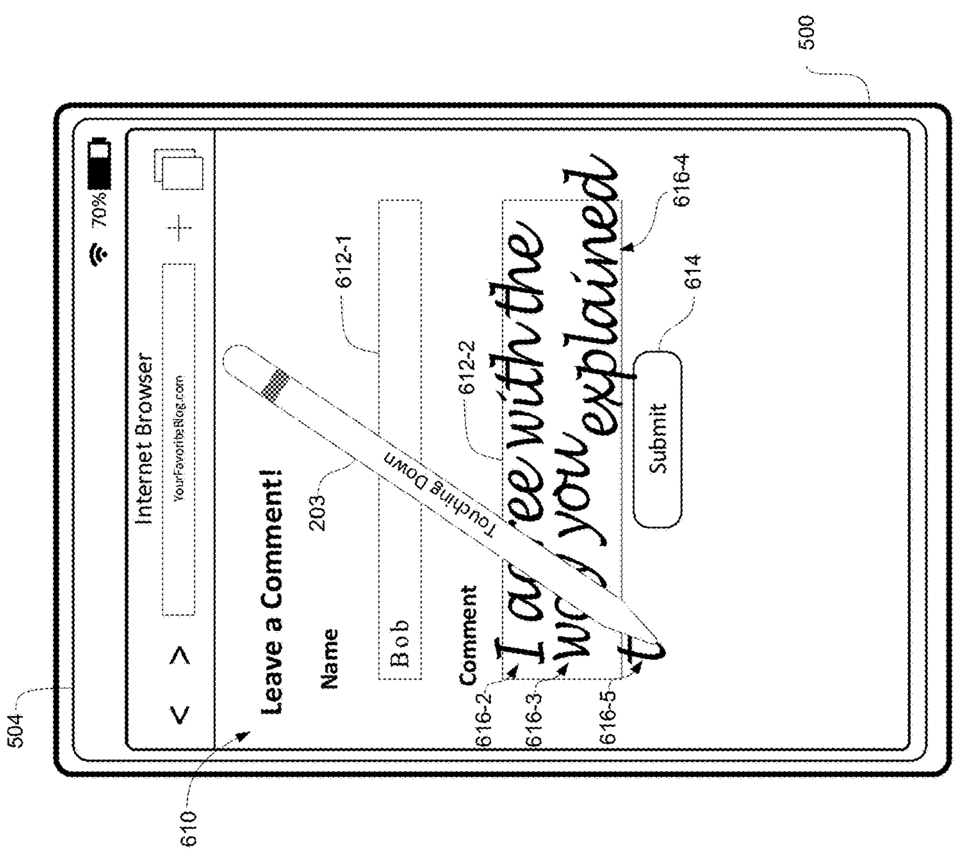
Figure 6I:
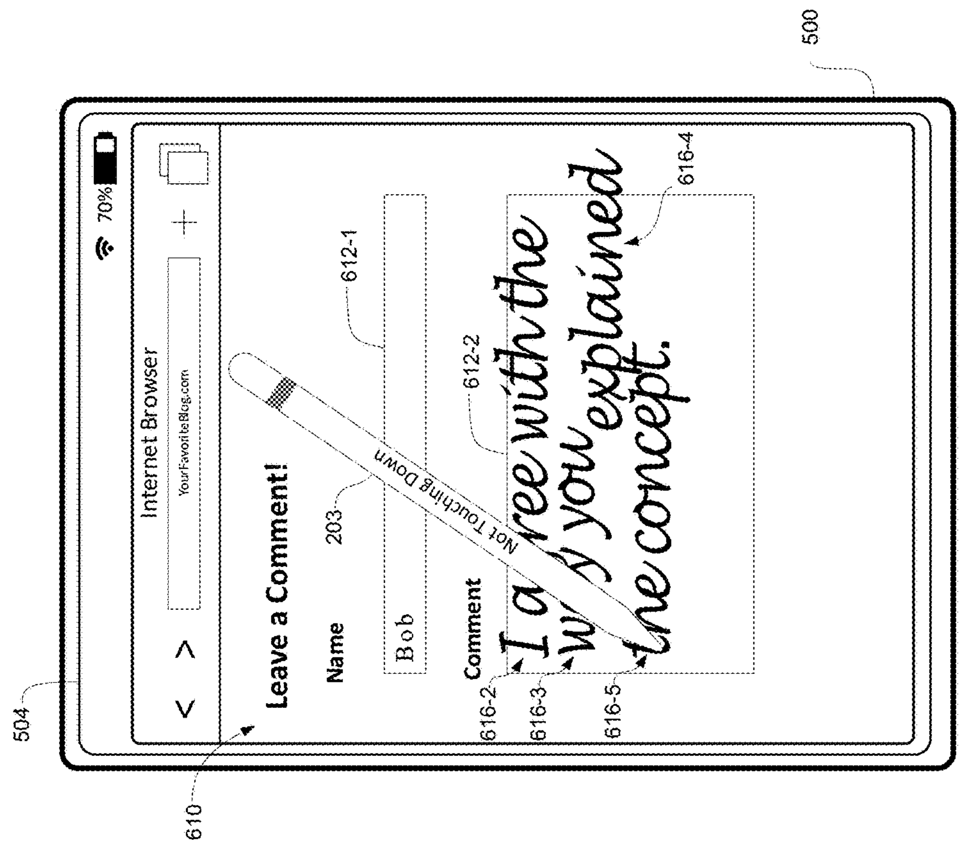
Figure 6H:
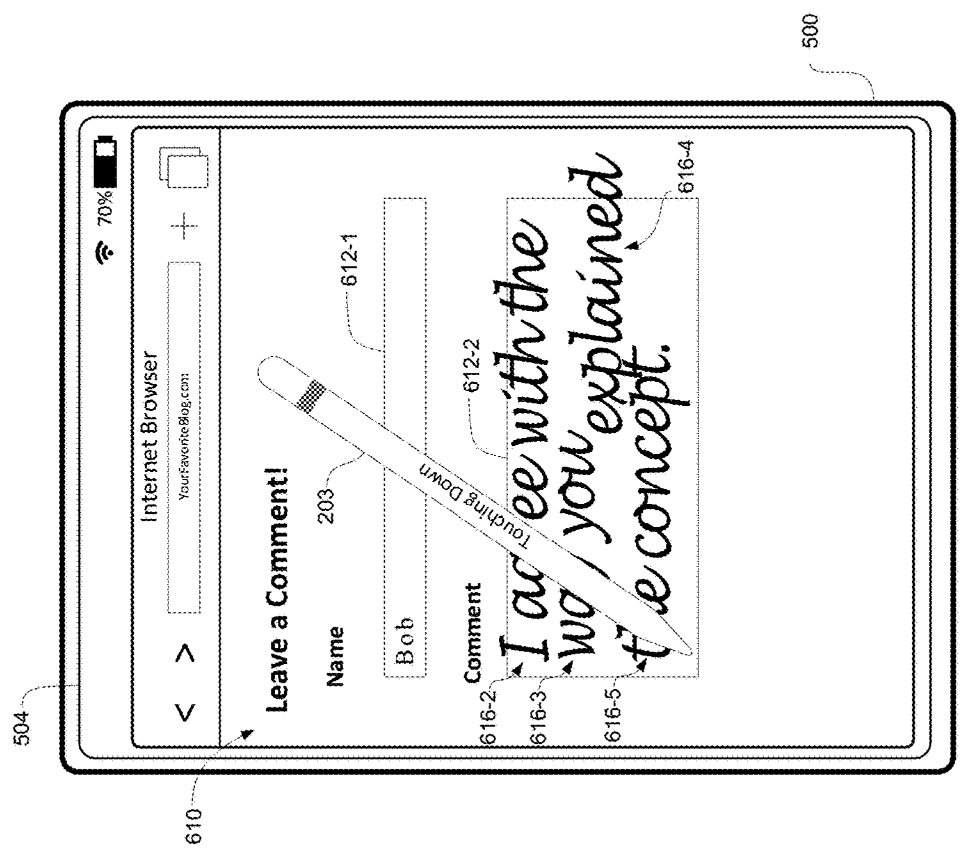
Figure 6K:
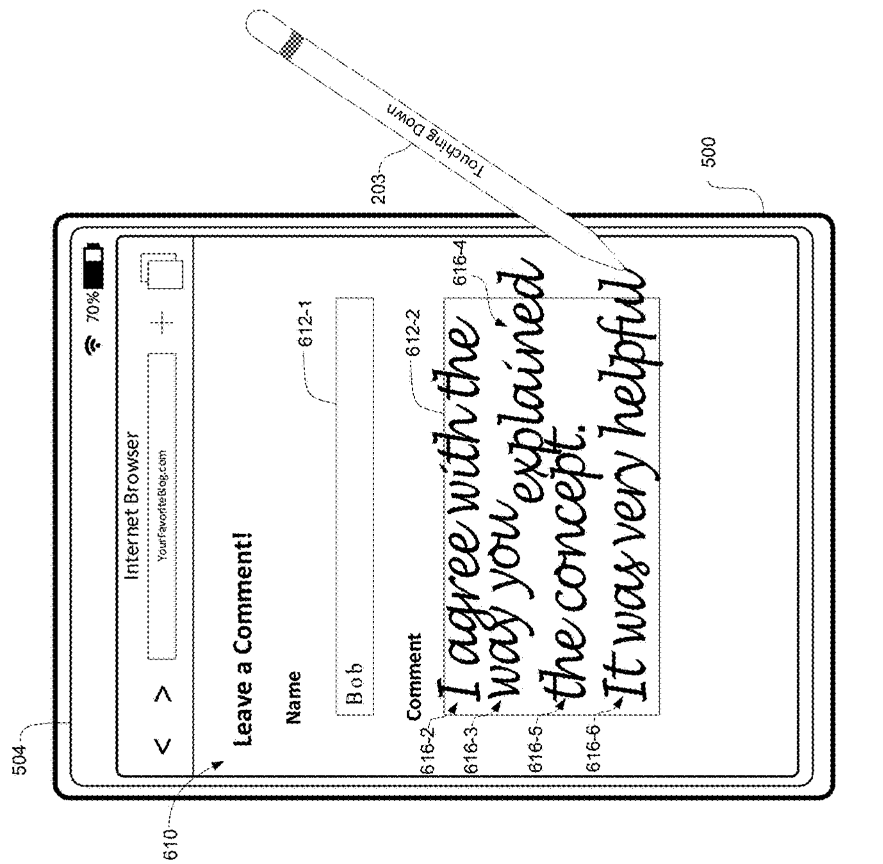
Figure 6J:
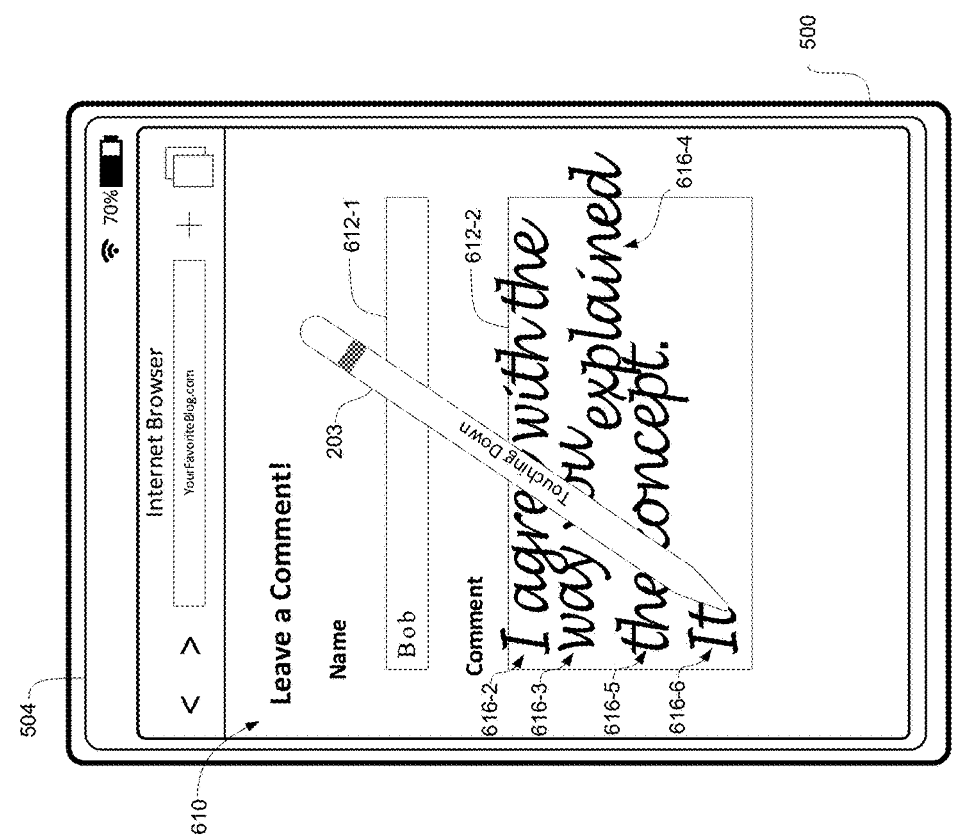
Figure 6M:
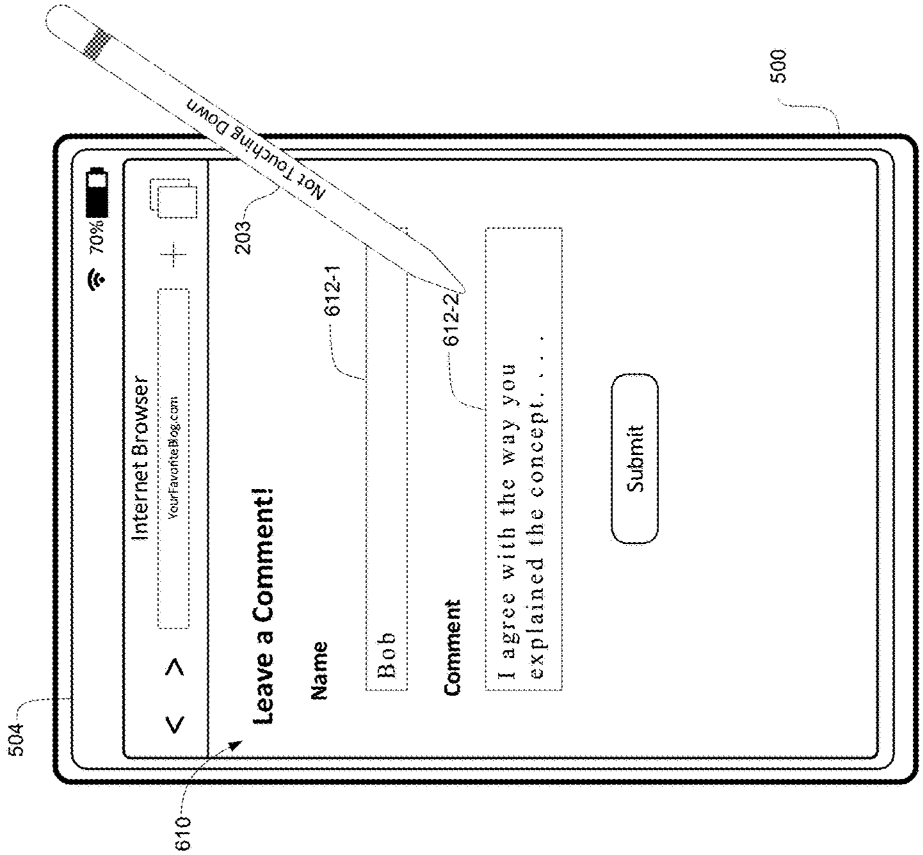
Figure 6L:
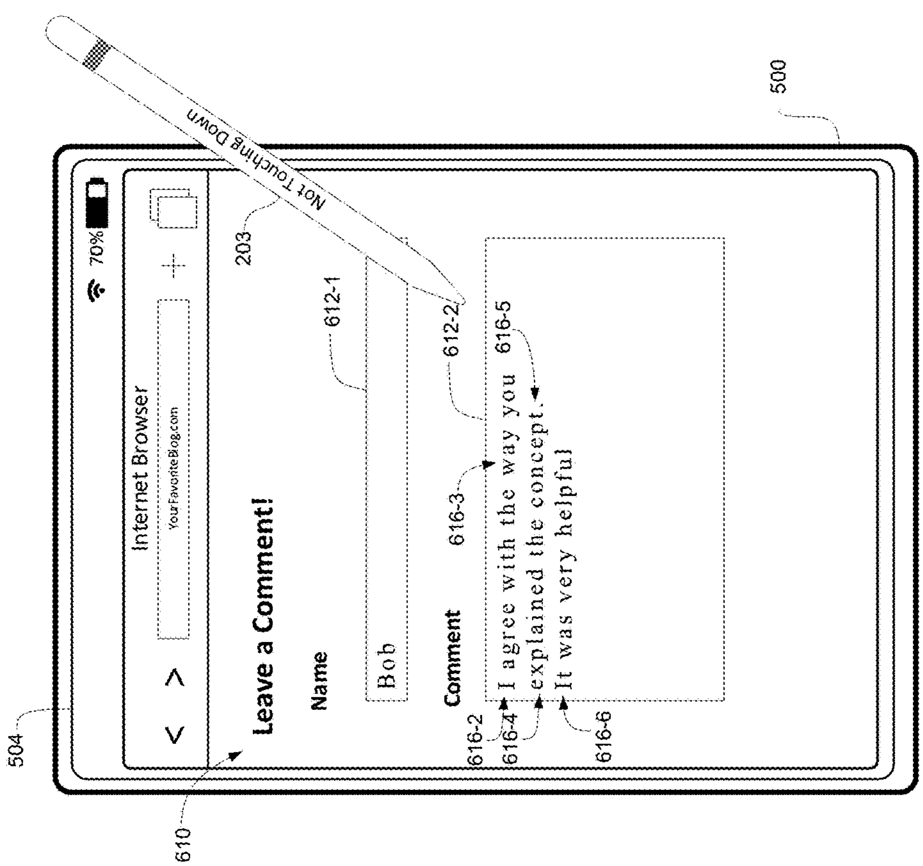
Figure 6N:
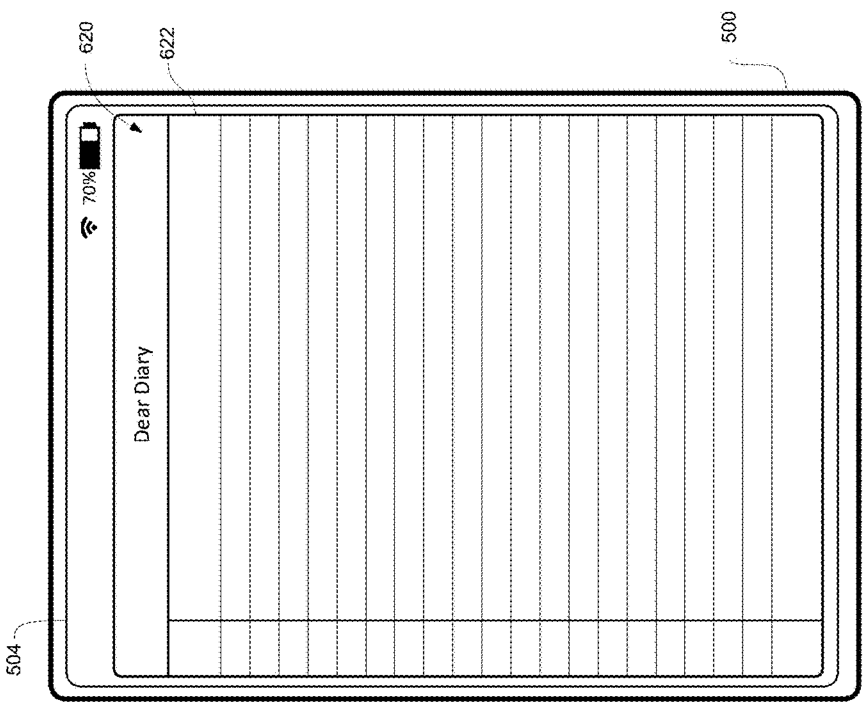
Figure 6O:
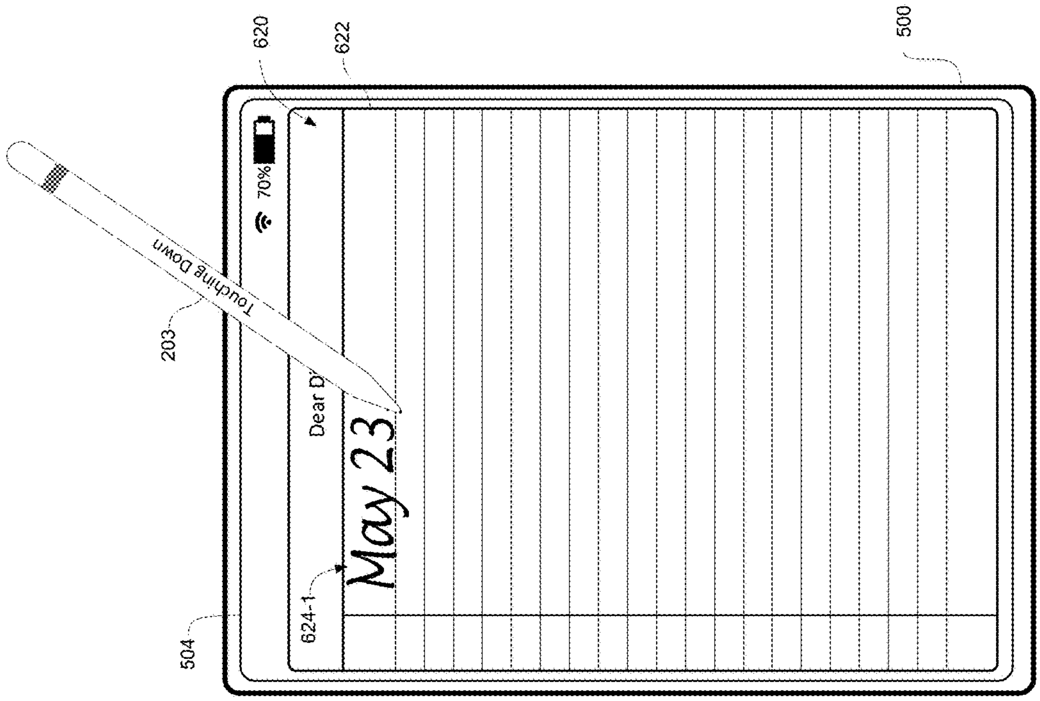
Figure 6P:
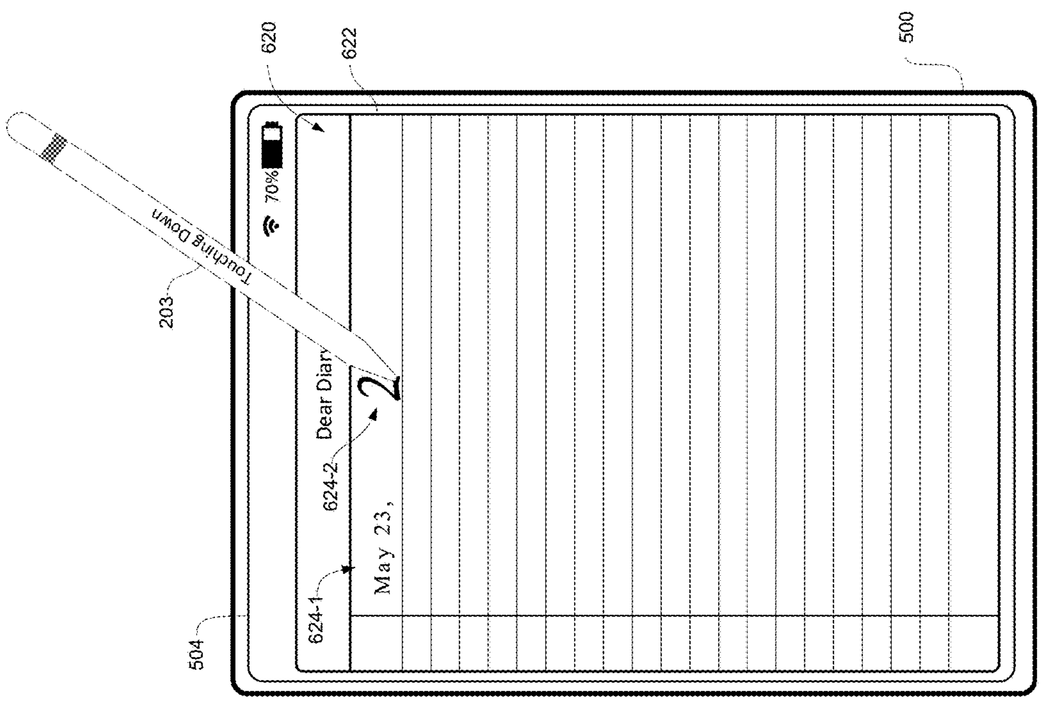
Figure 6Q:
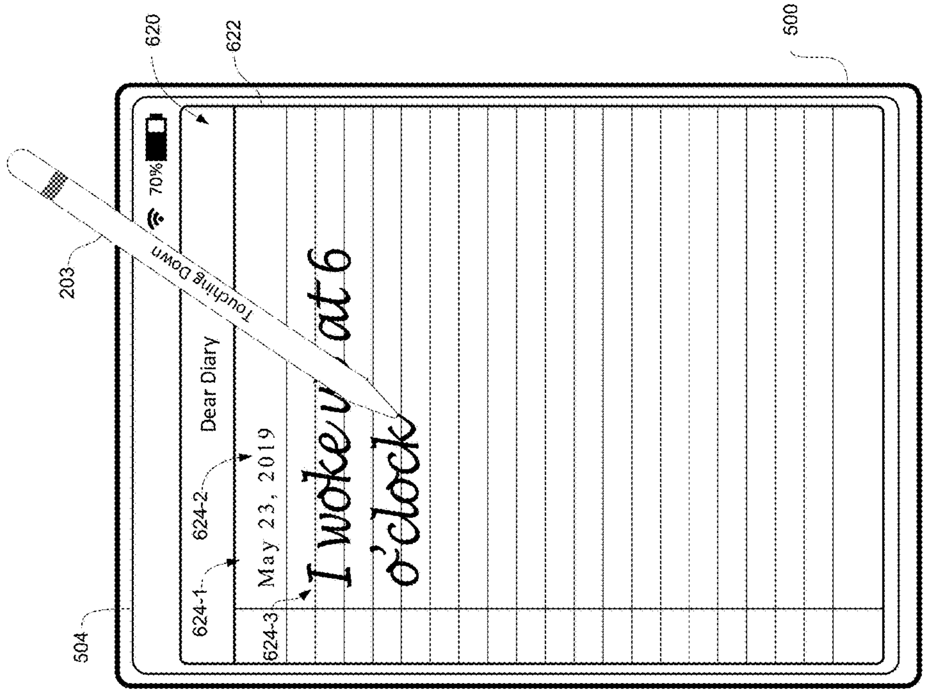
Figure 6S:
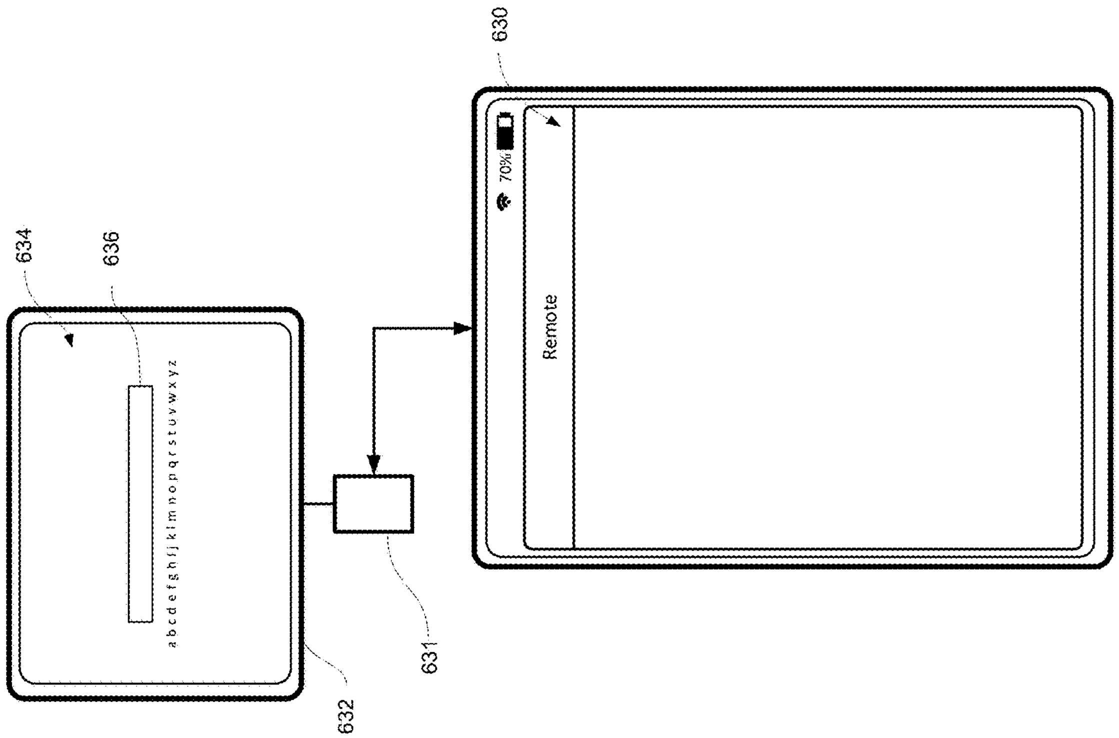
Figure 6R:
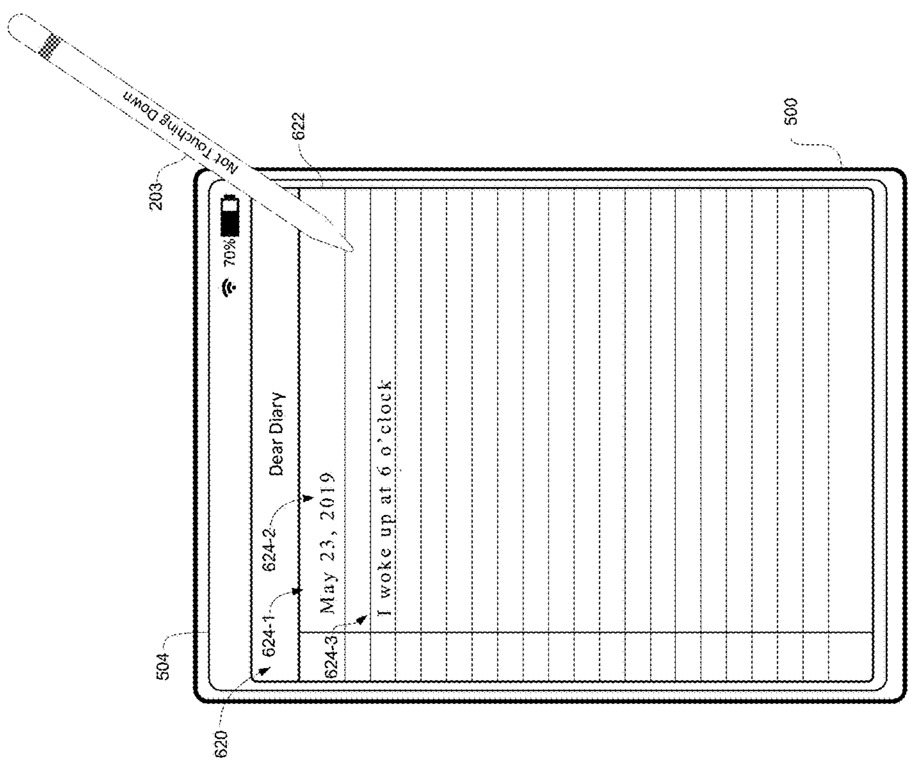
Figure 6U:
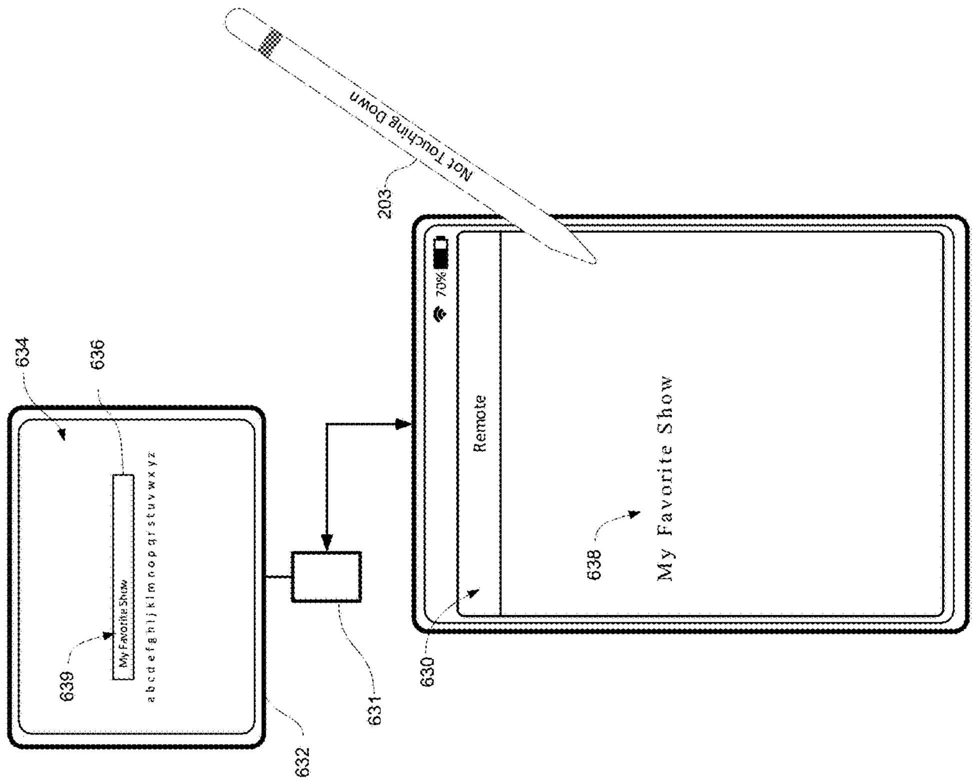
Figure 6T:
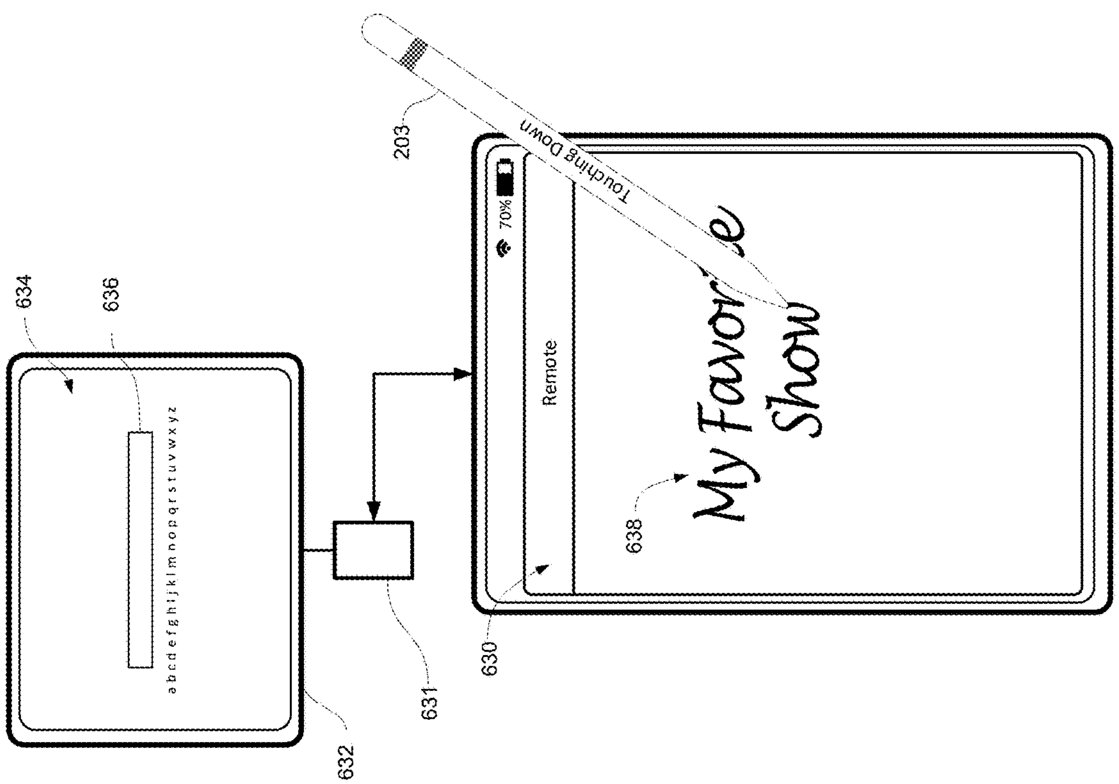
Figure 6W:
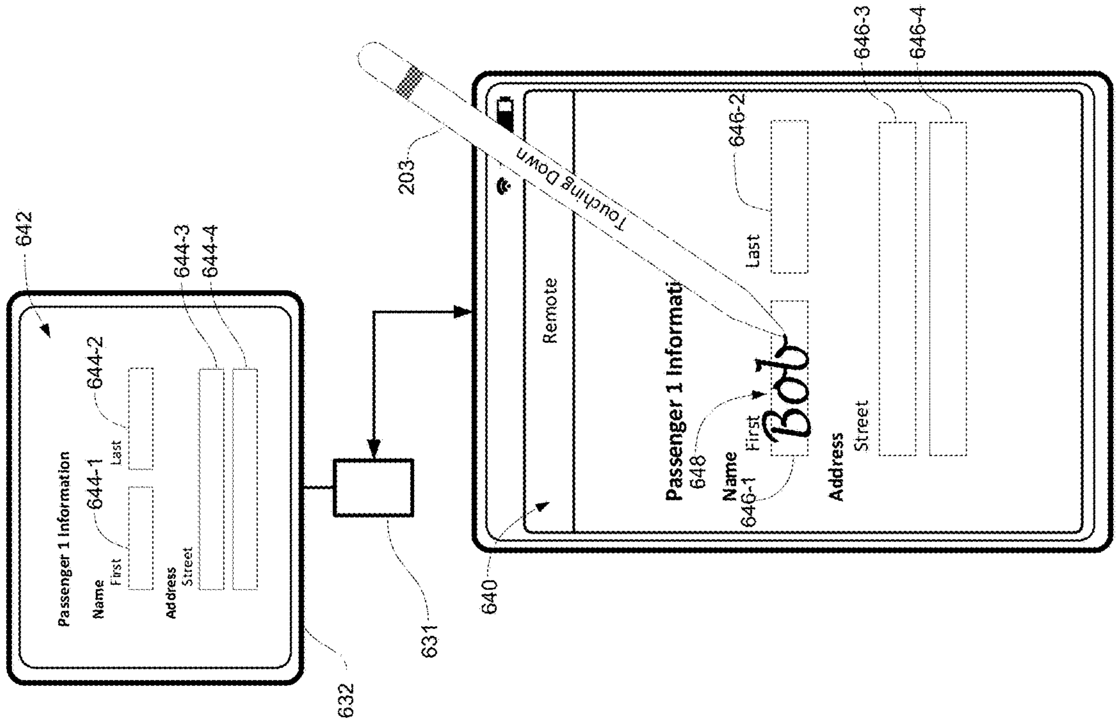
Figure 6V:
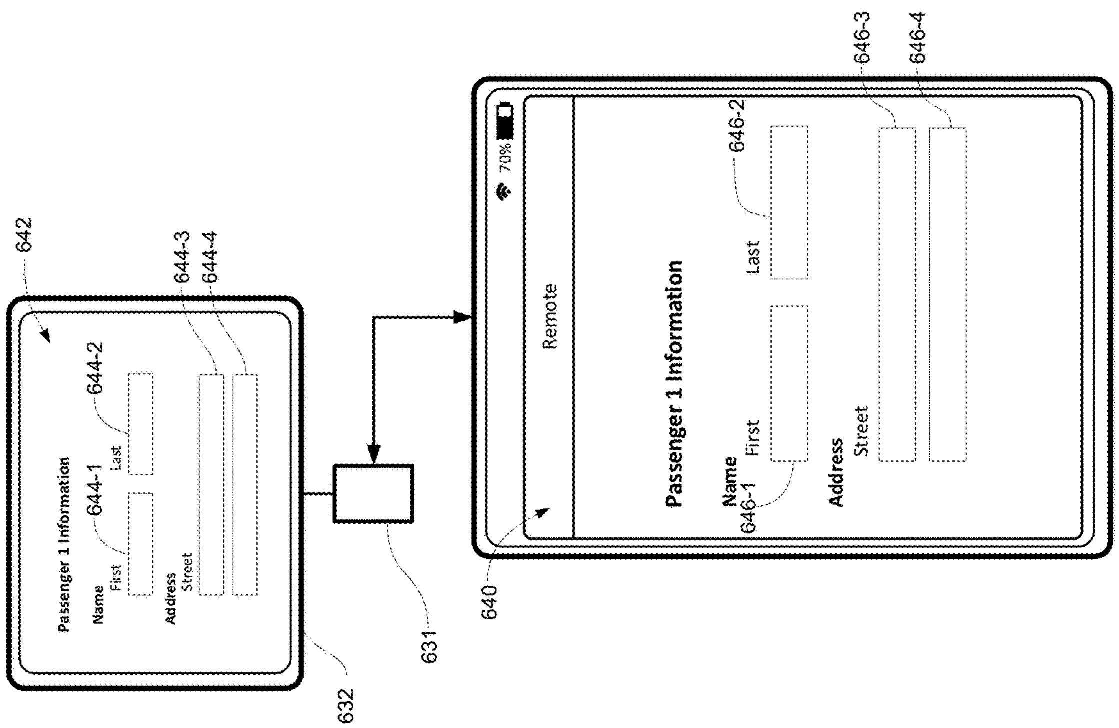
Figure 6X:
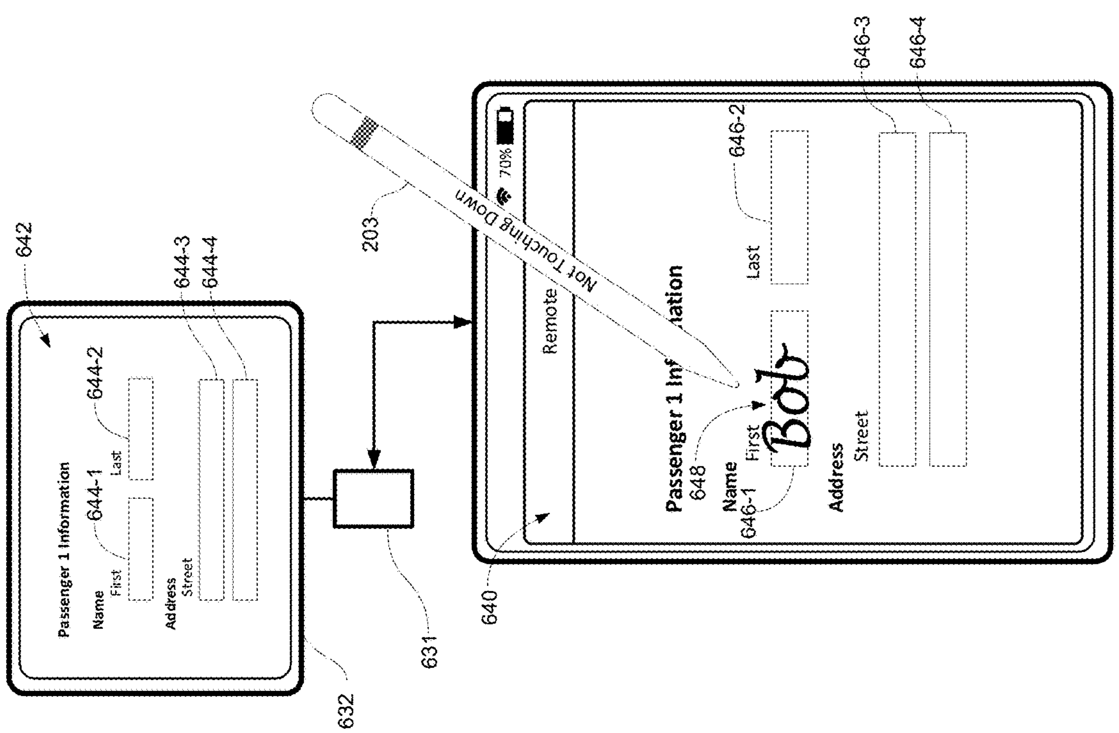
Figure 6Y:
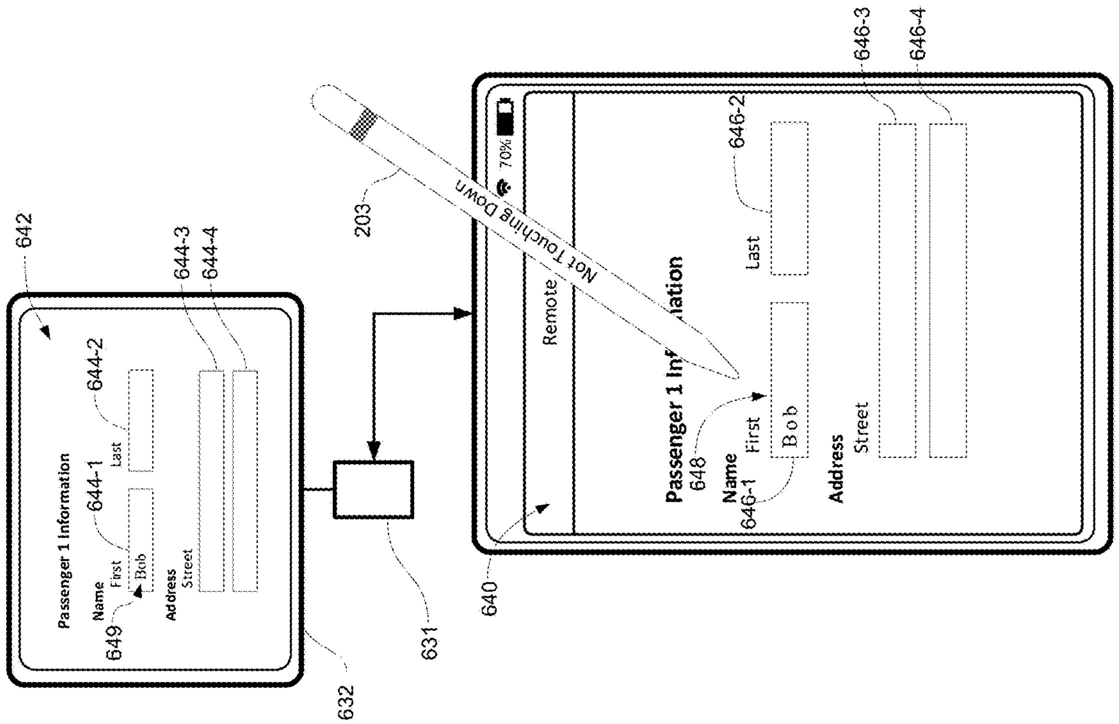
Figure 7A:
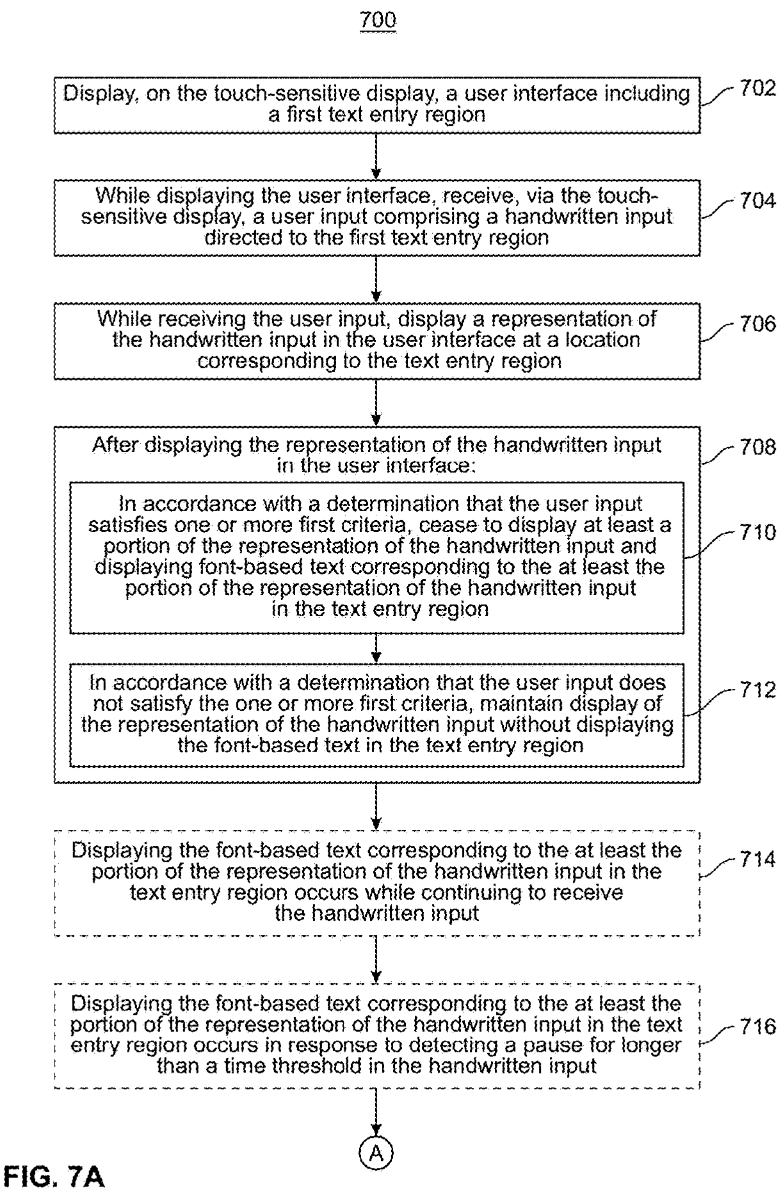
FIGS. 7A-7I are flow diagrams illustrating a method of converting handwritten inputs into font-based text in accordance with some embodiments.
Figure 7B:
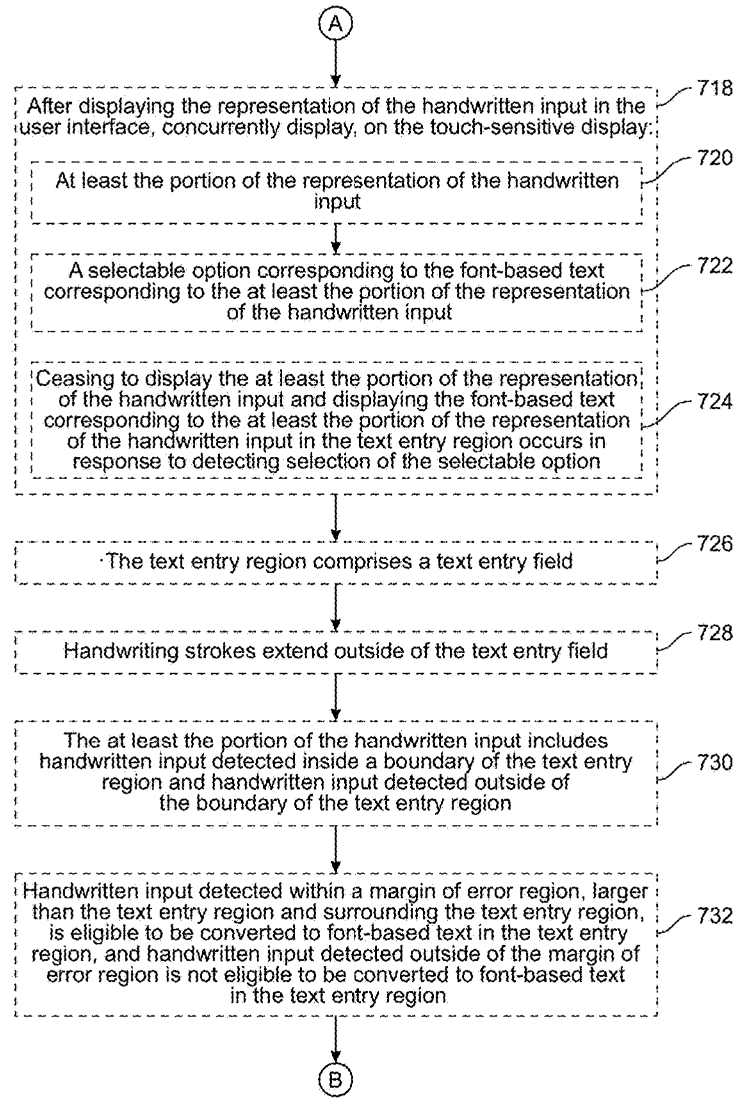
Figure 7C:
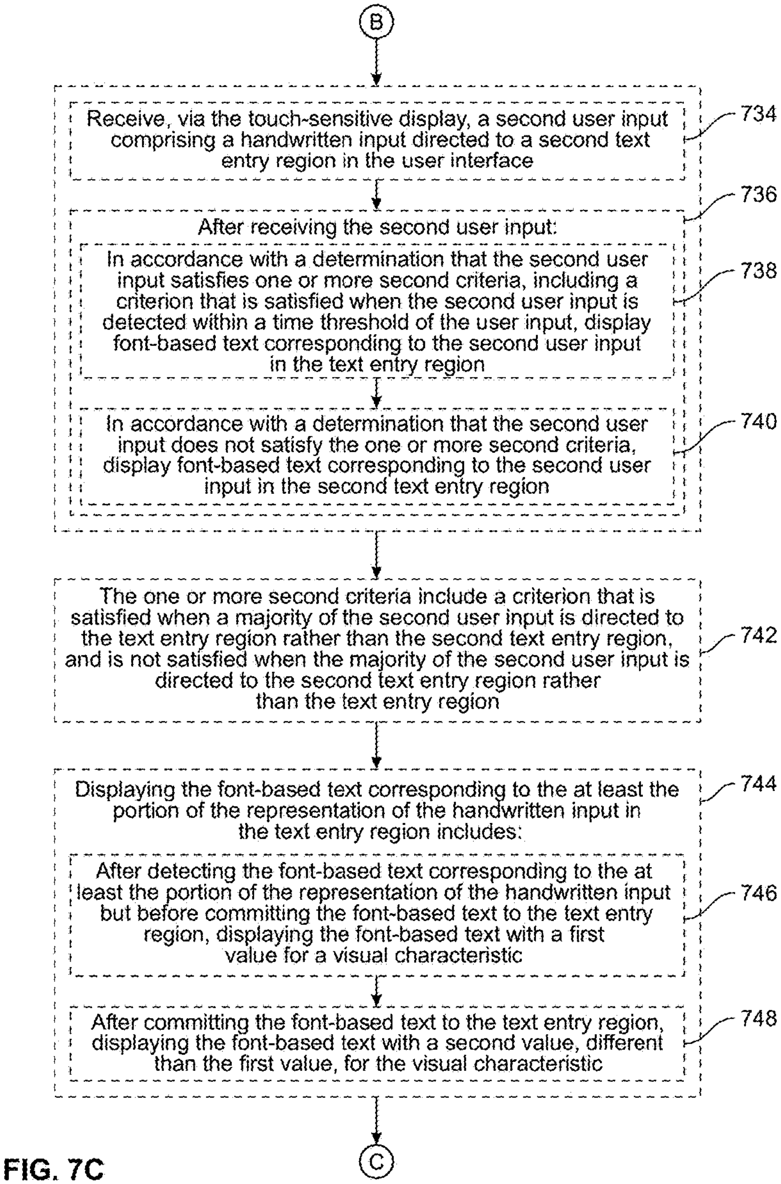
Figure 7D:
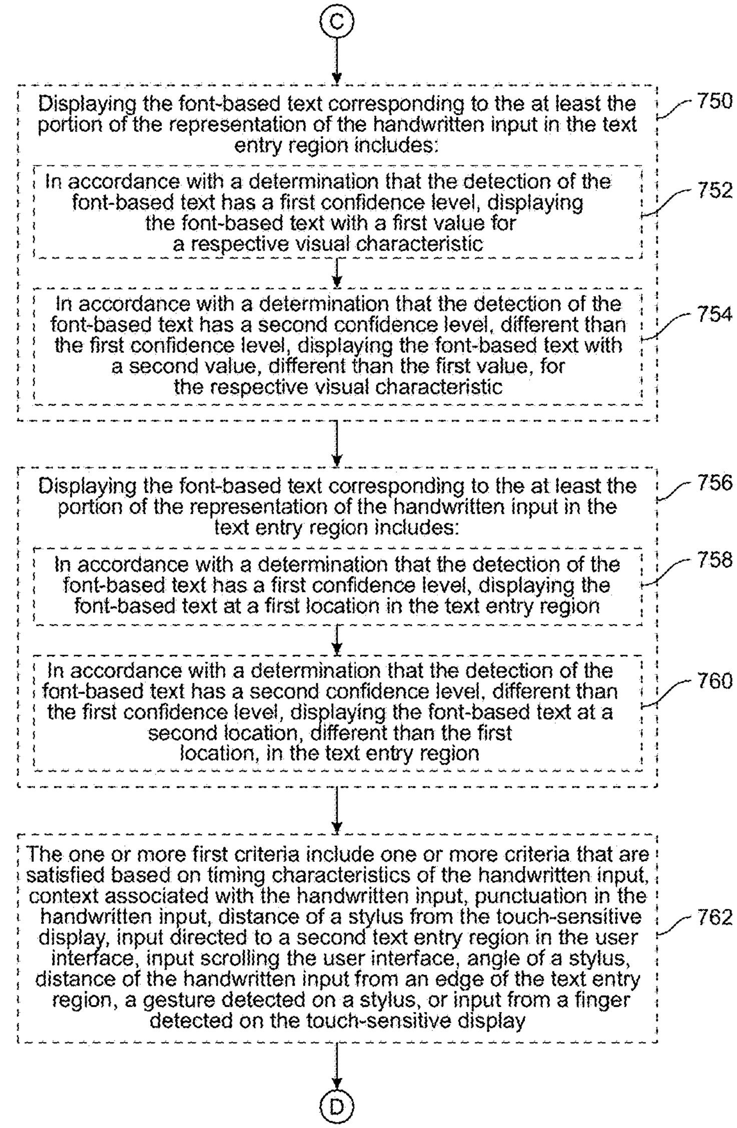
Figure 7E:
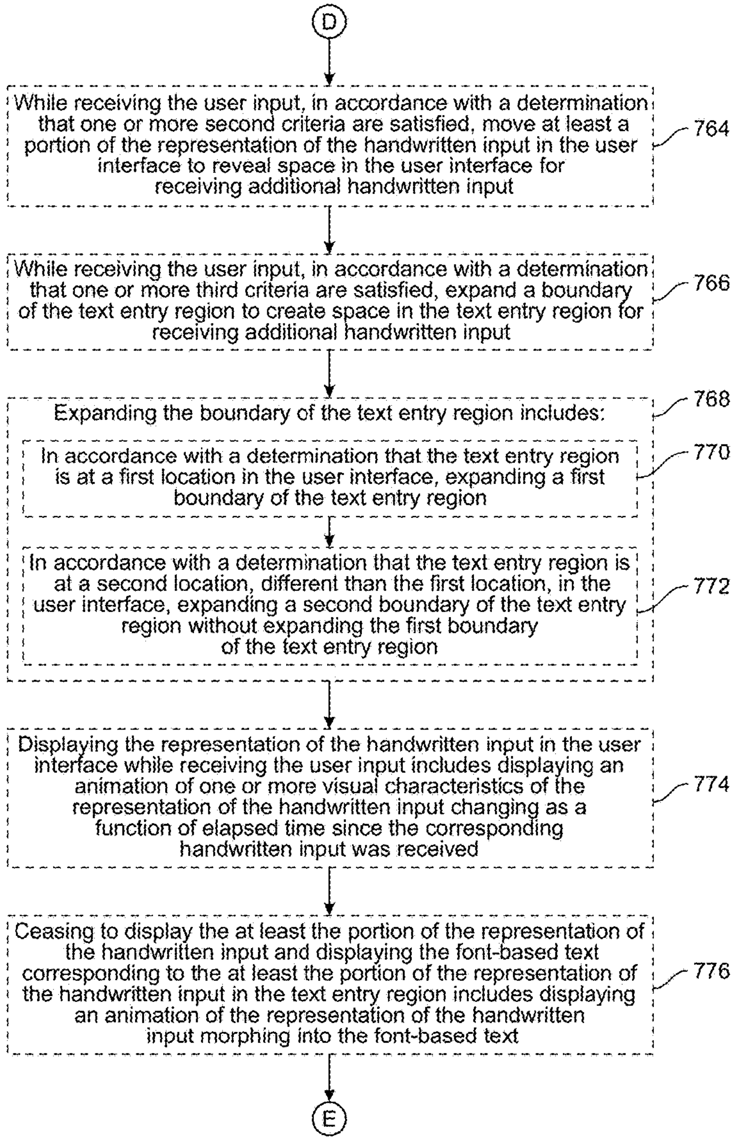
Figure 7F:
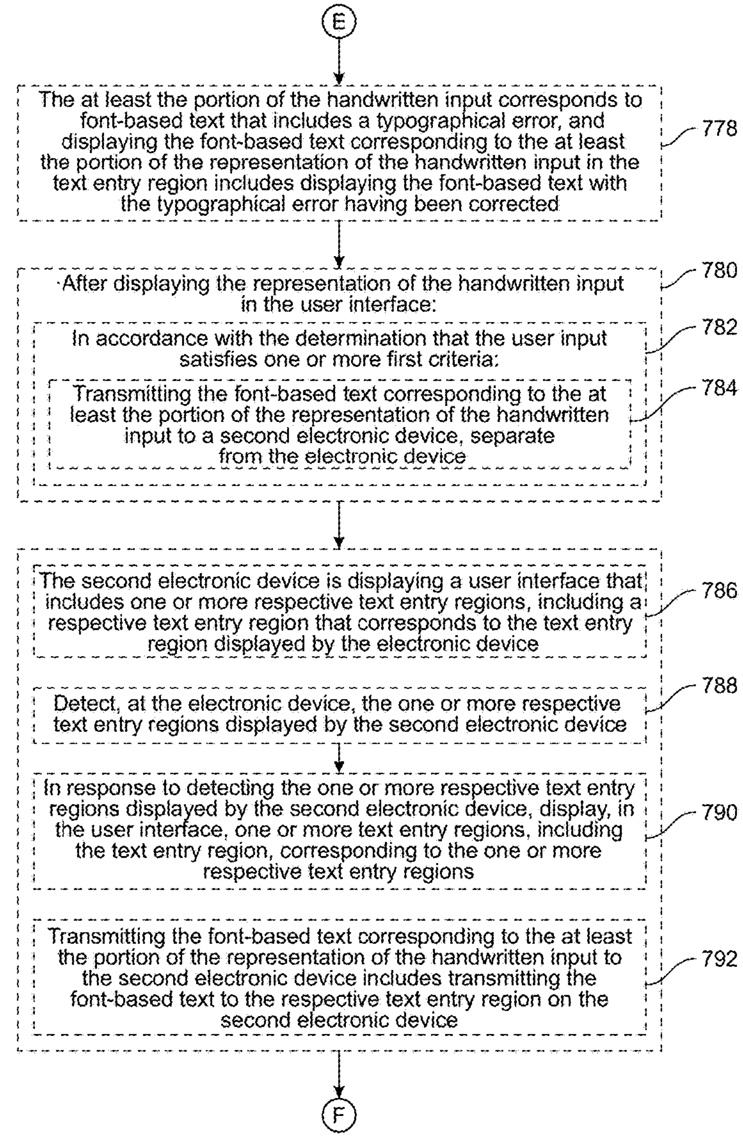
Figure 7G:
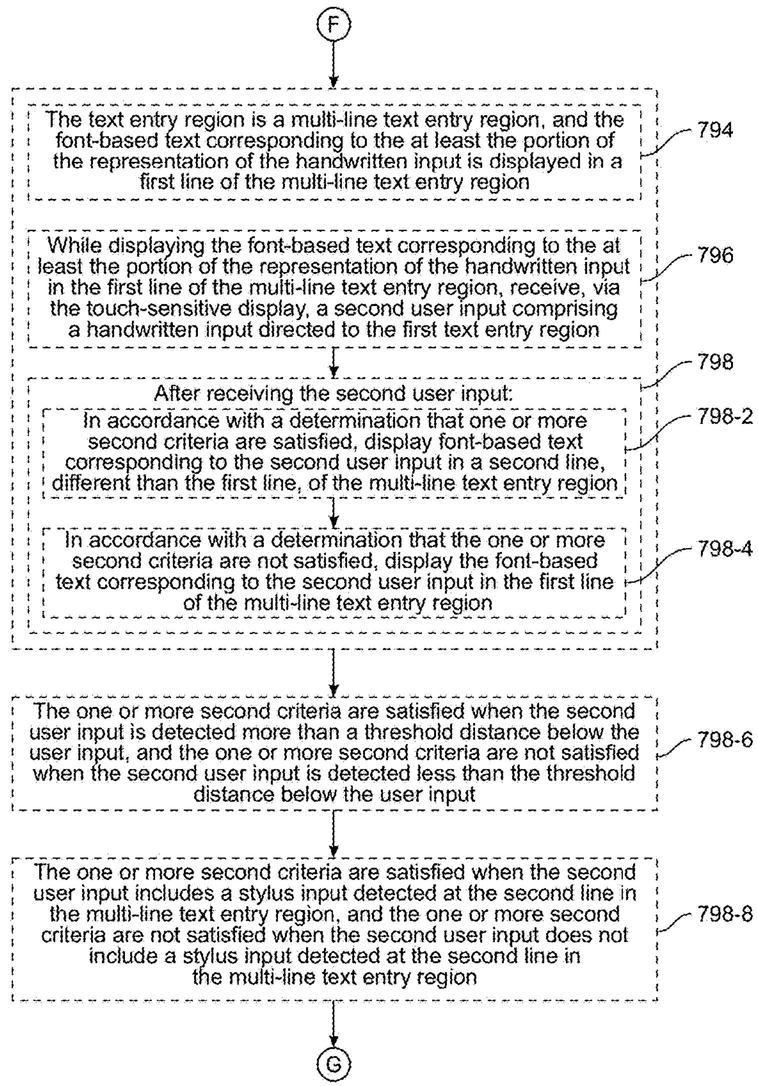
Figure 7H:
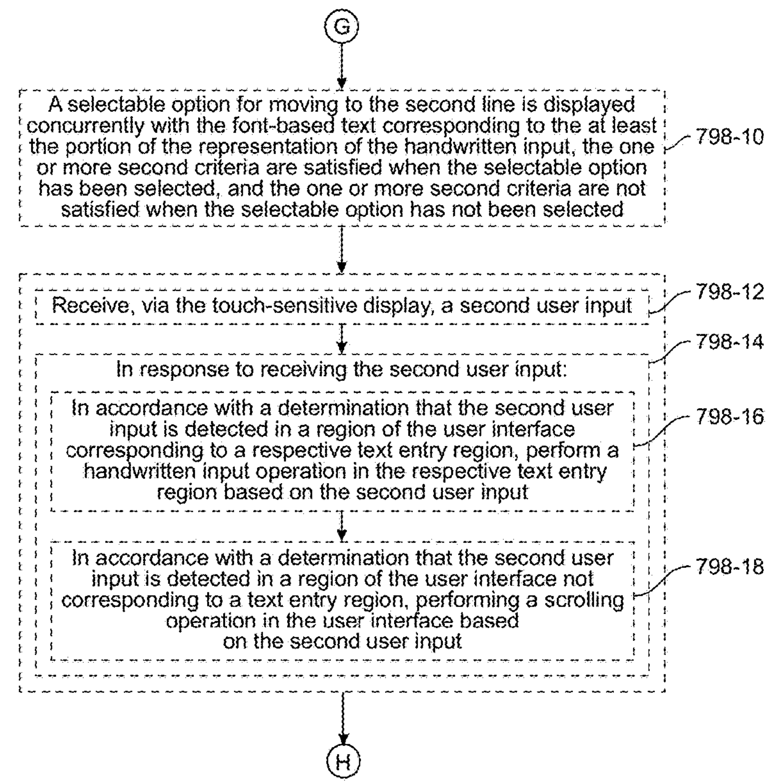
Figure 7I:
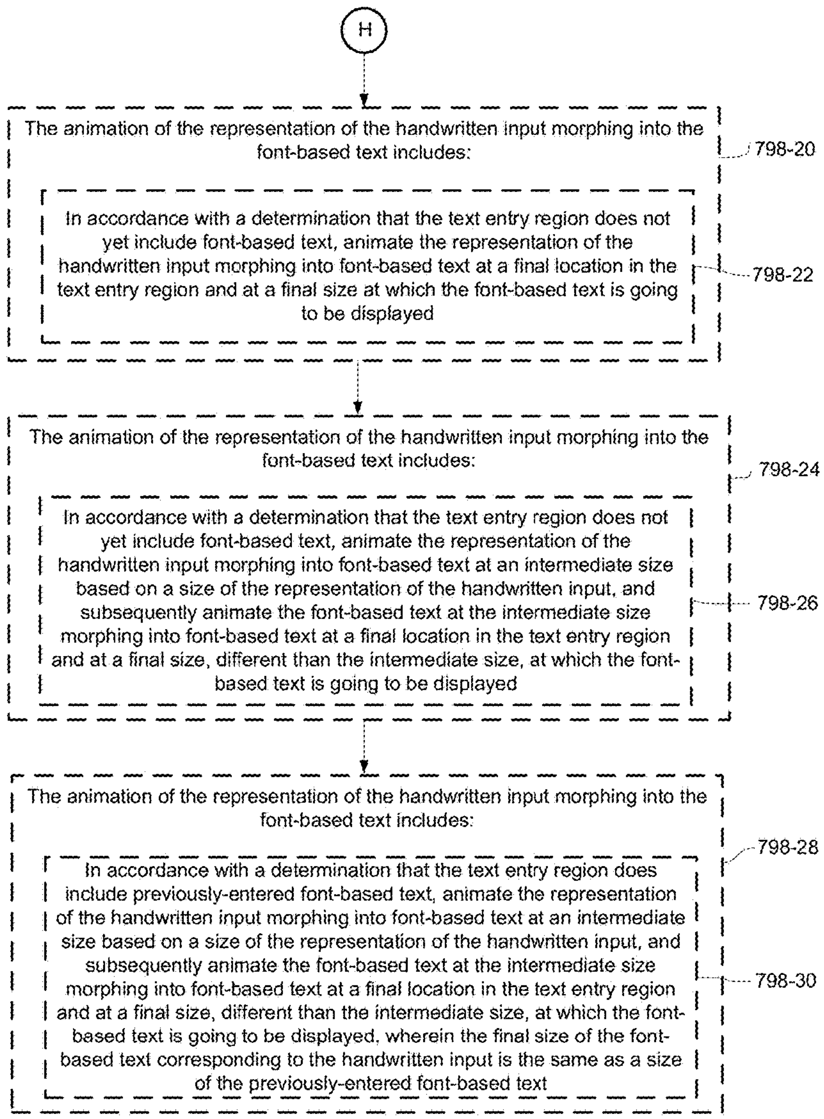

FIG. 6Z-6MM illustrate exemplary methods of receiving handwritten inputs in multi-lined text entry fields. In FIG. 6Z, device 500 is displaying user interface 610 which includes text entry fields 612-1 and 612-2. In some embodiments, text entry field 612-2 is a multi-lined text entry field which is capable of accepting and displaying multiple lines of text. In FIG. 6AA, text entry field 612-1 is populated with text 616-1 and text entry field 612-2 has received handwritten input 616-2. In some embodiments, if handwritten input 616-2 reaches or begins to reach the horizontal end of text entry field 612-2, then pop-up 618 is displayed presenting a selectable option for creating a new line of text for entry. In some embodiments, creating a new line of text comprises vertically increasing the size of the text entry field to accept further handwritten inputs (e.g., optionally based on the size of the handwritten input). For example, as shown in FIG. 6BB, a user input is detected selecting pop-up 618 by stylus 203 for creating (e.g., inserting) a new line of text. In some embodiments, as a result of the user input, text entry field 612-2 expands its lower boundary downwards to create a line of text for the user to provide further handwritten inputs, as shown in FIG. 6CC.

In FIG. 6DD, further handwritten input 616-3 is received from stylus 203 into the newly created space in text entry field 612-2. In some embodiments, as shown in FIG. 6EE, device 500 receives handwritten input 616-4. In some embodiments, handwritten input 616-4 is received at a lower vertical position in text entry field 612-2 than handwritten input 616-3. In some embodiments, however, because handwritten input 616-4 is not a threshold distance below handwritten input 616-3 (e.g., at least partially overlaps with the vertical space of handwritten input 616-3, 1 mm below handwritten input 616-3, 2 mm below handwritten input 616-3, etc.), handwritten input 616-4 is not considered to be written on a different line than handwritten input 616-3 and is not considered to be a request to insert a new line of text.

In FIG. 6FF, a handwritten input 616-5 is received more than a threshold distance below handwritten input 616-3 (e.g., 1 mm, 2 mm, 3 mm, etc. below handwritten input 616-3). In some embodiments, even though handwritten input 616-5 is generally received outside of the boundary of text entry field 612-2 (e.g., only slightly overlapping the area of text entry field 612-2), handwritten input 616-5 is considered to be a request to enter text into a new line into text entry field 612-2 because, for example, handwritten input 616-5 was entered shortly after handwritten input 616-4 and without much delay and/or there are no further text entry fields below text entry field 612-2. In some embodiments, in response to receiving handwritten input 616-5 a threshold distance below handwritten input 616-3, text entry field 612-2 creates a new line of text to encompass handwritten input 616-5, as shown in FIG. 6GG.

In FIG. 6HH, a user input from stylus 203 is received tapping on a space in text entry field 612-2 below handwritten input 616-5 corresponding to a request to add a new line of text. In some embodiments, in response to receiving the tap input (e.g., or long-press input), text entry field 612-2 further expands text entry field 612-2 to create space for a new line of text, as shown in FIG. 611. In FIGS. 6JJ-6KK, handwritten input 616-6 is received in the space for a new line of text. In FIG. 6LL, after the user has completed handwritten input and has lifted off stylus 203 from touch screen 504, device 500 optionally converts the handwritten inputs into font-based text. In some embodiments, after the handwritten inputs are converted into font-based text, text entry field 612-2 is returned to its original size and shape, as shown in FIG. 6MM. In some embodiments, if the text in text entry field 612-2 overflows the size of text entry field 612-2, a scroll bar or navigation element (not shown) is provided to allow the user to view the overflowed text.

FIG. 6NN-6RR illustrate exemplary criteria for converting handwritten input into font-based text. In FIG. 6NN, device 500 is displaying user interface 620 corresponding to a note taking application. In some embodiments, user interface 620 includes a text entry region 622 in which a user is able to enter multiple lines of text. In FIG. 6OO, handwritten input 624-1 is received in text entry region 622. In some embodiments, handwritten input 624-1 includes a punctuation after one or more letters or words (e.g., in FIG. 6OO, a comma). In some embodiments, in response to detecting a punctuation, the handwritten input before and including the punctuation is analyzed and converted into font-based text, as shown in FIG. 6PP. In some embodiments, the conversion is performed after a short time delay (e.g., in accordance with method 1300).

In FIG. 6PP, further handwritten input 624-2 is received in text entry region 622. In some embodiments, handwritten input 624-2 is converted after a certain time delay after the user completes writing handwritten input 624-2, as shown in FIG. 6QQ. In some embodiments, device 500 recognizes handwritten input 624-2 as a word which the user has completed writing, at which time, handwritten input 624-2 is converted. In some embodiments, handwritten input 624-2 is converted after device 500 detects that the user has begun writing on a different line from handwritten input 624-2 (e.g., handwritten input 624-3). In FIG. 6QQ, handwritten input 624-3 is received in text entry region 622. In some embodiments, handwritten input 624-3 includes a word in which no additional letters can be added (e.g., "o'clock"). In some embodiments, when device 500 detects that no additional letters can be added to a recently written word, then the handwritten inputs up to and including the word in which no additional letters can be added are analyzed and converted into font-based text, as shown in FIG. 6RR. In some embodiments, a word in which no letters can be added are those words which, based on the default dictionary of the device, no further letters can be added to create a valid word. In other words, any additional letters to the word would create a non-existent word (e.g., no combination of additional letters would create a valid word). In some embodiments, alternatively, handwritten input 624-3 is converted to font-based text because the user has written a threshold number of words (e.g., 3 words, 5 words, 6 words, etc.).

FIG. 6SS-6YY illustrate exemplary methods of transmitting font-based text from a first electronic device to a second electronic device. In FIG. 6SS, device 500 is in communication with device 631. In some embodiments, device 631 is a set-top box or other electronic device (e.g., such as device 580) that is in communication with display 632. In some embodiments, device 500 communicates with device 631 wirelessly over a wireless communication protocol (e.g., WiFi, WiFi Direct, NFC, IR, RF, etc.). In some embodiments, device 631 is in communication with other electronic devices that are able to remotely control device 631, such as device 590 and/or device 591. In some embodiments, as shown in FIG. 6SS, device 631 is displaying user interface 634 that includes a text entry field 636. Thus, in some embodiments, device 631 is expecting user input to enter text into text entry field 636. In some embodiments, device 500 is displaying user interface 630 corresponding to a remote control application for remotely controlling device 631. In some embodiments, user interface 630 includes a text entry region which is capable of accepting handwritten input. For example, in FIG. 6TT, handwritten input 638 is detected in the text entry region of user interface 630. In some embodiments, after receiving handwritten input 638 (or alternatively while receiving handwritten input 638), handwritten input 638 is converted into font-based text, as shown in FIG. 6UU. In some embodiments, in response to converting handwritten input 638 to font-based text (or concurrently with converting handwritten input 638 into font-based text), the text is transmitted to device 631 and optionally entered into and displayed in text entry field 636.

FIG. 6VV-6YY illustrate an alternative exemplary method of transmitting font-based text from a first electronic device to a second electronic device. In some embodiments, as shown in FIG. 6VV, device 631 displays one or more text entry fields (e.g., text entry fields 644-1 to 644-4) on user interface 642. In some embodiments, device 631 transmits data for the one or more text entry fields to device 500 (or device 500 otherwise receives data about the one or more text entry fields). In some embodiments, device 500 displays the one or more text entry fields on user interface 640. In some embodiments, the one or more text entry fields mimic the position and placement of the corresponding text entry fields on display 632. In some embodiments, device 500 does not mimic the position and placement of the text entry fields.

In FIG. 6WW, handwritten input 648 is received in text entry field 646-1 on user interface 640 of device 500. In some embodiments, after the user has completed handwritten input 648 and lifted off stylus 203 (e.g., as shown in FIG. 6XX), device 500 converts handwritten input 648 into font-based text, as shown in FIG. 6YY. In some embodiments, after or concurrently with converting handwritten input 648 into font-based text, device 500 transmits the text to device 631. In some embodiments, in response to receiving the text, device 631 enters and displays the received text into text entry field 644-1 (e.g., corresponding to text entry field 646-1).

FIGS. 7A-7I are flow diagrams illustrating a method 700 of converting handwritten inputs into font-based text. The method 700 is optionally performed at an electronic device such as device 100, device 300, device 500, device 501, device 510, and device 591 as described above with reference to FIGS. 1A-1B, 2-3, 4A-4B and 5A-5I. Some operations in method 700 are, optionally combined and/or order of some operations is, optionally, changed.

As described below, the method 700 provides ways to convert handwritten inputs into font-based text. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., an electronic device, a mobile device (e.g., a tablet, a smartphone, a media player, or a wearable device) including a touch screen, or a computer including a touch screen, such as device 100, device 300, device 500, device 501, or device

591) in communication with a touch-sensitive displays (702), on the touch-sensitive display, a user interface including a first text entry region, such as in FIG. 6A (e.g., a user interface with text fields or text entry regions in which a user is able to enter text). For example, the user interface is a form with a plurality of text fields (or text entry region) and selection of a particular text field (e.g., with a finger) optionally displays a soft keyboard for entering text into the text field. In some embodiments, a physical keyboard is optionally used to enter text into respective text fields.

In some embodiments, while displaying the user interface, the electronic device receives (704), via the touch-sensitive display, a user input comprising a handwritten input directed to the first text entry region, such as in FIG. 6B (e.g., receiving a handwritten input on or near a text field (or text entry region)). In some embodiments, the user input is received from a stylus or other writing device. In some embodiments, the user input is received from a finger. In some embodiments, the handwritten input is directed to the first text entry field when the handwritten input is received at a location on or near the text field (or text entry region). In some embodiments, handwritten input that is indicative of a request to enter text into the text entry field (or text entry region) is considered to be directed to the first text entry field. For example, a handwritten input that begins in the text field (or text entry region) optionally indicates that the entire sequence of handwritten inputs is intended to be entered into the text field (or text entry region), even if a portion of the handwritten input (e.g., some or all) extends outside of the text field (or text entry region). In some embodiments, a user input that begins outside of the text field (or text entry region) but a substantial amount of the handwritten input falls within the text field (or text entry region) is optionally considered to be an intent to enter text into the text field (or text entry region) (e.g., 30%, 50%, etc. falls within the text field or text entry region). In some embodiments, the text entry field (or text entry region) includes a predetermined margin of error in which handwritten inputs within a certain distance from the text entry field (or text entry region) will be considered to be a handwritten input within the text entry field (or text entry region). In some embodiments, a user input that is entirely outside of the text field (or text entry region) is considered to be an intent to enter text into the text field (or text entry region) if the timing of the entry indicates that the input is a continuation of handwritten input which should be entered into the text field (e.g., the user continues writing without pause or with a short pause and the writing extends beyond the text field).

In some embodiments, while receiving the user input, the electronic device displays (706) a representation of the handwritten input in the user interface at a location corresponding to the text entry region, such as in FIG. 6B (e.g., displaying the trail of the handwritten input on the display at the location where the handwritten input was received as the input is received). In some embodiments, as the user "draws" on the touch-sensitive display, the display shows the user's handwritten input at the location where the input was received. In some embodiments, the handwritten input trail is shown within the text field if the handwritten input is received in the text field. More generally, in some embodiments, the handwritten input trail is shown wherever on the touch-sensitive display the handwritten input is received. In some embodiments, displaying the handwritten input occurs after receipt of each letter, each word or each sentence, etc. In some embodiments, a user input with the input device (e.g., stylus, finger, etc.) that is not determined to be a handwritten input (e.g., an input that is not directed at a text entry field or region) will not cause concurrent display of the trail of the input.

In some embodiments, after displaying the representation of the handwritten input in the user interface (708), such as in FIG. 6E (e.g., after the handwritten input ends or after the handwritten input begins and while the user is still inputting further handwritten inputs), in accordance with a determination that the user input satisfies one or more first criteria (e.g., replacing the handwritten input with text (e.g., computer text) optionally depends on a number of criteria, including the timing of the writing, the use of certain words and/or letters, punctuation, sentence structure of the handwritten input and/or interaction with other user interface elements), the electronic device ceases (710) to display at least a portion of the representation of the handwritten input and displaying font-based text corresponding to the at least the portion of the representation of the handwritten input in the text entry region, such as in FIG. 6E (e.g., removing at least a portion of the handwritten input on the display and displaying computerized text (e.g., font-based text) corresponding to the removed portion of the handwritten input in the text entry field).

In some embodiments, the replacement occurs while the input is received (e.g., the first part of the handwritten input is replaced while the user is still inputting the second part of the handwritten input). In some embodiments, the replacement occurs after the input ends (e.g., after a threshold amount of time without receiving handwritten input, after the user completes writing a word or sentence, or after satisfaction of some other input termination criteria). In some embodiments, the replacement occurs after displaying proposed text to the user and receiving an input selecting or confirming proposed text.

In some embodiments, the system determines the letters and/or words that the user wrote in the handwritten input and converts them into computerized text. For example, the handwritten input is optionally replaced with text with 12-point Times New Roman font (e.g., or other suitable font). In some embodiments, font-based text is 10-point sized, 12-point sized, etc. and optionally is Arial, Calibri, Times New Roman, etc. In some embodiments, the computerized text (e.g., font-based text) replaces the handwritten input. In some embodiments, the font-based text is displayed before or after the portion of the handwritten input is removed from display (e.g., 0.5 seconds before or after, 1 second before or after, 3 seconds before or after, etc.). In some embodiments, an animation is shown converting the handwritten input into the computerized text or otherwise removing the handwritten input and displaying the computerized text. In some embodiments, the location of the computerized text overlaps with the location where the handwritten input existed before the conversion. In some embodiments, the computerized text is a smaller size than the handwritten input (e.g., the font size is smaller than the handwritten input). In some embodiments, the handwritten input is converted into font-based text that has the same size as the handwritten input (e.g., the size of the font-based text is matched to the handwritten input) before the font-based text is then updated to its final size (e.g., the default size of the font-based text or the default size of the text entry region). In some embodiments, the size of the handwritten input is modified to the final size of the font-based text (e.g., the default size of the font-based text or the default size of the text entry region) before the handwritten input is converted to font-based text (e.g., in its final size—which matches the final size of the handwritten input). In some embodiments, the size of the handwritten input is not changed and the font-based text appears already in its final size without matching the size of the handwritten input and without changing from an initial size to the final size. Similarly, in some embodiments, the location of the text is optionally updated before or after the conversion. In some embodiments, the handwritten input is moved to the final location before conversion, the font-based text appears (e.g., when it is converted) at the location of the handwritten input before moving to its final location, or the font-based text appears (e.g., when it is converted) at the final location without an animation moving the font-based text from an initial position to the final position. In some embodiments, the animation includes any combination of (e.g., and in any order) changing size and/or location of the handwritten input or font-based text to result in the final location and size from the initial location and size of the handwritten input. In some embodiments, regardless of the size of the user's writing, the representation of the handwritten text is displayed at the final size of the font-based text (e.g., the default size of the font-based text or the default size of the text entry region). In some embodiments, as a result of the conversion operation, the font-based text is provided to the text entry or text entry region as a text input. In some embodiments, the animation of the handwritten text converting into font-based text is similar to or shares similar features as the conversion of handwritten input into font-based text described below with respect to method 2000. In some embodiments, when the handwritten input is converted into font-based text, an animation is displayed of the handwritten input dissolving into particles and moving to the location where the font-based location appears similar to the animation described below with respect to method 2000 (e.g., and/or described below with respect to FIGS. 19I-19N and/or with respect to FIGS. 19O-19V).

In some embodiments, after displaying the representation of the handwritten input in the user interface (708), such as in FIG. 6C (e.g., after the handwritten input ends or after the handwritten input begins and while the user is still inputting further handwritten inputs), in accordance with a determination that the user input does not satisfy the one or more first criteria, the electronic device maintains (712) display of the representation of the handwritten input without displaying the font-based text in the text entry region, such as in FIG. 6C (e.g., if the criteria for converting text is not satisfied, do not convert the handwritten input into a font-based text). In some embodiments, the handwritten input is converted at a later time, after the criteria is satisfied (e.g., if the criteria is timing-related or further input is required to satisfy the criteria for converting text). In some embodiments, the handwritten input cannot be recognized and is not converted to computer text. In some embodiments, handwritten input that is not recognized is ignored or interpreted as a command. In some embodiments, the trail of the handwritten input remains on the display and is not removed. For example, the handwritten input is interpreted as a drawing instead of a handwritten input and thus the drawing remains displayed in the text entry region.

The above-described manner of converting handwritten inputs to text (e.g., by receiving the input at or near a text entry field and replacing the handwritten input with text if certain criteria are satisfied) allows the electronic device to provide the user with the ability to write directly onto a user interface to enter text (e.g., by accepting handwritten inputs and automatically determining the text that corresponds to the handwritten input and entering the text into the respective text entry field), which simplifies the interaction between the user and the electronic device and enhances the operability of the electronic device and makes the user-device interface more efficient (e.g., by allowing the user to handwrite text directly onto a touch screen display without requiring the user to select a respective text field and then use a keyboard (e.g., physical or virtual keyboard) to enter text into the text field), which additionally reduces power usage and improves battery life of the electronic device by enabling the user to use the electronic device more quickly and efficiency while reducing errors in the usage of the device.

In some embodiments, displaying the font-based text corresponding to the at least the portion of the representation of the handwritten input in the text entry region occurs while continuing to receive the handwritten input (714), such as in FIG. 6B (e.g., display the font-based text while still receiving handwritten input). In some embodiments, the handwritten input is converted "live" as the input is being received. In some embodiments, the conversion occurs after each word (or, optionally, after every two words, three words, four words, etc.). In some embodiments, the conversion occurs after a certain time delay. In some embodiments, the conversion occurs after some triggering event. In some embodiments, if the conversion is "live", then handwritten inputs are converted to font-based text as the user is still writing further words or letters.

The above-described manner of converting handwritten inputs to text (e.g., by displaying the font-based text while continuing to receive handwritten input) allows the electronic device to provide the user with the ability to receive instant feedback of the text that the user is writing (e.g., by accepting handwritten inputs and converting the handwritten inputs into text while the user is still continuing to provide handwritten inputs), which simplifies the interaction between the user and the electronic device and enhances the operability of the electronic device and makes the user-device interface more efficient (e.g., by allowing the user to verify that the conversion is correct without needing to wait until all of the input is converted at once or perform a separate input to trigger conversion), which additionally reduces power usage and improves battery life of the electronic device by enabling the user to use the electronic device more quickly and efficiency while reducing errors in the usage of the device.

In some embodiments, displaying the font-based text corresponding to the at least the portion of the representation of the handwritten input in the text entry region occurs in response to detecting a pause for longer than a time threshold (e.g., 0.5, 1, 2, 3, 5 seconds) in the handwritten input (716), such as in FIG. 6H (e.g., perform the conversion from handwritten input to font-based text after the user has paused handwritten input for a certain threshold of time). For example, if the user writes a certain phrase and stops writing for a threshold amount of time, then the system converts the phrase into font-based text. In some embodiments, the recognition of the text is improved by considering a string of words and converting the handwritten text after a pause provides a balance between improving text recognition and reducing the delay in converting the handwritten text.

The above-described manner of converting handwritten inputs to text (e.g., by displaying the font-based text after a pause in the handwritten input) allows the electronic device to convert handwritten text without unnecessarily distracting the user (e.g., by converting the handwritten text after the user has paused the handwritten input), which simplifies the interaction between the user and the electronic device and enhances the operability of the electronic device and makes the user-device interface more efficient (e.g., by allowing the user to complete his or her current input before performing the conversion, which reduces the chances of distracting the user, while improving the accuracy of the conversion and balances providing the user with feedback on the user's handwritten input), which additionally reduces power usage and improves battery life of the electronic device by enabling the user to use the electronic device more quickly and efficiency while reducing errors in the usage of the device.

In some embodiments, after displaying the representation of the handwritten input in the user interface, the electronic device concurrently displays (718), on the touch-sensitive display, such as in FIG. 6Q: at least the portion of the representation of the handwritten input (720), such as in FIG. 6Q; and a selectable option corresponding to the font-based text corresponding to the at least the portion of the representation of the handwritten input (724), such as in FIG. 6Q (e.g., display a pop-up or other type of dialog box with one or more selectable options which, when selected, causes the system to convert the portion of the representation of the handwritten input into font-based text. In some embodiments, the selectable option is a suggestion of the font-based text to convert the portion of the handwritten input into. In some embodiments, the pop-up is displayed when the confidence in the recognition of the handwritten input is below a certain threshold. For example, if the system is unsure of what the user's handwritten input is, the popup is able to provide the user with one or more choice of what to convert the handwritten input into. In some embodiments, if the user continues handwritten input while the popup is displayed, the suggested text in the popup continues to be updated based on the continued handwritten input. For example, the handwritten input continues to be interpreted and evaluated and the suggestion continues to be updated to reflect the new letters or words added to the handwritten input. In some embodiments, a popup is displayed for each word. In some embodiments, a popup is displayed for the entire handwritten input. In some embodiments, a popup is displayed for subsets of words of the handwritten input (e.g., two words, three words, four words, etc.).

In some embodiments, ceasing to display the at least the portion of the representation of the handwritten input and displaying the font-based text corresponding to the at least the portion of the representation of the handwritten input in the text entry region occurs in response to detecting selection of the selectable option (726), such as in FIG. 6S (e.g., the conversion occurs in response to the user selecting the selectable option). In some embodiments, if the user does not select the selectable option, then the conversion is not performed. In some embodiments, the conversion is performed at a later time (e.g., when another selectable option is presented to the user, or when other conversion criteria are satisfied). In some embodiments, if multiple suggestions of font-based text are presented to the user, then the option that the user selected is the one that is displayed.

The above-described manner of presenting a handwriting conversion option to the user (e.g., by displaying a selectable option to convert the handwritten text) allows the electronic device to present the user with the option of whether to convert the handwritten text and what to convert the handwritten text to (e.g., by converting the handwritten text when the user selects the selectable option to acknowledge the conversion), which simplifies the interaction between the user and the electronic device and enhances the operability of the electronic device and makes the user-device interface more efficient (e.g., by allowing the user to visually verify the conversion and acknowledge and/or confirm the conversion without requiring the user to verify the conversion after the conversion and then making any required edits if the conversion is incorrect), which additionally reduces power usage and improves battery life of the electronic device by enabling the user to use the electronic device more quickly and efficiency while reducing errors in the usage of the device.

In some embodiments, the text entry region comprises a text entry field (728), such as in FIG. 6G (e.g., the font-based text is entered into the text field in which the user's handwritten input is directed to). In some embodiments, the determination of which text field the user's handwritten input is directed to is based on the characteristics of the handwritten input. In some embodiments, if the handwritten input is biased in a given text field, then the font-based text is entered into the given text field. In some embodiments, if the handwritten input begins in a given text field, then the font-based text is entered into the given text field. In some embodiments, if the handwritten input ends in a given text field, then the font-based text is entered into the given text field. In some embodiments, if the handwritten input overlaps two or more text entry fields, then the font-based text is entered into the text entry field in which more of the handwritten input overlaps. In some embodiments, if the handwritten input is wholly outside of a text entry field, but is part of a sequence of words that have been determined will be input into a given text entry field, then the handwritten input that is wholly outside is entered into the given text field.

The above-described manner of entering the font-based text (e.g., by converting and entering the font-based text into a text entry field) allows the electronic device to enter the user's handwritten input into an appropriate text field (e.g., by converting the handwritten text and displaying the font-based text into a text entry field that accepts font-based text), which simplifies the interaction between the user and the electronic device and enhances the operability of the electronic device and makes the user-device interface more efficient (e.g., by entering the converted text into the appropriate text field without requiring the user to precisely provide handwriting input in the desired text entry field and without requiring the user to separately move the converted text into a text entry field after conversion), which additionally reduces power usage and improves battery life of the electronic device by enabling the user to use the electronic device more quickly and efficiency.

In some embodiments, the at least the portion of the handwritten input includes handwritten input detected inside a boundary of the text entry region and handwritten input detected outside of the boundary of the text entry region (730), such as in FIG. 6G (e.g., handwritten text that partially overlaps a given text entry region but also extends outside of the given text entry region is optionally entered into the given text entry region). In some embodiments, if the handwritten input begins in a given text field, then the font-based text is entered into the given text field. In some embodiments, if the handwritten input ends in a given text field, then the font-based text is entered into the given text field. In some embodiments, if the handwritten input overlaps two or more text entry fields, then the font-based text is entered into the text entry field in which more of the handwritten input overlaps.

The above-described manner of accepting handwritten input (e.g., by recognizing handwritten input that is both inside a text entry region and outside a text entry region as directed to the text entry region) allows the electronic device to provide the user with compatibility with natural handwriting characteristics (e.g., by accepting handwritten text that potentially extends outside of a text entry region and is not fully within a text entry region), which simplifies the interaction between the user and the electronic device and enhances the operability of the electronic device and makes the user-device interface more efficient (e.g., by accepting natural handwriting inputs that may be large and extend outside of a given text entry region without requiring the user to perfectly write within a given text entry region for the handwritten input to be accepted), which additionally reduces power usage and improves battery life of the electronic device by enabling the user to use the electronic device more quickly and efficiency.

In some embodiments, handwritten input detected within a margin of error region, larger than the text entry region and surrounding the text entry region, is eligible to be converted to font-based text in the text entry region, and handwritten input detected outside of the margin of error region is not eligible to be converted to font-based text in the text entry region (732), such as in FIG. 6B (e.g., the area in which handwritten is accepted as being directed to a given text entry region is a predetermined size larger than the text entry region (e.g., 10%, 20%, 30% larger)). In some embodiments, if part of the user's handwritten input extends beyond a given text entry region but remains within the margin of error region of the text entry region, then the entire handwritten input will be recognized as being directed to the given text entry region. In some embodiments, if the handwritten input extends beyond the margin of error region, then the handwritten input is not considered to be directed at the given text entry region. In some embodiments, if the handwritten input extends beyond the margin of error region, then the portion of the handwritten input that is within the margin of error region is processed and optionally converted while the portion of the handwritten input that is outside of the margin of error is not processed and optionally converted (optionally the portion of the handwritten input is maintained on the display).

The above-described manner of accepting handwritten input (e.g., by providing a margin of error area around a text entry region in which handwritten input is eligible to be converted to font-based text) allows the electronic device to provide the user with compatibility with natural handwriting characteristics (e.g., by accepting handwritten text that potentially extends outside of a text entry region and is not fully within a text entry region), which simplifies the interaction between the user and the electronic device and enhances the operability of the electronic device and makes the user-device interface more efficient (e.g., by accepting natural handwriting inputs that may be large and extend outside of a given text entry region without requiring the user to perfectly write within a given text entry region for the handwritten input to be accepted), which additionally reduces power usage and improves battery life of the electronic device by enabling the user to use the electronic device more quickly and efficiency.

In some embodiments, the electronic device receives (734), via the touch-sensitive display, a second user input comprising a handwritten input directed to a second text entry region in the user interface, such as in FIG. 6E (e.g., receiving a continuation of handwritten input). In some embodiments, the second user input is an input within a sequence of one or more handwritten inputs. In some embodiments, the second user input follows in quick succession after the first user input. In some embodiments, the second user input is not directed at the first text entry region. In some embodiments, the second user input is directed to a second text entry region or even no text entry region (e.g., a space on the user interface that is not associated with a text entry region such as the space between two text fields.).

In some embodiments, after receiving the second user input (736), in accordance with a determination that the second user input satisfies one or more second criteria, including a criterion that is satisfied when the second user input is detected within a time threshold of the user input, the electronic device displays (738) font-based text corresponding to the second user input in the text entry region, such as in FIG. 6H (e.g., if the second user input is received such that the system determines that it is associated with a sequence of handwritten inputs that are directed to the text entry region (e.g., within a time threshold of the previous handwritten input), then the converted text is entered into the text entry region and not the second entry region, even though the second user input is directed to the second text entry region). In some embodiments, the time threshold is 0.5 seconds, 1 second, 2 seconds, 3 seconds, 5 seconds, etc.

In some embodiments, after receiving the second user input (736), in accordance with a determination that the second user input does not satisfy the one or more second criteria, the electronic device displays (740) font-based text corresponding to the second user input in the second text entry region, such as in FIG. 6L (e.g., if the second user input is received after a threshold amount of delay, then the second user input is not considered to be associated with a sequence of handwritten inputs that is directed to the text entry region). In some embodiments, the second user input is then interpreted as being directed to the second text entry region and the converted text is entered into the second text entry region instead of the text entry region.

The above-described manner of converting handwritten input (e.g., by entering subsequent handwritten inputs into a given text entry region even if the subsequent handwritten input is directed to another text entry region) allows the electronic device to provide the user with compatibility with natural handwriting characteristics (e.g., by accepting continued handwritten text that is fully outside of a given text entry region and potentially directed to another text entry region as long as the continued handwritten text is within a certain time threshold from the previous handwritten text that is directed to the given text entry region), which simplifies the interaction between the user and the electronic device and enhances the operability of the electronic device and makes the user-device interface more efficient (e.g., by accepting natural handwriting inputs without requiring the user to pause his or her handwritten input and reposition the handwritten input to the desired text entry region or separately moving converted text from the second text entry region to the text entry region after conversion), which additionally reduces power usage and improves battery life of the electronic device by enabling the user to use the electronic device more quickly and efficiency.

In some embodiments, the one or more second criteria include a criterion that is satisfied when a majority of the second user input is directed to the text entry region rather than the second text entry region, such as in FIG. 6G, and is not satisfied when the majority of the second user input is directed to the second text entry region rather than the text entry region (742), such as in FIG. 6K (e.g., if the second (e.g., continued) handwritten input is performed more within the text entry region (e.g., with or without the margin of error), than within the second text entry region (e.g., with or without considering a space between the text entry region and the second text entry region), then the second criteria is satisfied such that the converted text of the second user input is entered into the text entry region rather than the second text entry region). In some embodiments, if the majority of the second user input is within the second entry region (e.g., with or without the margin of error), then the second criteria is not satisfied and the converted text is optionally entered into the second user input.

The above-described manner of converting handwritten input (e.g., by entering subsequent handwritten inputs into a given text entry region if a majority of the subsequent handwritten input is directed to the given text entry region rather than another text entry region) allows the electronic device to provide the user with compatibility with natural handwriting characteristics (e.g., by accepting continued handwritten text that extends outside of a given text entry region if a majority of the continued handwritten text is within the given text entry region), which simplifies the interaction between the user and the electronic device and enhances the operability of the electronic device and makes the user-device interface more efficient (e.g., by continued natural handwriting inputs without requiring the user to pause his or her handwritten input and reposition the handwritten input to the desired text entry region or separately moving converted text from the second text entry region to the text entry region after conversion), which additionally reduces power usage and improves battery life of the electronic device by enabling the user to use the electronic device more quickly and efficiency.

In some embodiments, displaying the font-based text corresponding to the at least the portion of the representation of the handwritten input in the text entry region includes (744), such as in FIGS. 6D-6E: after detecting the font-based text corresponding to the at least the portion of the representation of the handwritten input but before committing the font-based text to the text entry region, displaying the font-based text with a first value for a visual characteristic (746), such as in FIG. 6D (e.g., updating one or more visual characteristics of the handwritten input to indicate that the handwritten input has been detected as text that is able to be interpreted and converted into font-based text); and after committing the font-based text to the text entry region, displaying the font-based text with a second value, different than the first value, for the visual characteristic (748), such as in FIG. 6E (e.g., updating the one or more visual characteristics of the font-based text to indicate that the font-based text is now committed to (e.g., entered into) the text entry region). In some embodiments, updating the handwritten input comprises changing a color and/or opacity of the handwritten input. In some embodiments, alternatively or additionally, the font-based text that is displayed (e.g., after converting the handwritten input) is displayed with a particular visual characteristic (e.g., grey) to indicate that the font-based text is the tentatively proposed font-based text and will be committed (e.g., formally entered into the text entry region) after a certain time delay (e.g., 0.5 seconds, 1 second, 2 seconds, 3 seconds, 5 seconds). In some embodiments, the font-based text is updated to be black or otherwise the default color and/or size of the text entry region.

The above-described manner of displaying font-based text (e.g., by displaying the font-based text with a first visual characteristic before committing the text to the text entry field and by displaying the font-based text with a second visual characteristic after committing the text to the text entry field) allows the electronic device to provide the user with feedback on the progress of converting the user's handwritten text (e.g., by displaying the font-based text with a first visual characteristic before committing and a second visual characteristic after committing the font-based text to the text entry region), which simplifies the interaction between the user and the electronic device and enhances the operability of the electronic device and makes the user-device interface more efficient (e.g., by providing the user with visual feedback on the progress of converting handwritten input to font-based text), which additionally reduces power usage and improves battery life of the electronic device by enabling the user to use the electronic device more quickly and efficiency.

In some embodiments, displaying the font-based text corresponding to the at least the portion of the representation of the handwritten input in the text entry region includes (750), such as in FIGS. 6D and 6H: in accordance with a determination that the detection of the font-based text has a first confidence level, displaying the font-based text with a first value for a respective visual characteristic (752), such as in FIG. 6D (e.g., based on the level of confidence of the interpretation of the handwritten input, displaying the font-based text with a particular color or opacity); and in accordance with a determination that the detection of the font-based text has a second confidence level, different than the first confidence level, displaying the font-based text with a second value, different than the first value, for the respective visual characteristic (754), such as in FIG. 6H (e.g., if the system does not have a high confidence in the conversion of the handwritten input (e.g., if the handwritten input is sloppy or otherwise difficult to interpret), then display the font-based text with a different visual characteristic than when the system has a high confidence in the interpretation). For example, if the system has high confidence in the conversion of the handwritten input into a given font-based text, then the font-based text is displayed with black color. For example, if the system has a low confidence, then the font-based text is displayed with a grey or red color.

The above-described manner of providing visual feedback (e.g., by displaying the font-based text with a first visual characteristic if the confidence in the interpretation and conversion is at a first level and by displaying the font-based text with a second visual characteristic if the confidence in the interpretation and conversion is at a second level) allows the electronic device to provide the user with visual feedback of the confidence and/or accuracy of the conversion, which simplifies the interaction between the user and the electronic device and enhances the operability of the electronic device and makes the user-device interface more efficient (e.g., by providing the user with a visual cue of the confidence level of the conversion of the user's handwritten user input, thus providing the user with an indication of whether to confirm that the conversion is accurate), which additionally reduces power usage and improves battery life of the electronic device by enabling the user to use the electronic device more quickly and efficiency, while reducing errors in the usage of the device.

In some embodiments, displaying the font-based text corresponding to the at least the portion of the representation of the handwritten input in the text entry region includes (756), such as in FIG. 6S: in accordance with a determination that the detection of the font-based text has a first confidence level, displaying the font-based text at a first location in the text entry region (758), such as in FIG. 6S (e.g., based on the confidence level of the conversion, the font-based text is displayed at different locations in the text entry region); and in accordance with a determination that the detection of the font-based text has a second confidence level, different than the first confidence level, displaying the font-based text at a second location, different than the first location, in the text entry region (760), such as in FIG. 6S (e.g., if the confidence level of the conversion is low, then the font-based text is optionally left in the same position as the original handwritten input). For example, if the confidence in the conversion is high, then the font-based text is moved to be left-aligned in the text entry region (e.g., if the text entry region is empty) or otherwise aligned with other text in the text entry region. In some embodiments, if the confidence level of the conversion is low, the handwritten input is converted and left in the same position to allow the user to verify whether the conversion is accurate before aligning the text with other text in the text entry region (e.g., or left-aligning the text if the text entry region is empty). In some embodiments, a separate user input is required to confirm or otherwise accept the font-based text that has a low confidence.

The above-described manner of displaying font-based text (e.g., by displaying the font-based text at a location based on the confidence level of the conversion of the text from handwritten input) allows the electronic device to provide the user with visual feedback of the confidence and/or accuracy of the conversion, which simplifies the interaction between the user and the electronic device and enhances the operability of the electronic device and makes the user-device interface more efficient (e.g., by providing the user with a visual cue of the confidence level of the conversion of the user's handwritten user input by not moving the font-based text into its final location, thus providing the user with an indication of whether to confirm that the conversion is accurate), which additionally reduces power usage and improves battery life of the electronic device by enabling the user to use the electronic device more quickly and efficiency, while reducing errors in the usage of the device.

In some embodiments, such as in FIGS. 6A-6RR, the one or more first criteria include (762) one or more criteria that are satisfied based on timing characteristics of the handwritten input (e.g., convert the text after handwritten input ceases for a predetermined period of time), context associated with the handwritten input (e.g., if no further letters can be added to a word that the user has written, then convert the word into font-based text), punctuation in the handwritten input (e.g., if the user writes a punctuation mark such as a period, then convert the text that has been written up to and including the punctuation mark), distance of a stylus from the touch-sensitive display (e.g., if the user places the stylus down or moves the stylus a threshold distance away from the device (e.g., 6 inches, 12 inches, 2 feet, etc.), then convert the handwritten input that has been inputted so far), input directed to a second text entry region in the user interface (e.g., if the user begins inputting text in another text entry region, then convert the handwritten text that has been entered into the first text entry region), input scrolling the user interface (e.g., if the user interacts with the user interface to scroll or otherwise navigate around the user interface, then convert the handwritten input that has been inputted so far), angle of a stylus (e.g., if the user points the stylus away from the device, then convert the handwritten input that has been inputted so far), distance of the handwritten input from an edge of the text entry region (e.g., convert text faster as the user reaches the end of a text entry region to free up space for the user to perform more handwritten input), a gesture detected on a stylus (e.g., detecting a user input tapping on the stylus causes conversion of handwritten input that has been inputted so far), or input from a finger detected on the touch-sensitive display (e.g., receiving a user input from a finger instead of the stylus, then convert the handwritten text that was entered by the stylus before the user input from the finger).

The above-described manner of converting handwritten input (e.g., by converting the handwritten text based on a number of different factors) allows the electronic device to select the most appropriate time to convert handwritten text based on the situation (e.g., by converting text based on timing of the input, context, punctuation, distance and angle of the stylus, inputs interacting with other elements, etc.), which simplifies the interaction between the user and the electronic device and enhances the operability of the electronic device and makes the user-device interface more efficient (e.g., by converting text at a time that is least intrusive to the user while balancing the speed to convert the text), which additionally reduces power usage and improves battery life of the electronic device by enabling the user to use the electronic device more quickly and efficiency.

In some embodiments, while receiving the user input, in accordance with a determination that one or more second criteria are satisfied, the electronic device moves (764) at least a portion of the representation of the handwritten input in the user interface to reveal space in the user interface for receiving additional handwritten input, such as in FIG. 6N (e.g., while receiving the handwritten user input, move the handwritten user input to provide room in the text entry region for the user to continue providing further handwritten input). For example, as the handwritten user input is received, scroll the previously provided handwritten input to the left. In some embodiments, as a result of the scrolling, the user is able to continue to write in the same location or only shift his or her writing rightwards slightly. In some embodiments, the text that is scrolled to the left scrolls beyond the boundary of the text entry region, in which case the text is displayed above the text entry region (e.g., scrolls beyond the text entry region and is not hidden from display) or behind the text entry region (e.g., scrolls beyond the text entry region but any text that is beyond the boundary of the text entry region is displayed as hidden by the boundary of the text entry region).

The above-described manner of receiving handwritten input (e.g., by moving previous handwritten input as handwritten input is received to provide room for more handwritten input) allows the electronic device to provide the user with space to provide handwritten input (e.g., by spatially moving previously inputted handwritten input to provide room for receiving further handwritten input), which simplifies the interaction between the user and the electronic device and enhances the operability of the electronic device and makes the user-device interface more efficient (e.g., by allowing the user to continue providing handwritten input without having to reset the location of the user's input to ensure that it stays within the text entry region), which additionally reduces power usage and improves battery life of the electronic device by enabling the user to use the electronic device more quickly and efficiency.

In some embodiments, while receiving the user input, in accordance with a determination that one or more third criteria are satisfied, the electronic device expands (766) a boundary of the text entry region to create space in the text entry region for receiving additional handwritten input, such as in FIG. 6J (e.g., expanding the text entry region horizontally and/or vertically as the user reaches the boundary of the text entry region to provide space for the user to continue to input handwritten input). In some embodiments, the text entry region expands into the region of another text entry region in which case the text entry region will cover or otherwise be displayed above the other text entry region. In some embodiments, after the user completes handwritten input and/or the handwritten input is converted to font-based text, the text entry region will contract back to its original size.

The above-described manner of receiving handwritten input (e.g., by expanding the size of the text entry region) allows the electronic device to provide the user with space to provide handwritten input (e.g., by expanding the text entry region horizontally and/or vertical when the user begins to reach the boundary of the text entry region to provide room for receiving further handwritten input), which simplifies the interaction between the user and the electronic device and enhances the operability of the electronic device and makes the user-device interface more efficient (e.g., by allowing the user to continue providing handwritten input into the text entry region), which additionally reduces power usage and improves battery life of the electronic device by enabling the user to use the electronic device more quickly and efficiency.

In some embodiments, expanding the boundary of the text entry region, such as in FIG. 6J, includes (768), in accordance with a determination that the text entry region is at a first location in the user interface, expanding a first boundary of the text entry region (770), such as in FIG. 6J (e.g., if the text entry region is at a certain predefined location on the touch screen, such as the lower third of the touch screen, then expand the text entry region vertically upwards) In some embodiments, expanding the text entry region vertically upwards allows the user to provide handwritten input at a more comfortable or natural handwriting location. For example, writing at the bottom third of the touch screen is potentially awkward or uncomfortable and expanding the text entry region vertically upwards allows the user to avoid the awkward or uncomfortable handwriting location.

In some embodiments, expanding the boundary of the text entry region, such as in FIG. 6K, includes (768), in accordance with a determination that the text entry region is at a second location, different than the first location, in the user interface, expanding a second boundary of the text entry region without expanding the first boundary of the text entry region (772), such as in FIG. 6K (e.g., if the text entry region is not at the predefined location on the touch screen, such as the lower third of the touch screen, then do not expand the text entry region vertically upwards). In some embodiments, the text entry region expands vertically downwards and/or horizontally rightwards to provide a natural expansion of the space for handwriting (e.g., the natural handwriting progression is left-to-right and top-to-bottom, so the natural expansion of the text entry region is horizontally to the right and vertically downwards, as opposed to expanding vertically upwards when the text entry region is in the bottom third of the touch screen).

The above-described manner of receiving handwritten input (e.g., by expanding the boundaries of the text entry region based on the location of the text entry region on the screen) allows the electronic device to provide the user with space to provide handwritten input (e.g., by moving a respective boundary of the text entry region based on the location of the text entry region to provide the most natural location to perform handwritten input), which simplifies the interaction between the user and the electronic device and enhances the operability of the electronic device and makes the user-device interface more efficient (e.g., by providing the user with space in which to comfortably and naturally perform handwritten input without requiring the user to write in an awkward location), which additionally reduces power usage and improves battery life of the electronic device by enabling the user to use the electronic device more quickly and efficiency.

In some embodiments, displaying the representation of the handwritten input in the user interface while receiving the user input includes displaying an animation of one or more visual characteristics of the representation of the handwritten input changing as a function of elapsed time since the corresponding handwritten input was received (774), such as in FIG. 6D (e.g., displaying an animation of the handwritten input as it is received). For example, the handwritten input is displayed similarly to ink writing and the animation appears as if the ink writing is drying over time. In some embodiments, the color and/or opacity of the handwritten input changes to reach the final color and/or opacity level. In some embodiments, the animation of the visual characteristics (e.g., ink drying) is similar to or shares similar features as the conversion of handwritten input into font-based text described below with respect to method 2000 (e.g., the handwritten input changing to grey).

The above-described manner of displaying handwritten input (e.g., by changing the visual characteristics of the handwritten input over time) allows the electronic device to provide the user with a visual cue of how long since the handwritten input has been received and how long the handwritten input has been processed (e.g., by displaying an animation of the handwritten input changing visual characteristics based on how the time since receiving the handwritten input), which simplifies the interaction between the user and the electronic device and enhances the operability of the electronic device and makes the user-device interface more efficient (e.g., by providing the user with a visual indication of the elapsed time since the handwritten input was received), which additionally reduces power usage and improves battery life of the electronic device by enabling the user to use the electronic device more quickly and efficiency.

In some embodiments, ceasing to display the at least the portion of the representation of the handwritten input and displaying the font-based text corresponding to the at least the portion of the representation of the handwritten input in the text entry region includes displaying an animation of the representation of the handwritten input morphing into the font-based text (776), such as in FIG. 6D (e.g., animating the conversion of the handwritten input into the font-based text). In some embodiments, the handwritten input changes shape and size to result in the font-based text. In some embodiments, the animation includes changing the size, shape, color, and/or opacity of the handwritten input. In some embodiments, the handwritten input appears to be disassembled and re-assembled into the font-based text (e.g., disassembled and reassembled in large pieces, small pieces, particles, atomizing, any combination of the aforementioned, etc., such as described below with respect to method 2000). In some embodiments, the handwritten input fades away and font-based text fades in. In some embodiments, during the animation, the font-based text is displayed on the display at the same time as the handwritten input (e.g., the font-based text is being displayed on the display as the handwritten input is removed from display such that at some point in time, both the font-based text and the handwritten input is displayed on the display at the same time). In some embodiments, the animation of the handwritten input morphing into the font-based text is similar to or shares similar features as the conversion of handwritten input into font-based text described below with respect to method 2000

(e.g., the handwritten input dissolving into particles and moving toward the location of where the font-based text appears).

The above-described manner of displaying handwritten input (e.g., by displaying an animation of the handwritten input morphing into the font-based text) allows the electronic device to provide the user with a visual cue that the handwritten input is converted into the font-based text (e.g., by displaying an animation of the handwritten input morphing into the font-based text), which simplifies the interaction between the user and the electronic device and enhances the operability of the electronic device and makes the user-device interface more efficient (e.g., by providing the user with a visual indication that it is the user's handwritten input that is being processed, interpreted, and converted into the font-based text), which additionally reduces power usage and improves battery life of the electronic device by enabling the user to use the electronic device more quickly and efficiency.

In some embodiments, the at least the portion of the handwritten input corresponds to font-based text that includes a typographical error, and displaying the font-based text corresponding to the at least the portion of the representation of the handwritten input in the text entry region includes displaying the font-based text with the typographical error having been corrected (778), such as in FIG. 6H (e.g., in some embodiments if the handwritten input includes a typographical error in which the system is able to determine the proper input, then the process of converting the handwritten text into font-based text automatically also corrects the typographical error). In some embodiments, the automatic correction of the conversion is performed if the confidence of what the correct input is above a certain threshold confidence level (e.g., a high confidence level).

The above-described manner of converting handwritten input (e.g., by removing typographical errors when converting handwritten input to font-based text) allows the electronic device to automatically provide the user with an error-free font-based text (e.g., by automatically removing typographical errors when converting handwritten input to font-based text), which simplifies the interaction between the user and the electronic device and enhances the operability of the electronic device and makes the user-device interface more efficient (e.g., by automatically removing typographical errors for the user without requiring the user to separately determine whether a typographical error exists and to perform additional inputs to edit the font-based text and remove the typographical error), which additionally reduces power usage and improves battery life of the electronic device by enabling the user to use the electronic device more quickly and efficiency.

In some embodiments, after displaying the representation of the handwritten input in the user interface (780), in accordance with the determination that the user input satisfies one or more first criteria (782), the electronic device transmits (784) the font-based text corresponding to the at least the portion of the representation of the handwritten input to a second electronic device, separate from the electronic device, such as in FIG. 6UU (e.g., if the device is controlling a second electronic device (e.g., wirelessly or wired) and the second electronic device is requested text input, then after converting the handwritten input to font-based text, the text is transferred to the second electronic device to fulfill the text input request). For example, if the second electronic device is a set-top box and the user has requested a search user interface on the second electronic device, the user is able to use the electronic device to remotely transmit text into the search field on the search user interface of the second electronic device.

The above-described manner of transmitting text to a second electronic device (e.g., by receiving handwritten input on the electronic device, converting it into font-based text, and transmitting the font-based text to the second electronic device) allows the electronic device to provide the user with a handwritten entry method of entering text on a second electronic device (e.g., by receiving handwritten input from the user, converting the handwritten input to font-based text and transmitting text to the second electronic device), which simplifies the interaction between the user and the electronic device and enhances the operability of the electronic device and makes the user-device interface more efficient (e.g., by accepting the user's handwritten input and transmitting the font-based text to the second electronic device without requiring the user to use a virtual keyboard or use a traditional remote control to enter text on the second electronic device), which additionally reduces power usage and improves battery life of the electronic device by enabling the user to use the electronic device more quickly and efficiency.

In some embodiments, the second electronic device is displaying a user interface that includes one or more respective text entry regions, including a respective text entry region that corresponds to the text entry region displayed by the electronic device (786), such as in FIG. 6SS (e.g., the second electronic device is displaying one or more text entry regions).

In some embodiments, the electronic device detects, at the electronic device, the one or more respective text entry regions displayed by the second electronic device (788), such as in FIG. 6VV. In some embodiments, in response to detecting the one or more respective text entry regions displayed by the second electronic device, the electronic device displays (790), in the user interface, one or more text entry regions, including the text entry region, corresponding to the one or more respective text entry regions, such as in FIG. 6VV (e.g., extracting the text entry regions from the user interface of the second electronic device and displaying them on the electronic device). In some embodiments, the electronic device mirrors the user interface of the second electronic device including any labels, text, graphics, etc. such that the electronic device displays the same user interface as the second electronic device. In some embodiments, the electronic device does not mirror the user interface of the second electronic device, but rather only displays parts of the elements of the user interface of the second electronic device (e.g., displays the text fields and text field labels from the user interface of the second electronic device, and not other elements of the user interface of the second electronic device).

In some embodiments, transmitting the font-based text corresponding to the at least the portion of the representation of the handwritten input to the second electronic device includes transmitting the font-based text to the respective text entry region on the second electronic device (792), such as in FIG. 6YY (e.g., the electronic device receives handwritten input directed to a respective text entry region and after the handwritten input is converted to font-based text, the font-based text is transmitted to the second electronic device to be entered into the corresponding text entry region on the user interface of the second electronic device).

The above-described manner of transmitting text to a second electronic device (e.g., by displaying the same text entry regions on the electronic device as is being displayed on the second electronic device) allows the electronic device to provide the user with an intuitive interface by which to transmit text to the second electronic device (e.g., by mirroring the user interface of the second electronic device to the electronic device and transmitting text from the electronic device to the appropriate text entry region on the second electronic device), which simplifies the interaction between the user and the electronic device and enhances the operability of the electronic device and makes the user-device interface more efficient (e.g., by providing the same user interface on the electronic device as is shown on the first electronic device so that the user can easily and intuitively select which text entry region to enter text into, without requiring the user to perform additional inputs or use a traditional remote control to select which text entry region to enter text into), which additionally reduces power usage and improves battery life of the electronic device by enabling the user to use the electronic device more quickly and efficiency.

In some embodiments, the text entry region is a multi-line text entry region, and the font-based text corresponding to the at least the portion of the representation of the handwritten input is displayed in a first line of the multi-line text entry region (794), such as in Fig. AA (e.g., the text entry region supports multiple lines of text).

In some embodiments, while displaying the font-based text corresponding to the at least the portion of the representation of the handwritten input in the first line of the multi-line text entry region, the electronic device receives (796), via the touch-sensitive display, a second user input comprising a handwritten input directed to the first text entry region, such as in FIG. 6DD (e.g., after detecting handwritten inputs directed to the text entry region, receiving a second input directed to the text entry region). In some embodiments, the second input corresponds to a request to insert a second line below the previous handwritten input. In some embodiments, the request to insert a second line includes a tap below the previous handwritten input. In some embodiments, the request includes receiving further handwritten input below the previous handwritten input. In some embodiments, the request includes selecting a selectable option to create a second line. In some embodiments, creating the second line includes vertically expanding the size of the text entry region.

In some embodiments, after receiving the second user input (798), in accordance with a determination that one or more second criteria are satisfied, the electronic device displays (798-2) font-based text corresponding to the second user input in a second line, different than the first line, of the multi-line text entry region, such as in FIG. 6LL (e.g., converting the handwritten input of the second user input and entering the converted text into a second line of the text entry region (e.g., the line below the previous line of handwritten text)). In some embodiments, the one or more second criteria are satisfied when the second user input includes a tap in the space below the previous line of handwritten text, includes a selection of a selectable option to create a new line, and/or includes handwritten input that is a threshold distance below the previous line of handwritten text (e.g., 6 points, 12 points, 18 points, 24 points, etc.).

In some embodiments, after receiving the second user input (798), in accordance with a determination that one or more second criteria are satisfied, in accordance with a determination that the one or more second criteria are not satisfied, the electronic device displays (798-4) the font-based text corresponding to the second user input in the first line of the multi-line text entry region, such as in FIG. 6EE (e.g., if the second user input does not reflect an input to enter text in a second line, then enter the font-based text into the same line as the previous line of handwritten text). For example, if the user continues handwritten input slightly below the previous line, but not far enough below the previous line, such that the second user input should be input into the previous line (e.g., it appears as if the user intended to continue writing on the previous line), then the converted text will continue to be inputted into the previous line.

The above-described manner of entering handwritten text (e.g., by entering the text into a second line of a text entry region that supports multiple lines of text when the user input indicates a request to enter text in a second line) allows the electronic device to provide the user with an intuitive method of entering multi-line text (e.g., by entering text in a second line of the text entry region if certain criteria for the handwritten input are met), which simplifies the interaction between the user and the electronic device and enhances the operability of the electronic device and makes the user-device interface more efficient (e.g., by determining whether a new line should be created and entering text into the new line, without requiring the user to perform additional user inputs or wait until after the handwritten text is converted to manually edit the font-based text to insert line breaks at the desired locations), which additionally reduces power usage and improves battery life of the electronic device by enabling the user to use the electronic device more quickly and efficiency.

In some embodiments, the one or more second criteria are satisfied when the second user input is detected more than a threshold distance below the user input (e.g., 6 points, 12 points, 18 points, 20 points, 24 points, etc.), and the one or more second criteria are not satisfied when the second user input is detected less than the threshold distance below the user input (798-6), such as in FIGS. 6EE-6FF (e.g., if the second user input is more than a threshold distance below the previous handwritten text, then the second user input indicates a request to insert text in a second line (e.g., below the previous line of handwritten text)). In some embodiments, if the second user input is not more than a threshold distance below the previous handwritten text, then the second user input indicates a request to continue inserting text in the previous line of text.

The above-described manner of entering multi-lined handwritten text (e.g., by entering the text into a second line of a text entry region when a user input is received that is more than a threshold distance below the previous line of text indicating a request to enter text in a second line) allows the electronic device to provide the user with an intuitive method of entering multi-line text (e.g., by accepting handwritten text below the previous line of text and interpreting the input as a request to enter the handwritten text into a line below the previous line of text), which simplifies the interaction between the user and the electronic device and enhances the operability of the electronic device and makes the user-device interface more efficient (e.g., by entering text into a new line when handwritten text is received a threshold distance below the previous line of text, without requiring the user to perform additional user inputs or wait until after the handwritten text is converted to manually edit the font-based text to insert line breaks at the desired locations), which additionally reduces power usage and improves battery life of the electronic device by enabling the user to use the electronic device more quickly and efficiency.

In some embodiments, the one or more second criteria are satisfied when the second user input includes a stylus input detected at the second line in the multi-line text entry region, and the one or more second criteria are not satisfied when the second user input does not include a stylus input detected at the second line in the multi-line text entry region (798-8), such as in FIG. 6FF (e.g., if the second user input includes a tap, a long press, or an input above a certain force threshold at a location below the previous line of text, then the second user input is interpreted to include a request to insert a second line of text below the previous line of text.).

The above-described manner of entering multi-lined handwritten text (e.g., by receiving a tap at a second line indicating a request to enter text in a second line and inserting the text into a second line of a text entry region) allows the electronic device to provide the user with an intuitive method of entering multi-line text (e.g., by accepting a gestural input below the previous line of text and interpreting the input as a request to enter the handwritten text into a line below the previous line of text), which simplifies the interaction between the user and the electronic device and enhances the operability of the electronic device and makes the user-device interface more efficient (e.g., by entering text into a new line when receiving a tap below the previous line of text, without requiring the user to perform additional user inputs or wait until after the handwritten text is converted to manually edit the font-based text to insert line breaks at the desired locations), which additionally reduces power usage and improves battery life of the electronic device by enabling the user to use the electronic device more quickly and efficiency.

In some embodiments, a selectable option for moving to the second line is displayed concurrently with the font-based text corresponding to the at least the portion of the representation of the handwritten input, the one or more second criteria are satisfied when the selectable option has been selected, and the one or more second criteria are not satisfied when the selectable option has not been selected (798-10), such as in FIG. 6BB (e.g., receiving a user input selecting a selectable option for inserting a new line of text) In some embodiments, the selectable option is displayed or otherwise presented in response to receiving a tap input or other indication of a request to insert a new line of text. In some embodiments, in response to receiving the user input selecting the selectable option for inserting a new line of text, font-based text is inserted into a new line of text below the previous line of text.

The above-described manner of entering multi-lined handwritten text (e.g., by receiving a selection on a selectable option for inserting a new line of text below the previous line of text) allows the electronic device to provide the user with an easy method of entering multi-line text (e.g., by providing a selectable option that is selectable to insert handwritten text into a line below the previous line of text), which simplifies the interaction between the user and the electronic device and enhances the operability of the electronic device and makes the user-device interface more efficient (e.g., by providing a selectable option to enter a new line of text and entering text into a new line in response to receiving a selection of the selectable option, without requiring the user to manually edit the font-based text to insert line breaks at the desired locations after the handwritten text has been converted into font-based text), which additionally reduces power usage and improves battery life of the electronic device by enabling the user to use the electronic device more quickly and efficiency.

In some embodiments, the electronic device receives (798-12), via the touch-sensitive display, a second user input, such as in FIG. 6B. In some embodiments, in response to receiving the second user input (798-14), in accordance with a determination that the second user input is detected in a region of the user interface corresponding to a respective text entry region, the electronic device performs (798-16) a handwritten input operation in the respective text entry region based on the second user input, such as in FIG. 6C (e.g., if the user input is directed to a text entry region, then interpret the user input as a handwritten input or otherwise a request to enter text in the text entry region). In some embodiments, in response to receiving the user input directed to a text entry region, then accept the input as a handwritten input.

In some embodiments, in response to receiving the second user input (798-14), in accordance with a determination that the second user input is detected in a region of the user interface not corresponding to a text entry region, the electronic device performs (798-18) a scrolling operation in the user interface based on the second user input, such as in FIG. 6Y (e.g., if the user input is not directed to a text entry region, then do not interpret the user input as a request to insert text). For example, if the user interacts with another user element that is not a text entry region, then do not perform handwritten conversion processes. In some embodiments, for example, if the user performs a scrolling or other type of navigation gesture, then perform the navigation according to the user input instead of inserting font-based text based on handwritten input.

The above-described manner of interpreting user input (e.g., by interpreting input as handwritten text when it is received in a text entry region, but not interpreting the input as handwritten text if it is not received in a text entry region) allows the electronic device to provide the user with an easy method of entering text (e.g., by allowing the user to interact with the device in a non-text-method if the input does not indicate a request to enter text but also accepting handwritten input if the input indicates a request to enter text), which simplifies the interaction between the user and the electronic device and enhances the operability of the electronic device and makes the user-device interface more efficient (e.g., by automatically determining whether the user is request to enter text or to otherwise interact with the user interface without requiring the user to perform additional inputs to switch to text-entry mode or to interact with a separate user interface or use a separate device to enter text), which additionally reduces power usage and improves battery life of the electronic device by enabling the user to use the electronic device more quickly and efficiency.

In some embodiments, the animation of the representation of the handwritten input morphing into the font-based text includes (798-20): in accordance with a determination that the text entry region does not yet include font-based text, animating the representation of the handwritten input morphing (e.g., directly) into font-based text at a final location in the text entry region and at a final size at which the font-based text is going to be displayed (798-22), such as in FIG. 6E (e.g., if the text entry region does not have any font-based text (or the line in which the handwritten input is directed to does not have any text), then the animation is of the handwritten text concurrently changing size and shape into the font-based text and moving to the final location of the font-based text (e.g., left-aligned in the text entry region)). Thus, in some embodiments, the animation is performed in one step. In some embodiments, the animation of the handwritten input morphing into the font-based text is similar to or shares similar features as the conversion of handwritten input into font-based text described below with respect to method 2000. In some embodiments, if the text entry region does have font-based text, then the animation is of the handwritten text changing shape into the font-based text and then changing size to match the size of the pre-existing font-based text.

The above-described manner of converting handwritten inputs to text (e.g., by displaying an animation of the handwritten input concurrently changing to the final size of the font-based text and moving to the final location) allows the electronic device to provide the user with a visual cue that the handwritten input is converted into the font-based text (e.g., by displaying an animation of the handwritten input morphing into the font-based text in one step), which simplifies the interaction between the user and the electronic device and enhances the operability of the electronic device and makes the user-device interface more efficient (e.g., by providing the user with a visual indication that it is the user's handwritten input that is being processed, interpreted, and converted into the font-based text), which additionally reduces power usage and improves battery life of the electronic device by enabling the user to use the electronic device more quickly and efficiency while reducing errors in the usage of the device.

In some embodiments, the animation of the representation of the handwritten input morphing into the font-based text includes (798-24): in accordance with a determination that the text entry region does not yet include font-based text, animating the representation of the handwritten input morphing into font-based text at an intermediate size based on a size of the representation of the handwritten input, and subsequently animating the font-based text at the intermediate size morphing into font-based text at a final location in the text entry region and at a final size, different than the intermediate size, at which the font-based text is going to be displayed (798-26), such as in FIG. 6E (e.g., if the text entry region does not have any font-based text (or the line in which the handwritten input is directed to does not have any text), then the animation is of the handwritten text first changing shape into the font-based text and changing size to a size between the final size and the original handwritten size (e.g., and optionally remains in the same location as the original handwritten input)). In some embodiments, after changing shape into the font-based text, the animation continues and changes the text into the final size and moves the text to the final location of the font-based text (e.g., left-aligned in the text entry region). Thus, in some embodiments, the animation is performed in two steps. In some embodiments, the animation of the handwritten input morphing into the font-based text is similar to or shares similar features as the conversion of handwritten input into font-based text described below with respect to method 2000. For example, in some embodiments, a first animation similar to the animation described in method 2000 is performed converting the handwritten input into font-based text of the same size as the handwritten input and after the first animation, a second animation is performed (e.g., optionally similar to the animation described in method 2000) morphing the size of the resulting font-based text into the final size of the font-based text (e.g., from 36 font size, to 12 font size, from 24 font size to 12 font size, etc.).

The above-described manner of converting handwritten inputs to text (e.g., by displaying an animation of the handwritten input first converting into a font-based text with an intermediate size (between the final size and the size of the handwritten input) and then converting from the intermediate size into the final size while moving to the final location) allows the electronic device to provide the user with a visual cue that the handwritten input is converted into the font-based text (e.g., by displaying an animation of the handwritten input morphing into the font-based text in two steps to emphasize that the process is both converting the handwritten input into font-based text and resizing and moving the font-based text into the proper size and position), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency while reducing errors in the usage of the device.

In some embodiments, the animation of the representation of the handwritten input morphing into the font-based text includes (798-28): in accordance with a determination that the text entry region does include previously-entered font-based text (e.g., font-based text that is displayed in the text entry region before the handwritten input is converted to font-based text (e.g., the font-based text corresponding to the handwritten input will be added to the pre-existing font-based text in the text entry region)), animating the representation of the handwritten input morphing into font-based text at an intermediate size based on a size of the representation of the handwritten input, and subsequently animating the font-based text at the intermediate size morphing into font-based text at a final location in the text entry region and at a final size, different than the intermediate size, at which the font-based text is going to be displayed, wherein the final size of the font-based text corresponding to the handwritten input is the same as a size of the previously-entered font-based text (798-30), such as in FIG. 6H (e.g., if the text entry region has pre-existing font-based text (or the line in which the handwritten input is directed to has pre-existing text), then the animation is of the handwritten text first changing shape into the font-based text and changing size to a size between the size of the pre-existing text and the original handwritten size (e.g., and optionally remains in the same location as the original handwritten input)). In some embodiments, after changing shape into the font-based text, the animation continues and changes the text into the final size (e.g., the same size as the pre-existing text) and moves the text to the final location of the font-based text (e.g., left-aligned with the pre-existing text). Thus, in some embodiments, the animation is performed in two steps and matches the font format of the pre-existing text. In some embodiments, the animation of the handwritten input morphing into the font-based text is similar to or shares similar features as the conversion of handwritten input into font-based text described below with respect to method 2000. For example, in some embodiments, a first animation similar to the animation described in method 2000 is performed converting the handwritten input into font-based text of an intermediate size and after the first animation, a second animation is performed (e.g., optionally similar to the animation described in method 2000) morphing the size of the resulting font-based text from the intermediate size to the final size of the font-based text (e.g., from the handwritten input's effective 36 font size to font-based text at 24 font size and then to 12 font size).

The above-described manner of converting handwritten inputs to text (e.g., by displaying an animation of the handwritten input first converting into a font-based text with an intermediate size (between the final size and the size of the handwritten input) and then converting from the intermediate size into the same size as any pre-existing text while moving to the final location (e.g. aligned with the pre-existing text)) allows the electronic device to provide the user with a visual cue that the handwritten input is converted into the font-based text (e.g., by displaying an animation of the handwritten input morphing into the font-based text in two steps to emphasize that the process is both converting the handwritten input into font-based text and resizing and moving the font-based text into the proper size and position), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency while reducing errors in the usage of the device.

It should be understood that the particular order in which the operations in FIGS. 7A-7I have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, 1300, 1500, 1600, 1800, 2000, and 2200) are also applicable in an analogous manner to method 700 described above with respect to FIGS. 7A-7I. For example, the operation of the electronic device converting handwritten inputs into font-based text described above with reference to method 700 optionally have one or more of the characteristics of the selection and deletion of text, inserting handwritten inputs into pre-existing text, managing the timing of converting handwritten text into font-based text, presenting handwritten entry menus, controlling the characteristics of handwritten input, presenting autocomplete suggestions, and converting handwritten input to font-based text, displaying options in a content entry palette, etc., described herein with reference to other methods described herein (e.g., methods 900, 1100, 1300, 1500, 1600, 1800, 2000, and 2200). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 7A-7I are, optionally, implemented by components depicted in FIGS. 1A-1B. For example, displaying operations 702, 706, 710, 712, 714, 716, 718, 738, 740, 744, 746, 748, 750, 752, 754, 756, 758, 760, 774, 776, 778, 790, 798-2, and 798-4, and receiving operations 704, 734, 796, and 798-12, are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Selecting and Deleting Text Using a Stylus

Users interact with electronic devices in many different manners, including entering text into the electronic device. In some embodiments, an electronic device displays text in a text field or a text region. The embodiments described below provide ways in which an electronic device selects and/or deletes text using a handwriting input device (e.g., a stylus). Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 8A:
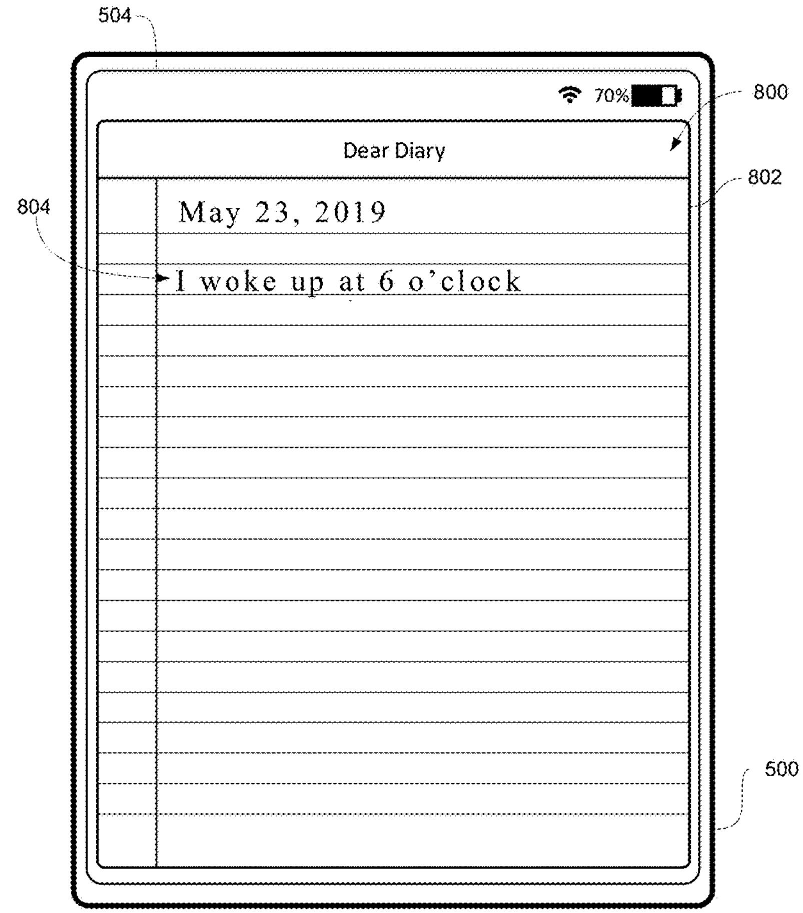
FIGS. 8A-8MM illustrate exemplary ways in which an electronic device interprets handwritten inputs to select or delete text in accordance with some embodiments.

FIGS. 8A-81I illustrate exemplary ways in which an electronic device interprets handwritten inputs to select or delete text. The embodiments in these figures are used to illustrate the processes described below, including the processes described with reference to FIGS. 9A-9G.

FIG. 8A illustrates an exemplary device 500 that includes touch screen 504. In FIG. 8A, device 500 is displaying user interface 800 corresponding to a note taking application. In some embodiments, user interface 800 includes a text entry region 802 in which a user is able to enter multiple lines of text. In some embodiments, text entry region 802 includes one or more pre-existing text 804. In some embodiments, pre-existing text 804 was previously entered as handwritten inputs and converted into font-based text. In some embodiments, pre-existing text 804 was entered using a soft keyboard (e.g., by the user or another user, on this device or another device).

Figure 8C:
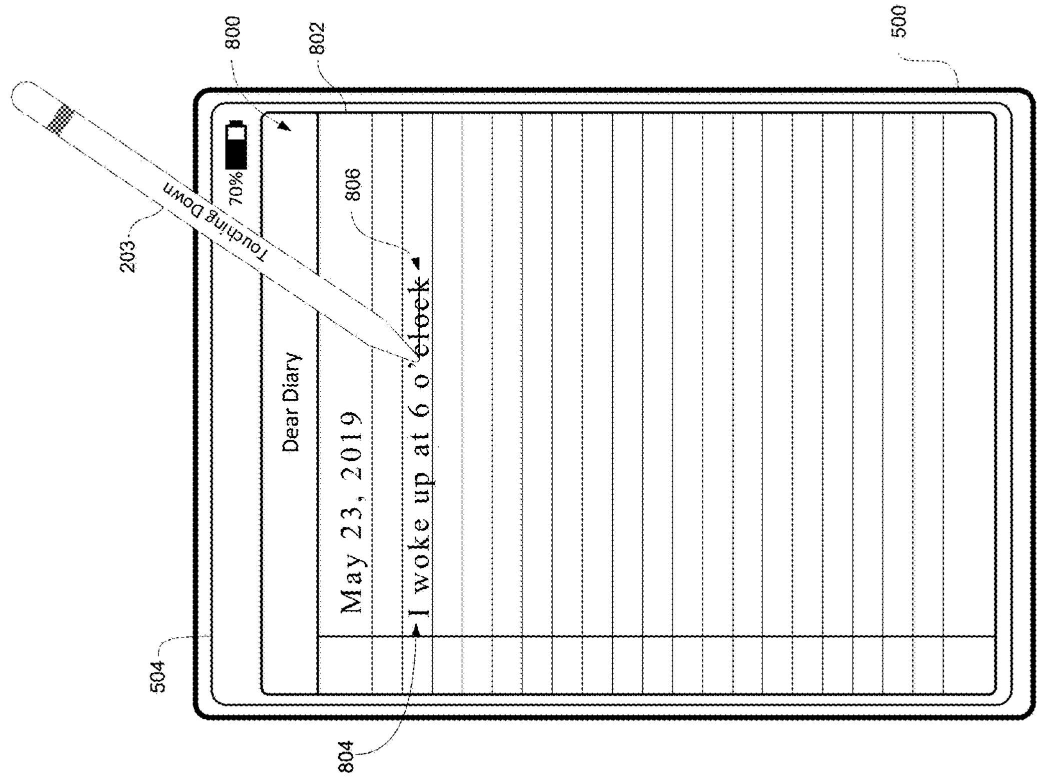
Figure 8B:
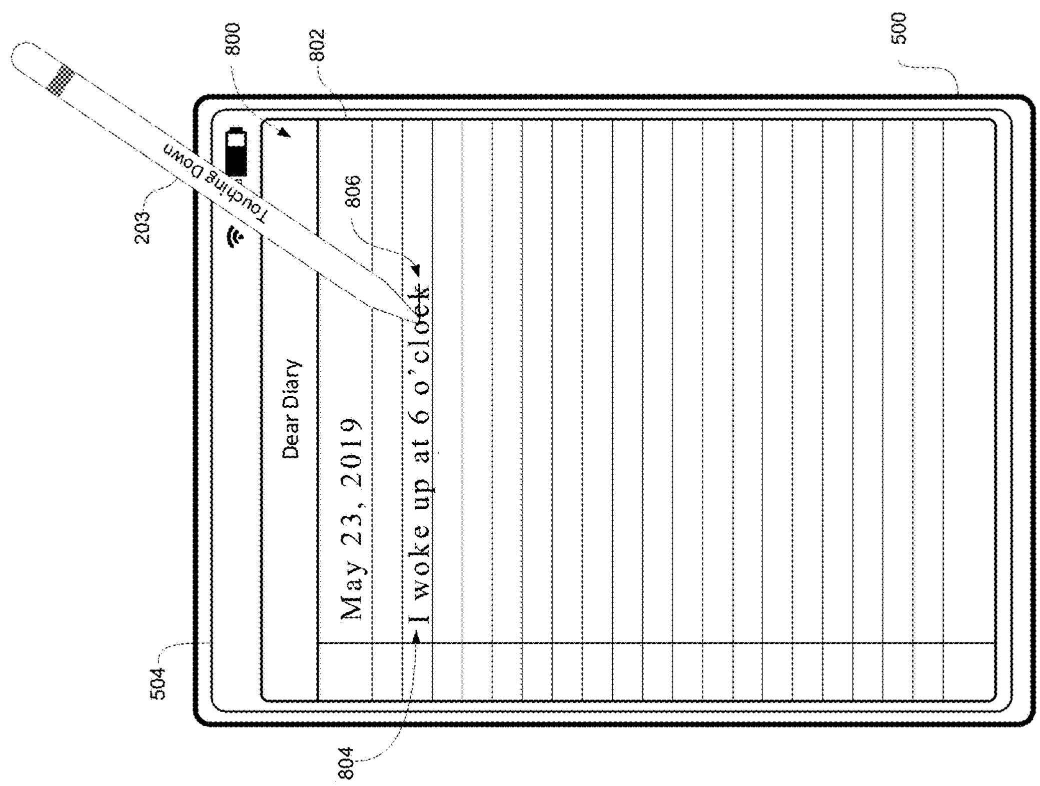

In FIG. 8B, a user input is received from stylus 203. In some embodiments, the user input is a gesture on the touch-screen 504 passing through a portion of pre-existing text 804, as shown in FIG. 8B. In some embodiments, in response to the user input, a trail 806 of the handwritten input is displayed on the display. In some embodiments, trail 806 is a visual indication on the display corresponding to the handwritten user input at the location of the handwritten input. In other words, trail 806 is a representation of the user's handwritten input. In some embodiments, as shown in FIG. 8B, the handwritten input has horizontally passed through the letters "ck" in the word "clock". In some embodiments, trail 806 provides a visual indication that the user has performed a horizontal gesture through the letters "ck" of word "clock". In FIG. 8C, the user input continues to be received from stylus 203 (e.g., without lift-off) crossing out the entire word "clock". In some embodiments, the horizontal gesture (e.g., or substantially horizontal gesture) is considered a request to select (e.g., highlight) the respective portions of pre-existing text 804.

Figure 8E:
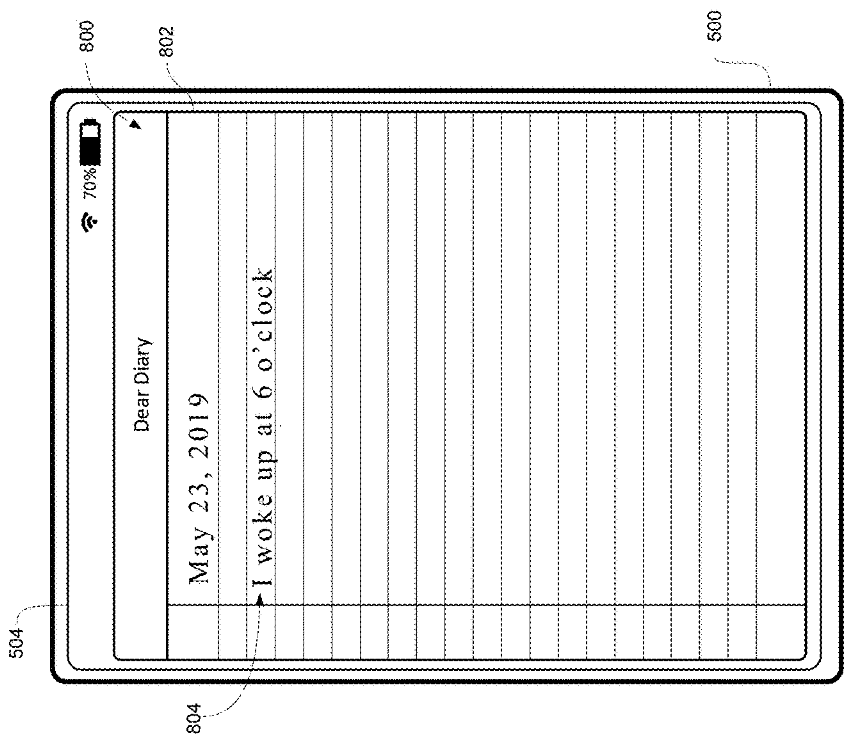
Figure 8D:
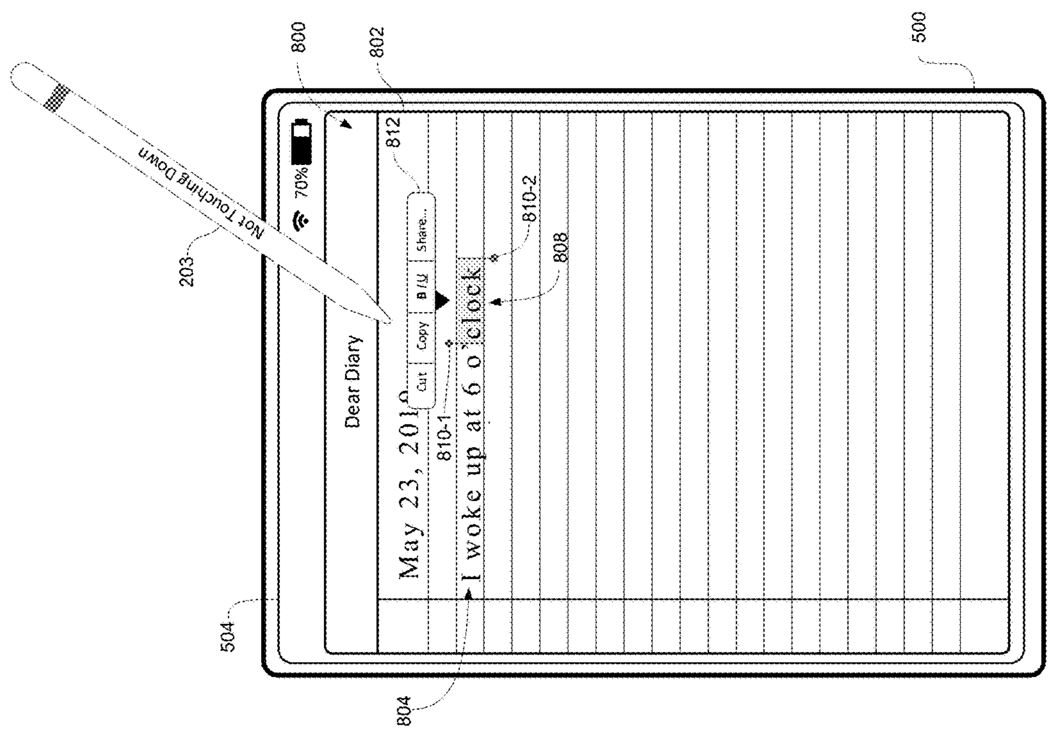

In FIG. 8D, the handwritten user input is terminated (e.g., stylus 203 has lift-off from touch screen 504). In some embodiments, in response to lift-off of stylus 203, pre-existing text 804 corresponding to the "clock" word is selected. In some embodiments, selecting the word comprises highlighting the word (e.g., as indicated by highlighting 808), displaying one or two selection adjustment elements 810-1 and 810-2 and/or displaying a pop-up menu 812. In some embodiments, the selection adjustment elements 810-1 and 810-2 are selectable to move the selection to include more or fewer letters or words (e.g., the user is able to drag the selection adjustment elements 810-1 and 810-2 to encompass more or fewer letters. In some embodiments, pop-up menu 812 includes one or more selectable options for performing operations on the highlighted text. In some embodiments, pop-up menu 812 includes a selectable option to cut the selected text (e.g., copy the selected text into a clipboard and concurrently delete the selected text), a selectable option to copy the text (e.g., copy the selected text into a clipboard), a selectable option to modify the font of the selected text (e.g., change font, size, whether it is bolded, underlined, italicized, etc.), and/or a selectable option to share the selected text (e.g., to another user and/or another electronic device).

FIG. 8E-8H illustrate an alternative exemplary embodiment for selecting text based on handwritten input. In FIG. 8E, device 500 is displaying user interface 800 corresponding to a note taking application. In some embodiments, user interface 800 includes a text entry region 802 in which a user is able to enter multiple lines of text. In some embodiments, text entry region 802 includes one or more pre-existing text 804. In some embodiments, pre-existing text 804 was previously entered as handwritten inputs and converted into font-based text. In some embodiments, pre-existing text 804 was entered using a soft keyboard (e.g., by the user or another user, on this device or another device).

Figure 8G:
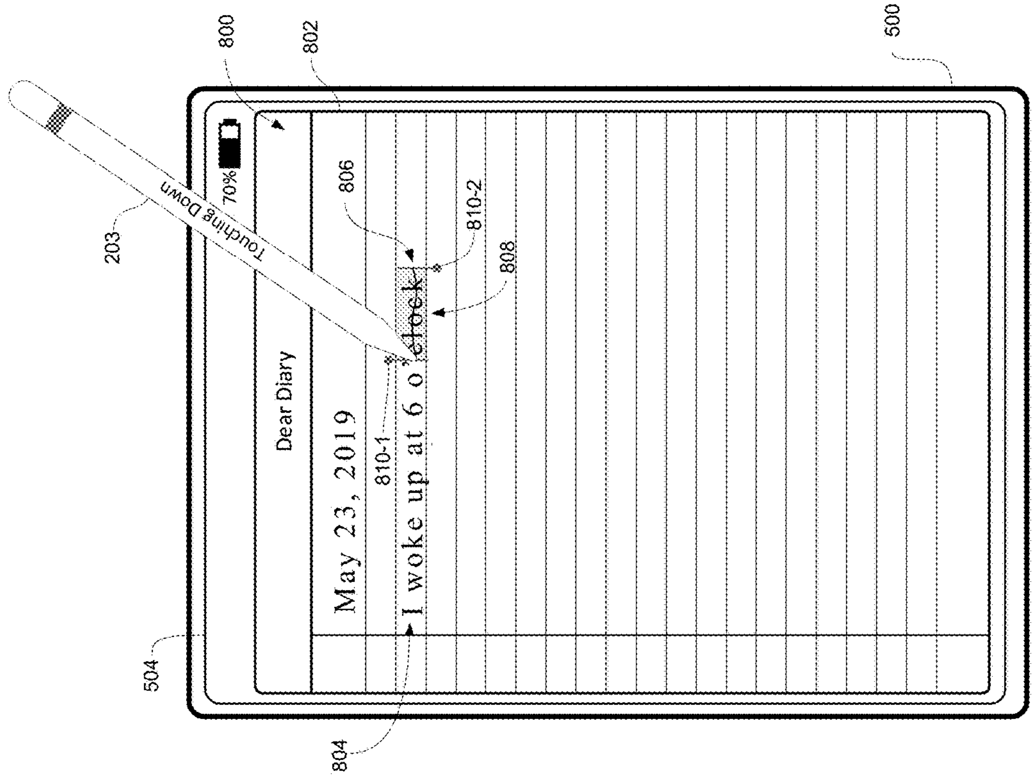
Figure 8F:
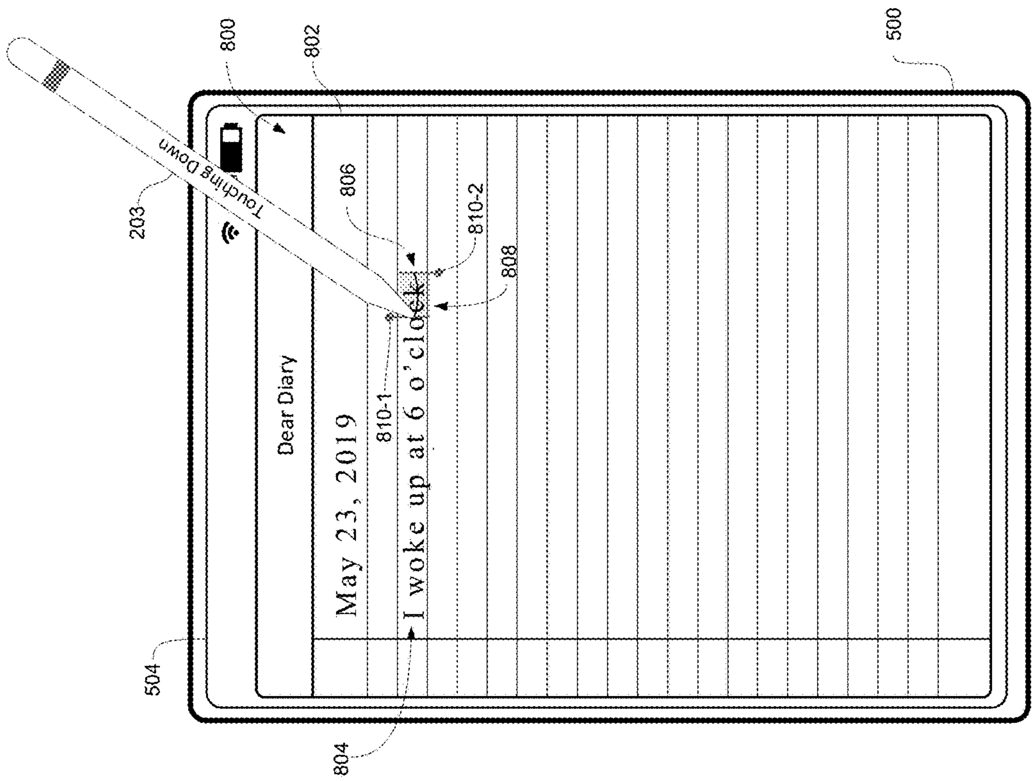

In FIG. 8F, a user input is received from stylus 203. In some embodiments, the user input is a gesture on the touch-screen 504 passing through a portion of pre-existing text 804, as shown in FIG. 8F. In some embodiments, in response to the user input, a trail 806 of the handwritten input is displayed on the display. In some embodiments, trail 806 is a visual indication on the display corresponding to the handwritten user input at the location of the handwritten input. In some embodiments, as shown in FIG. 8F, the handwritten input has passed through the letters "ck" in the word "clock". In some embodiments, trail 806 provides a visual indication that the user has performed a horizontal gesture through the letters "ck" of word "clock". In some embodiments, after handwritten input is recognized as a selection gesture, the letters that have been selected so far are highlighted and the highlighting updates "live" (e.g., moves with the handwritten input). Thus, as shown in FIG. 8F, highlighting 808 currently highlights the letters "ck".

In FIG. 8G, the user input continues to be received from stylus 203 (e.g., without lift-off) crossing out the entire word "clock". In some embodiments, highlighting 808 updates to highlight the additional letters that have been selected by the user input as the user is selecting the additional letters (e.g., now highlighting the entire word "clock").

In some embodiments, as shown in FIGS. 8F-8G, the handwritten input does not need to be perfectly straight or perfectly horizontal to be interpreted as a request to select letters or words. In some embodiments, handwritten inputs that are substantially straight and/or substantially horizontal are interpreted as a request to select letters or words. In some embodiments, any handwritten input that passes through at least a portion of a letter or word and is not interpreted to be a deletion command (as will be discussed in more detail below) is interpreted as a request to select letters or words. In some embodiments, selection of letters or words is the default function that is performed unless the handwritten input is interpreted as another command (e.g., deletion). Thus, in some embodiments, any handwritten input for which a confidence level that it is another command is below a certain threshold (e.g., below 80%, 75%, 50% confident that it is another command) is interpreted as a selection command. In some embodiments, underlining one or more letters or words are interpreted as a request to select letters or words. In some embodiments, circling one or more letters or words are interpreted as a request to select letters or words. In some embodiments, tapping or double tapping (e.g., with stylus 203) a word is interpreted as a request to select the respective word In FIG. 8H, the handwritten user input is terminated (e.g., stylus 203 has lift-off from touch screen 504). In some embodiments, in response to lift-off of stylus 203, pre-existing text 804 corresponding to the "clock" word is selected. In some embodiments, selecting the word comprises highlighting the word (e.g., as indicated by highlighting 808), displaying one or two selection adjustment elements (similar to those discussed in FIG. 8D) and/or displaying a pop-up menu 812 (similar to pop-up menu 812 discussed in FIG. 8D). In some embodiments, trail 806 of the handwritten input is straightened and aligned to the bottom of the indicated word. In some embodiments, the representation of the handwritten input (e.g., trail 806) "snaps" to underlining the word that is being selected.

Figure 8I:
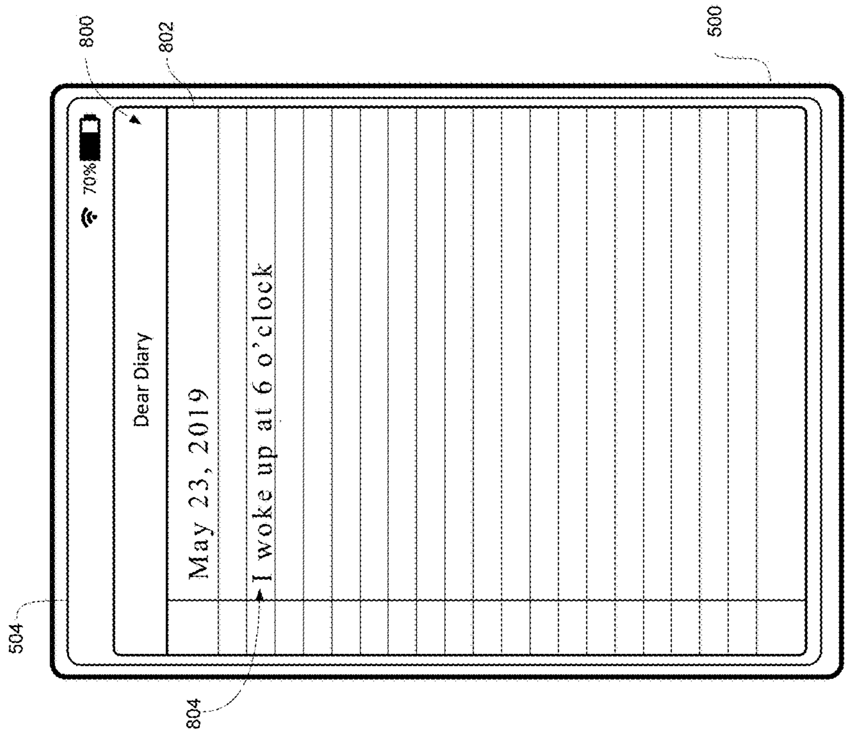
Figure 8H:
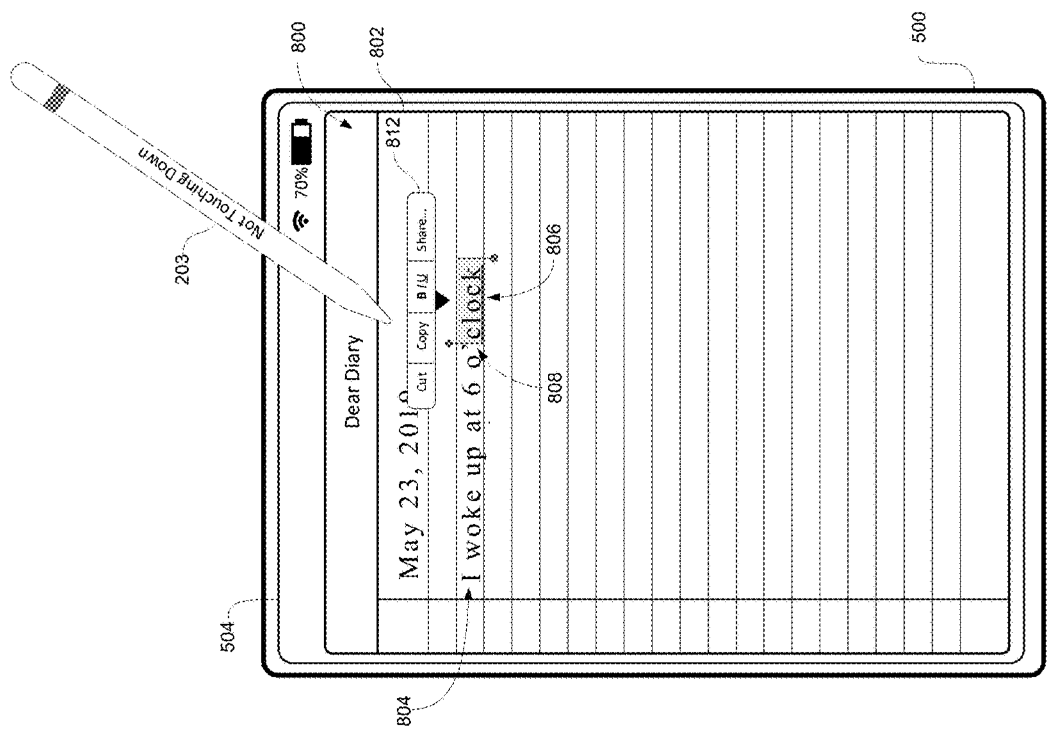
Figure 8K:
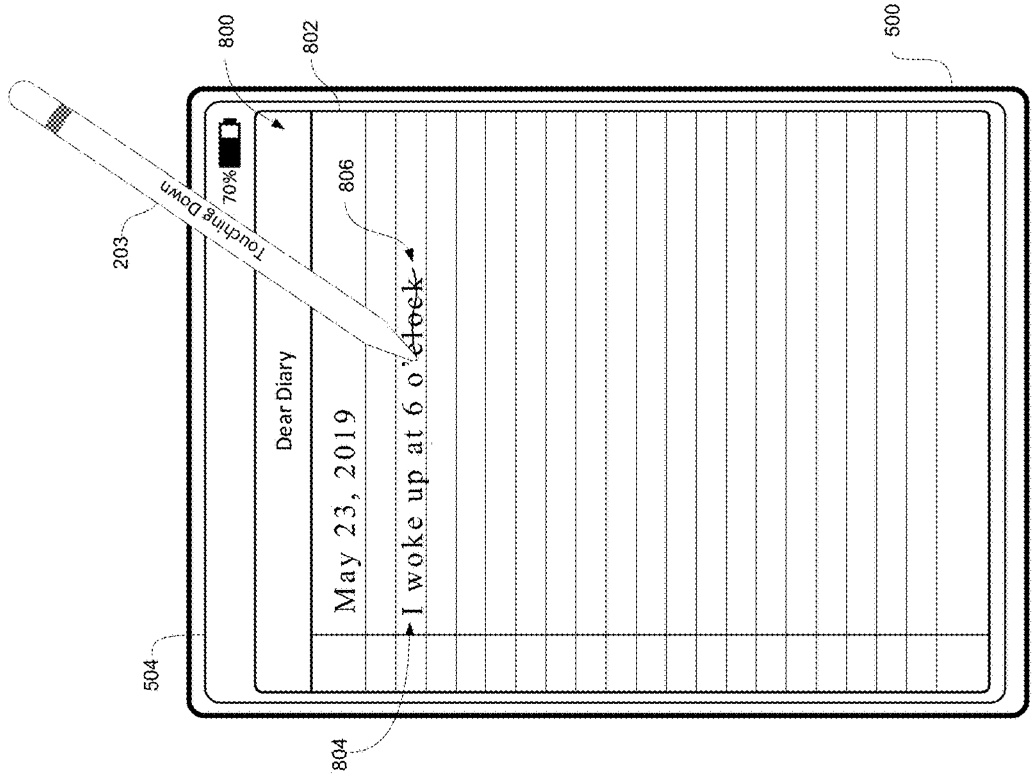
Figure 8J:
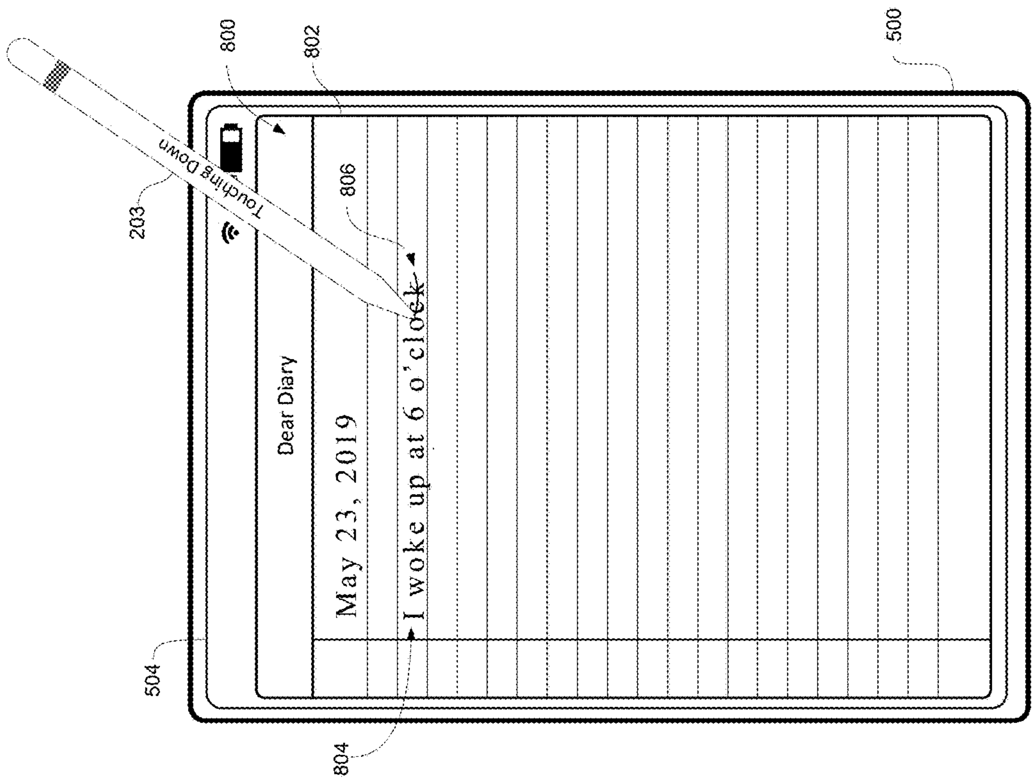
Figure 8M:
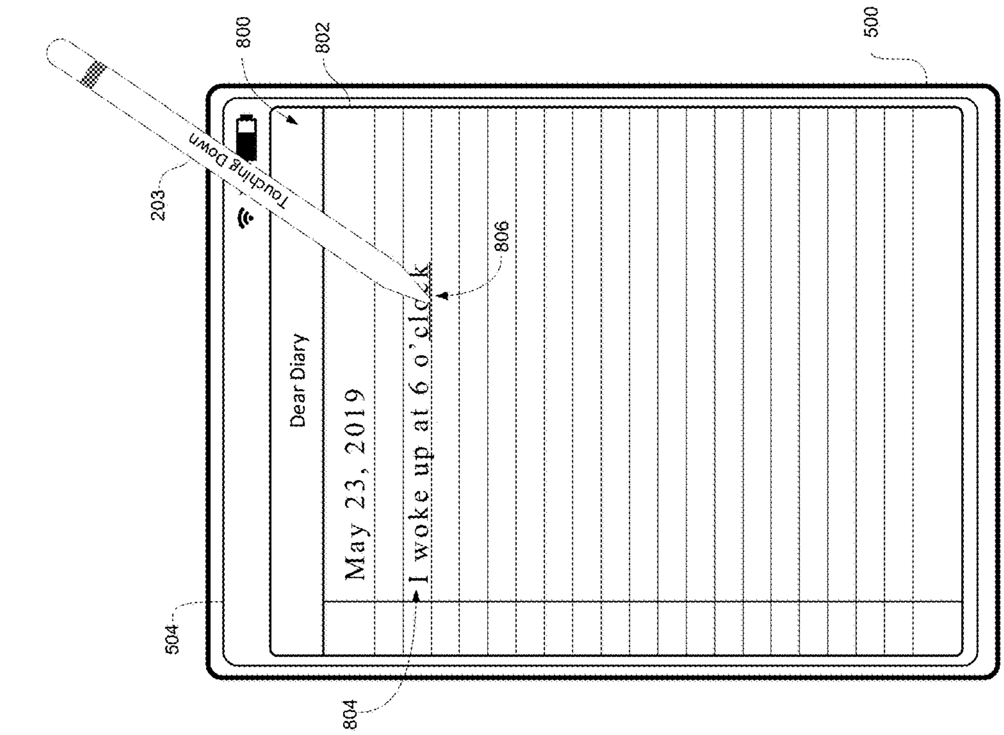
Figure 8L:
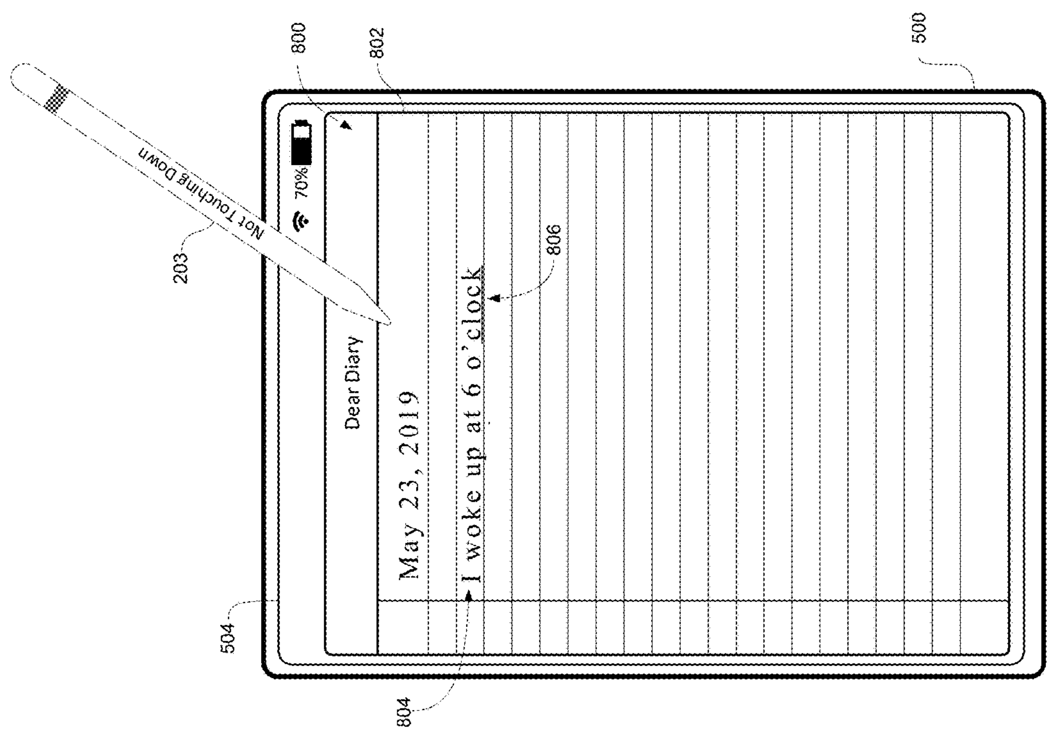
Figure 8O:
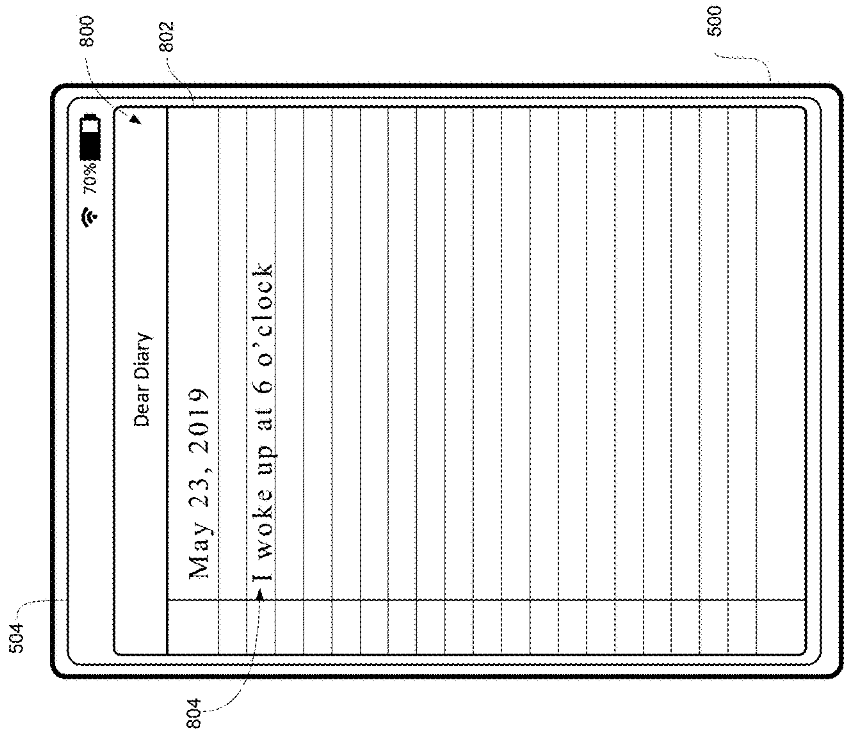
Figure 8N:
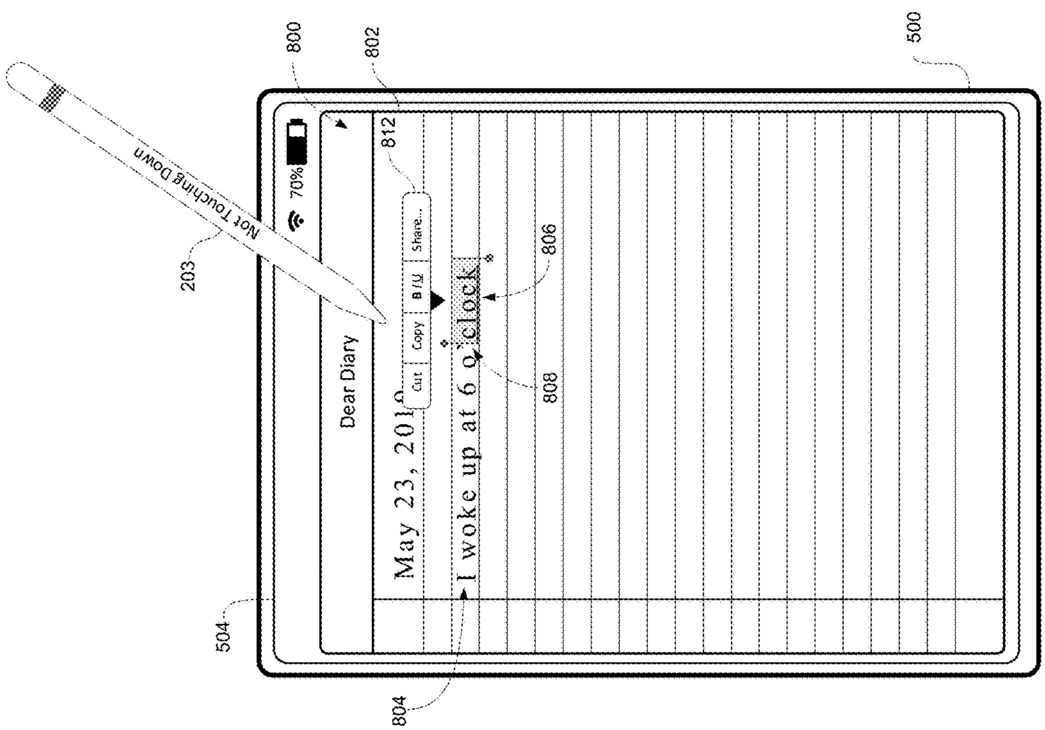

FIGS. 8I-8N illustrate an alternative exemplary embodiment for selecting text based on handwritten input. In FIG. 8N, device 500 is displaying user interface 800 corresponding to a note taking application (similar to user interface 800 discussed in FIG. 8E and FIG. 8A).

In FIG. 8J, a user input is received from stylus 203. In some embodiments, the user input is a gesture on the touch-screen 504 passing through a portion of pre-existing text 804, as shown in FIG. 8F. In some embodiments, in response to the user input, a trail 806 of the handwritten input is displayed on the display. In some embodiments, trail 806 is a visual indication on the display corresponding to the handwritten user input at the location of the handwritten input. In some embodiments, as shown in FIG. 8F, the handwritten input has horizontally passed through the letters "ck" in the word "clock". In some embodiments, trail 806 provides a visual indication that the user has performed a horizontal gesture through the letters "ck" of word "clock". In FIG. 8K, the user input continues to be received from stylus 203 (e.g., without lift-off) crossing out the entire word "clock".

In FIG. 8L, the handwritten user input is terminated (e.g., stylus 203 has lift-off from touch screen 504). In some embodiments, in response to lift-off of stylus 203, trail 806 of the handwritten input is straightened and aligned to the bottom of the indicated word. In some embodiments, the representation of the handwritten input (e.g., trail 806) "snaps" to underlining the word that is being requested to be selected. In some embodiments, actual selection does not occur and a pop-up menu is not displayed.

In FIG. 8M, a user input is detected selecting the straightened and snapped representation of handwritten input 806 (e.g., by stylus 203 or optionally by a finger or other input device). In some embodiments, in response to the user input selecting the underlining of the word "clock", pre-existing text 804 corresponding to the word "clock" is selected, as shown in FIG. 8N. In some embodiments, selecting the word comprises highlighting the word (e.g., as indicated by highlighting 808), displaying one or two selection adjustment elements (similar to those discussed in FIG. 8D) and/or displaying a pop-up menu 812 (similar to pop-up menu 812 discussed in FIG. 8D).

FIG. 8O-8R illustrate an exemplary process of deleting text based on handwritten inputs. In FIG. 8O, device 500 is displaying user interface 800 corresponding to a note taking application (similar to user interface 800 discussed in FIG. 8E and FIG. 8A).

Figure 8Q:
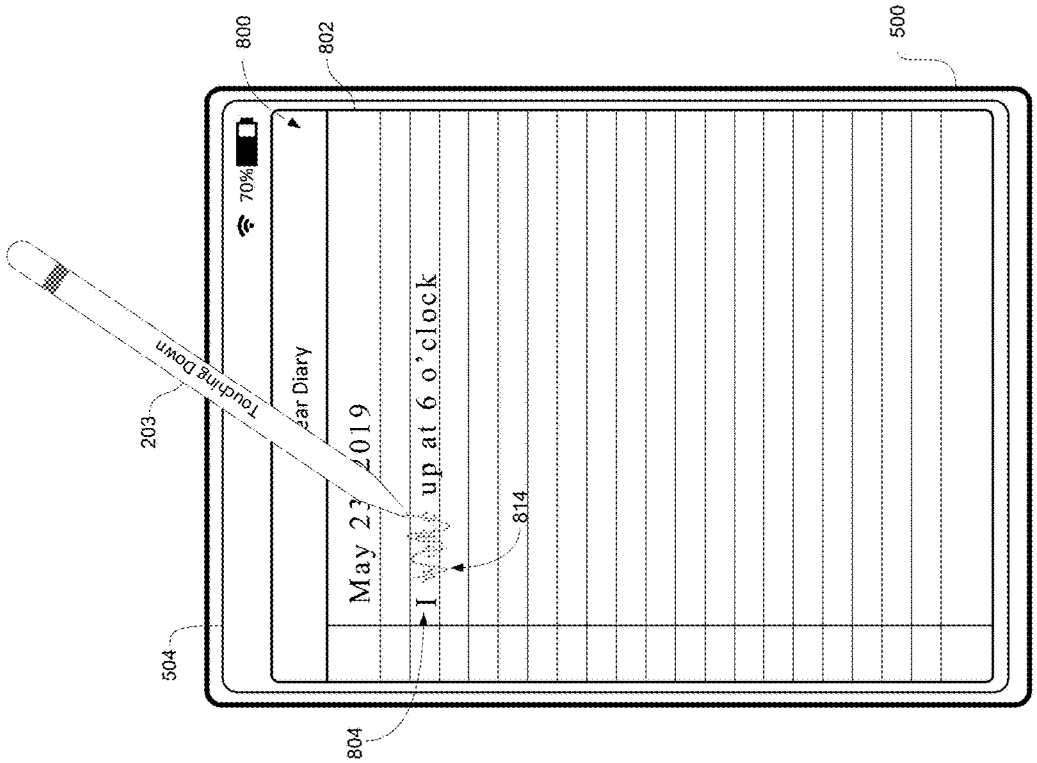
Figure 8P:
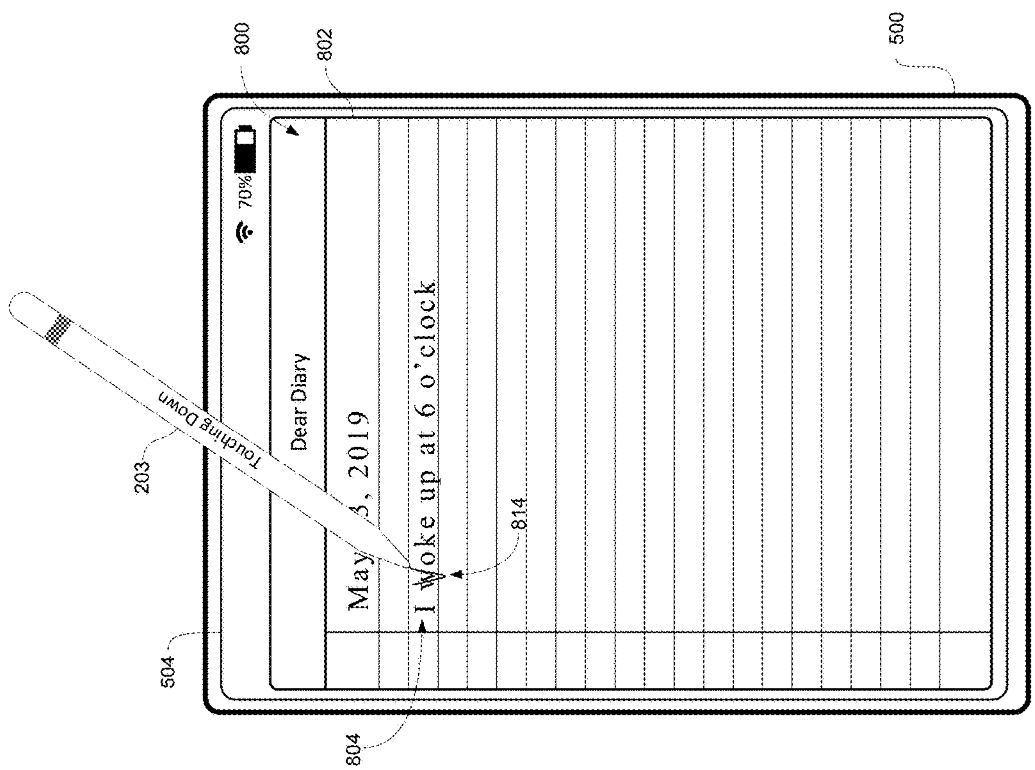

In FIG. 8P, a user input is received from stylus 203. In some embodiments, the user input is a gesture on the touch-screen 504 passing through a portion of pre-existing text 804, as shown in FIG. 8P. In some embodiments, in response to the user input, a trail 814 of the handwritten input is displayed on the display. In some embodiments, trail 814 is a visual indication on the display corresponding to the handwritten user input at the location of the handwritten input. In some embodiments, as shown in FIG. 8P, the handwritten input passes vertically through the letter "w"

twice (e.g., in an up and down gesture). In some embodiments, the handwritten input also includes a minor horizontal component to indicate a crossing-out motion of the entire letter "w".

In FIG. 8Q, the handwritten input continues crossing-out the word "woke". In some embodiments, when the handwritten input is recognized as a request to delete the word "woke", then the word and trail 814 is updated to change color and/or opacity. For instance, as shown in FIG. 8Q, in some embodiments, the word and/or trail become grey indicating that device 500 has recognized the user's gesture as a deletion command and the word that will be deleted is "woke". In some embodiments, the visual characteristics of the word that will be deleted and/or the trail is not changed. In some embodiments, the input is recognized as a deletion command if it vertically passes through one or more letters or every letter of a word in a vertical cross-out, scratch-out, or scribbled manner. For example, if the handwritten input vertically passes through a word a threshold number of times (e.g., 3, 4, 5, etc.), then it is considered to be a request to delete the word. In some embodiments, if the handwritten input if the vertical movement is received in quick succession (e.g., 0.25 seconds, 0.5 seconds, 1 second, 3 seconds), then the gesture is considered to be a request to delete a word. In some embodiments, as discussed above, any gesture in which the confidence level that it is a deletion command will be interpreted as a selection command.

Figure 8S:
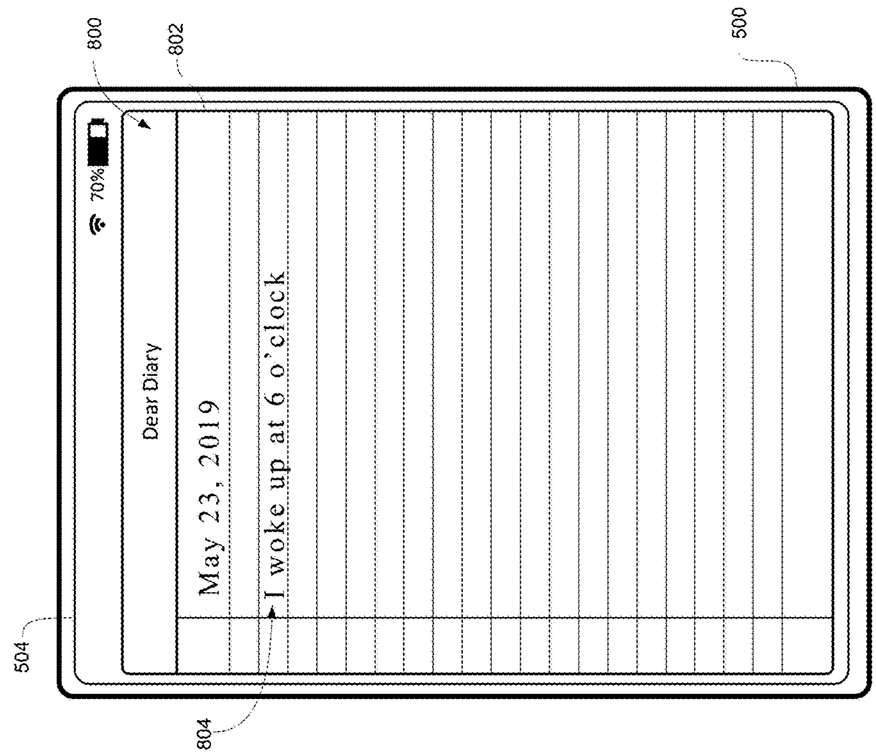
Figure 8R:
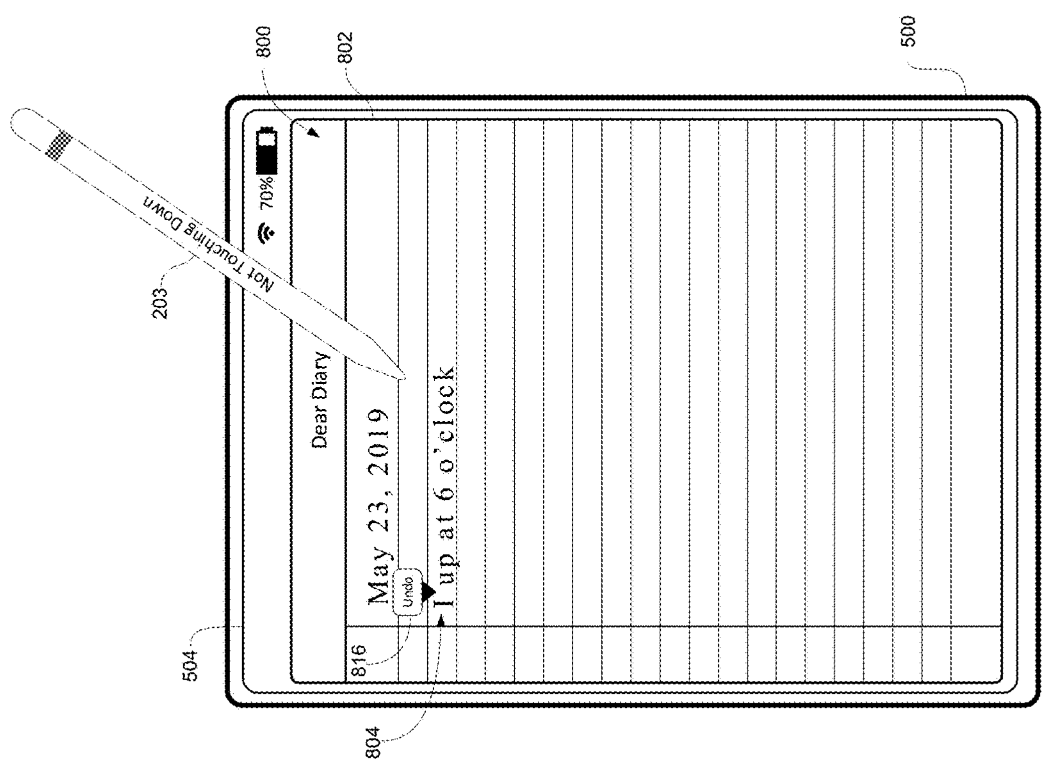

In FIG. 8R, the handwritten user input is terminated (e.g., stylus 203 has lift-off from touch screen 504). In some embodiments, in response to lift-off of stylus 203, the deletion command is performed (e.g., executed), thus deleting the word "woke" from pre-existing text 804. In some embodiments, concurrently with, after, or in response to deleting the word "woke" from pre-existing text 804, pop-up 816 is displayed for undoing the deletion command. In other words, pop-up 816 includes a selectable option (e.g., or itself is a selectable option) which is selectable to insert the deleted word (e.g., "woke") back into pre-existing text 804 in its original location, thus undoing the deletion command.

FIG. 8S-8W illustrate an exemplary method of cancelling a deletion operation. In FIG. 8S, device 500 is displaying user interface 800 corresponding to a note taking application (similar to user interface 800 discussed in FIG. 8E and FIG. 8A).

Figure 8U:
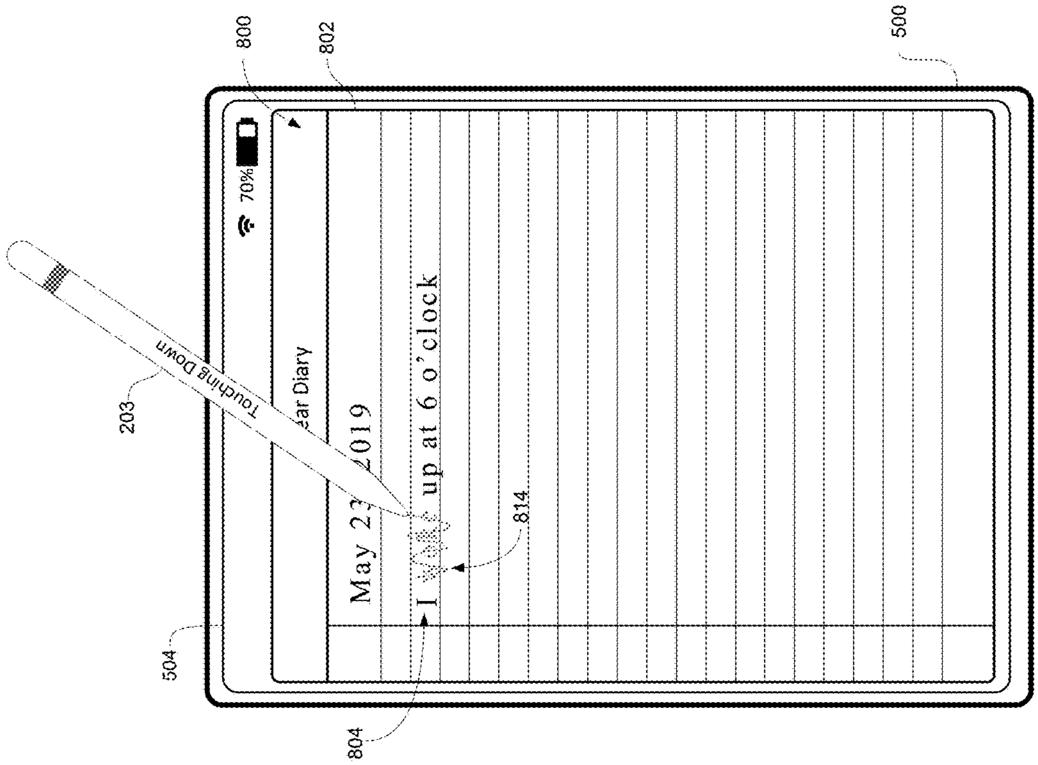
Figure 8T:
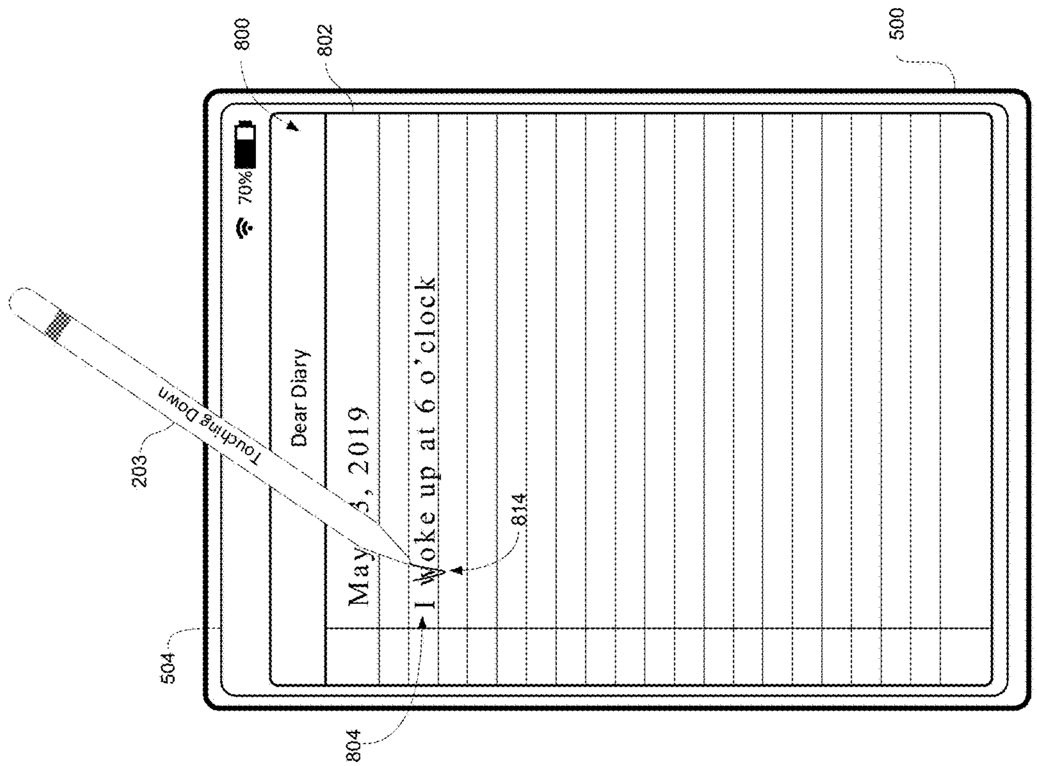

In FIG. 8T, a user input is received from stylus 203. In some embodiments, the user input is a gesture on the touch-screen 504 passing through a portion of pre-existing text 804, as shown in FIG. 8T. In some embodiments, in response to the user input, a trail 814 of the handwritten input is displayed on the display. In some embodiments, trail 814 is a visual indication on the display corresponding to the handwritten user input at the location of the handwritten input. In some embodiments, as shown in FIG. 8T, the handwritten input passes vertically through the letter "w" twice (e.g., in an up and down gesture). In some embodiments, the handwritten input also includes a minor horizontal component to indicate a crossing-out motion of the entire letter "w".

In FIG. 8U, the handwritten input continues crossing-out the word "woke". In some embodiments, when the handwritten input is recognized as a request to delete the word "woke", then the word (e.g., "woke") and trail 814 is updated to change color and/or opacity (e.g., 50% opacity, 75% opacity, etc.). For instance, as shown in FIG. 8U, in some embodiments, the word and/or trail become grey indicating that device 500 has recognized the user's gesture as a deletion command and the word that will be deleted is "woke".

Figure 8W:
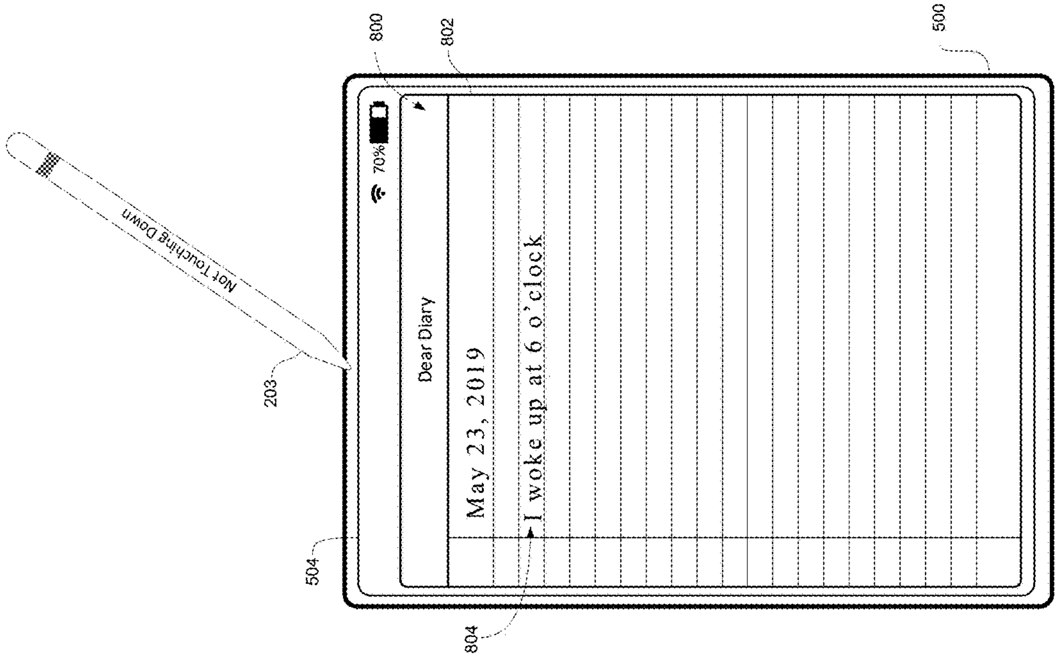
Figure 8V:
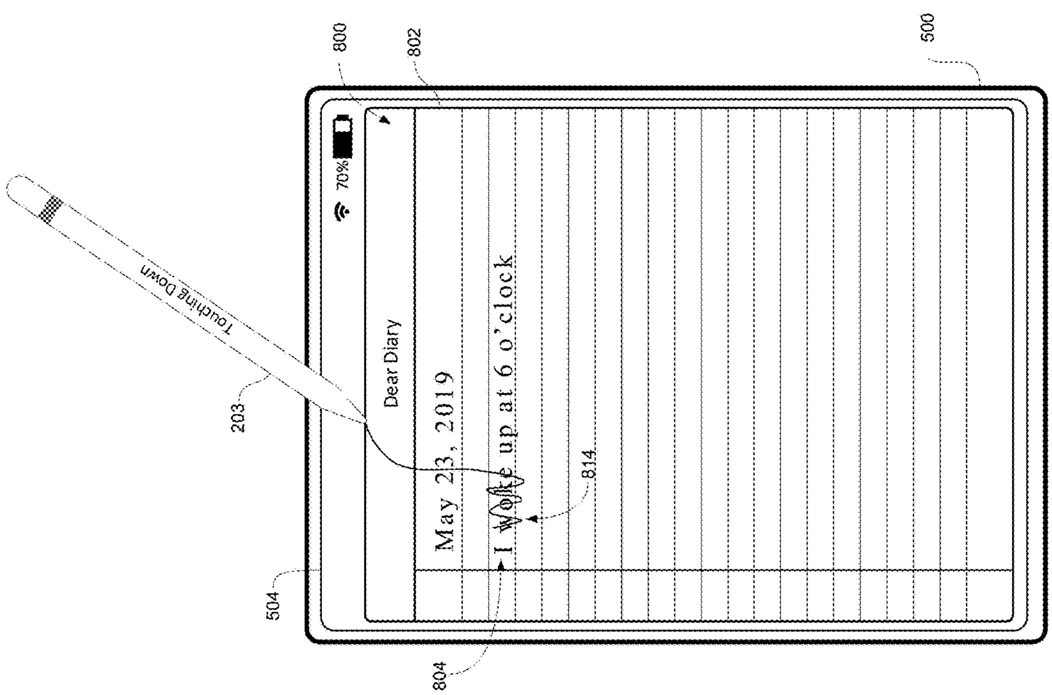

In FIG. 8V, the handwritten input, while continuing touch-down on the touch screen 504, moves away from the pre-existing text 804. In some embodiments, if the handwritten input moves a threshold distance (e.g., 3 mm, 5 mm, 1 cm, 3 cm, etc.) away from the word that has been selected for deletion (e.g., "woke"), then the additional handwritten input (e.g., moving away from the word "woke") is considered to be a request to cancel the deletion operation. In some embodiments, as shown in FIG. 8V, the visual characteristic of trail 814 and the word that has been selected for deletion is returned to its original state (e.g., back to black from grey). In FIG. 8W, lift-off of stylus 203 is detected and the deletion command is cancelled. Thus, in some embodiments, the word "woke" is left untouched and is not deleted, as shown in FIG. 8W.

Figure 8Y:
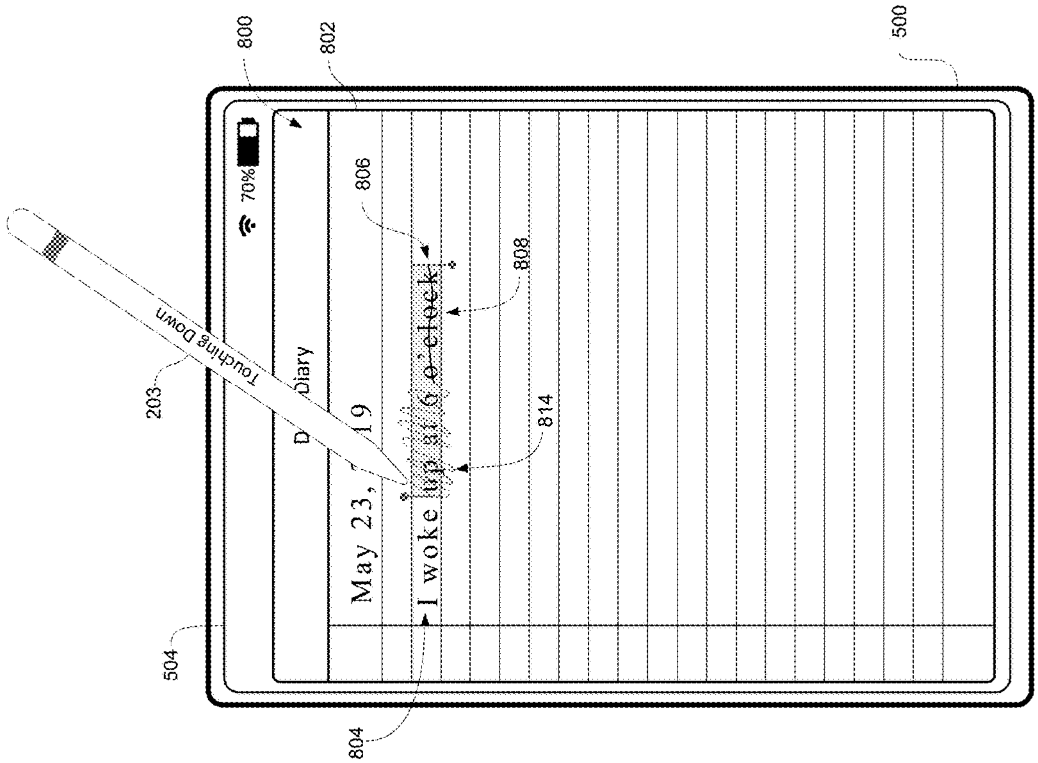
Figure 8X:
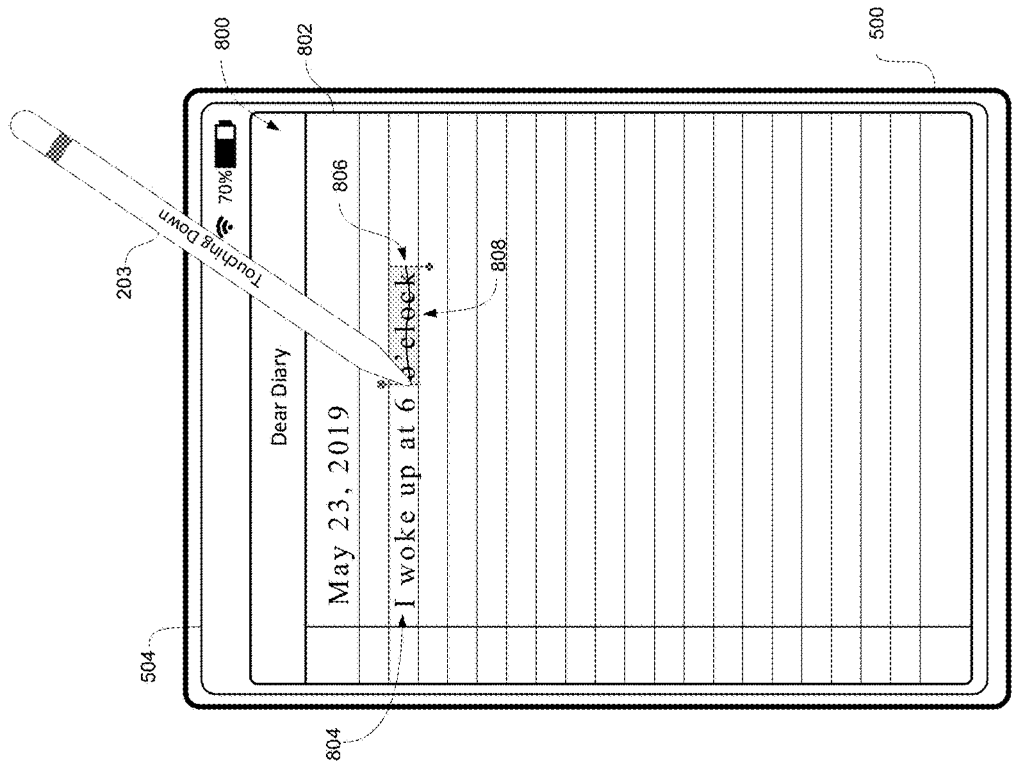
Figure 8A:
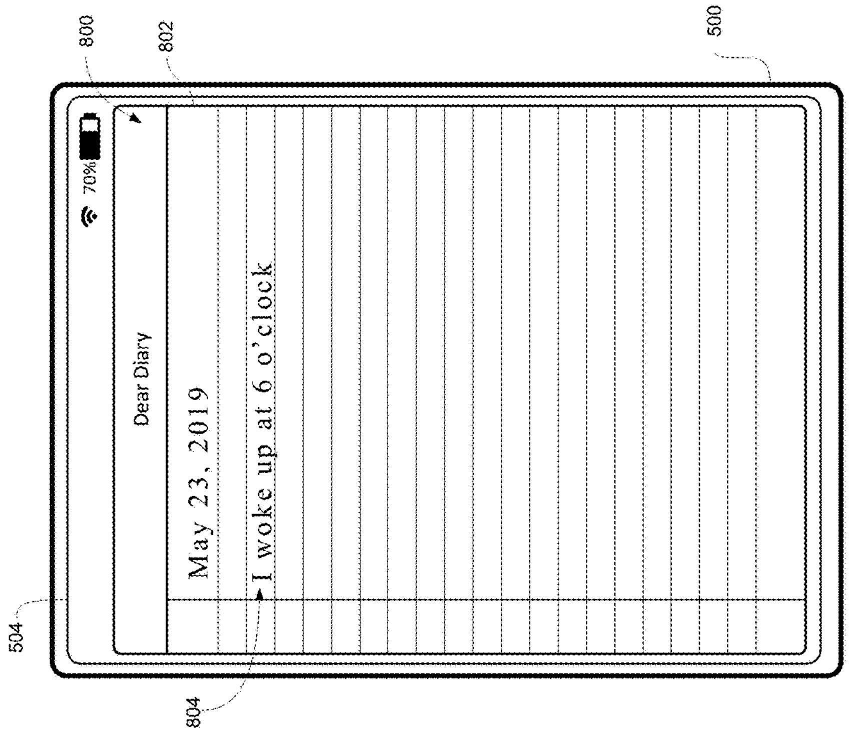
Figure 8Z:
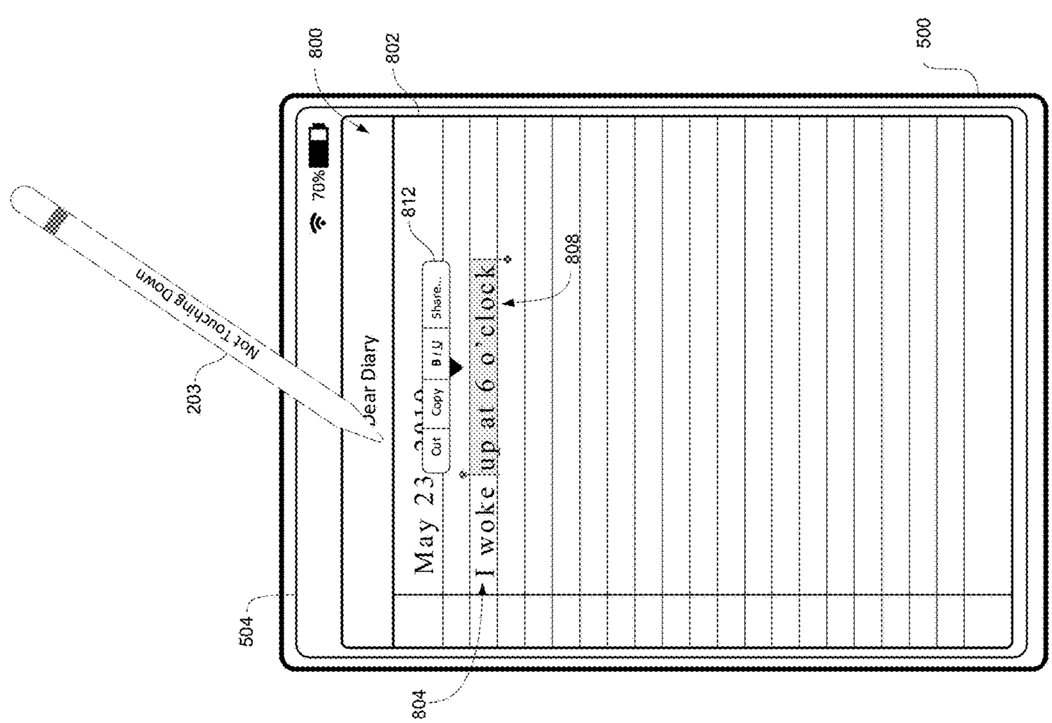
Figure 8C:
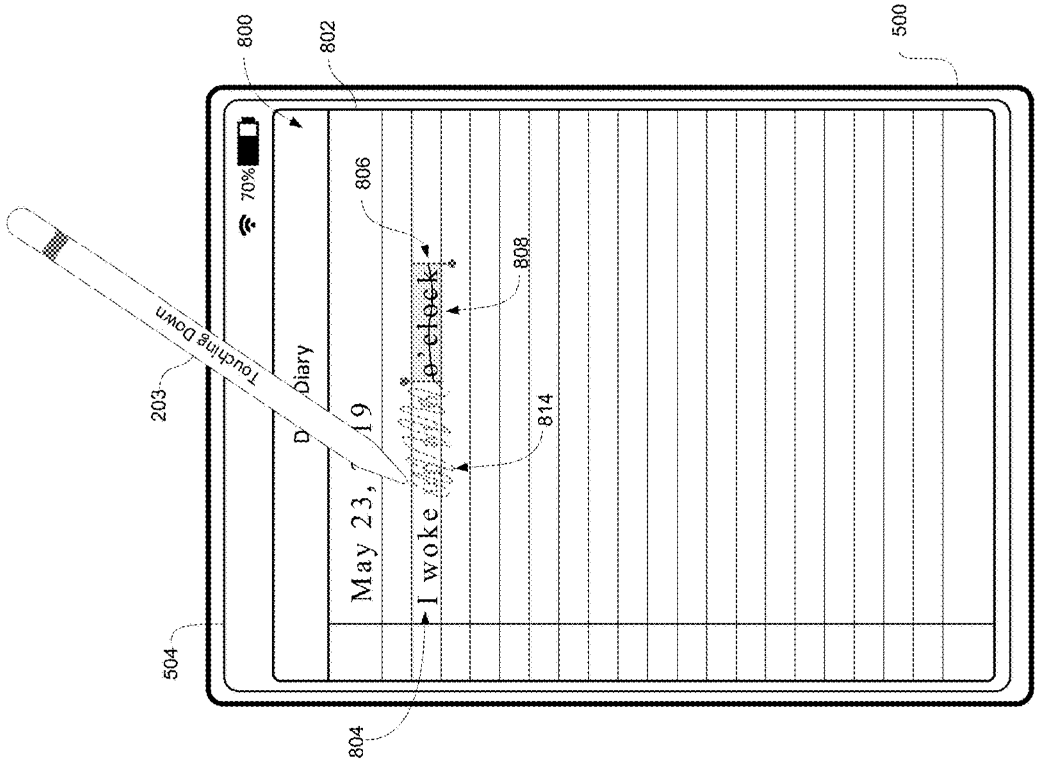
Figure 8B:
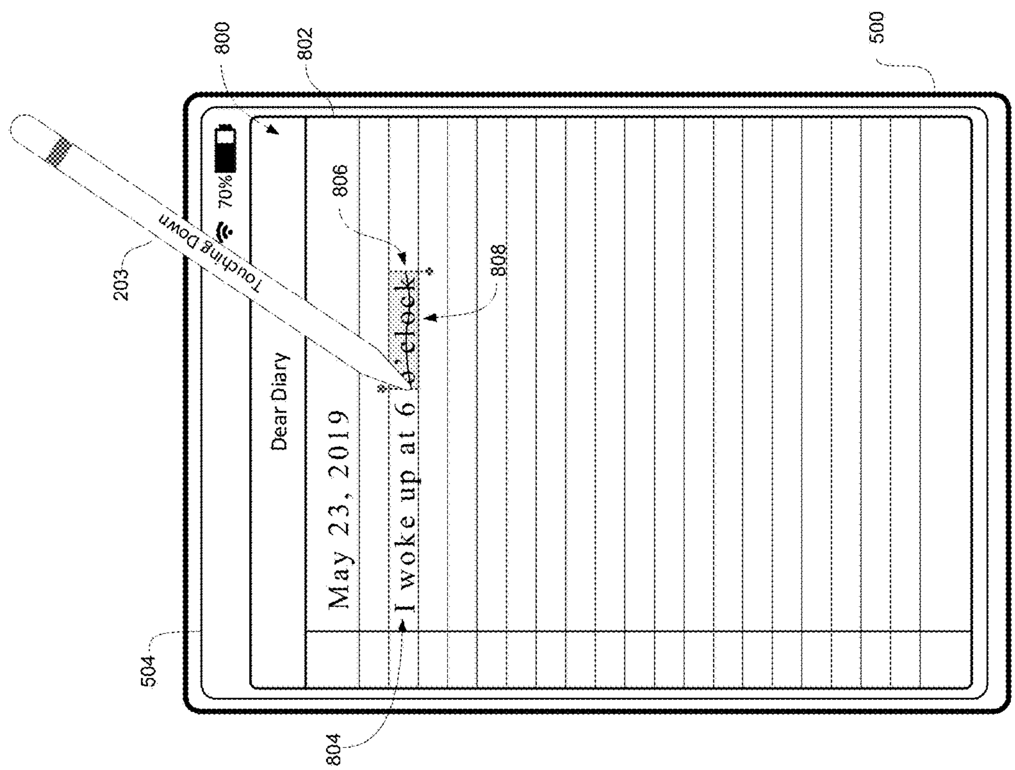
Figure 8E:
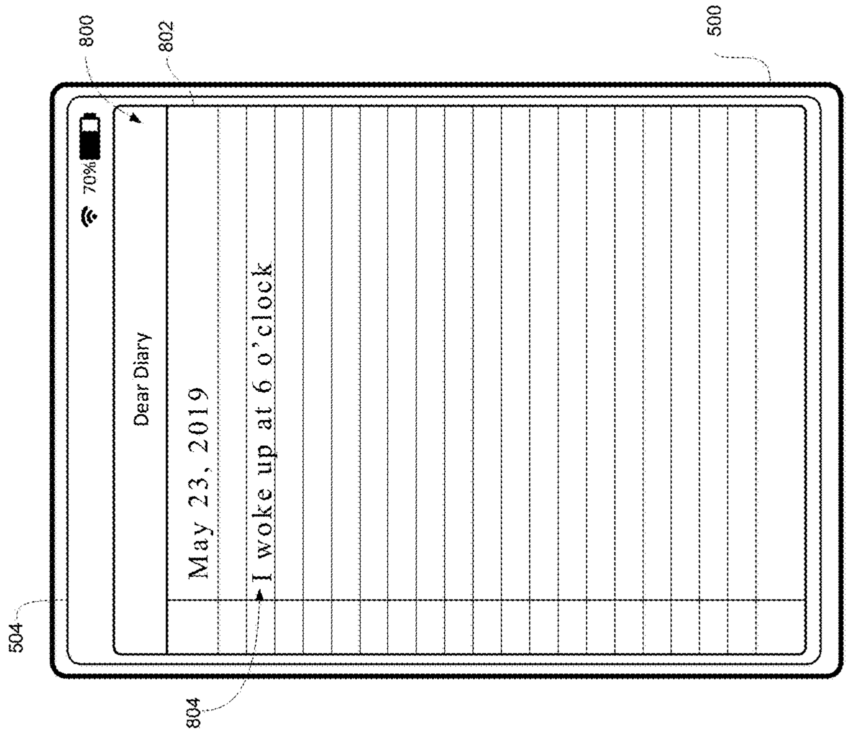
Figure 8D:
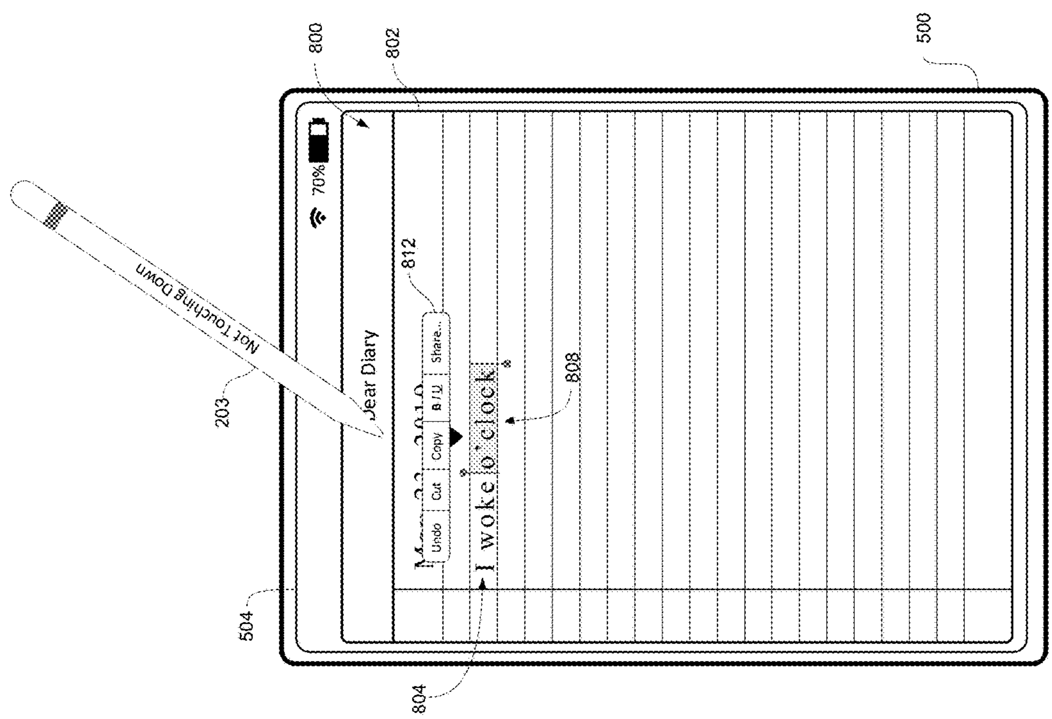
Figure 8G:
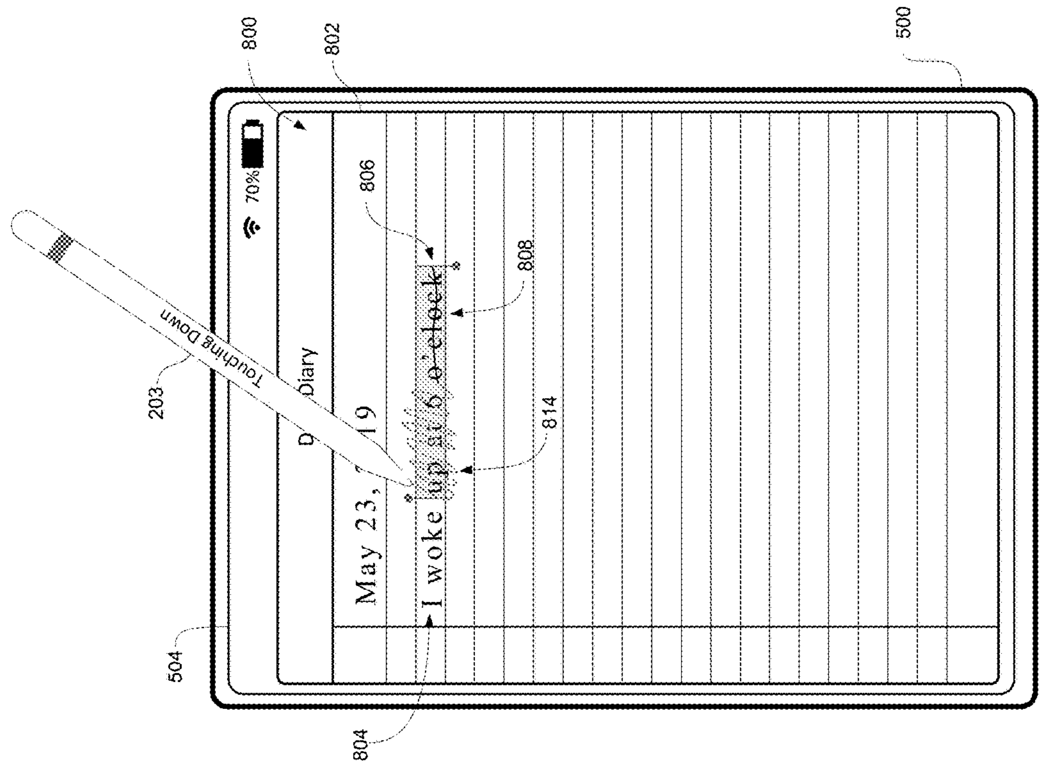
Figure 8F:
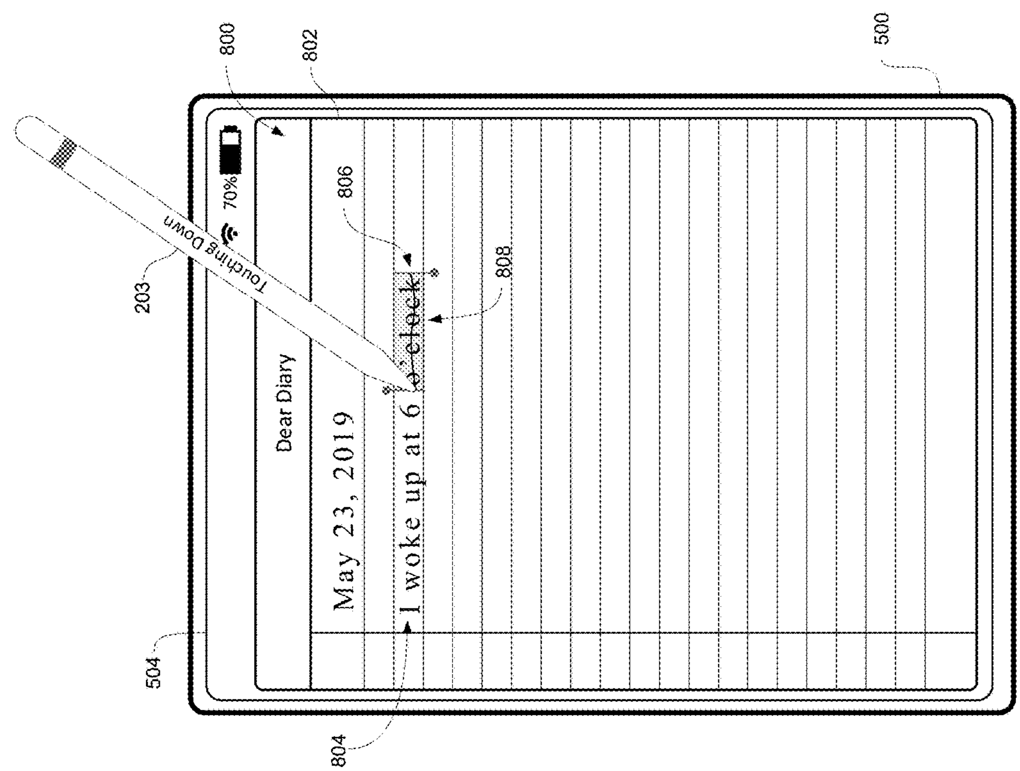
Figure 8I:
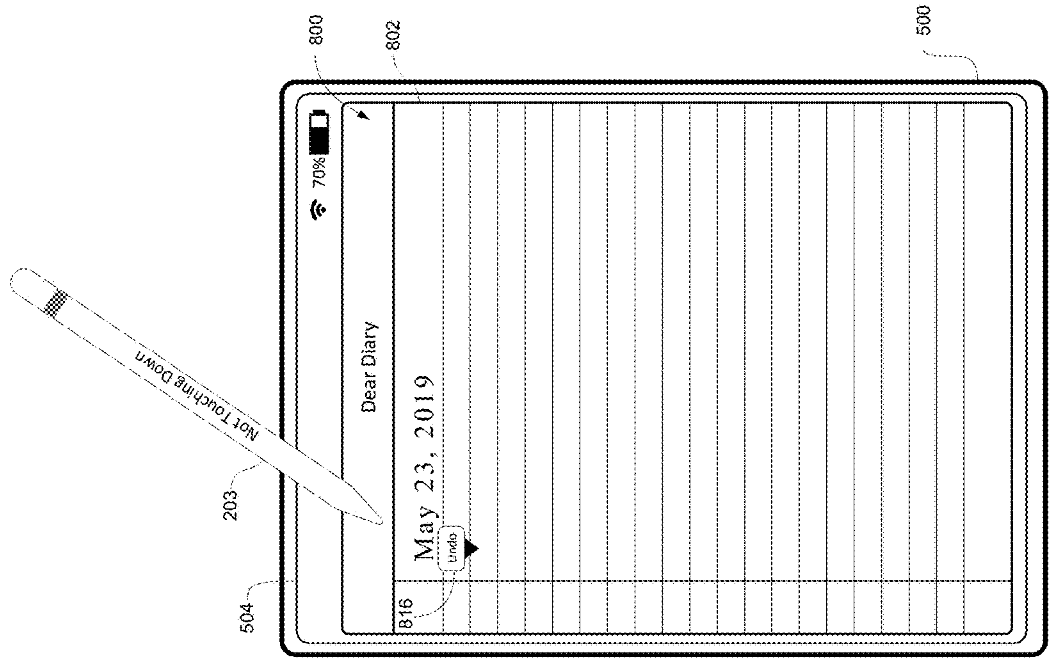
Figure 8H:
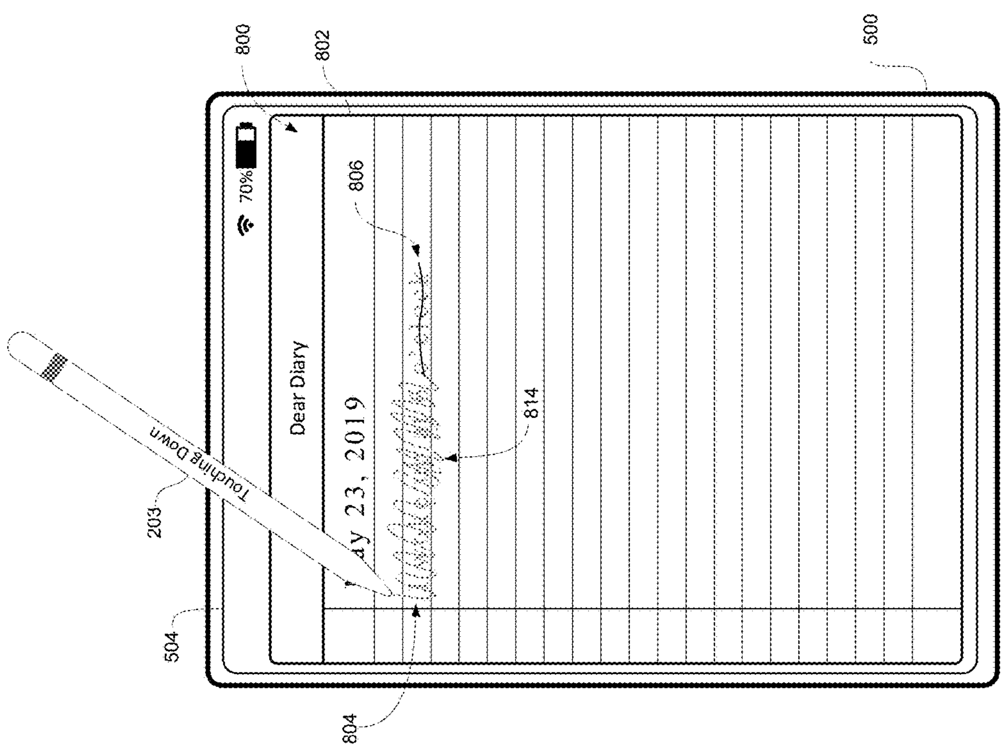
Figure 8K:
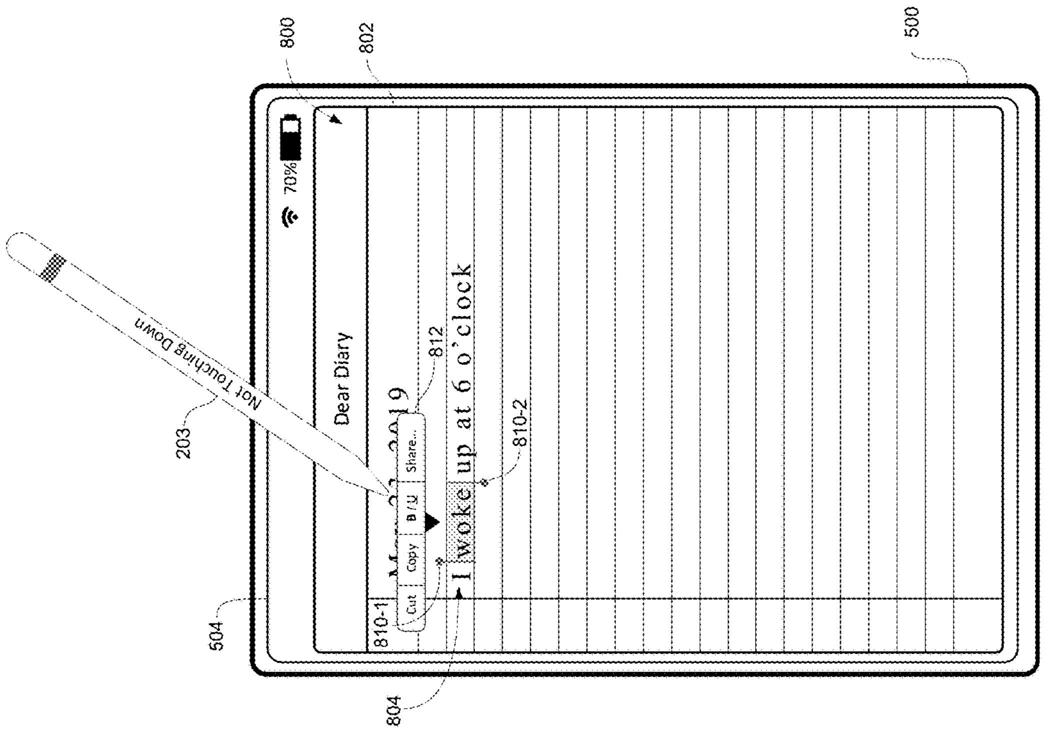
Figure 8J:
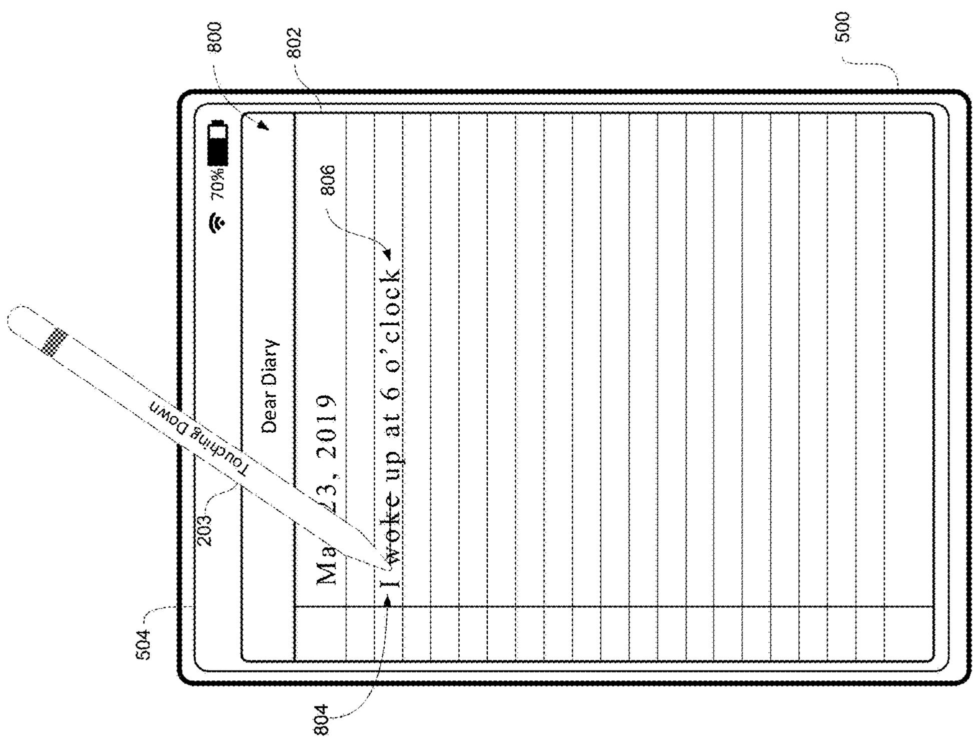
Figure 8M:
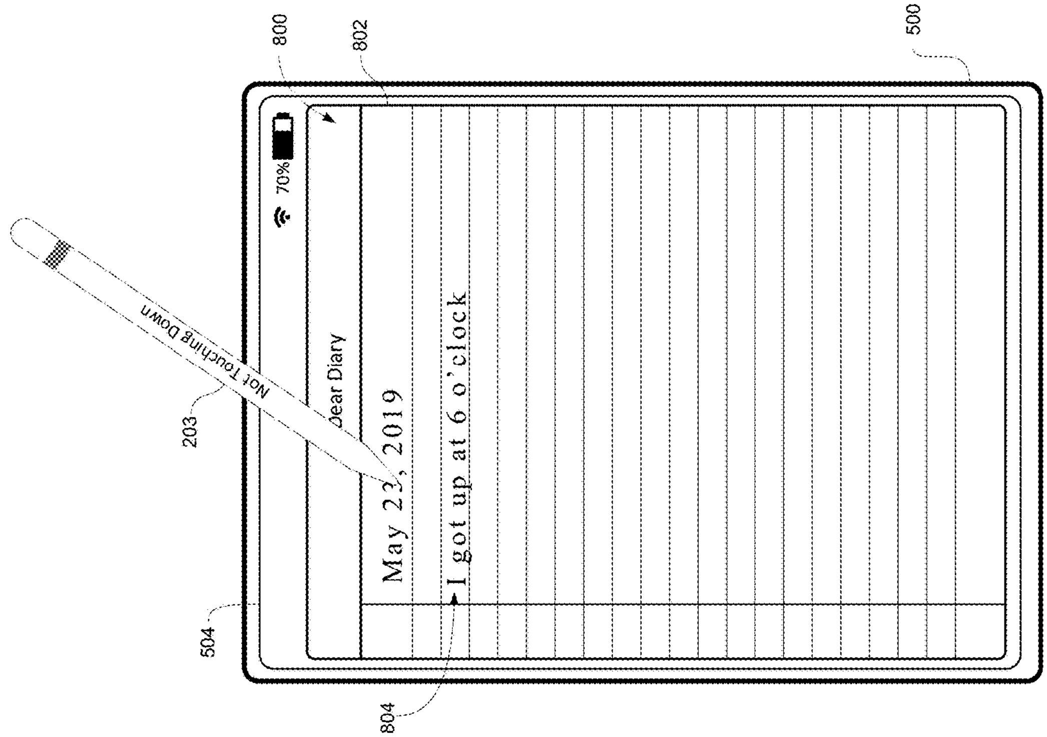
Figure 8L:
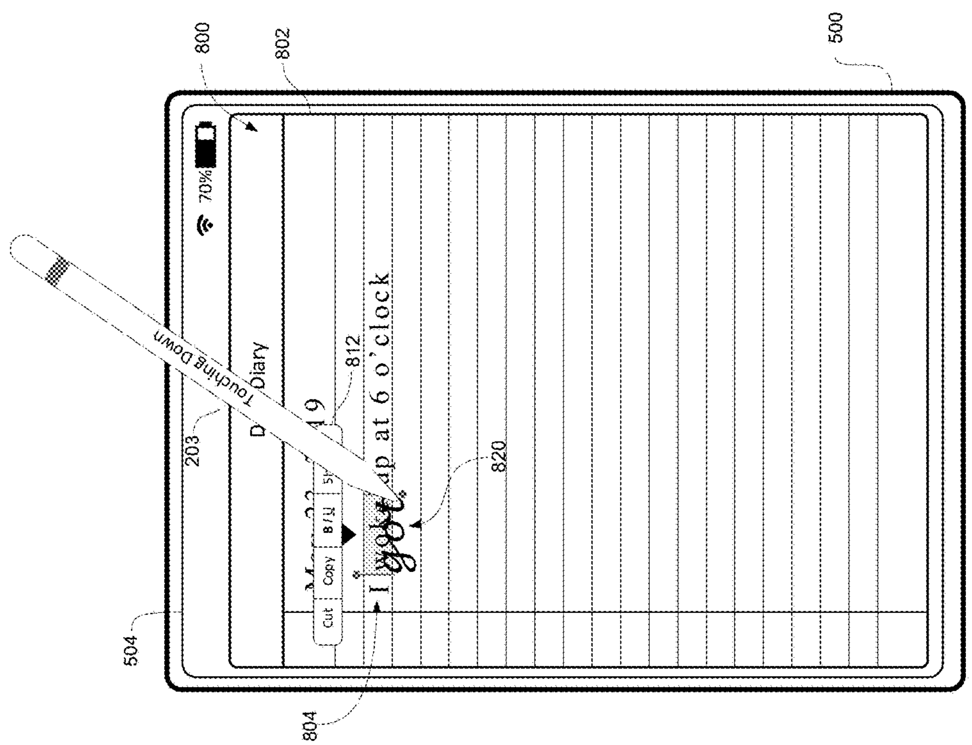
Figure 9A:
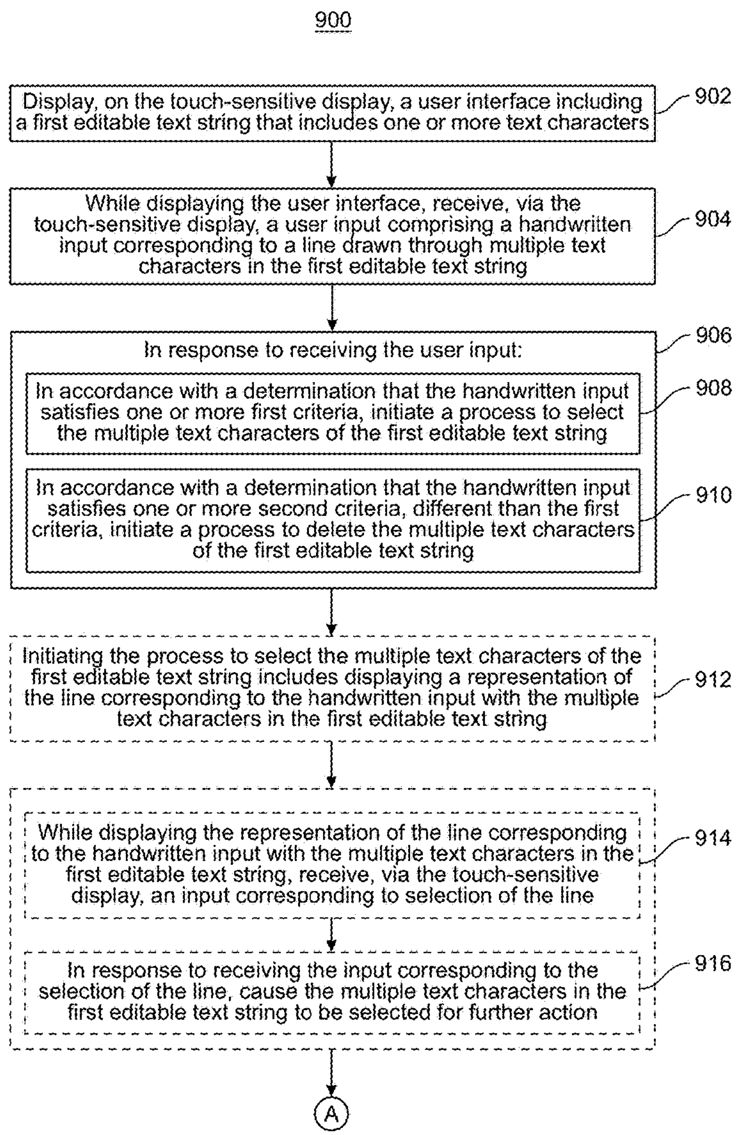
FIGS. 9A-9G are flow diagrams illustrating a method of interpreting handwritten inputs to select or delete text in accordance with some embodiments.
Figure 9B:
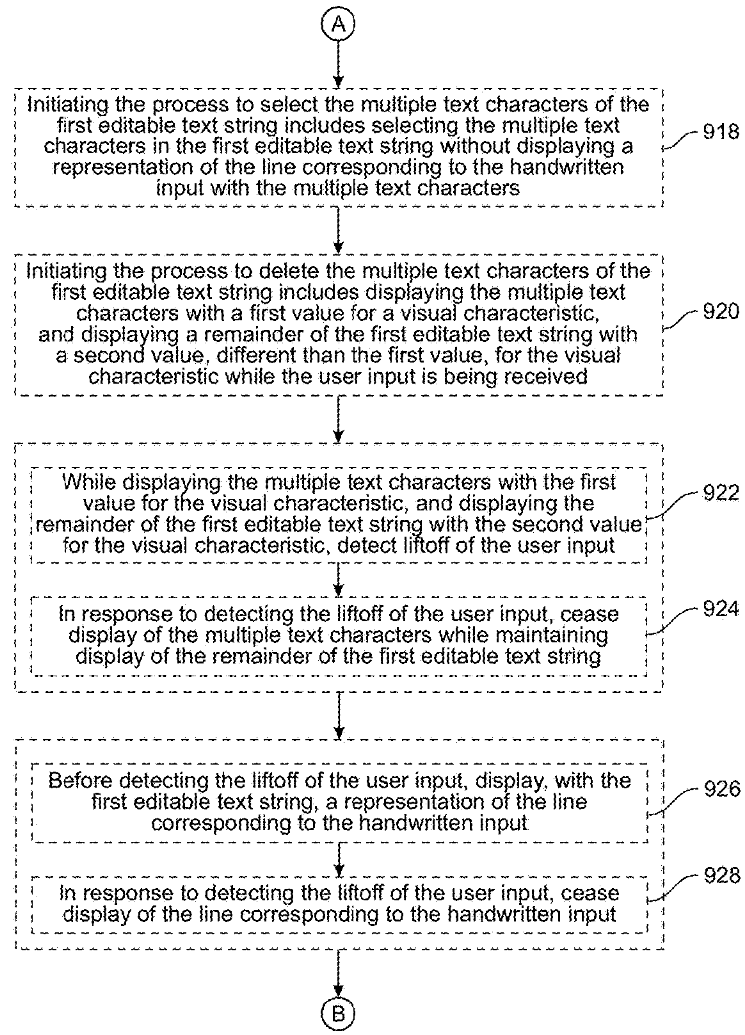
Figure 9C:
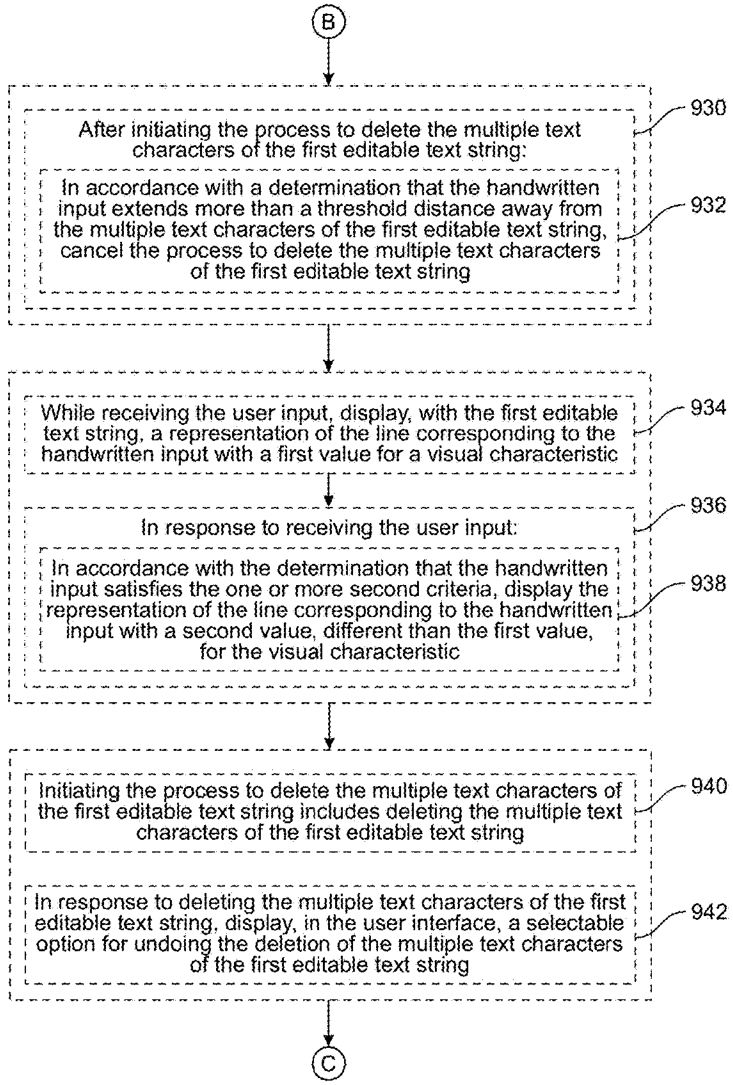
Figure 9D:
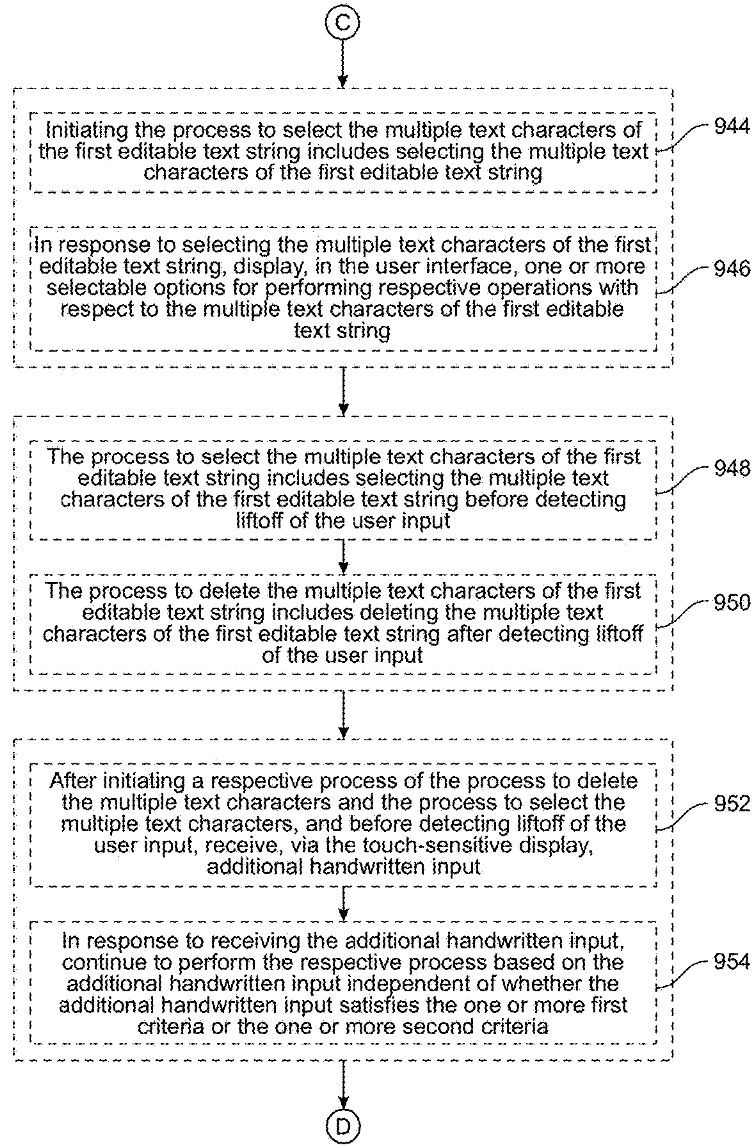
Figure 9E:
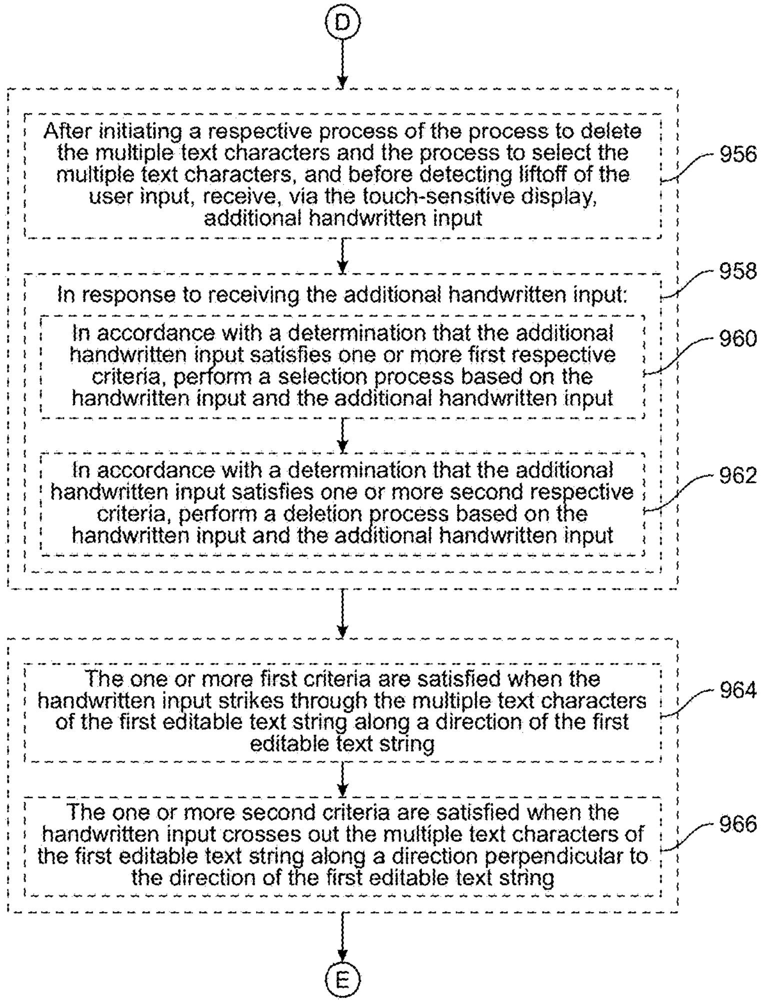
Figure 9F:
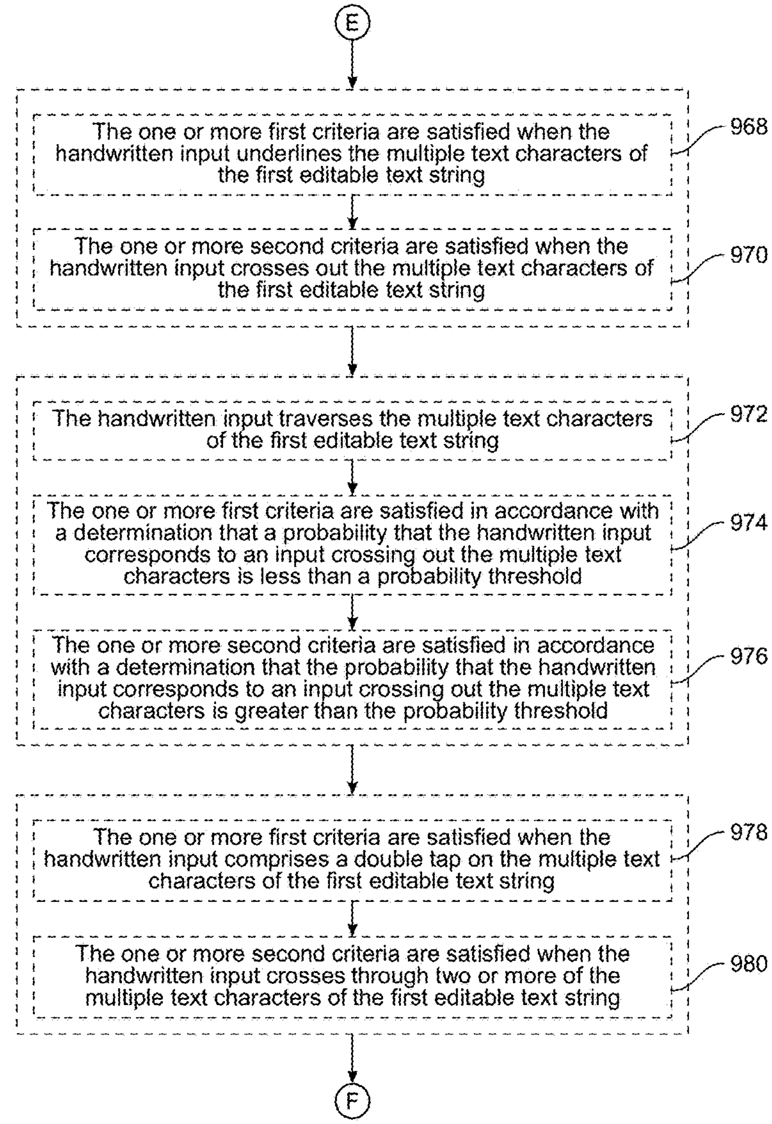
Figure 9G:
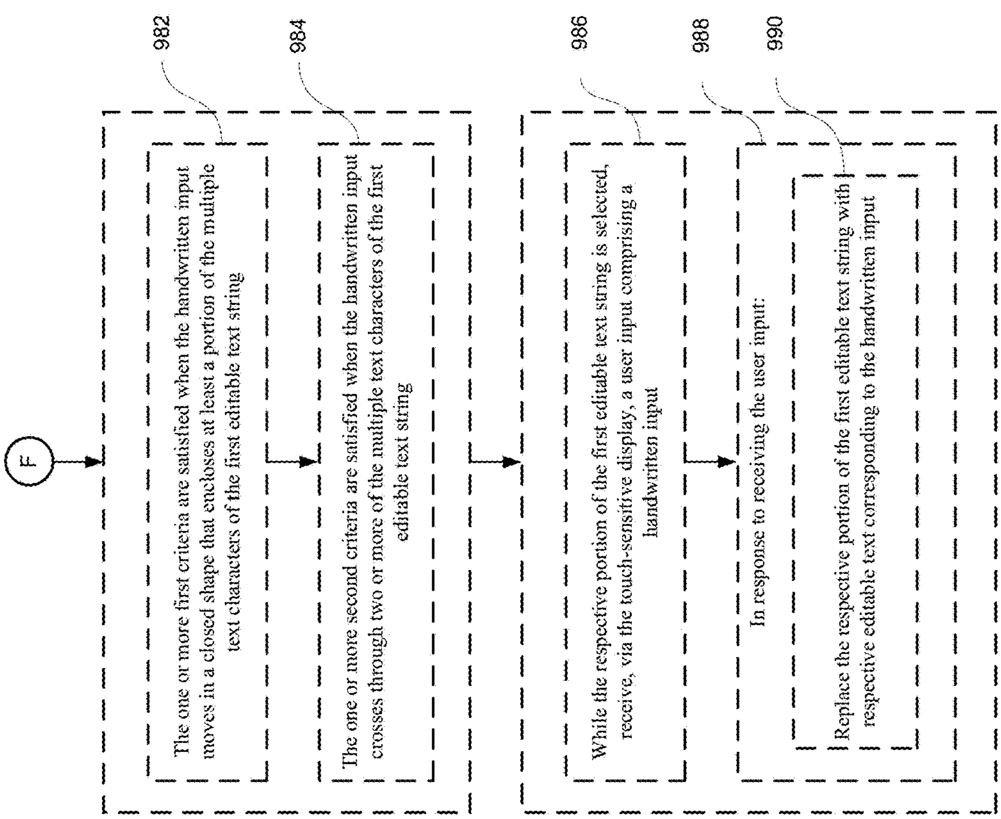

FIGS. 8X-8Z illustrate an exemplary process of interpreting handwritten input with both selection and deletion components. In FIG. 8W, device 500 is displaying user interface 800 corresponding to a note taking application (similar to user interface 800 discussed in FIG. 8E and FIG. 8A). In FIG. 8X, a user input is received from stylus 203 selecting a portion of pre-existing text 804, as shown in FIG. 8X. In FIG. 8Y, the user continues the handwritten input (without lift-off) and begins to perform a gesture associated with the deletion command (e.g., vertical crossing out of words). In some embodiments, even though the user has transitioned the handwritten input into providing a gesture ordinarily interpreted as a deletion command, device 500 determines that the user still intends to perform the selection command. For example, in FIG. 8Z, a lift-off of stylus 203 is detected and in response to the lift-off, the entire sequence of words (e.g., including the words that were subject to the deletion gesture) is highlighted. Thus, in some embodiments, if the user begins performing a particular command, the device will commit to that command even if the gesture transitions to another command. In some embodiments, the same applies for a gesture that begins as a deletion and transitions into a selection gesture (e.g., the system will perform a deletion command on the entire sequence of words that were interacted with).

FIGS. 8AA-8DD illustrate another exemplary process of interpreting handwritten input with both selection and deletion components. In FIG. 8AA, device 500 is displaying user interface 800 corresponding to a note taking application (similar to user interface 800 discussed in FIG. 8E and FIG. 8A). In FIG. 8BB, a user input is received from stylus 203 selecting a portion of pre-existing text 804 (e.g., "o'clock"), as shown in FIG. 8BB. In FIG. 8CC, the user continues the handwritten input (without lift-off) and begins to perform a gesture associated with the deletion command (e.g., vertical crossing out of the words "up at 6"). In some embodiments, the user has transitioned the handwritten input into providing a gesture ordinarily interpreted as a deletion command, so device 500 determines that the user now intends to perform the deletion command on the words on which the deletion command was received. For example, in FIG. 8DD, a lift-off of stylus 203 is detected and in response to the lift-off, a portion of the words are selected (e.g., "o'clock") and a portion of the words are deleted (e.g., "up at 6") corresponding to the portions that were subject to the selection and deletion gestures, respectively. Thus, in some embodiments, if the user begins performing a particular command and transitions to another command, the device will perform both commands on the respective portions of the pre-existing text. In some embodiments, as shown in FIG. 8DD, pop-up menu 812 includes an additional selectable option to undo the deletion of the portion of the pre-existing text that was deleted.

FIGS. 8EE-8II illustrate another exemplary process of interpreting handwritten input with both selection and deletion components. In FIG. 8EE, device 500 is displaying user interface 800 corresponding to a note taking application (similar to user interface 800 discussed in FIG. 8E and FIG. 8A). In FIG. 8FF, a user input is received from stylus 203 selecting a portion of pre-existing text 804 (e.g., "o'clock"), as shown in FIG. 8FF. In FIG. 8GG, the user continues the handwritten input (without lift-off) and begins to perform a gesture associated with the deletion command (e.g., vertical crossing out of the words "up at 6"). In some embodiments, the user has transitioned the handwritten input into providing a gesture ordinarily interpreted as a deletion command, so device 500 determines that the user now intends to perform the deletion command. In some embodiments, if the user has transitioned to the deletion command, then the entire sequence of words on which the selection and deletion gestures are performed will be deleted upon liftoff. Alternatively, in some embodiments, after the user has transitioned to the handwritten input, the system does not mark the entire sequence of words for deletion until the entire sequence of handwritten inputs comprises a majority of deletion gesture rather than selection gesture. For example, in FIG. 8HH, the user continues the handwritten input (without lift-off) and on the words "I woke". Thus, in some embodiments, the handwritten input has performed more of the deletion gesture than the selection gesture. In FIG. 8II, a lift-off of stylus 203 is detected and in response to the lift-off, the entire sequence of words (e.g., including the words that were subject to the selection gesture) is deleted. In some embodiments, as shown in FIG. 8II, concurrently with, after, or in response to deleting the sequence of words from pre-existing text 804, pop-up 816 is displayed for undoing the deletion command. In other words, pop-up 816 includes a selectable option (e.g., or itself is a selectable option) which is selectable to insert the deleted word(s) back into pre-existing text 804 in its original location, thus undoing the deletion command.

It is understood that the above-described deletion and selection gestures can be applied on a per-letter basis or a per-word basis. In other words, if a gesture is received on one or more letters of a word, then in some embodiments, only those one or more letters are subject to the respective selection or deletion command. In some embodiments, if a gesture is received on one or more letters of a word, then the entire word associated with the one or more letters is subject to the respective selection or deletion command.

FIGS. 8JJ-8MM illustrate an embodiment of receiving a handwritten input and replacing currently selected characters with the handwritten input. FIG. 8JJ illustrates user interface 800 with pre-existing font-based text 804 in text entry region 802. In FIG. 8JJ, a user input is received from stylus 203 passing through a portion of pre-existing text 804 (e.g., the word "woke"), such as a right-to-left strike through of "woke". In some embodiments, in response to the user input (optionally termination of the user input), pre-existing text 804 corresponding to the "woke" word is selected, as shown in FIG. 8KK (optionally according to the methods described above with respect to FIGS. 8B-8N).

In FIG. 8LL, while the word "woke" is selected, a handwritten input is received from stylus 203 writing the word "got" in text entry region 802. In some embodiments, while receiving the handwritten input, a representation of the handwritten input 820 is displayed in text entry region 802. In some embodiments, the handwritten input is received (e.g., at least partially) overlapping with the selected word by a threshold amount. For example, in FIG. 8LL, 50% of the handwritten input overlaps with the selected word. In some embodiments, the handwritten input is received within a threshold distance from the selected word (e.g., 0.5 inches, 1 inch, 3 inches, 5 inches, etc.). In some embodiments, the handwritten input is received at any location in text entry region 802 without regard to the distance from the selected word or the amount of overlap with the selected word.

In some embodiments, in response to receiving the handwritten input (optionally in response to a lift-off corresponding to the handwritten input (e.g., lift-off of stylus 203) and optionally after a threshold amount of time, such as 0.5 seconds, 1 second, 3 seconds, 5 seconds, etc.), the selected word "woke" is replaced with the characters corresponding to the handwritten input, as shown in FIG. 8MM. In FIG. 8MM, the handwritten input "got" is recognized and converted into font-based text (optionally in accordance with methods 700, 900, 1300, 1500, 1600, 1800, and 2000) before the word "woke" is replaced (e.g., "got" is converted into font-based text at the original location of the handwritten input, then moved to the location of the word "woke"). In some embodiments, the handwritten input "got" is recognized and converted concurrently with the replacement of the word "woke" (e.g., "got" is converted at the same time that the word "woke" is replaced without displaying a font-based version of "got" before the replacement). In some embodiments, the words of pre-existing text 804 are rearranged to have the proper character spacing with the newly inserted word. Thus, in some embodiments, while one or more characters are selected (e.g., highlighted), device 500 is able to receive handwritten input writing one or more characters and replace the selected characters with the newly written characters. In some embodiments, for the handwritten input to be identified as a request to replace the selected characters, the handwritten input must overlap with the selected characters by a threshold amount (e.g., 10% overlap, 30% overlap, 50% overlap, 75% overlap, etc.). In some embodiments, for the handwritten input to be identified as a request to replace the selected characters, the handwritten input must be within a threshold distance of the selected characters (e.g., 0.5 inches, 1 inch, 3 inches, 5 inches, etc.). In some embodiments, the handwritten input is recognized as a request to replace the selected characters without regard to the amount of overlap of the distance from the selected characters (e.g., as long as characters are currently selected). In some embodiments, the selected characters are only replaced if the device is currently in a text entry mode, such as a mode in which handwritten input is converted to font-based text as described in this disclosure (e.g., as opposed to a drawing mode).

FIGS. 9A-9G are flow diagrams illustrating a method 900 of interpreting handwritten inputs to select or delete text. The method 900 is optionally performed at an electronic device such as device 100, device 300, device 500, device 501, device 510, and device 591 as described above with reference to FIGS. 1A-1B, 2-3, 4A-4B and 5A-5I. Some operations in method 900 are, optionally combined and/or order of some operations is, optionally, changed.

As described below, the method 900 provides ways to interpret handwritten inputs to select or delete text. The method reduces the cognitive burden on a user when interacting with a user interface of the device of the disclosure, thereby creating a more efficient human-machine interface.

For battery-operated electronic devices, increasing the efficiency of the user's interaction with the user interface conserves power and increases the time between battery charges.

In some embodiments, an electronic device (e.g., an electronic device, a mobile device (e.g., a tablet, a smartphone, a media player, or a wearable device) including a touch screen, or a computer including a touch screen, such as device 100, device 300, device 500, device 501, or device 591) in communication with a touch-sensitive display displays (902), on the touch-sensitive display, a user interface including a first editable text string that includes one or more text characters, such as in FIG. 8A (e.g., an editable text field which already includes text). In some embodiments, the text in the editable text field was previously inputted by the user or was pre-populated without user input. In some embodiments, the pre-existing text in the editable text field is also editable (e.g., the text can be deleted, modified, moved, added to, etc.).

In some embodiments, while displaying the user interface, the electronic device receives (904), via the touch-sensitive display, a user input comprising a handwritten input corresponding to a line drawn through multiple text characters in the first editable text string, such as in FIG. 8B (e.g., receiving a handwritten input on the touch-sensitive display (e.g., using a stylus, finger, or other writing device) that passes through at least a portion of the text). In some embodiments, the input passes through the text string longitudinally (e.g., the input has substantially only horizontal components such that the input passes from the beginning of a part of the text string to the end of the part of the text string or vice versa). In some embodiments, the input passes through the text string transversely (e.g., the input has substantially vertical components such that the input passes across the text from top to bottom or vice versa). In some embodiments, the input has a combination of horizontal and vertical components. In some embodiments, depending on the input characteristics, the system interprets the input differently and performs different actions. In some embodiments, the line drawn through the multiple text characters is not necessarily straight and optionally includes twists, turns, squiggles, etc.

In some embodiments, in response to receiving the user input (906), in accordance with a determination that the handwritten input satisfies one or more first criteria, the electronic device initiates (908) a process to select the multiple text characters of the first editable text string, such as in FIG. 8D (e.g., if the line crosses out or passes through the editable text in the longitudinal direction (e.g., across the text in a left/right direction), then the input is interpreted as a selection input). In some embodiments, selecting the respective portion of the editable text includes highlighting the respective portion of the text. In some embodiments, a text edit menu or popup is displayed when (e.g., in response to) the respective portion of the editable text is highlighted. In some embodiments, the respective portion of the first editable text is the portion through which the handwritten input passed. In some embodiments, the respective portion of the first editable text does not include other portions of the first editable text through which the handwritten input has not passed. In some embodiments, if the handwritten input includes both longitudinal and transverse components, then only the portion of the text through which the handwritten input included longitudinal components is selected. In some embodiments, if the handwritten input began with longitudinal components and later included transverse components, then all of the text is selected (e.g., even the text through which the transverse components passed). In some embodiments, if the handwritten input includes both longitudinal and transverse components, then the input is interpreted based on which component comprises the majority of the input (e.g., if the input is mostly longitudinal, then the input is interpreted as a selection input and if the input is mostly transverse, then the input is interpreted as a deletion).

In some embodiments, in response to receiving the user input (906), in accordance with a determination that the handwritten input satisfies one or more second criteria, different than the first criteria, the electronic device initiates (910) a process to delete the multiple text characters of the first editable text string, such as in FIG. 8R (e.g., if the handwritten input crosses out or passes through the editable text in a transverse direction in a zigzag pattern (e.g., squiggled across the text in an up/down direction), then the input is interpreted as a deletion input). In some embodiments, the pattern of the handwritten input suggests a request to scratch out, cover up, cancel, or delete the text. In some embodiments, the portion of the editable text through which the handwritten input passed is deleted from the editable text (and other portions of the text are optionally not deleted). In some embodiments, a threshold number of transverse "passes" are required to interpret the input as a deletion (e.g., as if the user is crossing out the respective portion of the editable text). In some embodiments, if the handwritten input does not satisfy the threshold number of transverse "passes", then the handwritten input is neither interpreted as a deletion input nor as a selection input (e.g., the input is ignored, or the input results in drawing on the display without also causing a selection or deletion operation to be performed). For example, if the handwritten input has insufficient characteristics of a zigzag pattern or a strike-through pattern, then the system does not interpret the handwritten input as either a request to highlight text or a request to delete text.

The above-described manner of selecting or deleting text (e.g., by receiving a handwritten user input on editable text and interpreting the handwritten user input as a selection or deletion based on the characteristics of the input) allows the electronic device to provide the user with the ability to edit text (e.g., by accepting handwritten inputs and automatically determining whether the uses intends to select text or delete text based on the input gestures), which simplifies the interaction between the user and the electronic device and enhances the operability of the electronic device and makes the user-device interface more efficient (e.g., by allowing the user to use a handwritten input to either select and delete text without requiring the user to navigate to a separate user interface or menu to activate the selection function or the deletion function), which additionally reduces power usage and improves battery life of the electronic device by enabling the user to use the electronic device more quickly and efficiency.

In some embodiments, initiating the process to select the multiple text characters of the first editable text string includes displaying a representation of the line corresponding to the handwritten input with the multiple text characters in the first editable text string (912), such as in FIG. 8K (e.g., if the user is requesting to highlight text, displaying the trail of the line input on the display at the location where the input was received as the input is received). In some embodiments, as the user "draws" the line across the multiple text characters, the display shows the line being drawn at the location where the input was received. In some embodiments, after the user lifts-off from the touch screen, the line that has been drawn on the touch screen is converted into a straight line (e.g., if the line was not perfectly straight but still interpreted as a highlighting request, the line is snapped into a straight line). In some embodiments, the straight line is aligned to the bottom of the multiple text characters (e.g., similarly to underlining the multiple text characters).

The above-described manner of selecting (e.g., by displaying the user's input as the user is inputting it) allows the electronic device to provide the user with feedback on what characters the user is requesting to be selected (e.g., by providing a visual indication of where and what the user is interacting with), which simplifies the interaction between the user and the electronic device and enhances the operability of the electronic device and makes the user-device interface more efficient (e.g., by giving the user feedback on what characters are being identified for selection or deletion without requiring the user to guess or perform additional inputs to correct any errors in selection or deletion), which additionally reduces power usage and improves battery life of the electronic device by enabling the user to use the electronic device more quickly and efficiency, while reducing errors in the usage of the device.

In some embodiments, while displaying the representation of the line corresponding to the handwritten input with the multiple text characters in the first editable text string, the electronic device receives (914), via the touch-sensitive display, an input corresponding to selection of the line, such as in FIG. 8M (e.g., the line that was aligned to the bottom of the multiple text characters is selectable to cause selection of the line). In some embodiments, after receiving the input selecting the multiple characters, the multiple characters are not highlighted. In some embodiments, instead, the user is presented with the selectable option (e.g., the underline), which is selectable to cause the highlighting.

In some embodiments, in response to receiving the input corresponding to the selection of the line, the electronic device causes (916) the multiple text characters in the first editable text string to be selected for further action, such as in FIG. 8N (e.g., in response to the user selecting the line, the multiple characters are highlighted). In some embodiments, one or more selectable options are presented to the user to perform actions on the multiple text characters that are selected. For example, the actions include copying (e.g., copying the selected text into a clipboard), cutting (e.g., copying the selected text into a clipboard and deleting the selected text), pasting (e.g., replacing the selected text with content from the clipboard), deleting the selected text, and formatting (e.g., changing the formatting of the selected text such as changing font, changing font size, bolding, italicizing, underlining, etc.). In some embodiments, more or fewer actions are possible.

The above-described manner of selecting text (e.g., by displaying the user's input underlining the multiple characters that were selected to be highlighted and highlighting the words after receiving the user's selection of the line) allows the electronic device to provide the user with feedback on what characters the user is requesting to be selected (e.g., by providing a visual indication of what characters would be selected and giving the user the opportunity to confirm the selection), which simplifies the interaction between the user and the electronic device and enhances the operability of the electronic device and makes the user-device interface more efficient (e.g., by providing the user with the opportunity to confirm what characters would be selected or providing the user an opportunity to exit from selection mode without requiring the user to perform additional inputs to correct errors in selection or exit selection mode), which additionally reduces power usage and improves battery life of the electronic device by enabling the user to use the electronic device more quickly and efficiency, while reducing errors in the usage of the device.

In some embodiments, initiating the process to select the multiple text characters of the first editable text string includes selecting the multiple text characters in the first editable text string without displaying a representation of the line corresponding to the handwritten input with the multiple text characters (918), such as in FIG. 8D (e.g., selecting the multiple text characters as the user is performing the selection gesture through the multiple text characters). In some embodiments, the selection is occurring "live" as the user is selecting. In some embodiments, the trail of the line corresponding to the user's selection input is not shown (e.g., since there is already a visual indication of what is being selected). In some embodiments, the trail of the line is shown.

The above-described manner of selecting text (e.g., by selecting the multiple characters as the user is performing the selection input gesture) allows the electronic device to provide the user with feedback on what characters the user is requesting to be selected (e.g., by providing a visual indication of what characters would be selected), which simplifies the interaction between the user and the electronic device and enhances the operability of the electronic device and makes the user-device interface more efficient (e.g., by providing the user with the opportunity to see the selection occurring as the user is performing the input to confirm that the intended characters are being selected without requiring the user to perform additional inputs to correct errors in selection), which additionally reduces power usage and improves battery life of the electronic device by enabling the user to use the electronic device more quickly and efficiency, while reducing errors in the usage of the device.

In some embodiments, initiating the process to delete the multiple text characters of the first editable text string includes displaying the multiple text characters with a first value for a visual characteristic, and displaying a remainder of the first editable text string with a second value, different than the first value, for the visual characteristic while the user input is being received (920), such as in FIG. 8Q (e.g., as the user is performing the gesture for deleting text characters, updating the visual characteristics of the characters that have been so-far selected for deletion). For example, the characters that have been so-far selected for deletion are greyed out. In some embodiments, the characters that have been so-far selected for deletion are translucent (e.g., 75% transparency, 50% transparency, 25% transparency, etc.).

The above-described manner of deleting text (e.g., by changing the visual characteristics of the characters that have been selected by the user for deletion so far) allows the electronic device to provide the user with feedback on what characters the user is requesting to be deleted (e.g., by providing a visual indication of what characters would be deleted), which simplifies the interaction between the user and the electronic device and enhances the operability of the electronic device and makes the user-device interface more efficient (e.g., by providing the user with the opportunity to see what characters would be deleted as the user is performing the input to confirm that the intended characters will be deleted without requiring the user to perform additional inputs to correct errors in deletion), which additionally reduces power usage and improves battery life of the electronic device by enabling the user to use the electronic device more quickly and efficiency, while reducing errors in the usage of the device.

In some embodiments, while displaying the multiple text characters with the first value for the visual characteristic, and displaying the remainder of the first editable text string with the second value for the visual characteristic, the electronic device detects (922) liftoff of the user input, such as in FIG. 8R. In some embodiments, in response to detecting the liftoff of the user input, the electronic device ceases (924) display of the multiple text characters while maintaining display of the remainder of the first editable text string, such as in FIG. 8R (e.g., the multiple text characters that have been marked for deletion are deleted from the text string when the user lifts off from interacting with the touch screen). For example, if the user performed the deletion gesture using a stylus, then the deletion is executed (e.g., performed) when the user lifts the stylus off of the touch screen.

The above-described manner of deleting text (e.g., by performing the deletion after the user has lifted off from interacting with the touch screen) allows the electronic device to provide the user with the ability to confirm the text to be deleted before performing the deletion (e.g., by not deleting the text when the user performs the deletion gesture, but allowing the user to verify the text to be deleted and deleting the text after the user has lifted off, indicating confirmation of the deletion), which simplifies the interaction between the user and the electronic device and enhances the operability of the electronic device and makes the user-device interface more efficient (e.g., by providing the user with the opportunity to see what characters would be deleted to confirm that the intended characters will be deleted before lifting off to perform the deletion without requiring the user to perform additional inputs to correct errors in deletion), which additionally reduces power usage and improves battery life of the electronic device by enabling the user to use the electronic device more quickly and efficiency, while reducing errors in the usage of the device.

In some embodiments, before detecting the liftoff of the user input, the electronic device displays (926), with the first editable text string, a representation of the line corresponding to the handwritten input, such as in FIG. 8Q (e.g., displaying the trail of the user's input performing the deletion gesture on the text characters.). In some embodiments, in response to detecting the liftoff of the user input, the electronic device ceases (928) display of the line corresponding to the handwritten input, such as in FIG. 8R (e.g., when the deletion is performed (e.g., when the liftoff is detected), also remove the display of the trail of the user's input (e.g., the trail of the deletion gesture).

The above-described manner of deleting text (e.g., by removing the display of the handwritten input at the time that the deletion is performed) allows the electronic device to clear the display of executed gestures (e.g., by removing the representation of the deletion gesture at the time that the deletion is executed or after the deletion is executed), which simplifies the interaction between the user and the electronic device and enhances the operability of the electronic device and makes the user-device interface more efficient (e.g., by providing the user with multiple visual indications that the deletion has been performed including removing the residual handwritten gesture), which additionally reduces power usage and improves battery life of the electronic device by enabling the user to use the electronic device more quickly and efficiency.

In some embodiments, after initiating the process to delete the multiple text characters of the first editable text string (930), in accordance with a determination that the handwritten input extends more than a threshold distance (e.g., 0.5 cm, 1 cm, 2 cm, 5 cm) away from the multiple text characters of the first editable text string, the electronic device cancels (932) the process to delete the multiple text characters of the first editable text string, such as in FIG. 8V (e.g., after the user has begun performing the deletion gesture, receiving further handwritten user input indicating that the user wants to cancel the deletion function). For example, if the user pulls the handwritten user input away from the text that has been marked for deletion (e.g., vertically and/or horizontally), then the system optionally recognizes that the user is requesting to cancel the deletion function. In some embodiments, in response to receiving a request to cancel the deletion, the deletion is not performed when the user lifts off In some embodiments, in response to receiving a request to cancel the deletion, the color and/or opacity of the characters that are marked for deletion are restored to their original color and/or opacity, respectively. In some embodiments, if the user does not extend the handwritten input away from the text characters, then the system determines that the user is still requesting to delete the text characters (e.g., the user is not requesting to cancel the deletion) and the deletion process continues.

The above-described manner of canceling deletion of text (e.g., by interpreting the user's gesture extending the input away from the text characters by a certain threshold distance as a request to cancel the deletion function) allows the electronic device to provide the user with the opportunity to cancel deleting text (e.g., by accepting input that extends away from the characters that have been marked for deletion as a request to cancel the deletion process), which simplifies the interaction between the user and the electronic device and enhances the operability of the electronic device and makes the user-device interface more efficient (e.g., by providing the user with an opportunity to cancel the deletion function without requiring the user to re-enter all of the text that the user was not intending to delete), which additionally reduces power usage and improves battery life of the electronic device by enabling the user to use the electronic device more quickly and efficiency.

In some embodiments, while receiving the user input, the electronic device displays (934), with the first editable text string, a representation of the line corresponding to the handwritten input with a first value for a visual characteristic, such as in FIG. 8P. In some embodiments, in response to receiving the user input (936), in accordance with the determination that the handwritten input satisfies the one or more second criteria, the electronic device displays (938) the representation of the line corresponding to the handwritten input with a second value, different than the first value, for the visual characteristic, such as in FIG. 8Q (e.g., when the handwritten input is detected as a deletion request, the representation (e.g., trail) of the handwritten input is changed to indicate that the system has determined the handwritten input to be a deletion request). In some embodiments, the representation of the handwritten input is updated to have the same visual characteristic that the text that has been marked for deletion. For example, the representation is updated to be greyed out. In some embodiments, the representation is updated to be translucent (e.g., 75% transparency, 50% transparency, 25% transparency, etc.).

The above-described manner of deleting text (e.g., by changing the visual characteristics of the representation of the user's handwriting input) allows the electronic device to provide the user with feedback that the user's input has been properly interpreted as a request to delete text (e.g., by providing a visual indication that the user's input gesture has been processed and interpreted as a deletion request), which simplifies the interaction between the user and the electronic device and enhances the operability of the electronic device and makes the user-device interface more efficient (e.g., by providing the user with feedback at the time at which the user's input is recognized and interpreted as a deletion request and providing the user with the visual feedback that the characters over which the gesture is overlapping would be deleted), which additionally reduces power usage and improves battery life of the electronic device by enabling the user to use the electronic device more quickly and efficiency, while reducing errors in the usage of the device.

In some embodiments, initiating the process to delete the multiple text characters of the first editable text string includes deleting the multiple text characters of the first editable text string (940), such as in FIG. 8R. In some embodiments, in response to deleting the multiple text characters of the first editable text string, the electronic device displays (942), in the user interface, a selectable option for undoing the deletion of the multiple text characters of the first editable text string, such as in FIG. 8R (e.g., after executing the deletion of the multiple characters, provide the user with a popup or dialog box with a selectable option that is selectable to undo the deletion of the multiple characters). In some embodiments, the popup or dialog box is displayed at or near the position of the characters that were deleted. In some embodiments, in response to selection of the selectable option for undoing the deletion, the multiple text characters are re-displayed and inserted back in their original positions.

The above-described manner of providing a deletion undo function (e.g., by displaying a selectable option for undoing the deletion) allows the electronic device to provide the user with the option to undo the deletion (e.g., by providing a selectable option that is selectable to undo the deletion), which simplifies the interaction between the user and the electronic device and enhances the operability of the electronic device and makes the user-device interface more efficient (e.g., by providing the user with the option to undo the deletion without requiring the user to manually re-enter all of the text that was deleted), which additionally reduces power usage and improves battery life of the electronic device by enabling the user to use the electronic device more quickly and efficiency, while reducing errors in the usage of the device.

In some embodiments, initiating the process to select the multiple text characters of the first editable text string includes selecting the multiple text characters of the first editable text string (944), such as in FIG. 8D (e.g., visually highlighting the multiple text characters that have been marked by the user as to be selected). In some embodiments, in response to selecting the multiple text characters of the first editable text string, the electronic device displays (946), in the user interface, one or more selectable options for performing respective operations with respect to the multiple text characters of the first editable text string, such as in FIG. 8D (e.g., providing or displaying a pop-up or dialog box with one or more options for performing one or more operations on the selected text). For example, the operations include copying the selected text into a clipboard, cutting the selected text (e.g., copying the selected text into a clipboard and concurrently deleting the text), replacing the selected text with the contents of the clipboard (e.g., paste), and/or changing one or more font characteristics of the selected text (e.g., size, font, bold, italics, underline, strikethrough, etc.).

The above-described manner of providing function related to the selected text (e.g., by displaying a user interface with selectable options to perform certain functions to or with the selected text) allows the electronic device to provide the user with options for interacting with the selected text (e.g., by, after selecting the selected text, displaying one or more selectable options for performing one or more functions, respectively, on the selected text), which simplifies the interaction between the user and the electronic device and enhances the operability of the electronic device and makes the user-device interface more efficient (e.g., by automatically providing the user with functions to perform on the selected text without requiring the user to perform additional inputs or navigate to a separate user interface to perform the same functions), which additionally reduces power usage and improves battery life of the electronic device by enabling the user to use the electronic device more quickly and efficiency.

In some embodiments, the process to select the multiple text characters of the first editable text string includes selecting the multiple text characters of the first editable text string before detecting liftoff of the user input (948), such as in FIG. 8G (e.g., performing or executing the selection of the multiple text characters is performed before liftoff of the user input). In some embodiments, the selection is performed while receiving the gesture. In some embodiments, the process to delete the multiple text characters of the first editable text string includes deleting the multiple text characters of the first editable text string after detecting liftoff of the user input (950), such as in FIG. 8R (e.g., performing or executing the deletion of the multiple text characters is performed after detecting liftoff of the user input).

The above-described manner of selecting and deleting text (e.g., by performing the selection functions before detecting a liftoff, but performing the deletion function after detecting liftoff) allows the electronic device to perform the selection or deletion at the appropriate time (e.g., by performing selection while receiving the selection gesture but performing the deletion after the user has had a chance to confirm the text that the user wants to delete and cancel the deletion if appropriate), which simplifies the interaction between the user and the electronic device and enhances the operability of the electronic device and makes the user-device interface more efficient (e.g., by providing the user the opportunity to confirm a deletion before performing the deletion but selecting content as the user is performing the selection gesture because selection is less intrusive than deletion), which additionally reduces power usage and improves battery life of the electronic device by enabling the user to use the electronic device more quickly and efficiency, while reducing errors in the usage of the device.

In some embodiments, after initiating a respective process of the process to delete the multiple text characters and the process to select the multiple text characters, and before detecting liftoff of the user input, the electronic device receives (952), via the touch-sensitive display, additional handwritten input, such as in FIG. 8Y (e.g., after receiving deletion gesture and recognizing the gesture as a deletion, receiving further handwritten input). In some embodiments, the further handwritten input is a continuation of the deletion gesture to delete more characters. In some embodiments, the further handwritten input is not a deletion gesture. In some embodiments, the further handwritten input is a selection gesture.

In some embodiments, in response to receiving the additional handwritten input, the electronic device continues (954) to perform the respective process based on the additional handwritten input independent of whether the additional handwritten input satisfies the one or more first criteria or the one or more second criteria, such as in FIG. 8Z (e.g., despite the additional handwritten input being a selection gesture or any other gesture, interpreting the entirety of the handwritten input as a deletion command). In some embodiments, ignoring that the user has switched to a different type of gesture and continuing as if the user is requesting deletion. In some embodiments, the text that the additional handwritten input is directed to is also deleted along with the text that was marked for deletion by the initial handwritten input. In some embodiments, the same process described above applies to when the handwritten input begins as a selection gesture and becomes a different gesture, such as a deletion gesture (e.g., continuing to perform a selection despite the additional input being a deletion gesture).

The above-described manner of selecting and deleting text (e.g., by performing a selection function or a deletion function if the handwritten input begins as a selection or deletion gesture, respectively) allows the electronic device to provide the user with certainty on the function that is performed (e.g., by committing to a particular function regardless of how the input gesture evolves from the initial gesture), which simplifies the interaction between the user and the electronic device and enhances the operability of the electronic device and makes the user-device interface more efficient (e.g., by allowing the user to begin the gesture and then still accepting further inputs to perform the initial function even if the further input deviates from the initial gesture), which additionally reduces power usage and improves battery life of the electronic device by enabling the user to use the electronic device more quickly and efficiency, while reducing errors in the usage of the device.

In some embodiments, after initiating a respective process of the process to delete the multiple text characters and the process to select the multiple text characters, and before detecting liftoff of the user input, the electronic device receives (956), via the touch-sensitive display, additional handwritten input, such as in FIG. 8Y (e.g., after receiving deletion gesture or selection gesture and recognizing the gesture as a deletion or selection, respectively, receiving further handwritten input). In some embodiments, the further handwritten input is a continuation of the same gesture. In some embodiments, the further handwritten input is a different gesture. For example, the handwritten input begins as a selection gesture and then becomes a deletion gesture or the handwritten input begins as a deletion gesture and becomes a selection gesture.

In some embodiments, in response to receiving the additional handwritten input (958), in accordance with a determination that the additional handwritten input satisfies one or more first respective criteria, the electronic device performs (960) a selection process based on the handwritten input and the additional handwritten input, such as in FIG. 8Z (e.g., performing a selection function over the entirety of the handwritten inputs (e.g., both the initial handwritten input and the additional handwritten input)). In some embodiments, the first criteria is satisfied if the additional handwritten input is a selection gesture of a certain threshold (e.g., across a threshold number of characters (e.g., 3 characters, 5 characters, 1 word, 2 words, etc.) or for a threshold amount of time (e.g., 0.5 seconds, 1 second, 2 seconds, 3 seconds, 5 seconds)). In some embodiments, the first criteria is satisfied if the additional handwritten input causes the majority of the entirety of the handwritten input (e.g., the initial handwritten input and the additional handwritten input) to be a selection gesture rather than a deletion gesture (e.g., the additional handwritten input causes the majority of the entire handwritten input to be a selection gesture or the additional handwritten input does not cause the majority of the handwritten to no longer be a selection gesture).

In some embodiments, in response to receiving the additional handwritten input (958), in accordance with a determination that the additional handwritten input satisfies one or more second respective criteria, the electronic device performs (962) a deletion process based on the handwritten input and the additional handwritten input, such as in FIG. 8HH (e.g., performing a deletion function over the entirety of the handwritten inputs (e.g., both the initial handwritten input and the additional handwritten input)). In some embodiments, the second criteria is satisfied if the additional handwritten input is a deletion gesture of a certain threshold (e.g., across a threshold number of characters (e.g., 3 characters, 5 characters, 1 word, 2 words, etc.) or for a threshold amount of time (e.g., 0.5 seconds, 1 second, 2 seconds, 3 seconds, 5 seconds)). In some embodiments, the second criteria is satisfied if the additional handwritten input causes the majority of the entirety of the handwritten input (e.g., the initial handwritten input and the additional handwritten input) to be a deletion gesture rather than a selection gesture (e.g., the additional handwritten input causes the majority of the entire handwritten input to be a deletion gesture or the additional handwritten input does not cause the majority of the handwritten to no longer be a deletion gesture).

The above-described manner of selecting and deleting text (e.g., by performing a selection function if the entirety of the handwritten satisfies a first criteria and performing a deletion function if the entirety of the handwritten input satisfies a second criteria) allows the electronic device to provide the user with the ability to change the function to be performed on-the-fly (e.g., by interpreting the handwritten input as a whole when determining whether the user is requesting to perform a deletion or selection option), which simplifies the interaction between the user and the electronic device and enhances the operability of the electronic device and makes the user-device interface more efficient (e.g., by allowing the user to begin with a particular gesture and switch to another gesture if the user changes his or her mind and performing the function that the user is requesting based on the user's gestures), which additionally reduces power usage and improves battery life of the electronic device by enabling the user to use the electronic device more quickly and efficiency, while reducing errors in the usage of the device.

In some embodiments, the one or more first criteria are satisfied when the handwritten input strikes through the multiple text characters of the first editable text string along a direction of the first editable text string (964), such as in FIG. 8C (e.g., the handwritten input is interpreted as a request to select text if the handwritten input strikes through the text). In some embodiments, if a horizontal (or substantially horizontal) handwritten input crosses through the text, then the handwritten input is interpreted as a request to select the crossed-through text.

In some embodiments, the one or more second criteria are satisfied when the handwritten input crosses out the multiple text characters of the first editable text string along a direction perpendicular to the direction of the first editable text string (966), such as in FIG. 8Q (e.g., the handwritten input is interpreted as a request to delete text if the handwritten input crosses through the text in an up-and-down motion that is perpendicular to the direction of the text (including a minor lateral motion to cross through multiple characters and/or words)). In some embodiments, if the first criteria is satisfied, the second criteria is not satisfied and vice versa. In some embodiments, the system either performs a selection command or a deletion command but not both.

The above-described manner of selecting and deleting text (e.g., by performing a selection function if the handwritten input strikes through multiple text characters and performing a deletion function if the handwritten input crosses through the multiple text characters vertically) allows the electronic device to provide the user with the ability to use the same input device to either select or delete text (e.g., by interpreting the handwritten input as selection or deletion based on the gesture performed by the handwritten input), which simplifies the interaction between the user and the electronic device and enhances the operability of the electronic device and makes the user-device interface more efficient (e.g., by interpreting the handwritten input as a selection request or a deletion request based on the characteristics of the handwritten input, without requiring the user to navigate to a separate user interface to enable or disable selection or deletion functions), which additionally reduces power usage and improves battery life of the electronic device by enabling the user to use the electronic device more quickly and efficiency, while reducing errors in the usage of the device.

In some embodiments, the one or more first criteria are satisfied when the handwritten input underlines the multiple text characters of the first editable text string (968), such as in FIG. 8G (e.g., the handwritten input is interpreted as a request to select text if the handwritten input underlines the text). In some embodiments, the one or more second criteria are satisfied when the handwritten input crosses out the multiple text characters of the first editable text string (970), such as in FIG. 8Q (e.g., the handwritten input is interpreted as a request to delete text if the handwritten input crosses through the text in an up-and-down motion that is perpendicular to the direction of the text (including a minor lateral motion to cross through multiple characters and/or words)). In some embodiments, if a horizontal (or substantially horizontal) handwritten input passes underneath the text, then the handwritten input is interpreted as a request to select the underlined text. In some embodiments, if the first criteria is satisfied, the second criteria is not satisfied and vice versa. In some embodiments, the system either performs a selection command or a deletion command but not both.

The above-described manner of selecting and deleting text (e.g., by performing a selection function if the handwritten input underlines multiple text characters and performing a deletion function if the handwritten input crosses through the multiple text characters vertically) allows the electronic device to provide the user with the ability to use the same input device to either select or delete text (e.g., by interpreting the handwritten input as selection or deletion based on the gesture performed by the handwritten input), which simplifies the interaction between the user and the electronic device and enhances the operability of the electronic device and makes the user-device interface more efficient (e.g., by interpreting the handwritten input as a selection request or a deletion request based on the characteristics of the handwritten input, without requiring the user to navigate to a separate user interface to enable or disable selection or deletion functions), which additionally reduces power usage and improves battery life of the electronic device by enabling the user to use the electronic device more quickly and efficiency, while reducing errors in the usage of the device.

In some embodiments, the handwritten input traverses the multiple text characters of the first editable text string (972), such as in FIG. 8G (e.g., the handwritten input is interacting with the characters. In some embodiments, the handwritten input passes through or crosses through one or more letters of one or more words.). In some embodiments, the one or more first criteria are satisfied in accordance with a determination that a probability that the handwritten input corresponds to an input crossing out the multiple text characters is less than a probability threshold (974), such as in FIG. 8G (e.g., the handwritten input is interpreted as a request to select the text if the characteristics of the handwritten input does not satisfy the criteria required to be interpreted as a request to delete text). In some embodiments, the system is biased to interpret an uncertain gesture as a selection input rather than a deletion input. In some embodiments, if the handwritten input interacts with a subset of the letters of the word, then the entire word is selected. In some embodiments, if the handwritten input interacts with a subset of the letters of a word, then only the subset of letters is selected.

In some embodiments, the one or more second criteria are satisfied in accordance with a determination that the probability that the handwritten input corresponds to an input crossing out the multiple text characters is greater than the probability threshold (976), such as in FIG. 8Q (e.g., the handwritten input is interpreted as a request to delete text if the characteristics of the handwritten input are interpreted to match the criteria required for interpreting the handwritten text as a request to delete text by at least a certain confidence or probability threshold (e.g., 75%, 80%, 90% probability that the gesture corresponds to a request to delete text)). In some embodiments, if the first criteria is satisfied, the second criteria is not satisfied and vice versa. In some embodiments, the system either performs a selection command or a deletion command but not both.

The above-described manner of selecting and deleting text (e.g., by performing a selection function if the handwritten input interacts with multiple text characters in a way that does not satisfy the deletion criteria and performing a deletion function if the handwritten input interacts with the text characters in a way that does satisfy the deletion criteria) allows the electronic device to provide the user with the ability to use the same input device to either select or delete text (e.g., by interpreting the handwritten input as selection unless the confidence that the handwritten input is a request to delete text is above a certain threshold level), which simplifies the interaction between the user and the electronic device and enhances the operability of the electronic device and makes the user-device interface more efficient (e.g., by defaulting to interpreting the handwritten input as a selection, without requiring the user to navigate to a separate user interface to enable or disable selection or deletion functions), which additionally reduces power usage and improves battery life of the electronic device by enabling the user to use the electronic device more quickly and efficiency, while reducing errors in the usage of the device.

In some embodiments, the one or more first criteria are satisfied when the handwritten input comprises a double tap on the multiple text characters of the first editable text string (978), such as in FIG. 8G (e.g., the handwritten input is interpreted as a request to select text if the input comprises two tap inputs in quick succession (e.g., within 0.2 seconds, 0.5 seconds, 0.7 seconds, 1 second, etc.) on a respective word). In some embodiments, double tapping a word causes selection of the entire word (e.g., as opposed to only certain letters of the word).

In some embodiments, the one or more second criteria are satisfied when the handwritten input crosses through two or more of the multiple text characters of the first editable text string (980), such as in FIG. 8Q (e.g., the handwritten input is interpreted as a request to delete text if the handwritten input crosses through the text in an up-and-down motion that is perpendicular to the direction of the text (including a minor lateral motion to cross through multiple characters and/or words)). In some embodiments, if the first criteria is satisfied, the second criteria is not satisfied and vice versa. In some embodiments, the system either performs a selection command or a deletion command but not both.

The above-described manner of selecting and deleting text (e.g., by performing a selection function if the handwritten input double taps on a word and performing a deletion function if the handwritten input crosses through the multiple text characters vertically) allows the electronic device to provide the user with the ability to use the same input device to either select or delete text (e.g., by interpreting the handwritten input as selection or deletion based on the gesture performed by the handwritten input), which simplifies the interaction between the user and the electronic device and enhances the operability of the electronic device and makes the user-device interface more efficient (e.g., by interpreting the handwritten input as a selection request or a deletion request based on the characteristics of the handwritten input, without requiring the user to navigate to a separate user interface to enable or disable selection or deletion functions), which additionally reduces power usage and improves battery life of the electronic device by enabling the user to use the electronic device more quickly and efficiency, while reducing errors in the usage of the device.

In some embodiments, the one or more first criteria are satisfied when the handwritten input moves in a closed (or substantially closed) shape that encloses at least a portion of the multiple text characters of the first editable text string (982), such as in FIG. 8G (e.g., the handwritten input is interpreted as a request to select text if the input comprises a gesture encircling a word). In some embodiments, if the gesture encircles only a subset of the letters of a word, the entire word is selected. In some embodiments, if the gesture encircles only a subset of the letters of a word, only the letters that are captured by the encircling are selected.

In some embodiments, the one or more second criteria are satisfied when the handwritten input crosses through two or more of the multiple text characters of the first editable text string (984), such as in FIG. 8Q (e.g., the handwritten input is interpreted as a request to delete text if the handwritten input crosses through the text in an up-and-down motion that is perpendicular to the direction of the text (including a minor lateral motion to cross through multiple characters and/or words)). In some embodiments, if the first criteria is satisfied, the second criteria is not satisfied and vice versa. In some embodiments, the system either performs a selection command or a deletion command and not both.

The above-described manner of selecting and deleting text (e.g., by performing a selection function if the handwritten input circles multiple text characters and performing a deletion function if the handwritten input crosses through the multiple text characters vertically) allows the electronic device to provide the user with the ability to use the same input device to either select or delete text (e.g., by interpreting the handwritten input as selection or deletion based on the gesture performed by the handwritten input), which simplifies the interaction between the user and the electronic device and enhances the operability of the electronic device and makes the user-device interface more efficient (e.g., by interpreting the handwritten input as a selection request or a deletion request based on the characteristics of the handwritten input, without requiring the user to navigate to a separate user interface to enable or disable selection or deletion functions), which additionally reduces power usage and improves battery life of the electronic device by enabling the user to use the electronic device more quickly and efficiency, while reducing errors in the usage of the device.

In some embodiments, while the multiple text characters in the first editable text string are selected (e.g., while the multiple text characters are highlighted), the device receives (986), via the touch-sensitive display, a user input comprising a handwritten input, such as in FIG. 8LL (e.g., handwritten input writing one or more handwritten characters at a location corresponding to the multiple text characters of the first editable text string). In some embodiments, the handwritten input at least partially overlaps the multiple text characters of the first editable text string (e.g., 10% overlap, 20% overlap, 50% overlap, 75% overlap, etc.), or is within a threshold distance of the multiple text characters of the first editable text string (e.g., within 0.25 cm, 0.5 cm, 1 cm, 3 cm, 5 cm, etc. of the multiple text characters of the first editable text string). In some embodiments, the handwritten input does not need to overlap the multiple text characters of the first editable text string. In some embodiments, the handwritten input need not be within a threshold distance of the multiple text characters of the first editable text string.

In some embodiments, in response to receiving the user input (988), the device replaces (990) the multiple text characters in the first editable text string with respective editable text corresponding to the handwritten input, such as the replacement of the word "woke" with the word "got" in FIG. 8MM (e.g., deleting the multiple text characters of the first editable text string and replacing it with text (e.g., font-based text) corresponding to the handwritten input).

In some embodiments, the handwritten input is converted to font-based text as described above with respect to methods 700, 1100, 1300, 1500, 1600, 1800, and/or 2000. In some embodiments, while receiving the handwritten input, the device displays a representation of the handwritten input (e.g., concurrently with the respective portion of the first editable text string) before converting the handwritten input to font-based text as described above with respect to methods 700, 1100, 1300, 1500, 1600, 1800, and/or 2000. In some embodiments, the respective portion of the first editable text string is replaced with font-based text corresponding to the handwritten input at the same time or after the handwritten input is converted to font-based text. In some embodiments, the newly inserted text is selected (e.g., highlighted). In some embodiments, the newly inserted text is not selected (e.g., not highlighted). In some embodiments, the characters immediately to the left and right of the replaced text is re-positioned to provide space for the newly inserted text (e.g., to provide the respective amount of character space). In some embodiments, if the handwritten input is not directed to the location corresponding to the respective portion of the first editable text string (e.g., does not satisfy the overlapping and/or threshold distance criteria), the electronic device does not replace the respective portion of the editable text string with font-based text corresponding to the handwritten input—in such embodiments, the electronic device optionally responds to the handwritten input such as described in methods 700, 1100, 1300, 1500, 1600, 1800, and/or 2000 (e.g., inserts the handwritten input at the respective location and converts to font-based text).

The above-described manner of replacing text (e.g., by receiving handwritten user input at or near selected text)

provides a quick and efficient manner of replacing text using handwritten input, thus simplifying the interaction between the user and the electronic device and enhancing the operability of the electronic device and makes the user-device interface more efficient (e.g., by allowing the user to select characters to be replaced and directly writing characters to replace the selected characters with the newly written characters without requiring the user to perform additional inputs to delete the undesired characters before inserting new characters), which additionally reduces power usage and improves battery life of the electronic device by enabling the user to use the electronic device more quickly and efficiency, while reducing errors in the usage of the device.

It should be understood that the particular order in which the operations in FIGS. 9A-9G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, 1300, 1500, 1600, 1800, 2000, and 2200) are also applicable in an analogous manner to method 900 described above with respect to FIGS. 9A-9G. For example, the selection and deletion of text using a stylus described above with reference to method 900 optionally have one or more of the characteristics of the acceptance and/or conversion of handwritten inputs, inserting handwritten inputs into pre-existing text, managing the timing of converting handwritten text into font-based text, presenting handwritten entry menus, controlling the characteristics of handwritten input, presenting autocomplete suggestions, and converting handwritten input to font-based text, displaying options in a content entry palette, etc., described herein with reference to other methods described herein (e.g., methods 700, 1100, 1300, 1500, 1600, 1800, 2000, and 2200). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 9A-9G are, optionally, implemented by components depicted in FIGS. 1A-1B. For example, displaying operations 902, 926, 934, 938, 942, and 946, receiving operations 904, 914, 952, 956, and 986, and initiating operations 908, 910 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Inserting Text Using a Stylus

Users interact with electronic devices in many different manners, including entering text into the electronic device. In some embodiments, an electronic device displays text in a text field or a text region. The embodiments described below provide ways in which an electronic device inserts text into pre-existing text using a handwriting input device (e.g., a stylus). Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 10A:
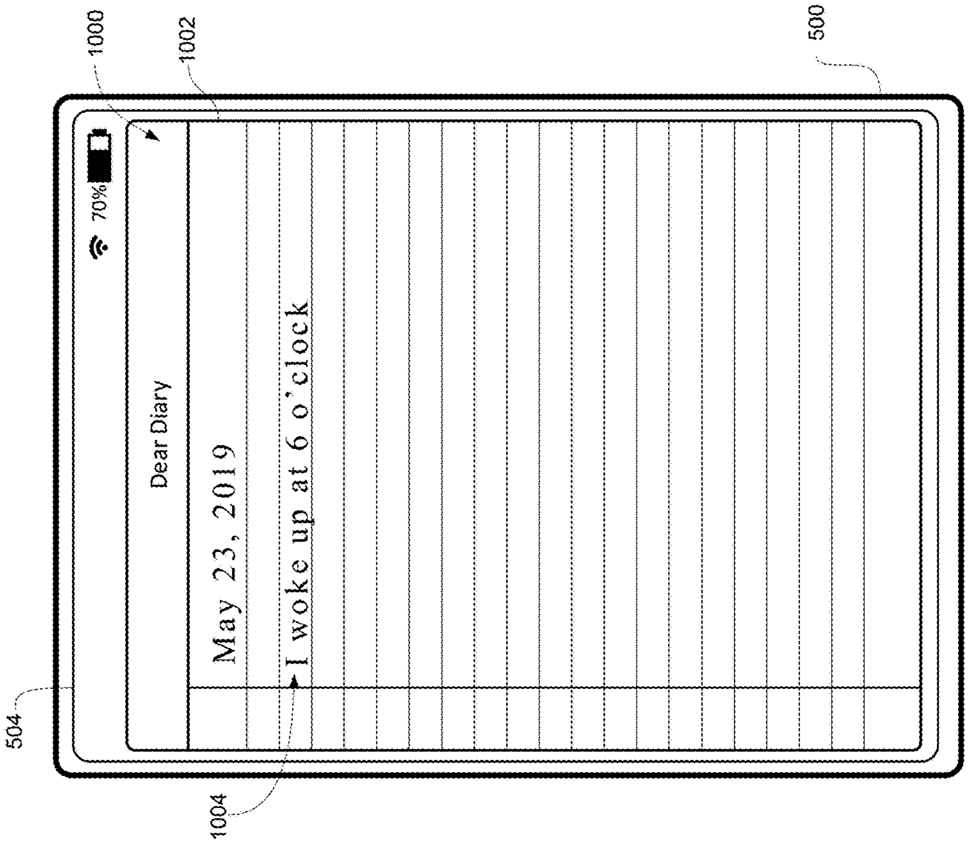
FIGS. 10A-10SSS illustrate exemplary ways in which an electronic device inserts handwritten inputs into pre-existing text in accordance with some embodiments.
Figure 10C:
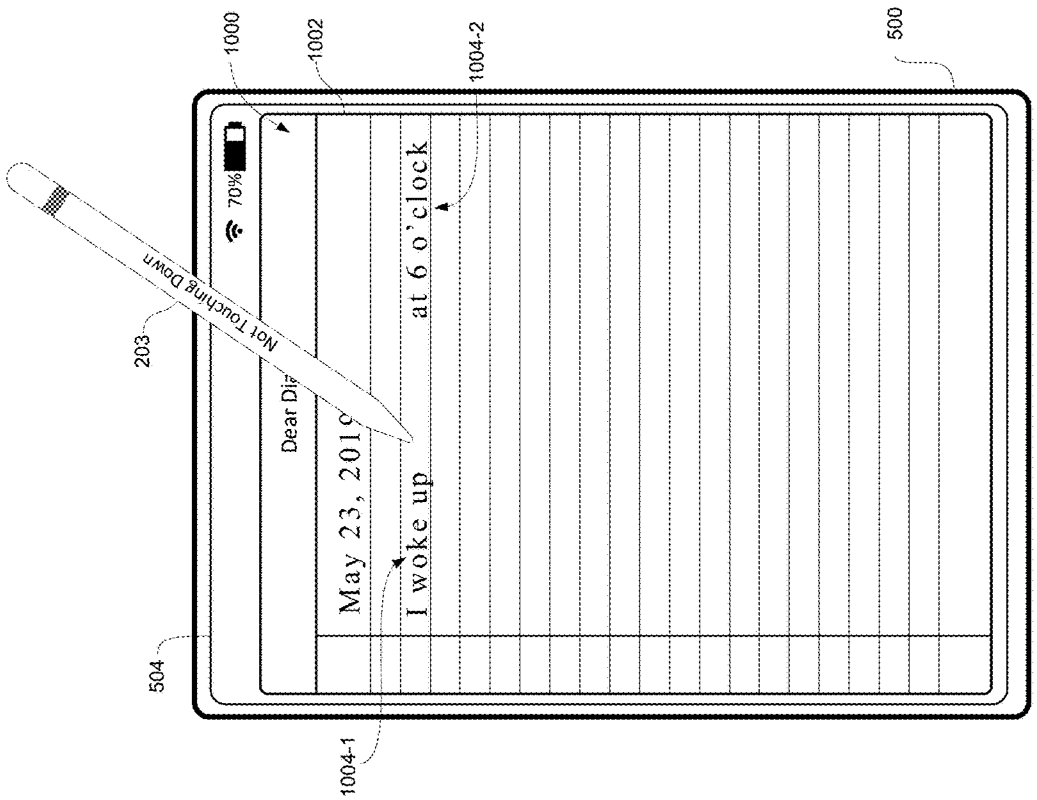
Figure 10B:
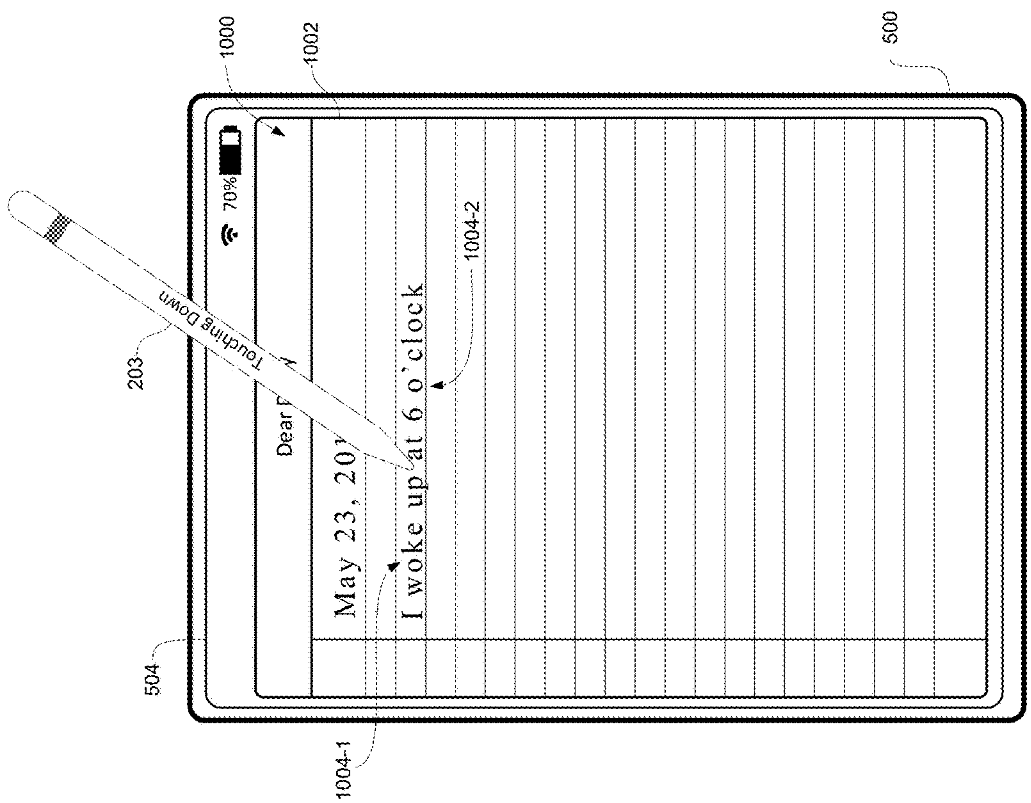
Figure 10E:
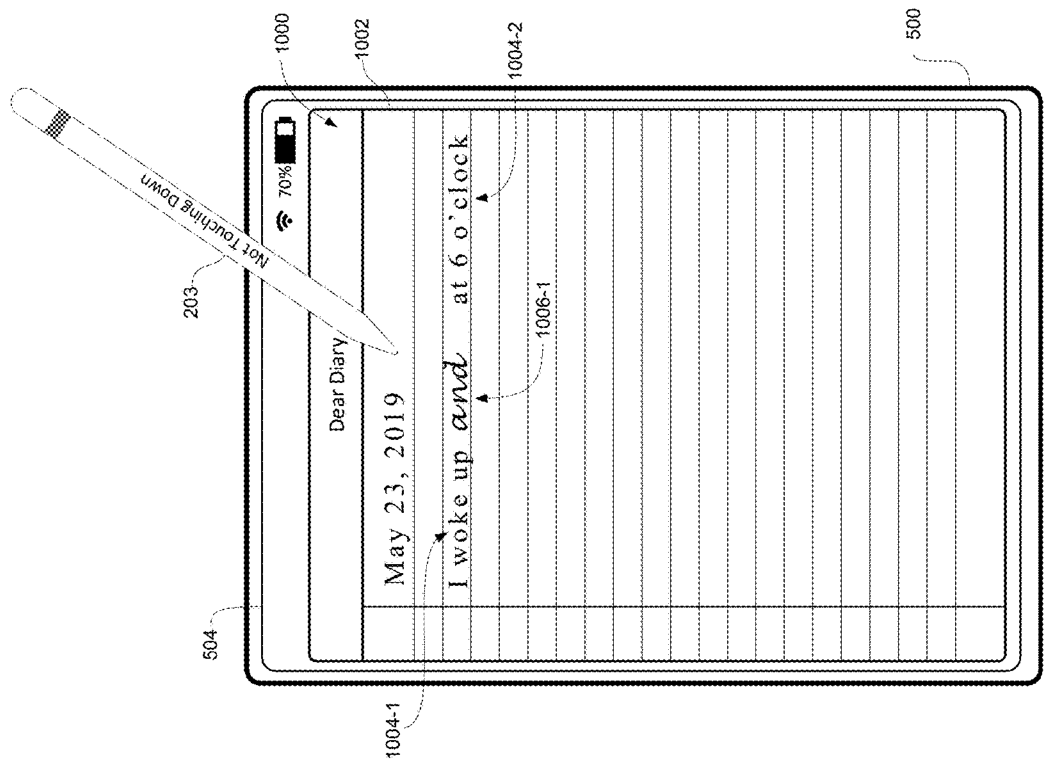
Figure 10D:
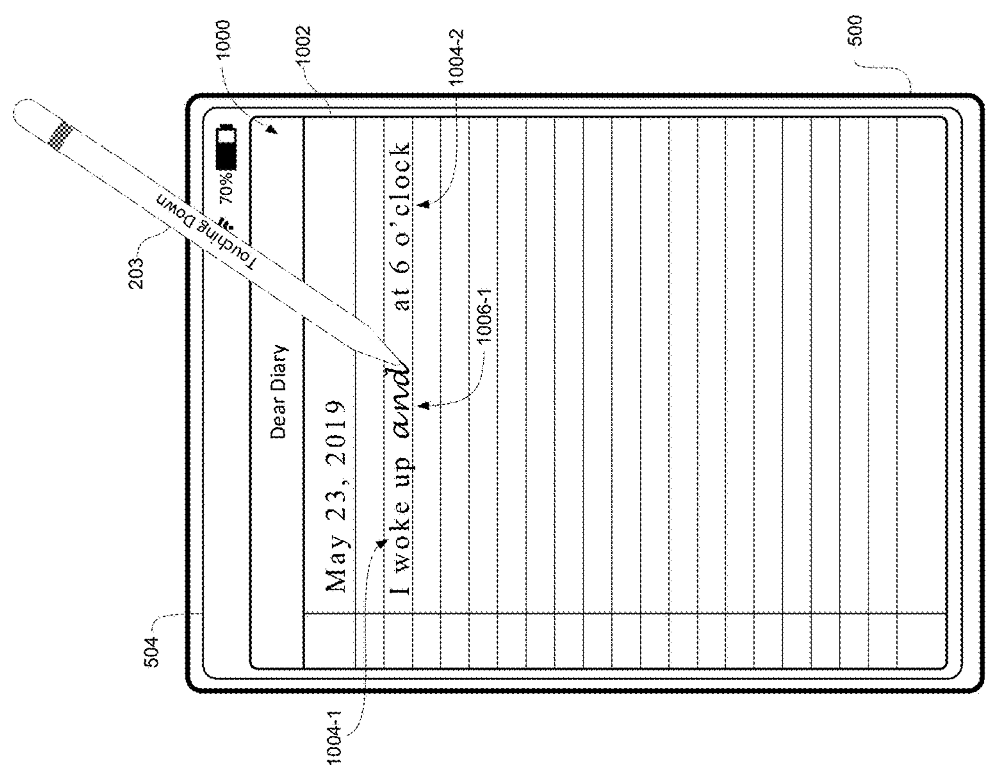
Figure 10G:
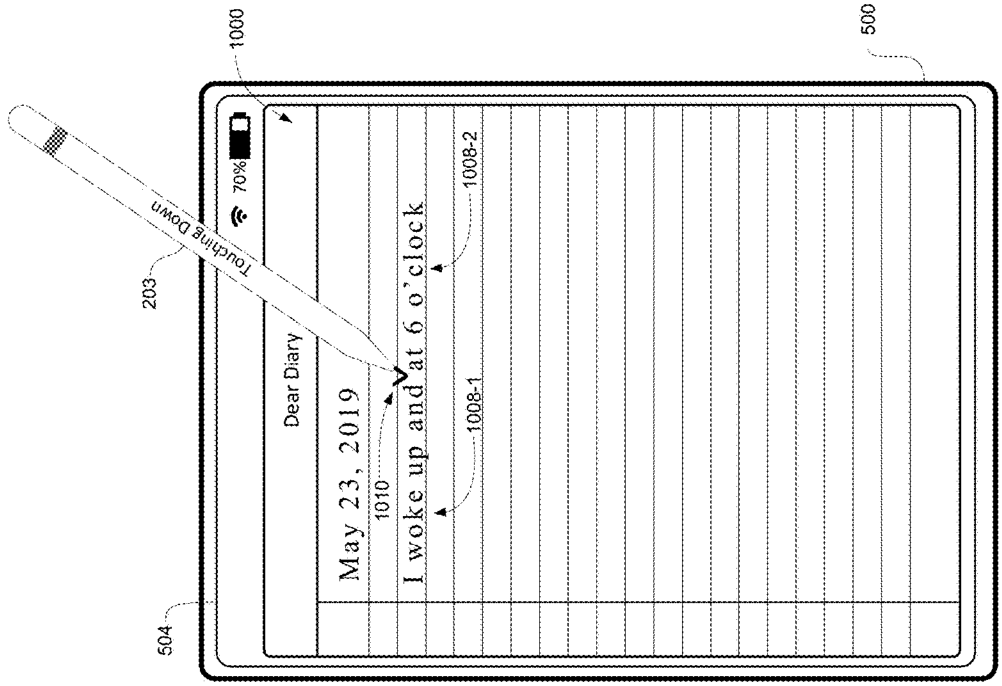
Figure 10F:
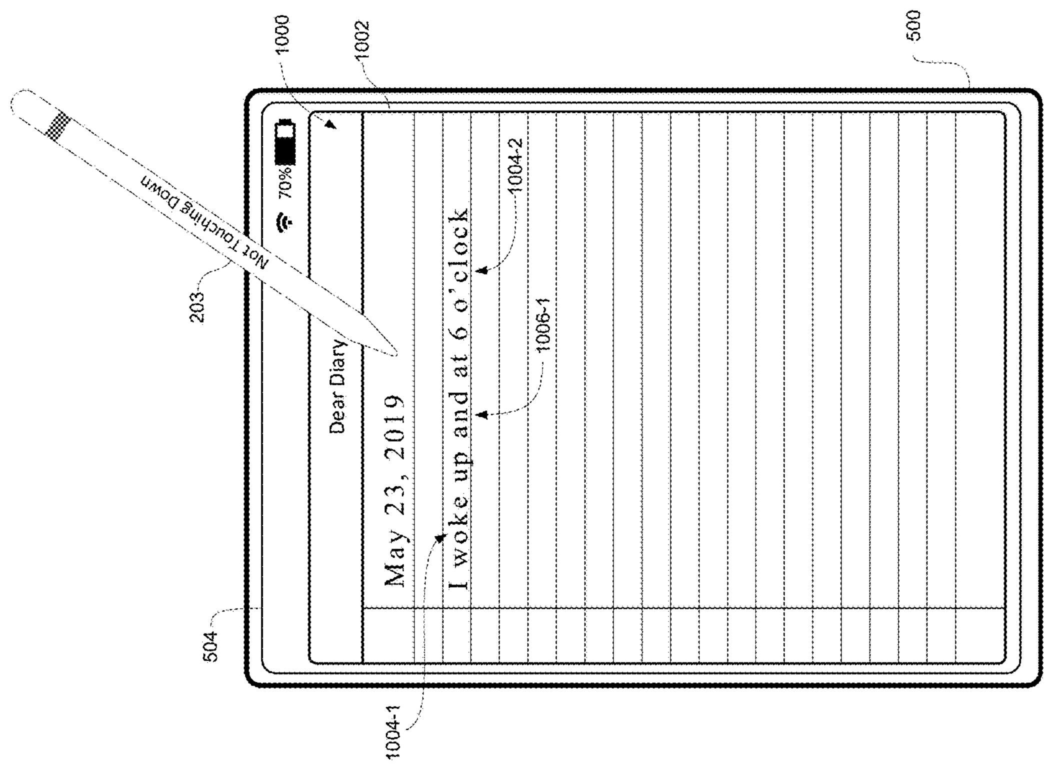
Figure 10I:
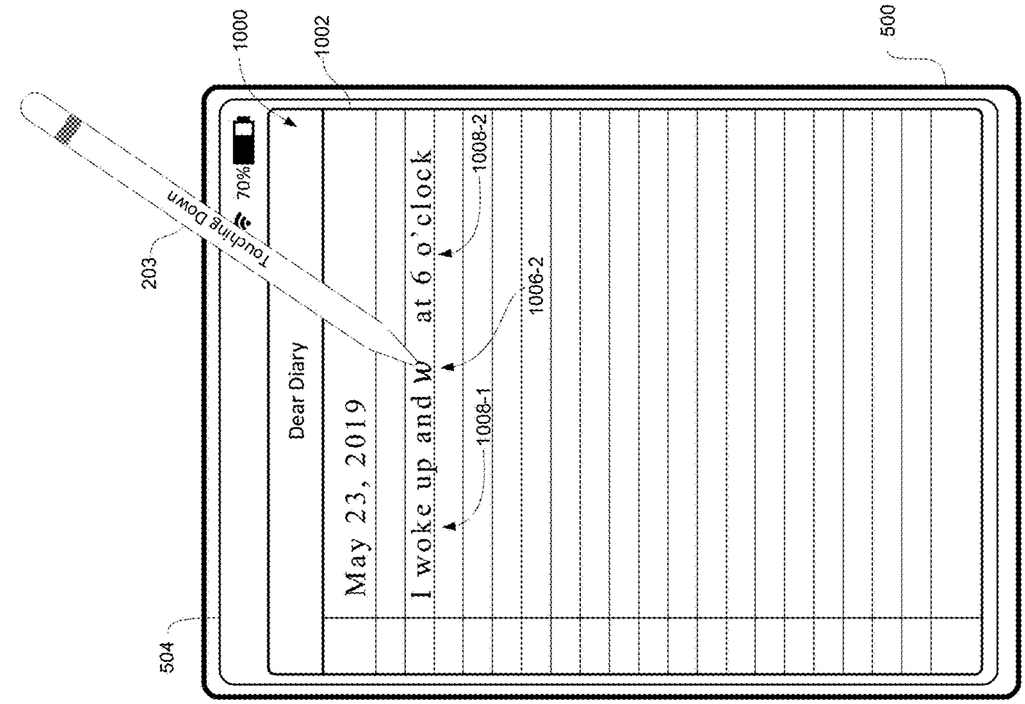
Figure 10H:
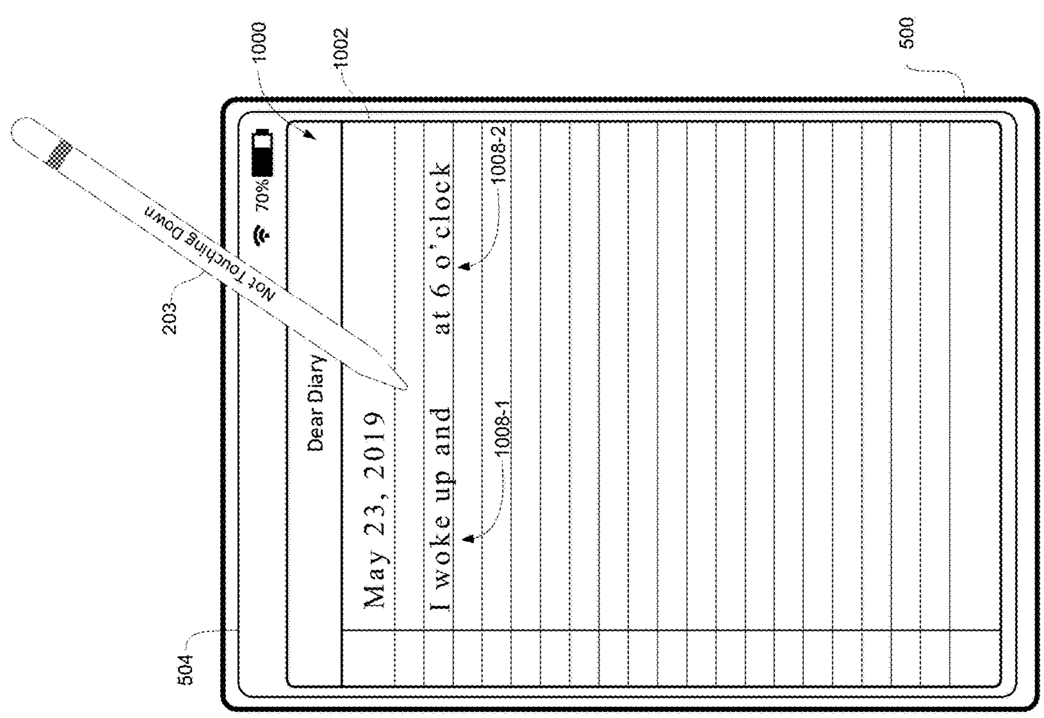
Figure 10J:
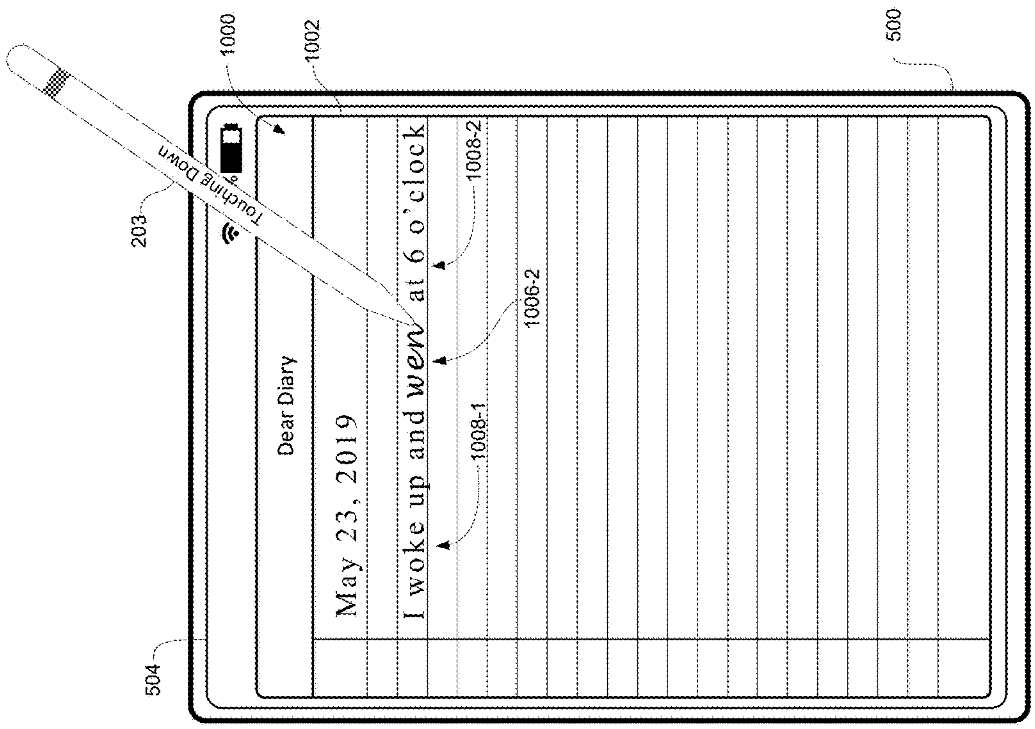
Figure 10K:
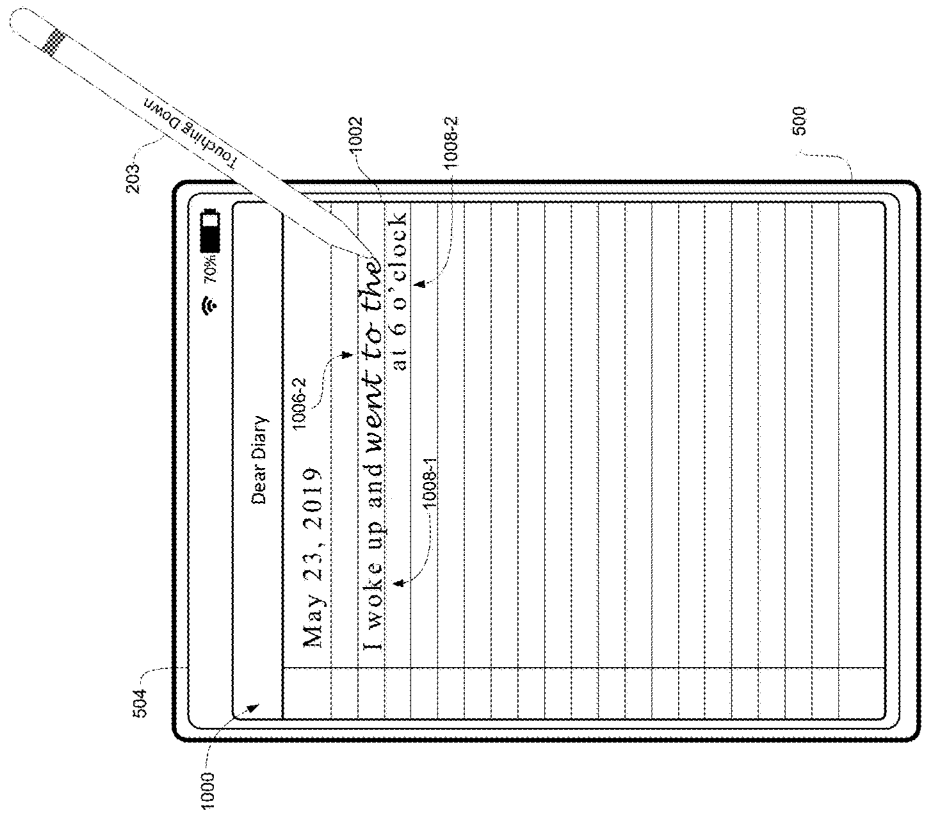
Figure 10M:
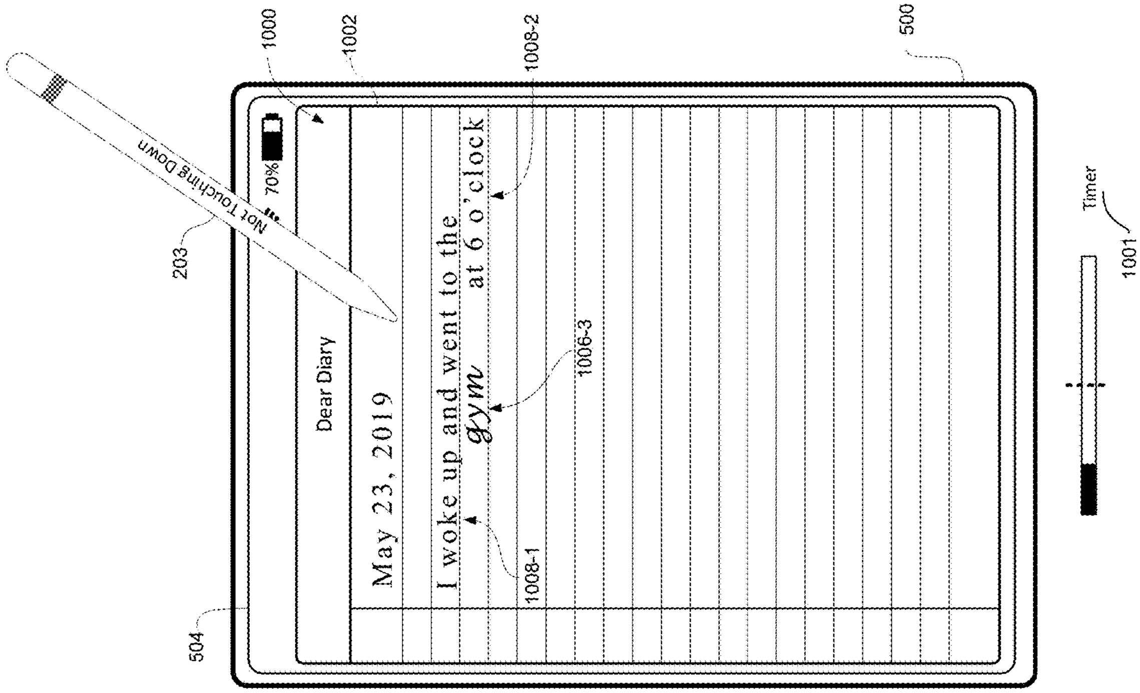
Figure 10L:
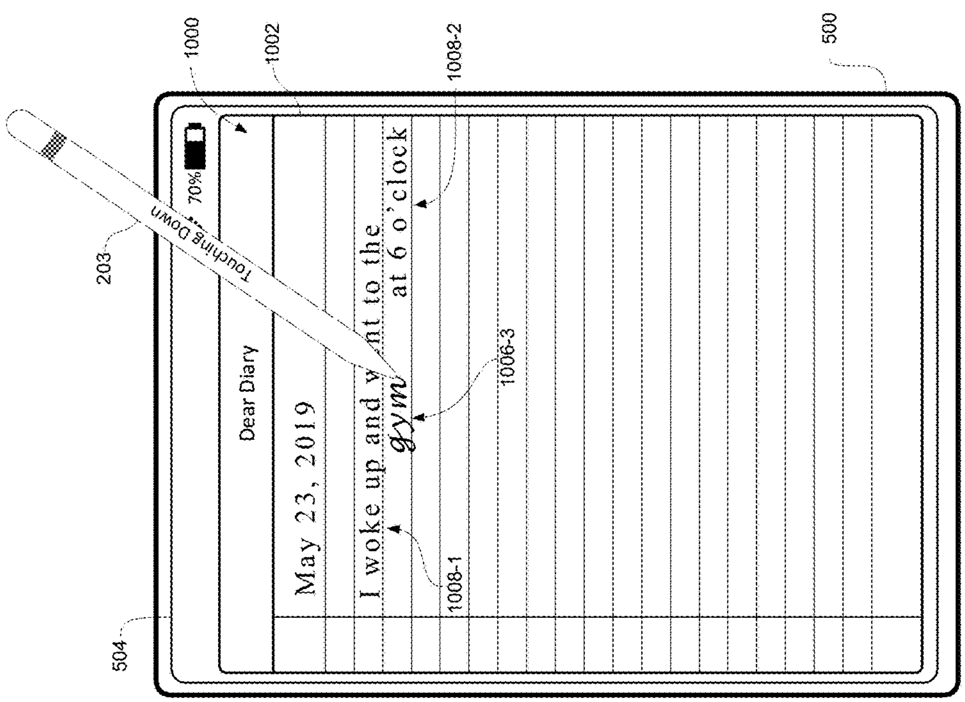
Figure 10O:
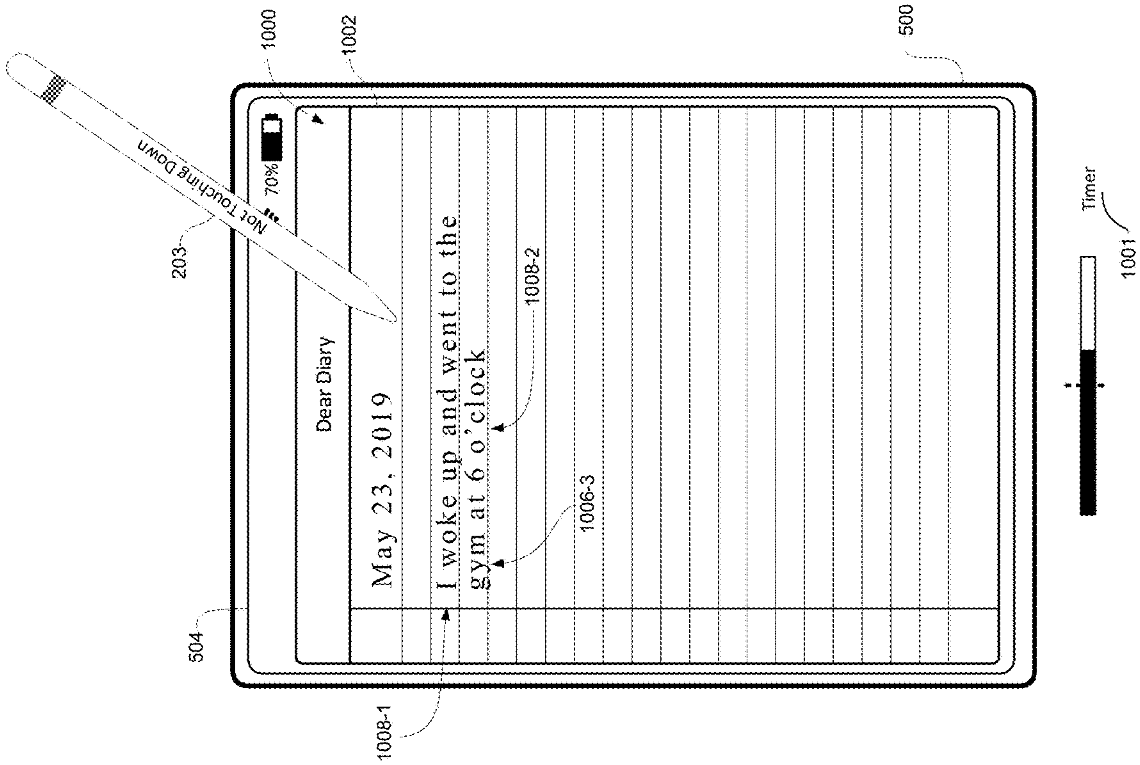
Figure 10N:
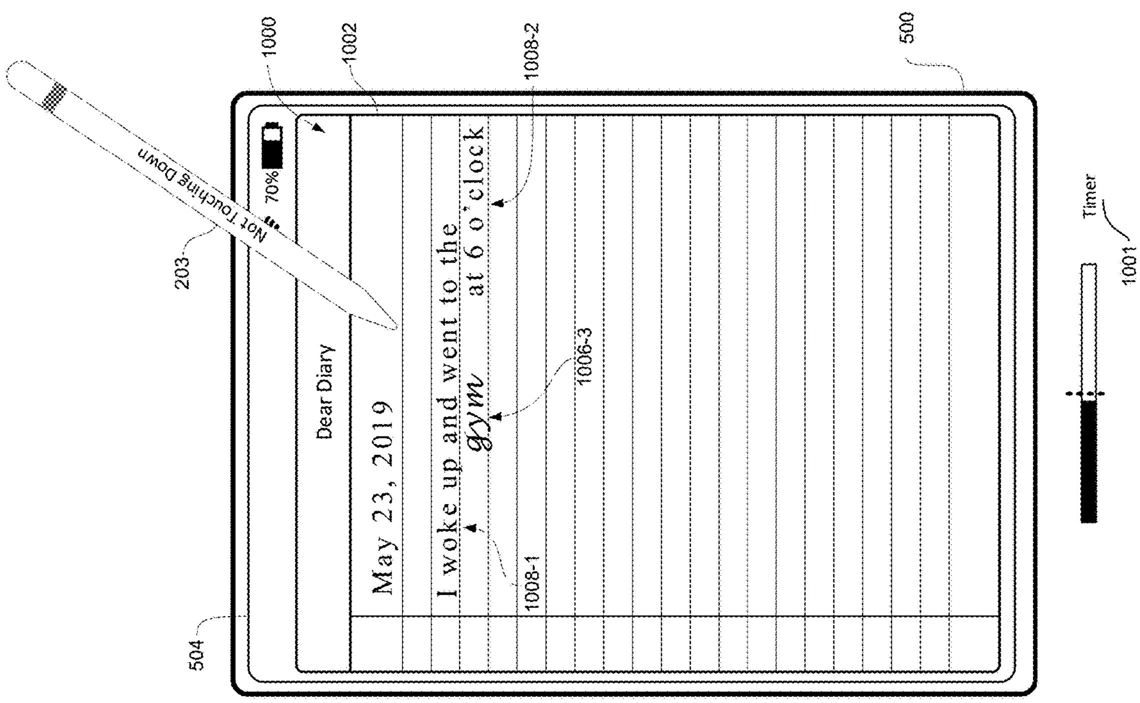
Figure 10P:
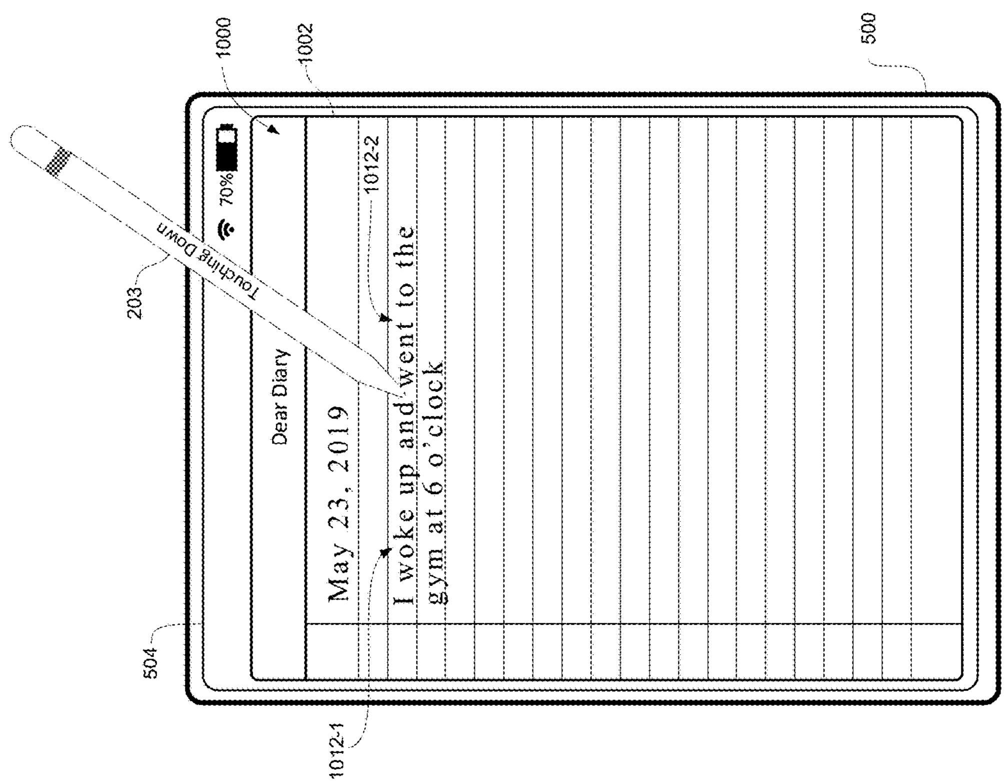
Figure 10Q:
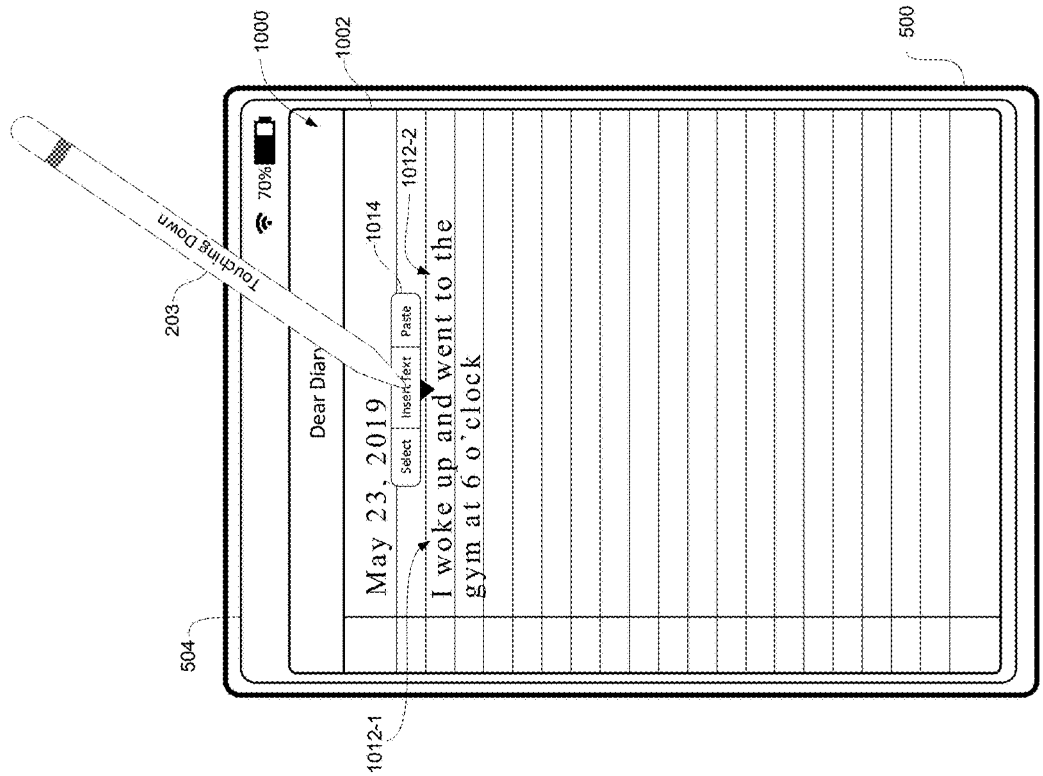
Figure 10S:
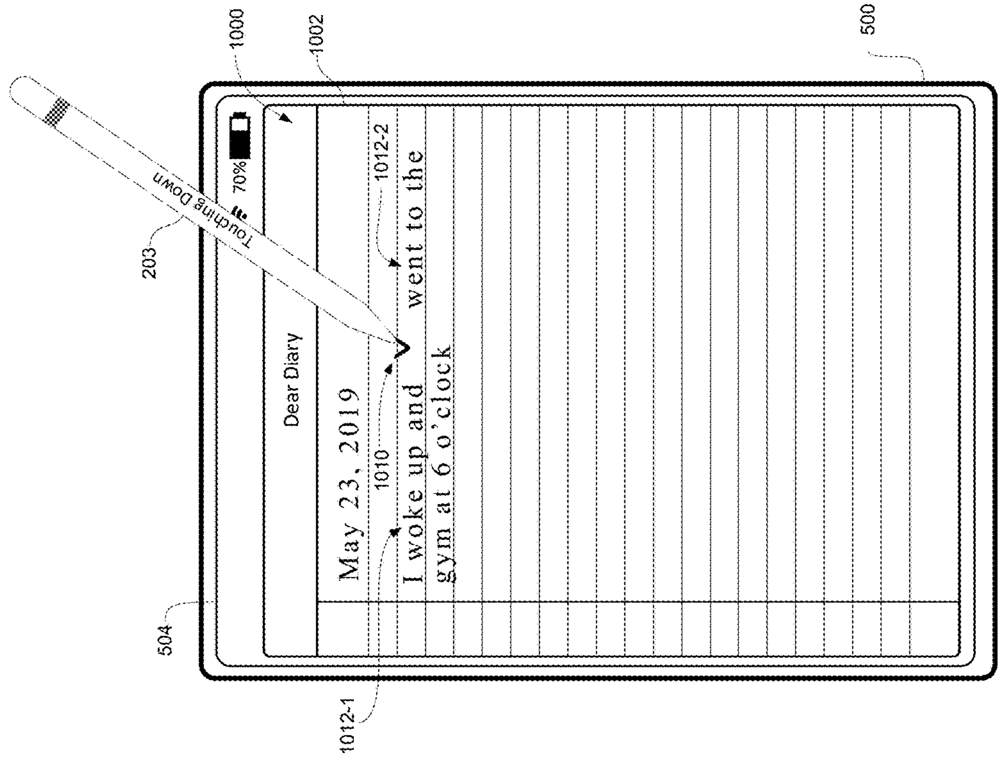

FIGS. 10A-10SSS illustrate exemplary ways in which an electronic device inserts handwritten inputs into pre-existing text. The embodiments in these figures are used to illustrate the processes described below, including the processes described with reference to FIGS. 11A-11M.

FIG. 10A illustrates an exemplary device 500 that includes touch screen 504. In FIG. 10A, device 500 is displaying user interface 1000 corresponding to a note taking application. In some embodiments, user interface 1000 includes a text entry region 1002 in which a user is able to enter multiple lines of text. In some embodiments, text entry region 1002 includes one or more pre-existing text 1004. In some embodiments, pre-existing text 1004 was previously entered as handwritten inputs and converted into font-based text. In some embodiments, pre-existing text 1004 was entered using a soft keyboard (e.g., by the user or another user, on this device or another device).

In FIG. 10B, a user input is detected from stylus 203 on touch screen 504. In some embodiments, the user input is a tap or a long-press on the touch screen 504. In some embodiments, the user input is received at a respective location in the pre-existing text 1004. In some embodiments, the pre-existing text 1004 will be referred to as the first portion 1004-1 and second portion 1004-2, as shown in FIG. 10B, for ease of description. Thus, in some embodiments, the user input detected at the location between the first portion 1004-1 and second portion 1004-2 corresponds to a request to insert text between the first and second portions of text.

In some embodiments, in response to the user input, a space is created between the first and second portions of text, as shown in FIG. 10C. In some embodiments, first portion 1004-1 is moved leftwards, the second portion 1004-2 is moved rightwards, or a combination of both. In some embodiments, the space created between the first and second portions of text provides space for the user to input handwritten text using stylus 203.

In FIG. 10D, a handwritten user input 1006-1 is received in the space created between the first and second portions of text (1004-1 and 1004-2, respectively). In some embodiments, the trail of the handwritten input is displayed on the display, similar to the methods discussed above with respect to FIG. 6 and FIG. 8. In FIG. 10E, a lift-off of the handwritten input is detected (e.g., lift-off of stylus 203 from touch screen 504). In some embodiments, in response to the lift-off of the stylus 203 or after the lift-off of the stylus 203, handwritten input 1006-1 is converted into font-based text (e.g., according to the conversion processes discussed with respect to method 700 and method 1300), as shown in FIG. 10F. In some embodiments, after handwritten input 1006-1 has been converted into font-based text or concurrently with the conversion to font-based text, excess space between the first portion 1004-1 of text, the second portion 1004-2 of text, and the converted handwritten input 1006-1 is removed by moving the first portion 1004-1 of text, the second portion 1004-2 of text, the converted handwritten input 1006-1 or any combination of these in order to remove the excess space.

In FIG. 10G, a handwritten user input 1010 is received performing a special reserved gesture, symbol, or character. For example, as shown in FIG. 10G, handwritten user input 1010 corresponds to a "v" character or a caret character. In some embodiments, the "v" character or caret character is a reserved keyword character that indicates a request to create space in order to insert text between portions of text. Thus, in response to receiving the handwritten user input 1010 corresponding to the special reserved gesture, space is created between the first portion of text 1008-1 (e.g., the portion of the text before the keyword character) and the second portion of text 1008-2 (e.g., the portion of the text after the keyword character), as shown in FIG. 10H.

In FIG. 10I, handwritten user input 1006-2 is received in the space between the first portion of text 1008-1 and the second portion of text 1008-2. In FIG. 10J, the user continues handwritten user input 1006-2 in the space between the first portion of text 1008-1 and the second portion of text 1008-2. In some embodiments, as the user provides handwritten input, the space between the first portion and second portion of text continues to expand to continue to provide space for the handwritten input. Thus, for example, as shown in FIG. 10J, the second portion of text 1008-2 is moved rightwards even farther (e.g., as compared to FIG. 10I). In FIG. 10K, the user further continues handwritten user input 1006 in the space between the first portion of text 1008-1 and the second portion of text 1008-2. In some embodiments, the second portion of text 1008-2 is unable to move rightwards any further (e.g., because the text has reached the end of the user interface or the end of the display). In some embodiments, as a result, the second portion of text 1008-2 is moved to a line below the current line of text, as shown in FIG. 10K. In some embodiments, the second portion of text 1008-2 is left-aligned on the second line of text. In some embodiments, the second portion of text 1008-2 is not left-aligned and space is provided for handwritten inputs on the second line. In some embodiments, the second portion of text 1008-2 is moved downwards and aligned with the original or previous lateral position of the second portion of text 1008-2 before the new line is created.

In FIG. 10L, handwritten user input 1006-3 is received on the second line of text in front of the second portion of text 1008-2. In some embodiments, as shown in FIGS. 10M-10O, the system does not close the excess space between the text. For example, in FIG. 10M, lift-off of stylus 203 is detected. In some embodiments, in response to detecting lift-off of stylus 203, timer 1001 begins counting upwards. In some embodiments, when timer 1001 reaches a threshold time (e.g., 0.5 seconds, 1 second, 2 seconds, 3 seconds, 5 seconds), then the handwritten input is converted into font-based text and the excess space between the text is reduced or eliminated. In FIG. 10N, the timer continues to count upwards but has not reached the threshold time (e.g., as shown by the dotted lines), so the handwritten input is not yet converted. In FIG. 10O, the threshold time is reached and the handwritten input 1006-3 is converted into font-based text and the excess space between the text is reduced or removed. In some embodiments, the handwritten input 1006-3 is converted before the excess space is removed or concurrently. In some embodiments, the time to convert handwritten input 1006-3 is on a different timer than the time to eliminate or reduce the excess space (e.g., optionally a longer timer such as 1 second, 2 seconds, 3 seconds, 5 seconds, 8 seconds). Thus, it is understood that, in some embodiments, the removal of excess space occurs at the same time as the conversion and, in some embodiments, the removal of excess space occurs at a different time (e.g., before or after) the conversion.

Figure 10R:
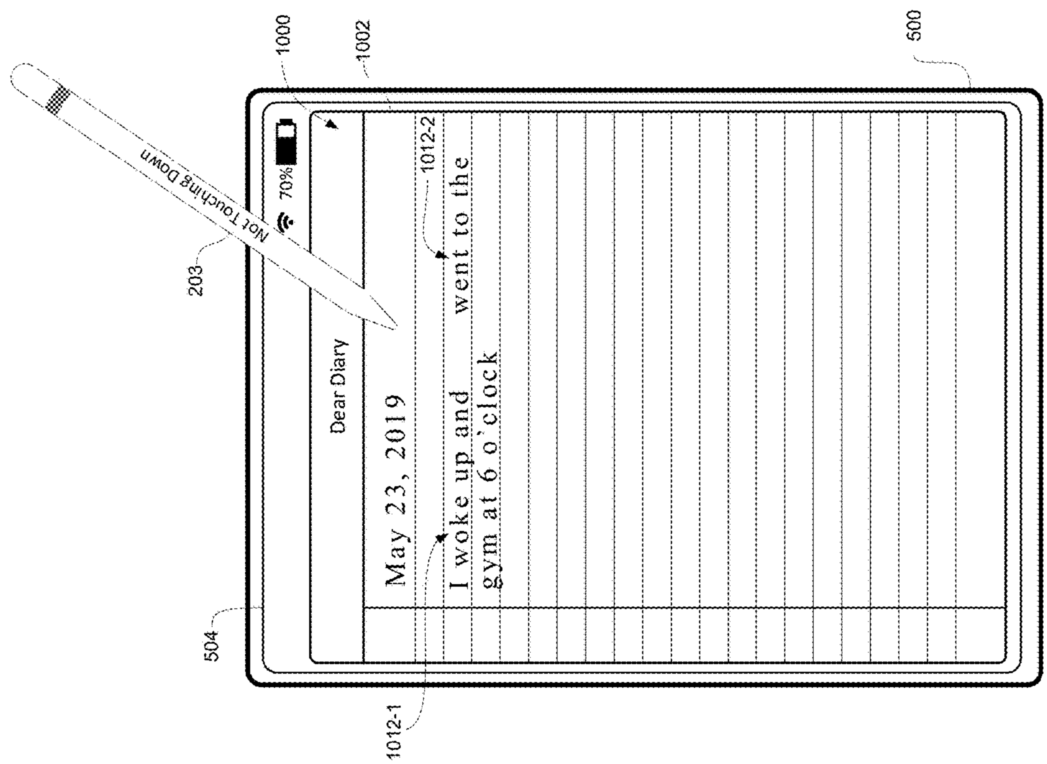

FIGS. 10P-10R illustrates an exemplary alternative method of inserting space in pre-existing text for receiving handwritten inputs. In FIG. 10P, a user input is received in the space between a first portion of text 1012-1 and a second portion of text 1012-2 (e.g., tap, long-press, etc.). In some embodiments, in response to the user input, pop-up 1014 is displayed, as shown in FIG. 10Q. In some embodiments, pop-up 1014 includes one or more selectable options corresponding to one or more functions for interacting with the pre-existing text. In some embodiments, pop-up 1014 includes a selectable option for creating space between the first portion of text 1012-1 and the second portion of text 1012-2 for inserting text. In FIG. 10Q, a user input is received from stylus 203 selecting the selectable option for inserting text. In some embodiments, in response to the user input, space is created between the first portion of text 1012-1 and the second portion of text 1012-2, as shown in FIG. 10R. In some embodiments, as described above, creating space between the first and second portions of text comprises moving the first portion of text leftwards, moving the second portion of text rightwards or a combination of the two.

Figure 10U:
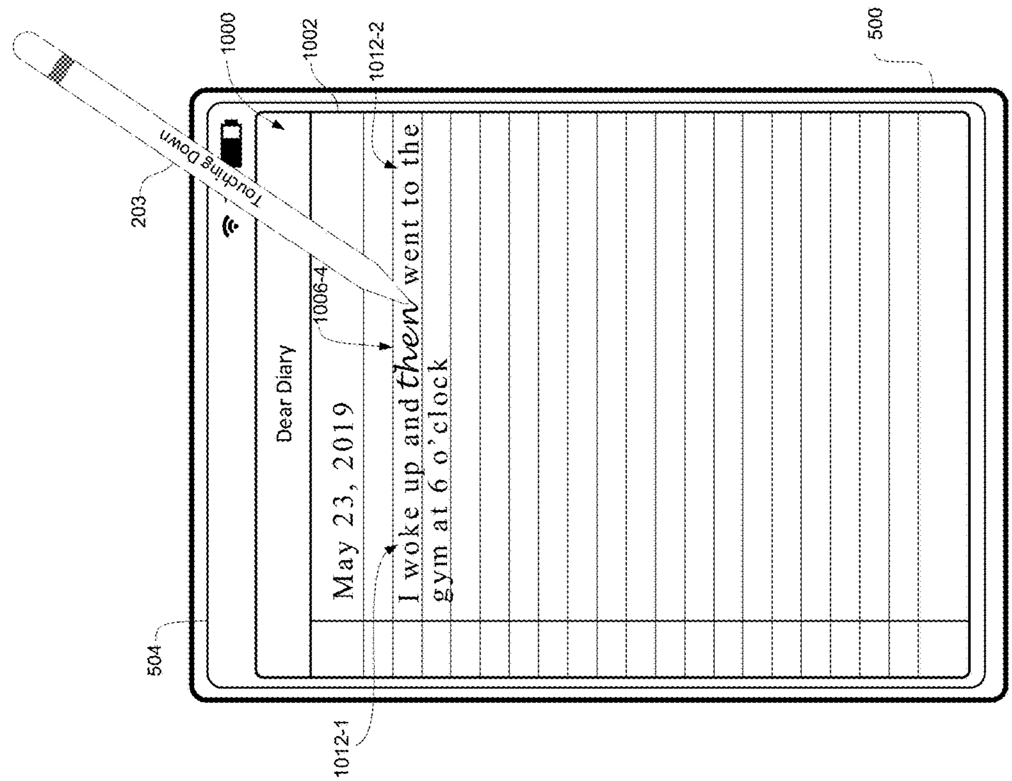
Figure 10T:
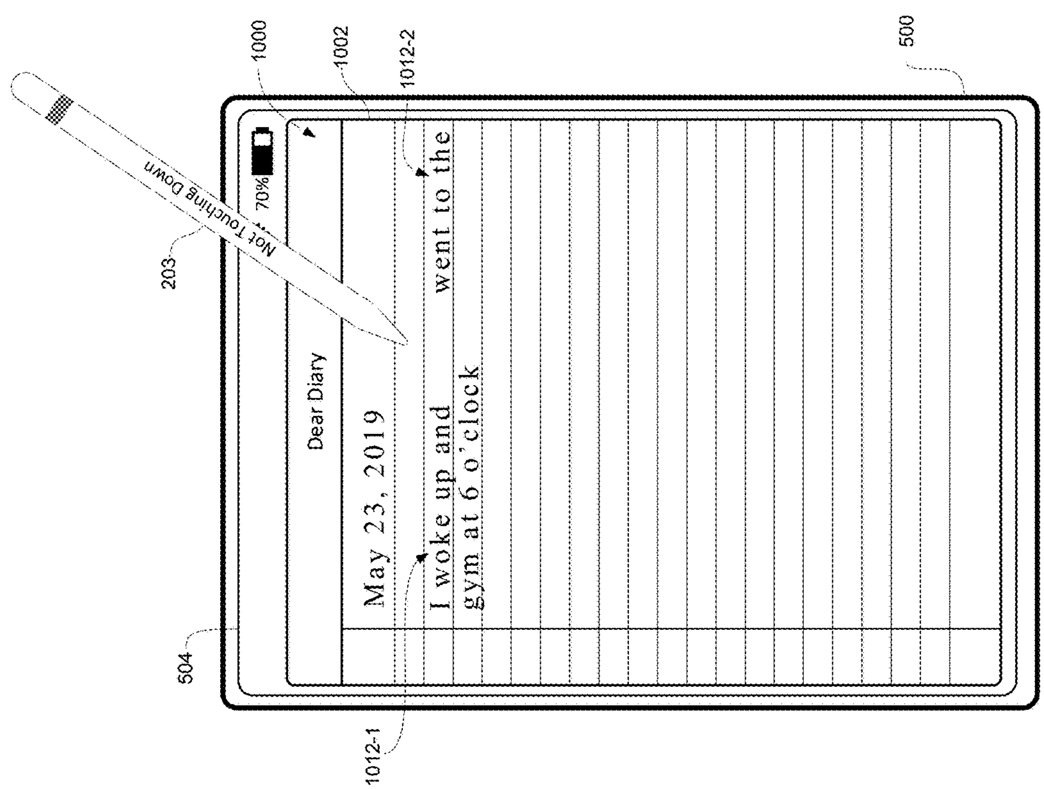

In FIG. 10S, a user input is received from stylus 203 performing the reserved keyword character (e.g., "v" or caret character, similar to the reserved keyword character described above with respect to FIG. 10G) in the created space between the first and second portions of text. In some embodiments, in response to receiving the user input, the space between the first and second portions of text is further expanded to provide even further space for user input, as shown in FIG. 10T. In FIG. 10U, handwritten input 1006-4 is received in the space between the first portion of text 1012-1 and the second portion of text 1012-2.

Figure 10W:
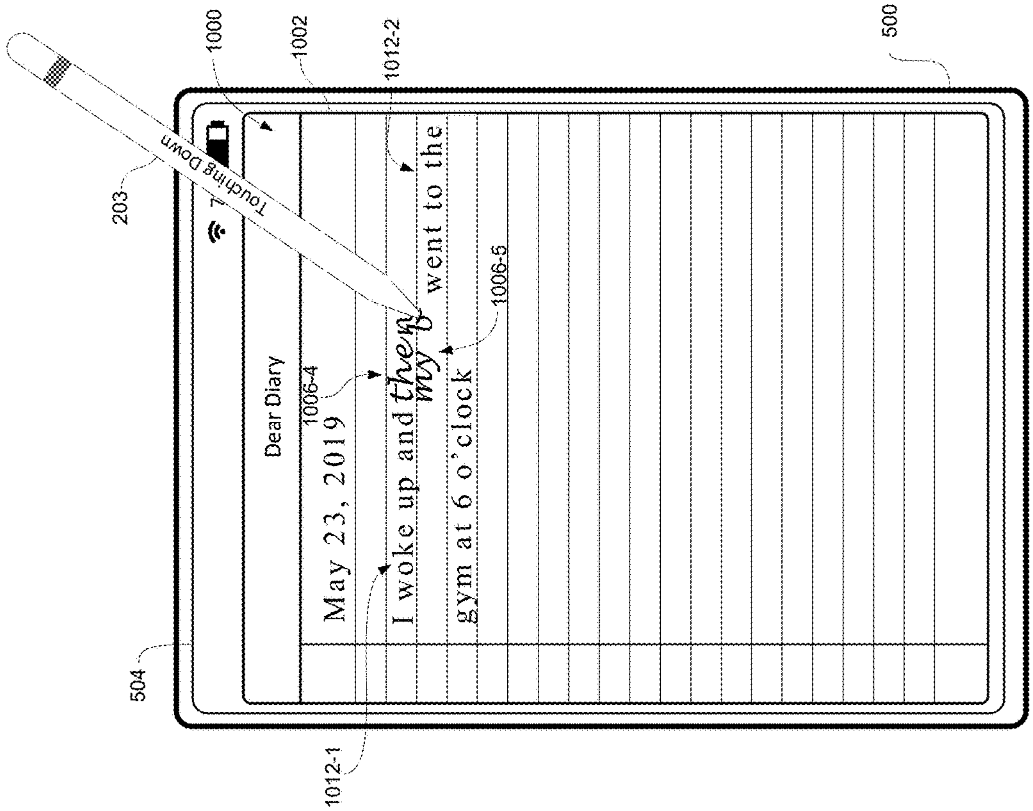
Figure 10V:
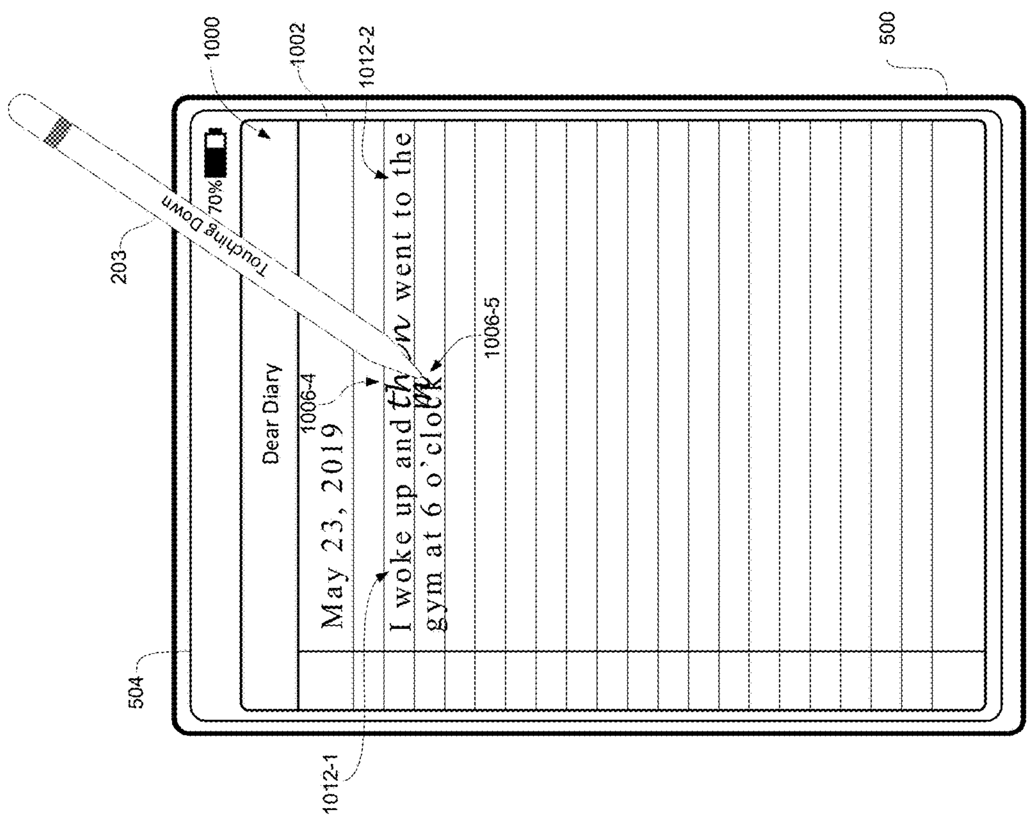

In FIG. 10V, further handwritten input 1006-5 is received in a space below handwritten input 1006-5. In some embodiments, the handwritten input 1006-5 is interpreted as a request to insert a new line of text. Thus, in some embodiments, a handwritten input 1006-5 that is received a threshold distance (e.g., 1 mm, 3 mm, 5 mm, 1 cm, 2 cm, etc.) below the current line of text or the previous handwritten input (e.g., 1006-4) is considered a request to insert a new line of text. In some embodiments, in response to the handwritten input 1006-5, a new line of text is inserted, as shown in FIG. 10W. In some embodiments, inserting a new line of text comprises moving the second portion of the text to a line below the current line of text. In some embodiments, inserting a new line of text comprises inserting a line break character into the current line of text or at the beginning of the second portion of text 1012-2.

Figure 10Y:
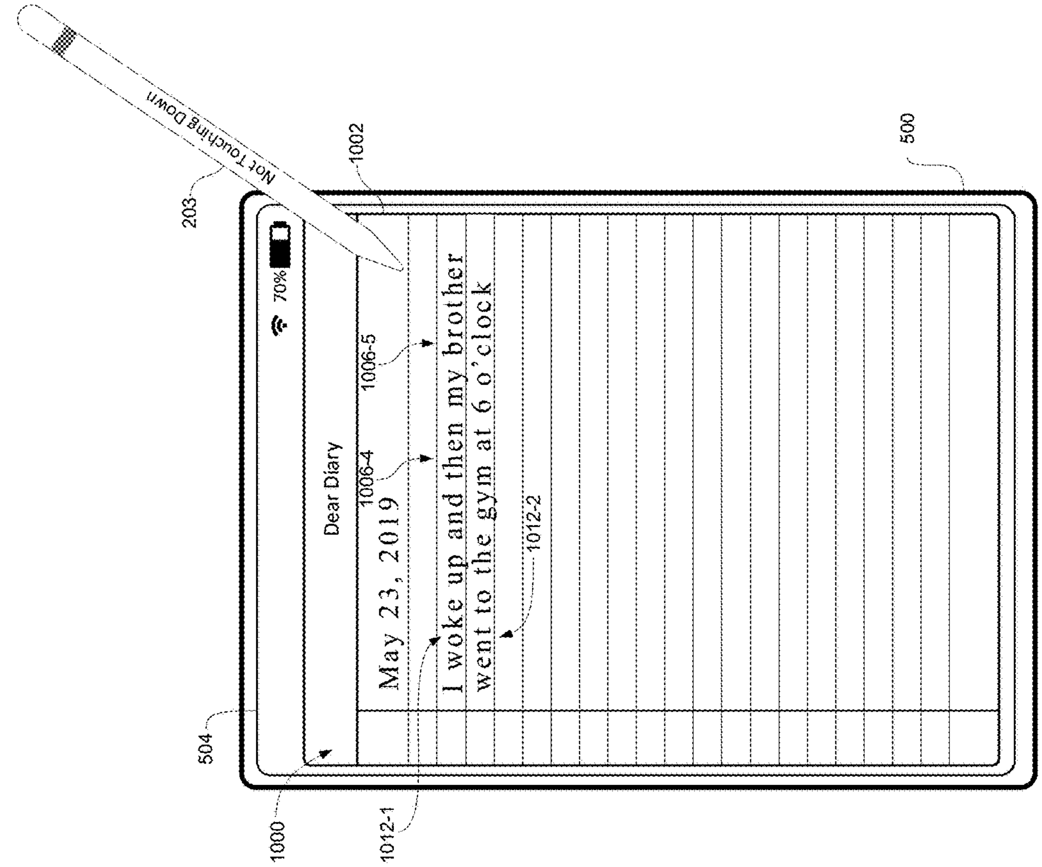
Figure 10X:
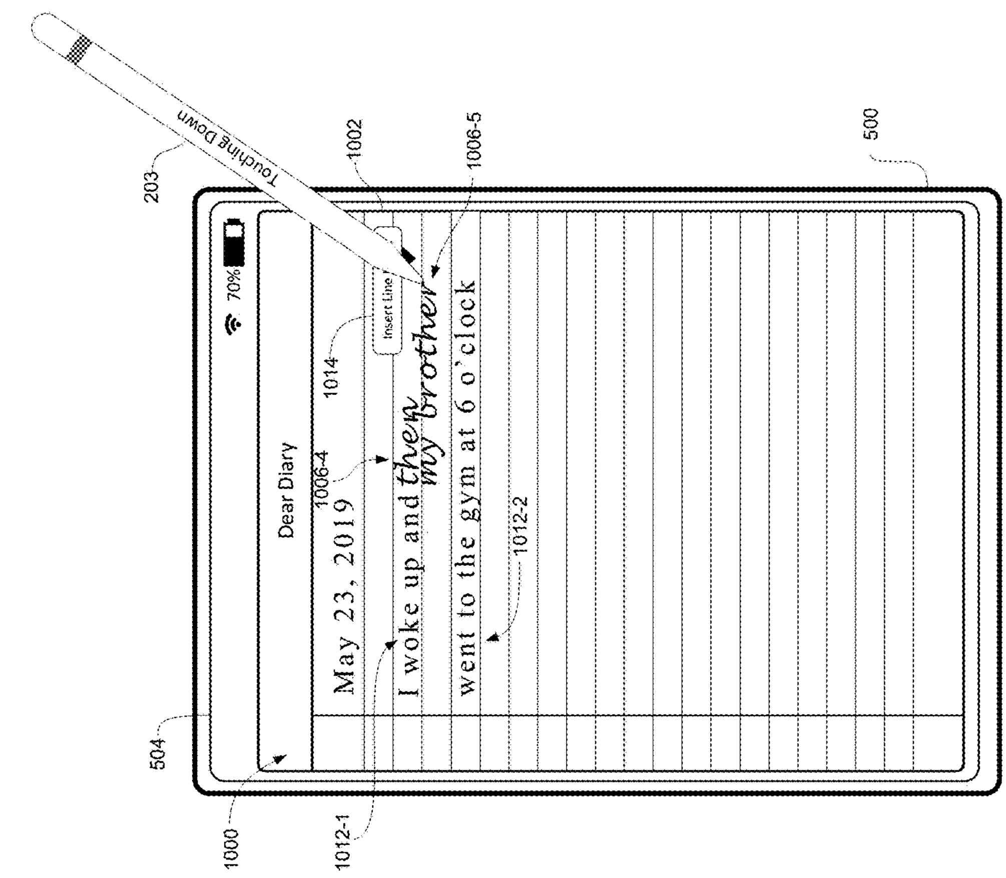
Figure 10A:
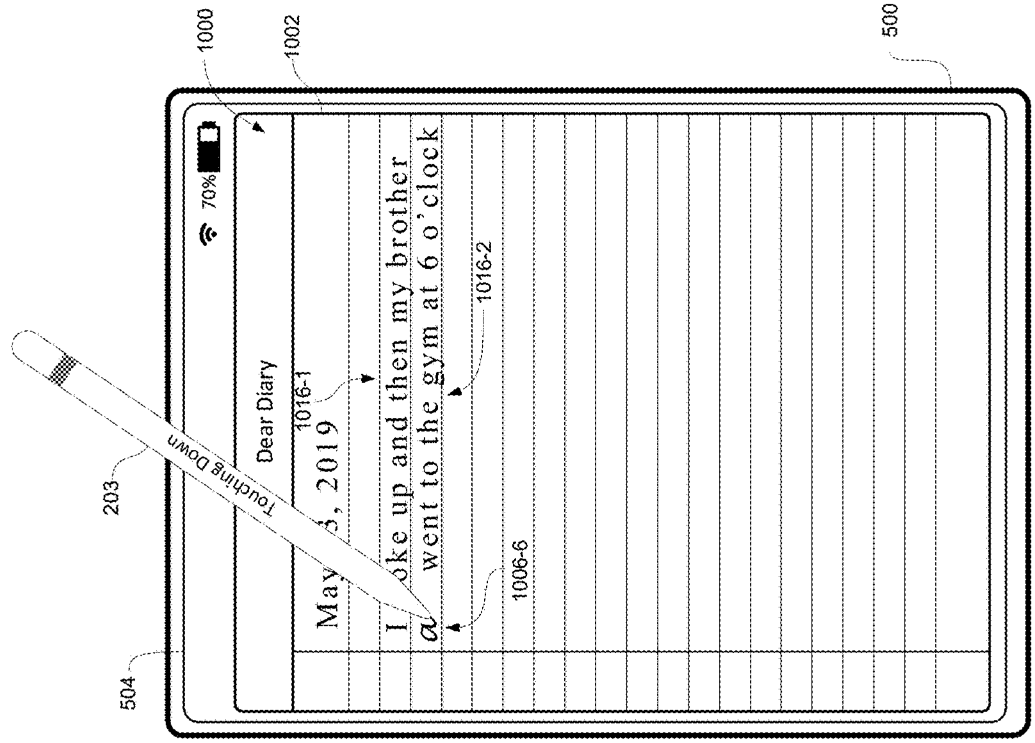

In FIG. 10X, the user continues providing handwritten input 1006-5. In some embodiments, if the handwritten input 1006-5 reaches the end of a line (e.g., the end of the text region or the end of the user interface), then the second portion of text 1012-2 is further moved to the next line to create space for handwritten inputs. In some embodiments, if the handwritten input 1006-5 reaches or approaches the end of a line, then a pop-up 1014 is displayed with a selectable option that is selectable to insert a new line of text. In some embodiments, after detecting the lift-off of stylus 203 (e.g., and optionally after a certain time threshold has elapsed), the handwritten input is converted into font-based text, as shown in FIG. 10Y. In some embodiments, concurrently with or after handwritten input has been converted into font-based text, the first portions and second portions of text are re-aligned such that excess space between words are removed, as shown in FIG. 10Y.

Figure 10Z:
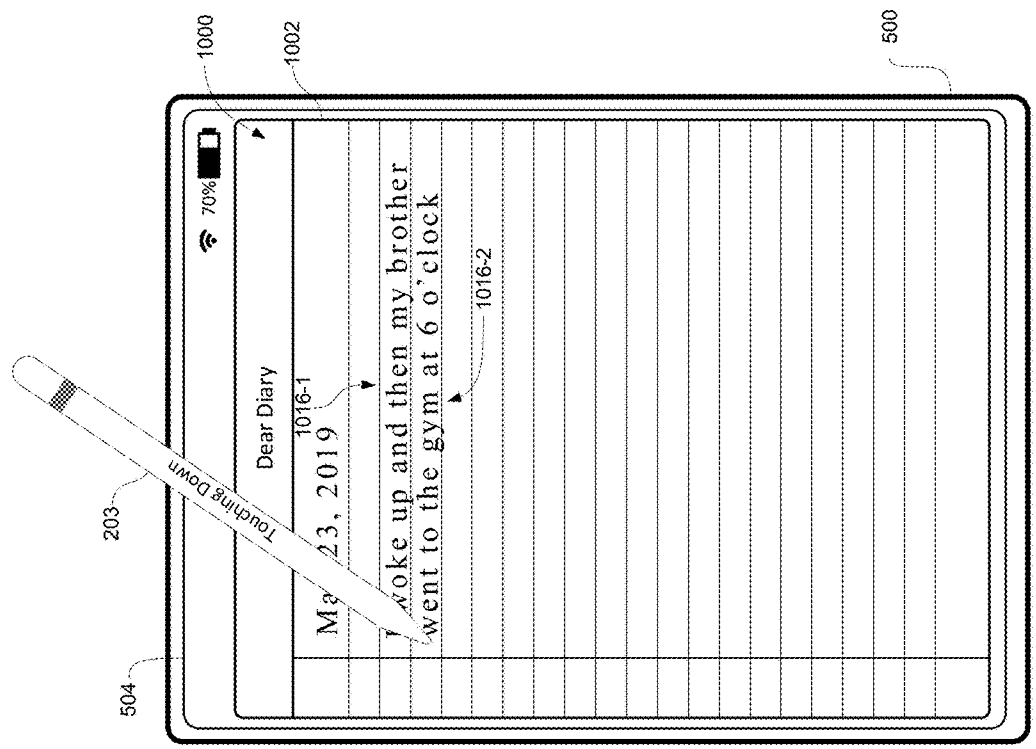
Figure 10C:
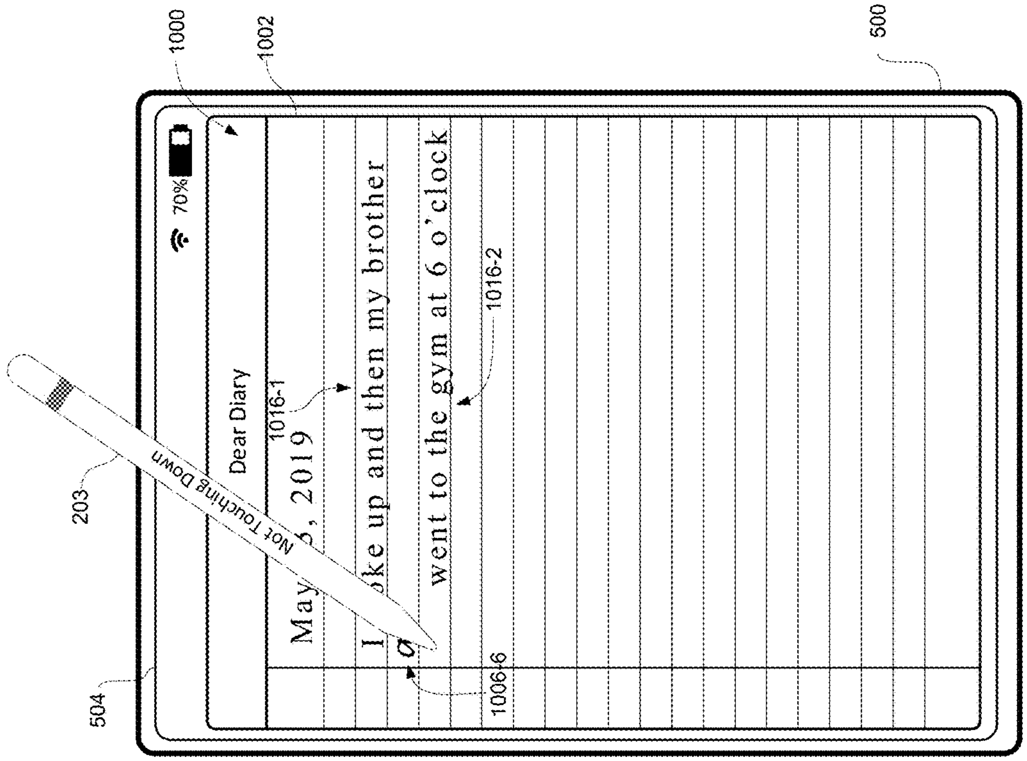
Figure 10B:
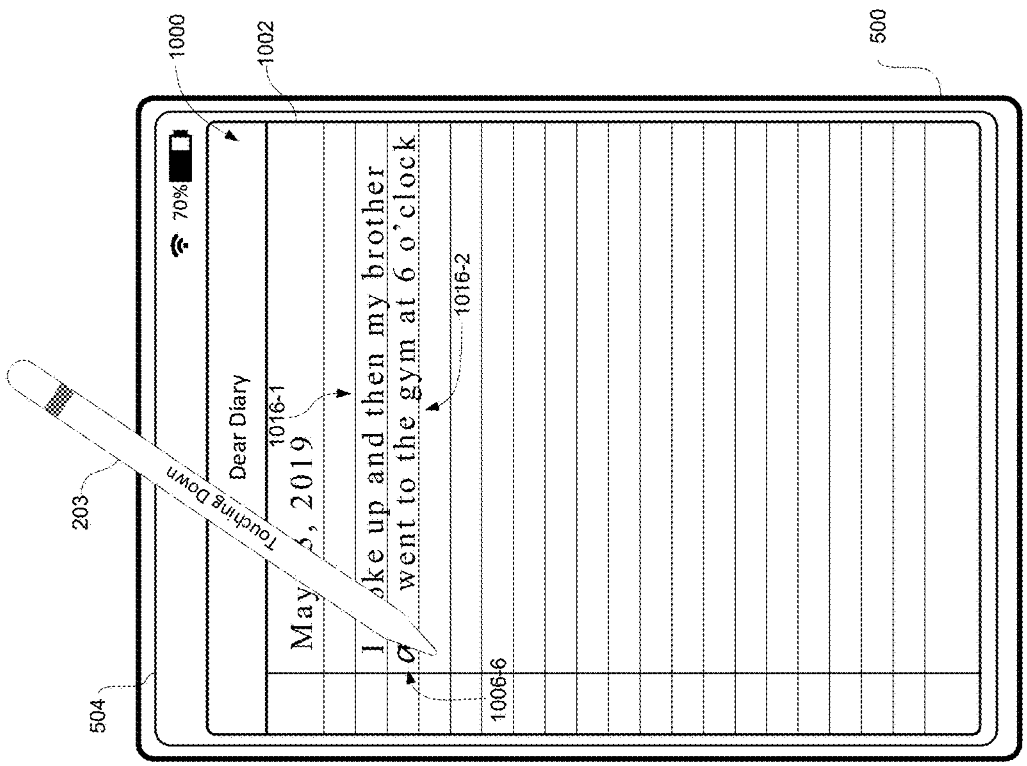
Figure 10E:
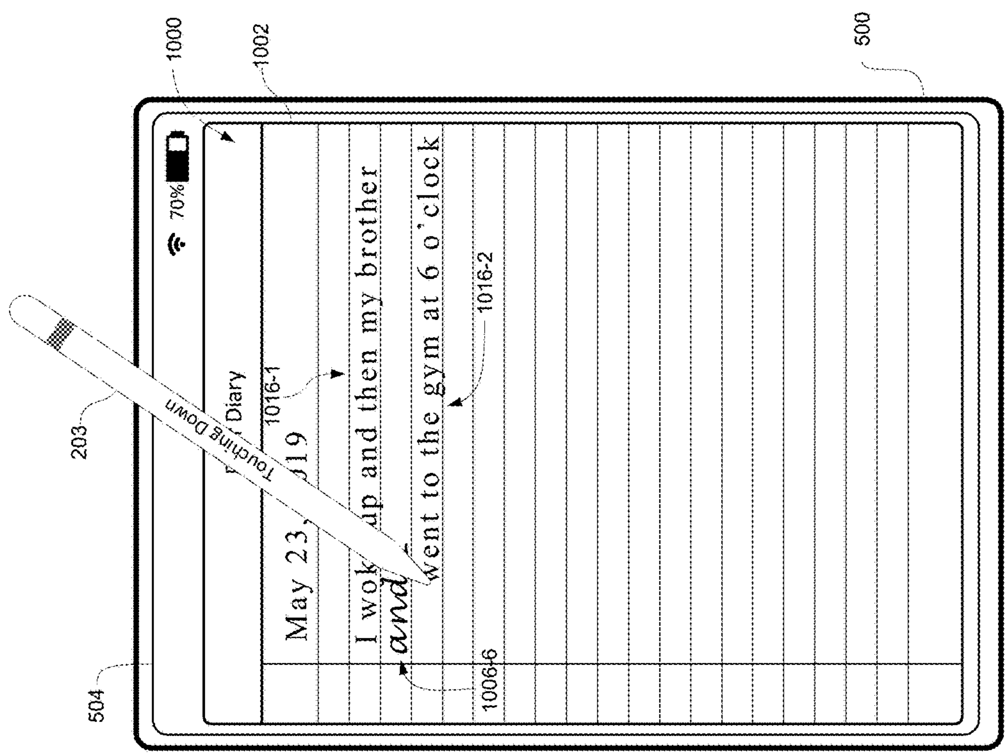
Figure 10D:
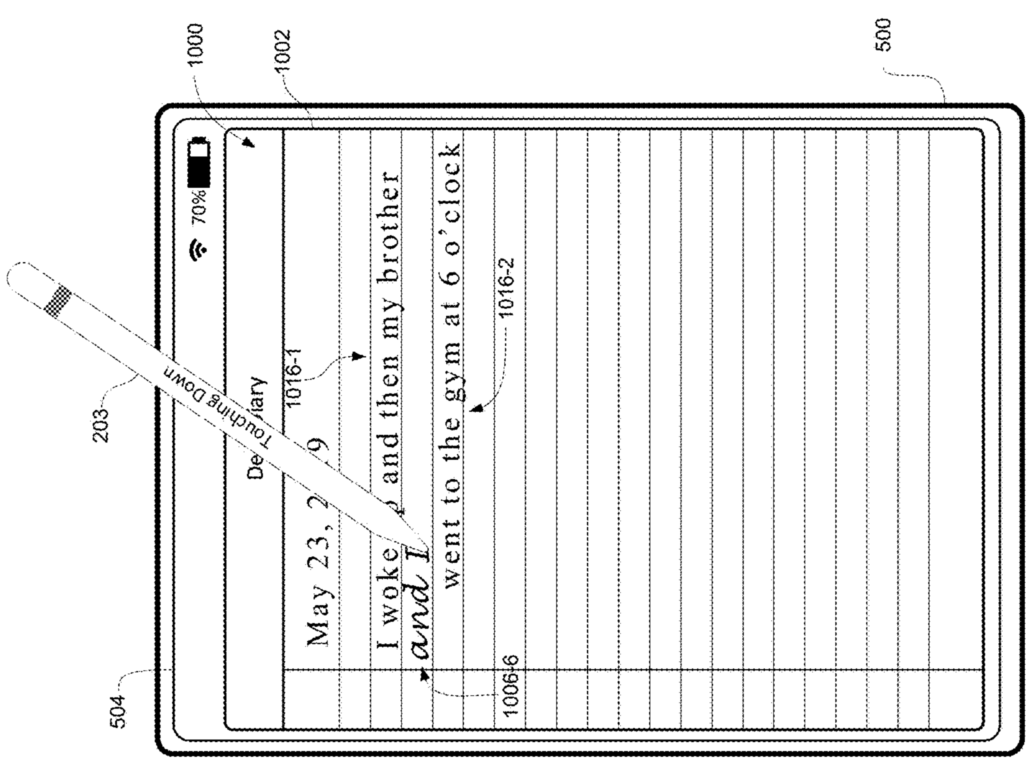
Figure 10G:
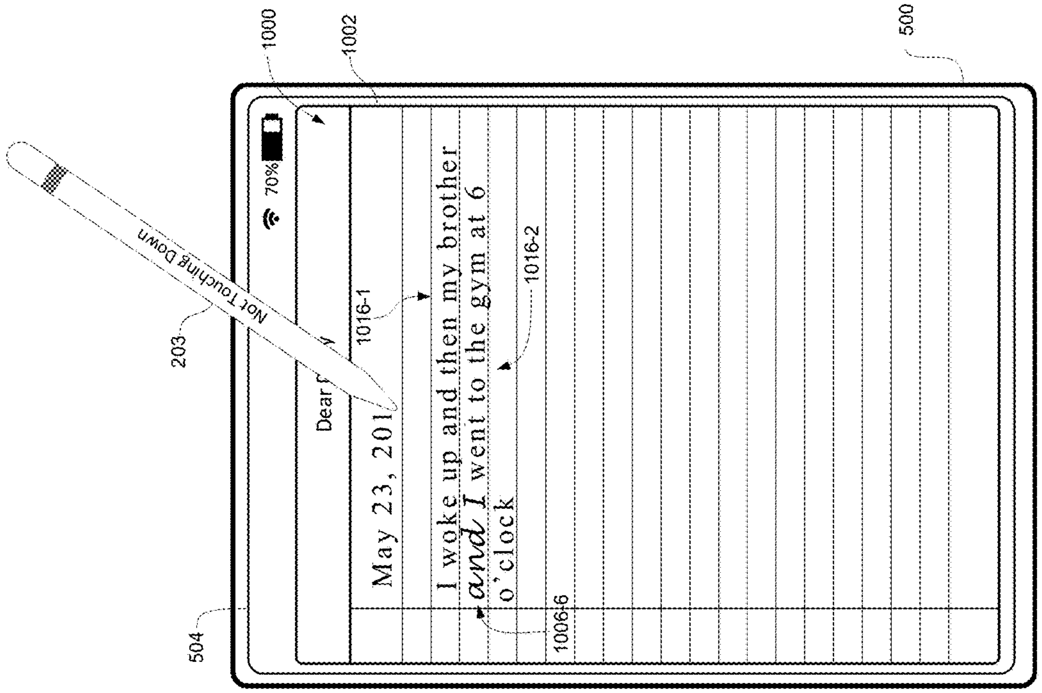
Figure 10F:
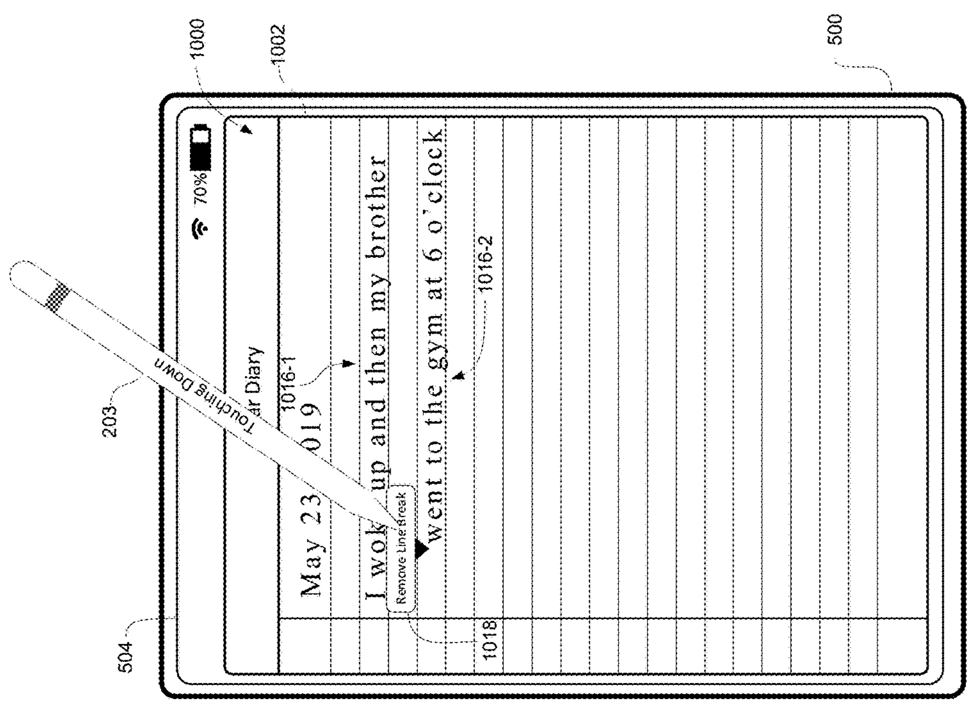
Figure 10I:
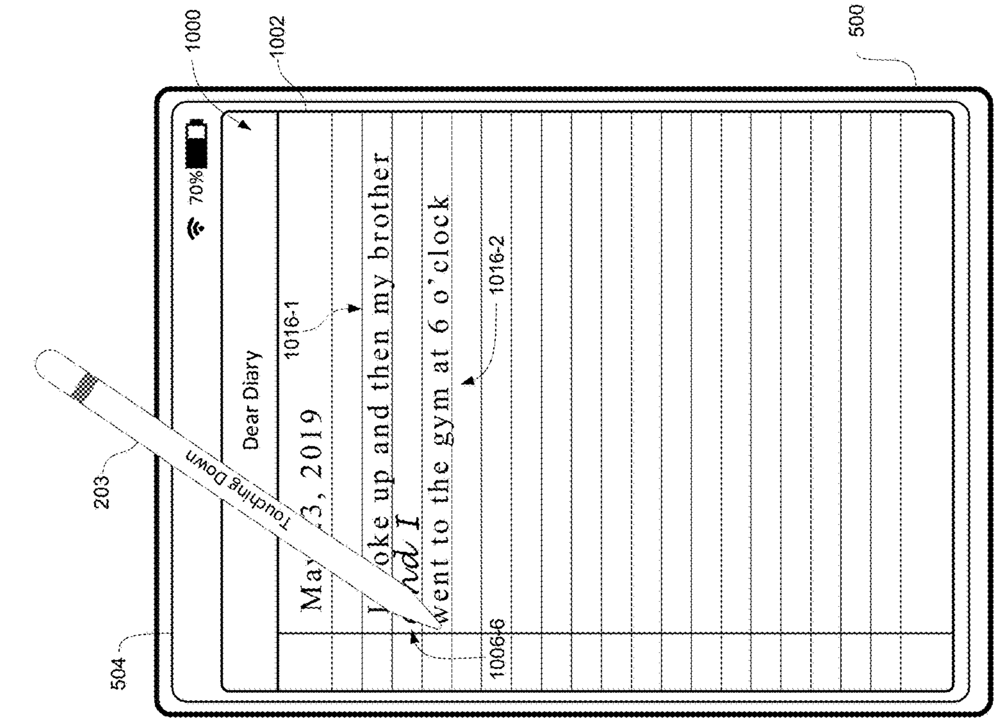
Figure 10H:
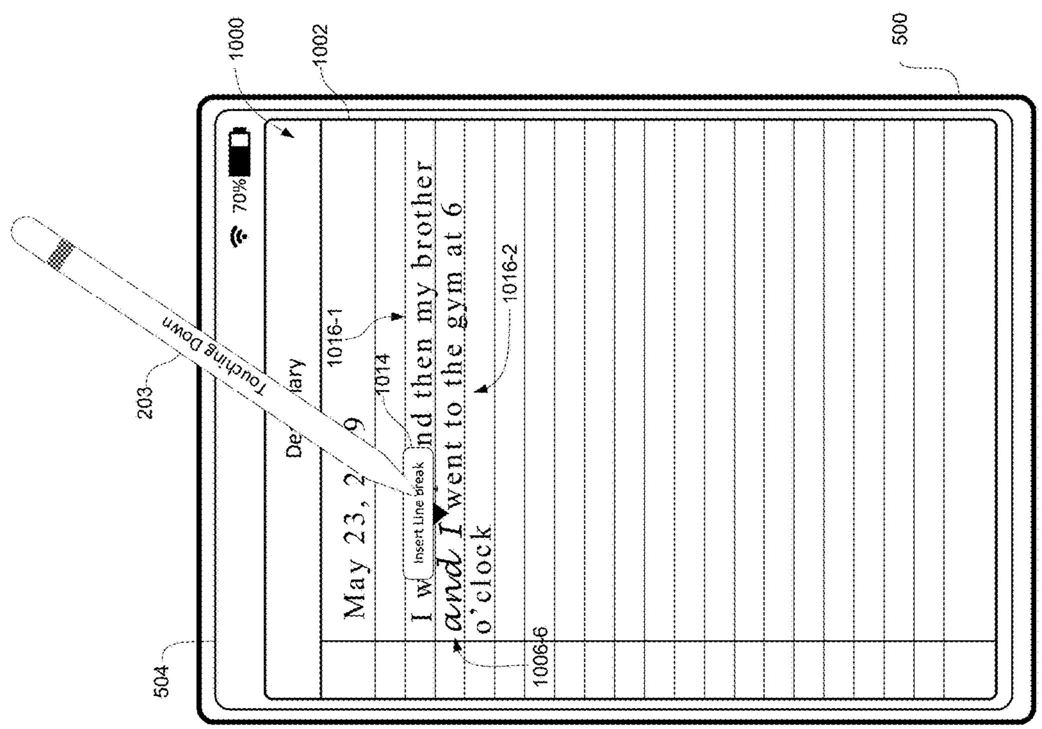
Figure 10K:
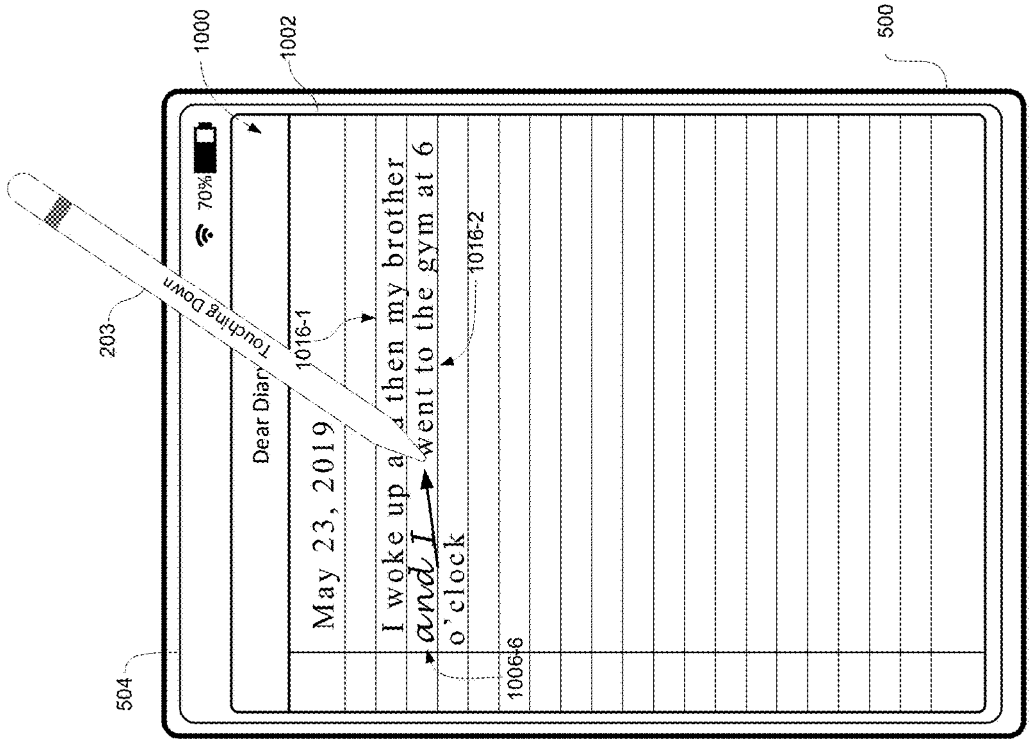
Figure 10J:
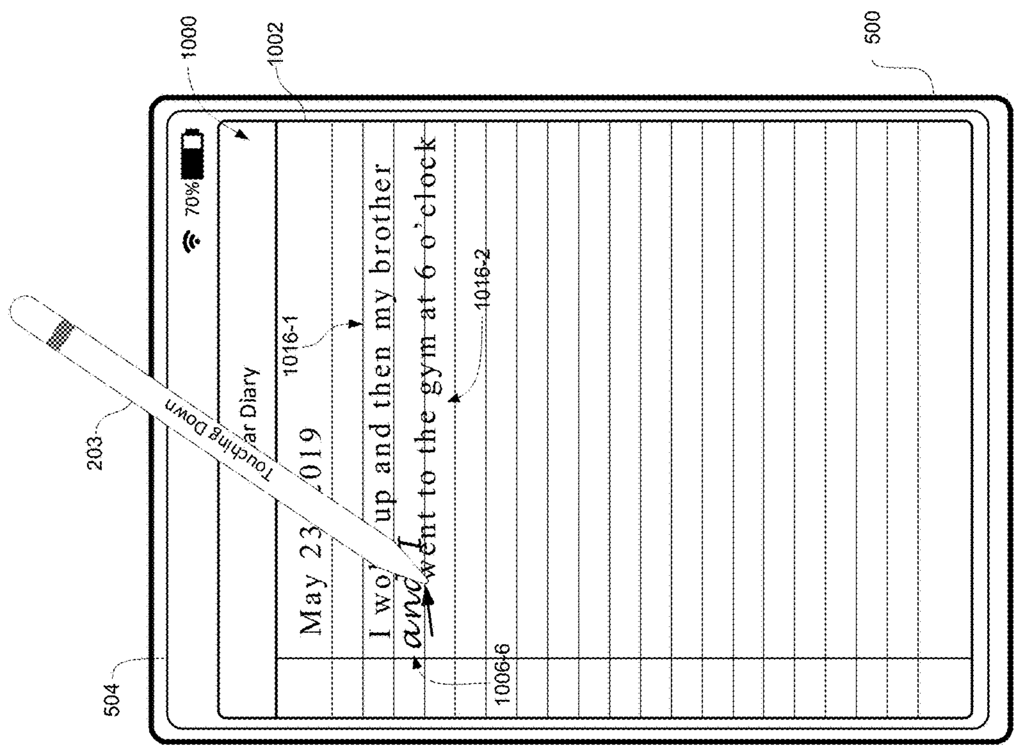
Figure 10M:
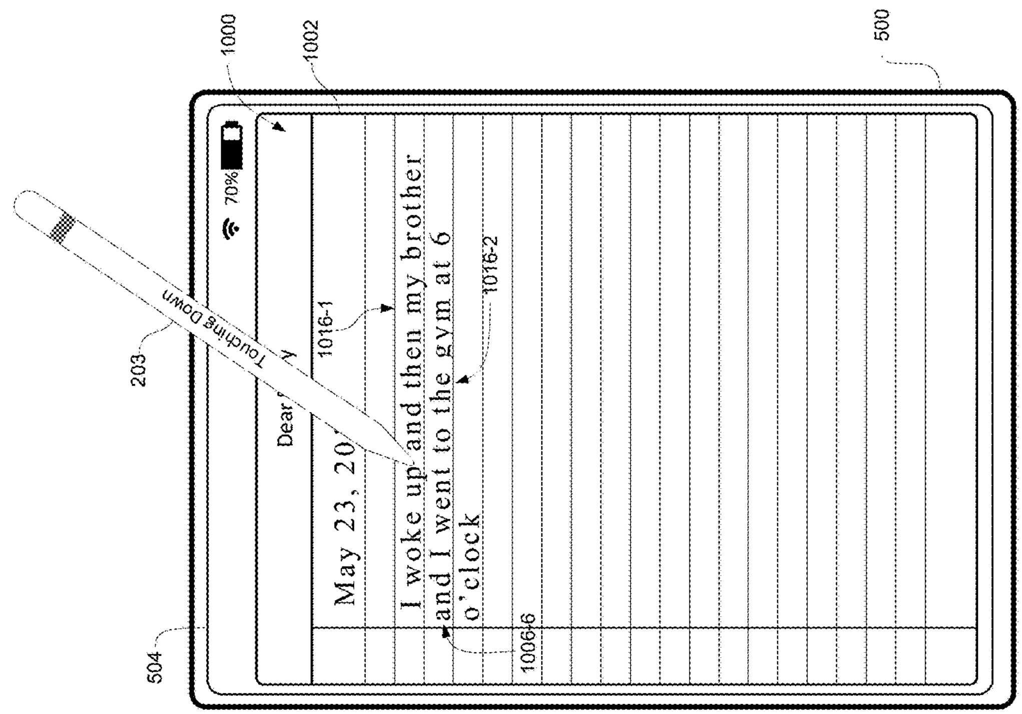
Figure 10L:
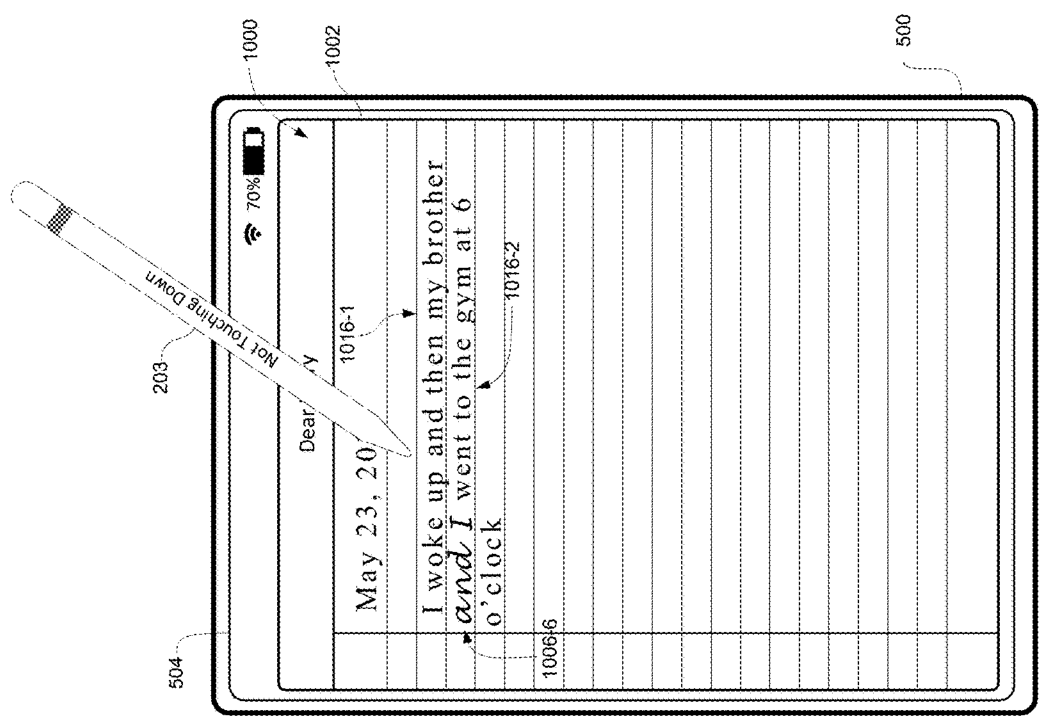
Figure 10O:
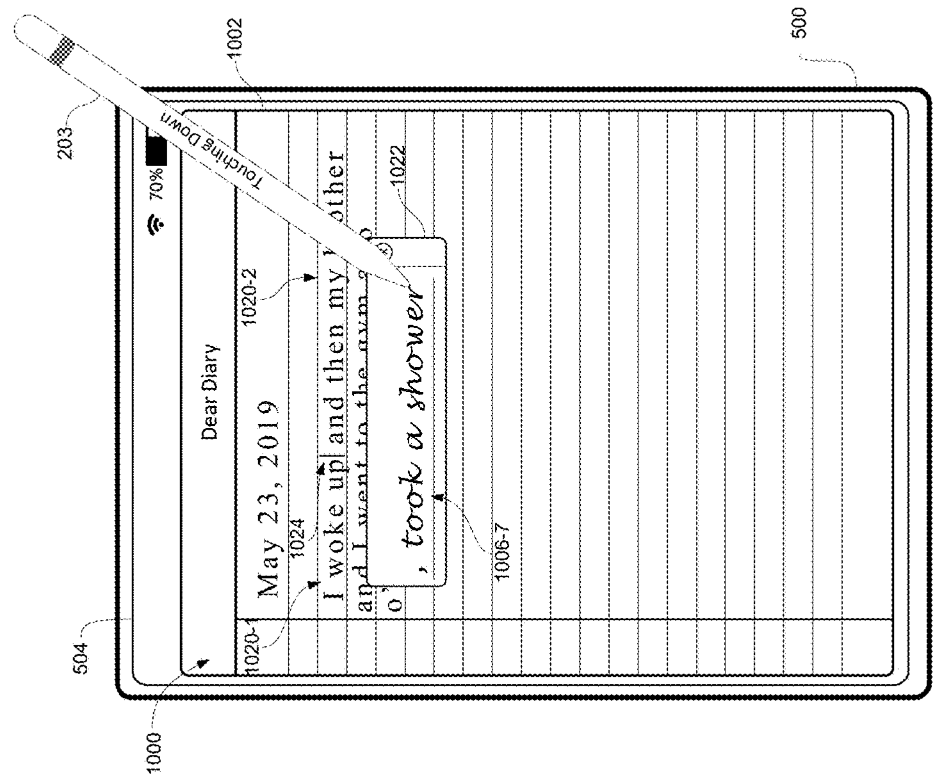
Figure 10N:
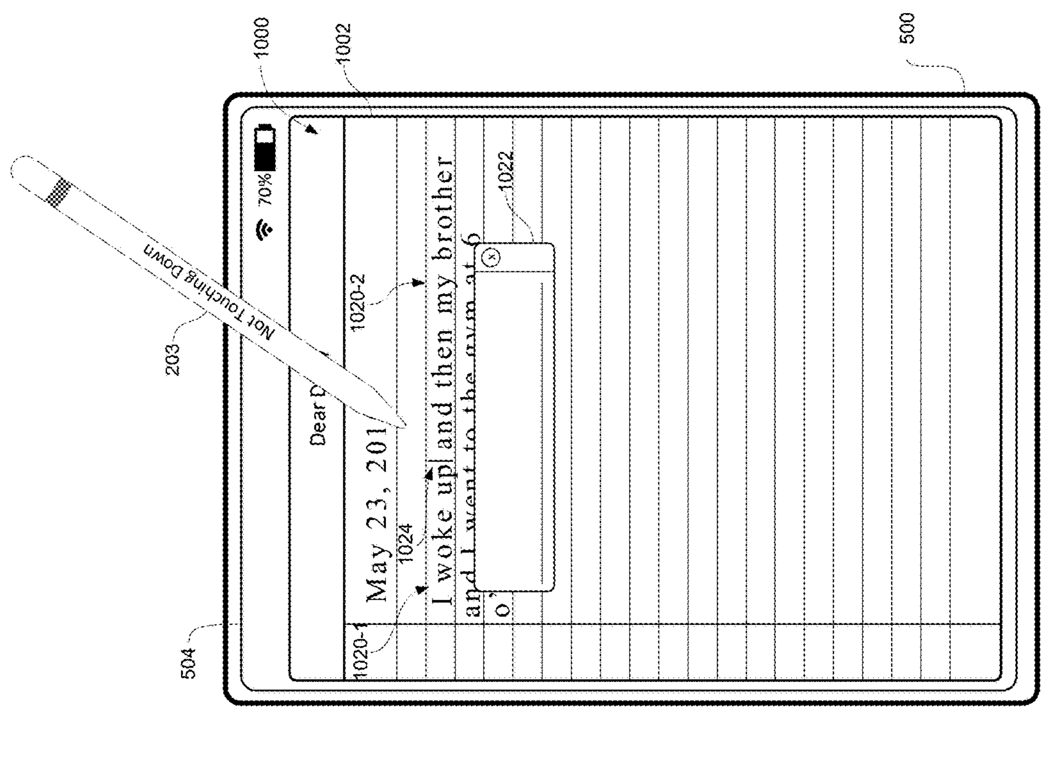
Figure 10Q:
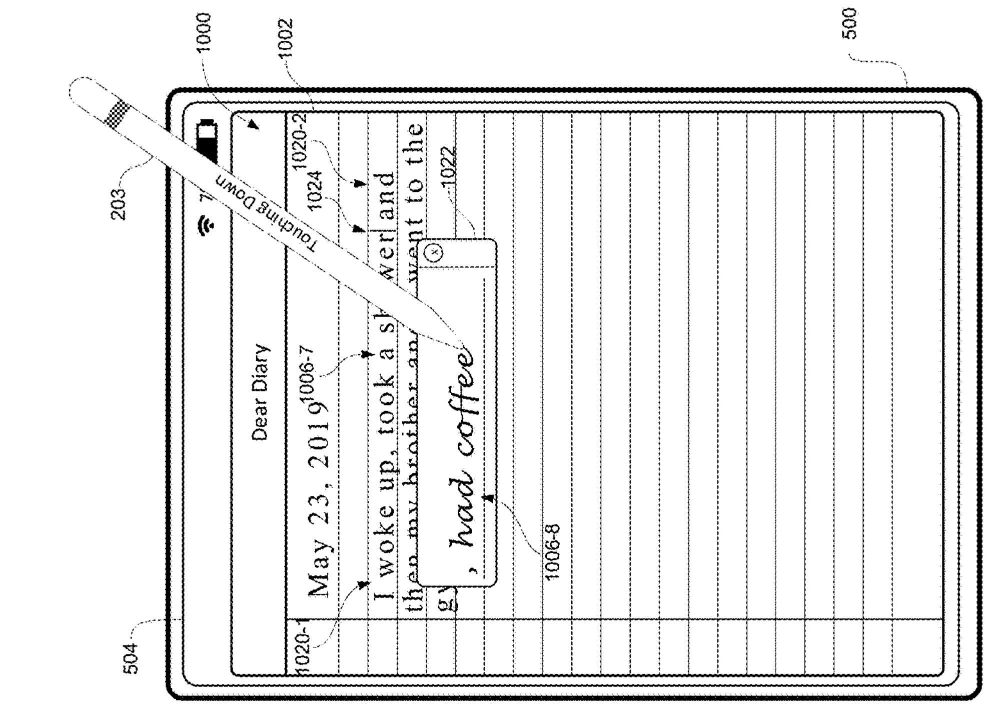
Figure 10P:
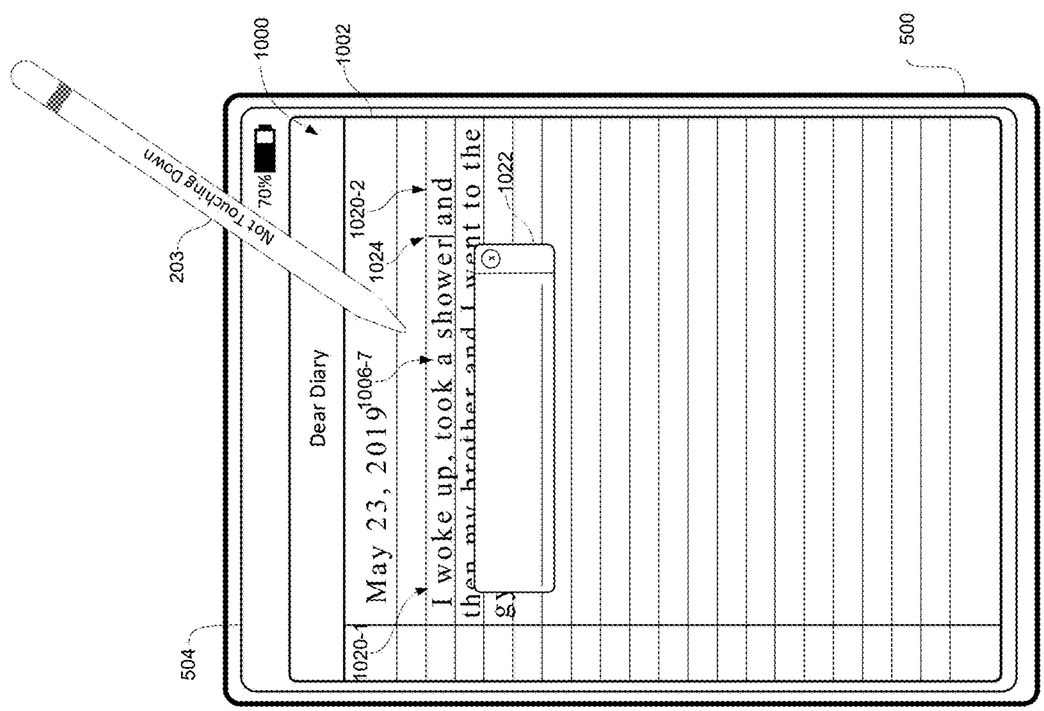
Figure 10R:
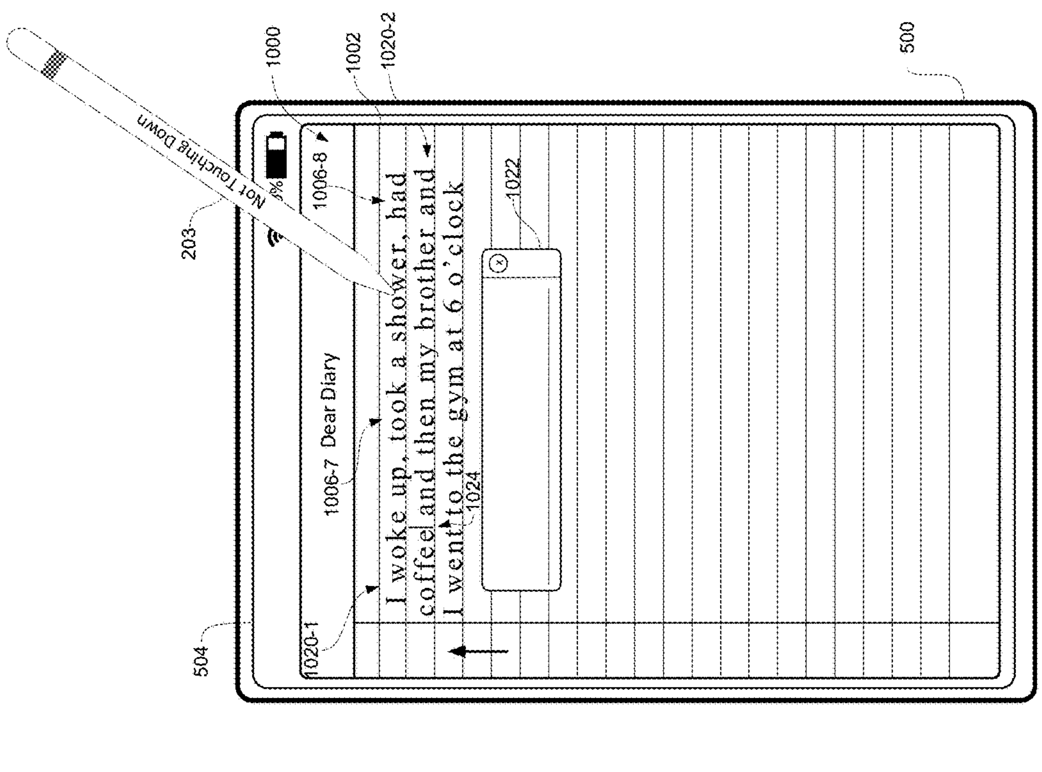
Figure 10S:
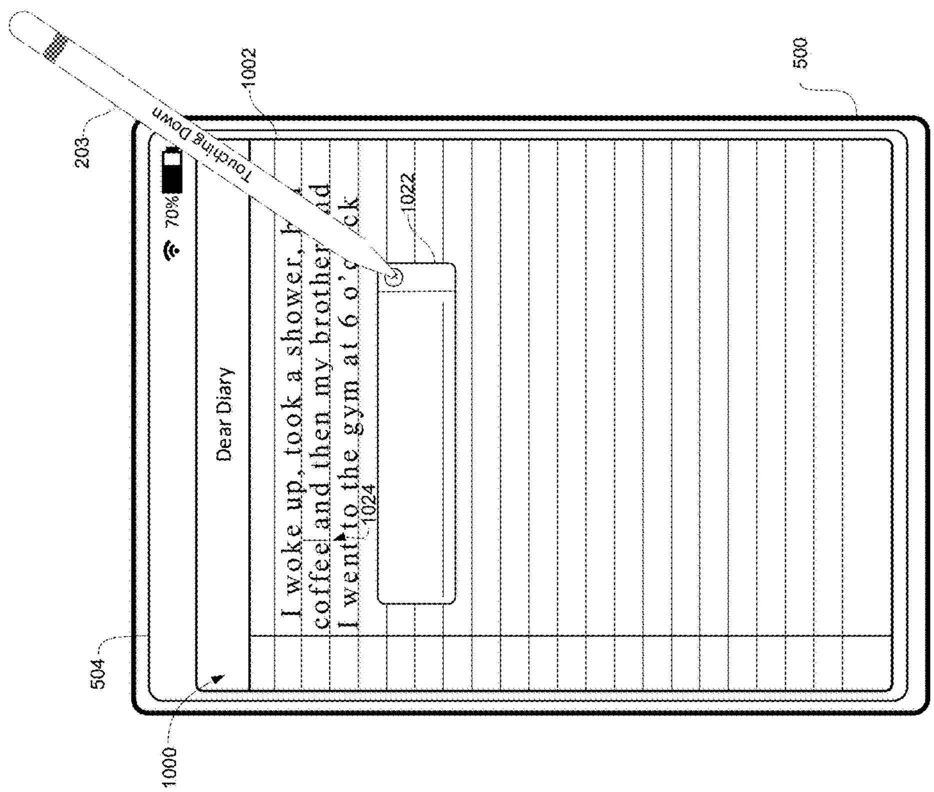
Figure 10U:
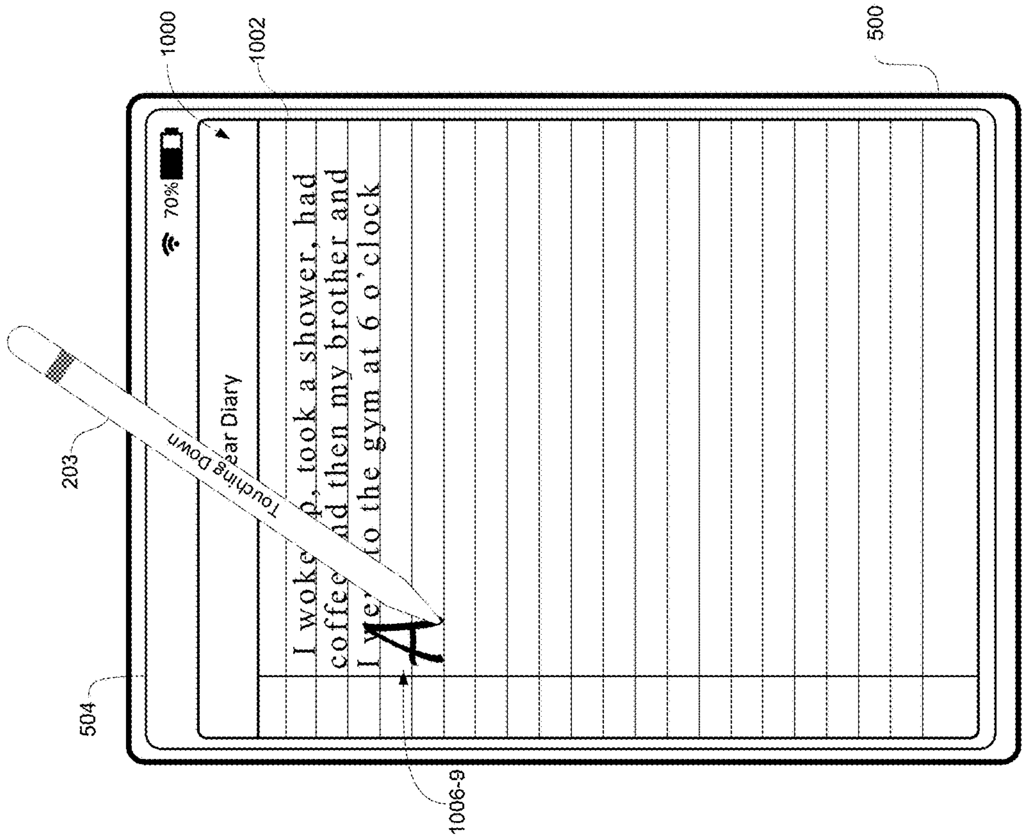
Figure 10T:
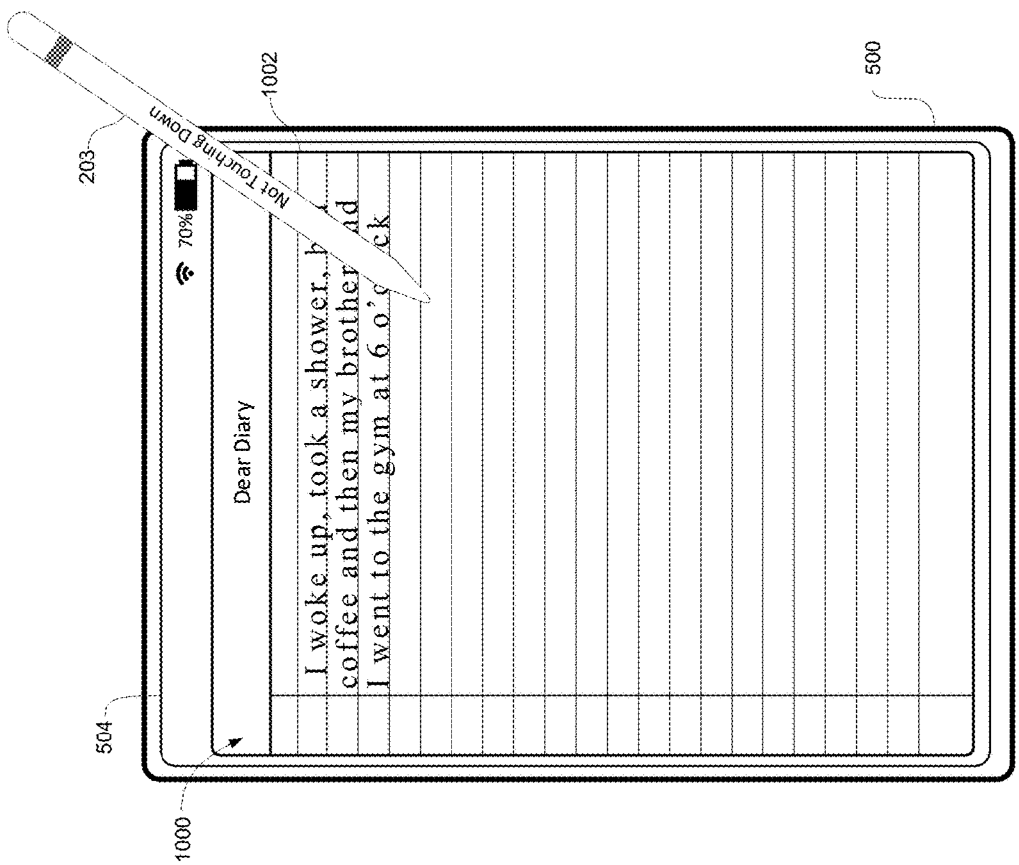
Figure 10W:
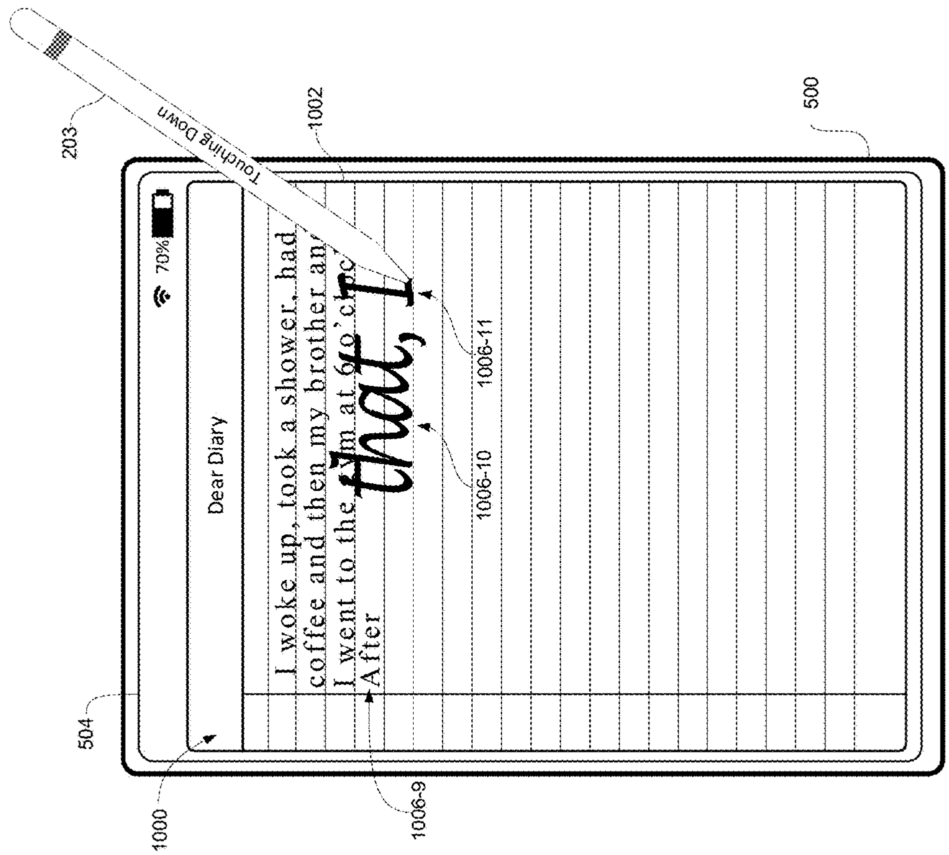
Figure 10V:
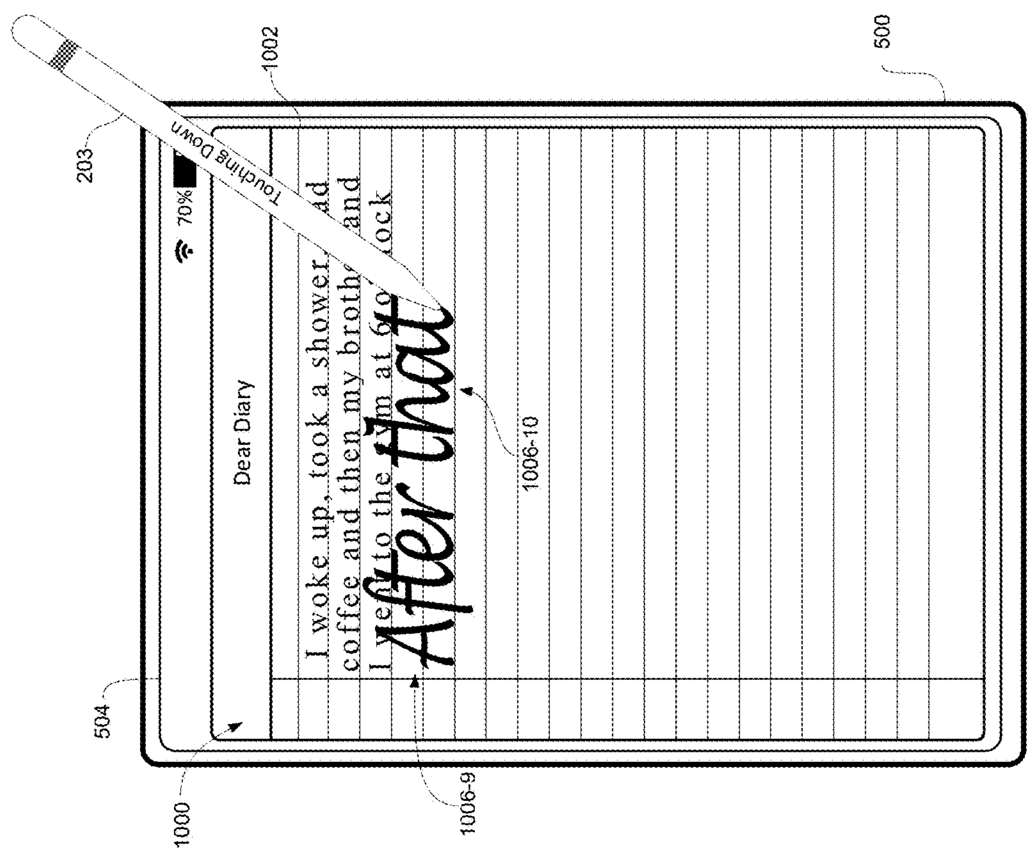
Figure 10Y:
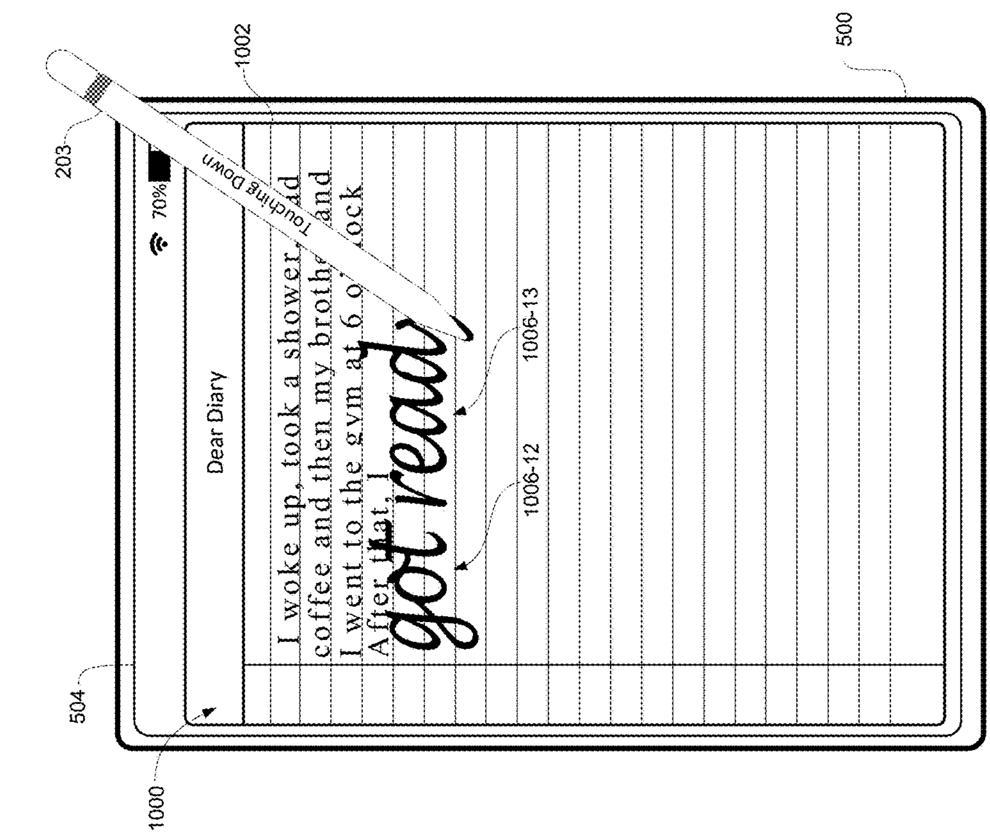
Figure 10X:
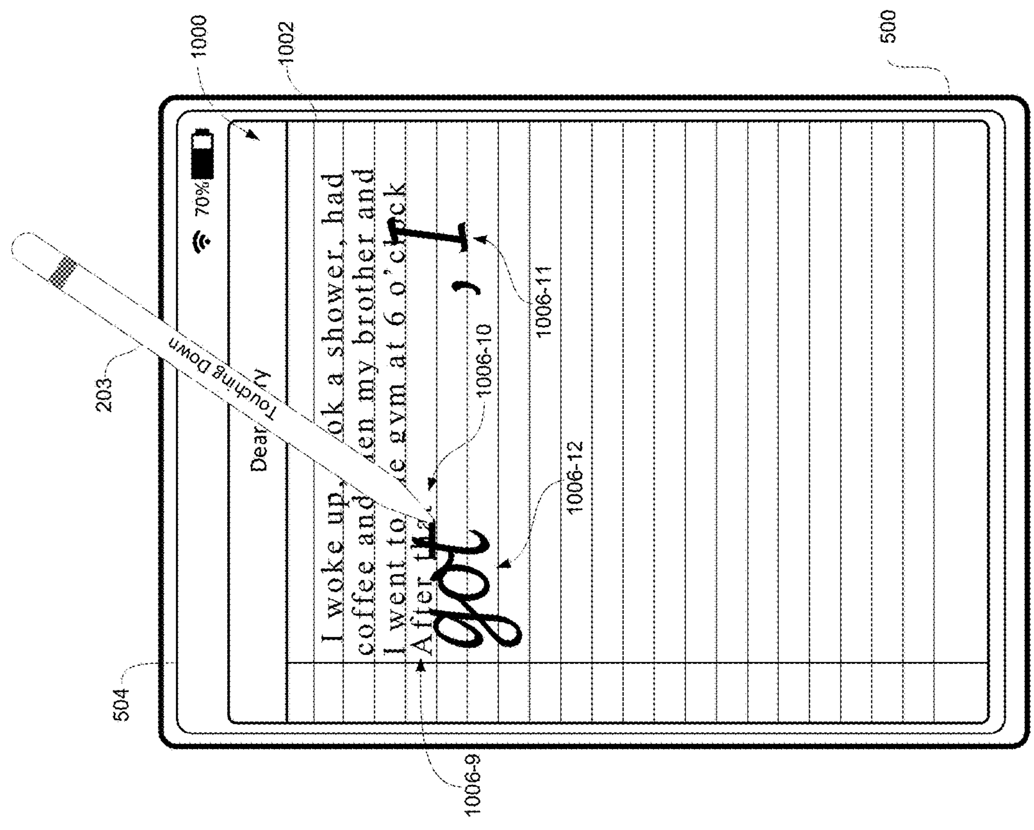
Figure 10Z:
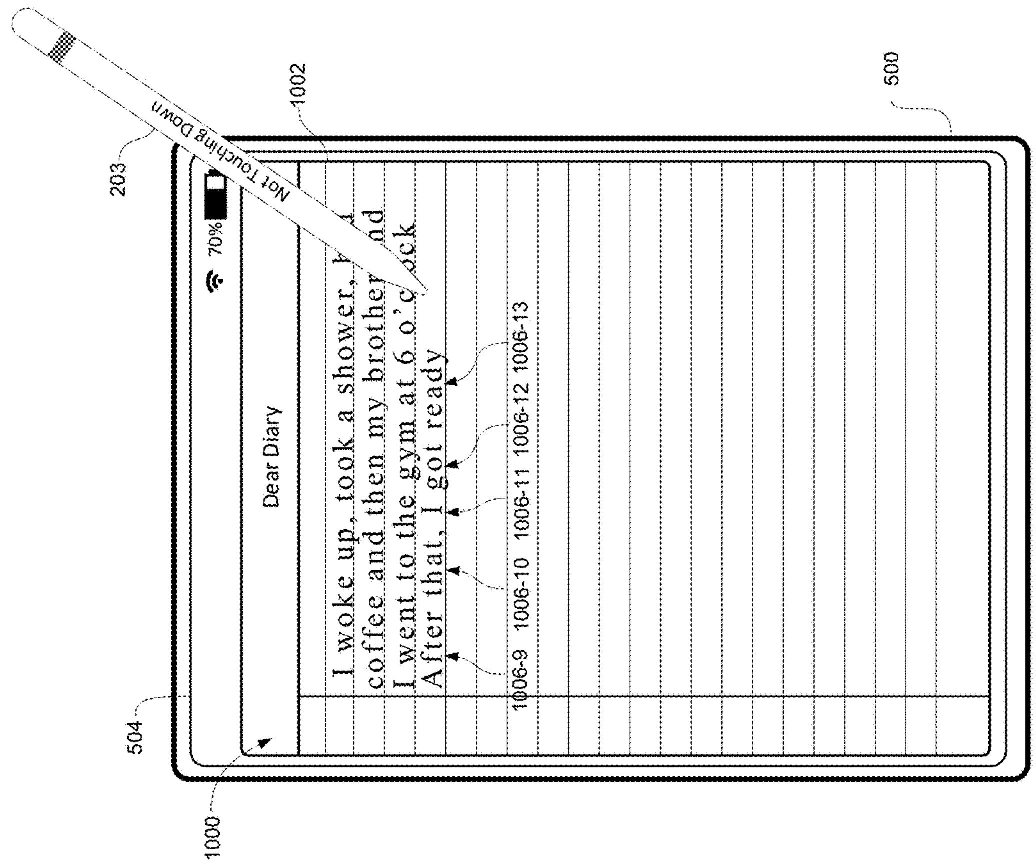
Figure 10Z:
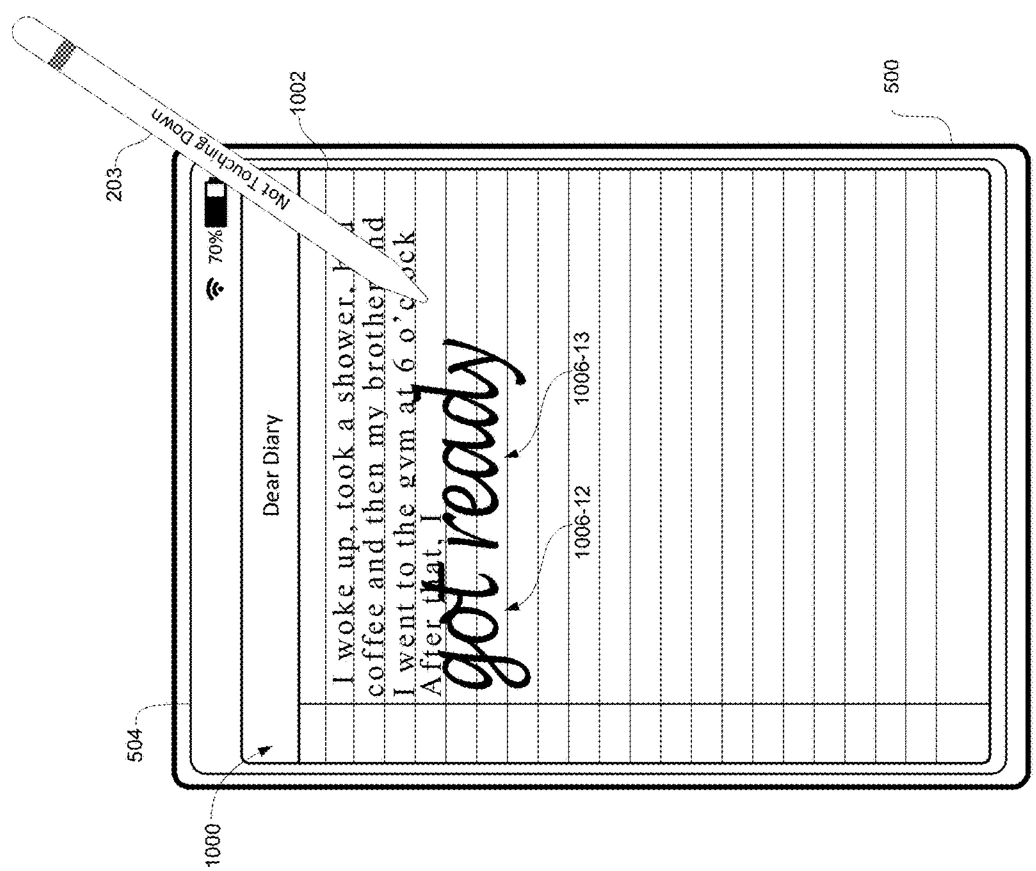
Figure 11A:
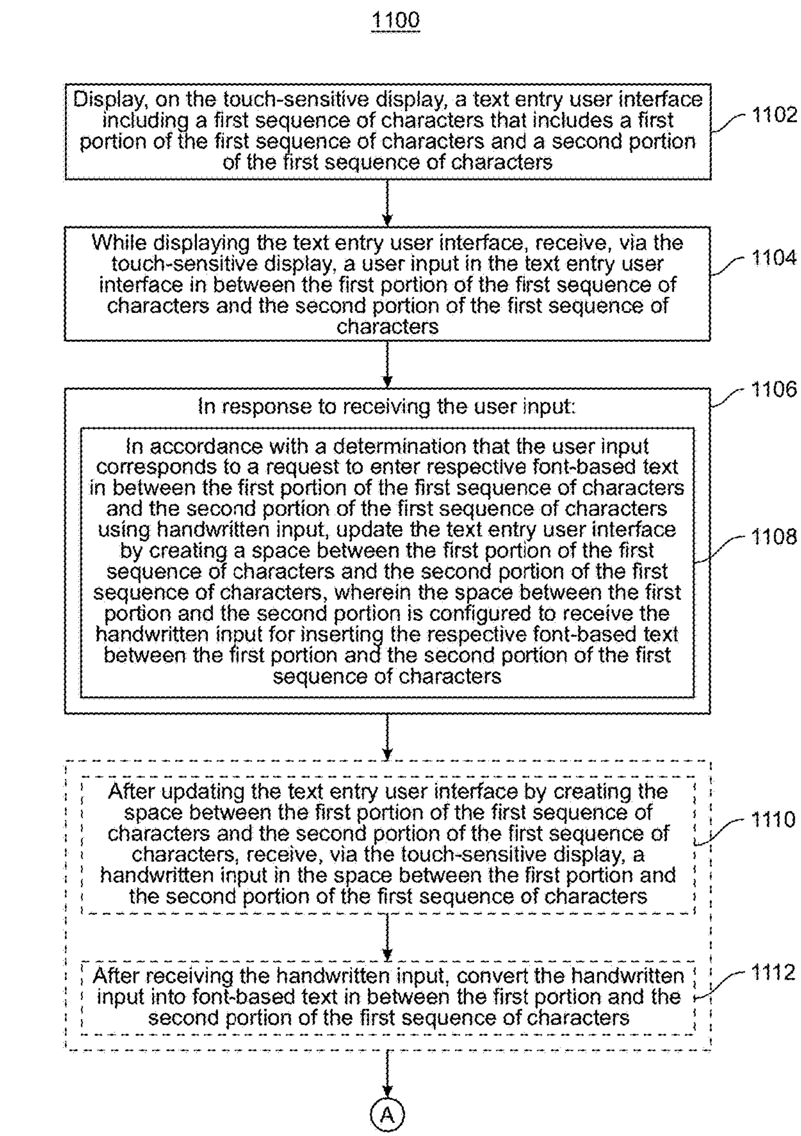
FIGS. 11A-11M are flow diagrams illustrating a method of inserting handwritten inputs into pre-existing text in accordance with some embodiments.
Figure 11B:
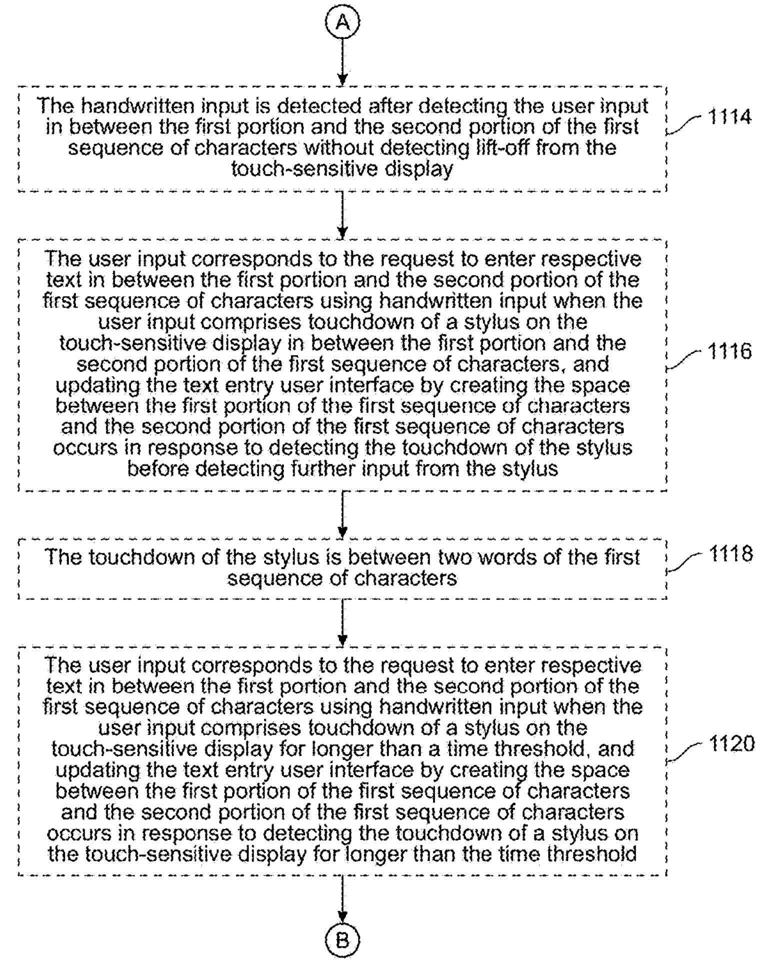
Figure 11C:
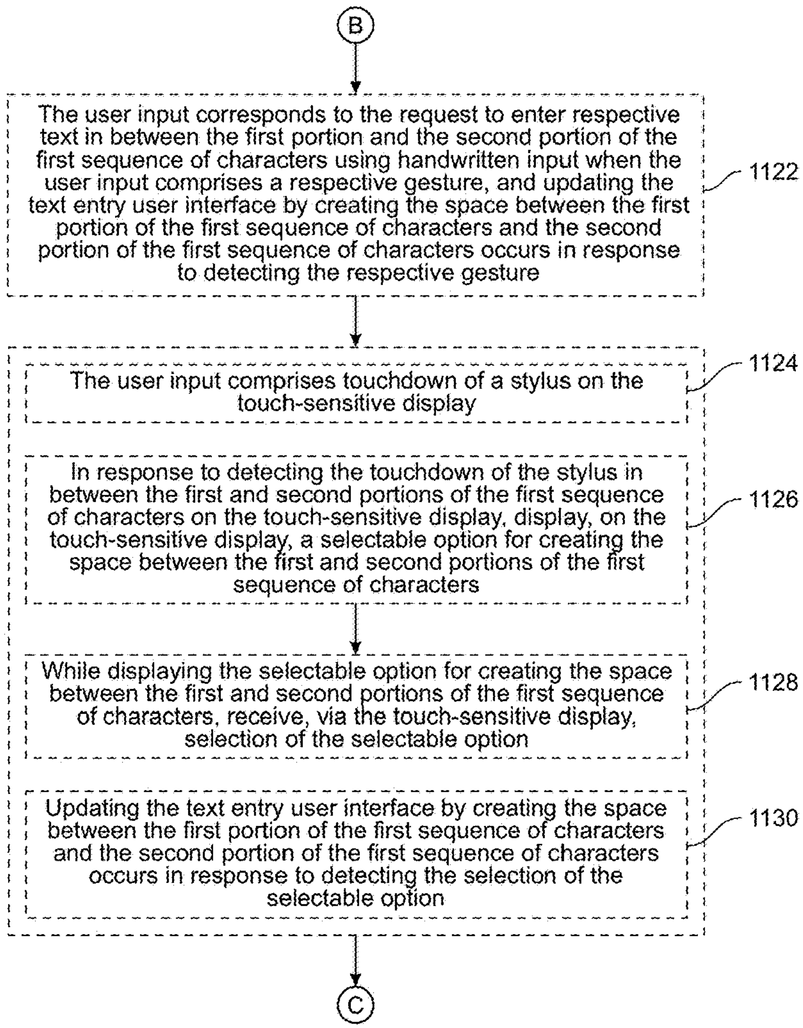
Figure 11D:
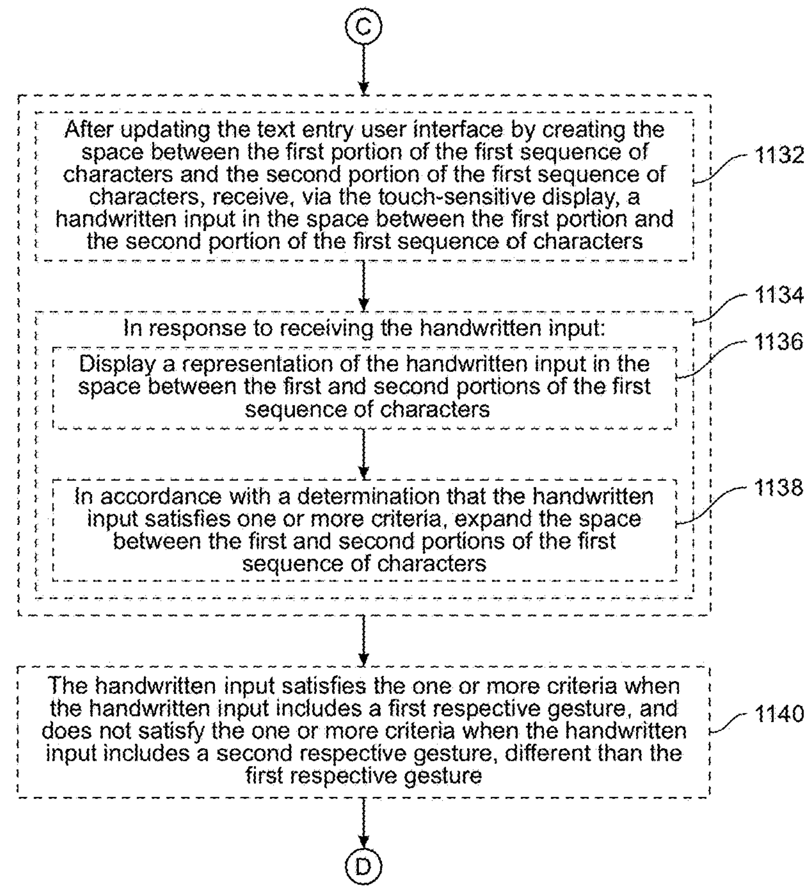
Figure 11E:
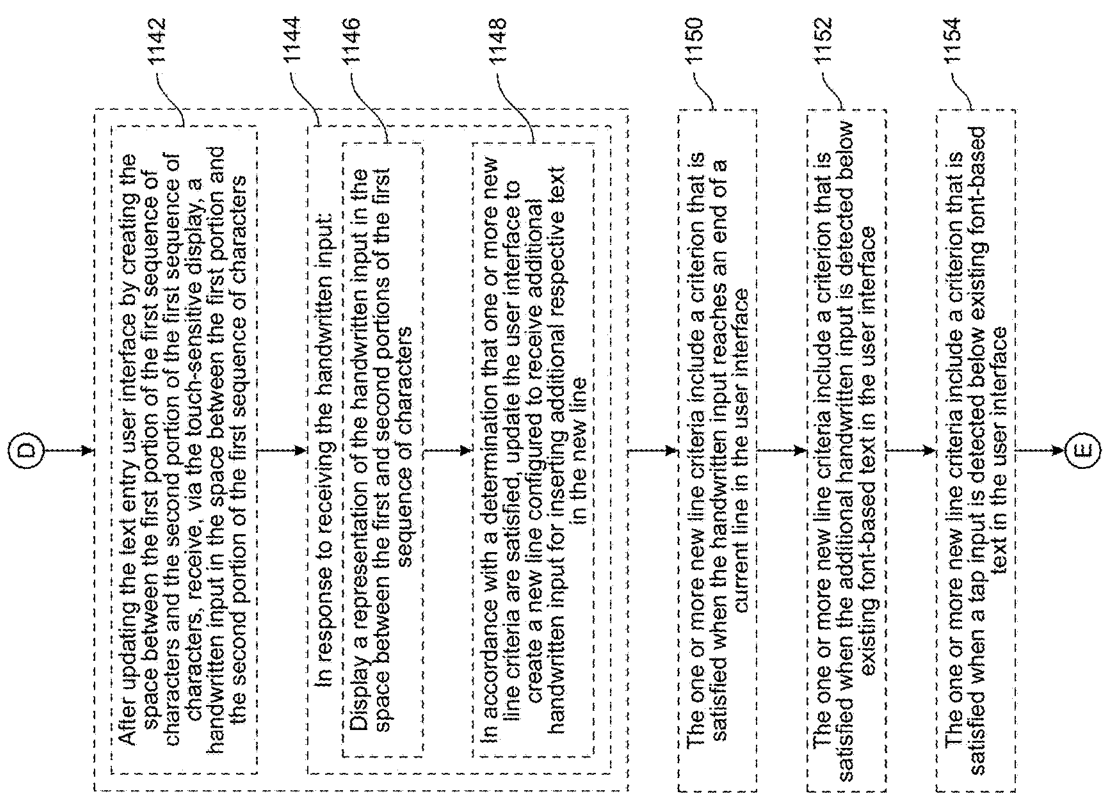
Figure 11F:
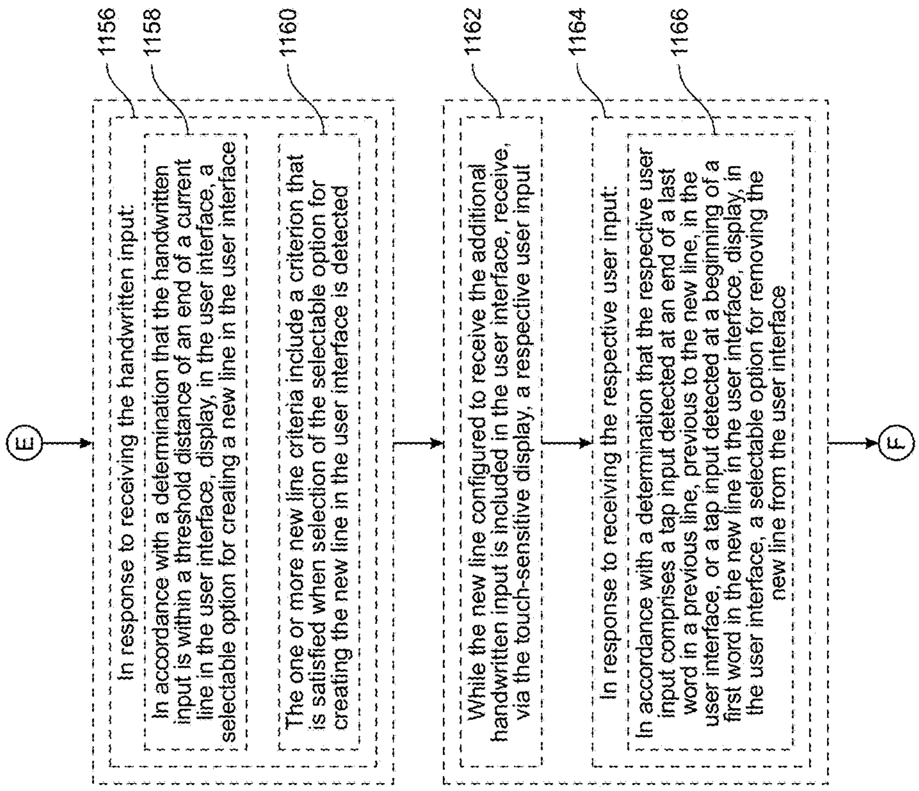
Figure 11H:
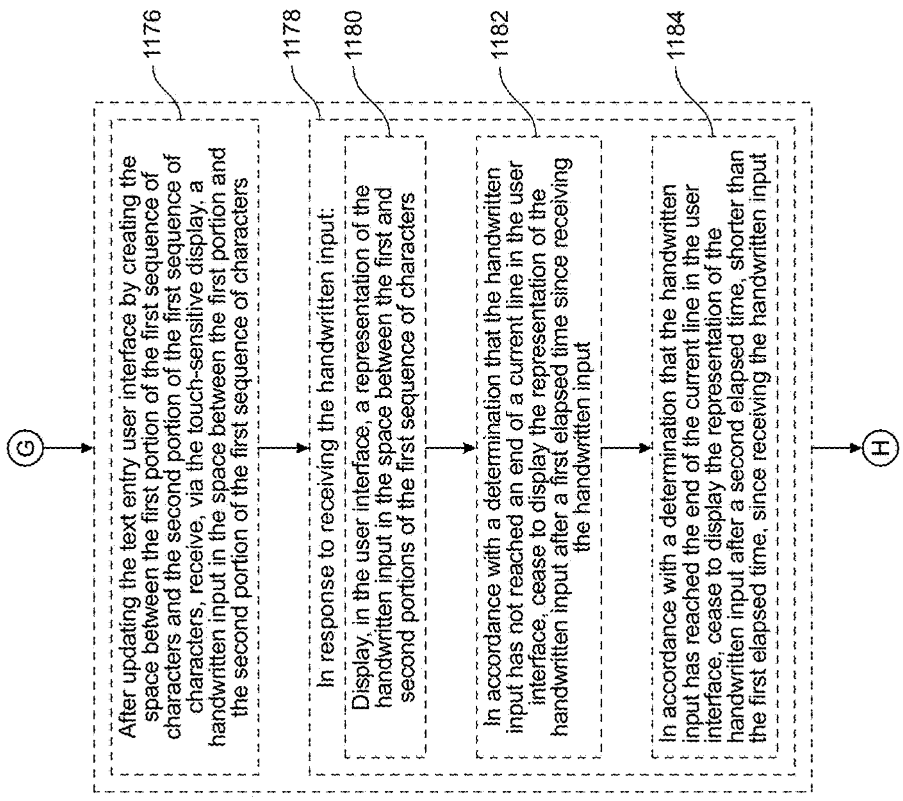
Figure 11G:
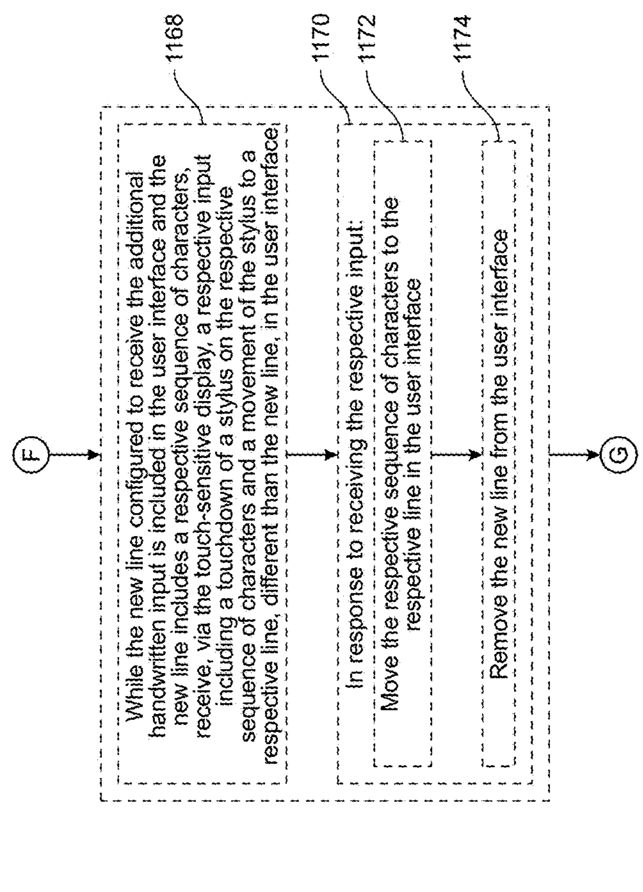
Figure 11I:
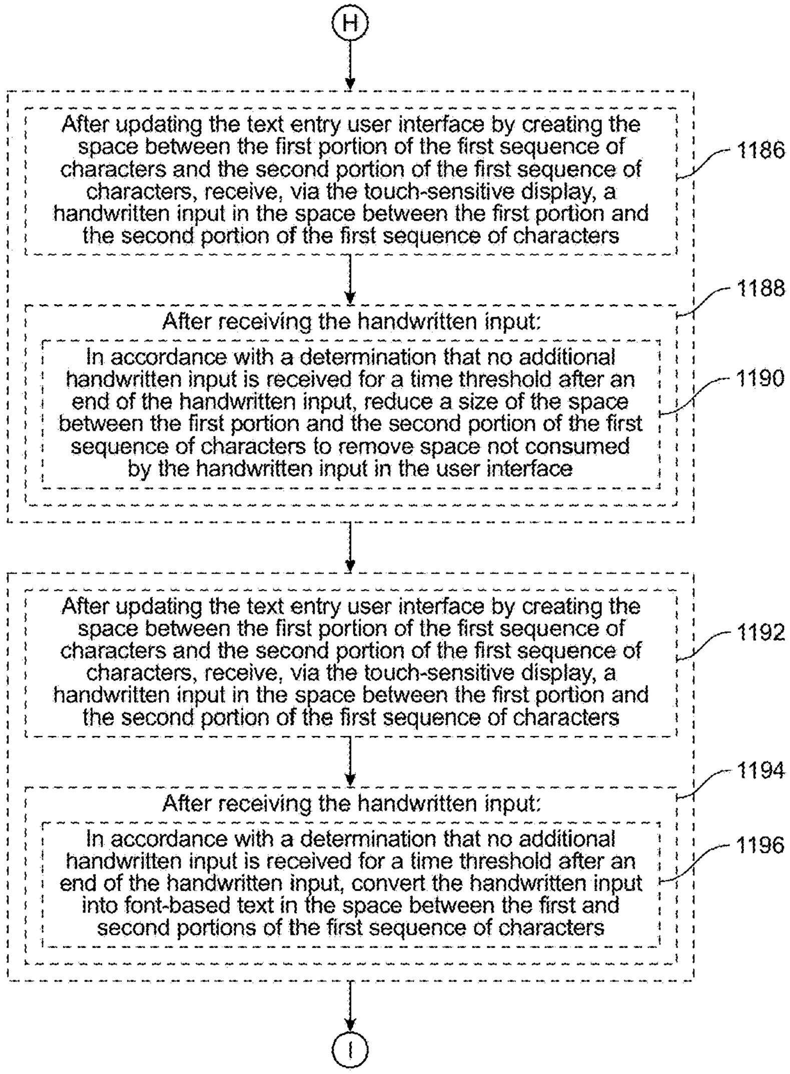
Figure 11J:
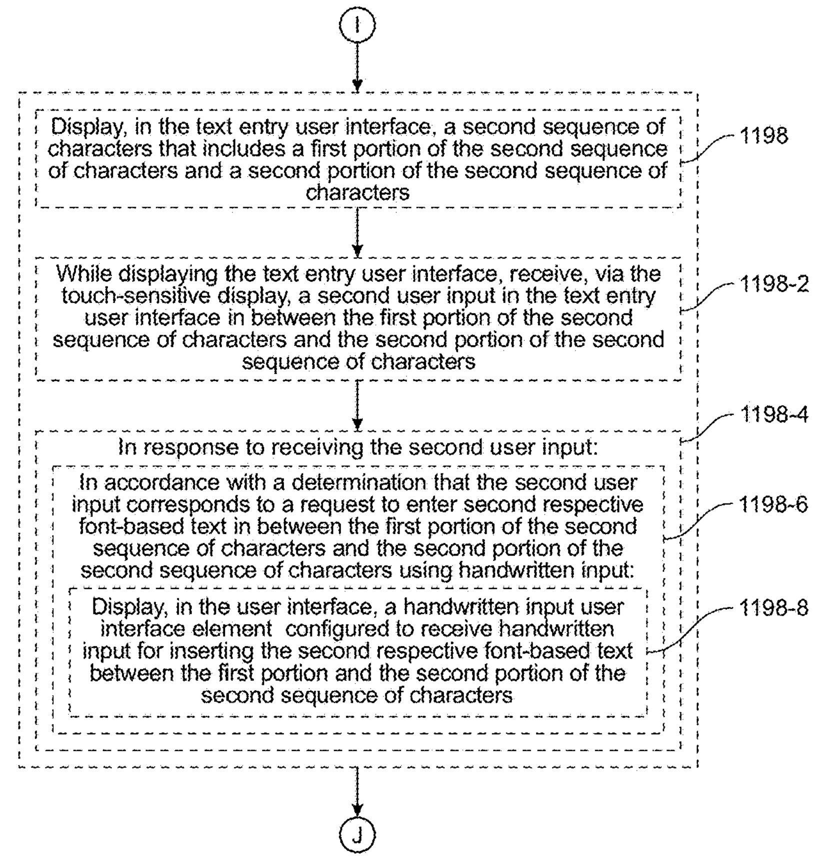
Figure 11K:
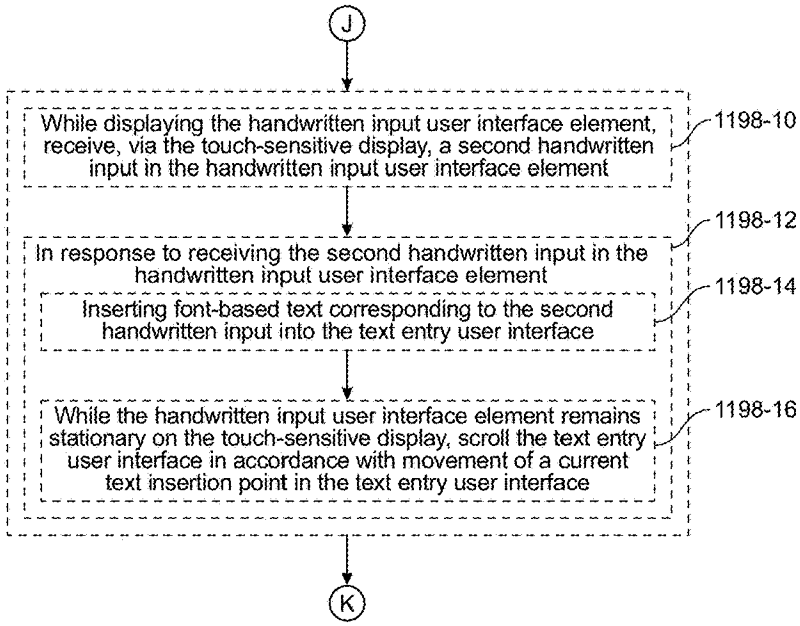
Figure 11L:
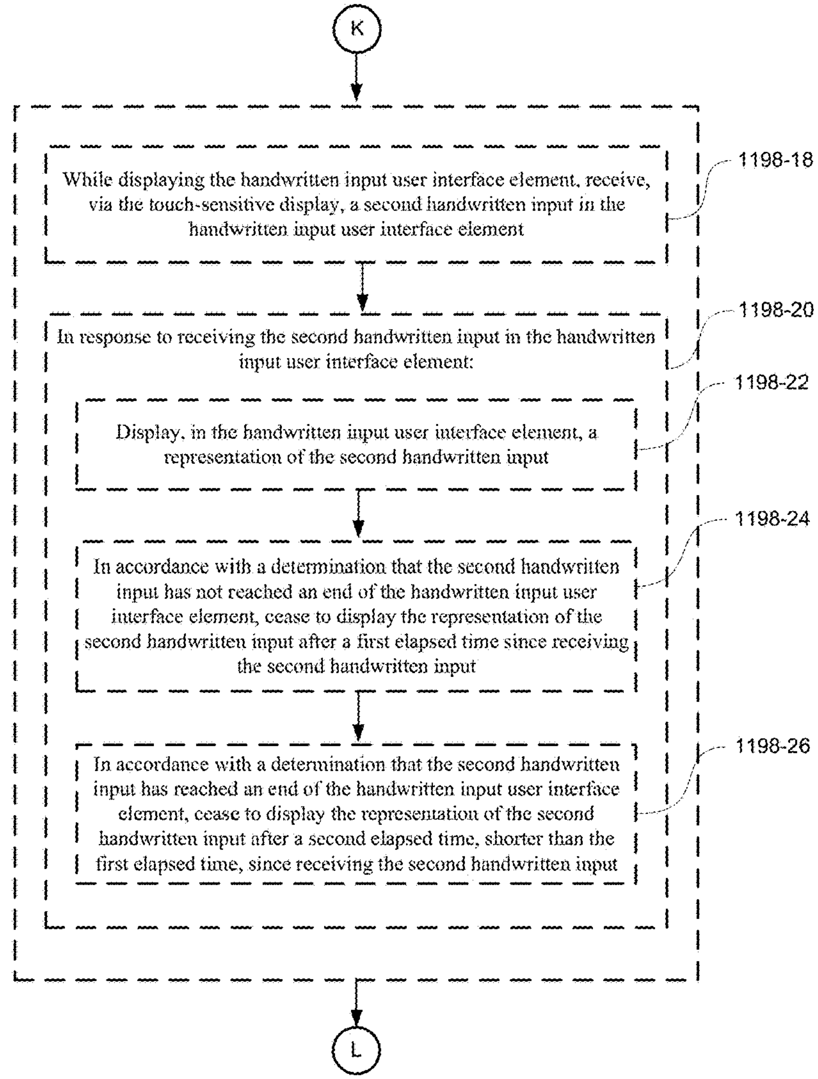
Figure 11M:
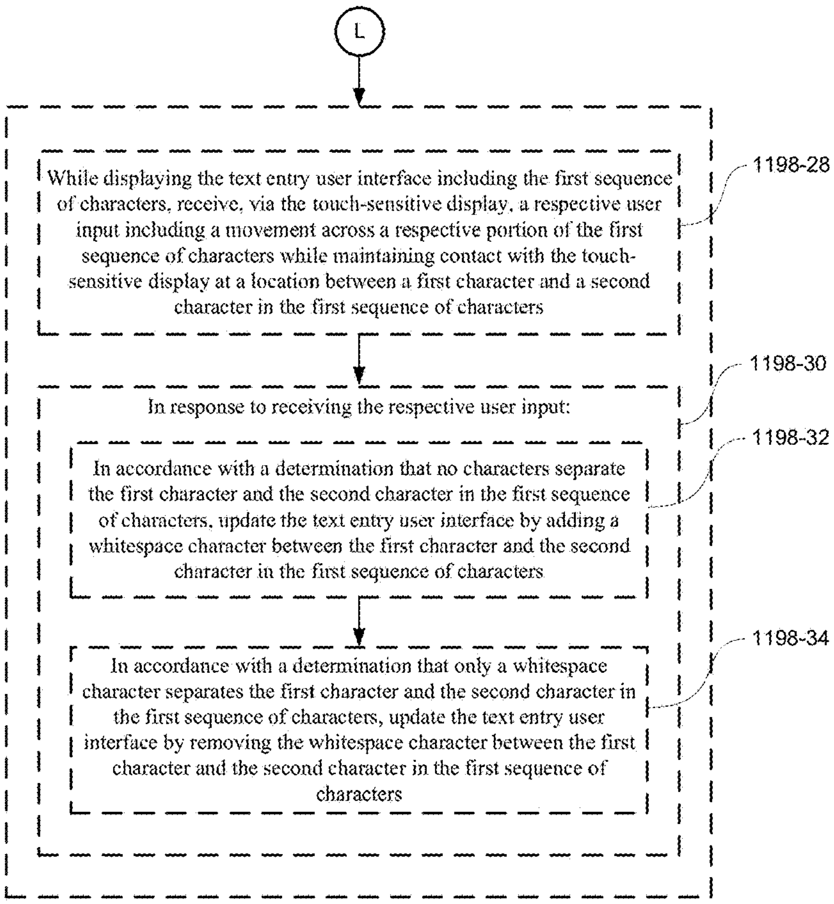

In FIG. 10Z, a touchdown by stylus 203 on touch screen 504 is detected. In some embodiments, the touch down by stylus 203 is a tap or long-press input on touch screen 504. In some embodiments, the touch down by stylus 203 is the beginning of a handwritten input. For example, as shown in FIG. 10AA, the user begins performing handwritten input 1006-6 at a location between a first portion of text 1016-1 and a second portion of text 1016-2. In some embodiments, in response to the handwritten input 1006-6, a space is created between the first portion of text 1016-1 and the second portion of text 1016-2, as shown in FIG. 10AA. Thus, in some embodiments, a user is able to insert space between pre-existing text by touching down at a respective location, waiting of space to be generated, and then begin handwritten inputs without lifting off contact with the touch screen or, alternatively, the user is able to touch down at a respective location and begin handwritten inputs without lifting off (e.g., the touch down is the beginning of the user's handwritten input) and without waiting for space to be created (e.g., and the appropriate space will be created in response).

In FIG. 10BB, a user input is received at a line below the previous handwritten input 1006-6. In some embodiments, the user input is a tap or a long-press. In some embodiments, the user input received a threshold distance below the previous handwritten input 1006-6 (e.g., 3 mm, 5 mm, 1 cm, 2 cm) is considered a request to insert a new line of text. In some embodiments, in response to the user input, a new line of text is inserted behind handwritten input 1006-6 (e.g., effectively pushing the second portion of the text 1016-2 to the next line), as shown in FIG. 10CC.

In FIG. 10DD, the user continues handwritten input 1006-6 at the previous line of text. In some embodiments, the line (e.g., line break) that was inserted is not removed when the user returns to handwriting in the previous line. In FIG. 10EE, a tap of stylus 203 (e.g., or long press) is detected at the beginning of the second portion of text 1016-2. In some embodiments, in response to the user input, popup 1018 is displayed that is selectable to remove the line break that is inserted before the second portion of text 1016-2. In some embodiments, popup 1018 is also displayed if the user taps (or long presses) at the end of the user's handwritten input 1006-6. In other words, a tap at the end of the last word before a line break and a tap at the beginning of the first word after a line break optionally causes display of popup 1018 that is selectable to remove the line break. In some embodiments, in response to receiving a user input selecting popup 1018, the line break between handwritten input 1006-6 and the second portion of text 1016-2 is removed, as shown in FIG. 10GG.

In FIG. 10HH, popup 1014 is displayed for inserting a new line (e.g., line break) between handwritten input 1006-6 and the second portion of text 1016-2. In some embodiments, popup 1014 is displayed in response to a tap or long press input at the location between handwritten input 1006-6 and the second portion of text 1016-2. In some embodiments, selection of popup 1014 causes a new line (e.g., line break) to be inserted at the respective location, as shown in FIG. 10II.

In FIG. 10II, a touchdown of stylus 203 is detected at the beginning of the second portion of text 1016-2. In some embodiments, the user is able to remove a line break that was inserted by "dragging" the second portion of text 1016-2 back to the previous line of text. For example, as shown in FIG. 10JJ, without lifting off from touch screen 504, the user input drags the second portion of text 1016-2 up and across to the previous line of text. In FIG. 10KK, the user continues the drag gesture, moving the second portion of text 1016-2 up to the previous line of text and beyond the point at which the second portion of text 1016-2 is aligned with handwritten input 1006-6. In some embodiments, as shown in FIG. 10LL, in response to detecting a lift-off of the user input, the second portion of text 1016-2 "snaps" (e.g., aligns) with the handwritten input 1006-6. FIG. 10MM illustrates handwritten input 1006-6 being converted into font-based text (e.g., optionally in accordance with method 700 and/or method 1300).

In FIG. 10MM, a user input is detected touching down in the pre-existing text (e.g., tap or long press). In some embodiments, in response to the user input, a text entry pop-up 1022 is displayed, as shown in FIG. 10NN. In some embodiments, a cursor 1024 appears in the location where the inserted text will appear (e.g., in the location between the first portion of the text 1020-1 and the second portion of the text 1020-2). In some embodiments, a cursor is not displayed. In some embodiments, text entry pop-up 1022 includes a text entry region. In some embodiments, the text entry region is capable of receiving handwritten inputs, converting the handwritten input into font-based text, and inserting the font-based text at the position of the cursor.

In FIG. 10OO, a handwritten input 1006-8 is received in text entry pop-up 1022. In some embodiments, a trail of the handwritten input 1006-8 is displayed in the text entry pop-up 1022. In some embodiments, the text entry region of the text entry pop-up shares similar features as the text entry regions described in FIG. 6 (e.g., the margin of error, tolerance, interpretation of words that begin or end outside of the text entry region, etc.). In some embodiments, after the user has completed inputting the handwritten input, the handwritten input is converted into font-based text and inserted at the location of the cursor, as shown in FIG. 10PP. In some embodiments, the handwritten input is converted into font-based text while still in the text entry pop-up 1022 before the font-based text is moved to the location of the cursor. In some embodiments, the conversion of handwritten input into font-based text occurs simultaneously with the insertion (e.g., the handwritten input is removed from display and the font-based text appears at the location of the cursor).

In FIG. 10QQ, further handwritten input 1006-8 is received in text entry pop-up 1022. In some embodiments, when handwritten input 1006-8 is converted into font-based text and inserted into the location of the cursor, the inserted text overflows the remainder of the current line where the text is inserted. Thus, in some embodiments, a part of the inserted text is in the previous line while a part of the inserted text is in the next line. In some embodiments, in response to inserting text that straddles two lines, the user interface beneath text entry pop-up 1022 is scrolled upwards to ensure that none of the inserted text is obstructed by text entry pop-up 1022 and/or the position of text entry pop-up 1022 is not moved. In some embodiments, in response to inserting text that straddles two lines, the user interface does not move and the text entry pop-up 1022 is moved downwards to ensure that it does not obstruct the inserted text.

In FIG. 10SS, a user input is detected selecting the selectable option to dismiss (e.g., close) text entry pop-up 1022. In some embodiments, in response to the user input, text entry pop-up 1022 is dismissed and no longer displayed, as shown in FIG. 10TT. In some embodiments, cursor 1024 is also removed from display.

FIGS. 10UU-10AAA illustrate a process of accelerating the conversion of handwritten inputs into text based on the position of the handwritten inputs. In FIG. 10UU, a user input is received performing handwritten input 1006-9. In some embodiments, handwritten input 1006-9 is large and encompasses several lines of text. In FIG. 10VV, the user continues writing and inputs handwritten input 1006-10. In some embodiments, because the user reached a threshold position on touch screen 504 or position in the user interface (e.g., halfway, ¾, ⅔, etc.), the system begins to convert handwritten input into font-based text faster (e.g., reducing the timers that control the timing of converting handwritten input into font-based text). In some embodiments, converting handwritten input into font-based text faster allows space to be freed up for the user at both the beginning of a line (e.g., if the handwritten input encompasses several lines of text and the font-based text only encompasses one line of text) and at the end of the line (e.g., by aligning the font-based text with pre-existing text while simultaneously reducing the size of the text from the original handwritten size to the font-based text size and thus providing additional space on the display).

For example, as shown in FIG. 10WW, handwritten input 1006-9 has optionally been converted to font-based text, which frees space on the left side of the display for further handwritten inputs. In FIG. 10WW, the user writes handwritten input 1006-11. In FIG. 10XX, the user begins writing in the position that has been freed up by the conversion from handwritten input 1006-9 to font-based text. In some embodiments, handwritten input 1006-10 has also been converted to font-based text. In FIG. 10YY, handwritten input 1006-11 has been converted into font-based text and aligned with the previously entered text. In some embodiments, the user writes handwritten input 1006-13. In FIG. 10YY, because the user has not yet written past a threshold position in the user interface (e.g., halfway, ¾, ⅔, etc.), the system does not convert handwritten input 1006-12 at an accelerated speed (e.g., the system uses the default timers for converting handwritten input 1006-12 without decreasing the elapsed time required before conversion). In FIG. 10ZZ, the user lifts off stylus 203 from contacting touch screen 504. In some embodiments, in response to the user lifting off stylus 203 (e.g., optionally after a threshold amount of time), handwritten input 1006-12 and handwritten input 1006-13 are converted to font-based text, as shown in FIG. 10AAA. In some embodiments, the converted font-based text are all aligned to generate a continuous sentence.

FIGS. 10BBB-10III illustrate an embodiment of creating space between two characters. In FIG. 10BBB illustrates user interface 1000 in which text entry region 1002 includes one or more pre-existing text characters 1004. In some embodiments, the pre-existing text 1004 will be referred to as the first portion 1004-1 and second portion 1004-2, as shown in FIG. 10CCC, for ease of description. In FIG. 10CCC, a user input is detected from stylus 203 touching down in the space between first portion 1004-1 and second portion 1004-2. In FIG. 10DDD, the contact with the touch screen 504 is held for less than the threshold amount of time and no space is created between first portion 1004-1 and second portion 1004-2. In FIG. 10EEE, in response to the user maintaining contact with touch screen 504 for the threshold amount of time (e.g., 0.25 seconds, 0.5 seconds, 1 second, 3 seconds, 5 seconds, etc.), a space is created between first portion 1004-1 and second portion 1004-2 to provide the user with additional space to insert characters. In FIG. 10FFF, a termination of the user input (e.g., lift-off of contact with touch screen 504) is detected. In some embodiments, in response to detecting the termination of the user input, the space between first portion 1004-1 and second portion 1004-2 is maintained. In some embodiments, the space is maintained for a threshold amount of time (e.g., 0.25 seconds, 0.5 seconds, 1 second, 3 seconds, 5 seconds, 10 seconds, etc.) before the space is collapsed to the spacing from before the user input (e.g., as in FIG. 10BBB). It is understood that the above-described method of creating space between two characters is applicable to both font-based text and handwritten text (e.g., text that has not been converted into font-based text or text that was inserted using a drawing tool and will not be converted into font-based text but is still recognized as valid text).

In FIG. 10GGG, a user input is received from stylus 203 in text entry region 1002 writing the word "all" in the space created between first portion 1004-1 and second portion 1004-2. In some embodiments, while the user input is being received, a representation of the handwritten input 1006-1 is displayed at the location of the user input. In FIG. 10HHH, a termination of the user input (e.g., lift-off of contact with touch screen 504) is detected. In some embodiments, in response to detecting the termination of the user input, representation of the handwritten input 1006-1 is analyzed, valid characters are detected and converted into font-based text, as shown in FIG. 10III. In some embodiments, the detection and conversion of handwritten characters into font-based text is described with respect to methods 700, 900, 1300, 1500, 1600, 1800, and 2000. In some embodiments, after converting the handwritten input into font-based text (e.g., optionally after a threshold amount of time in which no input is received such as 1 second, 3 seconds, 5 seconds, 10 seconds, etc.) or in response to converting the handwritten input into font-based text, any additional space that is not occupied by the newly inserted characters is collapsed and the spacing between characters and words is reverted to their original setting, such as in FIG. 10III. Thus, in some embodiments, device 500 recognizes the handwritten input as valid characters and inserts the characters as font-based text (e.g., converts the handwritten input into font-based text and inserts the font-based text) into the respective line and/or sentence of text.

FIGS. 10JJJ-10MMM illustrate an embodiment of creating and removing space between two characters. In FIG. 10JJJ, a handwritten input is received from stylus 203 corresponding to a downward swipe gesture between the characters "no" and "where" of the word "nowhere" in pre-existing text 1004. In some embodiments, while receiving the handwritten input, a representation of the downward swipe 1030 is displayed in text entry region 1002. In some embodiments, a representation of the downward swipe 1030 is not displayed in text entry region 1002. In some embodiments, in response to the handwritten input, a whitespace character (e.g., a single space) is inserted between the characters "no" and "where" of the word "nowhere", as shown in FIG. 10KKK. In some embodiments, a plurality of whitespace characters are inserted.

In FIG. 10LLL, a handwritten input is received from stylus 203 corresponding to a downward swipe gesture on the whitespace character between "no" and "where". In some embodiments, while receiving the handwritten input, a representation of the downward swipe 1030 is displayed in text entry region 1002. In some embodiments, a representation of the downward swipe 1030 is not displayed in text entry region 1002. In some embodiments, in response to the handwritten input, the whitespace character between "no" and "where" is removed (e.g., resulting in the word "nowhere"), as shown in FIG. 10MMM. In some embodiments, device 500 removes only one whitespace character regardless of the number of whitespace characters between the two non-whitespace characters (e.g., if multiple whitespace characters exist). In some embodiments, device 500 removes all the whitespace characters between the two non-whitespace characters (e.g., if multiple whitespace characters exist). Thus, in some embodiments, a downward swipe gesture at a location between two adjacent non-whitespace characters causes insertion of a whitespace character whereas a downward swipe gesture at a location of a whitespace character causes the deletion of the whitespace character. In some embodiments, an upward swipe gesture also performs the insertion/deletion function described above. In some embodiments, the downward and/or upward swipe gesture need not be perfectly vertical. For example, a downward or upward swipe gesture that is 5 degrees off vertical, 10 degrees off vertical, 15 degrees off vertical, 30 degrees off vertical, etc. is recognizable as a request to insert or delete a whitespace character (as the case may be). It is understood that the above-described method of adding and removing whitespace characters between two characters is applicable to both font-based text and handwritten text (e.g., text that has not been converted into font-based text or text that was inserted using a drawing tool and will not be converted into font-based text but is still recognized as valid text).

FIGS. 10NNN-10SSS illustrate display of a text insertion indicator. In FIG. 10NNN, a user input is detected from stylus 203 touching down in the space between first portion 1004-1 and second portion 1004-2 of text in text entry region 1002 (e.g., similar to FIG. 10DDD). In FIG. 10OOO, the contact is maintained for the threshold amount of time (e.g., 0.25 seconds, 0.5 seconds, 1 second, 3 seconds, 5 seconds, etc.). In some embodiments, in response to the contact being maintained for the threshold amount of time, a space is created between first portion 1004-1 and second portion 1004-2 to provide the user with additional space to insert characters, and text insertion indicator 1032 is displayed at the location of the inserted space, as shown in FIG. 10OOO. As shown in FIG. 10OOO, text insertion indicator 1032 is displayed between first portion 1004-1 and second portion 1004-2 representing the space that was inserted for the user to provide additional handwritten input. In some embodiments, the height of text insertion indicator 1032 has a height taller than the height of the font-based text to provide enough height for handwritten input. In some embodiments, the height of text insertion indicator 1032 is the height of the font-based text (e.g., of pre-existing text characters 1004). As shown in FIG. 10OOO, text insertion indicator 1032 is a grey rectangle or a grey highlighting at the position of the inserted space.

In some embodiments, displaying text insertion indicator 1032 includes displaying an animation expanding text insertion indicator 1032 from an initial width (e.g., 0.5 character width, 1 character width, 2 character width, etc.) to the final width of the space that was inserted in conjunction with an animation of the movement of first portion 1004-1 to the left and/or the movement of second portion 1004-2 to the right. For example, in FIG. 10OOO, text insertion indicator 1032 is displayed with a narrow width as second portion 1004-2 moves rightwards to begin creating space between first portion 1004-1 and second portion 1004-2.

In FIG. 10PPP, the animation of text insertion indicator 1032 continues and text insertion indicator 1032 further expands to reach its final width (e.g., the width of the space that was inserted). In some embodiments, second portion 1004-2 moves further rightwards to accommodate the entire width of the space that was inserted.

In FIG. 10QQQ, a termination of the user input (e.g., lift-off of contact with touch screen 504) is detected. In some embodiments, in response to detecting the termination of the user input, the space between first portion 1004-1 and second portion 1004-2 is maintained and display of text insertion indicator 1032 is maintained. In FIG. 10RRR, a handwritten input is received in the inserted space (e.g., at the location of text insertion indicator 1032). In some embodiments, while the user input is being received, a representation of the handwritten input 1006-1 is displayed at the location of the user input (e.g., within or on text insertion indicator 1032). In FIG. 10RRR, the handwritten input reaches the end of text insertion indicator 1032 (e.g., reaches the end of the inserted space, reaches within 0.5 mm, 1 mm, 3 mm, 5 mm, 1 cm, 3 cm, etc. of the end of text insertion indicator 1032). In some embodiments, in response to the handwritten input reaching the end of text insertion indicator 1032, additional space is inserted between first portion 1004-1 and second portion 1004-2 and text insertion indicator 1032 expands to include the width of the additional space, as shown in FIG. 10SSS. In some embodiments, second portion 1004-2 (or a portion of second portion 1004-2) is moved to a second line beneath first portion 1004-1 due to being displaced by the handwritten input.

In some embodiments, upon termination of the handwritten input and optionally after a threshold amount of time, representation of handwritten input 1006-1 is converted into font-based text (e.g., such as described above in FIG. 10III). In some embodiments, after the threshold amount of time, the spacing between the characters is collapsed to remove additional spaces that were not consumed by the additional handwritten input (e.g., such as described above in FIG. 10III). In some embodiments, concurrently with removing the additional spaces, text insertion indicator 1032 is ceased to be displayed (e.g., no longer displayed in user interface 1000).

It is understood that although the above examples describe and illustrate insertion of text between two words, inserting text between two characters in the same word or inserting text between any two characters based on the above-described exemplary methods are also possible.

FIGS. 11A-11M are flow diagrams illustrating a method 1100 of inserting handwritten inputs into pre-existing text. The method 1100 is optionally performed at an electronic device such as device 100, device 300, device 500, device 501, device 510, device 591 as described above with reference to FIGS. 1A-1B, 2-3, 4A-4B and 5A-5I. Some operations in method 1100 are, optionally combined and/or order of some operations is, optionally, changed.

As described below, the method 1100 provides ways to insert handwritten inputs into pre-existing text. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., an electronic device, a mobile device (e.g., a tablet, a smartphone, a media player, or a wearable device) including a touch screen, or a computer including a touch screen, such as device 100, device 300, device 500, device 501, or device 591) in communication with a touch-sensitive display displays (1102), on the touch-sensitive display, a text entry user interface including a first sequence of characters that includes a first portion of the first sequence of characters and a second portion of the first sequence of characters, such as in FIG. 10A (e.g., displayed on the text entry user interface is an editable text field which includes a sequence of characters (e.g., a string of text)). In some embodiments, the sequence of characters in the editable text field was previously inputted by the user or was pre-populated without user input. In some embodiments, the pre-existing characters in the editable text field is also editable (e.g., the characters are able to be deleted, modified, moved, added to, etc.). In some embodiments, the pre-existing text is computer text (e.g., font-based text). In some embodiments, the pre-existing text is handwritten words (e.g., handwritten inputs that have not been converted into font-based text yet).

In some embodiments, while displaying the text entry user interface, the electronic device receives (1104), via the touch-sensitive display, a user input in the text entry user interface in between the first portion of the first sequence of characters and the second portion of the first sequence of characters, such as in FIG. 10B (e.g., an input from a stylus between two words, two characters, etc. in the first text string). In some embodiments, the input is a tap input, a long press input, an input with a pressure above a certain threshold, a gesture, or handwritten input.

In some embodiments, in response to receiving the user input (1106), in accordance with a determination that the user input corresponds to a request to enter respective font-based text in between the first portion of the first sequence of characters and the second portion of the first sequence of characters using handwritten input (e.g., a tap input with a stylus between two words or characters in a text string optionally indicates a request to enter text between the two words or character, respectively), the electronic device updates (1108) the text entry user interface by creating a space between the first portion of the first sequence of characters and the second portion of the first sequence of characters, wherein the space between the first portion and the second portion is configured to receive the handwritten input for inserting the respective font-based text between the first portion and the second portion of the first sequence of characters, such as in FIG. 10C (e.g., pushing the first portion and the second portion of the text apart to create a space in which the user can input handwritten inputs).

In some embodiments, a touch-down of a stylus between two characters and continued contact for a threshold amount of time (e.g., 0.5 seconds, 1 second, 3 seconds, 5 seconds) indicates a request to enter text between the two characters. In some embodiments, an input with a particular pattern indicates a request to enter text between the two characters (e.g., a keyword gesture, or a keyword character, such as a caret). In some embodiments, beginning handwritten input with a stylus between the two characters (e.g., the user directly begins writing) indicates a request to enter text between the two words. In some embodiments, the system enters into a text insertion mode in response to the request to enter text between the first portion and the second portion of the first text string. In some embodiments, if the user input does not correspond to a request to enter font-based text, then interpret the input as a command or other non-text-entry gesture. For example, if the user input is optionally a request to scroll or navigate through the user interface (e.g., vertical or horizontal gestures), a selection input (e.g., a horizontal gesture passing through one or more characters), or a deletion input (e.g., a vertical cross-out gesture).

In some embodiments, the first portion of the text moves leftwards and the second portion of the text remains stationary. In some embodiments, the first portion of the text moves leftwards and the second portion of the text moves rightwards. In some embodiments, the first portion of the text remains stationary and the second portion of the text moves rightwards to create the space. In some embodiments, if the user has not entered handwritten input in the created space after a threshold amount of time (e.g., 1, 2, 5, 10 seconds), the first portion and second portion of the text are moved back together to form a continuous text string (e.g., back to its original state). In some embodiments, as the user enters handwritten input into the space, the space will increase in length (e.g., by continuing to push the first and/or second portions of the preexisting text string apart) to continually provide space for the user to continue inputting handwritten input. In some embodiments, after the user has stopped entering handwritten input for a threshold amount of time (e.g., 1, 2, 5, 10 seconds), the first portion and the second portion of the text will move to remove any excess space between the newly entered text and the preexisting text (e.g., the created excess space will collapse away). In some embodiments, the second portion of the text moves downwards (e.g., as opposed to rightwards) such that a new line is created (e.g., in response to the user reaching the end of the display or text field or in response to a user input corresponding to a request to insert a new line) to provide more space for the user to input handwritten input. In some embodiments, the handwritten input is converted into computer text as the user inputs the handwritten input (e.g., as described with reference to method 700). In some embodiments, the handwritten input is converted when the excess space is removed (e.g., when text insertion mode is terminated).

The above-described manner of inserting text (e.g., by receiving a user input corresponding to a request to insert text between pre-existing text and moving the pre-existing text to create space for the user to perform handwritten input) allows the electronic device to provide the user with the ability to insert handwritten input between preexisting text (e.g., by determining whether the user requests to insert text between pre-existing text and automatically moving the pre-existing text to create space for the user to insert handwritten input), which simplifies the interaction between the user and the electronic device and enhances the operability of the electronic device and makes the user-device interface more efficient (e.g., by allowing the user to easily insert text between words without requiring the user to navigate to a separate user interface or menu or perform additional user inputs to create space to insert text and to remove space after completion of text insertion), which additionally reduces power usage and improves battery life of the electronic device by enabling the user to use the electronic device more quickly and efficiency.

In some embodiments, after updating the text entry user interface by creating the space between the first portion of the first sequence of characters and the second portion of the first sequence of characters, the electronic device receives (1110), via the touch-sensitive display, a handwritten input in the space between the first portion and the second portion of the first sequence of characters, such as in FIG. 10D (e.g., receiving handwritten input in the space that was created for entering handwritten text). In some embodiments, the handwritten input is further gestures or commands to create more space. In some embodiments, the handwritten input is text to be converted into font-based text.

In some embodiments, after receiving the handwritten input, the electronic device converts (1112) the handwritten input into font-based text in between the first portion and the second portion of the first sequence of characters, such as in FIG. 10F (e.g., interpreting and recognizing the handwritten input and converting it into font-based text and entering the font-based text into the space between the two portions of characters). In some embodiments, after the handwritten input is converted, any remaining space between the first portion of characters, second portion of characters and new font-based text is removed (e.g., the text is "closed" back up).

The above-described manner of inserting text (e.g., by receiving handwritten input in the space that was created and converting the handwritten input into font-based text and inserting the font-based text between the first portion and second portion of the sequence of) allows the electronic device to provide the user with the ability to insert handwritten input between preexisting text (e.g., by receiving handwritten text in the space that was created between the two portions of characters and inserting the font-based text that was converted from the handwritten text into that), which simplifies the interaction between the user and the electronic device and enhances the operability of the electronic device and makes the user-device interface more efficient (e.g., by allowing the user to easily insert text between words without requiring the user to navigate to a separate user interface or menu or perform additional user inputs to create space to insert text and to remove space after completion of text insertion), which additionally reduces power usage and improves battery life of the electronic device by enabling the user to use the electronic device more quickly and efficiency.

In some embodiments, the handwritten input is detected after detecting the user input in between the first portion and the second portion of the first sequence of characters without detecting lift-off from the touch-sensitive display (1114), such as in FIG. 10AA (e.g., the user's handwritten input directly writing into the position between the first and second portions of the sequence of characters is itself considered a request to insert text between the first portion and second portions). In some embodiments, the user is able to begin writing into the text and the system will automatically determine that the user is requesting to insert text, and create the space required for the user to continue entering text. In some embodiments, the handwritten input begins after a tap-and-hold input without lift-off. In some embodiments, the user touched down on the screen, waits for the space to be created, then begins writing into the space without lifting off from the touch-sensitive display. Thus, in some embodiments, the handwritten input writing letters and/or words is detected without detecting a lift-off from the input that causes space to be created.

The above-described manner of inserting text (e.g., by receiving handwritten input without detecting a lift-off of the input) allows the electronic device to provide the user with the ability to begin accepting handwritten input after creation of space between preexisting text (e.g., by accepting handwritten text in the space that was created between the two portions of characters without requiring or otherwise detecting a lift-off of the handwritten input), which simplifies the interaction between the user and the electronic device and enhances the operability of the electronic device and makes the user-device interface more efficient (e.g., by allowing the user to begin handwritten input after the space has been created without lifting off from the screen), which additionally reduces power usage and improves battery life of the electronic device by enabling the user to use the electronic device more quickly and efficiency.

In some embodiments, the user input corresponds to the request to enter respective text in between the first portion and the second portion of the first sequence of characters using handwritten input when the user input comprises touchdown of a stylus on the touch-sensitive display in between the first portion and the second portion of the first sequence of characters, and updating the text entry user interface by creating the space between the first portion of the first sequence of characters and the second portion of the first sequence of characters occurs in response to detecting the touchdown of the stylus before detecting further input from the stylus (1116), such as in FIG. 10C (e.g., the system enters into text insertion mode and moves the portion of the text apart to create space is performed when the stylus initially touches down on the touch screen). In some embodiments, the stylus touches down on the touch screen and begins writing characters to be inserted without lifting off or otherwise waiting for space to be created (e.g., the user beginning to write is considered a request to insert text).

The above-described manner of inserting text (e.g., by beginning the process for inserting text upon detecting touchdown on the touch screen) allows the electronic device to provide the user with the ability to begin inserting handwritten text (e.g., by creating the space as soon as the user touches down on the screen, thus allowing the user to begin writing in the space that is created), which simplifies the interaction between the user and the electronic device and enhances the operability of the electronic device and makes the user-device interface more efficient (e.g., by allowing the user to easily insert text by merely touching down on the desired location and without requiring the user to navigate to a separate user interface or menu or perform additional user inputs to create space to insert text), which additionally reduces power usage and improves battery life of the electronic device by enabling the user to use the electronic device more quickly and efficiency.

In some embodiments, the touchdown of the stylus is between two words of the first sequence of characters (1118), such as in FIG. 10B (e.g., is not in the middle of a word in the first sequence of characters). In some embodiments, the system pushes the words apart to create space for inserting words or letters. In some embodiments, when the words are moved back together, the system automatically inserts spaces on each side of the inserted text. In some embodiments, the system does not automatically insert spaces on each side of the inserted side and preserves the space on one side of the inserted text based on the exact location of the inserted text.

The above-described manner of inserting text (e.g., by receiving a request to insert text between two words) allows the electronic device to provide the user with the ability to insert handwritten input between preexisting text (e.g., by receiving a touchdown between two words and allowing insertion of text between the two words), which simplifies the interaction between the user and the electronic device and enhances the operability of the electronic device and makes the user-device interface more efficient (e.g., by allowing the user to easily insert text between words without requiring the user to navigate to a separate user interface or menu or perform additional user inputs to create space to insert text and to remove space after completion of text insertion), which additionally reduces power usage and improves battery life of the electronic device by enabling the user to use the electronic device more quickly and efficiency.

In some embodiments, the user input corresponds to the request to enter respective text in between the first portion and the second portion of the first sequence of characters using handwritten input when the user input comprises touchdown of a stylus on the touch-sensitive display for longer than a time threshold (e.g., 1, 2, 3, 5 seconds). In some embodiments, the input corresponding to the request to insert text is a long touch by the stylus on the touch screen), and updating the text entry user interface by creating the space between the first portion of the first sequence of characters and the second portion of the first sequence of characters occurs in response to detecting the touchdown of a stylus on the touch-sensitive display for longer than the time threshold (1120), such as in FIG. 10B and FIGS. 10CCC-10EEE (e.g., the system enters text insertion mode and creates space for the insertion of text after receiving the long hold input).

In some embodiments, the input is also required to be substantially stationary for the time threshold (e.g., no more than a threshold amount of movement of the stylus during the time threshold). In some embodiments, entering into insertion mode after a long hold allows the system to determine that the user did not inadvertently request insertion of text. In some embodiments, if the touchdown is not longer than the time threshold, then the user input is ignored or otherwise not interpreted as a request to enter respective text. In some embodiments, the user input that is not longer than the time threshold is interpreted as a selection input. In some embodiments, the user input that is not longer than the tine threshold causes a pop-up or other menu to be displayed to allow the user to determine what function to perform.

The above-described manner of inserting text (e.g., by interpreting a long press user input as a request to insert text between pre-existing text and moving the pre-existing text to create space for the user to perform handwritten input) allows the electronic device to provide the user with the ability to insert handwritten input between preexisting text (e.g., by interpreting a long press user input as a request to insert text between pre-existing text and automatically moving the pre-existing text to create space for the user to insert handwritten input), which simplifies the interaction between the user and the electronic device and enhances the operability of the electronic device and makes the user-device interface more efficient (e.g., by ensuring that the user is requesting to insert text by interpreting a long press input as a request to insert text without requiring the user to navigate to a separate user interface or menu or perform additional user inputs to create space to insert text and to remove space after completion of text insertion), which additionally reduces power usage and improves battery life of the electronic device by enabling the user to use the electronic device more quickly and efficiency.

In some embodiments, the user input corresponds to the request to enter respective text in between the first portion and the second portion of the first sequence of characters using handwritten input when the user input comprises a respective gesture (e.g., receiving a particular keyword gesture that indicates a request to insert text), and updating the text entry user interface by creating the space between the first portion of the first sequence of characters and the second portion of the first sequence of characters occurs in response to detecting the respective gesture (1122), such as in FIG. 10G (e.g., in response to receiving the keyword gesture, entering insertion mode and creating space for insertion of handwritten input).

In some embodiments, receiving a caret gesture between two portions of sequence of characters is considered a request to insert text between the two portions of sequence of characters. In some embodiments, if the user input does not comprise a respective gesture (e.g., the user input is another gesture that is not considered a keyword gesture for inserting text), then the user input is not interpreted as a request to insert text. In some embodiments, the user input that does not comprise a respective gesture is interpreted as a selection input, a deletion input, or a navigation input, etc.

The above-described manner of inserting text (e.g., by interpreting a handwritten input of a particular respective gesture as a request to insert text between pre-existing text and moving the pre-existing text to create space for the user to perform handwritten input) allows the electronic device to provide the user with the ability to insert handwritten input between preexisting text (e.g., by interpreting a respective gesture in the handwritten input as a request to insert text between pre-existing text and automatically moving the pre-existing text to create space for the user to insert handwritten input), which simplifies the interaction between the user and the electronic device and enhances the operability of the electronic device and makes the user-device interface more efficient (e.g., by allowing the user to easily insert text between words without requiring the user to navigate to a separate user interface or menu or perform additional user inputs to create space to insert text), which additionally reduces power usage and improves battery life of the electronic device by enabling the user to use the electronic device more quickly and efficiency.

In some embodiments, the user input comprises touchdown of a stylus on the touch-sensitive display (1124), such as in FIG. 10P. In some embodiments, in response to detecting the touchdown of the stylus in between the first and second portions of the first sequence of characters on the touch-sensitive display, the electronic device displays (1126), on the touch-sensitive display, a selectable option for creating the space between the first and second portions of the first sequence of characters, such as in FIG. 10Q (e.g., in response to detecting a touchdown or tap, displaying a popup or other menu that includes a selectable option for inserting text). In some embodiments, the popup menu includes other options for interacting with the text entry field such as an option to paste text from a clipboard, an option to select text, etc.

In some embodiments, while displaying the selectable option for creating the space between the first and second portions of the first sequence of characters, the electronic device receives (1128), via the touch-sensitive display, selection of the selectable option, such as in FIG. 10Q (e.g., receiving an input selecting the selectable option for inserting text).

In some embodiments, updating the text entry user interface by creating the space between the first portion of the first sequence of characters and the second portion of the first sequence of characters occurs in response to detecting the selection of the selectable option (1130), such as in FIG. 10R (e.g., in response to receiving the input selecting the selectable option for inserting text, entering text insertion mode and creating space between the first portion and second portion of the sequence of characters for inserting text).

The above-described manner of inserting text (e.g., by receiving a user selection of a selectable option for inserting text and moving the pre-existing text to create space for the user to perform handwritten input) allows the electronic device to provide the user with the ability to insert handwritten input between preexisting text (e.g., by displaying a menu including selectable option to insert text and automatically moving the pre-existing text to create space for the user to insert handwritten input in response to the user's selection of the selectable option), which simplifies the interaction between the user and the electronic device and enhances the operability of the electronic device and makes the user-device interface more efficient (e.g., by allowing the user to insert text between words by selecting a selectable option to insert text without requiring the user to navigate to a separate user interface or menu to create space to insert text), which additionally reduces power usage and improves battery life of the electronic device by enabling the user to use the electronic device more quickly and efficiency.

In some embodiments, after updating the text entry user interface by creating the space between the first portion of the first sequence of characters and the second portion of the first sequence of characters, the electronic device receives (1132), via the touch-sensitive display, a handwritten input in the space between the first portion and the second portion of the first sequence of characters, such as in FIG. 10J.

In some embodiments, in response to receiving the handwritten input (1134), the electronic device displays (1136) a representation of the handwritten input in the space between the first and second portions of the first sequence of characters, such as in FIG. 10J (e.g. display the handwritten input on the display at the location where the handwritten is received as the handwritten input is received). In other words, displaying a "trail" of the handwritten input.

In some embodiments, in response to receiving the handwritten input (1134), in accordance with a determination that the handwritten input satisfies one or more criteria (e.g., reaches near the end of the space, includes special gesture to add more space, etc.), the electronic device expands (1138) the space between the first and second portions of the first sequence of characters, such as in FIG. 10J (e.g., further moving the first and/or second portions of the sequence of characters to provide additional space for receiving additional handwritten input in between the first and second portions of the first sequence of characters). In some embodiments, as the handwritten input begins to exhaust the space that has been created, provide more space for the user to continue inputting handwritten input. In some embodiments, if handwritten input does not satisfy the criteria, then do not create space for further inputting text. For example, if the handwritten input does not exhaust the space initially created for inserting text, do not create additional space for inserting more text.

The above-described manner of further providing space for inserting text (e.g., by receiving handwritten input directed to the space created between the first and second portions of text and further moving the first and/or second portions of text to create more space for the user to continue handwritten input as the user continues to provide handwritten input) allows the electronic device to provide the user with the ability to continue inserting handwritten input between preexisting text (e.g., by continuing to move the pre-existing text to continue to provide space for the user to input handwritten inputs), which simplifies the interaction between the user and the electronic device and enhances the operability of the electronic device and makes the user-device interface more efficient (e.g., by allowing the user to easily continue inserting text even after exhausting the initial space created for inserting text without requiring the user to navigate to a separate user interface or menu or perform additional user inputs to create space to insert text), which additionally reduces power usage and improves battery life of the electronic device by enabling the user to use the electronic device more quickly and efficiency.

In some embodiments, the handwritten input satisfies the one or more criteria when the handwritten input includes a first respective gesture, and does not satisfy the one or more criteria when the handwritten input includes a second respective gesture, different than the first respective gesture (1140), such as in FIG. 10G (e.g., detecting a keyword gesture for creating additional space for inserting text). In some embodiments, the keyword gesture or character is the same keyword gesture for initially entering insertion mode. In some embodiments, in response to detecting the keyword gesture, shifting the first and/or second portions to create further space for inserting text.

The above-described manner of further providing space for inserting text (e.g., by receiving handwritten input with a particular keyword gesture and further moving the first and/or second portions of text to create more space for the user to continue handwritten input as the user continues to provide handwritten input) allows the electronic device to provide the user with the ability to continue inserting handwritten input between preexisting text (e.g., by moving the pre-existing text to provide further space for the user to input handwritten inputs in response to receiving a particular keyword gesture), which simplifies the interaction between the user and the electronic device and enhances the operability of the electronic device and makes the user-device interface more efficient (e.g., by allowing the user to easily continue inserting text even after exhausting the initial space created for inserting text without requiring the user to navigate to a separate user interface or menu or perform additional user inputs to create space to insert text), which additionally reduces power usage and improves battery life of the electronic device by enabling the user to use the electronic device more quickly and efficiency.

In some embodiments, after updating the text entry user interface by creating the space between the first portion of the first sequence of characters and the second portion of the first sequence of characters, the electronic device receives (1142), via the touch-sensitive display, a handwritten input in the space between the first portion and the second portion of the first sequence of characters, such as in FIG. 10V.

In some embodiments, in response to receiving the handwritten input (1144), the electronic device displays (1146) a representation of the handwritten input in the space between the first and second portions of the first sequence of characters, such as in FIG. 10V (e.g. display the handwritten input on the display at the location where the handwritten is received as the handwritten input is received). In other words, displaying a "trail" of the handwritten input.

In some embodiments, in response to receiving the handwritten input (1144), in accordance with a determination that one or more new line criteria are satisfied, the electronic device updates (1148) the user interface to create a new line configured to receive additional handwritten input for inserting additional respective text in the new line, such as in FIG. 10W (e.g., inserting a new line (e.g., carriage return character)). In some embodiments, the second portion of the text is pushed downwards by a line when creating the new line. In some embodiments, the new line criteria are satisfied if the handwriting input reaches near the end of the current line. In some embodiments, the new line criteria are satisfied if the user reaches the end of the respective text entry field. In some embodiments, the new line criteria are satisfied if the user begins writing a threshold distance below the current line. Thus, in some embodiments, the new line criteria are satisfied based on the context of the handwriting input and the pre-existing text, the location of the handwriting input, the size of the text entry region and the length of the handwritten and pre-existing text.

The above-described manner of inserting a new line for further inserting text (e.g., by receiving handwritten input and inserting a new line in the pre-existing text if the new line criteria are satisfied) allows the electronic device to provide the user with the ability to insert multi-lined text (e.g., by automatically determining whether a new line should be inserted and inserting the new line to provide space for the user to further input handwritten inputs), which simplifies the interaction between the user and the electronic device and enhances the operability of the electronic device and makes the user-device interface more efficient (e.g., by allowing the user to easily insert a new line in the pre-existing text without requiring the user to navigate to a separate user interface or menu or perform additional user inputs to create space to insert text), which additionally reduces power usage and improves battery life of the electronic device by enabling the user to use the electronic device more quickly and efficiency.

In some embodiments, the one or more new line criteria include a criterion that is satisfied when the handwritten input reaches an end of a current line in the user interface (1150), such as in FIG. 10K (e.g., if the handwriting input reaches the end of a text field or the end of the user interface such that there is no further room to enter text or the text entry field cannot further be expanded, then insert a new line in the text entry user interface to provide space for the user to continue providing handwritten input).

The above-described manner of inserting a new line for further inserting text (e.g., by receiving handwritten input and inserting a new line in the pre-existing text if the handwritten input reaches the end or near the end of the current line of text) allows the electronic device to provide the user with the ability to insert multi-lined text (e.g., by automatically determining that a user likely needs a new line to further enter handwritten text and inserting the new line to provide space for the user to further input handwritten inputs), which simplifies the interaction between the user and the electronic device and enhances the operability of the electronic device and makes the user-device interface more efficient (e.g., by automatically inserting a new line in a situation in which a new line is likely needed without requiring the user to navigate to a separate user interface or menu or perform additional user inputs to create space to insert text), which additionally reduces power usage and improves battery life of the electronic device by enabling the user to use the electronic device more quickly and efficiency.

In some embodiments, the one or more new line criteria include a criterion that is satisfied when the additional handwritten input is detected below existing font-based text in the user interface (1152), such as in FIG. 10V (e.g., if the handwriting input is at a position that is a threshold distance below the existing line of text (e.g., 6 points, 12 points, 24 points, etc.), then insert a new line at the position that is the threshold distance below the current line of text).

The above-described manner of inserting a new line for further inserting text (e.g., by receiving handwritten input that is below the existing line of text and inserting a new line at the location below the existing line of text) allows the electronic device to provide the user with the ability to insert multi-lined text (e.g., by automatically interpreting the handwritten input below the existing font-based text as a request to insert a new line at the location of the handwritten input and inserting the new line to provide space for the user to further input handwritten inputs), which simplifies the interaction between the user and the electronic device and enhances the operability of the electronic device and makes the user-device interface more efficient (e.g., by automatically inserting a new line when the user provides handwritten input below the existing font-based text indicating a request to insert a new line at the location of the handwritten input), which additionally reduces power usage and improves battery life of the electronic device by enabling the user to use the electronic device more quickly and efficiency.

In some embodiments, the one or more new line criteria include a criterion that is satisfied when a tap input is detected below existing font-based text in the user interface (1154), such as in FIG. 10BB (e.g., if a tap input is received at a location below the existing font-based text, then insert a new line at the location below the existing font-based text).

The above-described manner of inserting a new line for further inserting text (e.g., by receiving a tap input below the existing line of text and inserting a new line at the location below the existing line of text) allows the electronic device to provide the user with the ability to insert multi-lined text (e.g., by interpreting a tap input below the existing font-based text as a request to insert a new line at the location of the handwritten input and inserting the new line to provide space for the user to further input handwritten inputs), which simplifies the interaction between the user and the electronic device and enhances the operability of the electronic device and makes the user-device interface more efficient (e.g., by inserting a new line when the user taps at a location below existing font-based text indicating a request to insert a new line at the location of the handwritten input), which additionally reduces power usage and improves battery life of the electronic device by enabling the user to use the electronic device more quickly and efficiency.

In some embodiments, in response to receiving the handwritten input (1156), in accordance with a determination that the handwritten input is within a threshold distance of an end of a current line in the user interface, the electronic device displays (1158), in the user interface, a selectable option for creating a new line in the user interface, such as in FIG. 10X (e.g., dynamically display a pop-up or menu that includes a selectable option that is selectable to create a new line). In some embodiments, as the user reaches or approaches the end of a current line, the pop-up or menu is dynamically displayed to the user to provide the user with the option to insert a new line.

In some embodiments, the one or more new line criteria include a criterion that is satisfied when selection of the selectable option for creating the new line in the user interface is detected (1160), such as in FIG. 10HH (e.g., a new line is created in response to the user selecting the selectable option for inserting a new line).

The above-described manner of inserting a new line for further inserting text (e.g., by displaying a selectable option that is selectable to insert a new line and inserting a new line in response to receiving a user input selecting the selectable option for inserting a new line) allows the electronic device to provide the user with the ability to insert multi-lined text (e.g., by dynamically displaying a selectable option to insert a new line when the user's handwriting input reaches the end of a line and a new line is likely needed, and inserting a new line in response to receiving a user input selecting the selectable option), which simplifies the interaction between the user and the electronic device and enhances the operability of the electronic device and makes the user-device interface more efficient (e.g., by inserting a new line when the user selects a selectable option for inserting a new line that is displayed when the user reaches the end of the current line), which additionally reduces power usage and improves battery life of the electronic device by enabling the user to use the electronic device more quickly and efficiency.

In some embodiments, while the new line configured to receive the additional handwritten input is included in the user interface, the electronic device receives (1162), via the touch-sensitive display, a respective user input, such as in FIG. 10EE (e.g., after a new line has been automatically inserted or inserted in response to the user's inputs, or while the text entry user interface includes multi-lined text, receiving a user input).

In some embodiments, in response to receiving the respective user input (1164), in accordance with a determination that the respective user input comprises a tap input detected at an end of a last word in a previous line, previous to the new line, in the user interface, or a tap input detected at a beginning of a first word in the new line in the user interface, the electronic device displays (1166), in the user interface, a selectable option for removing the new line from the user interface, such as in FIG. 10FF (e.g., receiving a tap input at the end of the last word on a previous line and/or receiving a tap input at the beginning of the first word on the next line to display a pop-up or menu that includes a selectable option to remove the line break between the previous line and the next line). In some embodiments, selecting the selectable option removes the line break between the previous line and the next line.

The above-described manner of removing a line break in multi-lined text (e.g., by receiving an input at the end of a first line or the beginning of a second line, displaying a selectable option for removing the line break between the first line and the second line, and removing the line break in response to receiving a user input selecting the selectable option) allows the electronic device to provide the user with the ability to remove a line break in multi-lined text (e.g., by dynamically displaying a selectable option to remove a line break and removing the line break in response to the user's selection of the selectable option to remove the line break), which simplifies the interaction between the user and the electronic device and enhances the operability of the electronic device and makes the user-device interface more efficient (e.g., by providing the user with a selectable option to remove a line break and removing the line break in response to receiving a user input selecting the selectable option), which additionally reduces power usage and improves battery life of the electronic device by enabling the user to use the electronic device more quickly and efficiency.

In some embodiments, while the new line configured to receive the additional handwritten input is included in the user interface and the new line includes a respective sequence of characters, the electronic device receives (1168), via the touch-sensitive display, a respective input including a touchdown of a stylus on the respective sequence of characters and a movement of the stylus to a respective line, different than the new line, in the user interface, such as in FIG. 10JJ (e.g., after a new line has been automatically inserted or inserted in response to the user's inputs, or while the text entry user interface includes multi-lined text, receiving a user input on the new line of text and "dragging" the new line of text). In some embodiments, the user input is received at the beginning of the new line of text.

In some embodiments, in response to receiving the respective input (1170), the electronic device moves (1172) the respective sequence of characters to the respective line in the user interface, such as in FIG. 10JJ (e.g., moving the new line of text in accordance with the movement of the stylus. In some embodiments, the new line of text snaps to the line that the new line was dragged to upon liftoff of the stylus). In some embodiments, when the user completes the movement gesture, the new line of text is aligned with the text that exists at the position where the new line was dragged to.

In some embodiments, in response to receiving the respective input (1170), the electronic device removes (1174) the new line from the user interface, such as in FIG. 10LL (e.g., the line break (e.g., carriage return or new line character, if any) between the new line and previous lines is removed such that the new line).

The above-described manner of removing a line break in multi-lined text (e.g., by receiving an input at a second line of text that drags the second line of text to a first line of text and removing any line breaks between the first and second lines of text) allows the electronic device to provide the user with the ability to remove a line break in multi-lined text (e.g., by interpreting the user's gesture dragging a line to a previous line as a request to remove a line break between the two lines of and removing the line break in response to the user's request to remove the line break), which simplifies the interaction between the user and the electronic device and enhances the operability of the electronic device and makes the user-device interface more efficient (e.g., by providing the user with an intuitive method of moving text and automatically removing line breaks in accordance with the user's inputs without requiring the user to navigate to a separate user interface or perform additional inputs to remove line breaks), which additionally reduces power usage and improves battery life of the electronic device by enabling the user to use the electronic device more quickly and efficiency.

In some embodiments, after updating the text entry user interface by creating the space between the first portion of the first sequence of characters and the second portion of the first sequence of characters, the electronic device receives (1176), via the touch-sensitive display, a handwritten input in the space between the first portion and the second portion of the first sequence of characters, such as in FIG. 10UU (e.g., after moving the first and/or second portions of the text to create space for the user to insert text between the first and second portions of the text, receive handwritten input inserting text).

In some embodiments, in response to receiving the handwritten input (1178), the electronic device displays (1180), in the user interface, a representation of the handwritten input in the space between the first and second portions of the first sequence of characters, such as in FIG. 10UU (e.g., displaying the trail of the handwritten input on the display as the input is received at the location where the input is received).

In some embodiments, in response to receiving the handwritten input (1178), in accordance with a determination that the handwritten input has not reached an end of a current line in the user interface, the electronic device ceases (1182) to display the representation of the handwritten input after a first elapsed time since receiving the handwritten input, such as in FIG. 10AAA (e.g., begin converting the handwritten text into font-based text). In some embodiments, the conversion is performed after a certain time delay. In some embodiments, the conversion is performed according to method 700 and/or method 1300. In some embodiments, if the progress of the handwritten input is at a position before a certain threshold location (e.g., before reaching the half-way point, before reaching the ¾ point, then convert the text according to the ordinary timing of converting text.).

In some embodiments, in response to receiving the handwritten input (1178), in accordance with a determination that the handwritten input has reached the end of the current line in the user interface, the electronic device ceases (1184) to display the representation of the handwritten input after a second elapsed time, shorter than the first elapsed time, since receiving the handwritten input, such as in FIG. 10WW (e.g., when the progress of the handwritten input reaches a certain threshold location (e.g., surpasses a certain threshold location) begin converting the handwritten text into font-based text at a faster speed (e.g., with a shorter time delay) than when the progress of the handwritten has not reached the threshold location). In other words, as the handwritten input begins to run out of room at the end of a line, converting the handwritten text at a faster speed in order to free up space. In some embodiments, converting the handwritten text faster causes handwritten text at the beginning of the line to be converted, thus removing display of the handwritten text and replacing the display of the handwritten text with font-based text. In some embodiments, the font-based text is a smaller size than the handwritten text. Thus, converting the handwritten text frees up screen space for the user to continue writing at the beginning of the next line. In some embodiments, converting the handwritten text causes the handwritten text that the user just wrote to be converted, thus removing display of handwritten text at or near the end of the current line, thus allowing the user to continue providing handwritten text in the same location without moving rightwards as the user writes (e.g., the words and/or letters is converted as the user is writing such that the user does not have to move locations to continue writing in an open space).

The above-described manner of providing space for handwritten input (e.g., by converting text at a faster speed as the user begins to run out of space to provide handwritten) allows the electronic device to continuously provide the user with space to input handwritten inputs (e.g., by determining that the user will run out of space for handwritten input and increasing the speed of converting handwritten text into font-based text in order to remove the handwritten text from display to free up space for the user to continue providing handwritten input), which simplifies the interaction between the user and the electronic device and enhances the operability of the electronic device and makes the user-device interface more efficient (e.g., by automatically and continuously providing space for the user to input handwritten text by converting previously written handwritten text at a faster speed without requiring the user to wait for the conversion process to occur or perform additional inputs to create space for further handwritten text), which additionally reduces power usage and improves battery life of the electronic device by enabling the user to use the electronic device more quickly and efficiency.

In some embodiments, after updating the text entry user interface by creating the space between the first portion of the first sequence of characters and the second portion of the first sequence of characters, the electronic device receives (1186), via the touch-sensitive display, a handwritten input in the space between the first portion and the second portion of the first sequence of characters, such as in FIG. 10D (e.g., after moving the first and/or second portions of the text to create space for the user to insert text between the first and second portions of the text, receive handwritten input inserting text.).

In some embodiments, after receiving the handwritten input (1188), in accordance with a determination that no additional handwritten input is received for a time threshold after an end of the handwritten input, the electronic device reduces (1190) a size of the space between the first portion and the second portion of the first sequence of characters to remove space not consumed by the handwritten input in the user interface, such as in FIG. 10F (e.g., if the handwritten input is no longer received for a threshold amount of time (e.g., 1 second, 3 seconds, 5 seconds, 10 seconds), then remove any excess space between the first portion of characters and the handwritten input and between the handwritten input and the first portion of characters). In some embodiments, the excess space that is removed is the space that was inserted to create space for handwritten input that was not used by the handwritten input. In some embodiments, that excess space that is removed is any space needed to be removed to align the newly inserted text with the pre-existing text (e.g., maintaining or inserting space characters in the proper places between words). In some embodiments, the handwritten input it converted into font-based text before the excess space is removed. In other words, the handwritten input is optionally converted and after a threshold amount of time after the handwritten input is converted (e.g., 0.5 seconds, 1 second, 2 seconds, 5 seconds), then the excess space is removed. In some embodiments, the excess space is removed at the same time that the handwritten input is converted into font-based text.

The above-described manner of removing excess space after handwritten input (e.g., by removing excess space between the text that was created to make space for the handwritten input after handwritten input has ceased for a threshold amount of time) allows the electronic device to exit text insertion mode (e.g., by determining that the user has stopped inserting text and removing any excess space to align the inserted text with the pre-existing text), which simplifies the interaction between the user and the electronic device and enhances the operability of the electronic device and makes the user-device interface more efficient (e.g., by automatically exiting text insertion mode and removing excess space without requiring the user to perform additional inputs to remove excess space after inserting handwritten inputs), which additionally reduces power usage and improves battery life of the electronic device by enabling the user to use the electronic device more quickly and efficiency.

In some embodiments, after updating the text entry user interface by creating the space between the first portion of the first sequence of characters and the second portion of the first sequence of characters, the electronic device receives (1192), via the touch-sensitive display, a handwritten input in the space between the first portion and the second portion of the first sequence of characters, such as in FIG. 10D (e.g., after moving the first and/or second portions of the text to create space for the user to insert text between the first and second portions of the text, receive handwritten input inserting text).

In some embodiments, after receiving the handwritten input (1194), in accordance with a determination that no additional handwritten input is received for a time threshold after an end of the handwritten input (e.g., 1 second, 2 seconds, 3 seconds, 5 seconds, etc.), the electronic device converts (1196) the handwritten input into font-based text in the space between the first and second portions of the first sequence of characters, such as in FIG. 10F (e.g., after handwritten input has ceased for a threshold amount of time, converting the handwritten input that has been inputted so far into font-based text.).

The above-described manner of inserting handwritten input (e.g., by converting the handwritten input after the user has ceased input for a threshold amount of time) allows the electronic device to insert text (e.g., by converting the handwritten input and insert the converted text into the space between the first and second portions of text), which simplifies the interaction between the user and the electronic device and enhances the operability of the electronic device and makes the user-device interface more efficient (e.g., by automatically converting handwritten input into font-based text and inserting the font-based text between the first and second portions of text when it appears that the user has completed handwritten input), which additionally reduces power usage and improves battery life of the electronic device by enabling the user to use the electronic device more quickly and efficiency.

In some embodiments, the electronic device displays (1198), in the text entry user interface, a second sequence of characters that includes a first portion of the second sequence of characters and a second portion of the second sequence of characters, such as in FIG. 10MM.

In some embodiments, while displaying the text entry user interface, the electronic device receives (1198-2), via the touch-sensitive display, a second user input in the text entry user interface in between the first portion of the second sequence of characters and the second portion of the second sequence of characters, such as in FIG. 10MM (e.g., receiving a tap input or a long press input that is over a threshold period of time between the first portion and second portion of text).

In some embodiments, in response to receiving the second user input (1198-4), in accordance with a determination that the second user input corresponds to a request to enter second respective font-based text in between the first portion of the second sequence of characters and the second portion of the second sequence of characters using handwritten input (1198-6), the electronic device displays (1198-8), in the user interface, a handwritten input user interface element (e.g., overlaid on what was previously displayed in the user interface) configured to receive handwritten input for inserting the second respective font-based text between the first portion and the second portion of the second sequence of characters, such as in FIG. 10NN (e.g., a pop-up text box in which the user is able to provide handwritten input that will be converted into font-based text). In some embodiments, a cursor indicator is displayed at the location where the text will be located. In some embodiments, the pop-up text box includes a selectable option to exit text insertion mode (e.g., dismiss the pop-up text box). In some embodiments, the pop-up text box includes a selectable option to convert and commit the user's handwritten input into font-based text.

The above-described manner of inserting handwritten input (e.g., by displaying a pop-up user interface element with a text box in which the user inserts handwritten input for conversion and insertion into the pre-existing text) allows the electronic device to provide the user with a text insertion element (e.g., by displaying a text box in response to the user's request to insert text, accepting handwritten input in the text box, and converting the handwritten input into font-based text), which simplifies the interaction between the user and the electronic device and enhances the operability of the electronic device and makes the user-device interface more efficient (e.g., by displaying a text insertion user interface element in which the user is able to input), which additionally reduces power usage and improves battery life of the electronic device by enabling the user to use the electronic device more quickly and efficiency.

In some embodiments, while displaying the handwritten input user interface element, the electronic device receives (1198-10), via the touch-sensitive display, a second handwritten input in the handwritten input user interface element, such as in FIG. 10QQ (e.g., receiving handwritten input in the pop-up text box corresponding to a request to insert the handwritten input into the pre-existing text).

In some embodiments, in response to receiving the second handwritten input in the handwritten input user interface element (1198-12), the electronic device inserts (1198-14) font-based text corresponding to the second handwritten input into the text entry user interface, such as in FIG. 10RR (e.g., converting the handwritten input into font-based text and inserting the font-based text into the pre-existing text (e.g., between the first and second portions of characters).

In some embodiments, in response to receiving the second handwritten input in the handwritten input user interface element (1198-12), while the handwritten input user interface element remains stationary on the touch-sensitive display, the electronic device scrolls (1198-16) the text entry user interface in accordance with movement of a current text insertion point, such as in FIG. 10RR (e.g., the position in the text entry user interface into which text, converted from the handwritten input in the handwritten input user interface element, will be inserted) in the text entry user interface (e.g., as the user inserts text, the insertion point (e.g., cursor) moves forward according to the text that has been inserted). In some embodiments, based on the amount of text that is inserted, the cursor moves to subsequent lines of text (e.g., the amount of text inserted exhausts the space on one line and moves to the next line). In some embodiments, in response to the cursor moving downwards, the user interface is scrolled upwards by the size of the line to preserve the cursor in the same vertical position on the screen and to not be blocked by the pop-up text box. In some embodiments, the pop-up text box does not move positions and the user interface underneath the pop-up text box scrolls upwards. In some embodiments, the user interface underneath the pop-up text box scrolls upwards more than the amount that the cursor has moved downwards to create even more space for the user to insert text.

The above-described manner of inserting handwritten input (e.g., by scrolling the user interface behind the pop-up text box as the user continue to input handwritten input) allows the electronic device to provide the user with a stationary text insertion element (e.g., by maintaining the location of the pop-up text box and scrolling the user interface behind the pop-up text box when needed to maintain display of the insertion point), which simplifies the interaction between the user and the electronic device and enhances the operability of the electronic device and makes the user-device interface more efficient (e.g., by maintaining the location of the pop-up text box while simultaneously displaying the insertion point without requiring the user to readjust his or her handwriting position while providing handwriting inputs), which additionally reduces power usage and improves battery life of the electronic device by enabling the user to use the electronic device more quickly and efficiency.

In some embodiments, while displaying the handwritten input user interface element, the electronic device receives (1198-18), via the touch-sensitive display, a second handwritten input in the handwritten input user interface element, such as in FIG. 10OO (e.g., receiving handwritten input in the pop-up text box corresponding to a request to insert the handwritten input into the pre-existing text).

In some embodiments, in response to receiving the second handwritten input in the handwritten input user interface element (1198-20), the electronic device displays (1198-22), in the handwritten input user interface element, a representation of the second handwritten input, such as in FIG. 10OO (e.g., displaying the trail of the handwritten input on the display as the input is received at the location where the input is received).

In some embodiments, in response to receiving the second handwritten input in the handwritten input user interface element (1198-20), in accordance with a determination that the second handwritten input has not reached an end of the handwritten input user interface element, the electronic device ceases (1198-24) to display the representation of the second handwritten input after a first elapsed time since receiving the second handwritten input, such as in FIG. 10AAA (e.g., begin converting the handwritten text into font-based text. In some embodiments, the conversion is performed after a certain time delay). In some embodiments, the conversion is performed according to method 700 and/or method 1300. In some embodiments, if the progress of the handwritten input is at a position before a certain threshold location (e.g., before reaching the halfway point, before reaching the ¾ point, then convert the text according to the ordinary timing of converting text.

In some embodiments, in response to receiving the second handwritten input in the handwritten input user interface element (1198-20), in accordance with a determination that the second handwritten input has reached the end of the handwritten input user interface element, the electronic device ceases (1198-26) to display the representation of the second handwritten input after a second elapsed time, shorter than the first elapsed time, since receiving the second handwritten input, such as in FIG. 10WW (e.g., when the progress of the handwritten input reaches a certain threshold location (e.g., surpasses a certain threshold location) begin converting the handwritten text into font-based text at a faster speed (e.g., with a shorter time delay) than when the progress of the handwritten has not reached the threshold location). In other words, as the handwritten input begins to run out of room at the end of a pop-up text box, converting the handwritten text at a faster speed in order to free up space. In some embodiments, converting the handwritten text faster causes handwritten text at the beginning of the text box to be converted, thus removing display of the handwritten text and replacing the display of the handwritten text with font-based text. In some embodiments, the font-based text is a smaller size than the handwritten text. Thus, converting the handwritten text frees up space for the user to continue writing at the beginning of the pop-up text box. In some embodiments, converting the handwritten text causes the handwritten text that the user just wrote to be converted, thus removing display of handwritten text at or near the end of the text box, thus allowing the user to continue providing handwritten text in the same location without moving rightwards as the user writes (e.g., the words and/or letters is converted as the user is writing such that the user does not have to move locations to continue writing in an open space).

The above-described manner of providing space for handwritten input (e.g., by converting text at a faster speed as the user begins to run out of space to provide handwritten) allows the electronic device to continuously provide the user with space to input handwritten inputs (e.g., by determining that the user will run out of space for handwritten input and increasing the speed of converting handwritten text into font-based text in order to remove the handwritten text from display to free up space for the user to continue providing handwritten input), which simplifies the interaction between the user and the electronic device and enhances the operability of the electronic device and makes the user-device interface more efficient (e.g., by automatically and continuously providing space for the user to input handwritten text by converting previously written handwritten text at a faster speed without requiring the user to wait for the conversion process to occur or perform additional inputs to create space for further handwritten text), which additionally reduces power usage and improves battery life of the electronic device by enabling the user to use the electronic device more quickly and efficiency.

In some embodiments, while displaying the text entry user interface including the first sequence of characters, the device receives (1198-28), via the touch-sensitive display, a respective user input including a movement across a respective portion of the first sequence of characters (e.g., a downward or an upward movement across the respective portion of first sequence of characters) while maintaining contact with the touch-sensitive display at a location between a first character and a second character in the first sequence of characters, such as in FIG. 10JJJ and 10LLL (e.g., a vertical or downward or upward swipe gesture between two characters (optionally adjacent characters).

In some embodiments, the first sequence of characters is a sequence of handwritten characters. In some embodiments, the first sequence of characters is font-based text. In some embodiments, the first sequence of characters is includes some font-based text and some handwritten characters. In some embodiments, the downward swipe gesture is less than a threshold angle from vertical (e.g., 5 degrees from vertical, 10 degrees from vertical, 20 degrees from vertical, etc.) and need not be perfectly vertical. In some embodiments, the input is from a stylus or similar input device in contact with the touch-sensitive display.

In some embodiments, in response to receiving the respective user input (1198-30), in accordance with a determination that no characters separate the first character and the second character in the first sequence of characters (e.g., the first character and second character are adjacent characters without a whitespace character (e.g., space) between them), the device updates (1198-32) the text entry user interface by adding a whitespace character between the first character and the second character in the first sequence of characters, such as in FIG. 10KKK (e.g., automatically inserting a whitespace character (e.g., single space) between the first and second characters). In some embodiments, a plurality of whitespace characters are inserted.

In some embodiments, in accordance with a determination that only a whitespace character separates the first character and the second character in the first sequence of characters, the device updates (1198-34) the text entry user interface by removing the whitespace character between the first character and the second character in the first sequence of characters, such as in FIG. 10MMM (e.g., if the first and second characters are separated by a single whitespace character, and no other characters, then remove the whitespace character, thus making the two characters adjacent).

In some embodiments, if the first and second characters are separated by multiple whitespace characters, then remove a single whitespace character. In some embodiments, if the first and second characters are separated by multiple whitespace characters, then remove all the whitespace characters between the first and second characters, thus making the two characters adjacent.

The above-described manner of inserting and removing whitespace (e.g., by receiving a downward swipe between two text characters) provide the user with a quick and efficient method of separating or adjoining characters (e.g., by automatically adding whitespace if no whitespace exists and removing whitespace if whitespace already exists), which simplifies the interaction between the user and the electronic device and enhances the operability of the electronic device and makes the user-device interface more efficient (e.g., by performing both an addition and deletion function using the same gesture without requiring the user to perform additional inputs or different inputs to either add or remove whitespace), which additionally reduces power usage and improves battery life of the electronic device by enabling the user to use the electronic device more quickly and efficiency.

It should be understood that the particular order in which the operations in FIGS. 11A-11M have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1300, 1500, 1600, 1800, 2000, and 2200) are also applicable in an analogous manner to method 1100 described above with respect to FIGS. 11A-11M. For example, the insertion of text into pre-existing text described above with reference to method 1100 optionally have one or more of the characteristics of the acceptance and/or conversion of handwritten inputs, selection and deletion of text, managing the timing of converting handwritten text into font-based text, presenting handwritten entry menus, controlling the characteristics of handwritten input, presenting autocomplete suggestions, and converting handwritten input to font-based text, displaying options in a content entry palette, etc., described herein with reference to other methods described herein (e.g., methods 700, 900, 1300, 1500, 1600, 1800, 2000, and 2200). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 11A-11M are, optionally, implemented by components depicted in FIGS. 1A-1B. For example, displaying operations 1102, 1126, 1136, 1146, 1158, 1166, 1180, 1198, 1198-8, and 1198-22, and receiving operations 1104, 1110, 1128, 1132, 1142, 1162, 1168, 1176, 1186, 1192, 1198-2, 1198-10, 1198-18, and 1198-28 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Timing of Converting Handwritten Inputs to Text

Users interact with electronic devices in many different manners, including entering text into the electronic device. In some embodiments, an electronic device receives handwritten input from a handwriting input device (e.g., a stylus) and converts the handwritten input into font-based text (e.g., computer text, digital text, etc.). The embodiments described below provide ways in which an electronic device manages the timing of converting handwritten input from a handwriting input device (e.g., a stylus) into font-based text (e.g., computer text, digital text, etc.). Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 12A:
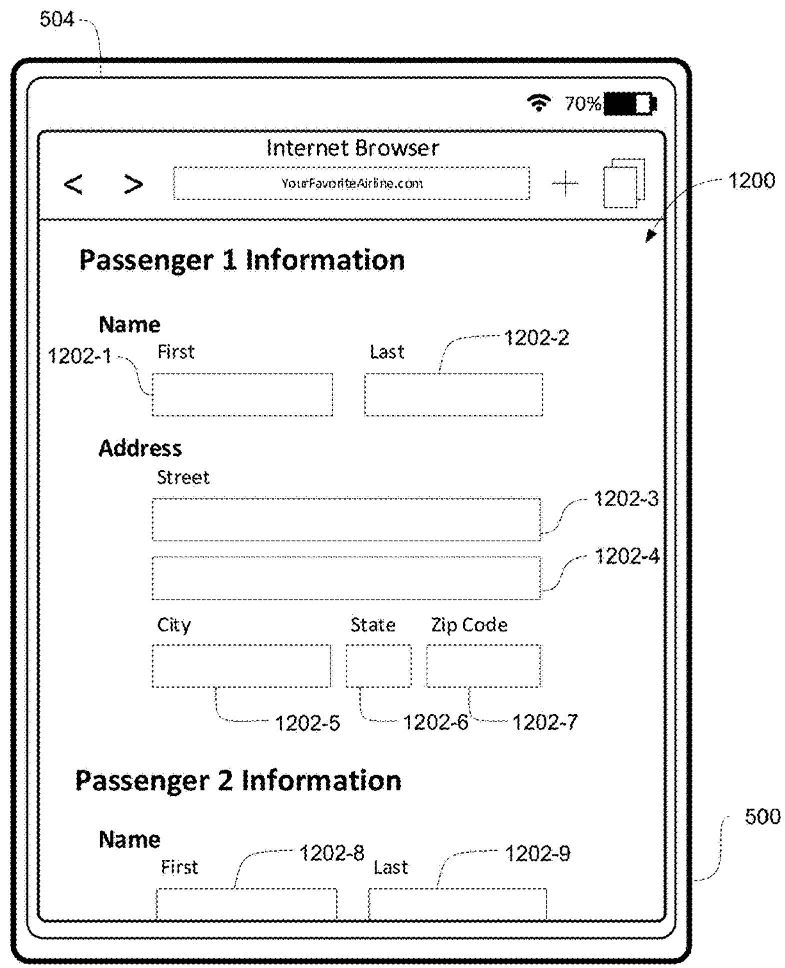
FIGS. 12A-12SS illustrate exemplary ways in which an electronic device manages the timing of converting handwritten text into font-based text in accordance with some embodiments.
Figure 12C:
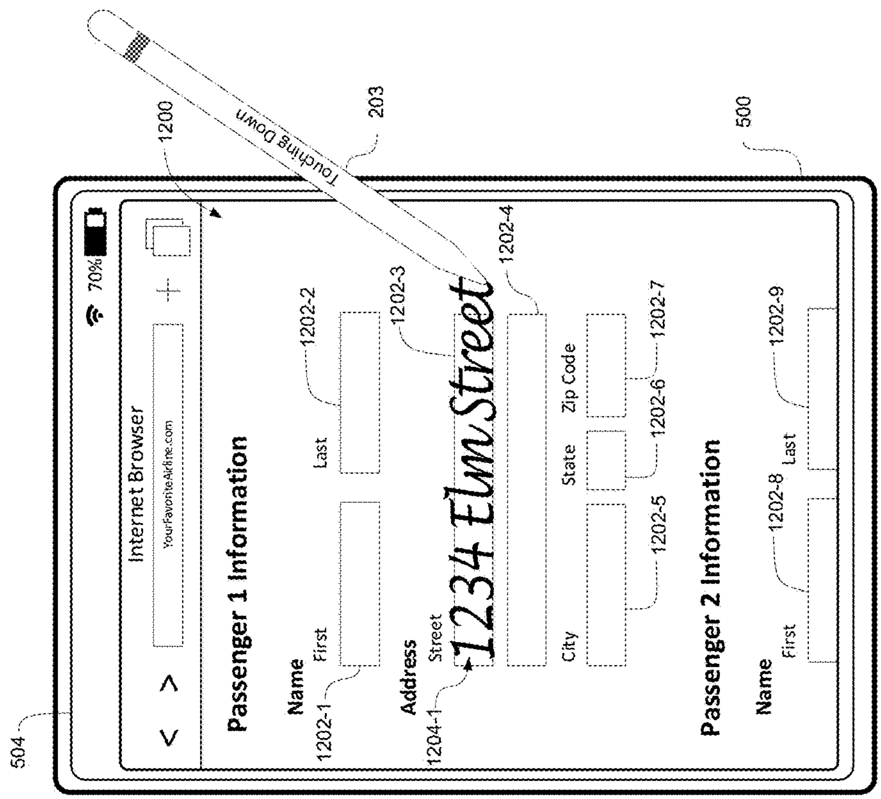
Figure 12B:
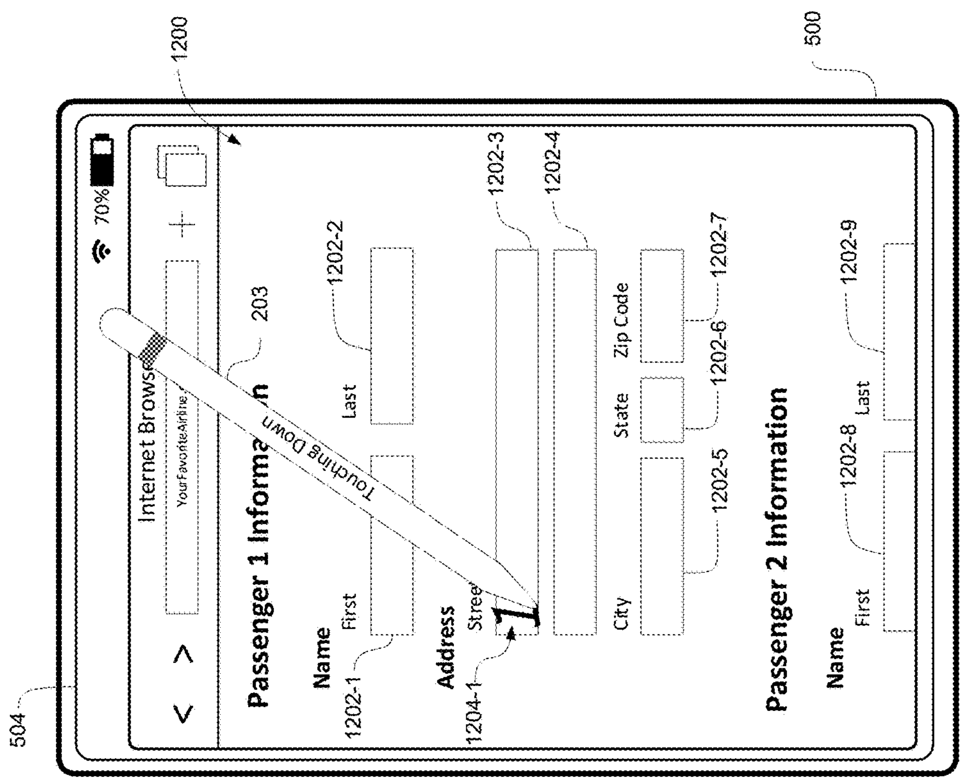
Figure 12E:
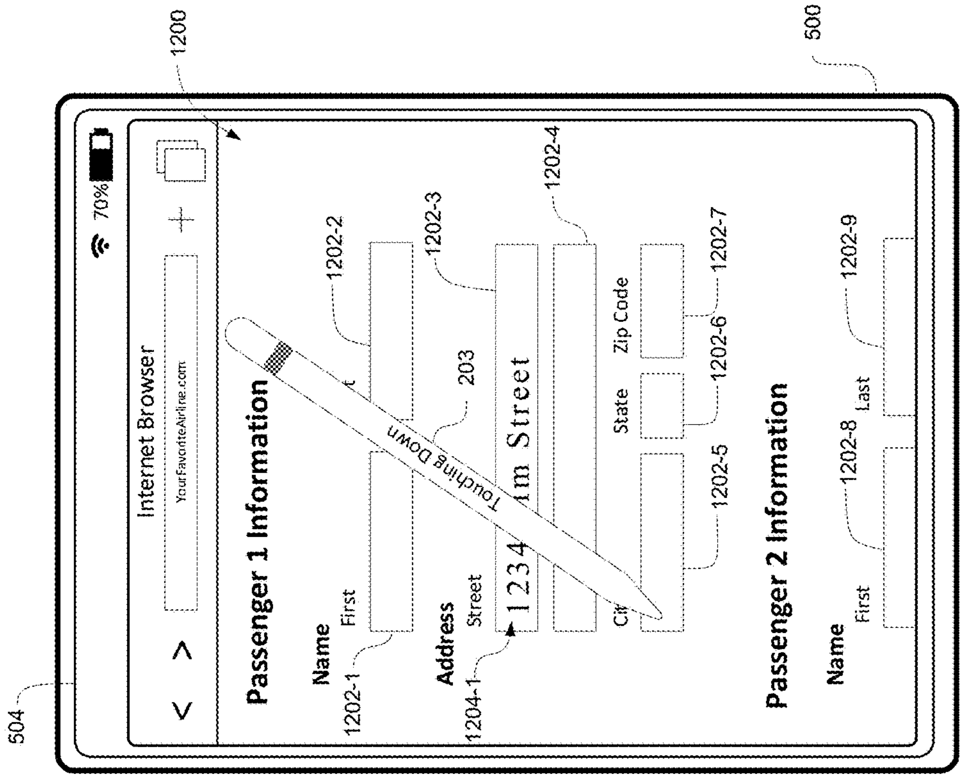
Figure 12D:
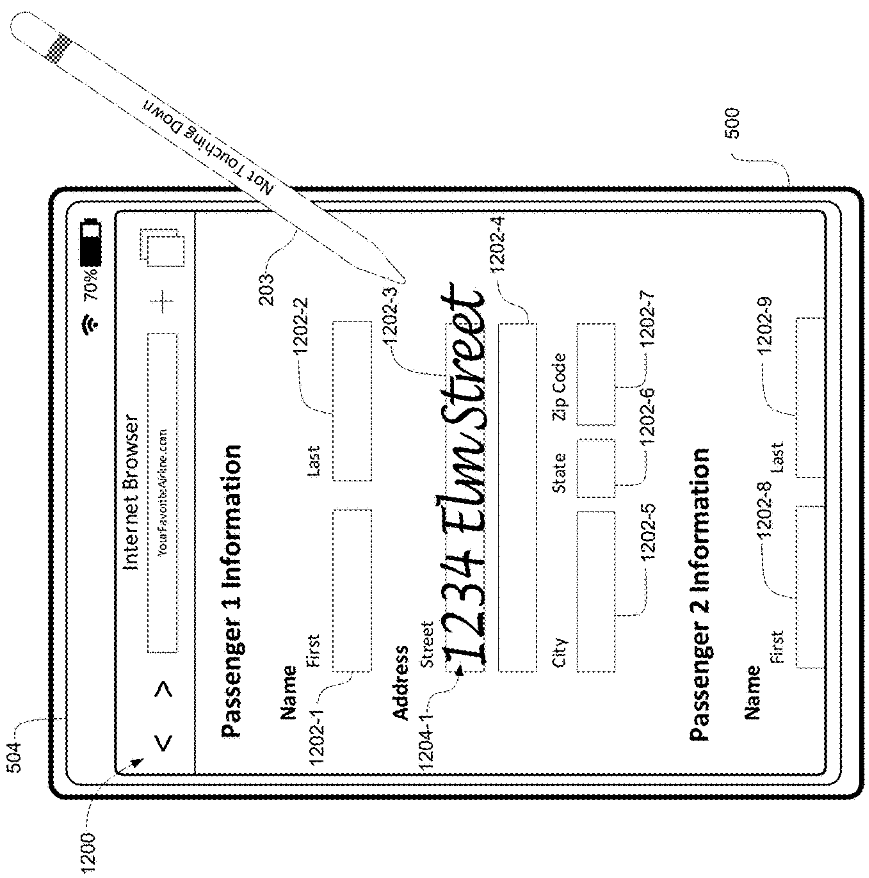
Figure 12G:
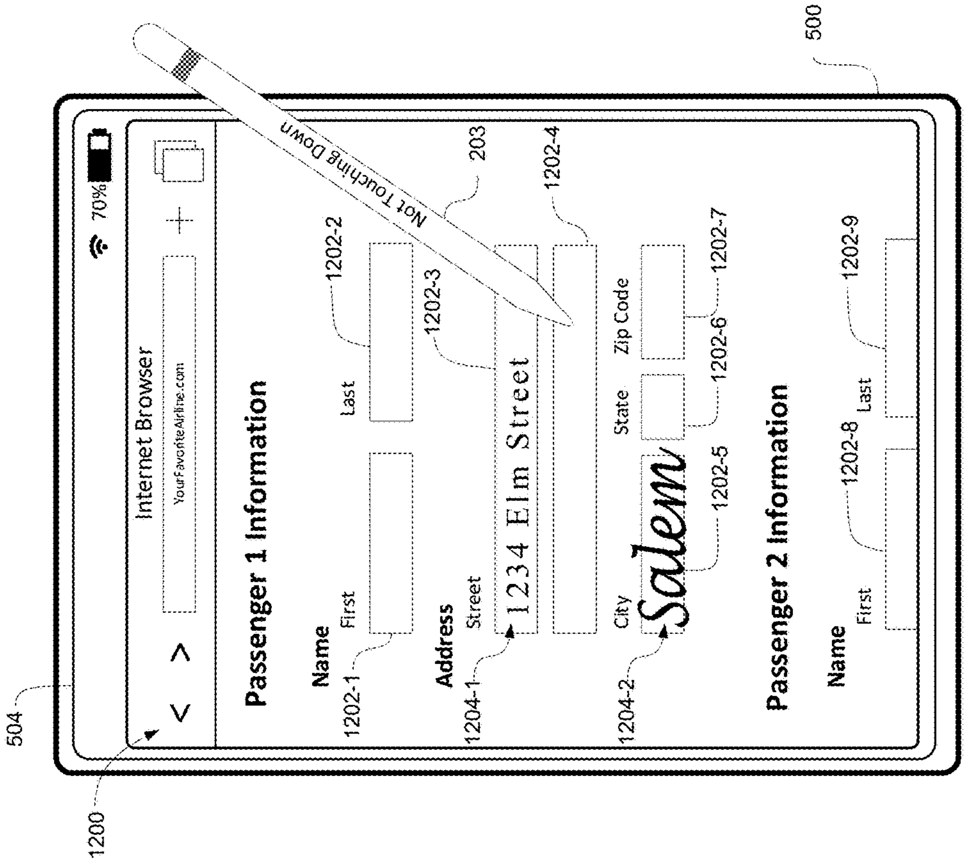
Figure 12F:
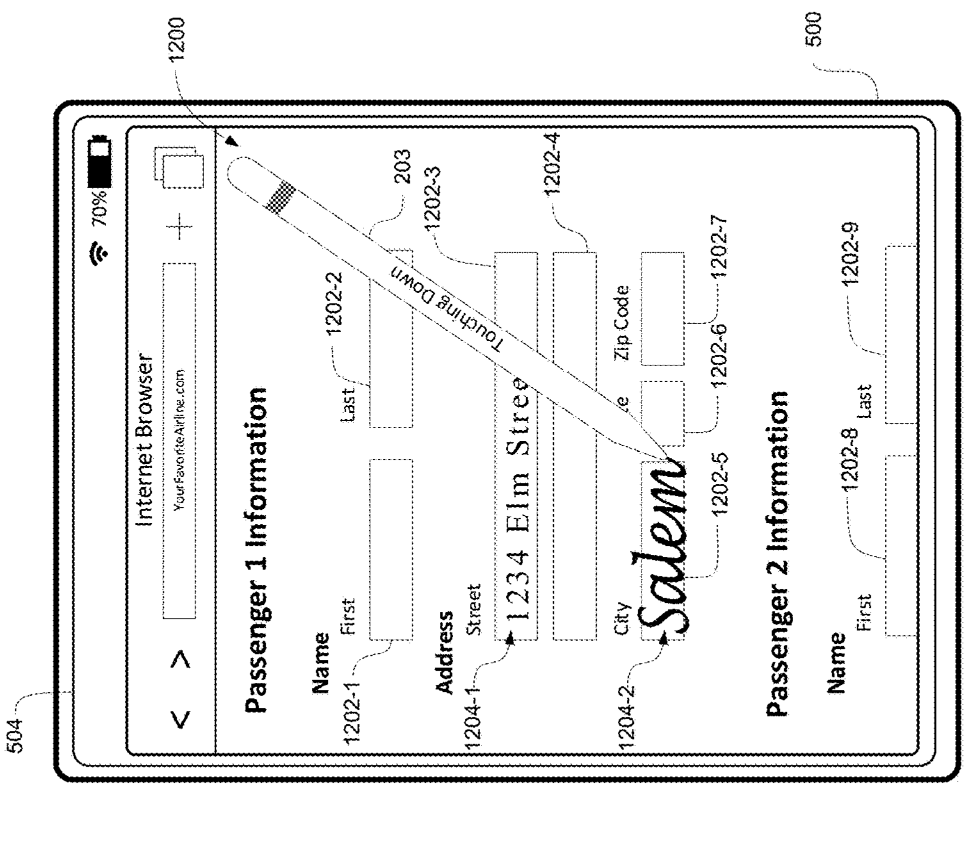
Figure 12I:
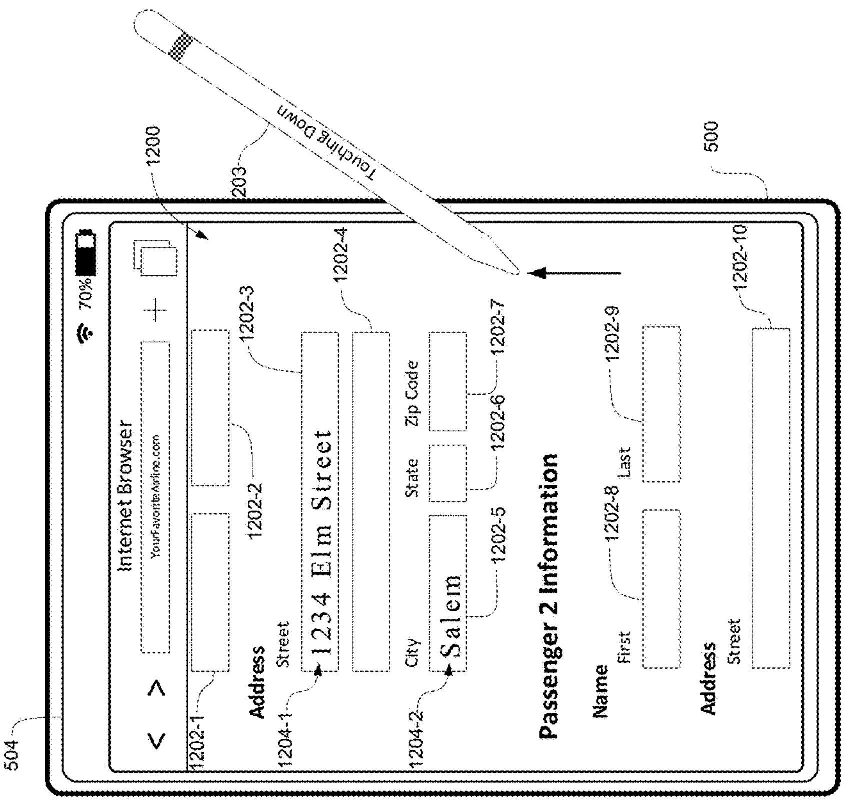
Figure 12H:
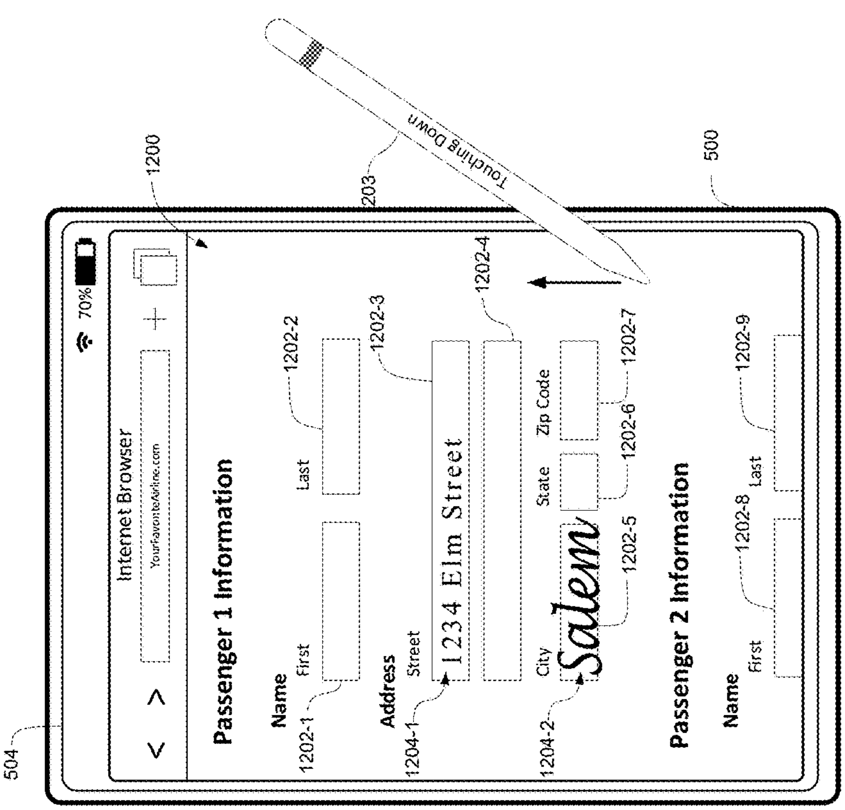
Figure 12K:
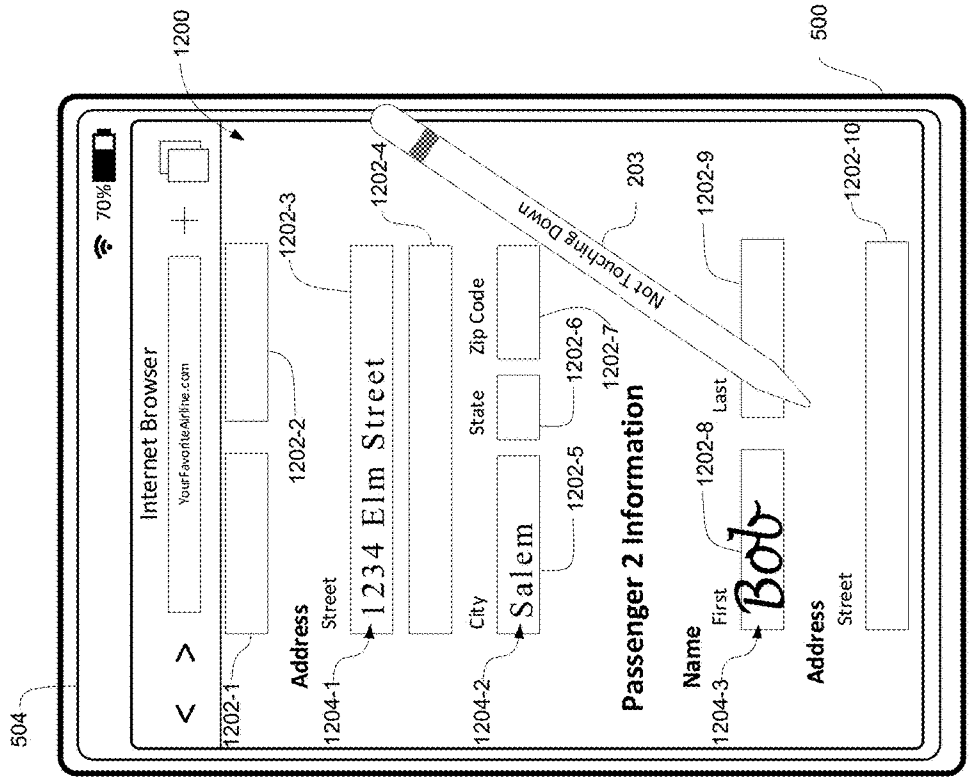
Figure 12J:
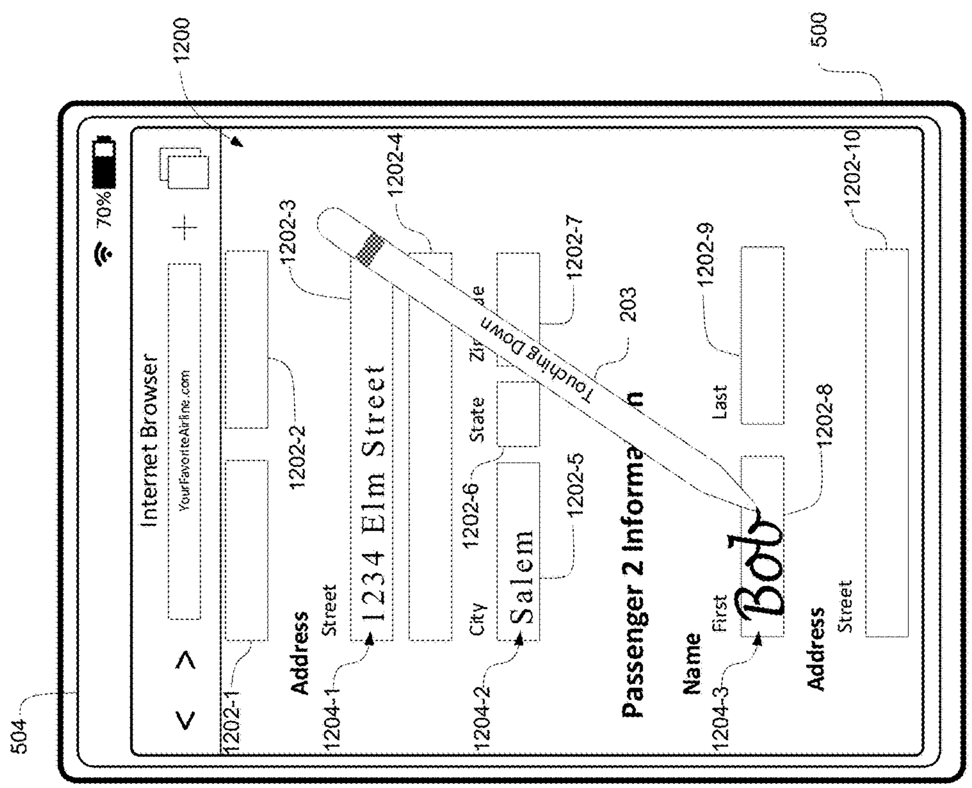
Figure 12M:
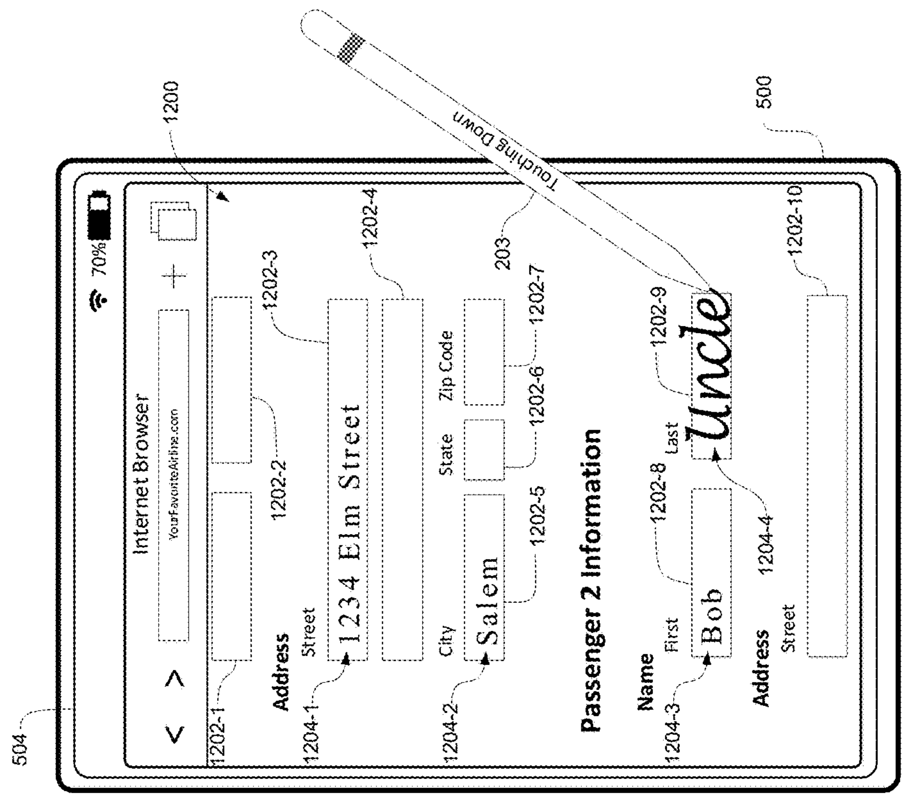
Figure 12L:
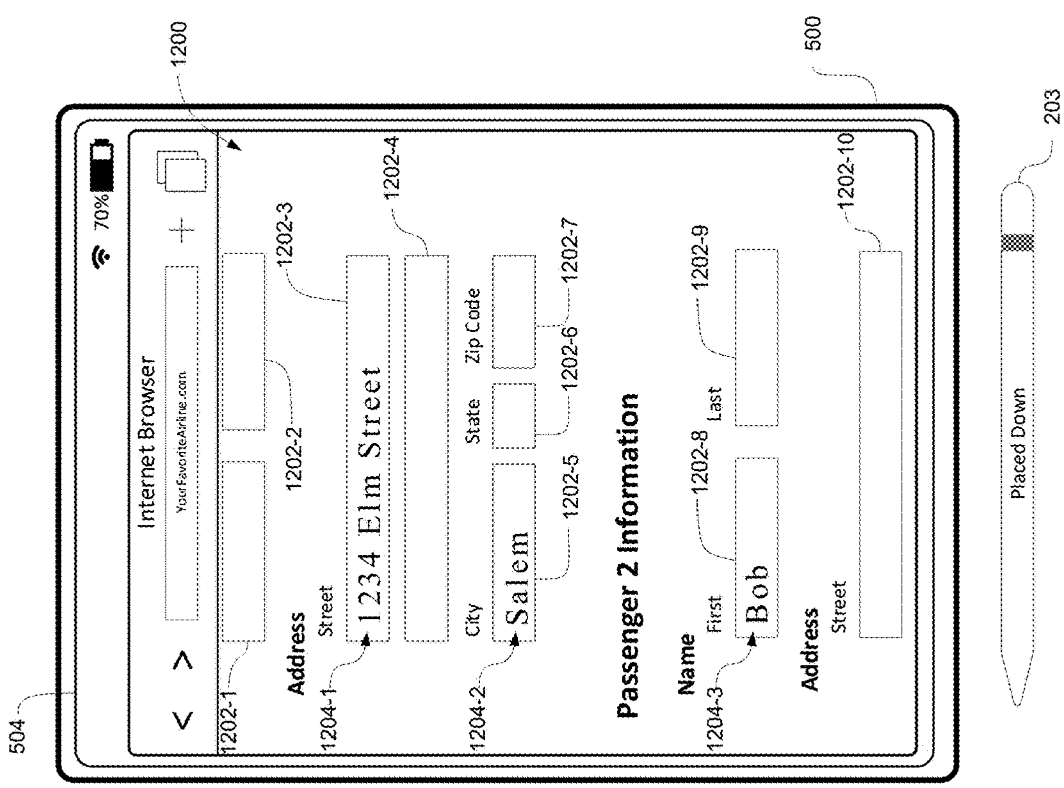
Figure 12O:
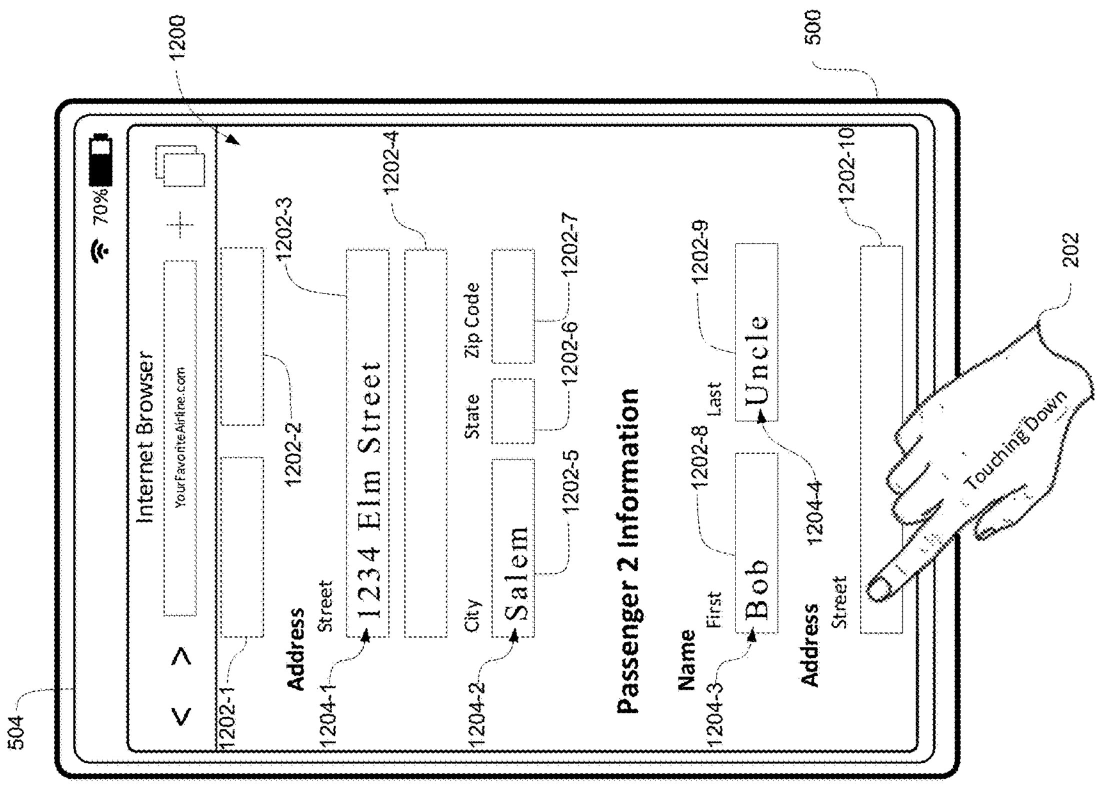
Figure 12N:
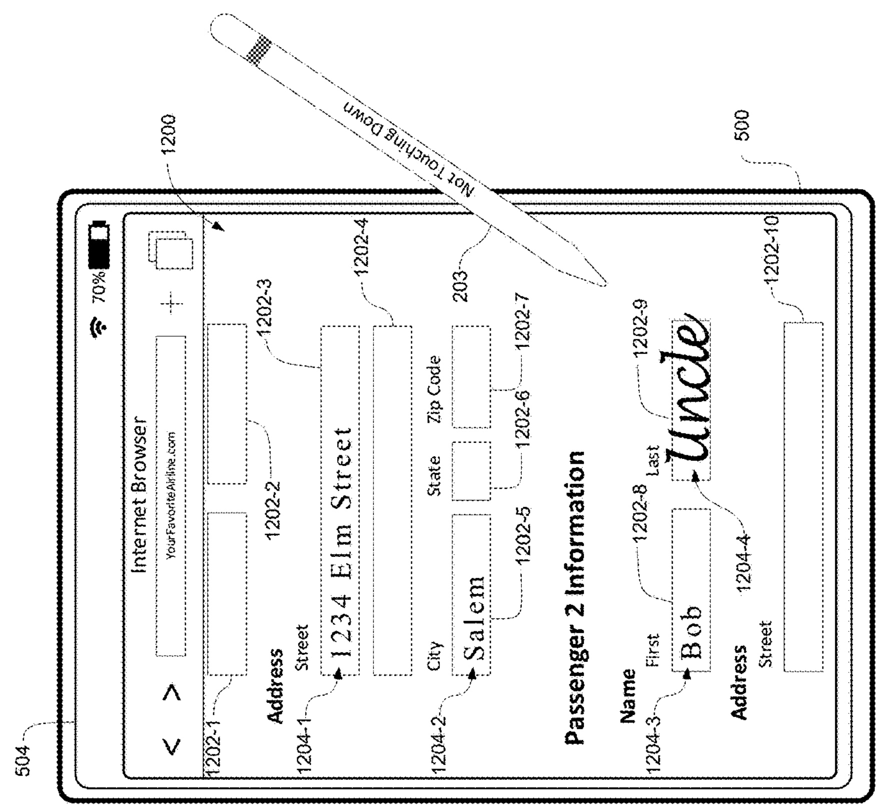
Figure 12Q:
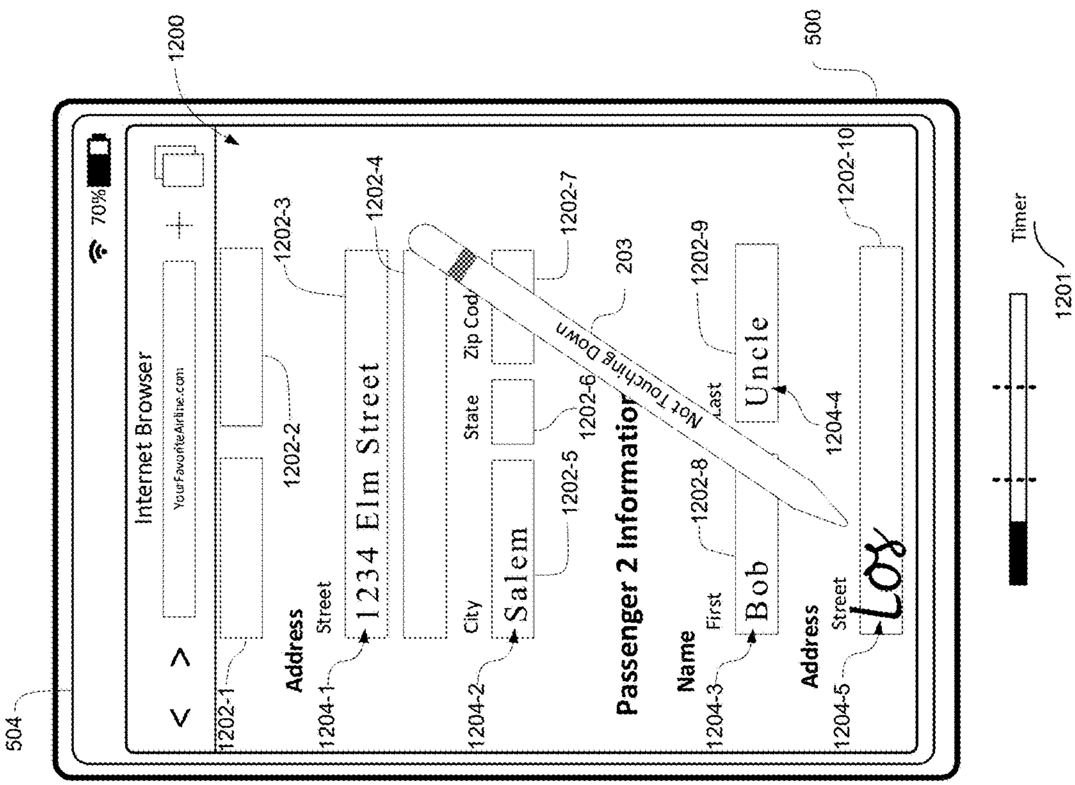
Figure 12P:
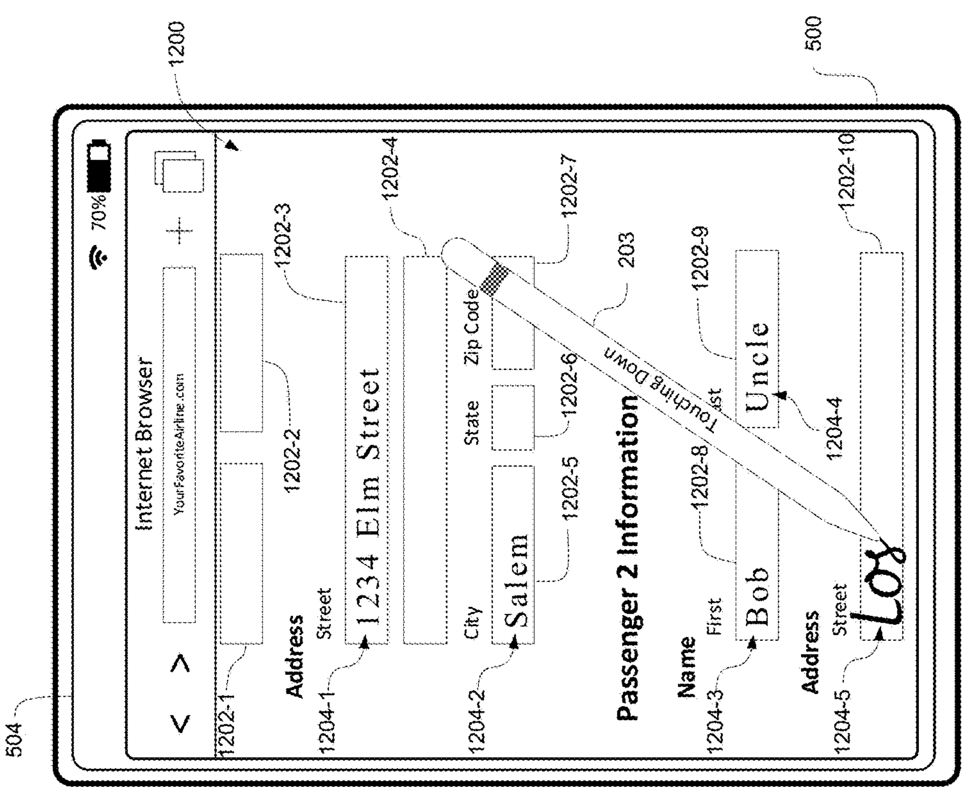
Figure 12S:
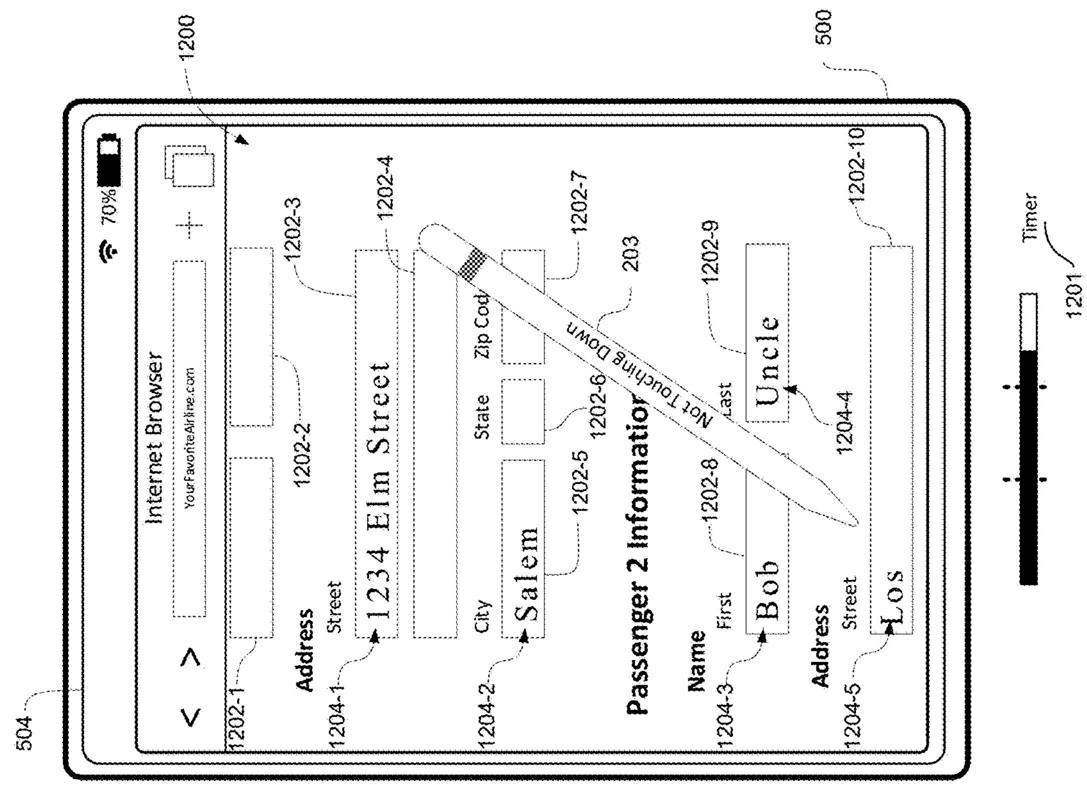

FIGS. 12A-12SS illustrate exemplary ways in which an electronic device manages the timing of converting handwritten text into font-based text. The embodiments in these figures are used to illustrate the processes described below, including the processes described with reference to FIGS. 13A-13G.

FIG. 12A illustrates an exemplary device 500 that includes touch screen 504. As shown in FIG. 12A, the electronic device 500 presents user interface 1200. In some embodiments, user interface 1200 is any user interface that includes one or more text entry fields (e.g., text entry regions). In some embodiments, a text entry field (e.g., text entry region) is a user interface element in which a user is able to enter text (e.g., letters, characters, words, etc.). For example, a text entry field can be a text field on a form, the URL entry element on a browser, login fields, etc. In other words, any user interface element in which a user is able to enter text and is able to edit, delete, copy, cut, etc. or perform any other text-based operations. It is understood that a text entry field (e.g., text entry region) is not limited to a user interface element that only accepts text, but one that is also able to accept and display audio and/or visual media.

In some embodiments, as shown in FIG. 12A, user interface 1200 is of an internet browser application that is displaying (e.g., navigated to) a passenger information entry user interface (e.g., for purchasing airplane tickets). It is understood that the examples shown in FIG. 12A-12SS are exemplary and should not be considered limiting to only the user interfaces and/or applications illustrated. In some embodiments, user interface 1200 includes text entry fields 1202-1 to 1202-9 in which a user is able to enter text to populate the respective text entry fields (e.g., information for two passengers).

In FIG. 12B, a user input is received (e.g., detected) on touch screen 504 from stylus 203. As shown in FIG. 6B, stylus 203 is touching down on touch screen 504. In some embodiments, stylus 203 touches down on touch screen 504 to provide handwritten input 1204-1. For example, as shown in FIG. 12B, handwritten input 1204-1 is of the character "1". In FIG. 12C, the user continues to enter handwritten input 1204-1 into text entry field 1202-3 (e.g., "1234 Elm Street"). In FIG. 12D, a lift-off of stylus 203 is detected (e.g., contact with touch screen 504 is terminated). In some embodiments, in response to detecting lift-off of stylus 203, a timer begins counting for converting the handwritten input to font-based text. The use of timers in converting handwritten input to font-based text will be described in more detail below with respect to FIGS. 12P-12SS. Thus, in some embodiments, handwritten input 1204-1 is not converted into font-based text at the time of detecting lift-off of stylus 203.

In FIG. 12E, a user input is detected by stylus 203 touching down on text entry field 1202-5. In some embodiments, the user input can be a tap, long-press input, or the beginning of handwritten text entry. In some embodiments, in response to the user input touching down on text entry field 1202-5 (e.g., a text entry field other than text entry field 1202-3), handwritten input 1204-1 is converted into font-based text. In this example, a timer that was being used for controlling the timing of the conversion of handwritten input 1204-1 is overridden and the handwritten input 1204-1 is converted to font-based text. Thus, in some embodiments, certain user interactions cause the conversion of handwritten input 1204-1 into font-based text without waiting for other predetermined conditions to be met (e.g., without regard to timers that are being used to determine when to convert handwritten text into font-based text). In some embodiments, the user interactions that cause the conversion of handwritten input are those that generally indicate that the user has completed handwritten input, or a particular sequence of handwritten inputs. For example, as shown in FIG. 12E, the user touching down on text entry field 1202-5 with stylus 203 indicates that the user likely has completed entry of handwritten input into text entry field 1202-3 (e.g., will likely not enter any further text within a certain duration of time). Thus, the use of a timer or otherwise delaying the handwritten input is unnecessary (e.g., because the system is likely to not receive any further inputs into text entry field 1202-3) and the system is able to convert the handwritten input without causing undue distraction or disruption to the user's interaction with the user interface.

In FIG. 12F, a user input is detected from stylus 203 entering handwritten input 1204-2 into text entry field 1202-5 (e.g., "Salem"). In FIG. 12G, lift-off of stylus 203 is detected and optionally a timer begins counting for converting handwritten input 1204-2 into font-based text. In FIG. 12H, a touchdown is detected from stylus 203 at a location in user interface 1200 outside of any text entry fields. In some embodiments, handwritten input 1204-2 is not converted at that time (e.g., because device 500 is unsure of what gesture or command the user is performing). In some embodiments, handwritten input 1204-2 is converted into font-based text in response to detecting the touchdown of stylus 203 and/or at the time of detecting the touchdown of stylus 203.

In FIG. 12I, the user moves stylus 203 while continuing contact with touch screen 504 and performs an upward swipe gesture. In some embodiments, the user input is interpreted as an upward scroll command. In some embodiments, in response to receiving the upward scroll command, user interface 1200 is scrolled upwards in accordance with the upward scrolling gesture (e.g., the user interface is scrolled upwards by the same amount as the gesture) (e.g., thus revealing text entry field 1202-10). In some embodiments, in response to determining that the user is performing a scrolling gesture (e.g., in response to the user input corresponding to a request to scroll the user interface), handwritten input 1204-2 is converted into font-based text. Thus, in some embodiments, the system determines that the user has likely completed input of handwritten input 1204-2 when the scroll command is received and is able to convert handwritten input 1204-2 into font-based text without regard to any timers (or satisfaction of other predetermined conditions).

In FIG. 12J, a user input is detected from stylus 203 entering handwritten input 1204-3 into text entry field 1202-8 (e.g., "Bob"). In FIG. 12K, lift-off of stylus 203 is detected and optionally a timer begins counting for converting handwritten input 1204-3 into font-based text. In FIG. 12L, stylus 203 is detected to have been placed down. In some embodiments, detecting that stylus 203 has been placed down is based on one or more sensors in stylus 203. For example, stylus 203 includes an accelerometer or a gyroscope that is able to determine that the user has placed stylus 203 down. In some embodiments, stylus 203 is in communication with device 500 (e.g., over a wireless communication protocol such as Bluetooth) and transmits data to device 500 that stylus 203 has been placed down. In some embodiments, in response to determining that stylus 203 has been placed down (e.g., by device 500 or stylus 203), handwritten input 1204-3 is converted into font-based text.

In some embodiments, handwritten input 1204-3 is converted into font-based text when stylus 203 is determined to be a threshold distance away from device 500 (e.g., 6 inches, 1 foot, 2 feet, outside of wireless communication range, etc.). In some embodiments, handwritten input 1204-3 is converted into font-based text when stylus 203 is determined to be pointed away from device 500 (e.g., the tip or the writing end of stylus 203 is facing away from device 500). In some embodiments, handwritten input 1204-3 is converted into font-based text when stylus 203 is docked with device 500 (e.g., magnetically attached to device 500, being charged by device 500, or otherwise in a state of non-use). Thus, based on the context of stylus 203 itself (e.g., location, distance, angle, movement, or any other indication that the user is done using the stylus for handwritten input, etc.), handwritten inputs are optionally converted into font-based text.

In FIG. 12M, a user input is detected from stylus 203 entering handwritten input 1204-4 into text entry field 1202-9 (e.g., "Uncle"). In FIG. 12N, lift-off of stylus 203 is detected and optionally a timer begins counting for converting handwritten input 1204-4 into font-based text. In FIG. 12O, a user input from finger 202 is detected on the touch screen 504. In some embodiments, the user input from finger 202 is detected on text entry field 1202-10. In some embodiments, in response to detecting the user input from finger 202 (e.g., on text entry field 1202-10 or optionally anywhere on user interface 1200), handwritten input 1204-4 is converted into font-based text (e.g., without consideration of any timers). Thus, in some embodiments, when the user switches from using a stylus to perform handwritten input to using a finger to interact with the touch screen, any previously inputted handwritten inputs from the stylus are optionally converted into font-based text.

FIGS. 12P-12 In FIG. 12P, a user input is detected from stylus 203 entering handwritten input 1204-5 into text entry field 1202-10 (e.g., "Los"). In FIG. 12Q, lift-off of stylus 203 is detected and timer 1201 begins counting for converting handwritten input 1204-5 into font-based text.

In some embodiments, different predetermined delay times are used for converting handwritten input into font-based text based on the context and the handwritten input conversion mode of the device. In some embodiments, when device 500 is in a live conversion mode (e.g., a mode in which letters or words are converted while the user is still performing handwritten inputs), a shorter predetermined delay time (e.g., 0.5 seconds, 1 second, 2 seconds, 5 seconds) is used when certain criteria for faster conversion times are satisfied, as will be discussed in further detail below. In some embodiments, when device 500 is in a live conversion mode, a longer predetermined delay time (e.g., 0.5 seconds, 1 second, 2 seconds, 3 seconds, 5 seconds, 10 seconds) is used when certain criteria for slower conversion times are satisfied, as will be discussed in further detail below. While in live conversion mode, in some embodiments, each letter or word has its own respective timer for controlling the timing for converting the respective letter or word into font-based text. In some embodiments, a third, even longer predetermined delay time is used when device 500 is in a simultaneous conversion mode (e.g., a mode in which an entire sequence of letters or words are converted at one time after the user has completed the sequence of handwritten inputs). In simultaneous conversion mode, in some embodiments, the entire sequence of letters or words has a timer for controlling the timing for converting the sequence of letters or words into font-based text.

Figure 12R:
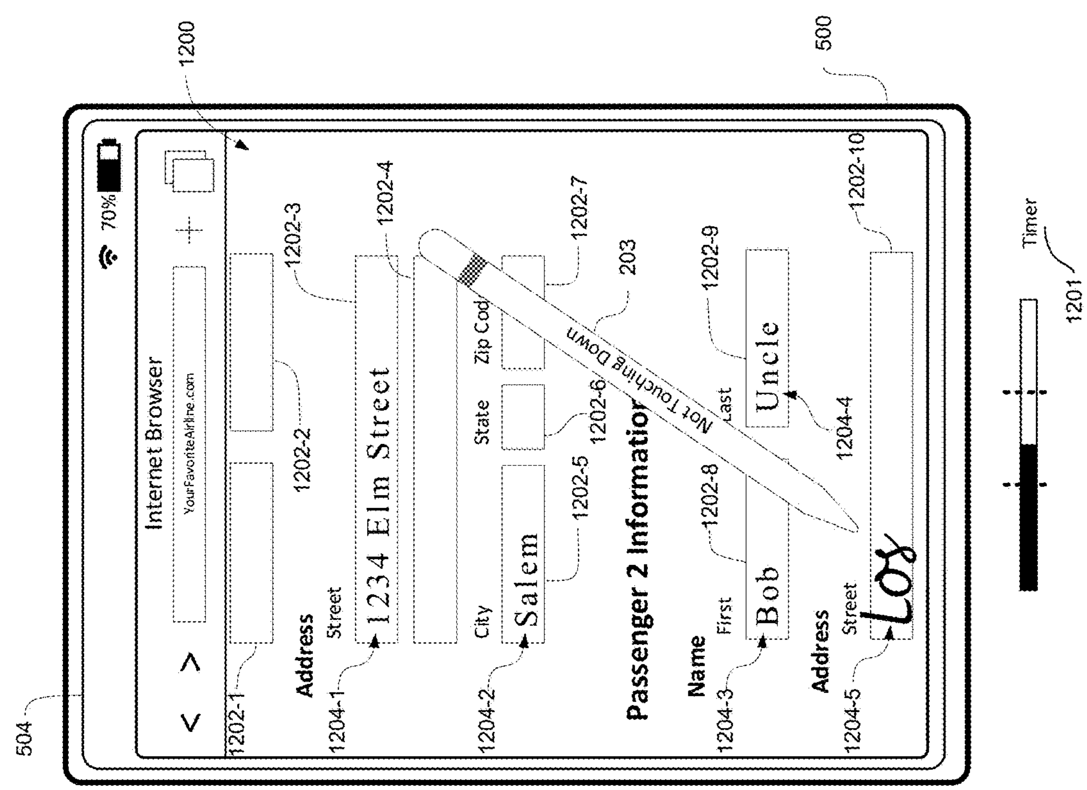

In FIG. 12Q, the handwritten input 1204-5 corresponding to the word "Los" is one in which additional letters can be added to form valid words. For example, the user is able to add "t" to "Los" to form "Lost," which is a valid word. Thus, in some embodiments, timer 1201 uses a longer predetermined time delay to convert handwritten input 1204-5 to font-based text. In some embodiments, using a longer predetermined time delay provides the user with additional time to provide additional input (e.g., to write "t" to complete the word "Lost") before the handwritten input is converted. In FIG. 12R, while the stylus 203 is still not contacting touch screen 504, timer 1201 has surpassed the shorter predetermined time delay. However, in some embodiments, because the criteria for a shortened conversion time (e.g., for the use of the shorter predetermined time delay) is not satisfied, handwritten input 1204-5 is not yet converted into font-based text. In FIG. 12S, timer 1201 has satisfied the longer predetermined time delay and in response to satisfying the longer predetermined time delay, handwritten input 1204-5 is converted into font-based text.

Figure 12U:
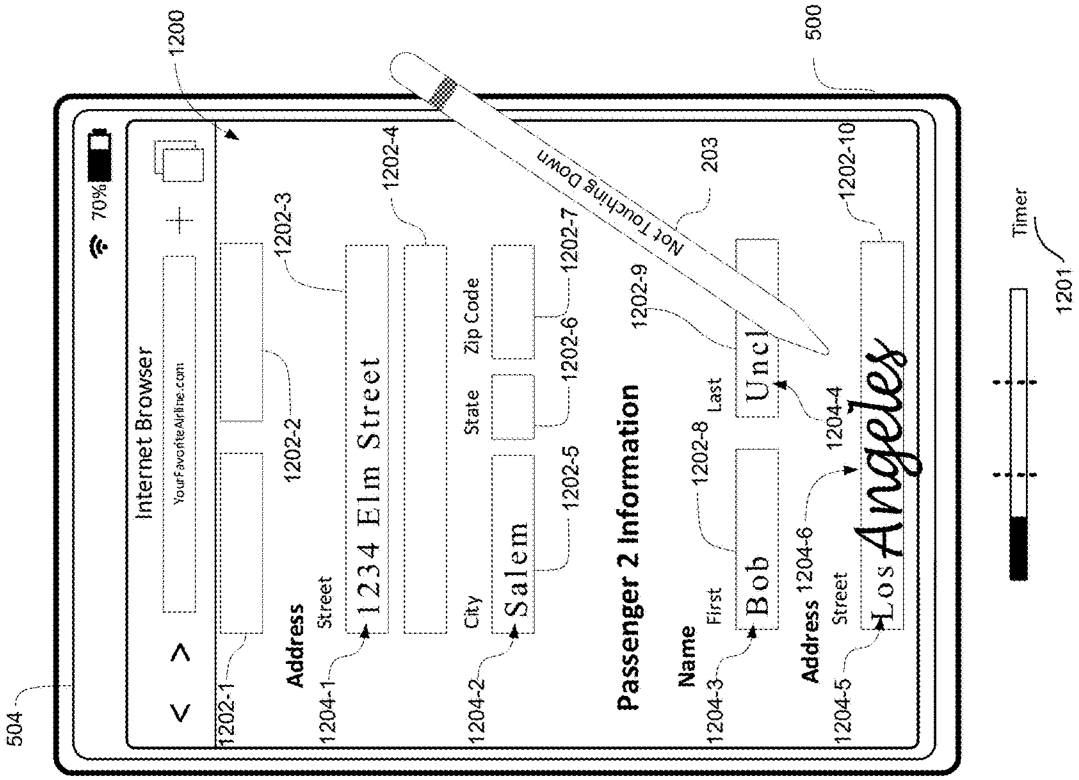
Figure 12T:
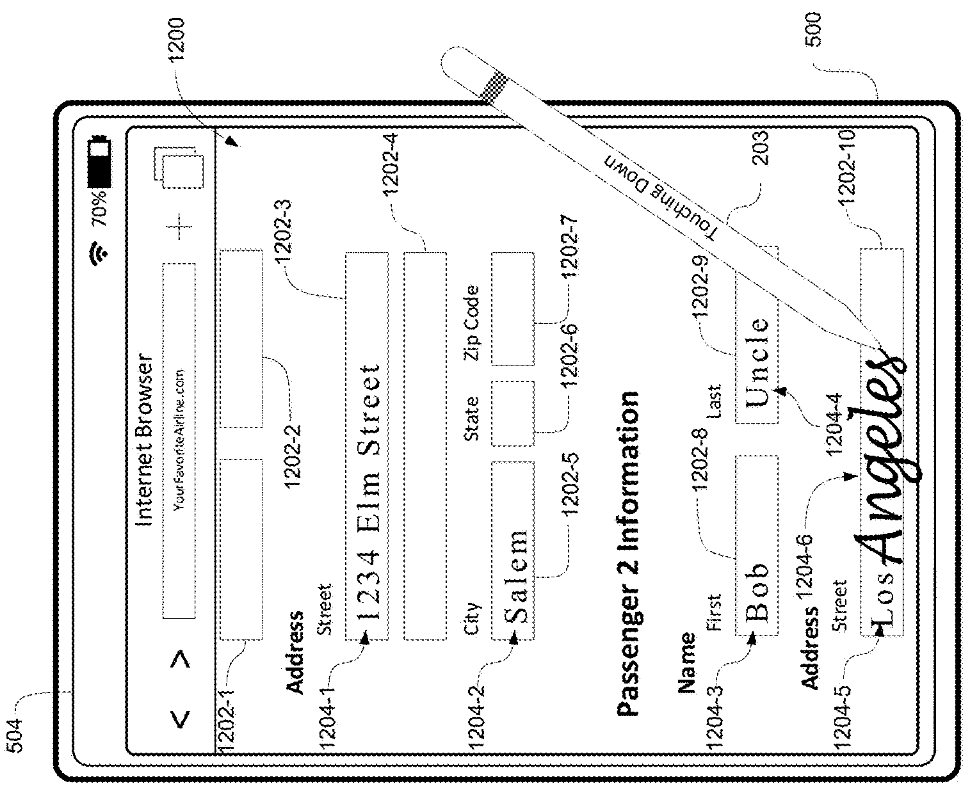
Figure 12V:
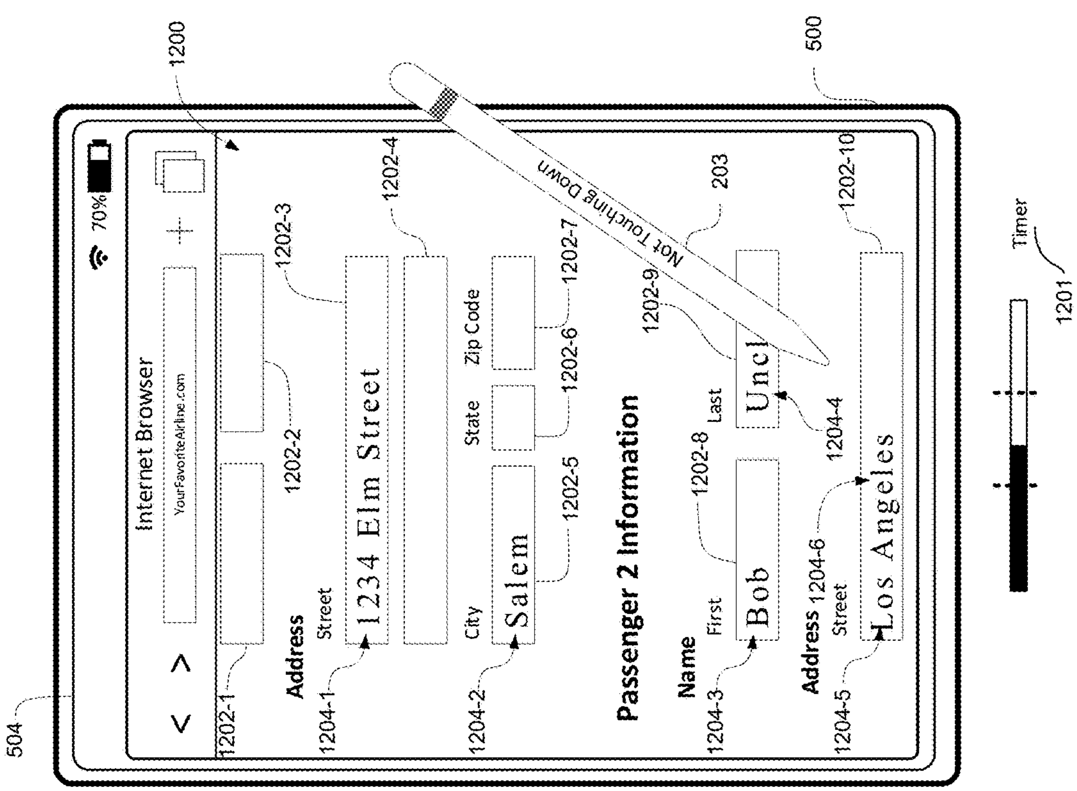

In FIG. 12T, a user input is detected from stylus 203 further entering handwritten input 1204-6 into text entry field 1202-10 (e.g., "Angeles"). In FIG. 12U, lift-off of stylus 203 is detected and timer 1201 begins counting for converting handwritten input 1204-6 into font-based text. In some embodiments, the word "Angeles" is one in which no additional letters can be added to form valid words. Thus, in some embodiments, device 500 determines that the user is likely to be done writing the current word and the shorter predetermined time delay can be used. In other words, because it is likely that the user is done writing a word, the system does not need to provide additional time for the user to potentially add additional letters. Thus, as shown in FIG. 12V, timer 1201 has satisfied the shorter predetermined time delay and in response to satisfying the shorter predetermined time delay, handwritten input 1204-6 is converted into font-based text.

Figure 12W:
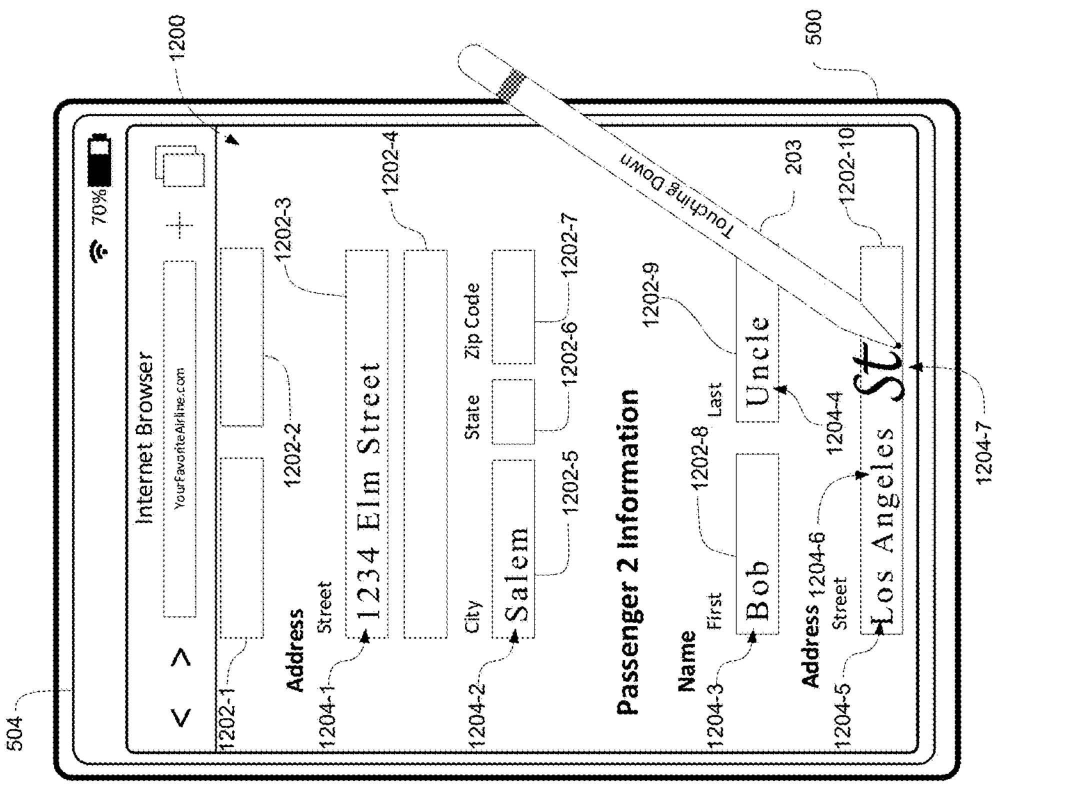
Figure 12Y:
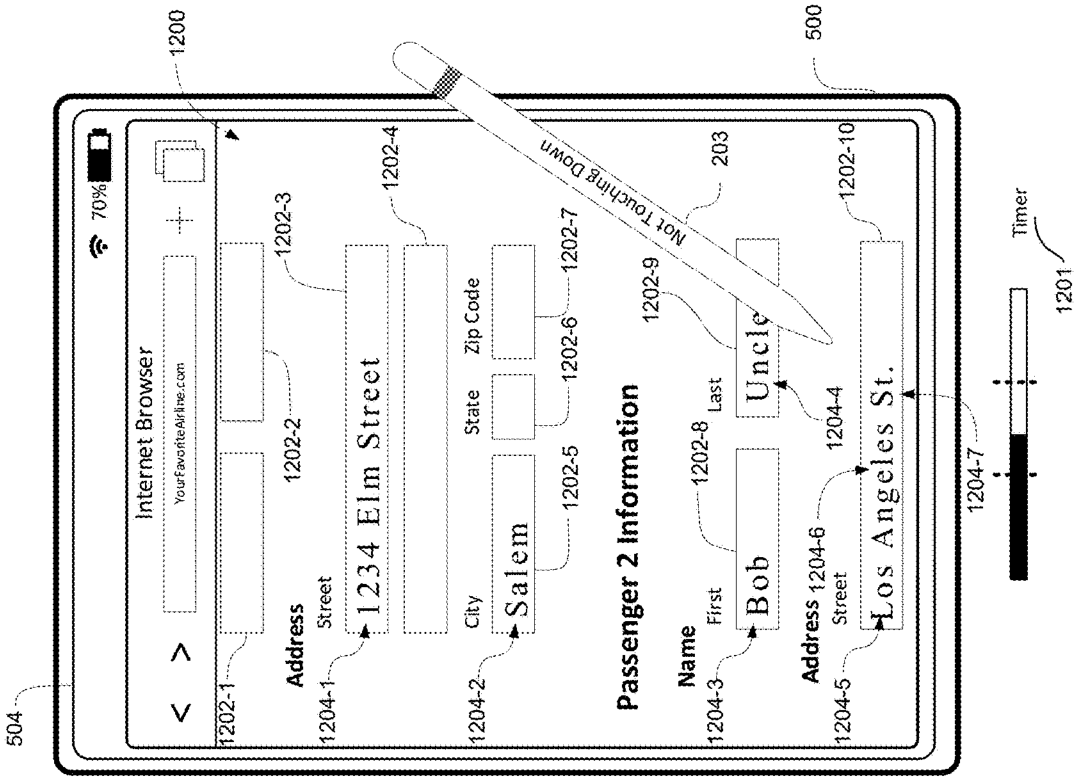
Figure 12X:
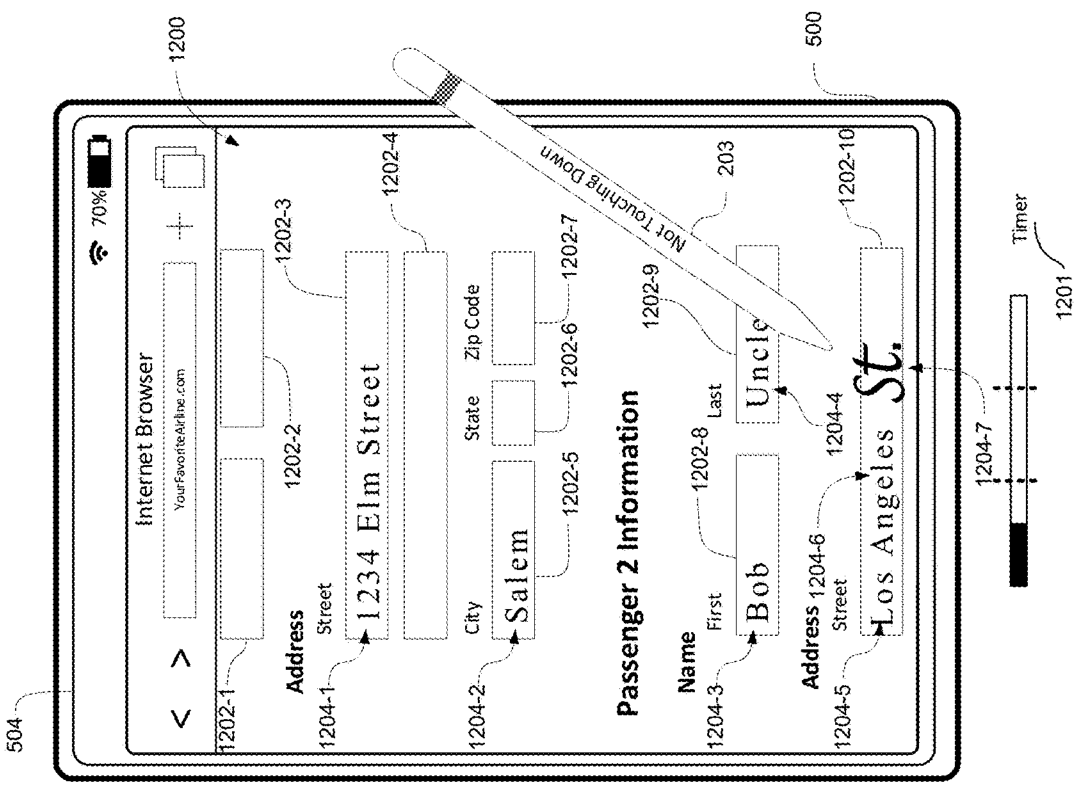
Figure 12A:
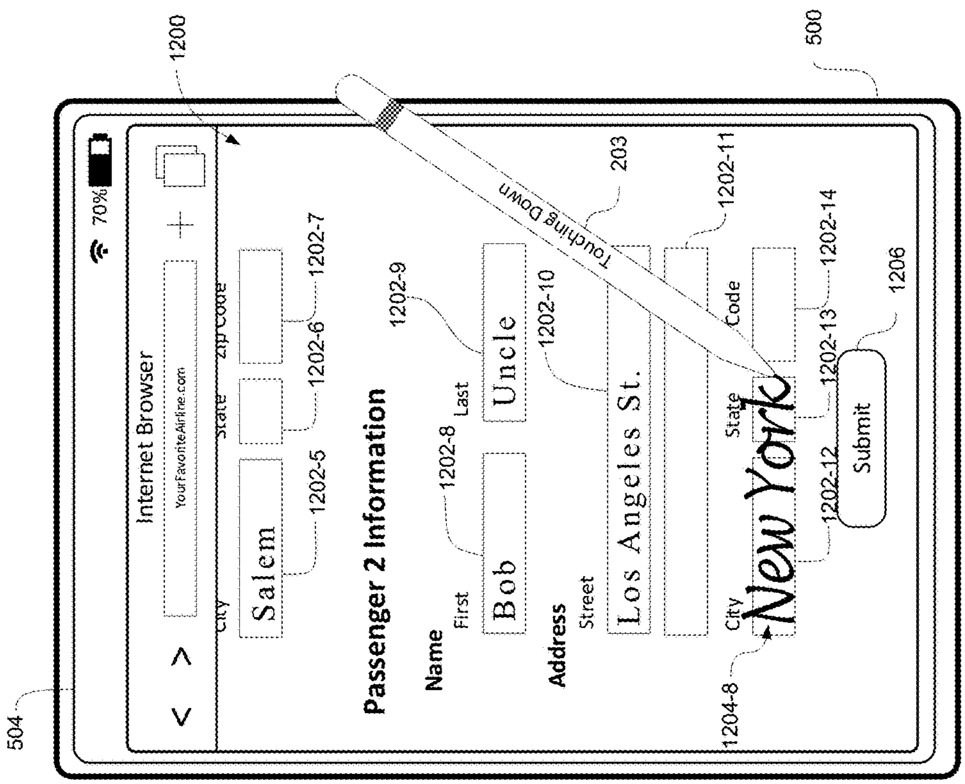

In FIG. 12W, a user input is detected from stylus 203 further entering handwritten input 1204-7 into text entry field 1202-10 (e.g., "St."). In FIG. 12X, lift-off of stylus 203 is detected and timer 1201 begins counting for converting handwritten input 1204-7 into font-based text. In some embodiments, the word "St." includes a punctuation mark (e.g., a period). In some embodiments, if a handwritten input includes a punctuation mark (e.g., a period, a comma, a colon, a semicolon, etc.), then device 500 determines that the user is likely to be done writing the current word and the shorter predetermined time delay can be used. In other words, because it is likely that the user is done writing a word, the system does not need to provide additional time for the user to potentially add additional letters. Thus, as shown in FIG. 12Y, timer 1201 has satisfied the shorter predetermined time delay and in response to satisfying the shorter predetermined time delay, handwritten input 1204-7 is converted into font-based text.

Figure 12Z:
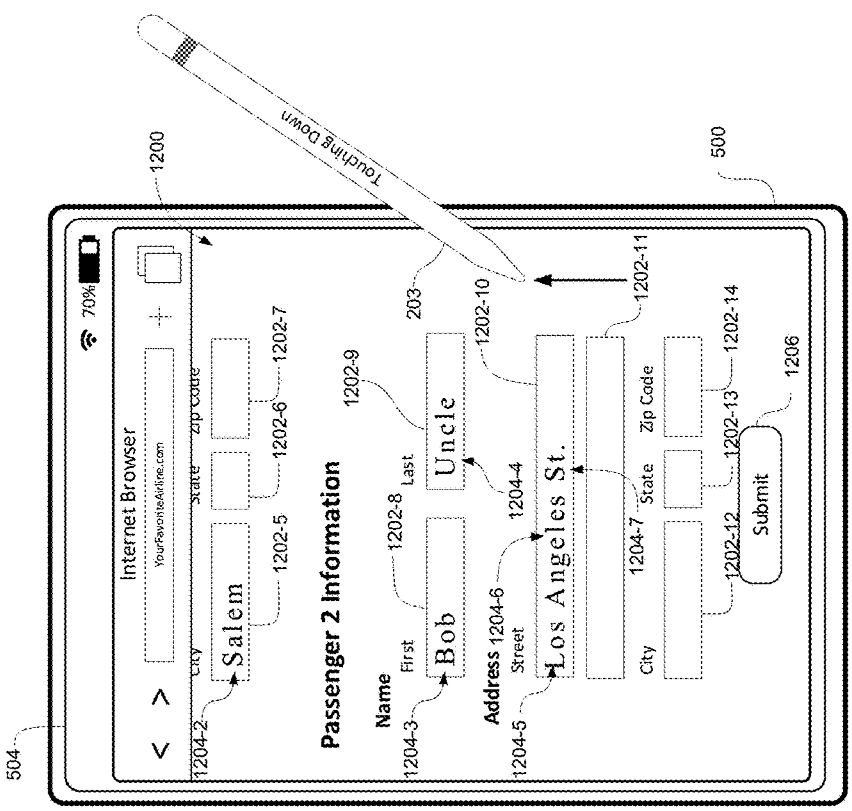
Figure 12C:
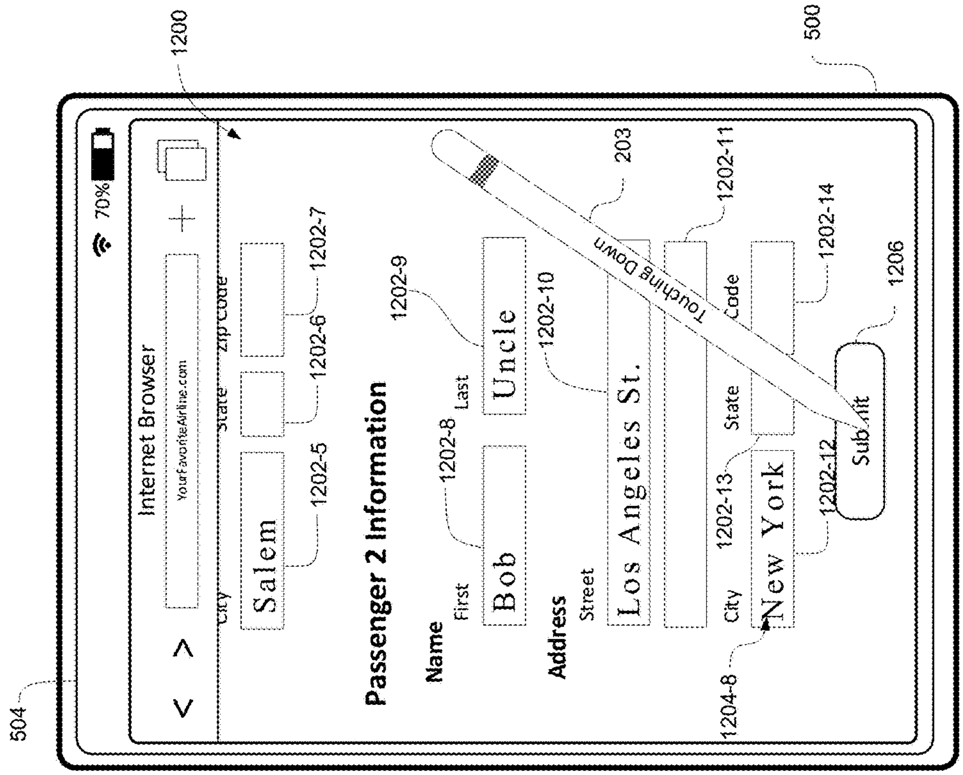
Figure 12B:
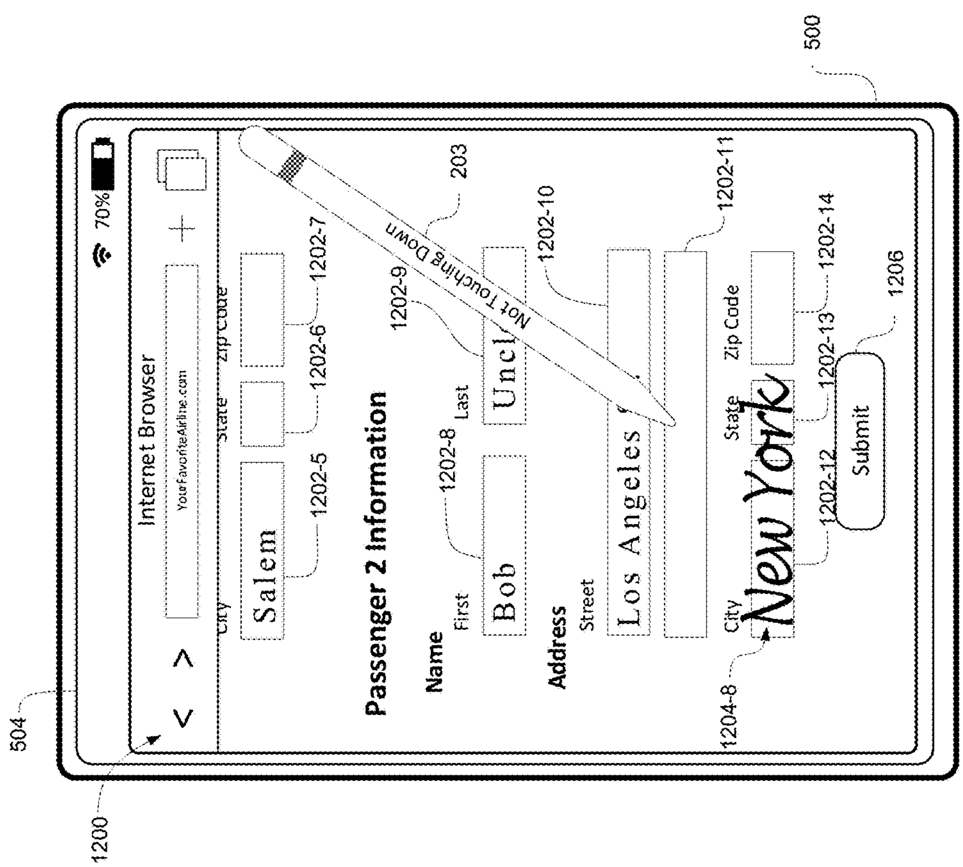
Figure 12E:
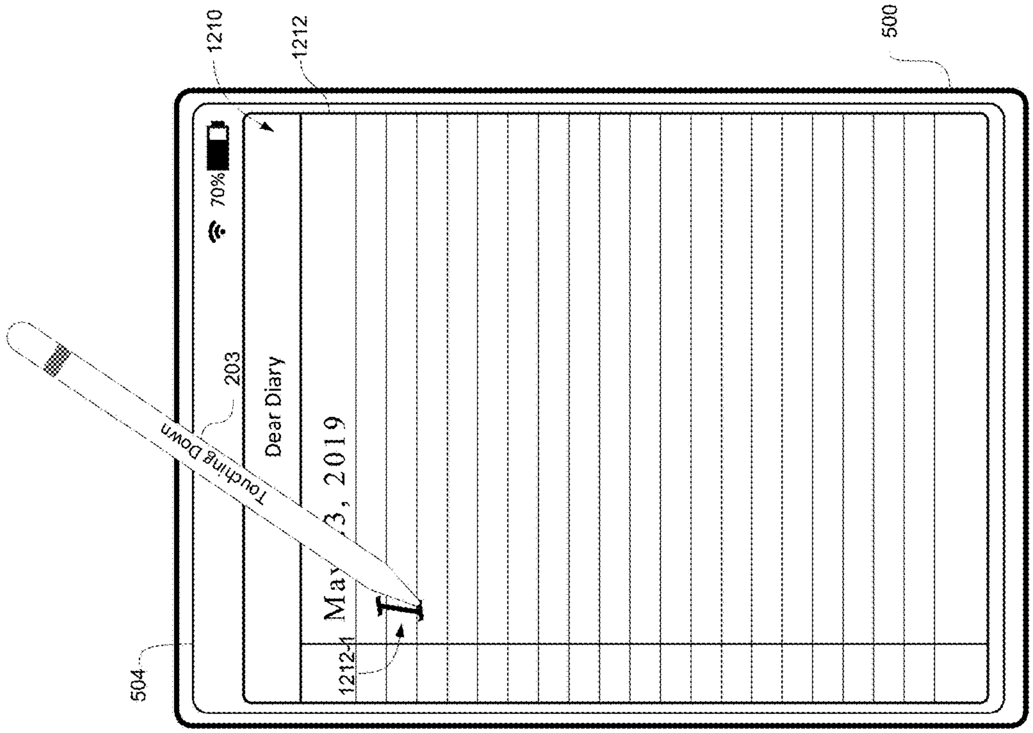
Figure 12D:
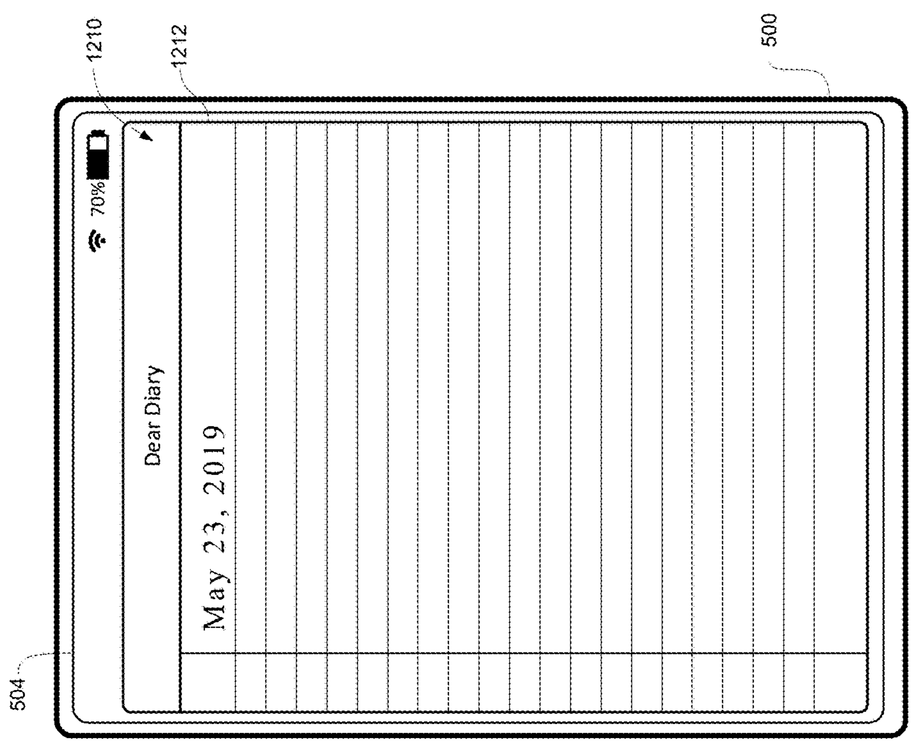
Figure 12G:
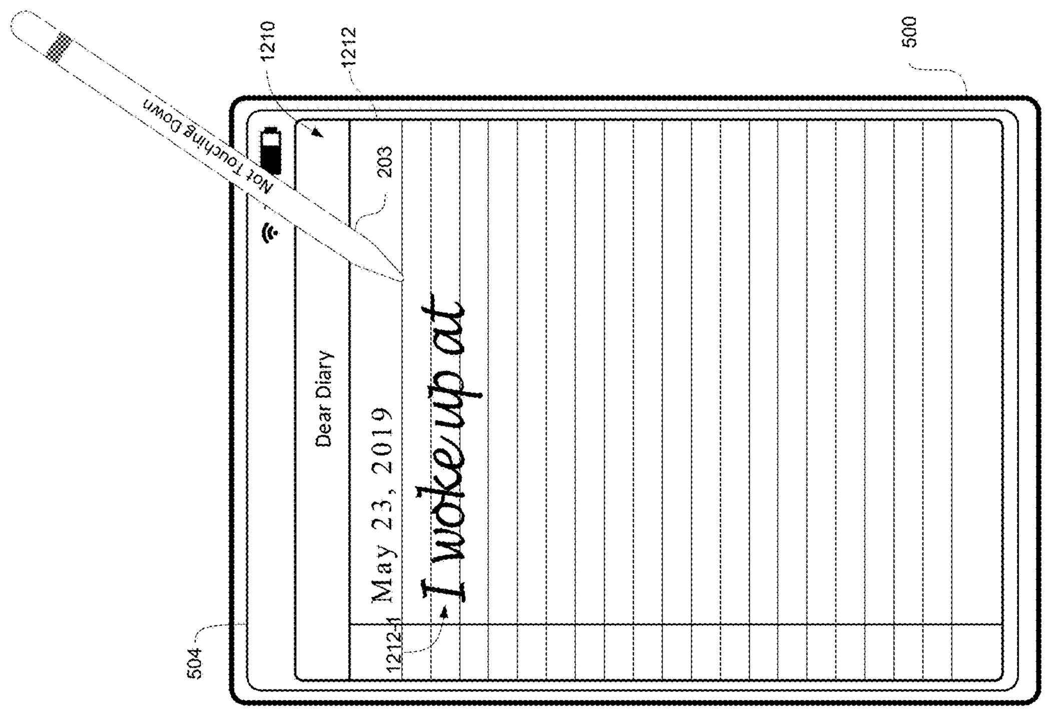
Figure 12F:
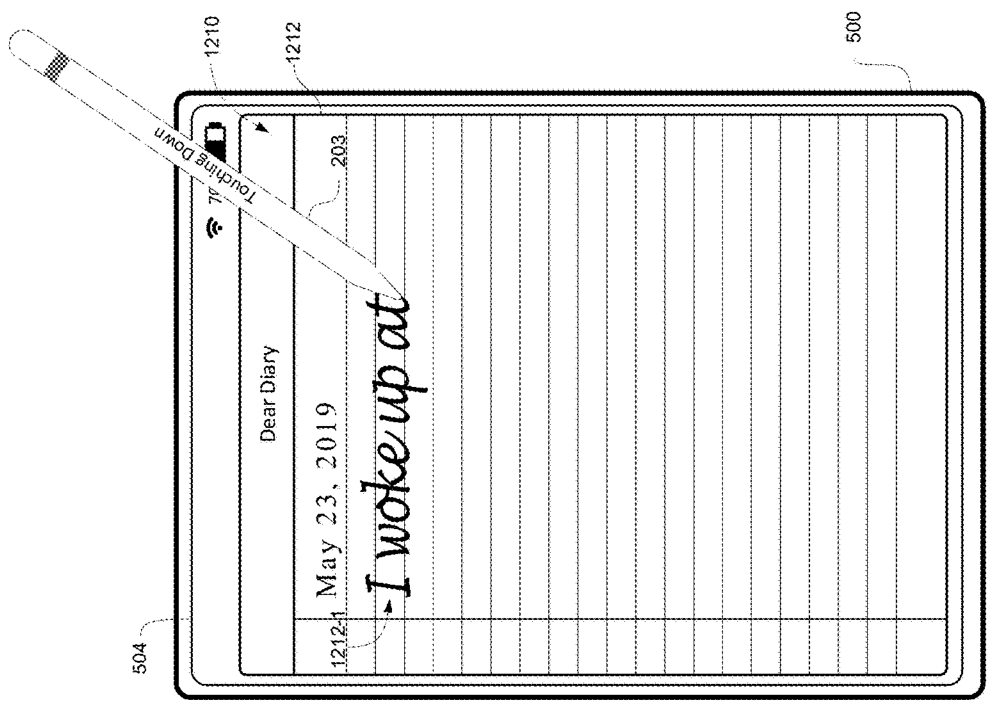
Figure 12I:
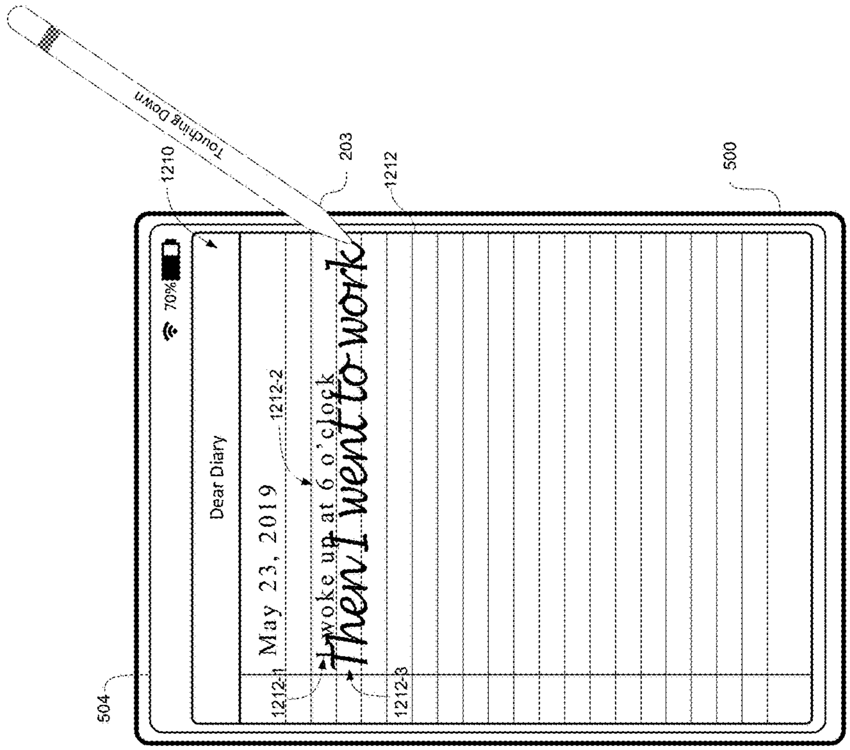
Figure 12H:
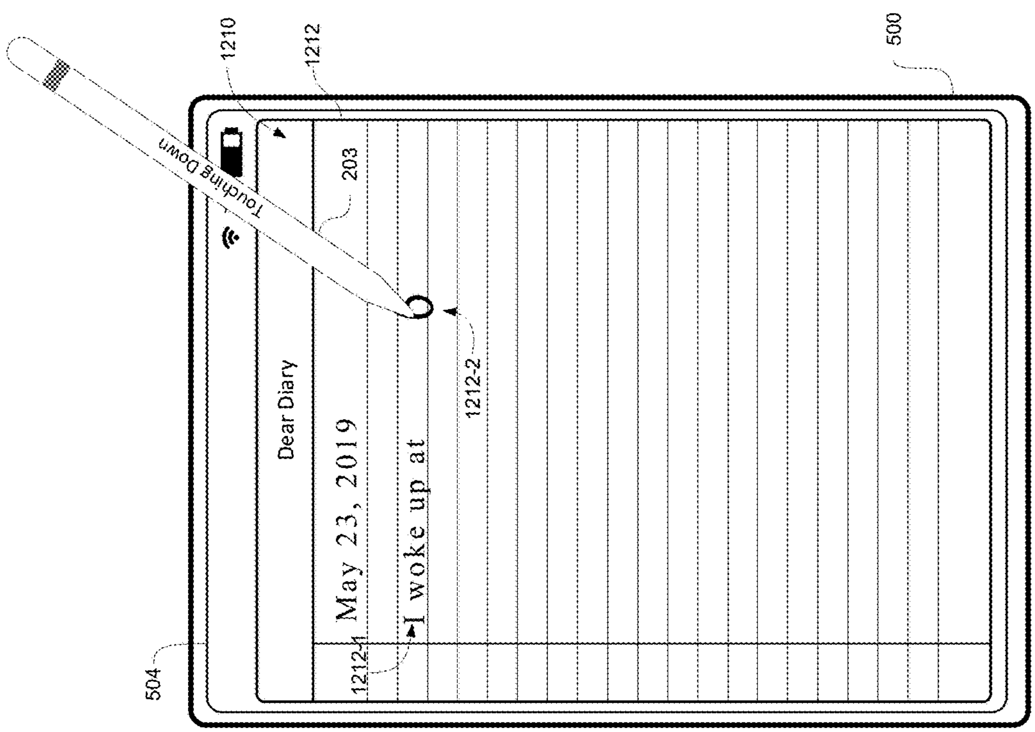
Figure 12K:
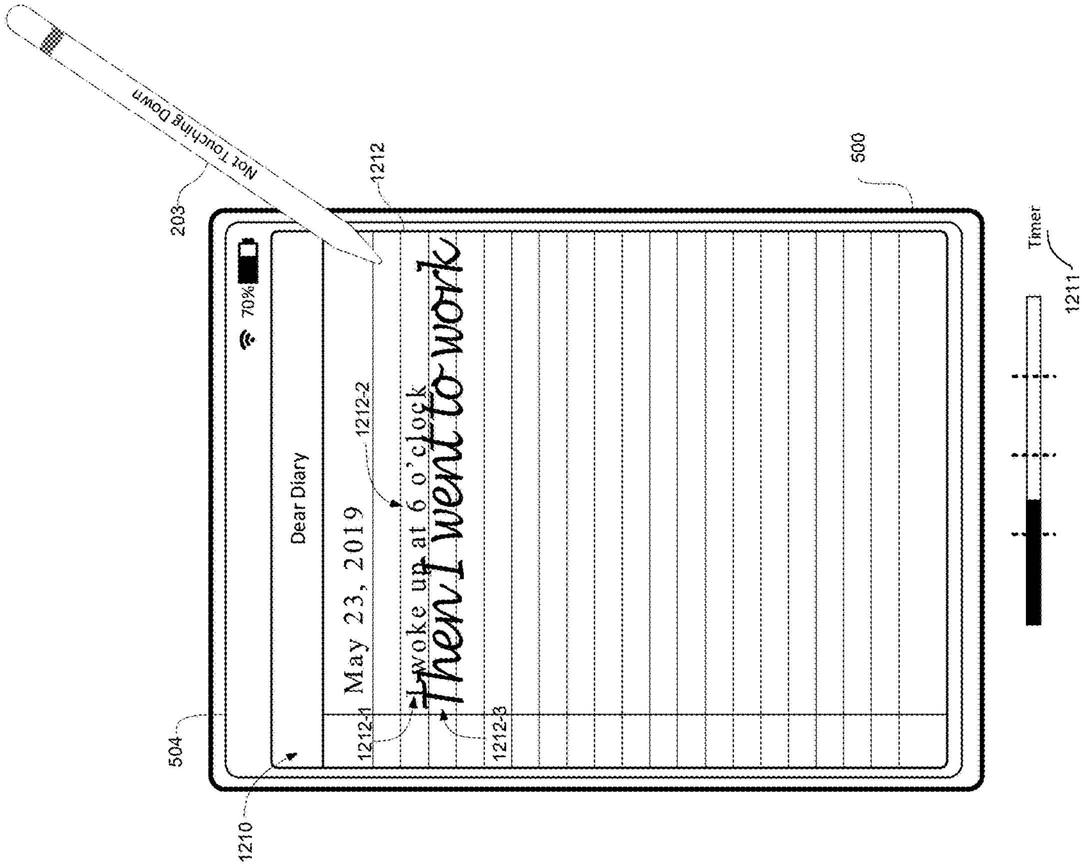
Figure 12J:
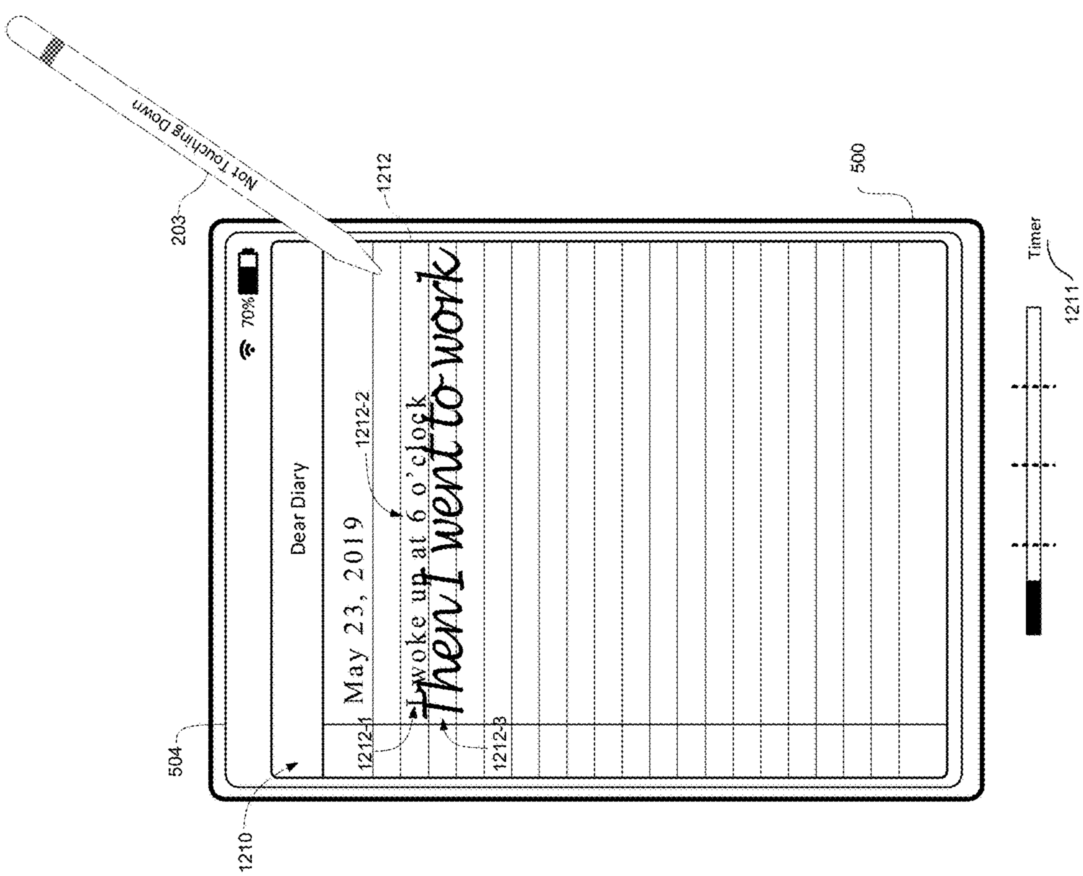
Figure 12M:
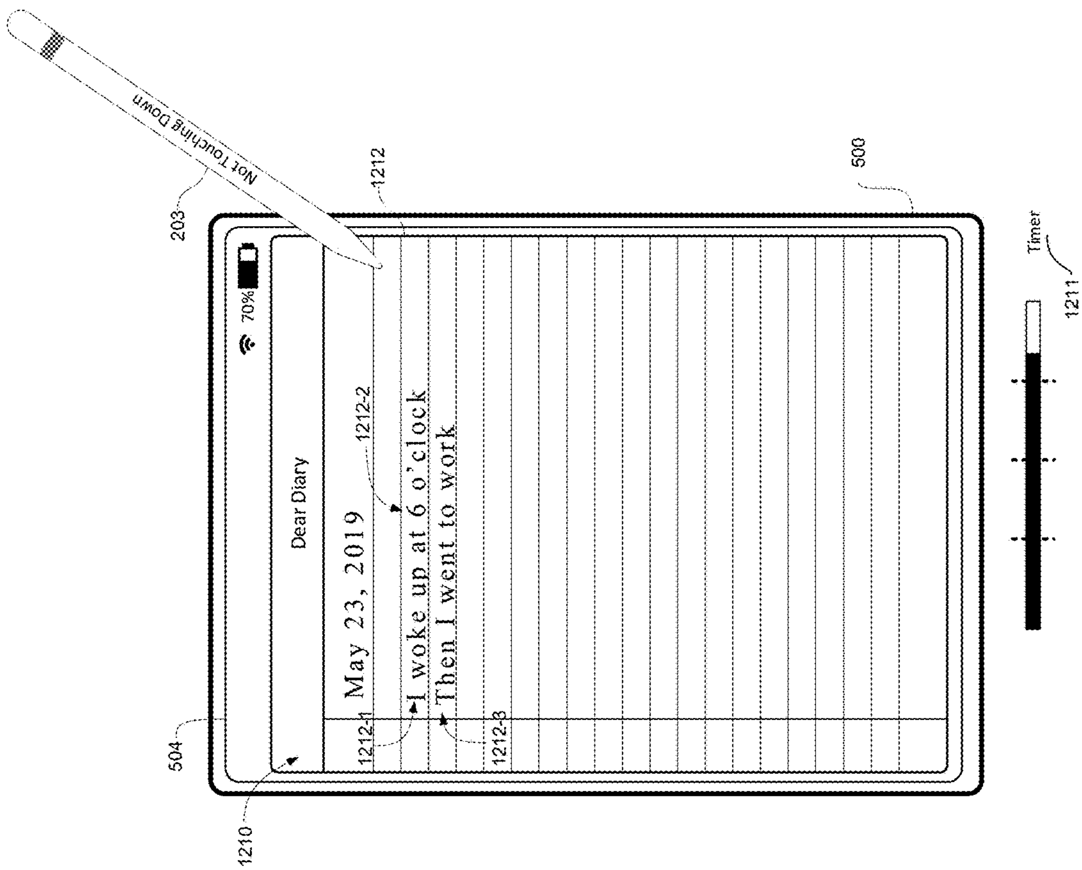
Figure 12L:
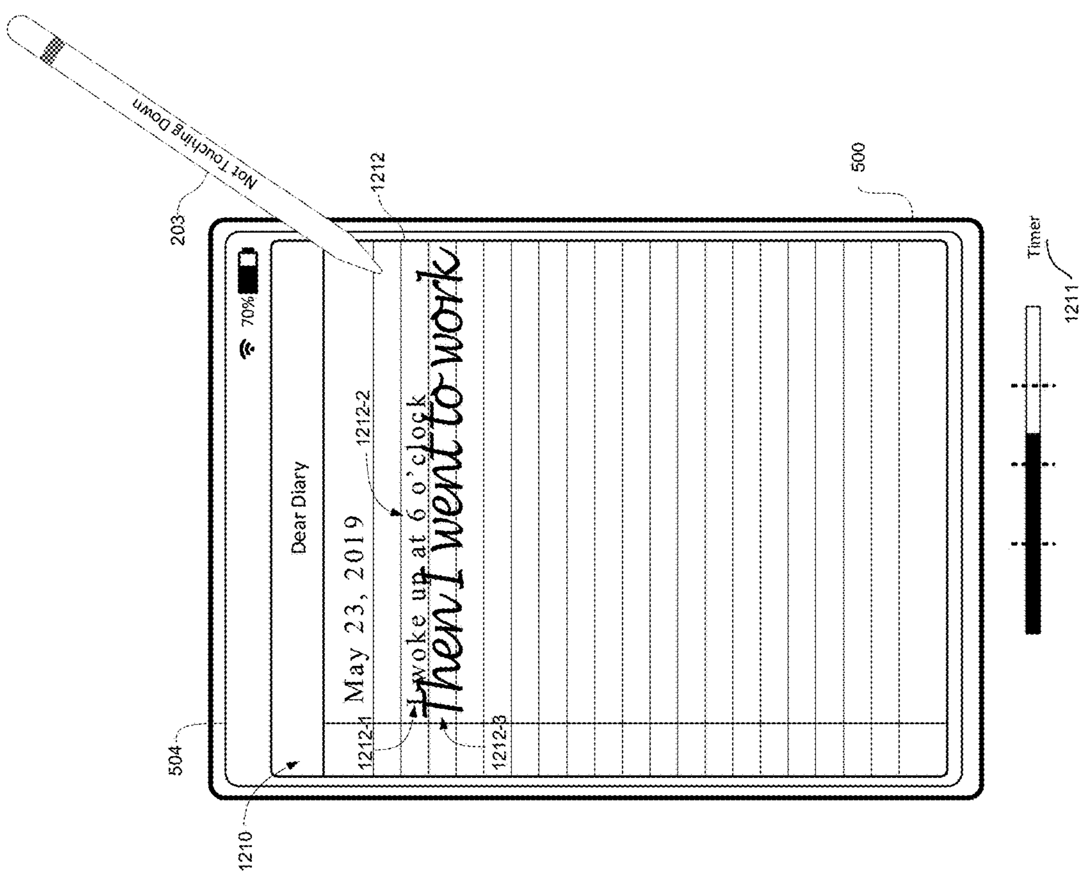
Figure 12O:
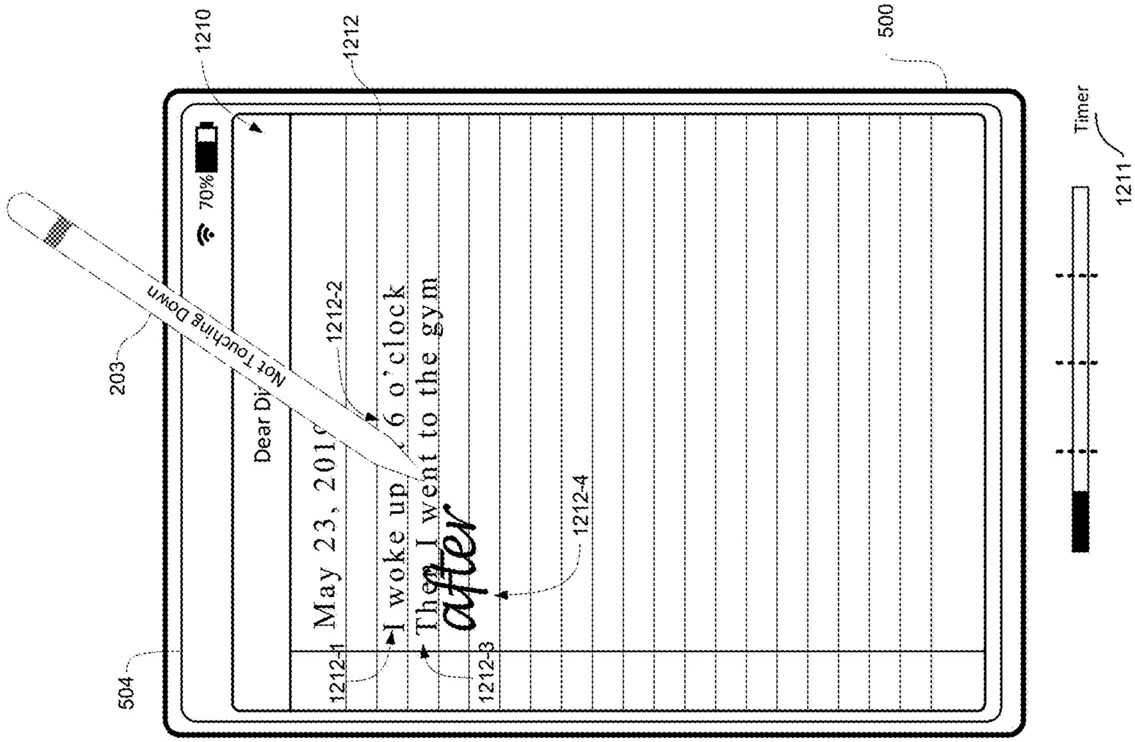
Figure 12N:
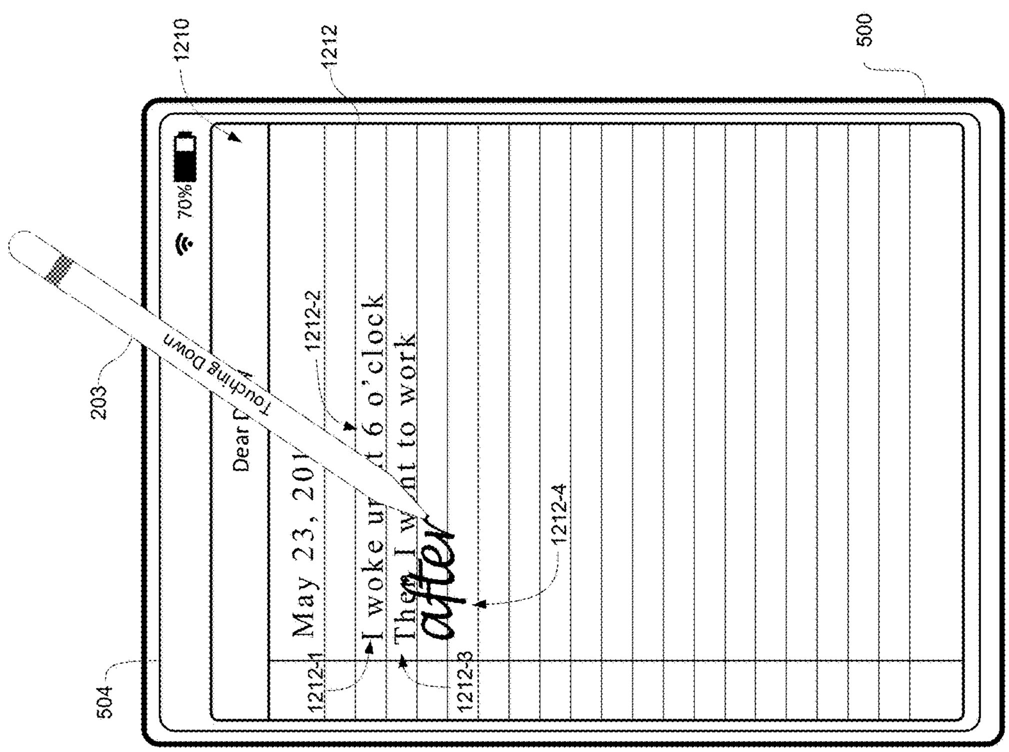
Figure 12P:
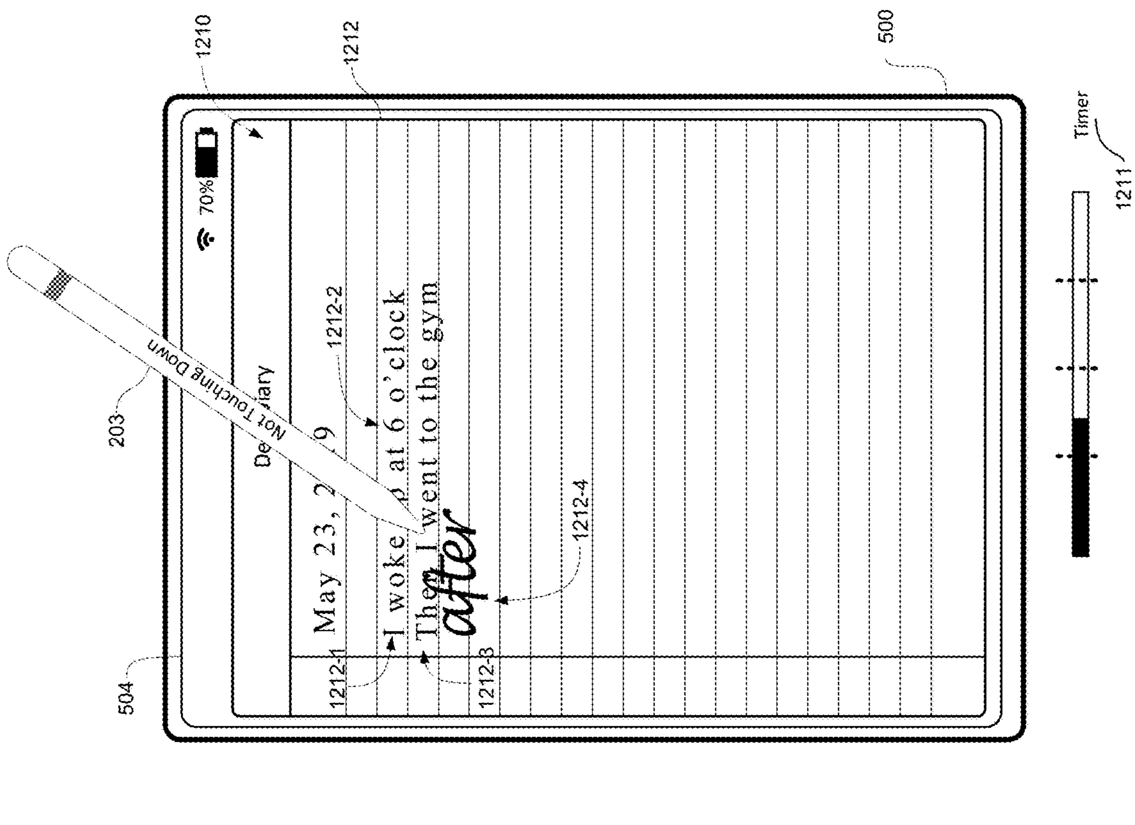
Figure 12Q:
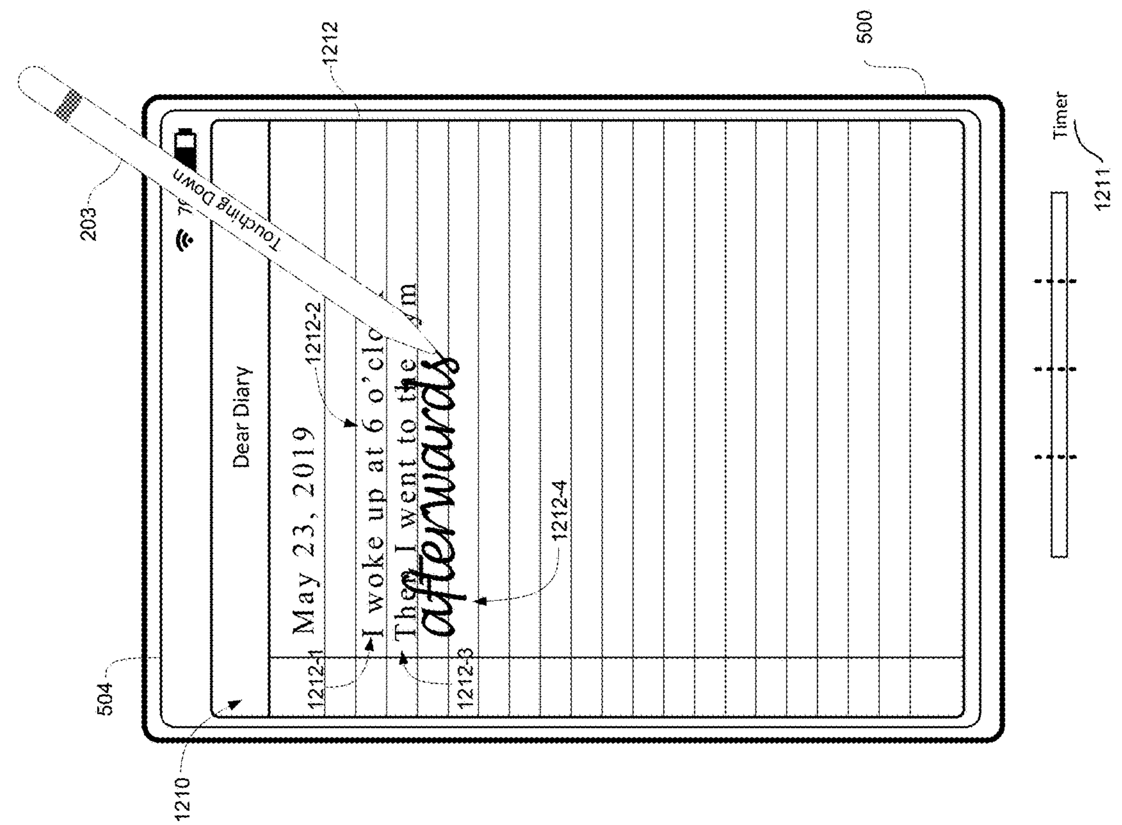
Figure 12S:
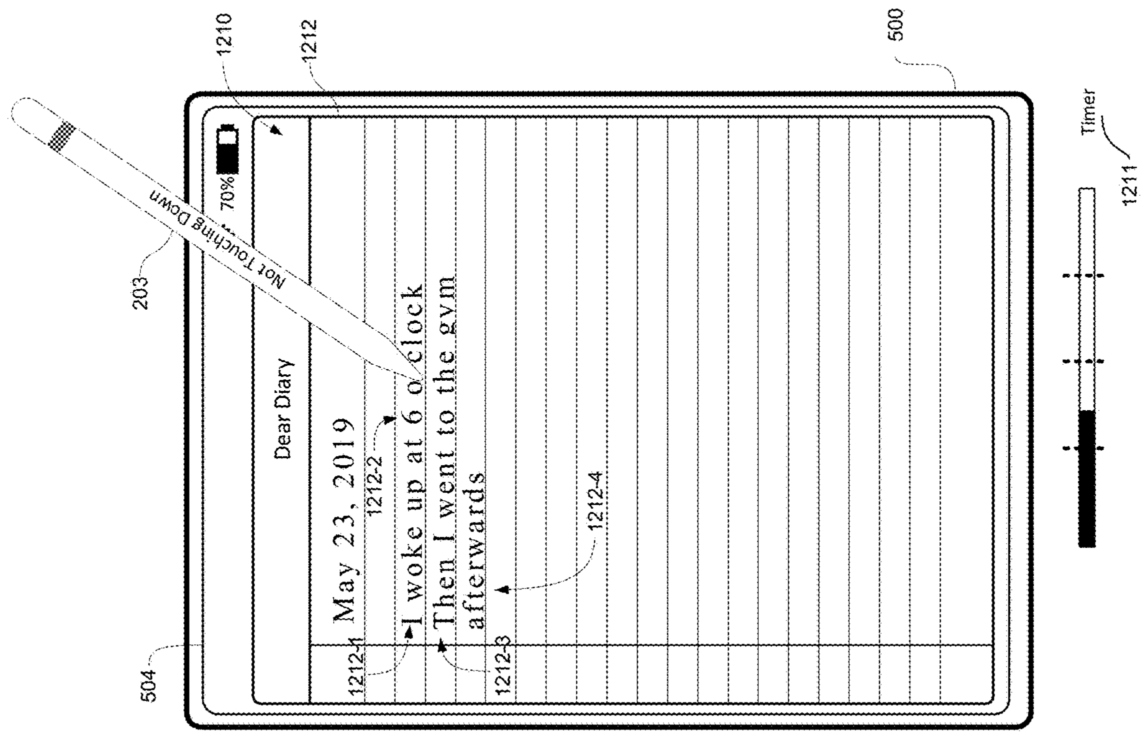
Figure 12R:
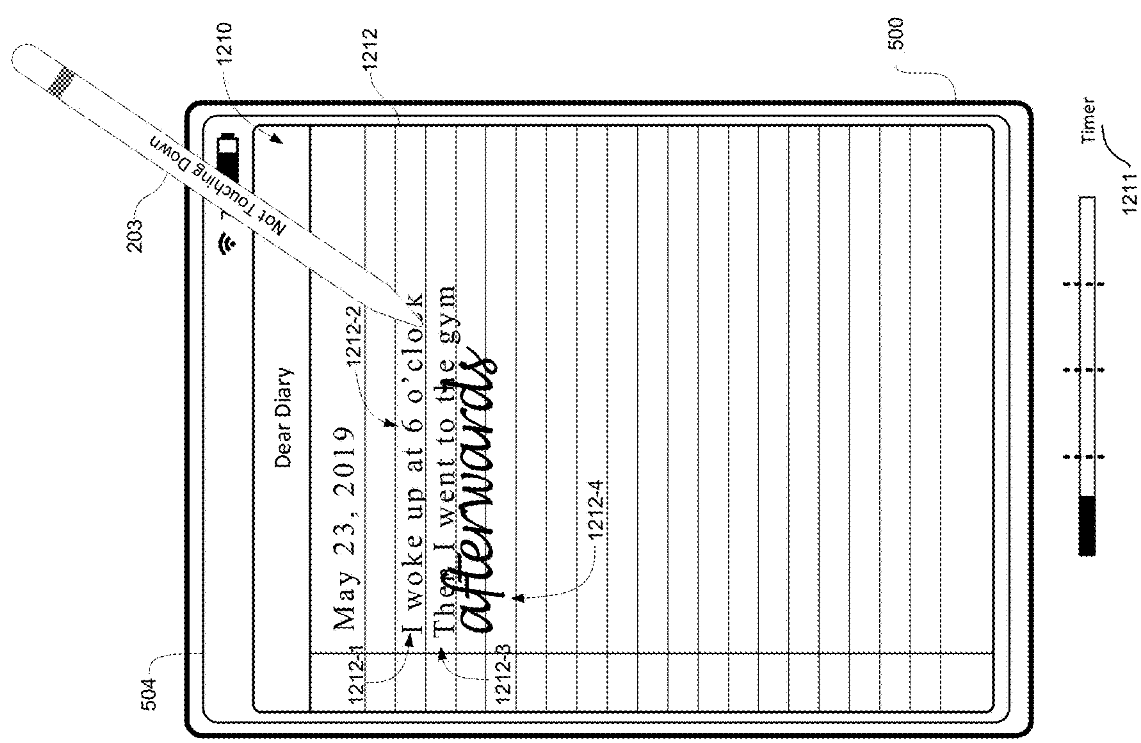
Figure 13A:
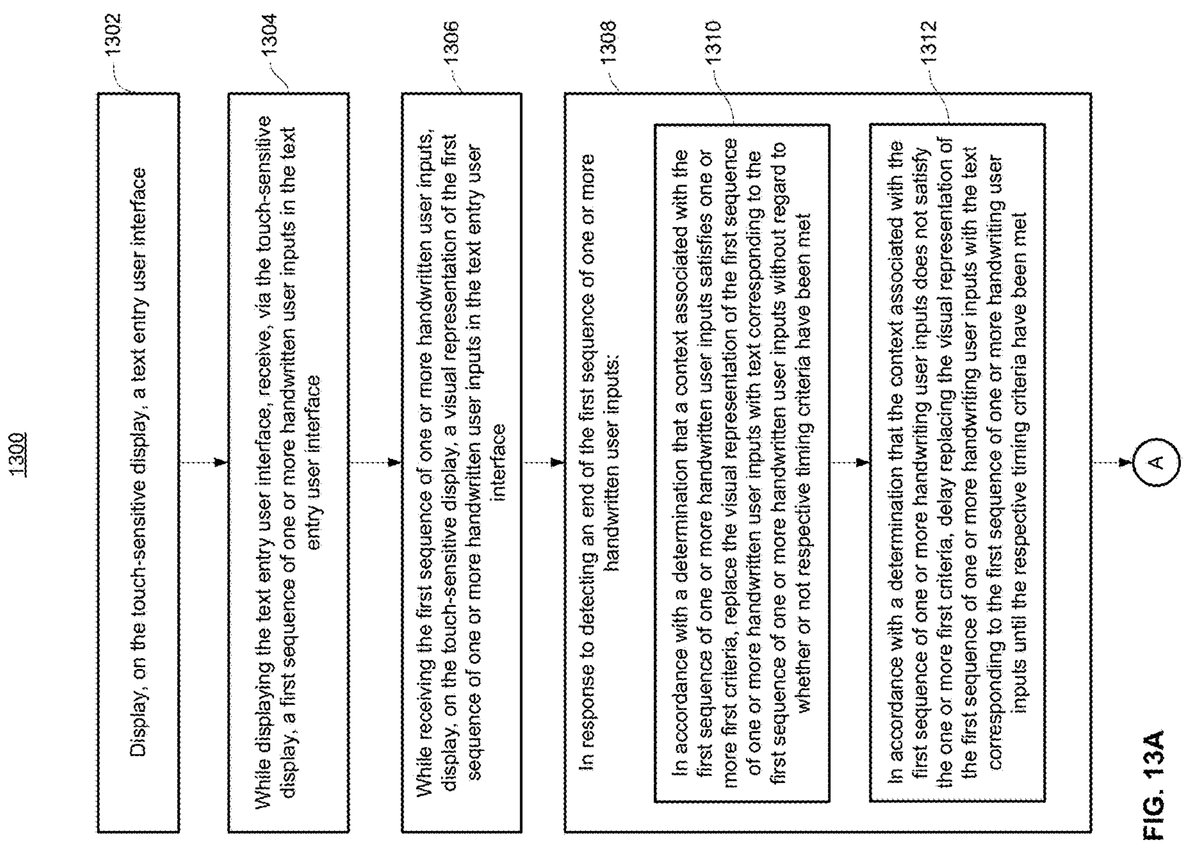
FIGS. 13A-13G are flow diagrams illustrating a method of managing the timing of converting handwritten text into font-based text in accordance with some embodiments.
Figure 13B:
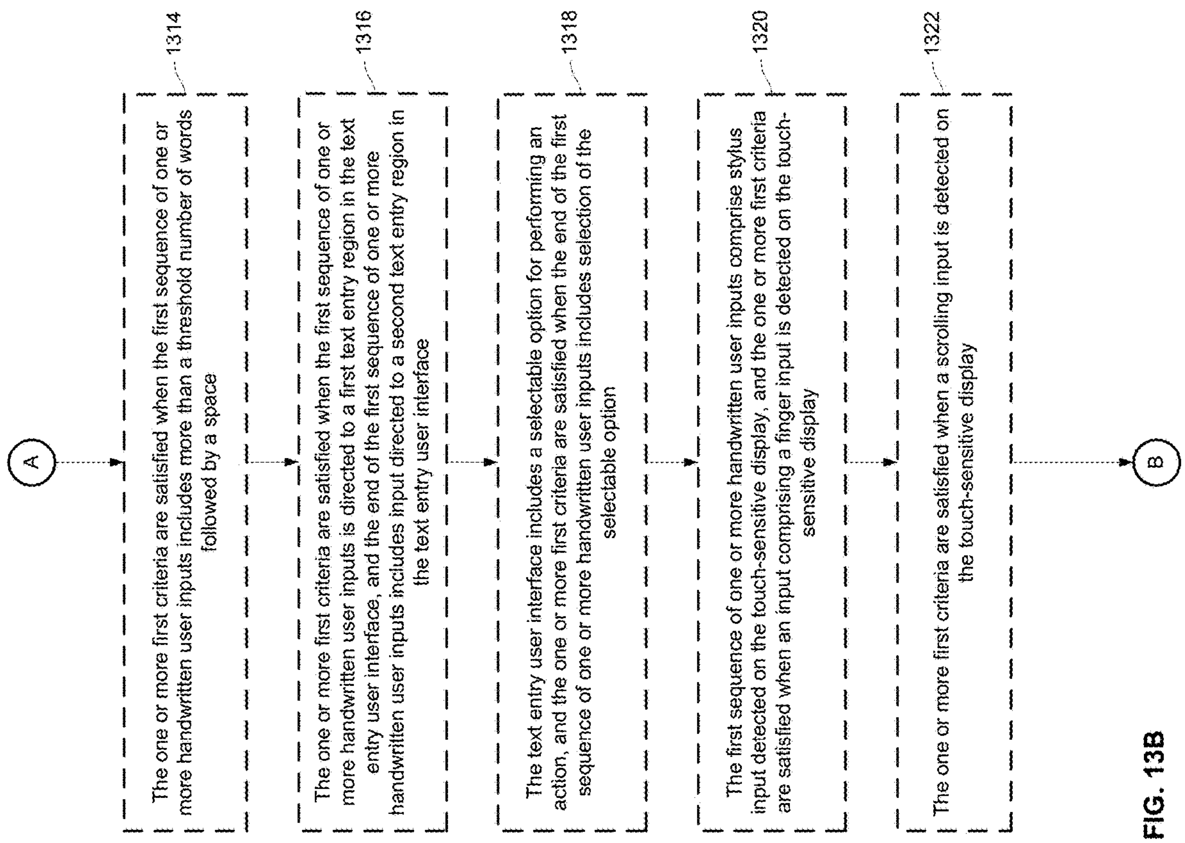
Figure 13C:
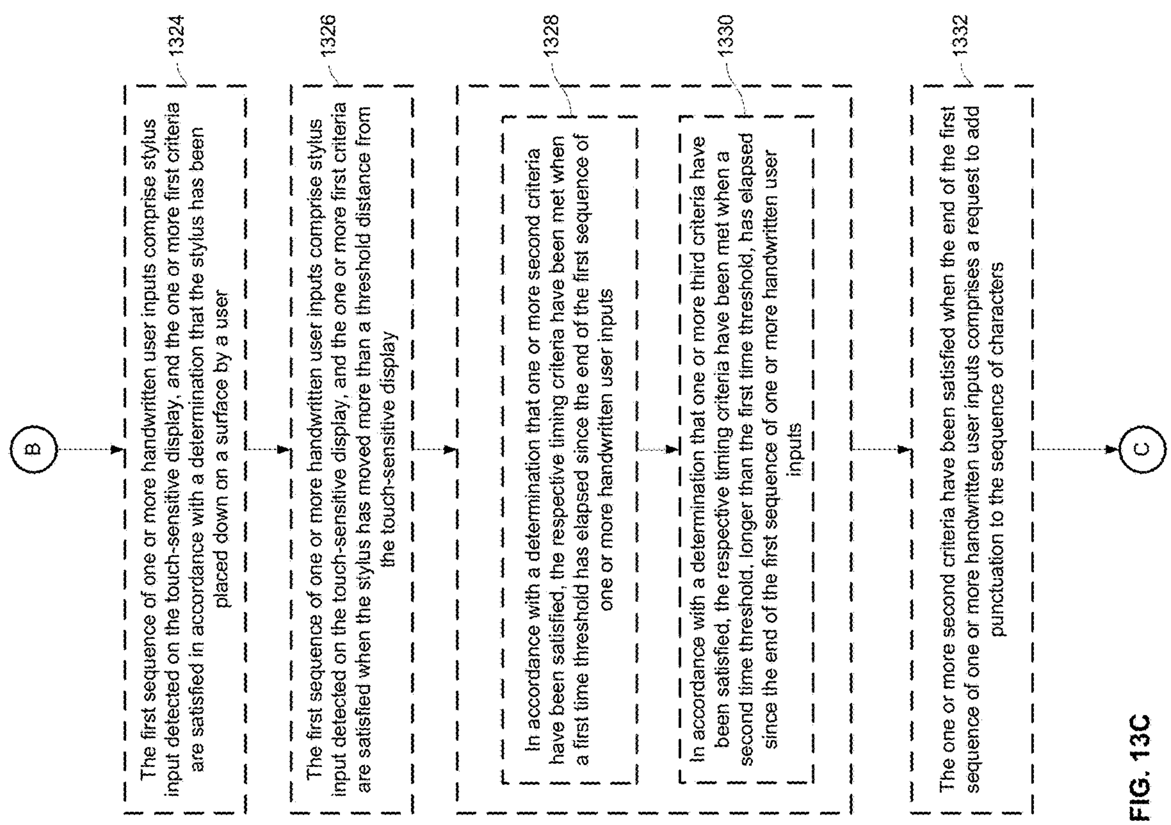
Figure 13D:
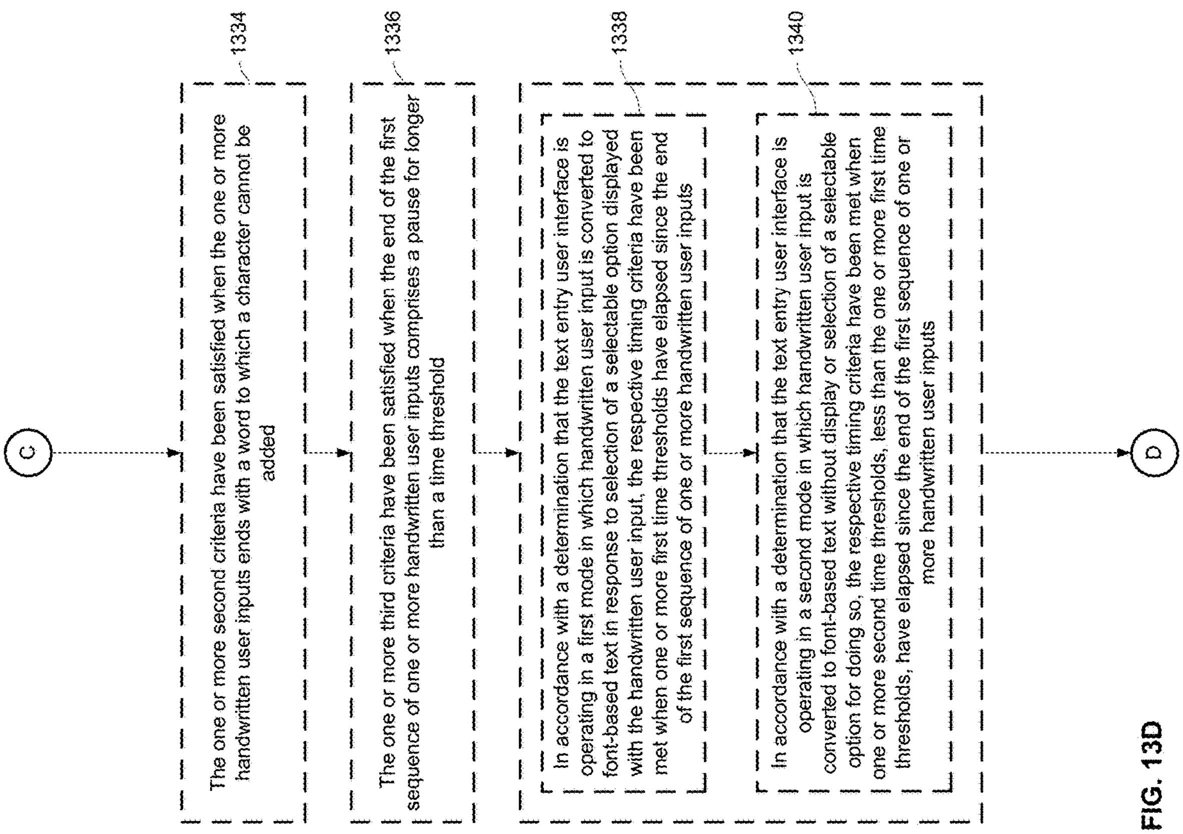
Figure 13E:
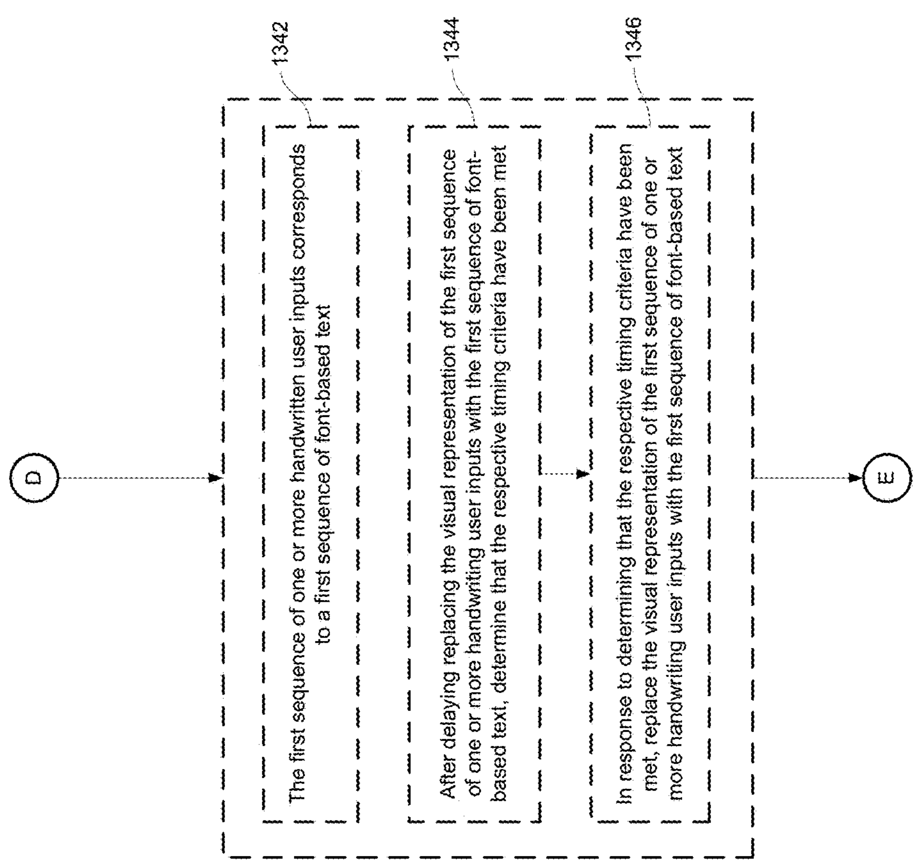
Figure 13F:
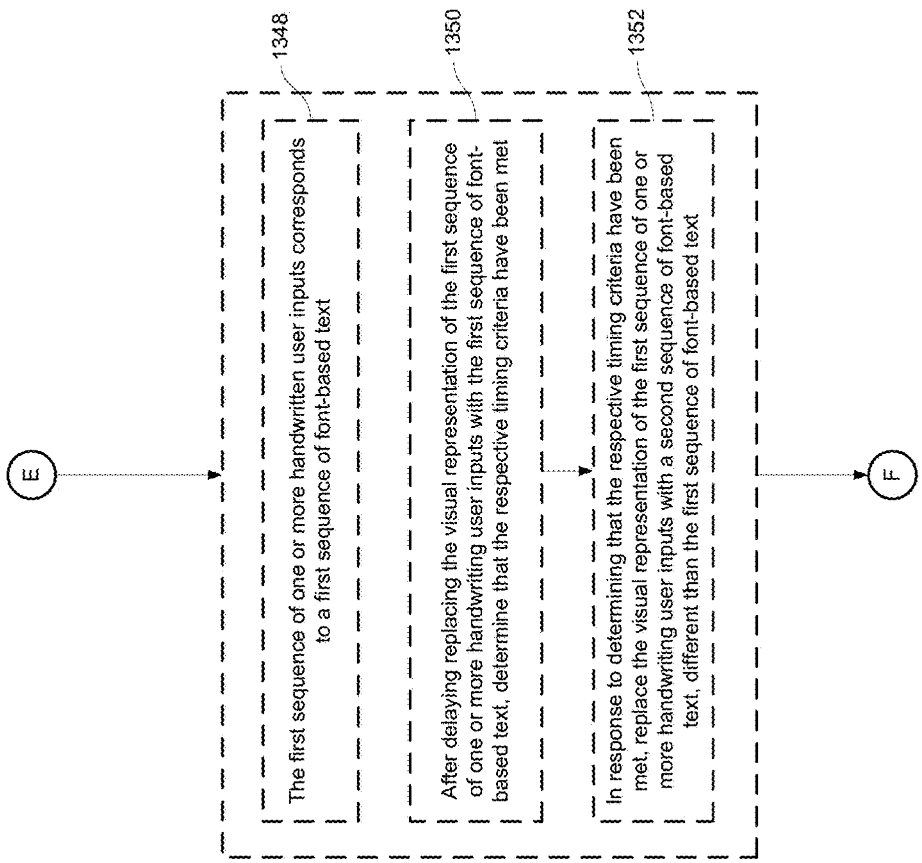

In FIG. 12Z, user interface 1200 is scrolled upwards to reveal additional text entry fields (e.g., text entry field 1202-11 to 1202-14) and selectable option 1206 (e.g., button). In FIG. 12AA, a user input is detected from stylus 203 entering handwritten input 1204-8 into text entry field 1202-12 (e.g., "New York"). In FIG. 12BB, lift-off of stylus 203 is detected and timer 1201 begins counting for converting handwritten input 1204-8 into font-based text. In FIG. 12CC, after detecting lift-off of stylus 203, user input is detected selecting selectable option 1206 using stylus 203. In some embodiments, in response to the user input selecting selectable option 1206, handwritten input 1204-8 is converted to font-based text without waiting for other predetermined conditions to be met (e.g., without regard to any timers that are being used to determine when to convert handwritten text into font-based text). Thus, in some embodiments, handwritten input is converted into font-based text when the user interacts with another user interface element (e.g., another text entry field, a selectable option, etc.) or performs a gesture or command other than entering text (e.g., scrolling the user interface, navigating the user interface, etc.).

FIGS. 12DD-12MM illustrate exemplary embodiments of converting handwritten input when device 500 is in a simultaneous conversion mode (e.g., a mode in which an entire sequence of letters or words are converted at one time after the user has completed the sequence of handwritten inputs). In FIG. 12DD, device 500 is displaying user interface 1210 corresponding to a note taking application. In some embodiments, user interface 1210 includes a text entry region 1212 in which a user is able to enter multiple lines of text. In FIG. 12EE, handwritten input 1212-1 is received in text entry region 1212. In FIG. 12FF, handwritten input 1212-1 continues to be received in text entry region, writing the four words "I woke up at". In some embodiments, handwritten input 1212-1 has not been converted into font-based text yet. In FIG. 12GG, a lift-off of stylus 203 is detected after writing the four words "I woke up at". In some embodiments, handwritten input 1212-1 is not converted into font-based text despite detecting a lift-off of stylus 203. In some embodiments, the lift-off of stylus 203 is the natural movement of the user in writing the next word after "at".

In FIG. 12HH, handwritten input 1212-2 is received in text region 1212 performing writing of the next word "6". In some embodiments, in response to receiving handwritten input 1212-2, handwritten input 1212-1 is converted to font-based text (e.g., the entire sequence of four words). In some embodiments, handwritten inputs are converted into font-based text after the user has written a threshold number of words (e.g., 4 words, 5 words, 6 words, etc.). In some embodiments, the conversion is triggered when the user has written the threshold number of words (e.g., after lift-off of writing the respective word), or after the user begins writing the next word (e.g., after receiving a handwritten input and determining that it is the beginning of the next word and not a continuation of the previous word, such as determining that the user has left a space after the previous word). In some embodiments, the conversion is performed after receiving the respective word (or alternatively after receiving the beginning of the next word) without regard to timers. In some embodiments, after receiving a threshold number of words, device 500 is able to determine that the user likely will not edit any previous handwritten words and converting the handwritten input would not be unduly disruptive or distracting. In some embodiments, converting the handwritten text after a threshold number of words, frees up additional space for the user to continue performing handwritten inputs.

In FIG. 12II, handwritten input 1212-3 is received in text entry region 1212 writing five words "Then I went to work". In the embodiment illustrated in FIG. 12II-12MM, the threshold number of words is greater than five such that receiving the five words of handwritten input 1212-3 does not cause conversion of the handwritten input at that time. Thus, as shown in FIG. 12JJ, lift-off of the stylus 203 is detected and timer 1211 begins counting for the conversion of handwritten input 1212-3. In some embodiments, as shown in FIG. 12JJ, when device 500 is in simultaneous conversion mode, the predetermined time delay for converting handwritten text is longer than either of the time delays for converting handwritten text in live conversion mode. In some embodiments, the predetermined time delay for converting handwritten text in simultaneous conversion mode is the same as the longer time delay for converting handwritten text in live conversion mode.

FIG. 12KK and FIG. 12LL illustrate timer 1211 counting upwards beyond the shorter predetermined time delay (e.g., used during live conversion mode) and the longer predetermined time delay (e.g., used during live conversion mode), while stylus 203 is not contacting touch screen 504 and without converting handwritten input 1212-3 into font-based text. In FIG. 12MM, timer 1211 has now satisfied the predetermined time delay for converting handwritten text in simultaneous conversion mode and handwritten input 1212-3 is converted into font-based text. In some embodiments, while in simultaneous conversion mode, and while waiting for timer 1211 to satisfy the predetermined time delay (e.g., while timer 1211 is still counting), a pop-up is displayed with a suggestion of the proposed font-based text, similar to pop-up 606 described above with respect to FIG. 6Q. In some embodiments, selecting the pop-up causes the conversion of the handwritten input 1212-3 without waiting for timer 1211 to satisfy the predetermined time delay.

FIGS. 12NN-12SS illustrate an exemplary method of resetting the timers used for converting handwritten inputs. It is understood that the method of resetting timers described here is applicable in both live and simultaneous conversion modes and to any timer or delay duration used for converting handwritten input. In FIG. 12NN, handwritten input 1212-4 is received in text entry region 1212. In FIG. 12OO, a lift-off of stylus 203 is detected and timer 1211 begins counting for the conversion of handwritten input 1212-4. In FIG. 12PP, stylus 203 is still not contacting touch screen 504 and timer 1211 has surpassed the shorter predetermined time delay (e.g., used during live conversion mode). In FIG. 12QQ, while timer 1211 is still counting, device 500 detects that stylus 203 has touched down and has continued performing handwritten input 1212-4, thus expanding the word "after" into the word "afterwards". As shown in FIG. 12QQ, in response to receiving the user input continuing to add to the word "after", timer 1211 resets to its initial position. In some embodiments, timer 1211 resets to its initial position when the user continues adding to a particular word. In some embodiments, timer 1211 resets to its initial position whenever the user continues handwritten input, even when it is of a new word (e.g., not a continuation of the previous word).

In FIG. 12RR, lift-off of stylus 203 is detected and timer 1211 begins counting again for the conversion of handwritten input 1212-4 into font-based text. In FIG. 12SS, after timer 1211 has reached the shorter predetermined time delay (e.g., because device 500 is now in live conversion mode and no additional letters can be added to "afterwards"), handwritten input 1212-4 is converted into font-based text.

FIGS. 13A-13G are flow diagrams illustrating a method 1300 of managing the timing of converting handwritten text into font-based text. The method 1300 is optionally performed at an electronic device such as device 100, device 300, device 500, device 501, device 510, and device 591 as described above with reference to FIGS. 1A-1B, 2-3, 4A-4B and 5A-5I. Some operations in method 1300 are, optionally combined and/or order of some operations is, optionally, changed As described below, the method 1300 provides ways to manage the timing of converting handwritten text into font-based text. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., an electronic device, a mobile device (e.g., a tablet, a smartphone, a media player, or a wearable device) including a touch screen, or a computer including a touch screen, such as device 100, device 300, device 500, device 501, or device 591) in communication with a touch-sensitive display displays (1302), on the touch-sensitive display, a text entry user interface, such as in FIG. 12A (e.g., a user interface with text fields in which a user is able to enter text). In some embodiments, text is entered into the text fields using a physical keyboard, a soft keyboard, or a stylus (e.g., such as described with reference to method 700).

In some embodiments, while displaying the text entry user interface, the electronic device receives (1304), via the touch-sensitive display, a first sequence of one or more handwritten user inputs in the text entry user interface, such as in FIG. 12B (e.g., receiving a handwritten input from a stylus on or near a text field in the text entry user interface). In some embodiments, the handwritten input is a sequence of one or more characters corresponding to one or more words in one or more sentences.

In some embodiments, while receiving the first sequence of one or more handwritten user inputs, the electronic device displays (1306), on the touch-sensitive display, a visual representation of the first sequence of one or more handwritten user inputs in the text entry user interface, such as in FIG. 12B (e.g., displaying the trail of the handwritten input on the display as the input is received). In some embodiments, as the user "draws" on the touch-sensitive display, the display shows the trail of the user's handwritten input at the location where the input was received.

In some embodiments, in response to detecting an end of the first sequence of one or more handwritten user inputs (1308) (e.g., any suitable termination of the sequence of handwritten user inputs), in accordance with a determination that a context associated with the first sequence of one or more handwritten user inputs satisfies one or more first criteria (e.g., text conversion criteria for converting handwritten input into font-based text without waiting for other predetermined conditions, for example.), the electronic device replaces (1310) the visual representation of the first sequence of one or more handwritten user inputs with text corresponding to the first sequence of one or more handwritten user inputs without regard to whether or not respective timing criteria have been met, such as in FIG. 12E (e.g., based on the user input, converting the handwritten input to computer text).

For example, if the user stops performing handwritten input (e.g., for a threshold amount of time, such as 1, 3 or 5 seconds), then the sequence of handwritten inputs is considered to have ended. In some embodiments, if the user completes writing a character, a word, or a sentence, the sequence of handwritten inputs is considered to have ended. In some embodiments, the handwritten input does not necessarily need to complete writing a sentence, a word, or a character, to be considered an end of the handwritten input. For example, if the user stops inputting mid-sentence, mid-word, or mid-character, the sequence of handwritten inputs is optionally considered terminated. In some embodiments, if another user input is detected while receiving handwritten input (e.g. or optionally between receiving handwritten words, characters, or sentences), the sequence of handwritten inputs is considered terminated.

For example, a triggering event optionally causes the handwritten input to be converted to computer text at that time, without waiting for other predetermined conditions to be met (e.g., without regard to any timers). In some embodiments, if a user enters handwritten input in one text field and selects another text field, the handwritten input in the first text field is converted to computer text. In some embodiments, if the user enters handwritten input and then interacts with another user interface element or scrolls the user interface, the handwritten input is converted to computer text. In some embodiments, if the user enters handwritten input using the stylus and subsequently interacts with the screen using a finger, the handwritten input is converted to computer text. In some embodiments, if the user enters handwritten input using the stylus and places the stylus down, moves the stylus away from the touch screen, or puts the stylus away (e.g., based on measurements from an accelerometer, gyroscope, or other positional and/or rotational sensing mechanism in the stylus), the handwritten input is converted to computer text.

In some embodiments, in response to detecting an end of the first sequence of one or more handwritten user inputs (1308) (e.g., any suitable termination of the sequence of handwritten user inputs), in accordance with a determination that the context associated with the first sequence of one or more handwriting user inputs does not satisfy the one or more first criteria, the electronic device delays (1312) replacing the visual representation of the first sequence of one or more handwriting user inputs with the text corresponding to the first sequence of one or more handwriting user inputs until the respective timing criteria have been met, such as in FIG. 12D and FIG. 12Q (e.g., based on the user input, using a timer of a predetermined length to convert handwritten inputs to computer text). In some embodiments, when handwritten input is paused for the predetermined length of time, then convert the handwritten input to font-based text. In some embodiments, after a word or letter has been received for a predetermined amount of time, convert the word or letter to font-based text. In some embodiments, different lengths of time are used to convert handwritten inputs to computer text depending on the context of the handwritten input. For example, a shorter timer (e.g., 0.5 seconds, 1 second, 2 seconds, 3 seconds, etc.) is used to convert text if the user pauses handwritten input after inputting a punctuation mark (e.g., a period). In some embodiments, a shorter timer is used after the user writes a word to which no additional letters can be added (e.g., no other words can be created by the addition of more letters). In some embodiments, a longer timer (e.g., 10 seconds, 5 seconds, 3 seconds, 2 seconds, 1.5 seconds, etc.) is used to convert if the user pauses handwritten input without satisfying one of the conditions for the shorter timer. For example, if the user pauses handwritten input in the middle of a sentence, then the system will wait for a longer length of time before converting the handwritten input into computer text. In some embodiments, if the conditions for converting text without waiting for other predetermined conditions to be met are not satisfied, the system will wait for a certain predetermined amount of time (e.g., wait for the other predetermined conditions to be met) before converting the text and, in some embodiments, the predetermined amount of time varies based on the context of the handwritten input. In some embodiments, further inputs received while the timer is counting down causes the timer to reset. For example, if the user pauses input in the middle of a sentence, the longer timer begins counting to convert the text, but before the timer reaches the longer threshold amount of time, the user resumes handwritten input, then the timer resets and waits until the user's next pause in or termination of handwritten input. Thus, in some embodiments, based on the characteristics of that additional input, the additional input is (or is not) added to the prior input when the prior input is converted.

The above-described manner of converting handwritten inputs to text (e.g., by converting to text under certain conditions and by delaying conversion for a certain amount of time under other conditions) allows the electronic device to convert text when it appears that the user has completed handwritten input (e.g., by converting the text in certain situations that indicates that the user has finished writing, and by not converting (or delaying the conversion) when it does not appear as if the user has completed writing), which simplifies the interaction between the user and the electronic device and enhances the operability of the electronic device and makes the user-device interface more efficient (e.g., by displaying to the user the results of his handwriting input as soon as possible (e.g., in situations in which it appears that the user has completed writing) without unduly distracting the user when the user appears to still be writing, without requiring the user to always wait for conversion even when the user has completed writing or to have text converted prematurely before the user has finished writing), which additionally reduces power usage and improves battery life of the electronic device by enabling the user to use the electronic device more quickly and efficiency while reducing errors in the usage of the device.

In some embodiments, the one or more first criteria are satisfied when the first sequence of one or more handwritten user inputs includes more than a threshold number of words followed by a space (1314), such as in FIG. 12HH (e.g., after the user has written a threshold number of words (e.g., 2 words, 3 words, 5 words, etc.) then convert the words into font-based text). In some embodiments, the conversion occurs upon the writing of the next word (e.g., if the threshold is 5 words, perform the conversion upon the recognition that a sixth word is being written). In some embodiments, the conversion occurs after the system recognizes that the user has completed writing the threshold number of words.

The above-described manner of converting handwritten inputs to text (e.g., by converting to font-based text after the user has written a threshold number of words) allows the electronic device to convert text after the user has written a certain number of words (e.g., by converting the text in a situation in which converting the word would not distract the user's handwriting input and balances the time delay before words are converted into font-based text), which simplifies the interaction between the user and the electronic device and enhances the operability of the electronic device and makes the user-device interface more efficient (e.g., by displaying to the user the results of his or her handwriting input as soon as possible while without unduly distracting the user when the user is still be writing, without requiring the user to wait for conversion even when the user has completed writing or to have text converted prematurely before the user has finished writing a word or sentence), which additionally reduces power usage and improves battery life of the electronic device by enabling the user to use the electronic device more quickly and efficiency while reducing errors in the usage of the device.

In some embodiments, the one or more first criteria are satisfied when the first sequence of one or more handwritten user inputs is directed to a first text entry region in the text entry user interface, and the end of the first sequence of one or more handwritten user inputs includes input directed to a second text entry region in the text entry user interface (1316), such as in FIG. 12E (e.g., converting handwritten input into font-based text when the user interacts with or otherwise indicates a request to enter text in another text entry region). For example, if a user selects another text entry region, then convert the text that was inputted in the first text entry region without waiting for other predetermined conditions to be met.

The above-described manner of converting handwritten inputs to text (e.g., by converting to font-based text after the user indicates a request to insert text in another text entry region) allows the electronic device to convert text after the user has completed handwritten input in a text entry region (e.g., by converting the text when the user signals that the user is completed entering handwritten text in the text entry region by selecting another text entry region to enter text into), which simplifies the interaction between the user and the electronic device and enhances the operability of the electronic device and makes the user-device interface more efficient (e.g., by displaying to the user the results of his or her handwriting input as soon as possible when the user appears to be finished inputting handwritten inputs in the first text entry region, without requiring the user to wait for conversion even when the user has completed writing), which additionally reduces power usage and improves battery life of the electronic device by enabling the user to use the electronic device more quickly and efficiency while reducing errors in the usage of the device.

In some embodiments, the text entry user interface includes a selectable option for performing an action, and the one or more first criteria are satisfied when the end of the first sequence of one or more handwritten user inputs includes selection of the selectable option (1318), such as in FIG. 12CC (e.g., if the user selects (e.g., actuates) a selectable option on the user interface, then convert the any inputted handwritten inputs into font-based text).

The above-described manner of converting handwritten inputs to text (e.g., by converting to font-based text after the user interacts with another user interface including selecting a selectable option) allows the electronic device to convert text after the user has completed handwritten input in a text entry region (e.g., by converting the text when the user signals that the user is completed entering handwritten text in the text entry region by selecting a selectable option), which simplifies the interaction between the user and the electronic device and enhances the operability of the electronic device and makes the user-device interface more efficient (e.g., by displaying to the user the results of his or her handwriting input as soon as possible when the user appears to be finished inputting handwritten inputs in the first text entry region, without requiring the user to wait for conversion even when the user has completed writing), which additionally reduces power usage and improves battery life of the electronic device by enabling the user to use the electronic device more quickly and efficiency while reducing errors in the usage of the device.

In some embodiments, the first sequence of one or more handwritten user inputs comprise stylus input detected on the touch-sensitive display, and the one or more first criteria are satisfied when an input comprising a finger input is detected on the touch-sensitive display (1320), such as in FIG. 12O (e.g., after receiving handwritten input from the stylus, convert the handwritten input when an input is detected from a finger).

The above-described manner of converting handwritten inputs to text (e.g., by converting to font-based text after the user interacts with the touch screen with a finger) allows the electronic device to convert text after the user has completed handwritten input in a text entry region (e.g., by converting the text when the user signals that the user is completed entering handwritten text in the text entry region by switching to using a finger instead of the stylus), which simplifies the interaction between the user and the electronic device and enhances the operability of the electronic device and makes the user-device interface more efficient (e.g., by displaying to the user the results of his or her handwriting input as soon as possible when the user appears to be finished inputting handwritten inputs in the first text entry region, without requiring the user to wait for conversion even when the user has completed writing), which additionally reduces power usage and improves battery life of the electronic device by enabling the user to use the electronic device more quickly and efficiency while reducing errors in the usage of the device.

In some embodiments, the one or more first criteria are satisfied when a scrolling input is detected on the touch-sensitive display (1322), such as in FIG. 12I (e.g., after receiving handwritten input, detecting a scrolling input or gesture on the user interface). In some embodiments, if the user interacts with a different user interface element after inputting handwritten input into the first text entry user interface. For example, if the user performs a scrolling gesture or otherwise inputs a request to scroll or navigate the user interface, then the user is signaling that he has completed handwritten input in the first text entry user interface such that the previously inputted handwritten input should be converted without waiting for other predetermined conditions to be met.

The above-described manner of converting handwritten inputs to text (e.g., by converting to font-based text after the user performs a scrolling input) allows the electronic device to convert text after the user has completed handwritten input in a text entry region (e.g., by converting the text when the user signals that the user is completed entering handwritten text in the text entry region by performing a scrolling input), which simplifies the interaction between the user and the electronic device and enhances the operability of the electronic device and makes the user-device interface more efficient (e.g., by displaying to the user the results of his or her handwriting input as soon as possible when the user appears to be finished inputting handwritten inputs in the first text entry region, without requiring the user to wait for conversion even when the user has completed writing), which additionally reduces power usage and improves battery life of the electronic device by enabling the user to use the electronic device more quickly and efficiency while reducing errors in the usage of the device.

In some embodiments, the first sequence of one or more handwritten user inputs comprise stylus input detected on the touch-sensitive display, and the one or more first criteria are satisfied in accordance with a determination that the stylus has been placed down on a surface by a user (1324), such as in FIG. 12L (e.g., after the user has performed handwritten input, convert the handwritten input into font-based text when it is determined that the user has placed the stylus down). In some embodiments, the stylus has one or more sensors (e.g., gyroscope, accelerometer, etc.) to detect position, direction, speed, angle, etc. In some embodiments, the stylus is able to communicate data from the one or more sensors to the system such that the stylus and/or system is able to determine that the stylus has been placed on a table or otherwise stowed away. In some embodiments, the stylus and/or device determines that the stylus has been placed down if the user is no longer holding or touching the stylus.

The above-described manner of converting handwritten inputs to text (e.g., by converting to font-based text after the user places the stylus down) allows the electronic device to convert text after the user has completed handwritten input in a text entry region (e.g., by converting the text when the user signals that the user is completed entering handwritten text in the text entry region by placing the stylus down), which simplifies the interaction between the user and the electronic device and enhances the operability of the electronic device and makes the user-device interface more efficient (e.g., by displaying to the user the results of his or her handwriting input as soon as possible when the user appears to be finished inputting handwritten inputs in the first text entry region, without requiring the user to wait for conversion even when the user has completed writing), which additionally reduces power usage and improves battery life of the electronic device by enabling the user to use the electronic device more quickly and efficiency while reducing errors in the usage of the device.

In some embodiments, the first sequence of one or more handwritten user inputs comprise stylus input detected on the touch-sensitive display, and the one or more first criteria are satisfied when the stylus has moved more than a threshold distance (e.g., 0.5 cm, 1 cm, 3 cm, 5 cm) from the touch-sensitive display (1326), such as in FIG. 12L (e.g., after the user has performed handwritten input, convert the handwritten input into font-based text when it is determined that the user has moved the stylus away a certain distance away from the display). In other words, in some examples, if the user pauses handwritten input and moves the stylus a certain threshold distance away, the user is signaling that the user has completed handwritten input or will pause handwritten input.

The above-described manner of converting handwritten inputs to text (e.g., by converting to font-based text after the user moves the stylus a threshold distance away from the touch screen) allows the electronic device to convert text after the user has completed or is pausing handwritten input in a text entry region (e.g., by converting the text when the user signals that the user is completed entering handwritten text in the text entry region or has paused handwritten input in the text entry region by moving the stylus a threshold distance away from the touch screen), which simplifies the interaction between the user and the electronic device and enhances the operability of the electronic device and makes the user-device interface more efficient (e.g., by displaying to the user the results of his or her handwriting input as soon as possible when the user appears to be finished or appears to have paused inputting handwritten inputs in the first text entry region, without requiring the user to wait for conversion even when the user has completed writing), which additionally reduces power usage and improves battery life of the electronic device by enabling the user to use the electronic device more quickly and efficiency while reducing errors in the usage of the device.

In some embodiments, in accordance with a determination that one or more second criteria have been satisfied, the respective timing criteria have been met when a first time threshold has elapsed since the end of the first sequence of one or more handwritten user inputs (1328), such as in FIG. 12V (e.g., in some embodiments, using a shorter timer (e.g., 0.5 second, 1 second, 2 seconds, 3 seconds) to convert handwritten input into font-based text). For example, if the user writes a word in which no further letters can be added, then convert the word after a shorter time delay. In another example, if the user inputs a punctuation mark, then convert the handwritten text up to and including the punctuation mark after a shorter time delay.

In some embodiments, in accordance with a determination that one or more third criteria have been satisfied, the respective timing criteria have been met when a second time threshold, longer than the first time threshold, has elapsed since the end of the first sequence of one or more handwritten user inputs (1330), such as in FIG. 12S (e.g., in some embodiments, using a longer timer (e.g., 1 second, 2 seconds, 3 seconds, 5 seconds, 10 seconds) to convert handwritten input into font-based text). For example, if the user writes a word (which does not include a punctuation mark and further letters can be added), then convert the word into font-based text after a longer time delay.

The above-described manner of converting handwritten inputs to text (e.g., by converting to font-based text after a predetermined amount of timer based on the context of the handwritten input) allows the electronic device to convert text after the user has likely completed writing a word or at a point that is least intrusive (e.g., by using a shorter timer to convert text in certain situations when the user has likely completed writing a word or sentence and by using a longer timer to convert text in situations when a user potentially could input further letters or words), which simplifies the interaction between the user and the electronic device and enhances the operability of the electronic device and makes the user-device interface more efficient (e.g., by converting handwritten input at a time when it is least intrusive while providing the user the opportunity to continue writing even if the user has momentarily paused writing), which additionally reduces power usage and improves battery life of the electronic device by enabling the user to use the electronic device more quickly and efficiency while reducing errors in the usage of the device.

In some embodiments, the one or more second criteria have been satisfied when the end of the first sequence of one or more handwritten user inputs comprises a request to add punctuation to the sequence of characters (1332), such as in FIG. 12W (e.g., using a shorter timer to convert handwritten input into font-based text when the handwritten input includes a punctuation). For example, if the user writes a sentence and includes a period, then after a shorter delay, convert the sentence into font-based text.

The above-described manner of converting handwritten inputs to text (e.g., by converting to font-based text after a shorter timer delay after detecting that the user has input punctuation) allows the electronic device to convert text after the user has likely completed writing a word or at a point that is least intrusive (e.g., by using a shorter timer to convert text when the user has input a punctuation and it is likely that the user has completed writing a word or sentence), which simplifies the interaction between the user and the electronic device and enhances the operability of the electronic device and makes the user-device interface more efficient (e.g., by converting handwritten input at a time when it is least intrusive and likely to have completed writing a word or sentence), which additionally reduces power usage and improves battery life of the electronic device by enabling the user to use the electronic device more quickly and efficiency while reducing errors in the usage of the device.

In some embodiments, the one or more second criteria have been satisfied when the one or more handwritten user inputs ends with a word to which a character cannot be added (1334), such as in FIG. 12T (e.g., if the user writes a word in which no further letters can be added, then use a shorter timer before converting the handwritten input into font-based text.).

The above-described manner of converting handwritten inputs to text (e.g., by converting to font-based text after detecting a word in which no further characters can be added) allows the electronic device to convert text after the user has likely completed writing a word (e.g., by using a shorter timer to convert text when the user has input a word in which no further letters can be added and it is likely that the user has completed writing the word), which simplifies the interaction between the user and the electronic device and enhances the operability of the electronic device and makes the user-device interface more efficient (e.g., by converting handwritten input at a time when it is least intrusive and likely to have completed writing a word), which additionally reduces power usage and improves battery life of the electronic device by enabling the user to use the electronic device more quickly and efficiency while reducing errors in the usage of the device.

In some embodiments, the one or more third criteria have been satisfied when the end of the first sequence of one or more handwritten user inputs comprises a pause for longer than a time threshold (1336), such as in FIG. 12S (e.g., 1, 2, 3 seconds). In some embodiments, the third criteria is satisfied if the first criteria (for conversion at that time) and second criteria (for conversion after a delay) are not satisfied.

The above-described manner of converting handwritten inputs to text (e.g., by converting to font-based text after a longer timer if no other criteria for faster conversion is satisfied) allows the electronic device to convert text after a certain time delay (e.g., by using a longer timer to convert text when none of the other faster conversion situations apply), which simplifies the interaction between the user and the electronic device and enhances the operability of the electronic device and makes the user-device interface more efficient (e.g., by ensuring that handwritten input is converted without too much delay without requiring the user to perform additional inputs to cause the conversion of the handwritten input), which additionally reduces power usage and improves battery life of the electronic device by enabling the user to use the electronic device more quickly and efficiency.

In some embodiments, in accordance with a determination that the text entry user interface is operating in a first mode in which handwritten user input is converted to font-based text in response to selection of a selectable option displayed with the handwritten user input, the respective timing criteria have been met when one or more first time thresholds have elapsed since the end of the first sequence of one or more handwritten user inputs (1338), such as in FIG. 12MM (e.g., in a first mode of operation, handwritten inputs are converted at one time after the completion or termination of handwritten input (e.g., "simultaneous conversion" or "simultaneous commit" mode)). In some embodiments, a selectable option is presented to the user of the suggested conversion (e.g., of font-based text) of the handwritten input. In some embodiments, selection of the selectable option causes the handwritten input to be converted into the suggested font-based text. In some embodiments, if the selectable option is not selected, then after a longer time period (e.g., 1.5 seconds, 3.5 seconds, 5 seconds, 10 seconds), the entirety of the handwritten text is converted into font-based text. In some embodiments, the above-described "simultaneous conversion" or "simultaneous commit" mode of converting handwritten text is performed without displaying the selectable option and conversion occurs after the longer time period elapses (e.g., the user is not presented with the option to select the selectable option to cause conversion).

In some embodiments, in accordance with a determination that the text entry user interface is operating in a second mode in which handwritten user input is converted to font-based text without display or selection of a selectable option for doing so, the respective timing criteria have been met when one or more second time thresholds, less than the one or more first time thresholds, have elapsed since the end of the first sequence of one or more handwritten user inputs (1340), such as in FIG. 12S (e.g., in a second mode of operation, handwritten inputs are converted as the handwritten input is received (e.g., "live commit" mode)). In some embodiments, different time thresholds are used to convert handwritten input into font-based text based on the context of the handwritten input. In some embodiments, each handwritten word is converted based on its own timer (e.g., 0.5 seconds, 1 second, 2 seconds from the completion of the respective word).

The above-described manner of converting handwritten inputs to text (e.g., by providing two modes of conversion, one in which inputs are converted as they are received and confirmed and one in which the entire handwritten input is converted after all inputs have been completed) allows the electronic device to convert according to two different conversion modes (e.g., by providing two conversion modes based on which mode is most appropriate for the situation), which simplifies the interaction between the user and the electronic device and enhances the operability of the electronic device and makes the user-device interface more efficient (e.g., by providing different conversion modes and deploying the mode that is more appropriate for the text insertion situation), which additionally reduces power usage and improves battery life of the electronic device by enabling the user to use the electronic device more quickly and efficiency.

In some embodiments, the first sequence of one or more handwritten user inputs corresponds to a first sequence of font-based text (1342), such as in FIG. 12P. In some embodiments, after delaying replacing the visual representation of the first sequence of one or more handwriting user inputs with the first sequence of font-based text, the electronic device determines (1344) that the respective timing criteria have been met, such as in FIG. 12S (after receiving the handwritten input, delaying for the respective time period (e.g., based on the respective timer that is used based on the context).

In some embodiments, in response to determining that the respective timing criteria have been met, the electronic device replaces (1346) the visual representation of the first sequence of one or more handwriting user inputs with the first sequence of font-based text, such as in FIG. 12S (e.g., converting the handwritten input into font-based text). In some embodiments, after delaying the conversion process due to the use of the timers, the converted font-based text is the same font-based text that the handwritten text would have been converted into had the conversion criteria (e.g., non-timer-based conversion criteria) been satisfied (e.g., selecting another text entry region, selecting a selectable option, scrolling the user interface, etc.). For example, if the user completes writing a word in a respective text field and instead of performing a non-timer-based conversion input trigger, pauses input for a threshold amount of time, the handwritten input is converted into font-based text.

The above-described manner of converting handwritten inputs to text (e.g., by converting handwritten text to the same resulting font-based text regardless of whether the conversion occurs as a result of satisfying a non-timer-based conversion criteria or as a result of the satisfaction of a timer-based conversion criteria) allows the electronic device to provide the user with consistent and reliable conversion of handwritten text (e.g., by ensuring that conversion without the use of a timer results in the same font-based text as timer-based conversion), which simplifies the interaction between the user and the electronic device and enhances the operability of the electronic device and makes the user-device interface more efficient (e.g., by providing different conversion modes and deploying the mode that is more appropriate for the text insertion situation), which additionally reduces power usage and improves battery life of the electronic device by enabling the user to use the electronic device more quickly and efficiency.

In some embodiments, the first sequence of one or more handwritten user inputs corresponds to a first sequence of font-based text (1348), such as in FIG. 12P. In some embodiments, after delaying replacing the visual representation of the first sequence of one or more handwriting user inputs with the first sequence of font-based text, the electronic device determines (1350) that the respective timing criteria have been met, such as in FIG. 12S (e.g., after receiving the handwritten input, delaying for the respective time period (e.g., based on the respective timer that is used based on the context).

In some embodiments, in response to determining that the respective timing criteria have been met, the electronic device replaces (1352) the visual representation of the first sequence of one or more handwriting user inputs are of font-based text, different than the first sequence of font-based text, such as in FIG. 6H (e.g., converting the handwritten input into font-based text that is different from the font-based text that the handwritten text would have been converted into had the non-timer-based conversion criteria been satisfied (e.g., selecting another text entry region, selecting a selectable option, scrolling the user interface, etc.)). For example, the handwritten input includes one or more typographical errors (e.g., spelling errors, grammatical errors), and the one or more typographical errors are corrected when the handwritten input is converted into font-based text. In some embodiments, delaying the conversion of handwritten input provides the system with more information on what the user intended to write (e.g., from further context of the handwriting input), thus increasing the confidence in the identification and correction of errors in the handwritten input.

The above-described manner of converting handwritten inputs to text (e.g., by converting handwritten text to font-based text while simultaneously and automatically correcting identified errors in the handwritten text) allows the electronic device to automatically correct user errors in the handwritten text (e.g., by identifying errors in the handwritten text and automatically correct the errors during the process of converting the handwritten input to font-based text), which simplifies the interaction between the user and the electronic device and enhances the operability of the electronic device and makes the user-device interface more efficient (e.g., by automatically correcting errors in the user's handwritten input without requiring the user to perform additional inputs or navigate to a separate user interface to correct the errors after the conversion to font-based text), which additionally reduces power usage and improves battery life of the electronic device by enabling the user to use the electronic device more quickly and efficiency while reducing errors in the usage of the device.

In some embodiments, the first sequence of one or more handwritten user inputs corresponds to a first sequence of font-based text (1354), such as in FIG. 12NN. In some embodiments, after delaying replacing the visual representation of the first sequence of one or more handwriting user inputs with the first sequence of font-based text, the electronic device detects (1356), via the touch-sensitive display, a second sequence of one or more handwriting user inputs corresponding to a second sequence of font-based text, such as in FIG. 12QQ (e.g., after receiving the first sequence of handwriting inputs, receiving a second sequence of handwritten inputs). In some embodiments, the timer that was pending for the first sequence of handwritten inputs resets when the second sequence of handwritten inputs is received. In some embodiments, the timer continues counting despite the detection of the second sequence of handwritten inputs.

In some embodiments, in response to detecting the second sequence of one or more handwriting user inputs, the electronic device displays (1358), with the visual representation of the first sequence of one or more handwriting user inputs, a visual representation of the second sequence of one or more handwriting user inputs, such as in FIG. 12QQ. In some embodiments, after displaying the visual representation of the second sequence of one or more handwriting user inputs, the electronic device determines (1360) that the respective timing criteria have been met, such as in FIG. 12SS (e.g., after receiving the first and second handwritten input, delaying for the respective time period (e.g., based on the respective timer that is used based on the context)). In some embodiments, the respective timer is the timer for the first sequence of handwritten inputs and did not reset after receiving the second sequence of handwritten inputs. In some embodiments, the respective timer was reset after receiving the second sequence of handwritten inputs.

In some embodiments, in response to determining that the respective timing criteria have been met (1362), the electronic device replaces (1364) the visual representation of the first sequence of one or more handwriting user inputs with the first sequence of font-based text, such as in FIG. 12SS (e.g., converting the first sequence of handwritten input into the font-based text that corresponds to the first sequence of handwritten inputs).

In some embodiments, in response to determining that the respective timing criteria have been met (1362), the electronic device replaces (1366) the visual representation of the second sequence of one or more handwriting user inputs with the second sequence of font-based text, such as in FIG. 12SS (e.g., converting the second sequence of handwritten input into the font-based text that corresponds to the second sequence of handwritten inputs). In some embodiments, the conversion of the second sequence of handwritten inputs is accelerated because the second sequence of handwritten inputs was received before the timer for the first sequence of handwritten inputs elapsed. Conversely, in some embodiments, the conversion of the first sequence of handwritten inputs is delayed because the receipt of the second sequence of handwritten inputs caused the timer to reset to the timer used to convert the second sequence of handwritten inputs and both the first and second sequence of handwritten inputs are converted at the same time based on the reset timer.

The above-described manner of converting handwritten inputs to text (e.g., by converting a first sequence of handwritten input and a second sequence of handwritten input simultaneously based on a single timer) allows the electronic device to combine text conversion operations and reduce the disruption to the user (e.g., by converting the first and second sequence of handwritten inputs at the same time based on the timer for the first sequence of handwritten inputs or a timer that was reset when the second sequence of handwritten inputs was received), which simplifies the interaction between the user and the electronic device and enhances the operability of the electronic device and makes the user-device interface more efficient (e.g., by converting both sequences of handwritten input at the same time without requiring the user to wait for the conversion of both sequences of handwritten input), which additionally reduces power usage and improves battery life of the electronic device by enabling the user to use the electronic device more quickly and efficiency while reducing errors in the usage of the device.

It should be understood that the particular order in which the operations in FIGS. 13A-13G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1500, 1600, 1800, 2000, and 2200) are also applicable in an analogous manner to method 1300 described above with respect to FIGS. 13A-13G. For example, the operation of managing the timing of converting handwritten inputs into font-based text described above with reference to method 1300 optionally have one or more of the characteristics of the acceptance and/or conversion of handwritten inputs, selection and deletion of text, inserting handwritten inputs into pre-existing text, presenting handwritten entry menus, controlling the characteristics of handwritten input, presenting autocomplete suggestions, and converting handwritten input to font-based text, displaying options in a content entry palette, etc., described herein with reference to other methods described herein (e.g., methods 700, 900, 1100, 1500, 1600, 1800, 2000, and 2200). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 13A-13G are, optionally, implemented by components depicted in FIGS. 1A-1B. For example, displaying operations 1302, 1306, and 1358, and receiving operations 1304 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Handwriting Entry Menus

Users interact with electronic devices in many different manners, including entering text into the electronic device. In some embodiments, an electronic device displays a user interface that accepts both textual and graphical inputs. The embodiments described below provide ways in which an electronic device displays input control menus for controlling user inputs into text fields that accept both textual and graphical inputs. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 14A:
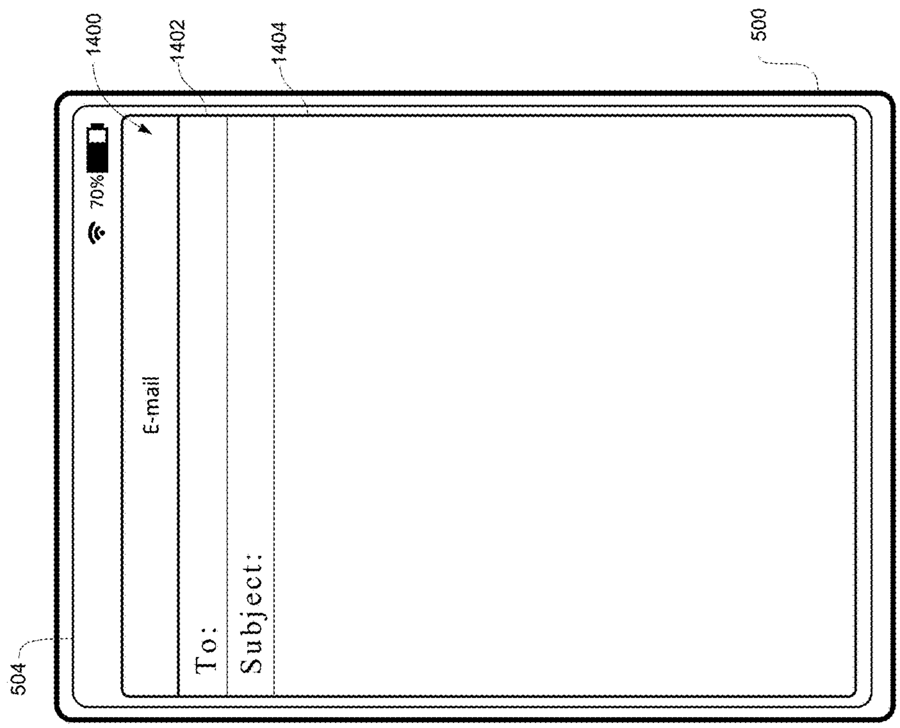
FIGS. 14A-14V illustrate exemplary ways in which an electronic device presents handwritten entry menus in accordance with some embodiments.
Figure 13G:
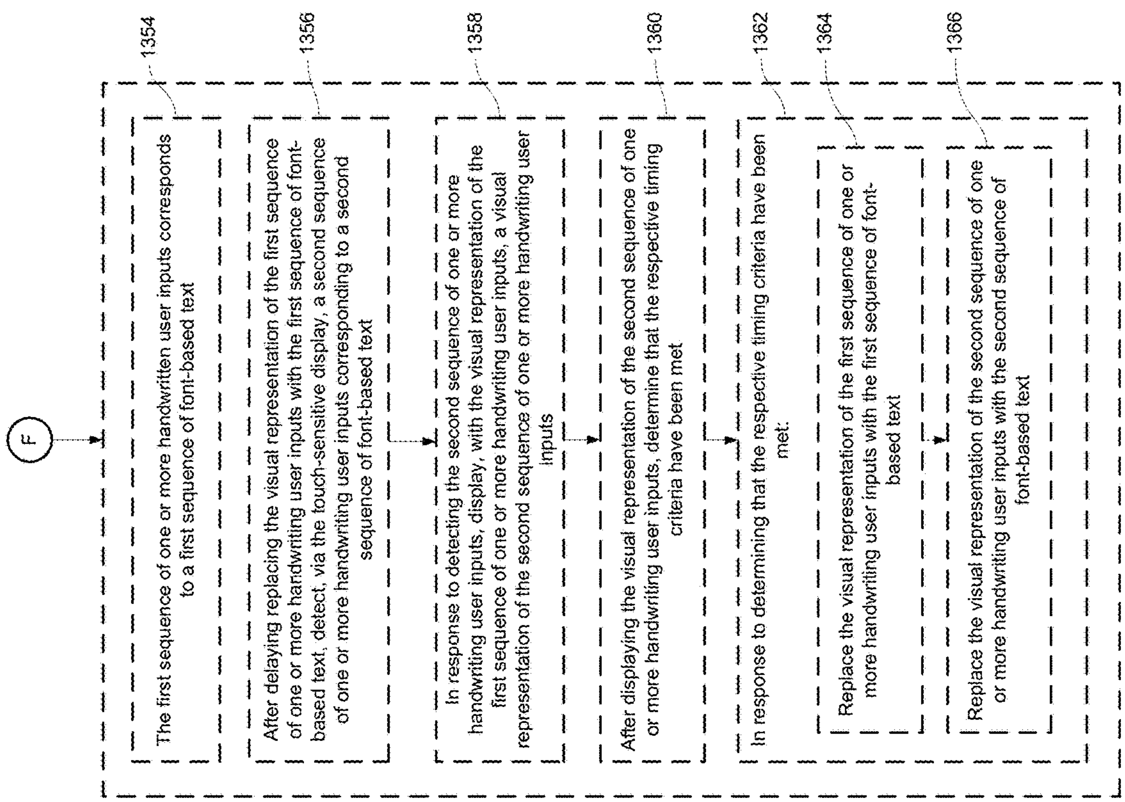
Figure 14C:
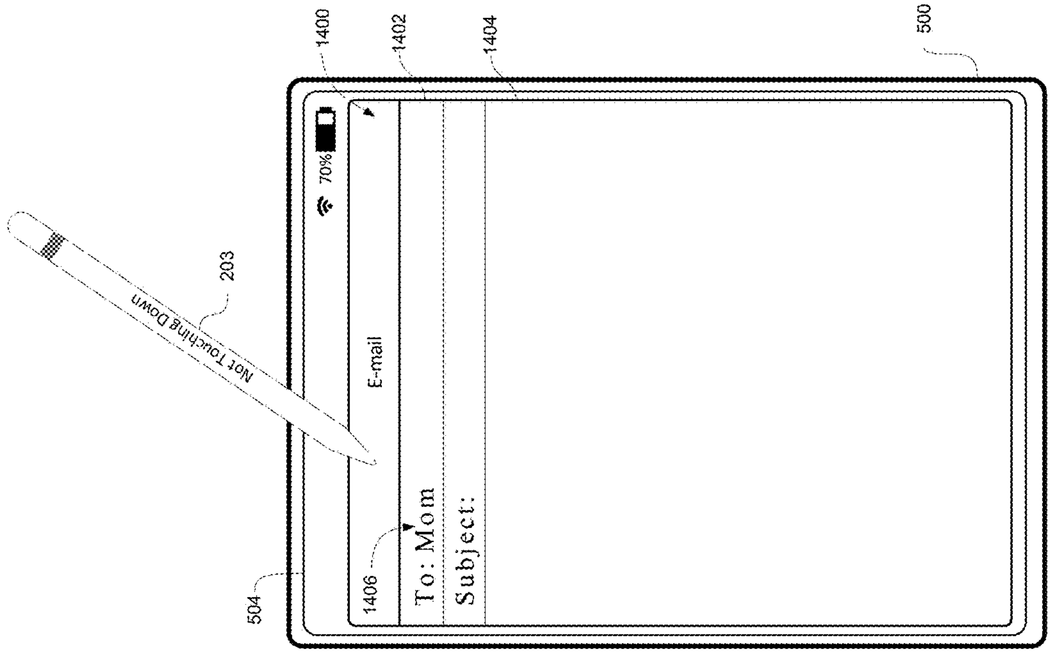
Figure 14B:
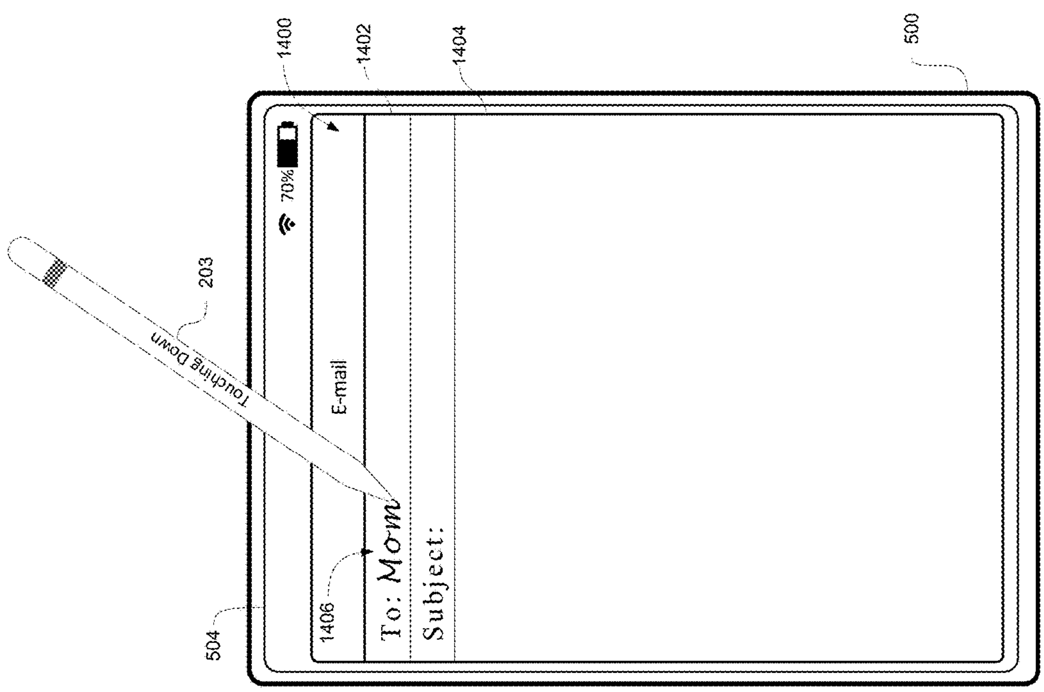
Figure 14E:
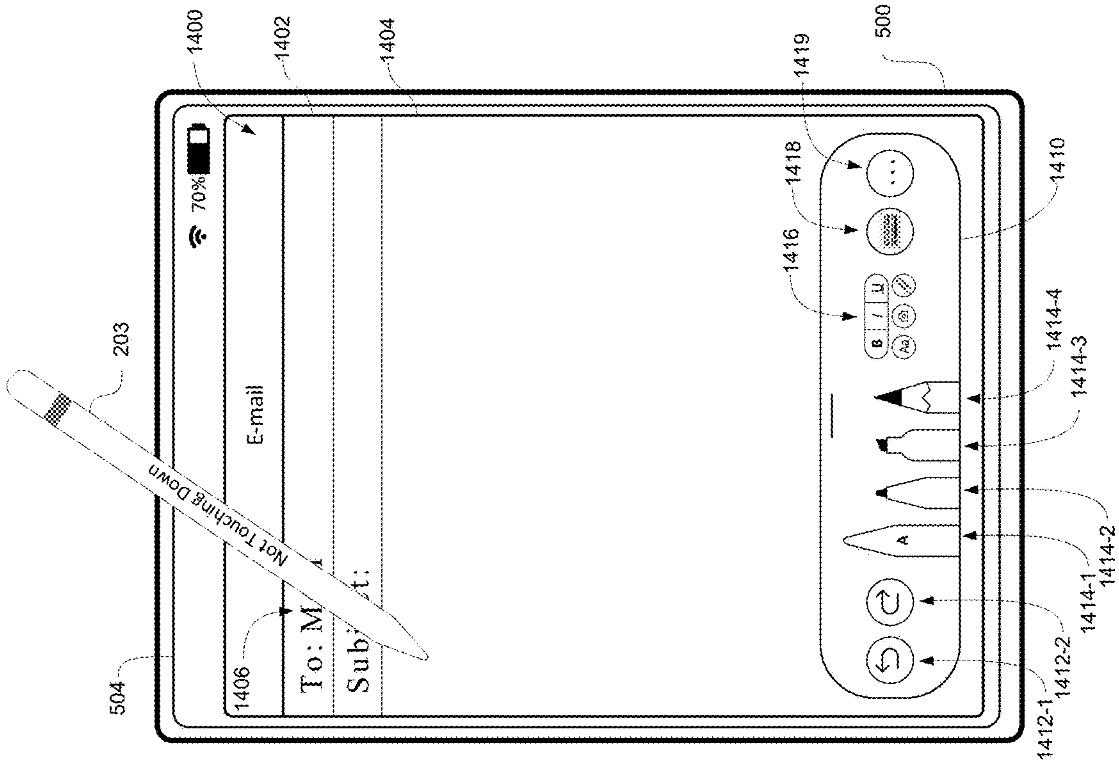
Figure 14D:
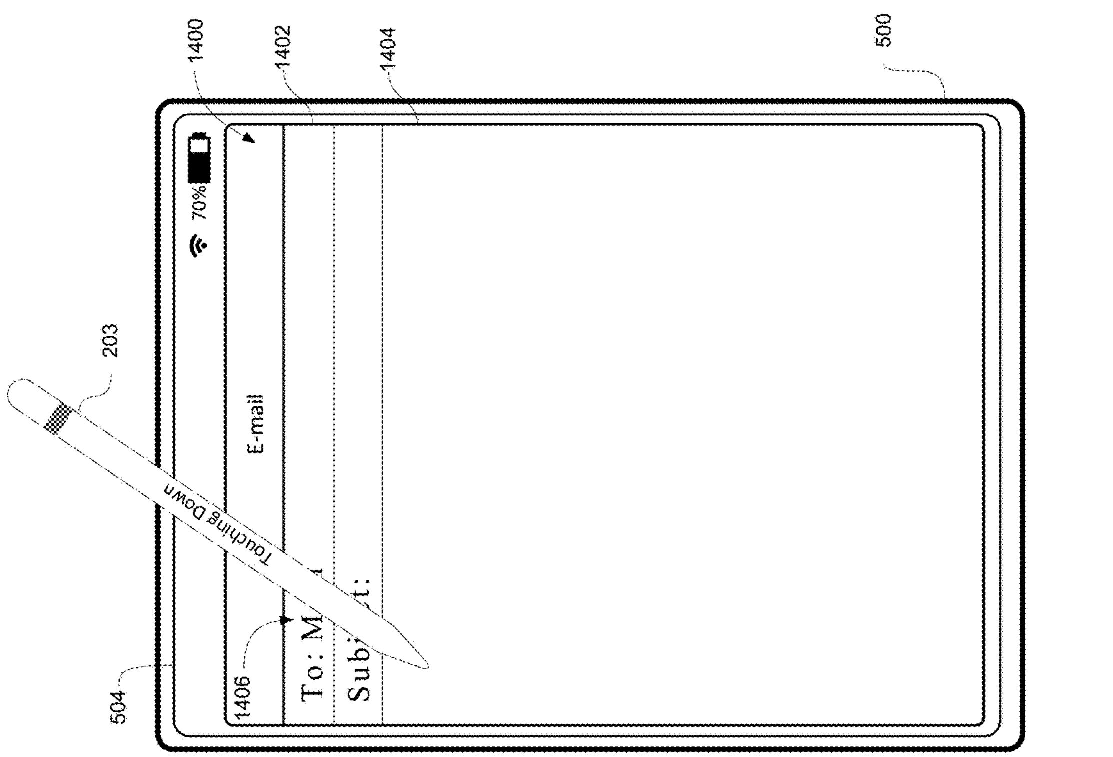
Figure 14G:
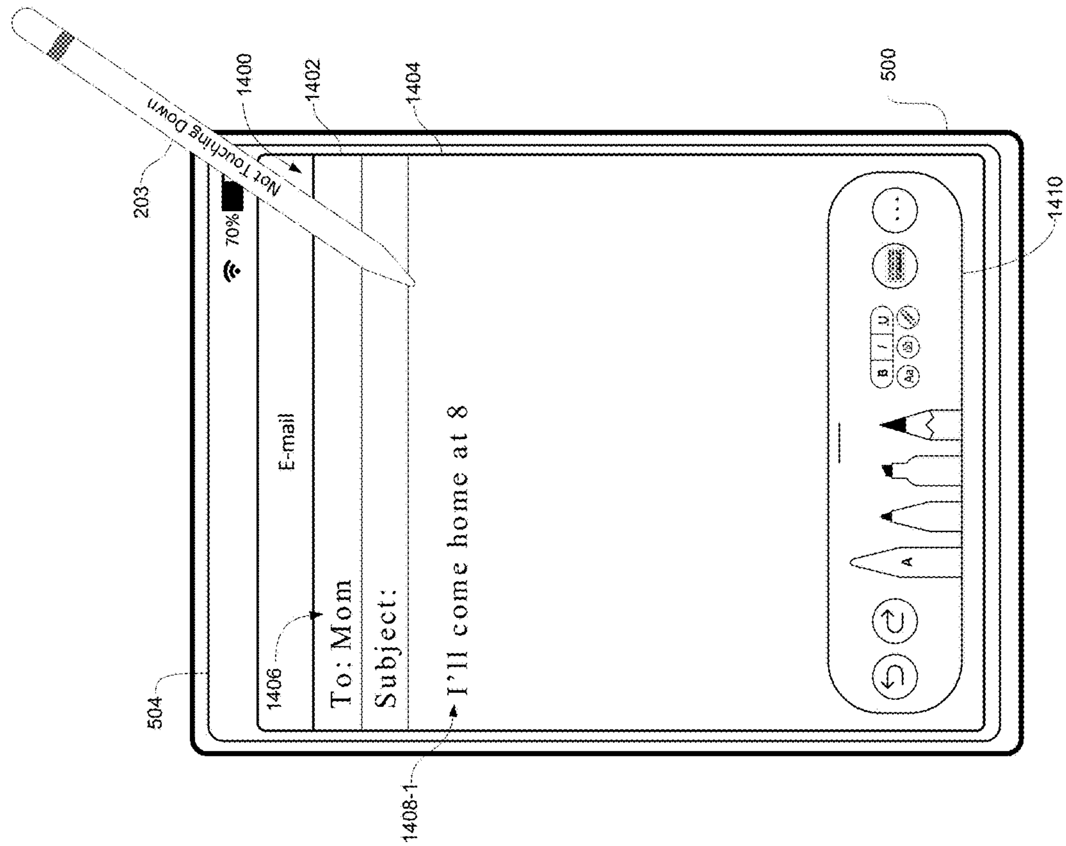
Figure 14F:
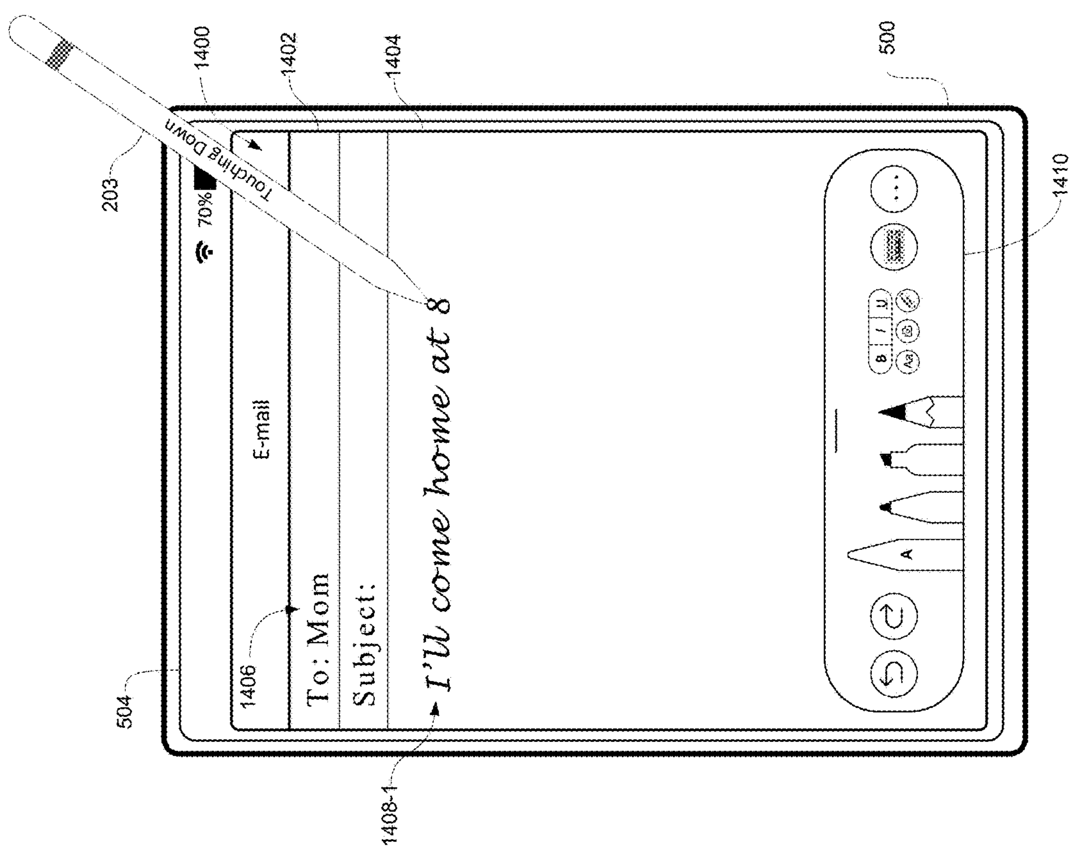
Figure 14I:
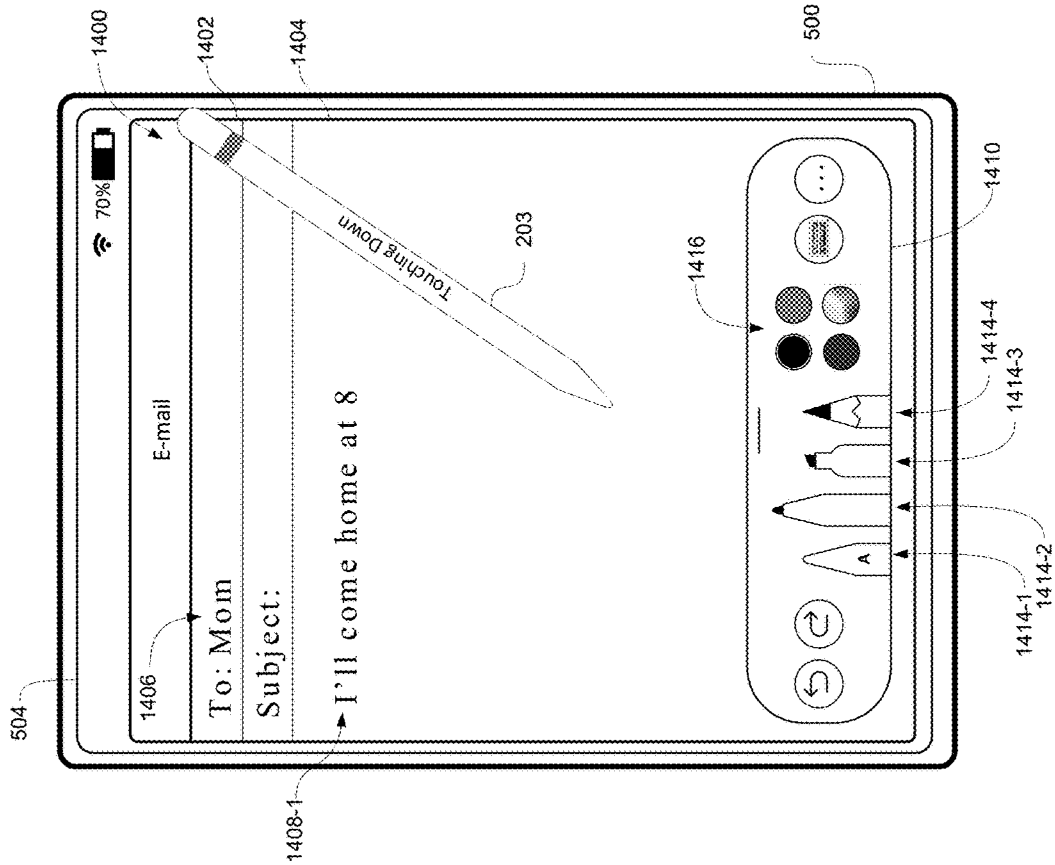
Figure 14H:
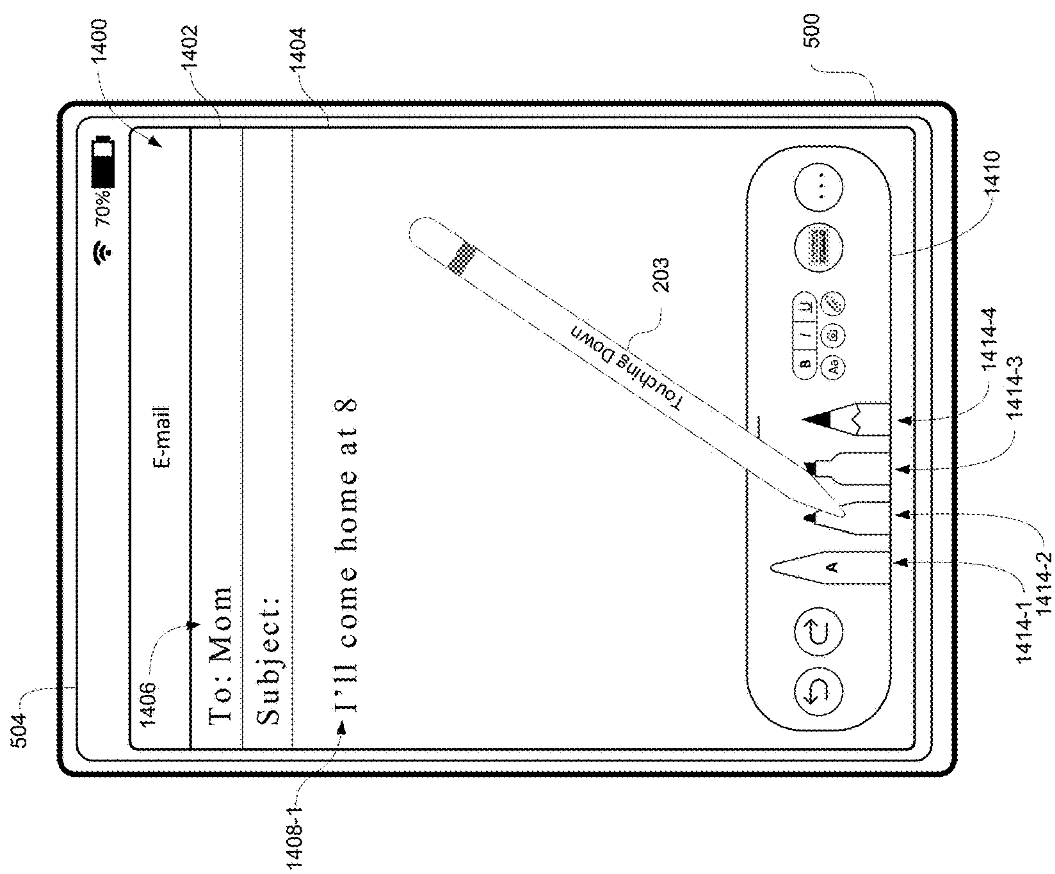
Figure 14K:
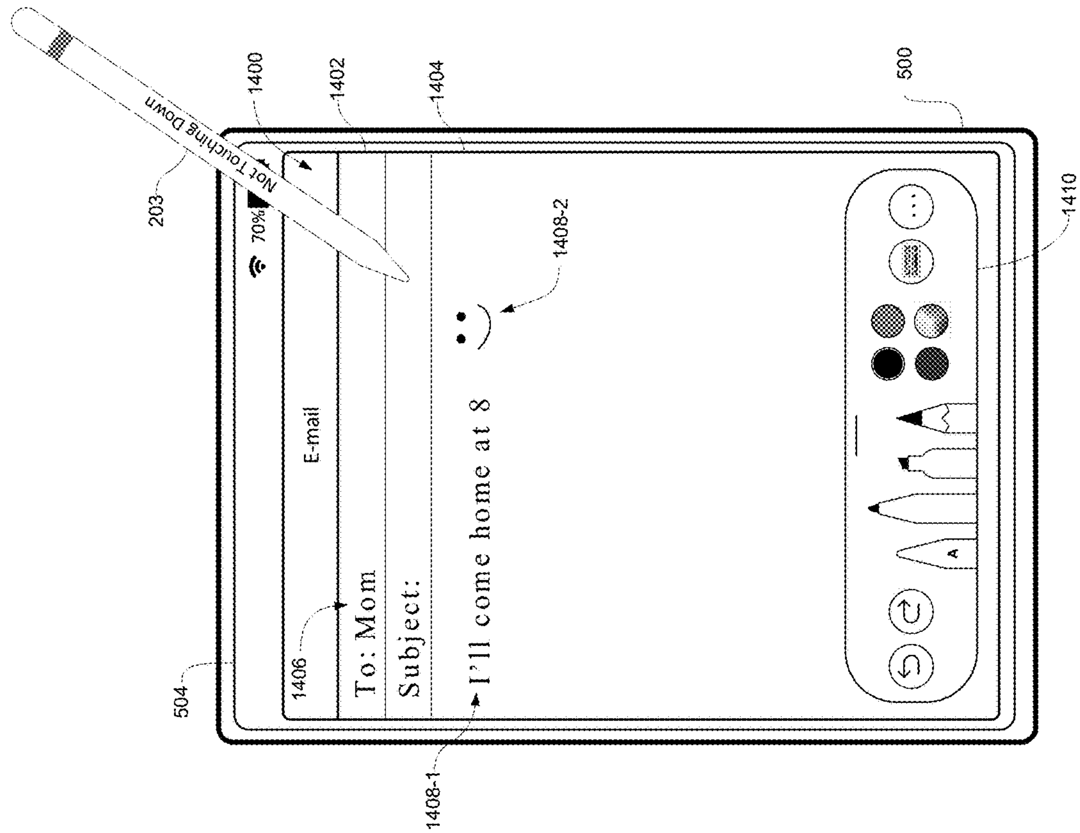
Figure 14J:
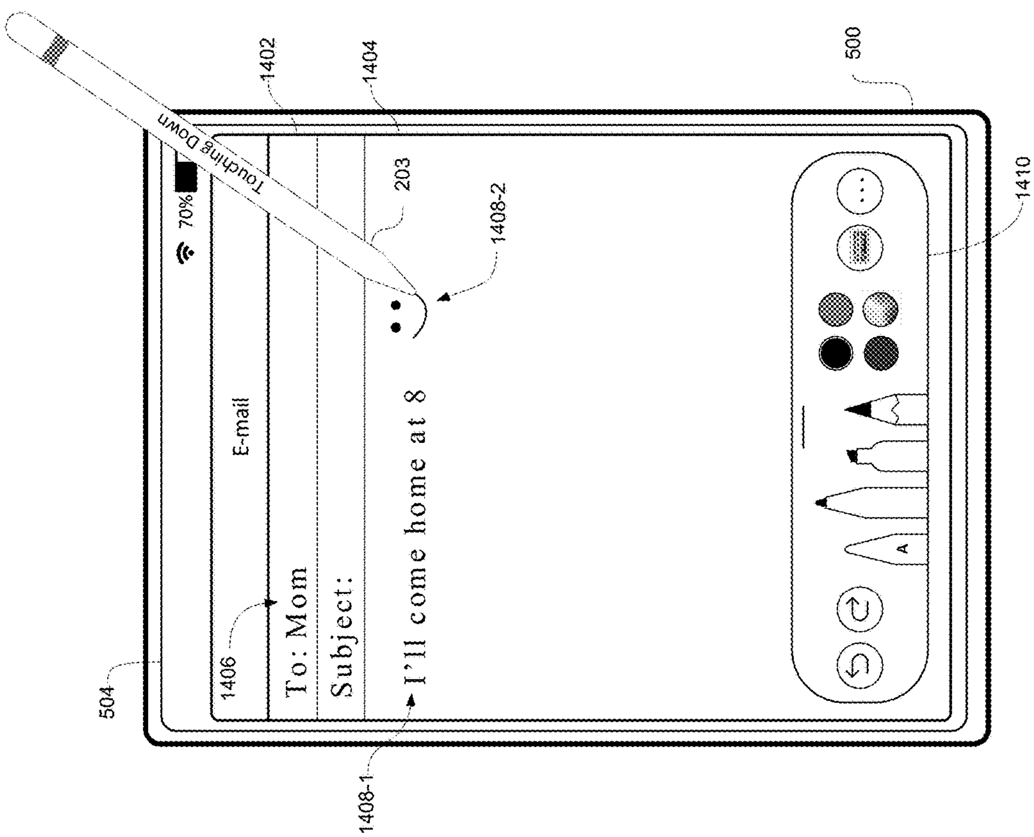
Figure 14M:
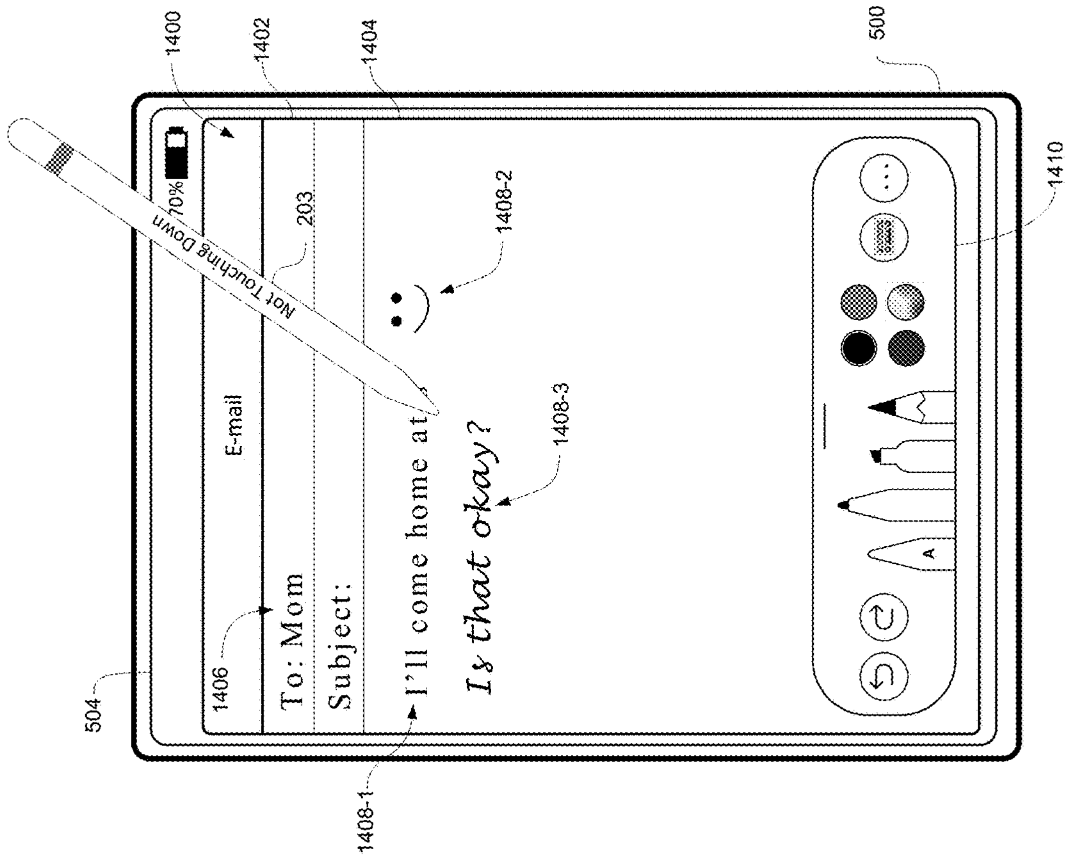
Figure 14L:
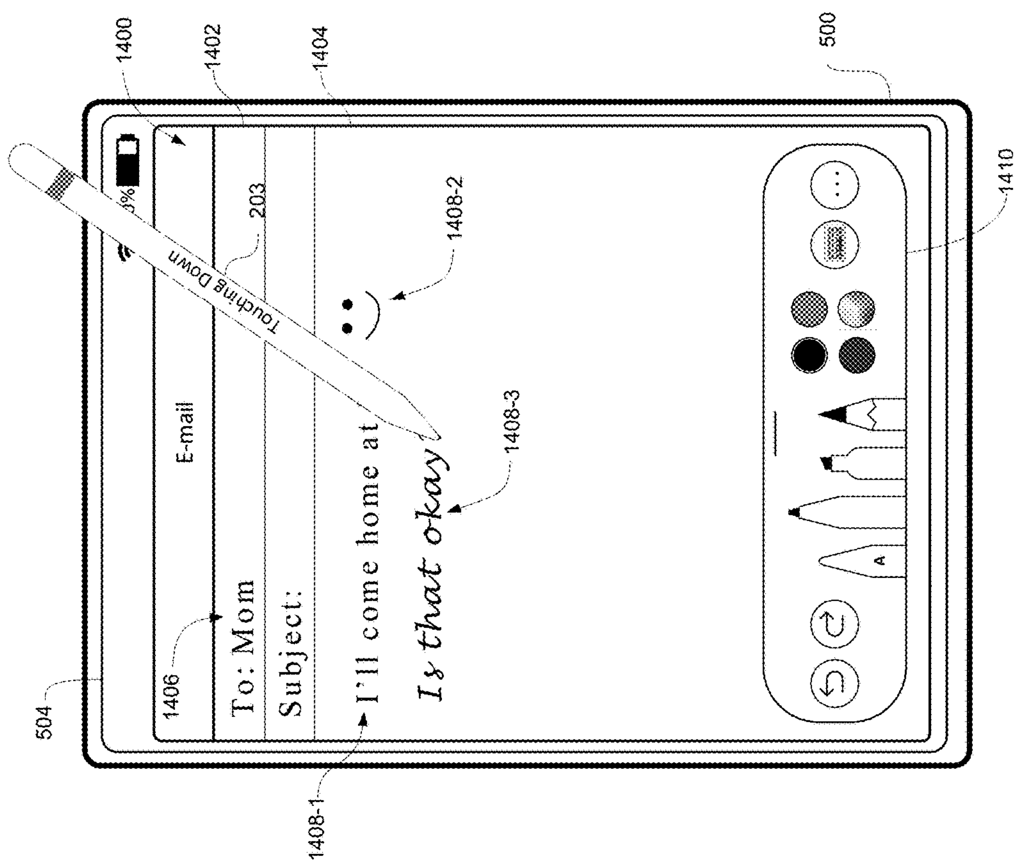
Figure 14O:
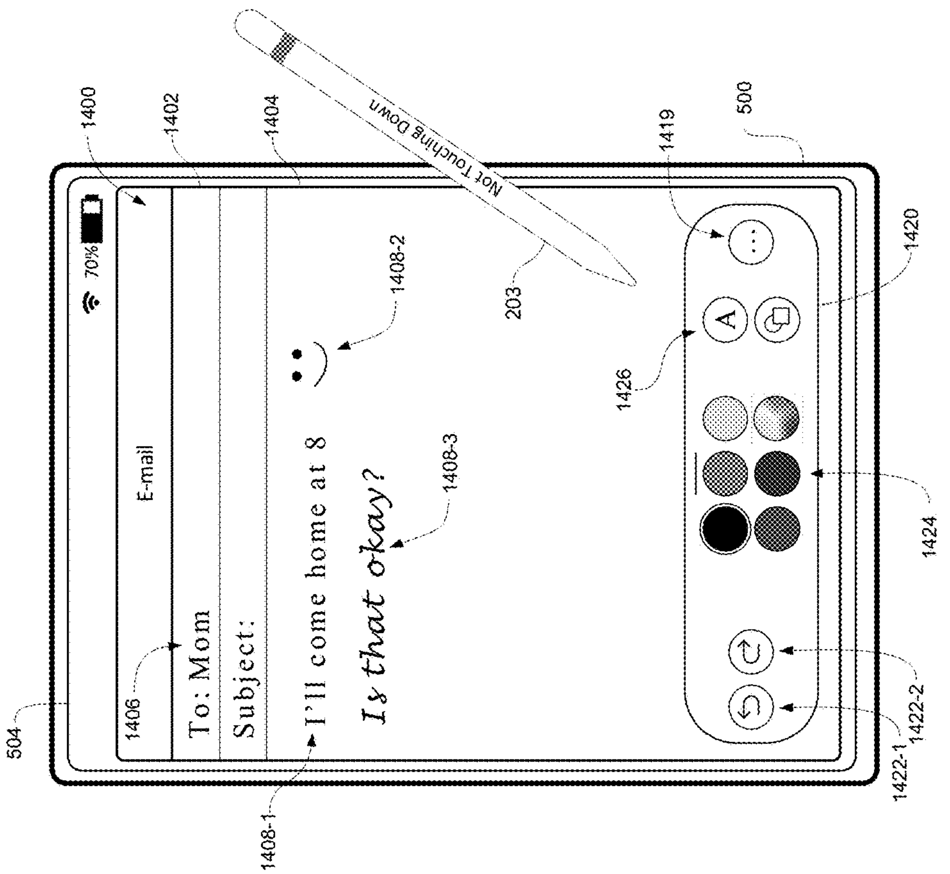
Figure 14N:
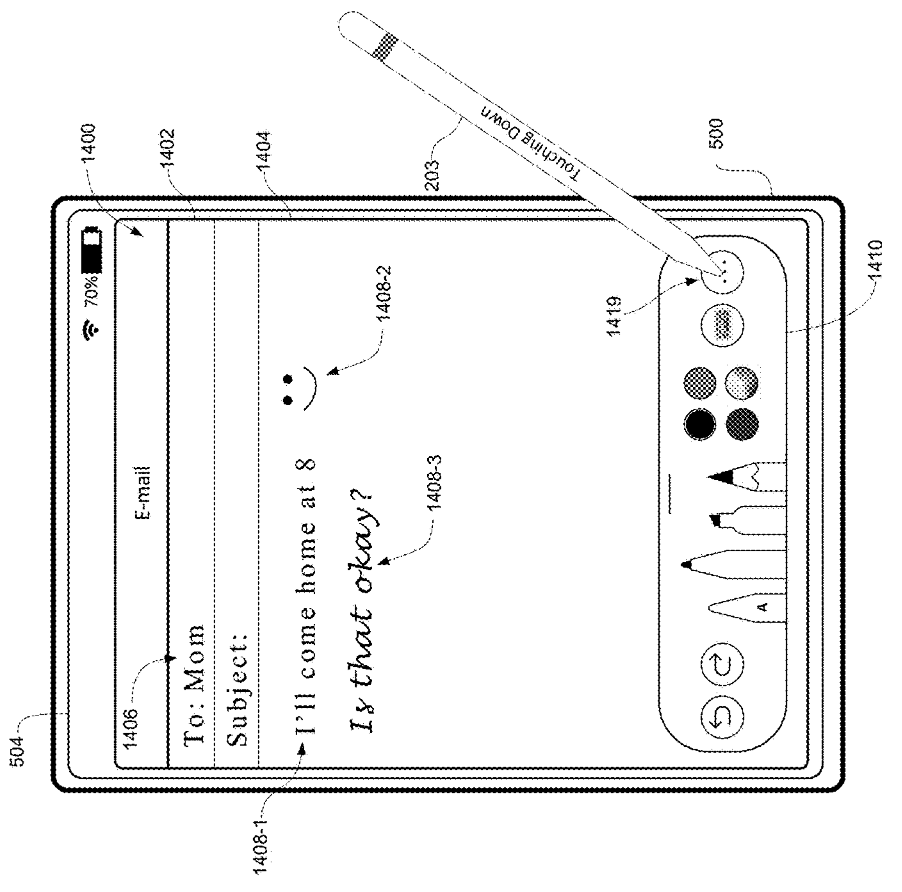
Figure 14Q:
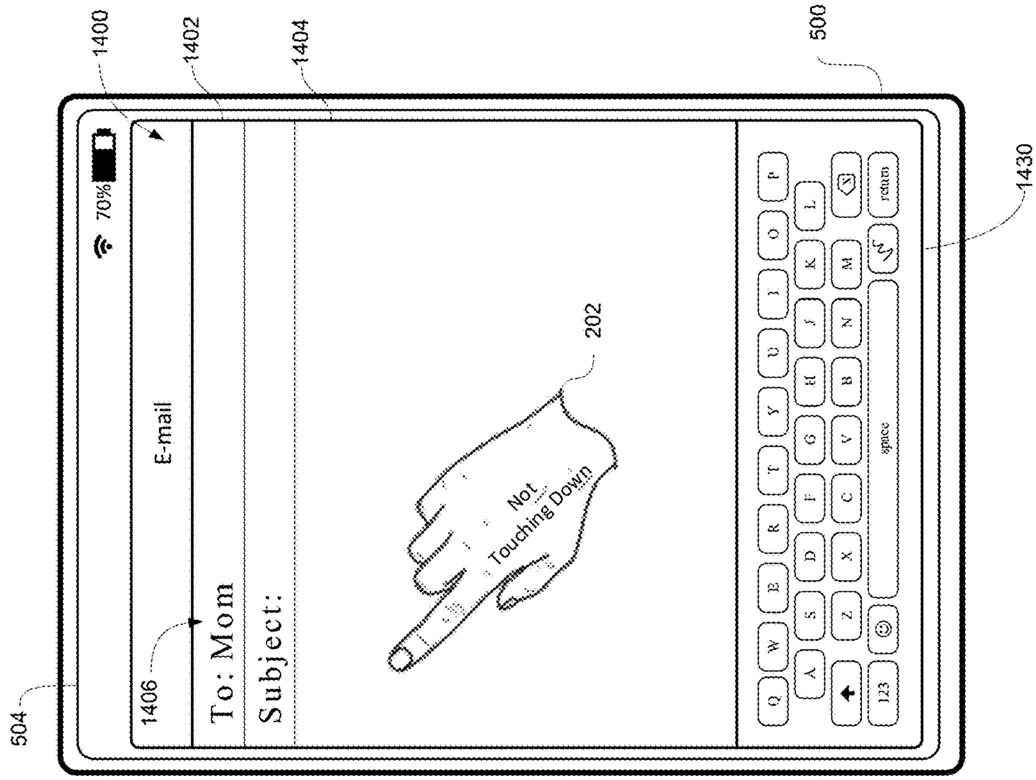
Figure 14P:
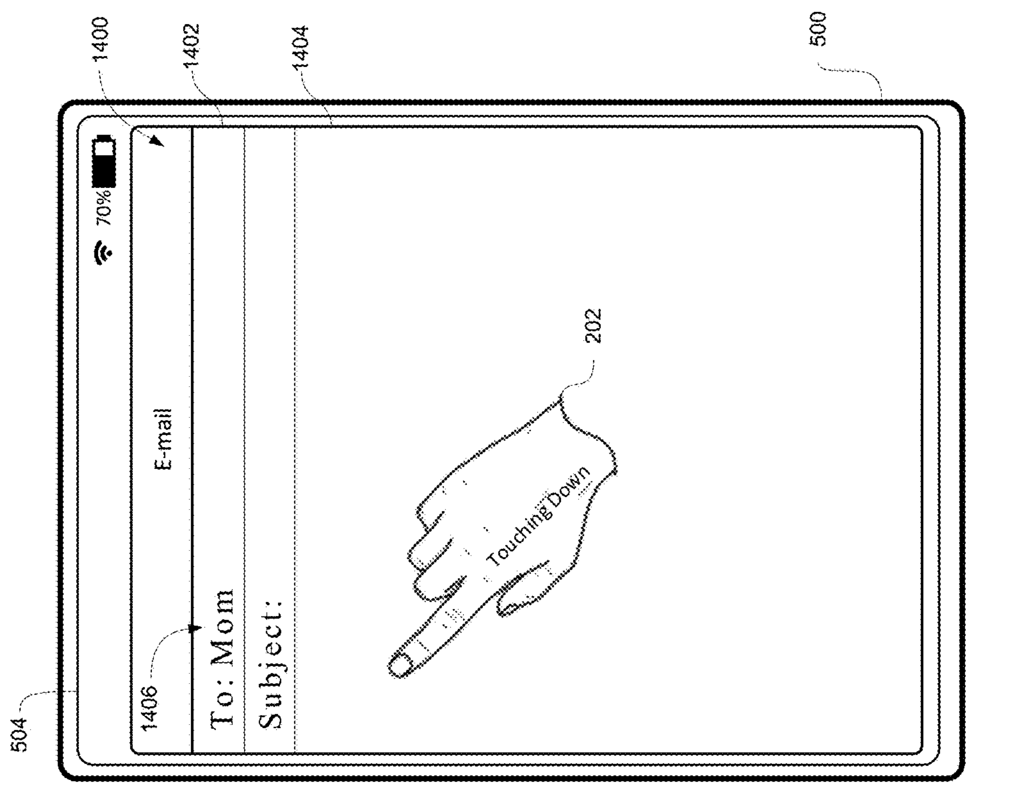
Figure 14S:
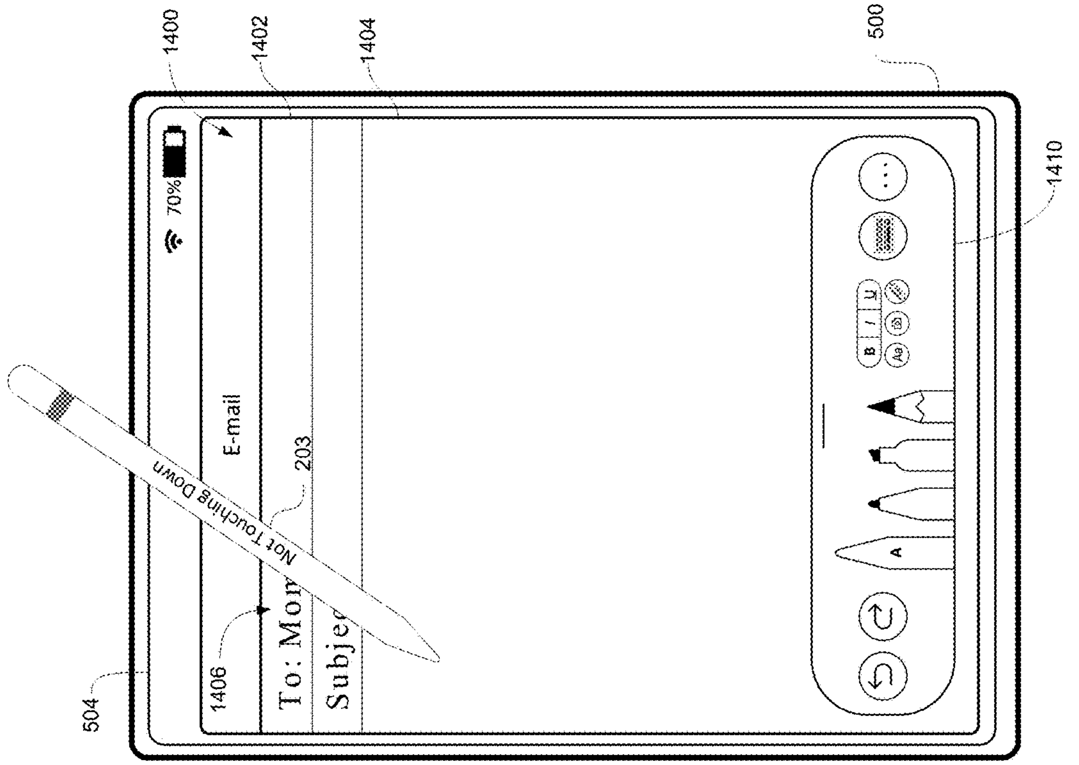
Figure 14R:
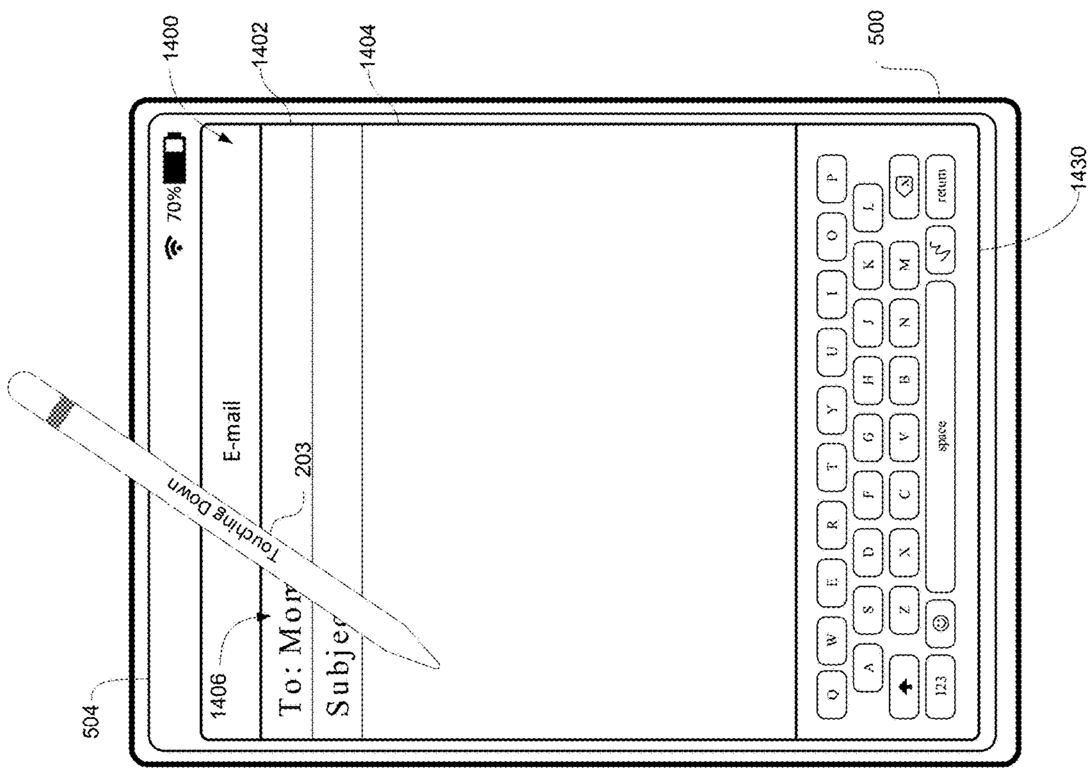
Figure 14U:
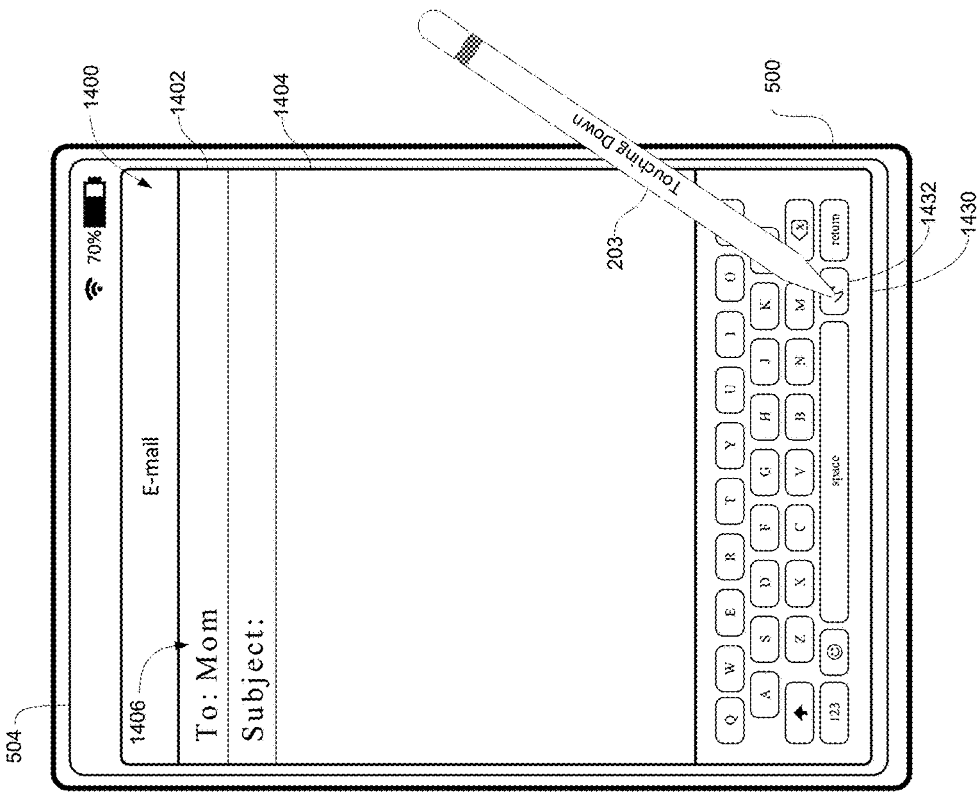
Figure 14T:
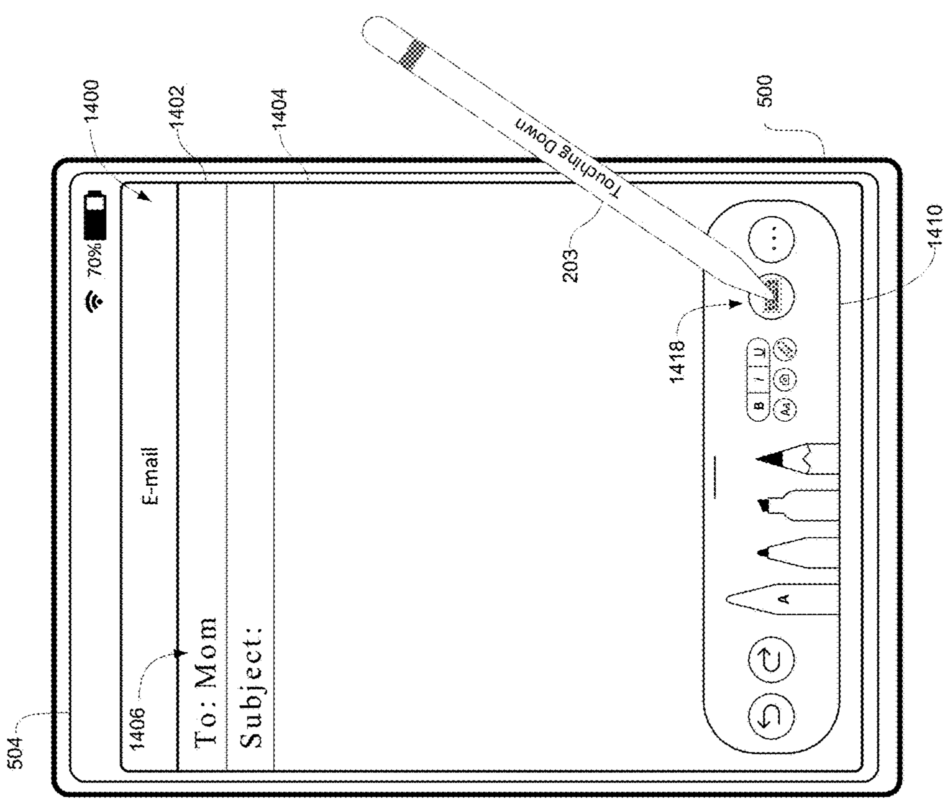
Figure 14V:
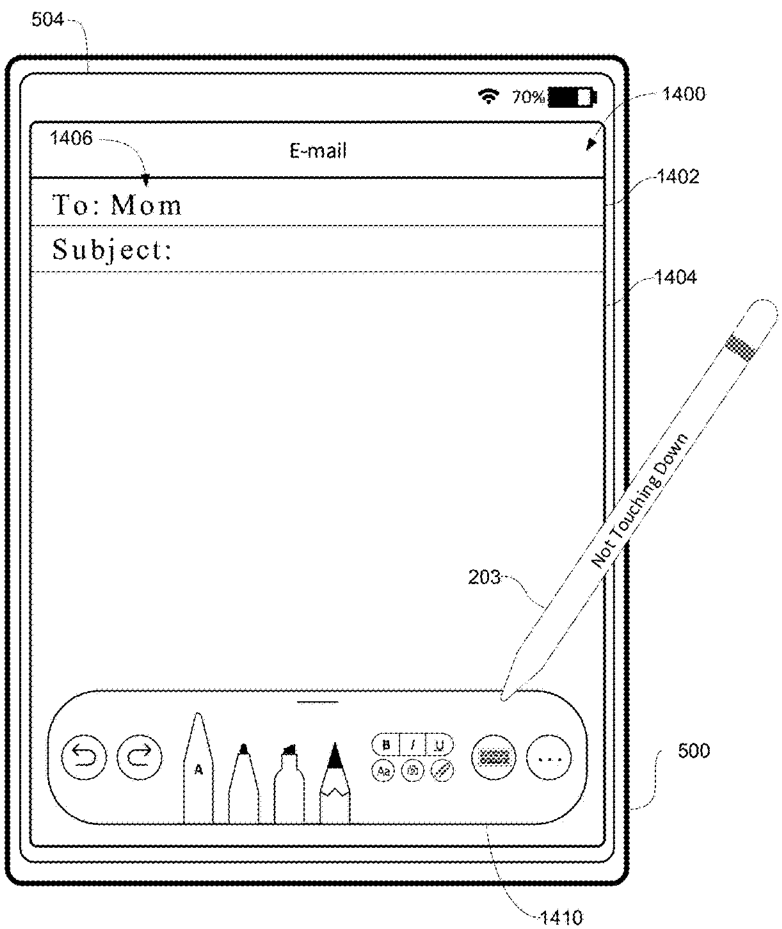
Figure 15A:
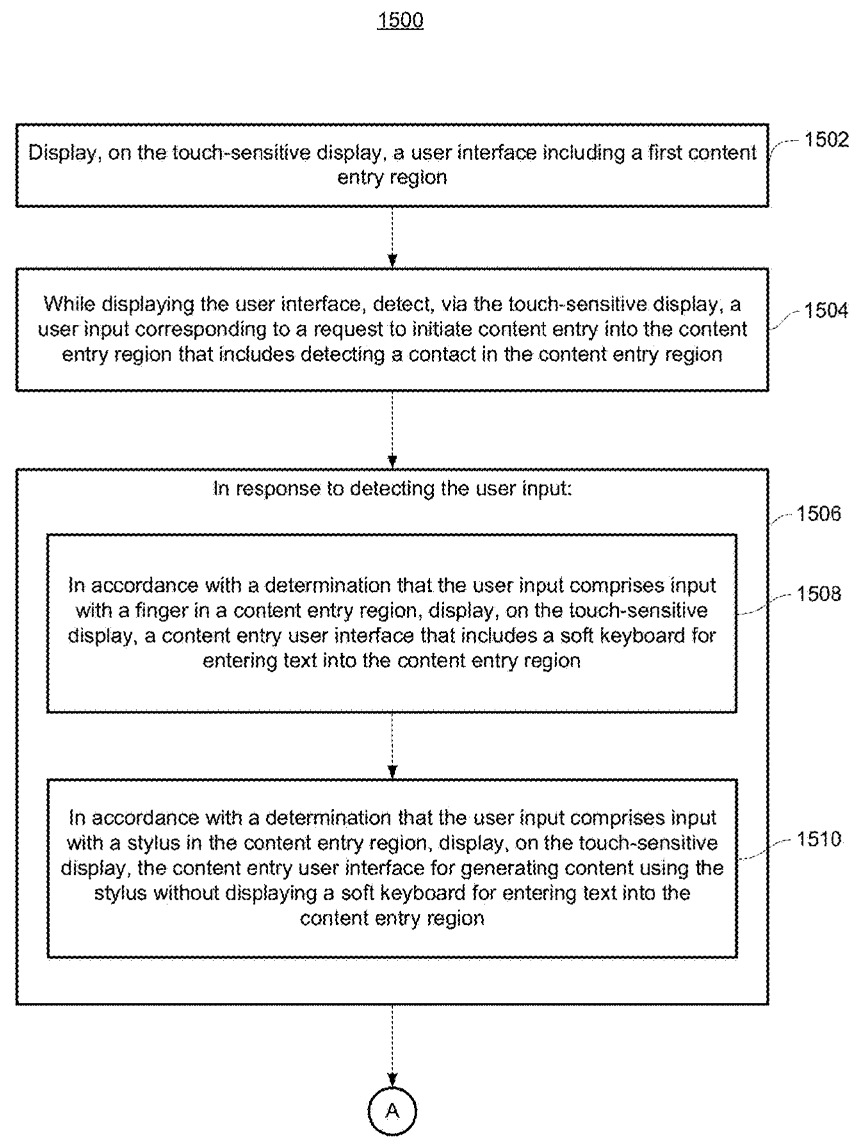
FIGS. 15A-15F are flow diagrams illustrating a method of presenting handwritten entry menus in accordance with some embodiments.
Figure 15B:
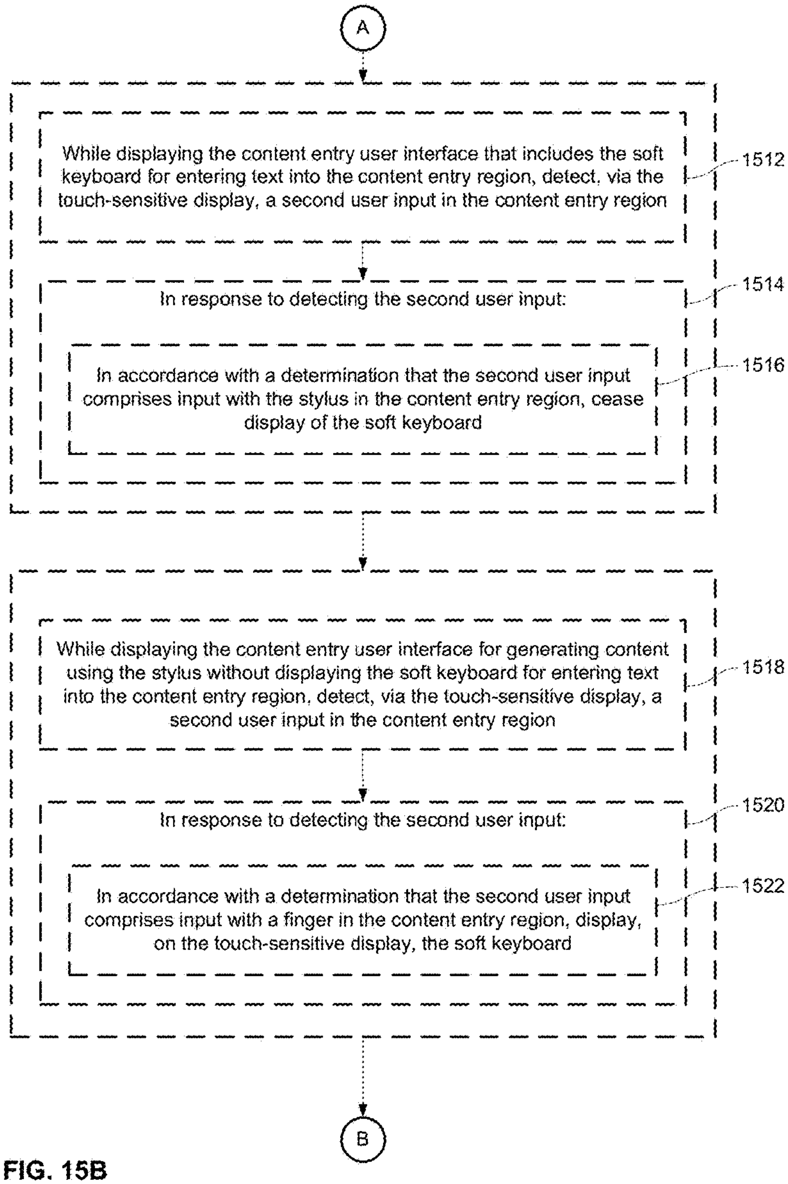
Figure 15C:
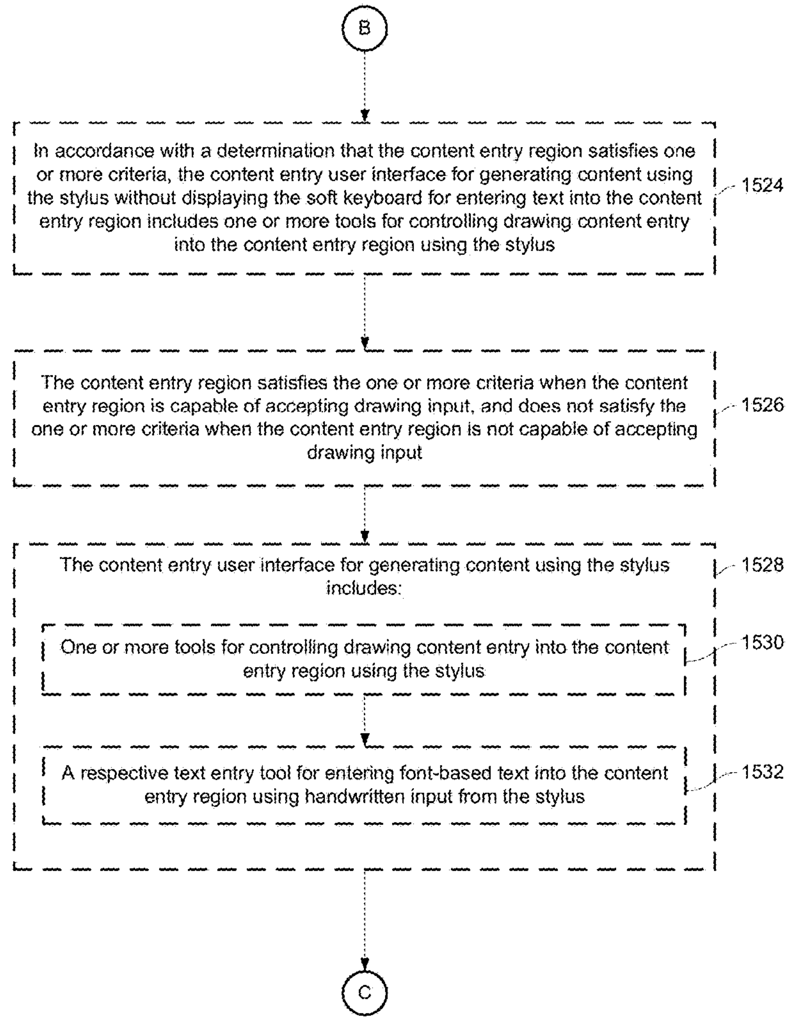
Figure 15D:
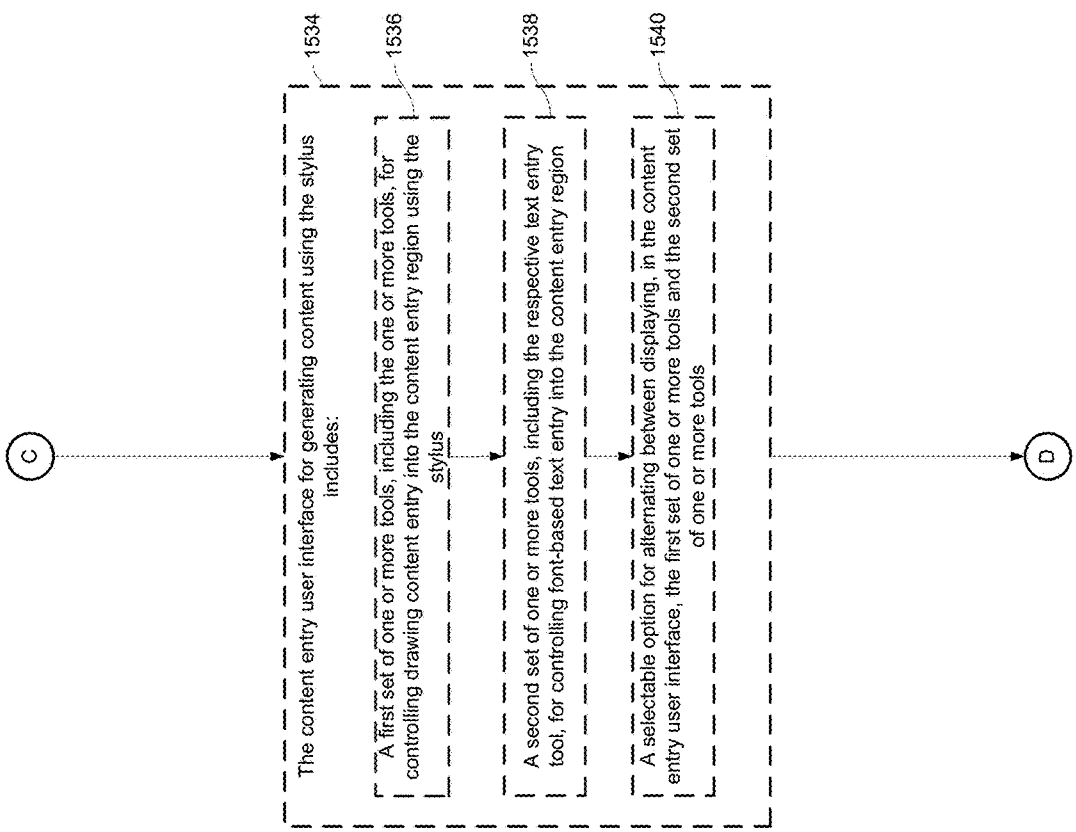
Figure 15E:
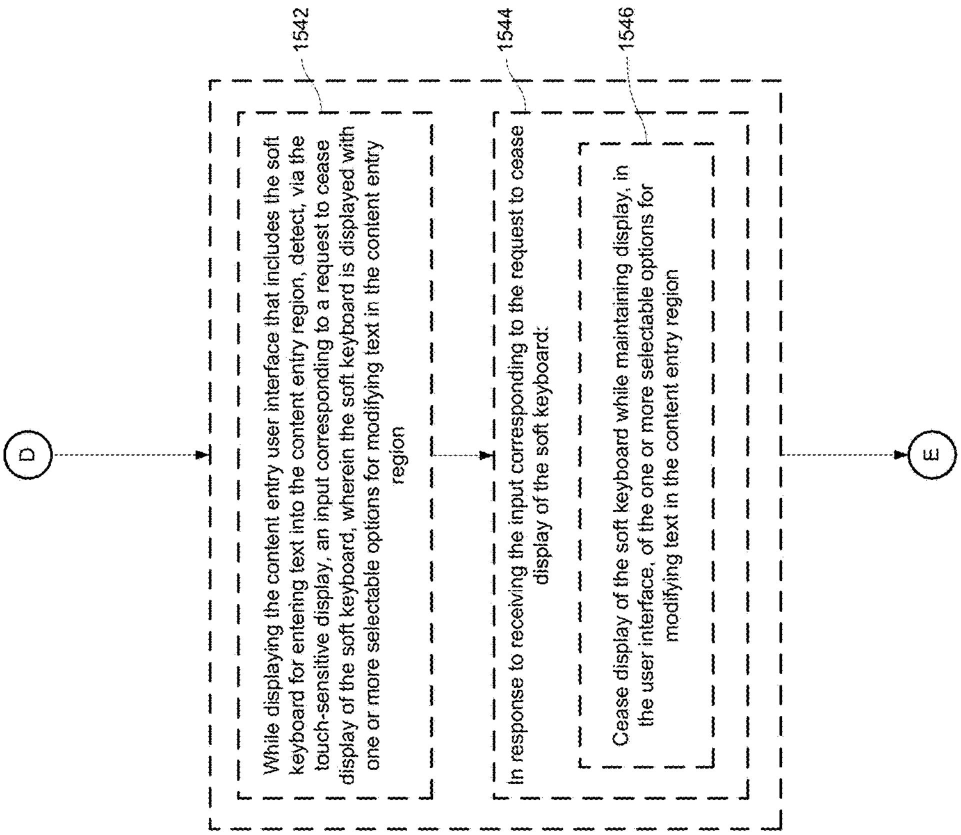
Figure 15F:
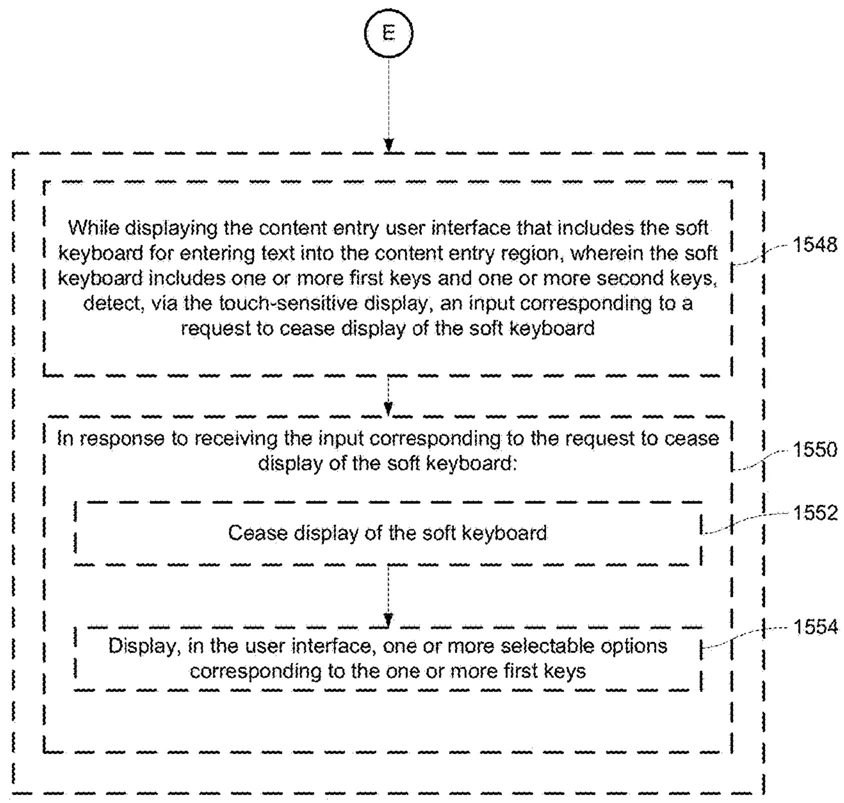
Figure 16A:
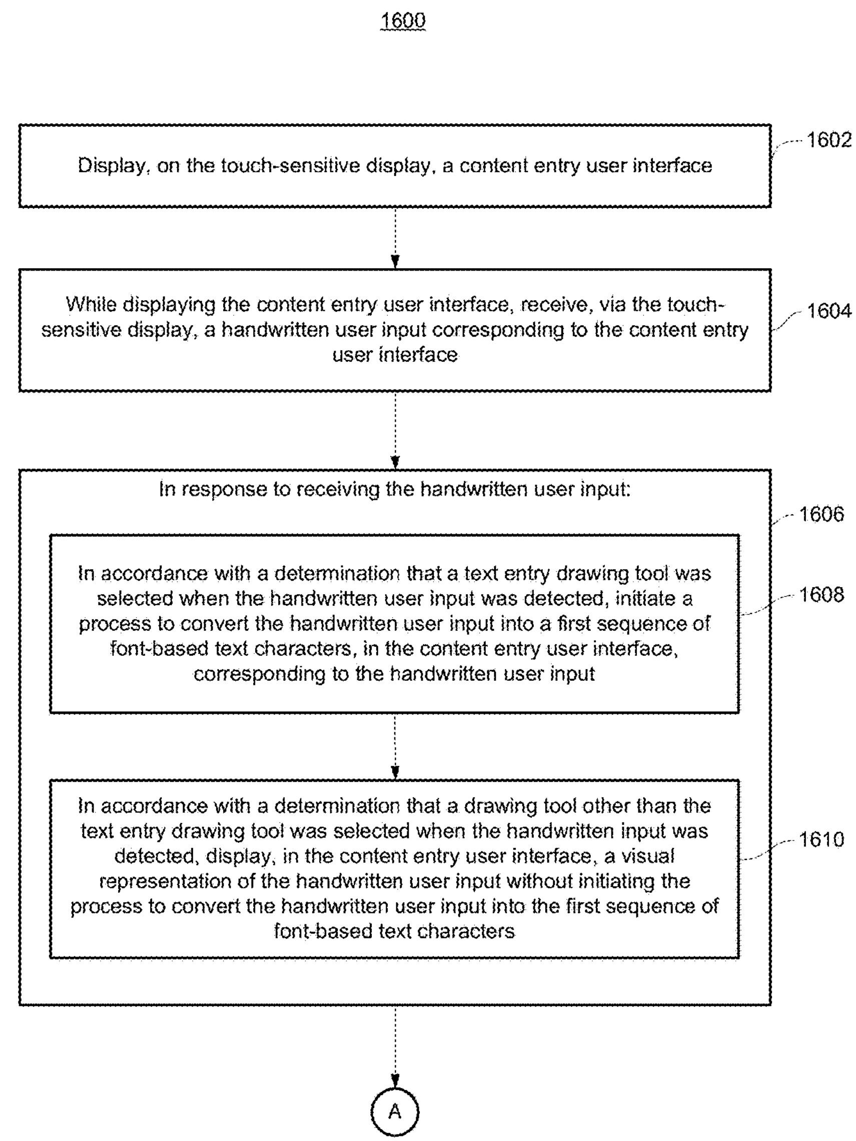
FIGS. 16A-16D are flow diagrams illustrating a method of controlling the characteristics of handwritten input based on selections on a handwritten entry menu in accordance with some embodiments.
Figure 16C:
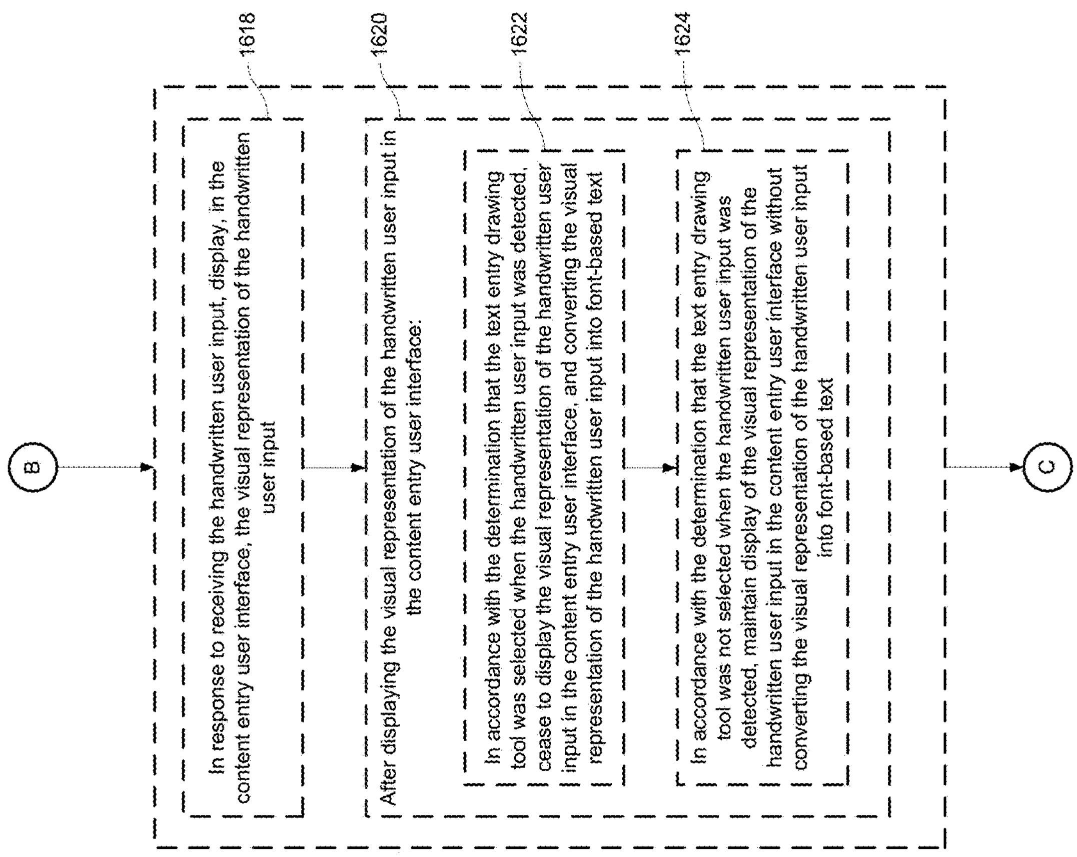
Figure 16B:
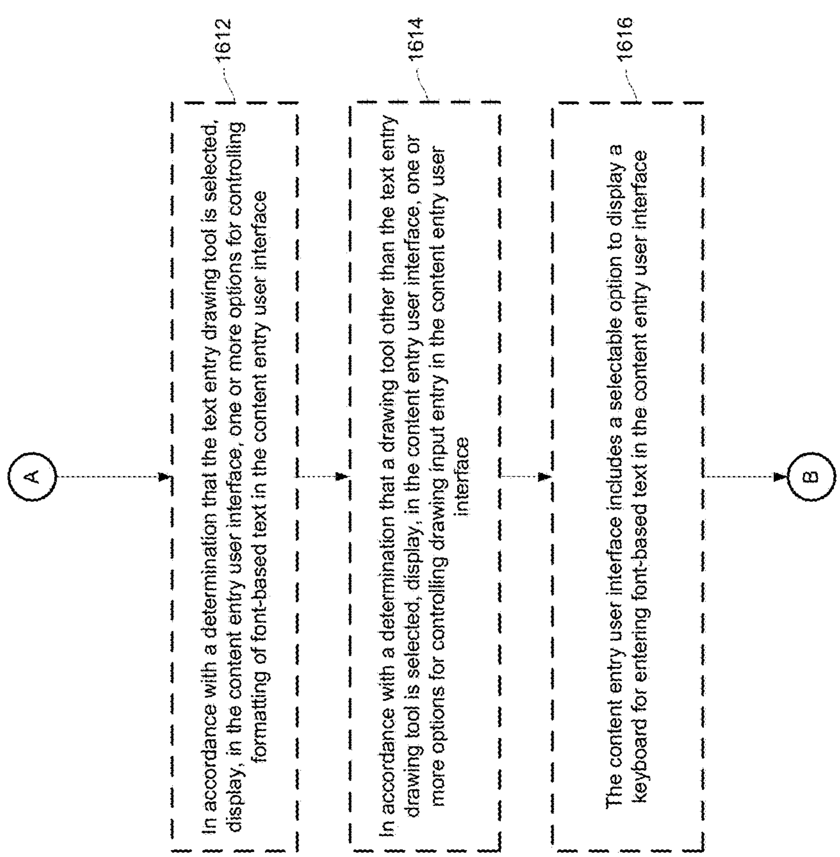

FIGS. 14A-14V illustrate exemplary ways in which an electronic device presents handwritten entry menus. The embodiments in these figures are used to illustrate the processes described below, including the processes described with reference to FIGS. 15A-15F and FIGS. 16A-16D.

FIG. 14A illustrates an exemplary device 500 that includes touch screen 504. As shown in FIG. 14A, the electronic device 500 presents user interface 1400. In some embodiments, user interface 1400 is a user interface of an email application for composing an email. In some embodiments, user interface 1400 includes a text entry field 1402 and a general entry field 1404. In some embodiments, text entry field 1402 only accepts and displays text inputs. For example, as shown in FIG. 14A, text entry field 1402 is a text entry field for providing the recipient of an email and only accepts text as inputs. In some embodiments, general entry field 1404 accepts and displays both text inputs and media inputs. For example, general entry field 1404 is the message body of an email and accepts text, symbols, pictures, links, videos, multimedia, attachments, etc.

In FIG. 14B, handwritten input 1406 is received from stylus 203 in text entry field 1402 corresponding to the email recipient field. In some embodiments, because text entry field 1402 only supports text entries, handwritten input 1406 is interpreted as a text entry. Thus, as shown in FIG. 14C, in some embodiments, handwritten input 1406 is converted to font-based text (e.g., according to method 700 and/or method 1300).

In FIG. 14D, a touchdown of stylus 203 is detected in general entry field 1404. In some embodiments, because general entry field 1404 accepts and displays both text and media, device 500 can accept inputs from stylus 203 as either text or as a drawing. Thus, in some embodiments, in response to detecting the touchdown of stylus 203 in general entry field 1404, handwriting entry menu 1410 is displayed, as shown in FIG. 14E. In some embodiments, handwriting entry menu 1410 is a content entry user interface that includes one or more options for generating content using the stylus.

As shown in FIG. 14E, handwriting entry menu 1410 includes selectable options 1412-1 to 1412-2, 1414-1 to 1414-4, 1416, 1418, and 1419. In some embodiments, fewer or more selectable options are displayed on handwriting entry menu 1410. In some embodiments, selectable option 1412-1 corresponds to an undo option, which is selectable to undo the most recently performed function or operation. In some embodiments, selectable option 1412-2 corresponds to a redo option, which is selectable to redo the most recently undone function or operation, or to re-perform the most recently performed function or operation.

In some embodiments, selectable options 1414-1 to 1414-4 correspond to a plurality of drawing tools. In some embodiments, the drawing tools control the shape, size, style, and other visual characteristics of the handwritten input. For example, if selectable option 1414-1 corresponding to the text entry drawing tool is selected, then device 500 is in a text input mode such that handwriting inputs from stylus 203 are interpreted as requests to enter text and are thus converted into font-based text. In some embodiments, if selectable option 1414-2 corresponding to a pen drawing tool is selected, then device 500 is in a pen input mode such that handwriting inputs from stylus 203 are interpreted as a drawing and thus have the visual characteristics associated with drawing using a pen (e.g., medium sized lines). In some embodiments, if selectable option 1414-3 corresponding to a marker drawing tool is selected, then device is in a marker input mode such that handwriting inputs from stylus 203 are interpreted as a drawing and have the visual characteristics associated with drawing using a marker (e.g., thicker and optionally rectangular lines). In some embodiments, if selectable option 1414-4 corresponding to a pencil drawing tool is selected, then device is in a pencil input mode such that handwriting inputs from stylus 203 are interpreted as a drawing and have the visual characteristics associated with drawing using a pencil (e.g., thin lines). In some embodiments, more or fewer drawing tools can be displayed on handwriting entry menu 1410.

In some embodiments, selectable options 1416 are a set of options corresponding to the selected drawing tool (e.g., in FIG. 14E, the text entry drawing tool). In some embodiments, selectable options 1416 include options (e.g., when selected) for changing the font, font size, or other characteristics such as underlined, italics, bold, etc. of the text that is entered by stylus 203. In some embodiments, selectable options 1416 include options (e.g., when selected) for attaching a photograph or file. In some embodiments, selectable option 1418 is selectable to display a soft keyboard for entering text. In some embodiments, selectable option 1419 is selectable to display a second set of options (e.g., display another "page" or "tab" of handwriting entry menu 1410).

In FIG. 14F, handwritten input 1408-1 is received from stylus 203 in general entry field 1404 while selectable option 1414-1 corresponding to the text entry drawing tool is selected. In some embodiments, because the text entry drawing tool is selected, the handwritten input 1408-1 is interpreted as text. Thus, as shown in FIG. 14H, handwritten input 1408-1 is converted into font-based text (e.g., according to method 700 and/or method 1300).

In FIG. 14H, a user input is received selecting selectable option 1414-2 corresponding to the pen drawing tool. In response to receiving the user input, device 500 enters a pen input mode. In some embodiments, as shown in FIG. 14I, the visual characteristic of selectable option 1414-2 is updated to show that the pen drawing tool is selected. For example, in FIG. 14I, selectable option 1414-2 is extended and displayed more prominently than the other selectable options (e.g., the pen is raised higher than the other drawing tools). In some embodiments, in response to entering pen input mode (e.g., in response to selecting selectable option 1414-2), selectable options 1416 are updated to reflect the options available for the pen drawing tool. For example, selectable options 1416 include one or more color options for controlling the color of the drawing (e.g., when selected). In some embodiments, selectable options 1416 includes a palette option, selection of which causes the display of a color palette from which the user is able to select a desired color.

In FIG. 14J, a user input is received from stylus 203 while the pen drawing tool is selected performing drawing 1408-2. In some embodiments, because drawing 1408-2 is inputted while the device is in pen input mode, drawing 1408-2 is not interpreted as text and not converted to font-based text. Instead, in some embodiments, drawing 1408-2 is interpreted as a drawing. In FIG. 14K, lift-off of stylus 203 is detected, but drawing 1408-2 is not converted into font-based text. In some embodiments, interpreting drawing 1408-2 as a drawing includes converting drawing 1408-2 into a drawing file format (e.g., BMP, JPG, etc.) and embedding the drawing at the respective location in general entry field 1404.

In FIG. 14L, handwritten input 1408-3 is received in general entry field 1404 when the pen drawing tool is still selected. In some embodiments, because the pen drawing tool is still selected, handwritten input 1408-3 is not interpreted as a request to enter font-based text, despite the fact that handwritten 1408-3 includes handwritten words and letters. Thus, as shown in FIG. 14M, after detecting lift-off of stylus 203, handwritten input 1408-3 is not converted into font-based text. In some embodiments, similarly to drawing 1408-2, handwritten input 1408-3 is converted into a drawing file format and embedded into general entry field 1404 at the respective location. Thus, in some embodiments, when text entry tool is not selected (e.g., when any of the drawing tools other than the text entry tool are selected), handwritten inputs are not changed and not converted into font-based text, and the visual characteristics of the handwritten inputs are preserved.

In FIG. 14N, a user input is detected selecting selectable option 1419. In some embodiments, in response to the user input, handwriting entry menu 1410 is replaced with handwriting entry menu 1420. In some embodiments, handwriting entry menu 1420 is the same element as handwriting entry menu 1410 and the handwriting entry menu is updated to display the options of handwriting entry menu 1420 (e.g., as opposed to the dismissal of a first handwriting entry menu element and display of a different handwriting entry menu element).

In some embodiments, handwriting entry menu 1420 includes selectable option 1422-1 corresponding to an undo option, which is selectable to undo the most recently performed function or operation. In some embodiments, handwriting entry menu 1420 includes selectable option 1422-2 corresponds to a redo option, which is selectable to redo the most recently undone function or operation, or to re-perform the most recently performed function or operation. In some embodiments, handwriting entry menu 1420 includes a set of color options 1424. In some embodiments, the set of color options 1424 include one or more selectable options for setting the color of the handwritten input. In some embodiments, a halo surrounding a particular color option indicates the color option that is currently selected (e.g., a halo around the block color option). In some embodiments, the set of color options 1424 includes a selectable option to display a color palette from which the user is able to select a desired color. In some embodiments, handwriting entry menu 1420 includes object insertion options 1426. For example, object insertion options 1426 includes a selectable option that is selectable to insert a text box into general entry region 1404. In some embodiments, object insertion options 1426 includes a selectable option that is selectable to insert a geometric shape (e.g., circles, square, triangles, lines, etc.) into general entry region 1404. In some embodiments, handwriting entry menu 1420 includes selectable option 1419 to re-display handwriting entry menu 1410. In some embodiments, handwriting entry menu 1420 can include more or fewer selectable options than those shown and discussed here.

In FIG. 14P, while handwritten entry menus are not displayed on the display, a user input is received on touch screen 504 by a finger 202 (e.g., tap, touch, hold, etc.). In some embodiments, in response to receiving the user input, device 500 displays soft keyboard 1430, as shown in FIG. 14Q. In some embodiments, soft keyboard 1430 is a virtual keyboard that mimics the layout of a physical keyboard. In some embodiments, the letters on the soft keyboard are selectable to insert the respective letter into general entry field 1404.

In FIG. 14R, a user input is then received in general entry field 1404 from stylus 203 while soft keyboard 1430 is displayed on the display. In some embodiments, in response to the user input, device 500 replaces display of soft keyboard 1430 with display of handwritten entry menu 1410, as shown in FIG. 14S. In some embodiments, soft keyboard 1430 is a different element than handwritten entry menu 1410. In some embodiments, soft keyboard 1430 is the same element as handwritten entry menu 1410 and is merely a different entry mode of handwritten entry menu 1410. It is understood that if a user input is received on touch screen 504 by a finger 202 while handwritten entry menu 1410 is displayed, then device 500 optionally replaces display of handwritten entry menu 1410 with soft keyboard 1430.

In FIG. 14T, a user input is received selecting selectable option 1418. In some embodiments, in response to the user input selecting selectable option 1418, handwritten entry menu 1410 is replaced with soft keyboard 1430, as shown in FIG. 14U. In some embodiments, soft keyboard 1430 includes a selectable option 1432 for displaying handwritten entry menu 1410. As shown in FIG. 14U, a user input is received selecting selectable option 1432. In response to the user input, handwritten entry menu 1410 is displayed, as shown in FIG. 14V.

FIGS. 15A-15F are flow diagrams illustrating a method 1500 of presenting handwritten entry menus. The method 1500 is optionally performed at an electronic device such as device 100, device 300, device 500, device 501, device 510, and device 591 as described above with reference to FIGS. 1A-1B, 2-3, 4A-4B and 5A-5I. Some operations in method 1500 are, optionally combined and/or order of some operations is, optionally, changed As described below, the method 1500 provides ways to presenting handwritten entry menus. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., an electronic device, a mobile device (e.g., a tablet, a smartphone, a media player, or a wearable device) including a touch screen, or a computer including a touch screen, such as device 100, device 300, device 500, device 501, or device 591) in communication with a touch-sensitive display displays (1502), on the touch-sensitive display, a user interface including a first content entry region, such as in FIG. 14A (e.g., a user interface with a content entry region in which a user is able to enter text, images, multimedia, etc.) For example, in an email composition user interface, a content entry region for the body of the email is capable of receiving (and transmitting over email) text, still images, videos, attachments, etc.

In some embodiments, while displaying the user interface, the electronic device detects (1504), via the touch-sensitive display, a user input corresponding to a request to initiate content entry into the content entry region that includes detecting a contact in the content entry region, such as in FIG. 14D (e.g. receiving an input in the content entry region from an input device, such as a stylus, a keyboard, mouse, or a user's finger).

In some embodiments, in response to detecting the user input (1506), in accordance with a determination that the user input comprises input with a finger in a content entry region, the electronic device displays (1508), on the touch-sensitive display, a content entry user interface that includes a soft keyboard for entering text into the content entry region, such as in FIG. 14Q (e.g., if the input was received in the content entry region from an input device other than a stylus, such as a finger, then display a virtual keyboard (e.g., soft keyboard) on the display). In some embodiments, the keyboard is displayed in a menu element that provides multiple options for controlling the input from the respective input device (e.g., finger). In some embodiments, the menu element includes the virtual keyboard (e.g., optionally without displaying the options for controlling the input). In some embodiments, the menu includes options for controlling the characters that are entered by the soft keyboard (e.g., font, font size, color, etc.). In some embodiments, the menu includes an option to dismiss the soft keyboard. In some embodiments, the menu includes an option to display the options that are displayed when the input is received from a handwriting input device. In some embodiments, text is able to be entered by interacting with the virtual keyboard using the stylus, finger, or other input device (e.g., selecting the keys on the virtual keyboard).

In some embodiments, in response to detecting the user input (1506), in accordance with a determination that the user input comprises input with a stylus in the content entry region, the electronic device displays (1510), on the touch-sensitive display, the content entry user interface for generating content using the stylus without displaying a soft keyboard for entering (font-based) text into the content entry region, such as in FIG. 14E (e.g., if the input was received from a stylus or other handwriting device, then display a menu which provides multiple options for controlling the input from the respective handwriting device). In some embodiments, the menu is the same menu as the menu that is displayed in response to receiving an input from a finger (or other input device other than the stylus). In some embodiments, the menu displays more or fewer options when displayed in response to receiving an input from the stylus than the options that are displayed in response to receiving an input from a finger (or other input device other than the stylus). For example, the menu includes one or more handwriting tools such as a text input tool, a drawing tool, a highlighting tool, etc. In some embodiments, selecting the text input tool causes the device to enter into a text input mode in which handwritten inputs from the input device received in the content entry region are interpreted as and converted into computer text (e.g., as described with reference to method 700). In some embodiments, selecting the drawing tool causes the device to enter into a drawing mode in which handwritten inputs received in the content entry region are interpreted as a drawing and the input is not converted into computer text. In some embodiments, the menu does not include a virtual keyboard (e.g., soft keyboard) because, for example, text is able to be inputted to the content entry region using handwritten input. In some embodiments, text is able to be entered into the content entry region using the stylus (e.g., according to methods 700 and/or 1300 with or without a virtual keyboard being displayed). In some embodiments, a virtual keyboard is displayed in response to selecting a selectable option on the menu to display the virtual keyboard. In some embodiments, text is able to be entered by interacting with the virtual keyboard using the stylus, finger, or other input device (e.g., selecting the keys on the virtual keyboard).

The above-described manner of providing content entry options (e.g., by displaying a content entry user interface that includes a soft keyboard when the input is received from a finger and displaying the content entry user interface without the soft keyboard when the input is received from a stylus) allows the electronic device to provide the user with a context specific menu for entering content into a content entry region (e.g., by determining that a virtual keyboard should be displayed if the user is using his or her finger to enter content, and by determining that no virtual keyboard should be displayed if the user is using a stylus (e.g., because handwritten input is optionally converted into computer text) and displaying the appropriate options accordingly), which simplifies the interaction between the user and the electronic device and enhances the operability of the electronic device and makes the user-device interface more efficient (e.g., by providing the user with the appropriate options based on the user's input device without requiring the user to navigate to a separate menu or perform additional inputs to reach the same options), which additionally reduces power usage and improves battery life of the electronic device by enabling the user to use the electronic device more quickly and efficiency.

In some embodiments, while displaying the content entry user interface that includes the soft keyboard for entering text into the content entry region, the electronic device detects (1512), via the touch-sensitive display, a second user input in the content entry region, such as in FIG. 14R. In some embodiments, in response to detecting the second user input (1514), in accordance with a determination that the second user input comprises input with the stylus in the content entry region, the electronic device ceases (1516) display of the soft keyboard, such as in FIG. 14S (e.g., while displaying a soft keyboard on the display, receiving an input from a stylus). In some embodiments, in response to receiving an input from the stylus, removing display of the soft keyboard. In some embodiments, the content entry user interface remains displayed and the soft keyboard is replaced with one or more options for controlling input from the stylus (e.g., text input tool, drawing tool, etc.). In some embodiments, the content entry user interface is also removed from display and no options are displayed to the user.

The above-described manner of removing display of a soft keyboard (e.g., by receiving an input from a stylus and removing display of the soft keyboard) allows the electronic device to update the menu for entering content to remove the keyboard when it's no longer needed (e.g., by determining that a virtual keyboard is unnecessary if the user is using a stylus (e.g., because handwritten input is optionally converted into font-based text such that a soft keyboard is unnecessary)), which simplifies the interaction between the user and the electronic device and enhances the operability of the electronic device and makes the user-device interface more efficient (e.g., by automatically providing the user with the appropriate options based on the user's switching to using a stylus without requiring the user to navigate to a separate menu or perform additional inputs to remove the soft keyboard), which additionally reduces power usage and improves battery life of the electronic device by enabling the user to use the electronic device more quickly and efficiency.

In some embodiments, while displaying the content entry user interface for generating content using the stylus without displaying the soft keyboard for entering text into the content entry region (e.g., while displaying the menu that is displayed when the user is interacting with the display with a stylus), the electronic device detects (1518), via the touch-sensitive display, a second user input in the content entry region, such as in FIG. 14P.

In some embodiments, in response to detecting the second user input (1520), in accordance with a determination that the second user input comprises input with a finger in the content entry region, the electronic device displays (1522), on the touch-sensitive display, the soft keyboard, such as in FIG. 14Q (e.g., if the menu is displayed without a soft keyboard and an input is received from a finger (e.g., from an input device other than the stylus), then update the menu to include or otherwise display the soft keyboard). In some embodiments, updating the menu includes removing the options that were displayed to the user when the user was interacting with the device using a stylus. In some embodiments, updating the menu includes switching to a virtual keyboard mode.

The above-described manner of displaying a soft keyboard (e.g., by receiving an input from a finger and displaying the soft keyboard) allows the electronic device to update the menu for entering content to display the keyboard when it may be needed (e.g., by determining that a virtual keyboard is likely needed if the user is interacting with his or her finger (e.g., to enter text)), which simplifies the interaction between the user and the electronic device and enhances the operability of the electronic device and makes the user-device interface more efficient (e.g., by automatically providing the user with a soft keyboard based on the user's switching to using his or her finger without requiring the user to navigate to a separate menu or perform additional inputs to display the soft keyboard), which additionally reduces power usage and improves battery life of the electronic device by enabling the user to use the electronic device more quickly and efficiency.

In some embodiments, in accordance with a determination that the content entry region satisfies one or more criteria, the content entry user interface for generating content using the stylus without displaying the soft keyboard for entering text into the content entry region includes one or more tools for controlling drawing content entry into the content entry region using the stylus (1524), such as in FIG. 14E (e.g., displaying drawing tools in the content entry menu). For example, the drawing tools include selectable options for selecting or changing the color of the drawing, selectable options for changing the size or shape of the drawing, selectable option to switch to a highlighting mode, text-entry mode, etc. In some embodiments, the criteria is satisfied if the content entry mode is compatible with simultaneously displaying or otherwise accepting as a user input, text and drawing. In some embodiments, if the criteria is not satisfied (e.g., if the content entry region only accepts text or drawings, for example), then the content entry user interface is not displayed or displayed with only a subset of the options (e.g., the options that are compatible with the content entry region). For example, if the content entry region only is compatible with text and not drawings, then do not display selectable options for changing the size or shape of the drawing, or selectable options for switching to highlighting mode, etc.

The above-described manner of displaying a tools for controlling drawing from the stylus (e.g., by automatically displaying drawing options when the content entry region satisfies certain criteria (e.g., accepts drawing inputs)) allows the electronic device to update the menu based on the characteristic of the content entry region (e.g., by determining that the content entry region supports drawings and displaying options for the user to control drawing content), which simplifies the interaction between the user and the electronic device and enhances the operability of the electronic device and makes the user-device interface more efficient (e.g., by automatically providing the user with the options that are available based on the compatibility of the content entry region without requiring the user to navigate to a separate menu or perform additional inputs to activate the same options), which additionally reduces power usage and improves battery life of the electronic device by enabling the user to use the electronic device more quickly and efficiency.

In some embodiments, the content entry region satisfies the one or more criteria when the content entry region is capable of accepting drawing input, and does not satisfy the one or more criteria when the content entry region is not capable of accepting drawing input (1526), such as in FIGS. 14B and 14E (e.g., if the content entry region is capable of accepting drawings from the user, then displaying the options for controlling entry of drawings). In some embodiments, if the content entry region is not capable of accepting drawings from the user, then do not display options for controlling entry of drawings.

The above-described manner of displaying tools for controlling drawing from the stylus (e.g., by automatically displaying drawing options when the content entry region supports drawing options) allows the electronic device to update the menu based on the characteristic of the content entry region (e.g., by determining that the content entry region supports drawings and displaying options for the user to control drawing content), which simplifies the interaction between the user and the electronic device and enhances the operability of the electronic device and makes the user-device interface more efficient (e.g., by automatically providing the user with the options that are available based on the compatibility of the content entry region without requiring the user to navigate to a separate menu or perform additional inputs to activate the same options), which additionally reduces power usage and improves battery life of the electronic device by enabling the user to use the electronic device more quickly and efficiency.

In some embodiments, the content entry user interface for generating content using the stylus includes (1528): one or more tools for controlling drawing content entry into the content entry region using the stylus (1530) (e.g., a pencil tool, a pen tool, a highlighting tool, a marker tool, a charcoal tool, etc.); and a respective text entry tool for entering font-based text into the content entry region using handwritten input from the stylus (1532), such as in FIG. 14E (e.g., a text entry tool in which handwritten inputs are interpreted and converted into text (e.g., according to method 700 and/or 1300)).

The above-described manner of displaying tools for controlling input from the stylus (e.g., by displaying options for drawing and entering text when the content entry region supports entry of both drawings and text) allows the electronic device to update the menu based on the characteristic of the content entry region (e.g., by determining that the content entry region supports drawings and text and displaying options for the user to enter drawing content and text), which simplifies the interaction between the user and the electronic device and enhances the operability of the electronic device and makes the user-device interface more efficient (e.g., by automatically providing the user with the options that are available based on the compatibility of the content entry region without requiring the user to navigate to a separate menu or perform additional inputs to activate the same options), which additionally reduces power usage and improves battery life of the electronic device by enabling the user to use the electronic device more quickly and efficiency.

In some embodiments, the content entry user interface for generating content using the stylus includes (1534): a first set of one or more tools, including the one or more tools, for controlling drawing content entry into the content entry region using the stylus (1536), such as in FIG. 14E (e.g., one or more selectable options for controlling drawing content such selectable options for controlling the color of the drawing input (e.g., a color palette and one or more preset colors)), a second set of one or more tools, including the respective text entry tool, for controlling font-based text entry into the content entry region (1538), such as in FIG. 14O (e.g., a set of options including a text-entry tool in which handwritten input is interpreted and converted into font-based text), and a selectable option for alternating between displaying, in the content entry user interface, the first set of one or more tools and the second set of one or more tools (1540), such as in FIG. 14O (e.g., a selectable option on the content entry user interface for toggling the menu between displaying the first set of options and displaying the second set of options).

The above-described manner of displaying sets of tools for controlling input from the stylus (e.g., by a selectable option to switch between a set first of tools and a second set of tools) allows the electronic device to provide multiple options and organize the options based on usage (e.g., by organizing tools into a first set or a second set of options and providing an option to switch between selecting from one set of options and selecting from a second set of options), which simplifies the interaction between the user and the electronic device and enhances the operability of the electronic device and makes the user-device interface more efficient (e.g., by providing the user with multiple sets of the options that are available based on the compatibility of the content entry region and allowing the user to switch between the two sets without requiring the user to navigate to a separate menu or perform additional inputs to access the same options), which additionally reduces power usage and improves battery life of the electronic device by enabling the user to use the electronic device more quickly and efficiency.

In some embodiments, while displaying the content entry user interface that includes the soft keyboard for entering text into the content entry region, the electronic device detects (1542), via the touch-sensitive display, an input corresponding to a request to cease display of the soft keyboard, wherein the soft keyboard is displayed with one or more selectable options for modifying text in the content entry region, such as in FIG. 14U (e.g., receiving an input that removes display of the soft keyboard from the content entry user interface such as receiving an input from a stylus). In some embodiments, the content entry user interface includes options for modifying the text that is entered by the soft keyboard, such as font size, font style (e.g., bold, italics, underline, etc.).

In some embodiments, in response to receiving the input corresponding to the request to cease display of the soft keyboard (1544), the electronic device ceases (1546) display of the soft keyboard while maintaining display, in the user interface, of the one or more selectable options for modifying text in the content entry region, such as in FIG. 14V (e.g., removing display of the soft keyboard in response to the request to cease displaying the soft keyboard, but maintaining selectable options for modifying the text that is entered). In some embodiments, the options are displayed in the content entry user interface as selectable options different from the options that were displayed concurrently with the soft keyboard. In some embodiments, the options were displayed in the soft keyboard and after the soft keyboard dismissed, the options are relocated to the content entry user interface.

The above-described manner of maintaining display of options for modifying text (e.g., by displaying options for modifying text when a soft keyboard is shown and maintaining options for modifying text after the soft keyboard is dismissed) allows the electronic device to continue to provide the user with options for modifying text (e.g., by maintaining display of the options for modifying text even after the soft keyboard is dismissed when it is likely that the user will want the options (e.g., because the user is using a stylus to input text instead of the soft keyboard)), which simplifies the interaction between the user and the electronic device and enhances the operability of the electronic device and makes the user-device interface more efficient (e.g., by maintaining the options for modifying text when the user begins to enter text using a stylus without requiring the user to navigate to a separate menu or perform additional inputs to access the same options), which additionally reduces power usage and improves battery life of the electronic device by enabling the user to use the electronic device more quickly and efficiency.

In some embodiments, while displaying the content entry user interface that includes the soft keyboard for entering text into the content entry region, wherein the soft keyboard includes one or more first keys and one or more second keys, the electronic device detects (1548), via the touch-sensitive display, an input corresponding to a request to cease display of the soft keyboard, such as in FIG. 14U (e.g., the soft keyboard includes a number of selectable options and/or keys such as an enter button and/or a "go" button (e.g., for executing navigation to a website)).

In some embodiments, in response to receiving the input corresponding to the request to cease display of the soft keyboard (1550): the electronic device ceases (1552) display of the soft keyboard; and the electronic device displays (1554), in the user interface, one or more selectable options corresponding to the one or more first keys, such as in FIG. 14V (e.g., maintaining display of one or more of the selectable options that was previously displayed on the soft keyboard, such as the enter button and/or the "go" button). In some embodiments, maintaining display of the one or more selectable options includes relocating the selectable option to another location on the user interface that is different from the content entry user interface (e.g., different from the content entry menu). In some embodiments, the selectable option is relocated to a menu of the user interface of the application currently being displayed. For example, the enter or "go" button is relocated to the URL navigation menu of a browser application.

The above-described manner of maintaining display of one or more selectable options (e.g., by relocating one or more options from the soft keyboard to the user interface of the application after the soft keyboard is dismissed) allows the electronic device to continue to provide the user with select keyboard options (e.g., by maintaining display of the options even after the soft keyboard is dismissed when it is likely that the user will want the options), which simplifies the interaction between the user and the electronic device and enhances the operability of the electronic device and makes the user-device interface more efficient (e.g., by maintaining the options when the user dismisses the keyboard but is still interacting with the user interface without requiring the user to navigate to a separate menu or perform additional inputs to access the same options), which additionally reduces power usage and improves battery life of the electronic device by enabling the user to use the electronic device more quickly and efficiency.

It should be understood that the particular order in which the operations in FIGS. 15A-15F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1600, 1800, 2000, and 2200) are also applicable in an analogous manner to method 1500 described above with respect to FIGS. 15A-15F. For example, the operations of presenting a handwritten entry menu described above with reference to method 1500 optionally have one or more of the characteristics of the acceptance and/or conversion of handwritten inputs, selection and deletion of text, inserting handwritten inputs into pre-existing text, managing the timing of converting handwritten text into font-based text, controlling the characteristics of handwritten input, presenting autocomplete suggestions, and converting handwritten input to font-based text, displaying options in a content entry palette, etc., described herein with reference to other methods described herein (e.g., methods 700, 900, 1100, 1300, 1600, 1800, 2000, and 2200). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 15A-15F are, optionally, implemented by components depicted in FIGS. 1A-1B. For example, displaying operations 1502, 1508, 1510, 1522, and 1554 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 16A-16D are flow diagrams illustrating a method 1600 of controlling the characteristics of handwritten input based on selections on a handwritten entry menu. The method 1600 is optionally performed at an electronic device such as device 100, device 300, device 500, device 501, device 510, and device 591 as described above with reference to FIGS. 1A-1B, 2-3, 4A-4B and 5A-5I. Some operations in method 1600 are, optionally combined and/or order of some operations is, optionally, changed As described below, the method 1600 provides ways to control the characteristics of handwritten input based on selections on a handwritten entry menu. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., an electronic device, a mobile device (e.g., a tablet, a smartphone, a media player, or a wearable device) including a touch screen, or a computer including a touch screen, such as device 100, device 300, device 500, device 501, or device 591) in communication with a touch-sensitive display displays (1602), on the touch-sensitive display, a content entry user interface, such as in FIG. 14A (e.g., a user interface with a content entry region in which a user is able to enter text, images, multimedia, etc.) For example, in an email composition user interface, a content entry region for the body of the email is capable of receiving (and transmitting over email) text, still images, videos, attachments, etc.

In some embodiments, while displaying the content entry user interface, the electronic device receives (1604), via the touch-sensitive display, a handwritten user input corresponding to the content entry user interface, such as in FIG. 14F (e.g., receiving a handwritten input on the touch-sensitive display (e.g., using a stylus, finger, or other writing device)). In some embodiments, the input is received in a user interface element that is capable of receiving and/or displaying text, still images, videos, attachments, etc.

In some embodiments, in response to receiving the handwritten user input (1606), in accordance with a determination that a text entry drawing tool was selected when the handwritten user input was detected, the electronic device initiates (1608) a process to convert the handwritten user input into a first sequence of font-based text characters, in the content entry user interface, corresponding to the handwritten user input, such as in FIG. 14G (e.g., displaying a handwriting menu including a one or more selectable options to select respective drawing tools including a selectable option for selecting a text entry drawing tool). In some embodiments, the text entry drawing tools allows a user to perform handwritten input and for the handwritten input to be interpreted as text and converted into font-based text. In some embodiments, if the text entry drawing tool is selected, then the user's handwritten input is interpreted as and converted into font-based text (e.g., as described with reference to method 700 and/or method 1300). In some embodiments, the device enters text input mode when a text entry drawing tool is selected from the handwriting menu.

In some embodiments, in response to receiving the handwritten user input (1606), in accordance with a determination that a drawing tool other than the text entry drawing tool was selected when the handwritten input was detected, the electronic device displays (1610), in the content entry user interface, a visual representation of the handwritten user input without initiating the process to convert the handwritten user input into the first sequence of font-based text characters, such as in FIGS. 14K and 14M (e.g., when the text entry drawing tool is not selected and another drawing tool in the handwriting menu is selected, then handwritten inputs are interpreted as a drawing and the input is not converted into font-based text (e.g., the handwritten input is displayed on the display, and is not removed and replaced with computer text)). In some embodiments, the device enters into drawing mode if a drawing tool other than the text entry drawing tool is selected. In some embodiments, the handwritten input is converted into an image or graphics element, but otherwise is substantially visually unchanged (e.g., not removed and not converted into computer text).

The above-described manner of interpreting handwritten input (e.g., by converting handwritten user input to text if a text entry mode is active and not converting the handwritten user input if text entry mode is not active) allows the electronic device to provide the user with the ability to switch between writing text and not writing text (e.g., by converting handwritten input into text if the text entry mode is active or leaving the handwritten input unmodified if the text entry mode is not active), which simplifies the interaction between the user and the electronic device and enhances the operability of the electronic device and makes the user-device interface more efficient (e.g., by allowing the user to use the same handwritten input to enter text or draw an image by toggling the text entry mode without requiring the user to switch to a different input device or navigate to a separate user interface to switch between entering text and drawing an image), which additionally reduces power usage and improves battery life of the electronic device by enabling the user to use the electronic device more quickly and efficiency.

In some embodiments, in accordance with a determination that the text entry drawing tool is selected, the electronic device displays (1612), in the content entry user interface, one or more options for controlling formatting of font-based text in the content entry user interface, such as in FIG. 14E (e.g., when the text entry drawing tool is selected and the system is in text entry mode (e.g., handwritten inputs are converted into font-based text), then the content entry user interface includes options for formatting the converted font-based text). For example, the content entry user interface includes options for changing the font, the font size, the font style (bold, italics, underlines, etc.).

The above-described manner of presenting input options (e.g., by presenting font-based text formatting options when the text entry drawing tool is selected) allows the electronic device to provide the user with the most relevant options for the input operation that is selected (e.g., by presenting font-based text formatting options when the text entry drawing tool enables handwritten input to be converted into font-based text), which simplifies the interaction between the user and the electronic device and enhances the operability of the electronic device and makes the user-device interface more efficient (e.g., by automatically determining the options that are likely desired by the user without requiring the user to navigate to a separate user interface or perform additional inputs to access the same options), which additionally reduces power usage and improves battery life of the electronic device by enabling the user to use the electronic device more quickly and efficiency.

In some embodiments, in accordance with a determination that a drawing tool other than the text entry drawing tool is selected, the electronic device displays (1614), in the content entry user interface, one or more options for controlling drawing input entry in the content entry user interface, such as in FIG. 14I (e.g., when other drawing tools are selected such as the pencil tool, pen tool, marker tool, etc., then the content entry user interface includes options for controlling the handwritten drawings). For example, the content entry user interface includes options for changing the color and size of the drawing. In some embodiments, one or more preselected color options are presented to the user. In some embodiments, a selectable option is selectable to display a full color spectrum in which the user is able to select a color.

The above-described manner of presenting input options (e.g., by presenting drawing input options when a drawing tool other than the text entry drawing tool is selected) allows the electronic device to provide the user with the most relevant options for the input operation that is selected (e.g., by presenting drawing options when a drawing tool is selected), which simplifies the interaction between the user and the electronic device and enhances the operability of the electronic device and makes the user-device interface more efficient (e.g., by automatically determining the options that are likely desired by the user without requiring the user to navigate to a separate user interface or perform additional inputs to access the same options), which additionally reduces power usage and improves battery life of the electronic device by enabling the user to use the electronic device more quickly and efficiency.

In some embodiments, the content entry user interface includes a selectable option to display a keyboard for entering font-based text in the content entry user interface (1616), such as in FIG. 14T (e.g., the content entry user interface includes a selectable option to display a virtual or soft keyboard in the content entry user interface which, when selected, causes display of a virtual or soft keyboard). In some embodiments, the virtual or soft keyboard replaces the options displayed in the content entry user interface (e.g., the keyboard is the only element presented in the content entry user interface). In some embodiments, the virtual or soft keyboard includes a selectable option to dismiss the virtual or soft keyboard and revert to the options that were presented before the virtual or soft keyboard was presented.

The above-described manner of displaying a virtual keyboard (e.g., by presenting a selectable option to display a virtual keyboard) allows the electronic device to provide the user with the option to switch to entering text using a virtual keyboard (e.g., by presenting a selectable option to display a virtual keyboard to enter text), which simplifies the interaction between the user and the electronic device and enhances the operability of the electronic device and makes the user-device interface more efficient (e.g., by allowing the user to switch from using handwritten input to enter text to using a familiar virtual keyboard to enter text), which additionally reduces power usage and improves battery life of the electronic device by enabling the user to use the electronic device more quickly and efficiency.

In some embodiments, in response to receiving the handwritten user input, the electronic device displays (1618), in the content entry user interface, the visual representation of the handwritten user input, such as in FIGS. 14F and 14L (e.g., displaying the trail of the handwritten input on the display as the input is received regardless of what drawing tool is selected or otherwise active). In other words, as the user "draws" on the touch-sensitive display, the display shows the user's handwritten input at the location where the input was received. More generally, in some embodiments, the handwritten input trail is shown wherever on the touch-sensitive display the handwritten input is received.

In some embodiments, after displaying the visual representation of the handwritten user input in the content entry user interface (1620), in accordance with the determination that the text entry drawing tool was selected when the handwritten user input was detected, the electronic device ceases (1622) to display the visual representation of the handwritten user input in the content entry user interface, and converting the visual representation of the handwritten user input into font-based text, such as in FIG. 14G (e.g., if the text entry drawing tool was selected, then convert the handwritten input into font-based text (e.g., in a manner described with respect to method 700 and/or method 1300)). In some embodiments, converting the handwritten input comprises ceasing display of the trail of the handwritten input and displaying the font-based text.

In some embodiments, after displaying the visual representation of the handwritten user input in the content entry user interface (1620), in accordance with the determination that the text entry drawing tool was not selected when the handwritten user input was detected, the electronic device maintains (1624) display of the visual representation of the handwritten user input in the content entry user interface without converting the visual representation of the handwritten user input into font-based text, such as in FIG. 14M (e.g., if a drawing tool other than the text entry drawing tool was selected, then do not convert the handwritten user input into font-based text and instead, maintaining the display of the handwritten user input). In other words, the handwritten user input is not interpreted as text and is instead interpreted as a drawing and as such, is displayed in the content entry user interface as a drawing. In some embodiments, the handwritten user interface is converted into a drawing file format (e.g., an embedded BMP file, an embedded JPG file, or any other suitable picture object, etc.), but is otherwise visually unchanged.

The above-described manner of displaying handwritten input on the display (e.g., by always displaying the handwritten input as the input is received on the display regardless of the tool that is selected and only removing the handwritten input if it is converted into font-based text (e.g., when the text entry drawing tool is selected)) allows the electronic device to provide the user with visual feedback on the user's handwritten input (e.g., by displaying the handwritten input whenever the handwritten input is received, regardless of the tool that is selected, thus allowing the user to see what the user is inputting), which simplifies the interaction between the user and the electronic device and enhances the operability of the electronic device and makes the user-device interface more efficient (e.g., by providing the user feedback of the user's input whenever the user is performing handwritten input in the content entry user interface), which additionally reduces power usage and improves battery life of the electronic device by enabling the user to use the electronic device more quickly and efficiency while reducing errors in the usage of the device.

In some embodiments, the visual representation of the handwritten user input displayed in accordance with the determination that a drawing tool other than the text entry drawing tool was selected when the handwritten input was detected comprises a line having a respective appearance (1626), such as in FIG. 14E (e.g., displaying the trail of the handwritten input on the display as the input is received when a drawing tool other than the text entry drawing tool is selected (e.g., the pen tool, pencil tool, marker tool, etc.).

In some embodiments, in accordance with a determination that the drawing tool is a first drawing tool, the respective appearance is a first appearance (1628), such as in FIG. 14E (e.g., if the tool that is selected is a respective tool, then the trail of the handwritten input has a first appearance). For example, a pencil tool has a small thickness while a pen tool has a medium thickness and a marker tool has a large thickness. In some embodiments, the tools have a certain shape and size based on the tool selected.

In some embodiments, in accordance with a determination that the drawing tool is a second drawing tool, different than the first drawing tool, the respective appearance is a second appearance, different than the first appearance (1630), such as in FIG. 14E (e.g., if the tool is a second drawing tool, then the appearance corresponds to the selected second drawing tool).

The above-described manner of displaying handwritten input on the display (e.g., by displaying the handwritten input with different appearances based on the drawing tool that is selected) allows the electronic device to provide the user with options for mimicking different drawing utensils (e.g., by displaying the handwritten input with visual characteristics based on the particular drawing tool that was selected), which simplifies the interaction between the user and the electronic device and enhances the operability of the electronic device and makes the user-device interface more efficient (e.g., by providing the user with the ability to mimic different drawing devices using the same input device without requiring the user to navigate to a separate user interface or use a separate input device to achieve different drawing styles), which additionally reduces power usage and improves battery life of the electronic device by enabling the user to use the electronic device more quickly and efficiency while reducing errors in the usage of the device.

It should be understood that the particular order in which the operations in FIGS. 16A-16D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1500, 1800, 2000, and 2200) are also applicable in an analogous manner to method 1600 described above with respect to FIGS. 16A-16D. For example, the operations of controlling the characteristic of handwritten inputs based on selections on the handwritten entry menu described above with reference to method 1600 optionally have one or more of the characteristics of the acceptance and/or conversion of handwritten inputs, selection and deletion of text, inserting handwritten inputs into pre-existing text, managing the timing of converting handwritten text into font-based text, presenting handwritten entry menus, presenting autocomplete suggestions, and converting handwritten input to font-based text, displaying options in a content entry palette, etc., described herein with reference to other methods described herein (e.g., methods 700, 900, 1100, 1300, 1500, 1800, 2000, and 2200). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 16A-16D are, optionally, implemented by components depicted in FIGS. 1A-1B. For example, displaying operations 1502 and receiving operations 1510, 1512, and 1542 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Autocomplete Suggestions for Handwritten Inputs

Users interact with electronic devices in many different manners, including entering text into the electronic device. The embodiments described below provide ways in which an electronic device accepts handwritten inputs from a handwriting input device (e.g., a stylus) and provides the user with autocomplete suggestions, thus enhancing the user's interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 17A:
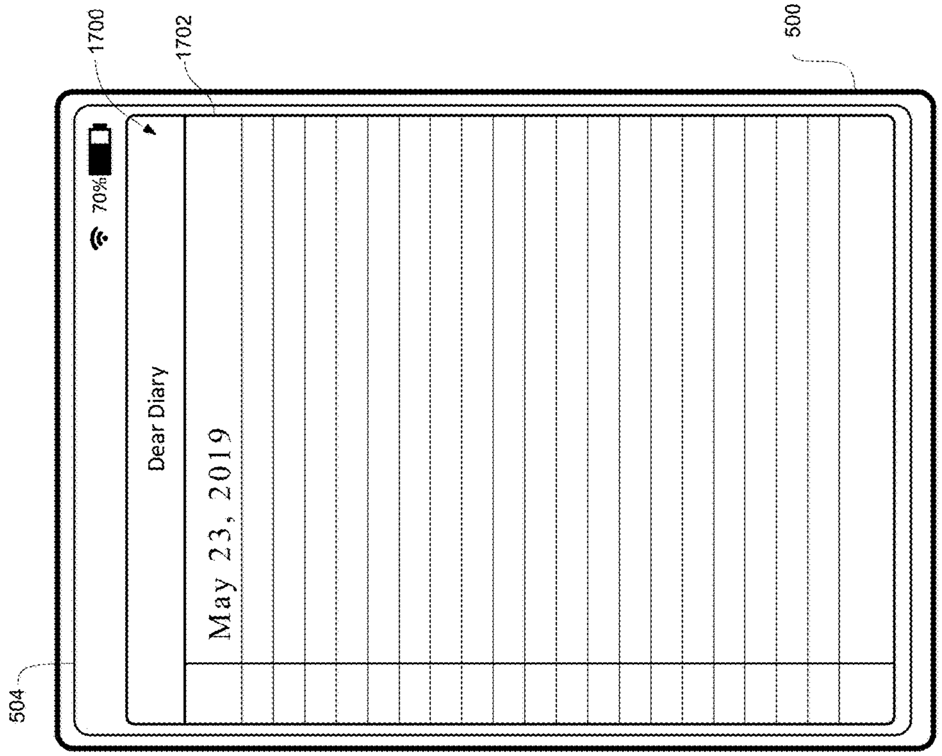
FIGS. 17A-17W illustrate exemplary ways in which an electronic device presents autocomplete suggestions in accordance with some embodiments.
Figure 16D:
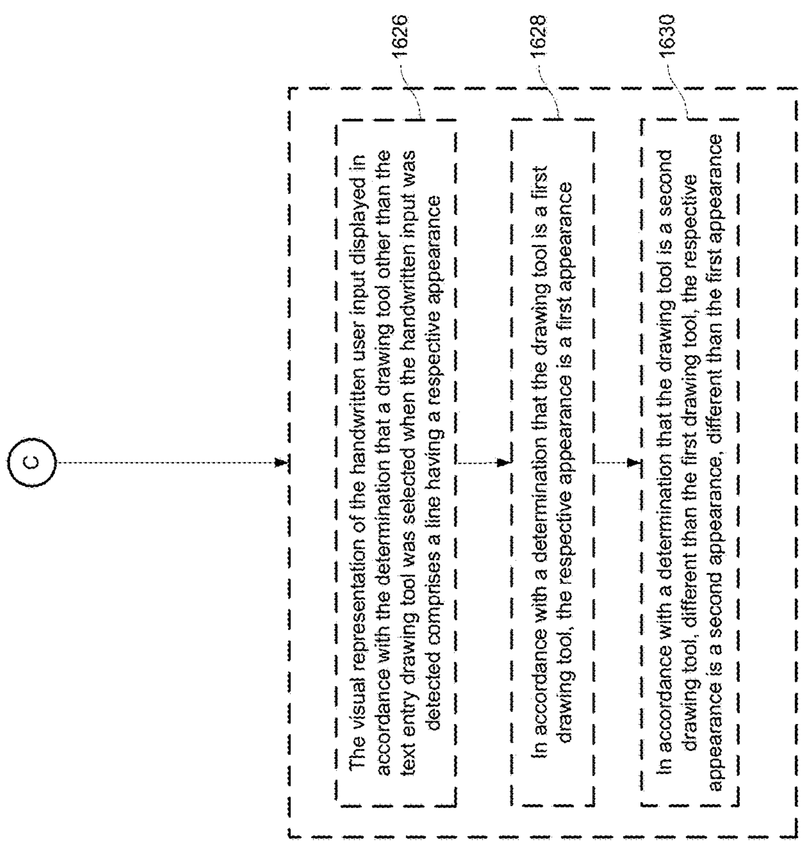
Figure 17C:
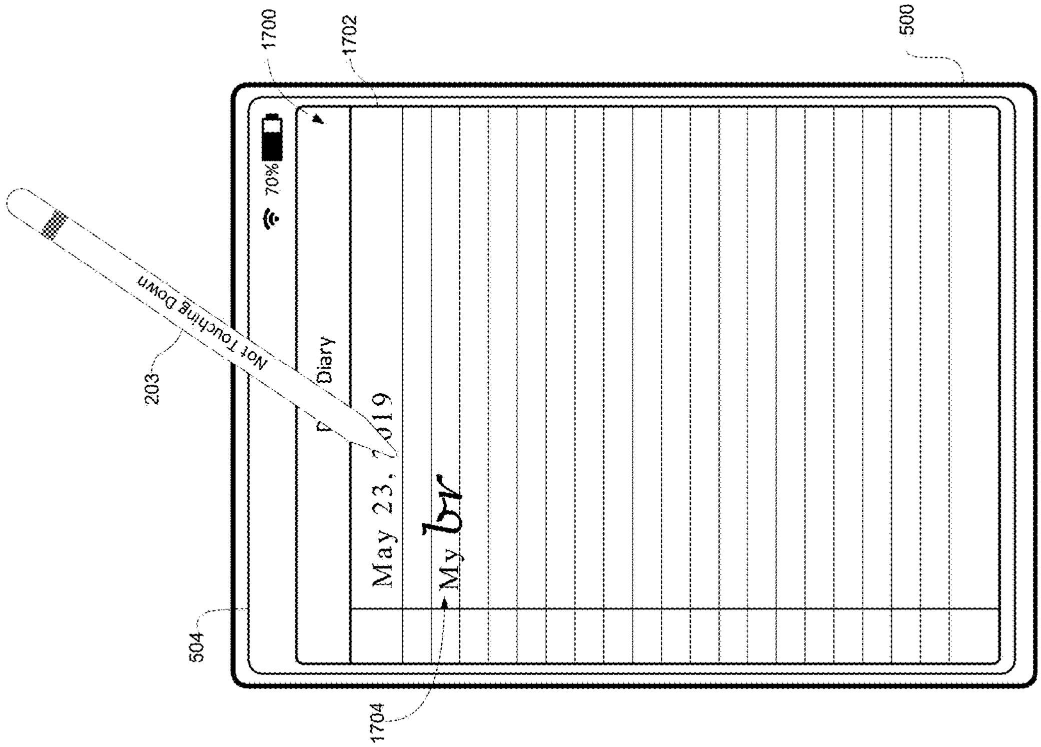
Figure 17B:
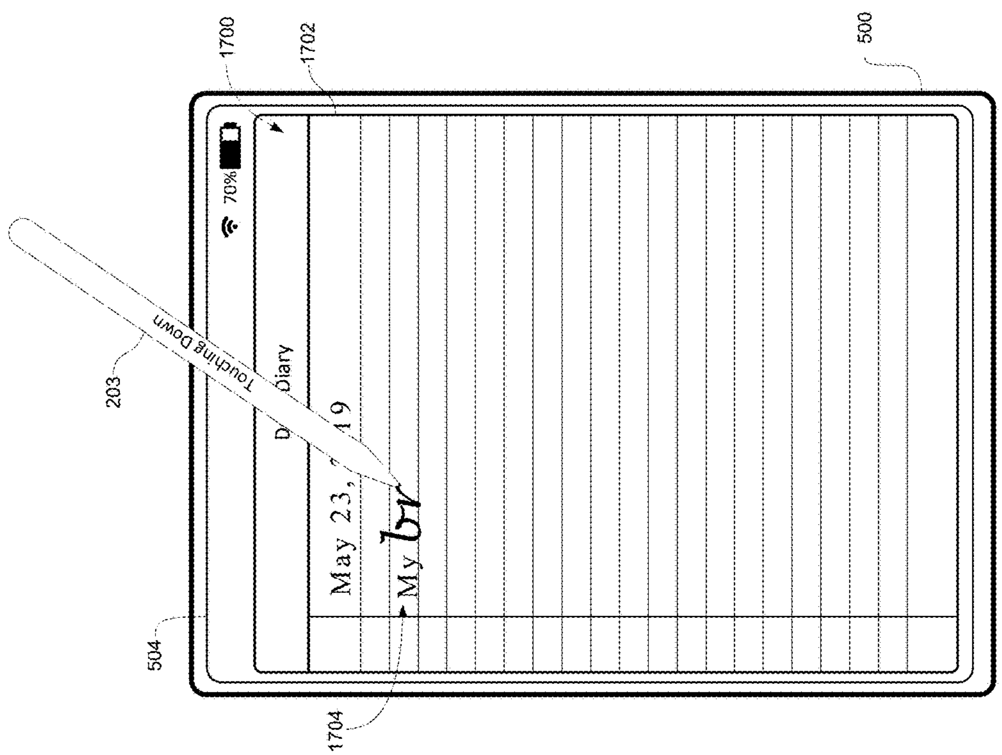
Figure 17E:
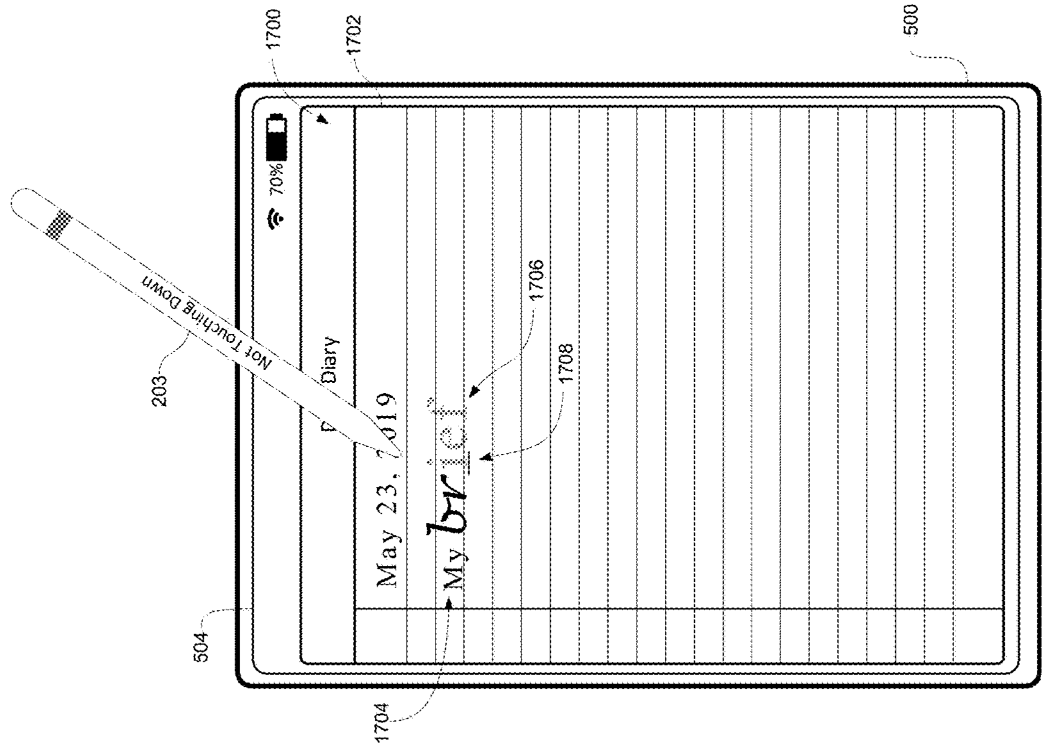
Figure 17D:
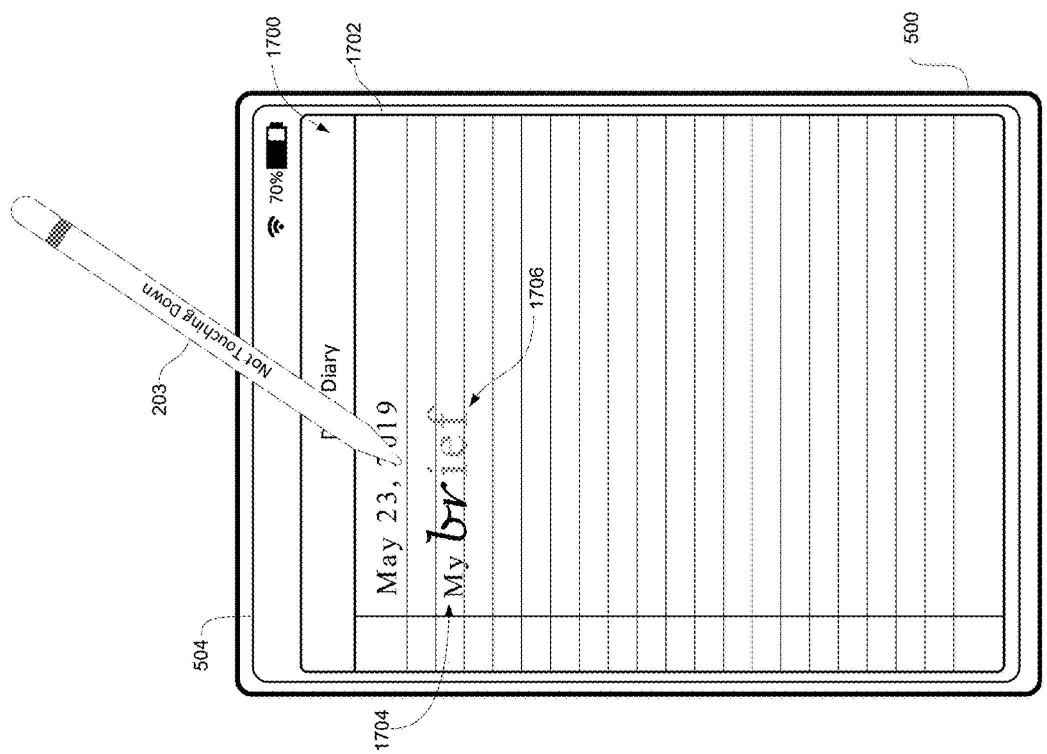
Figure 17G:
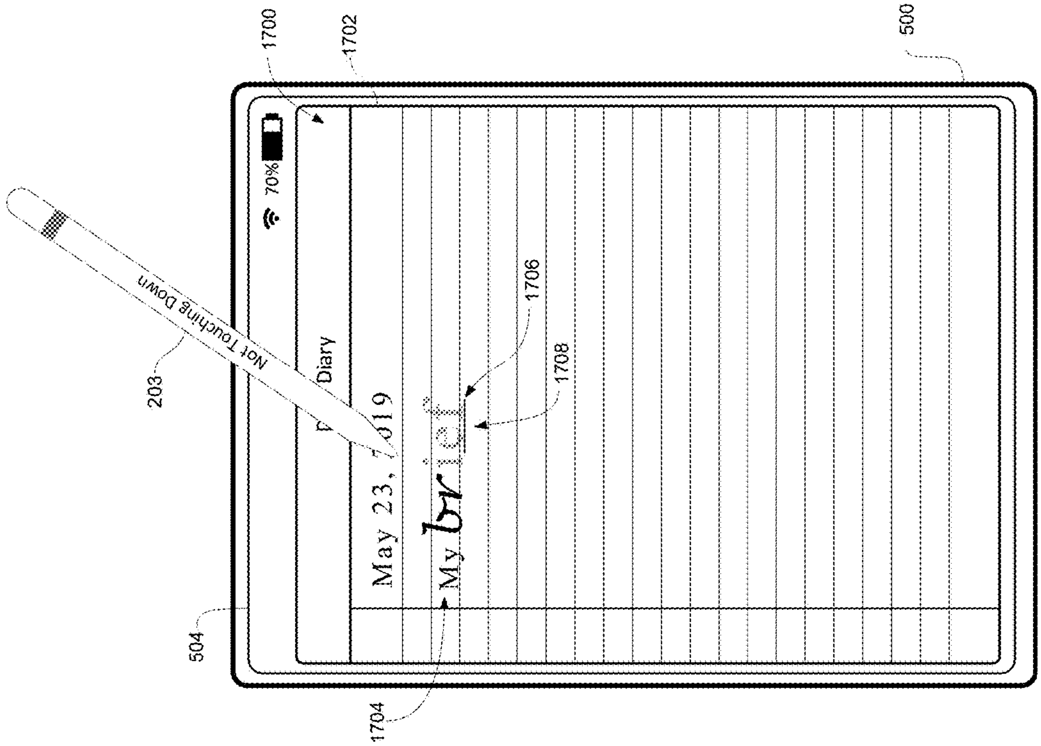
Figure 17F:
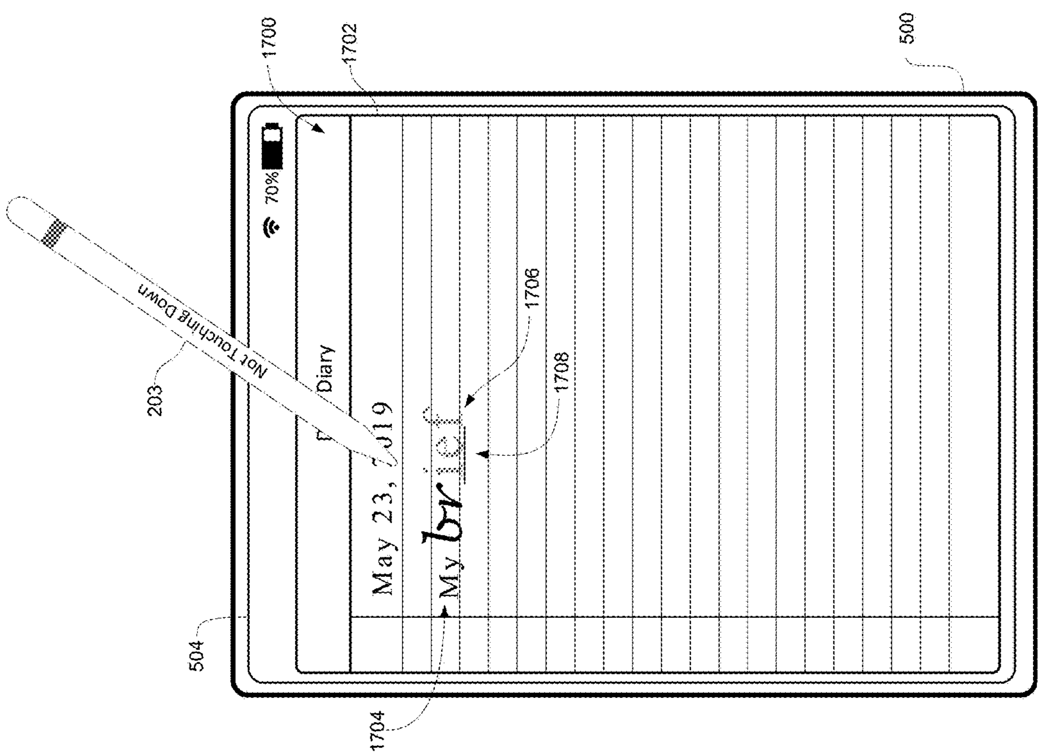
Figure 17I:
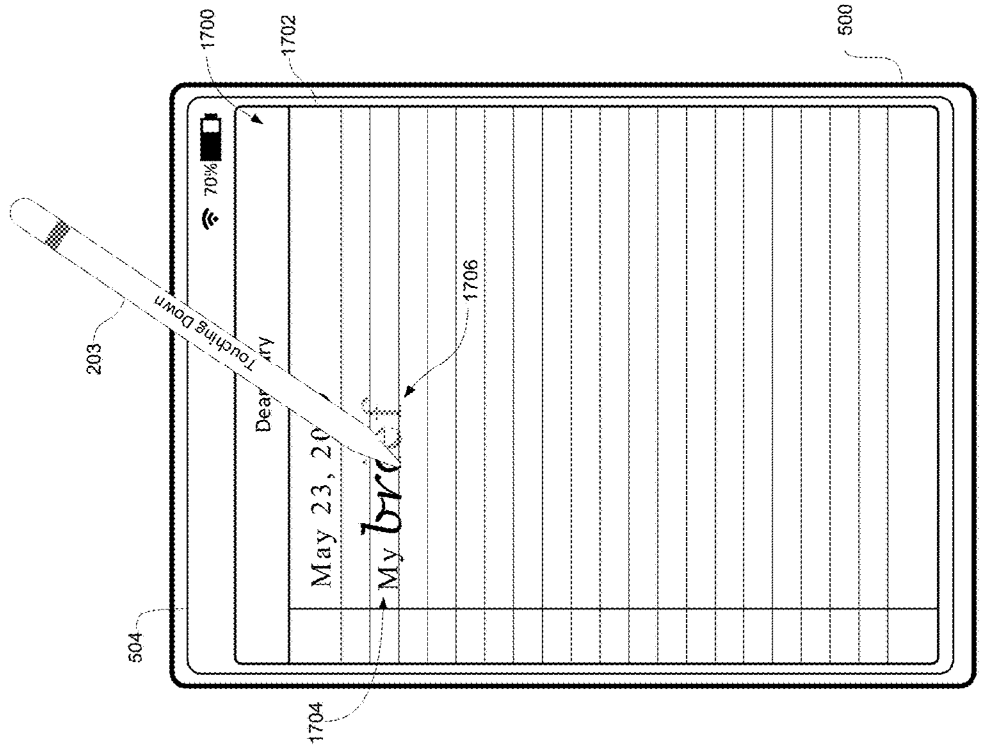
Figure 17H:
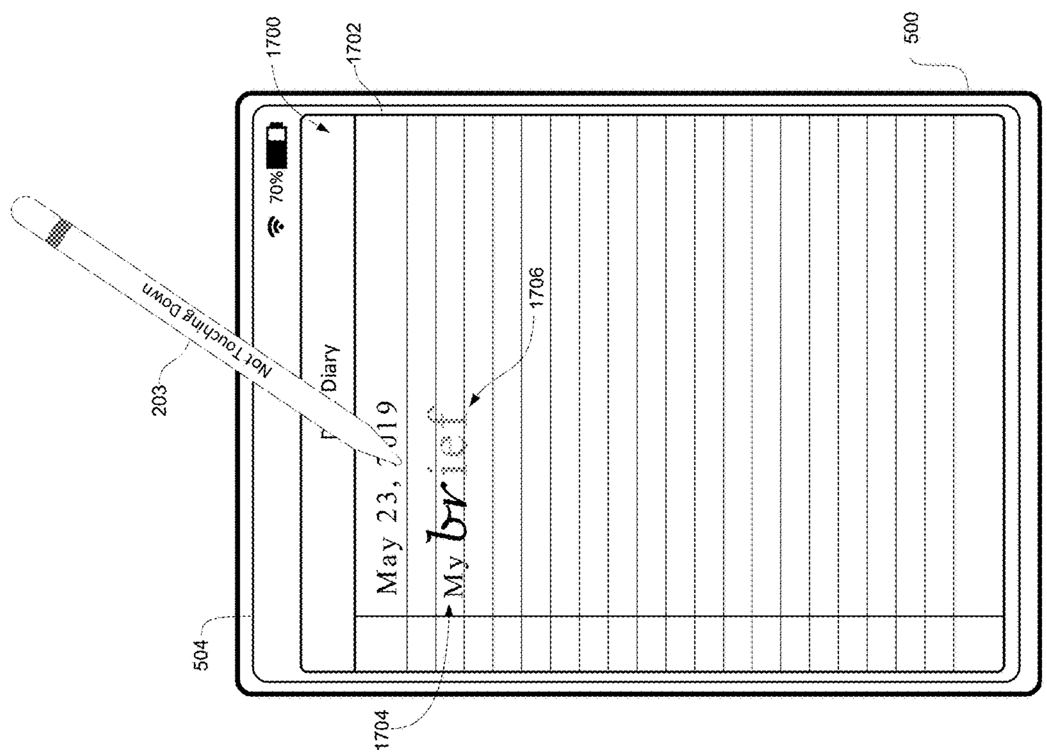
Figure 17K:
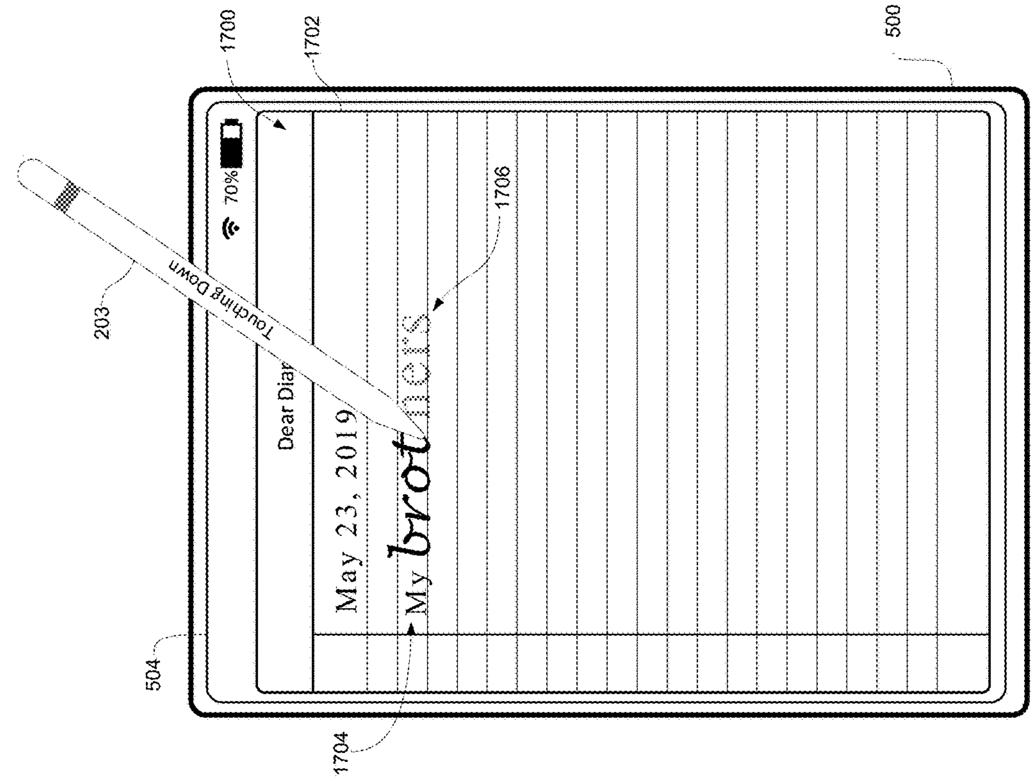
Figure 17J:
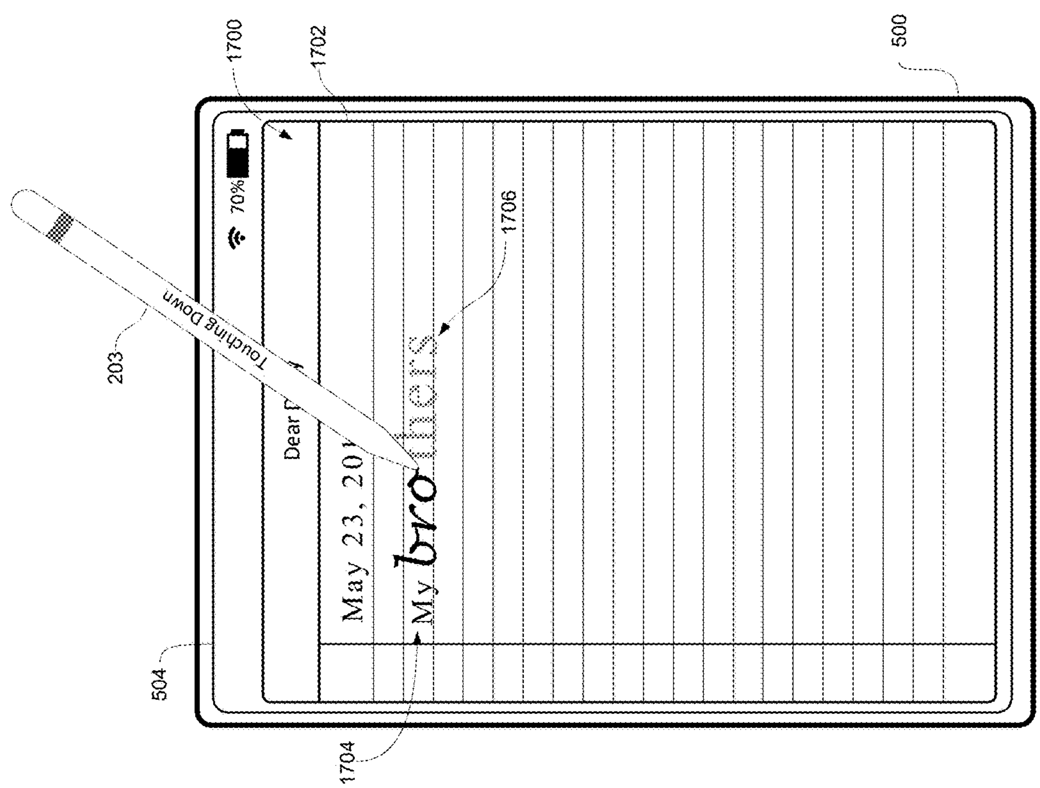
Figure 17M:
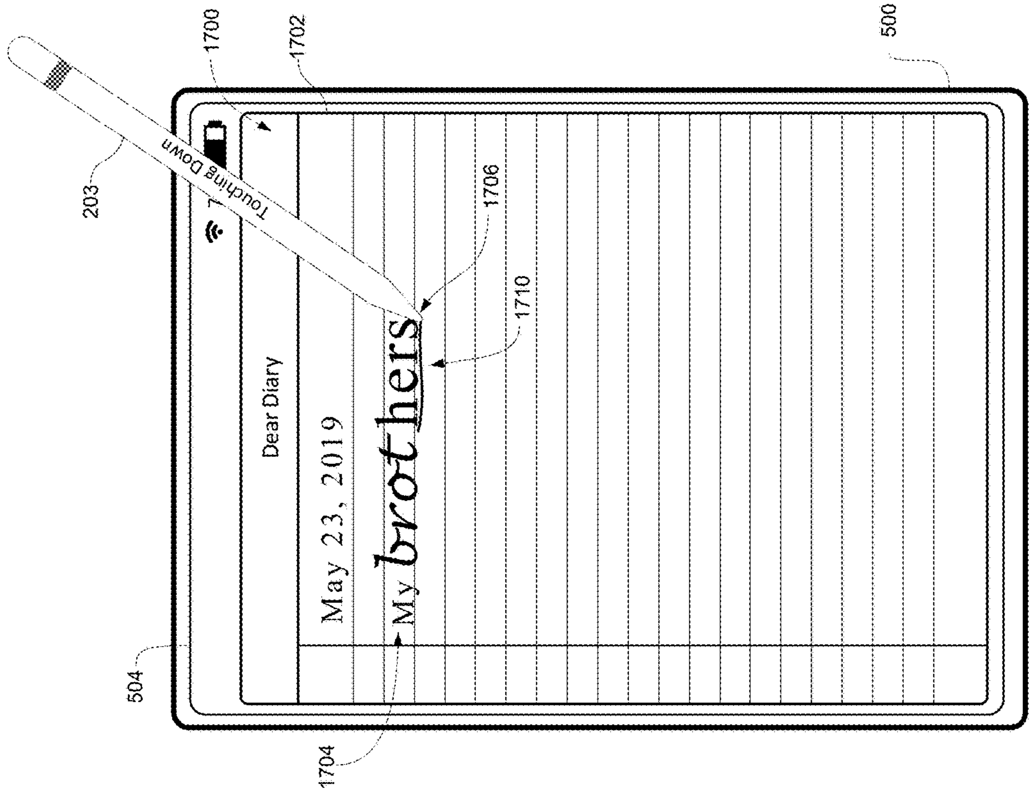
Figure 17L:
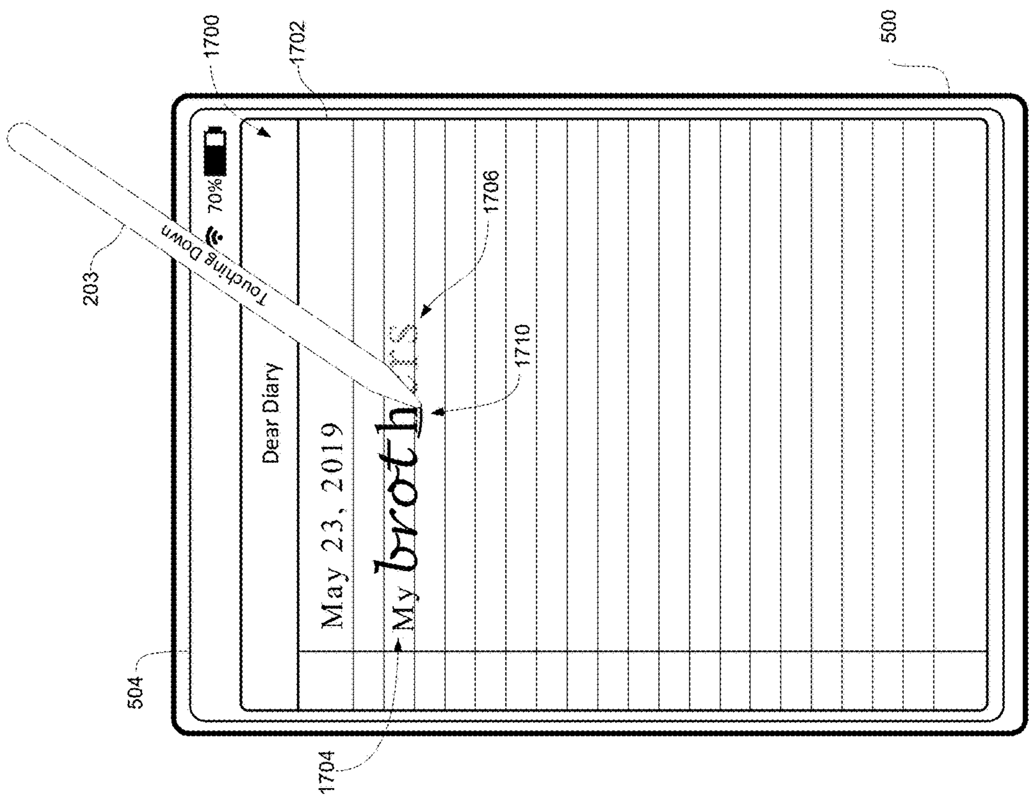
Figure 17O:
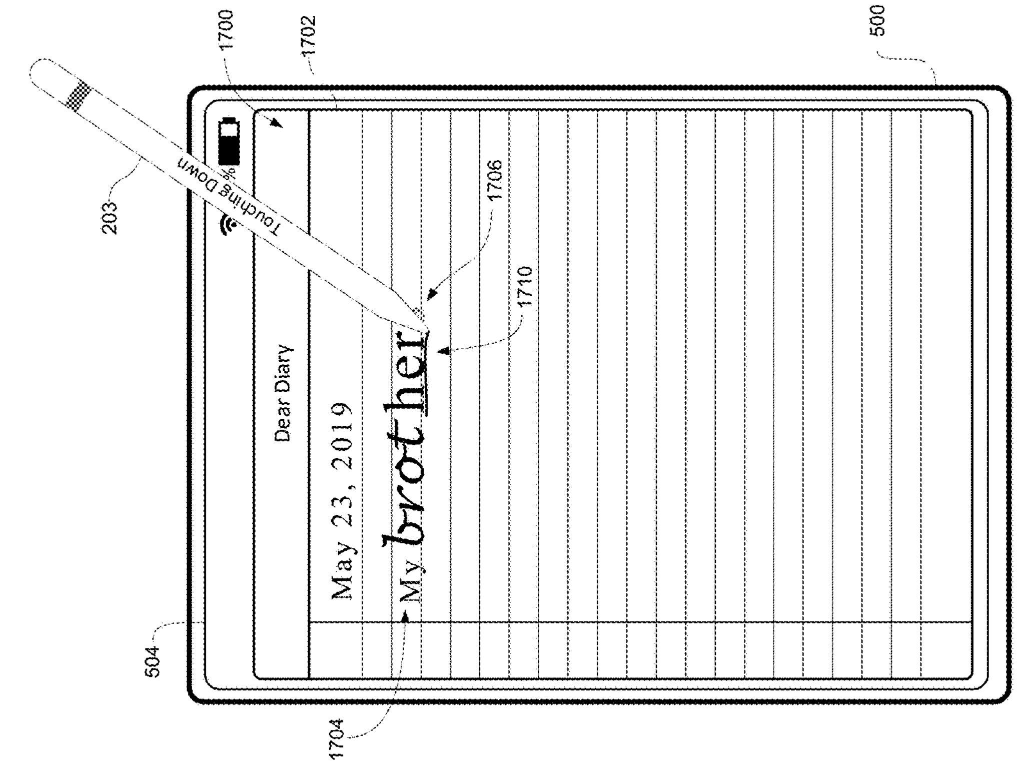
Figure 17N:
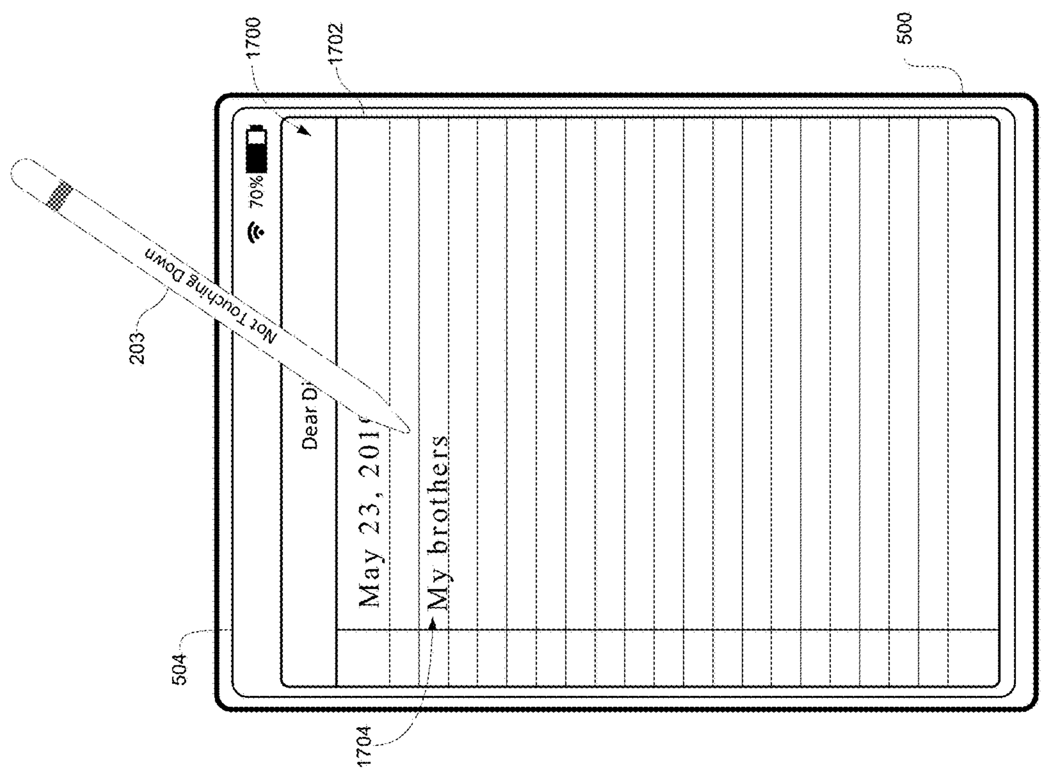
Figure 17Q:
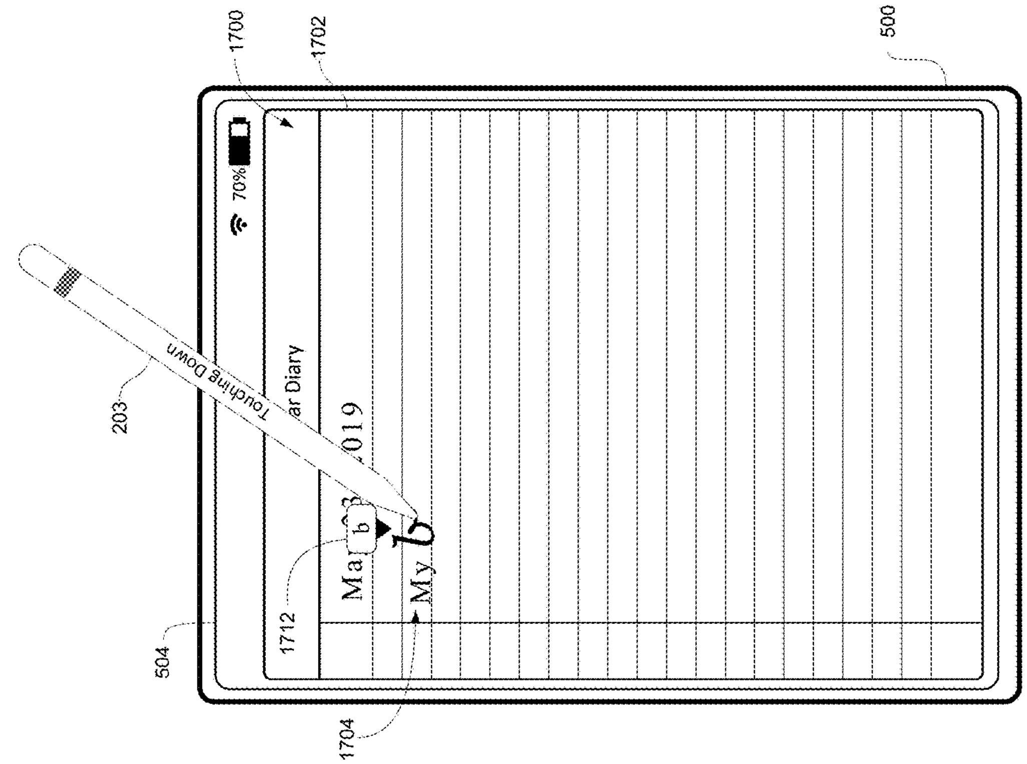
Figure 17P:
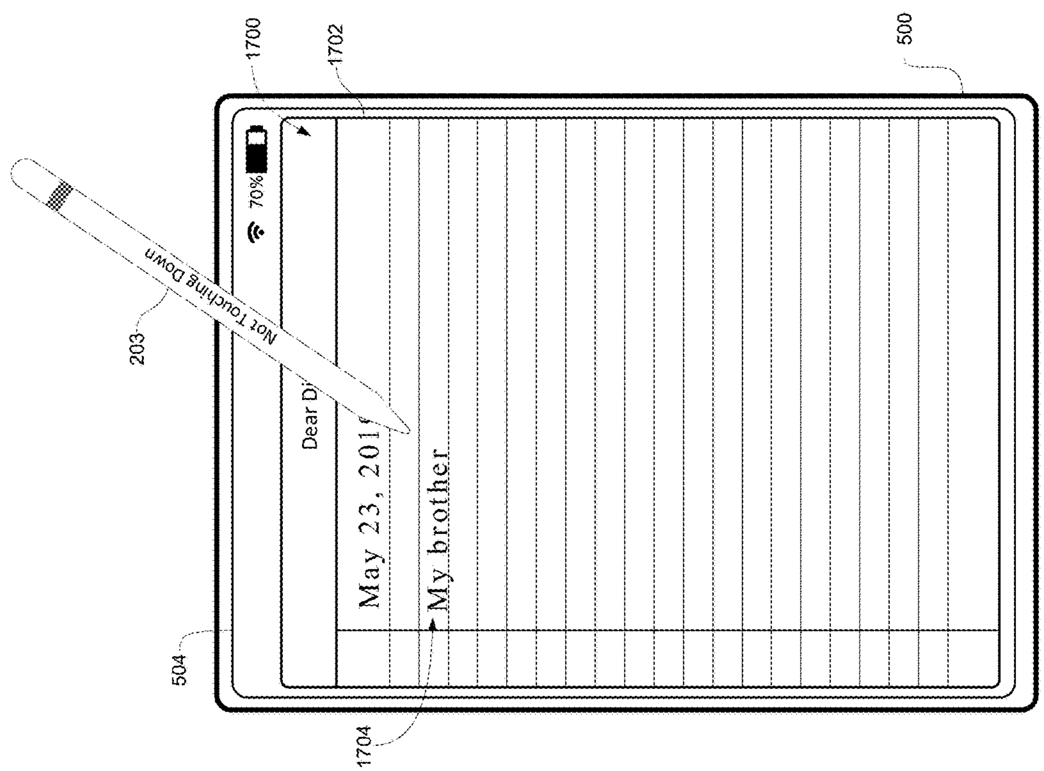
Figure 17S:
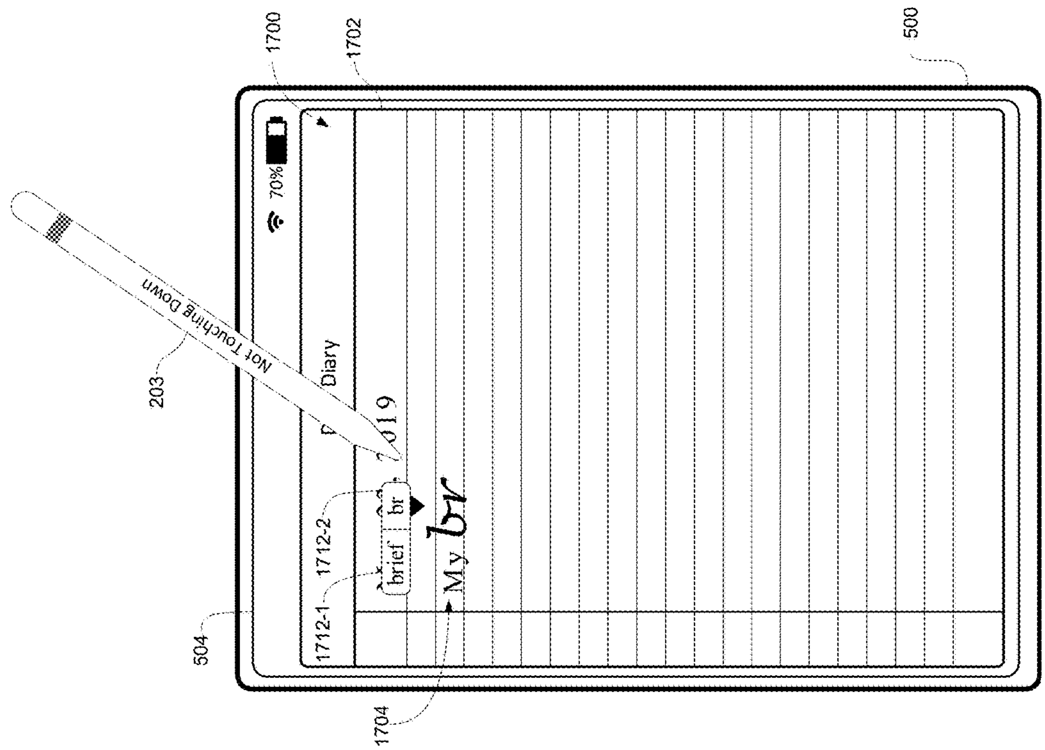
Figure 17R:
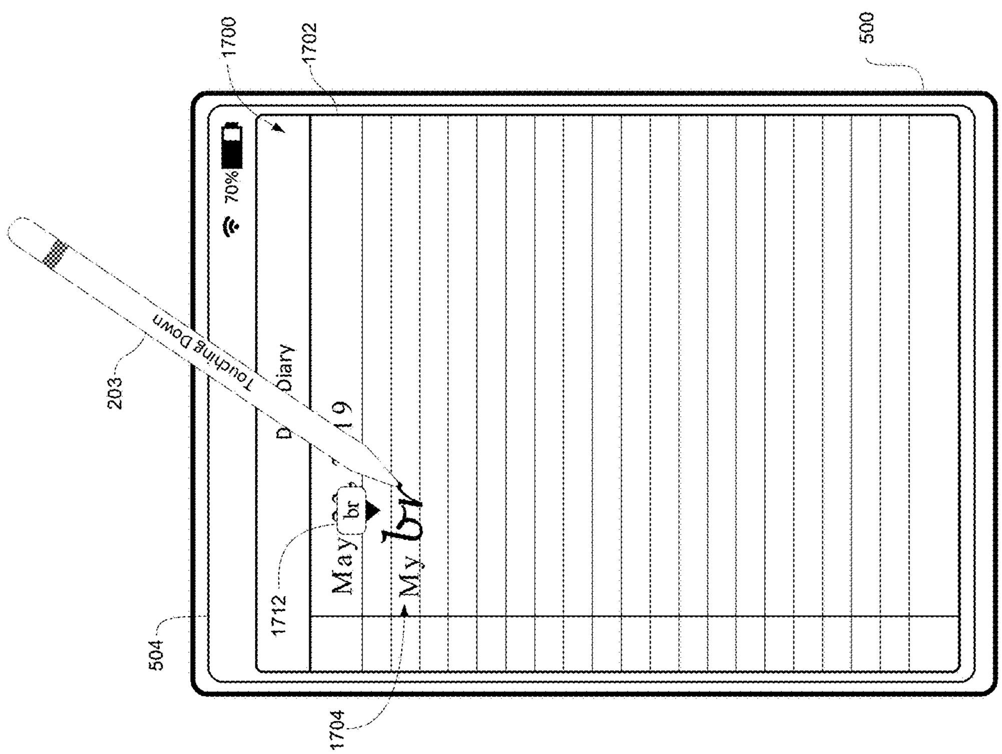
Figure 17U:
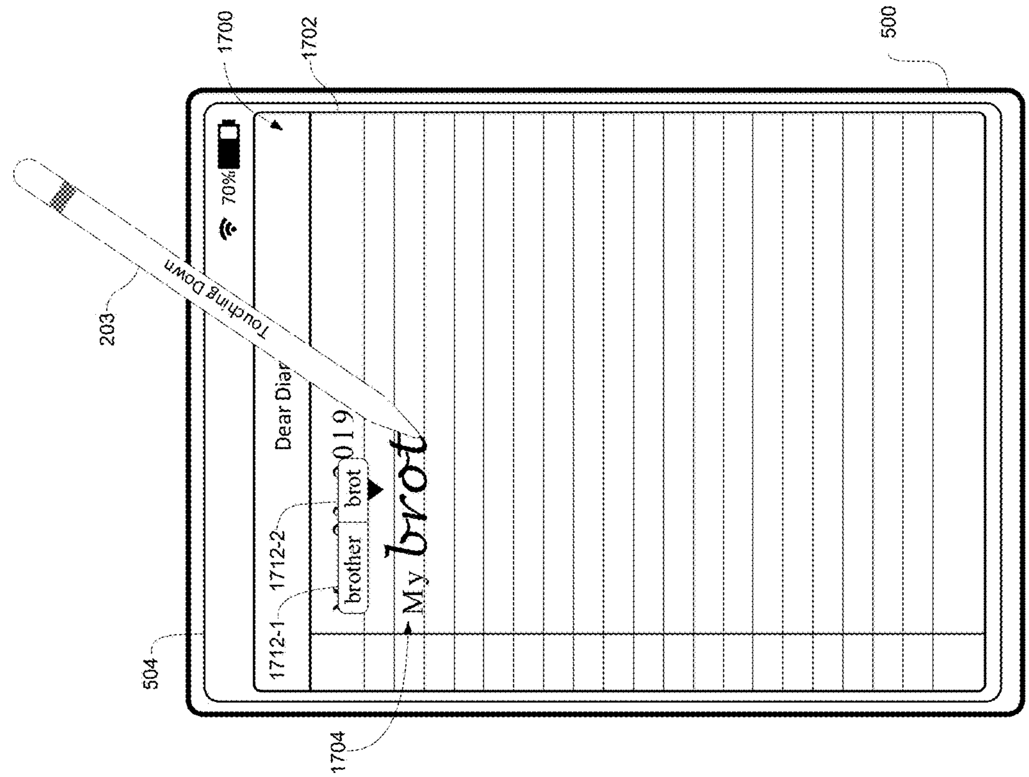
Figure 17T:
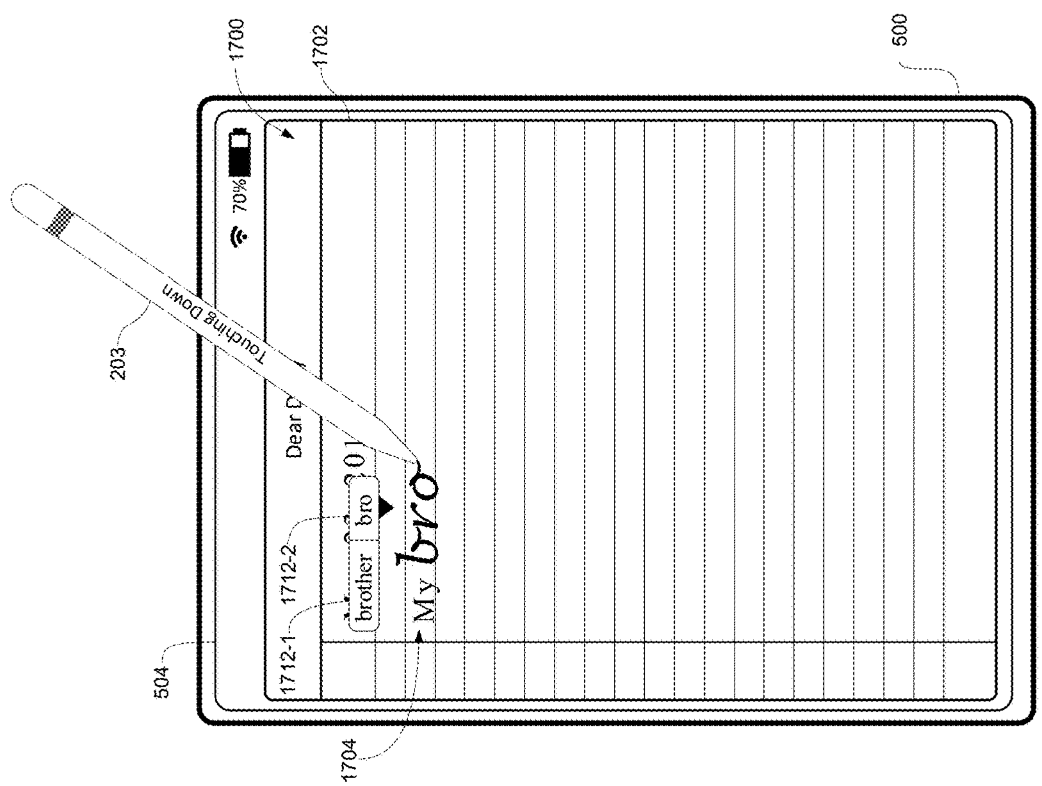
Figure 17W:
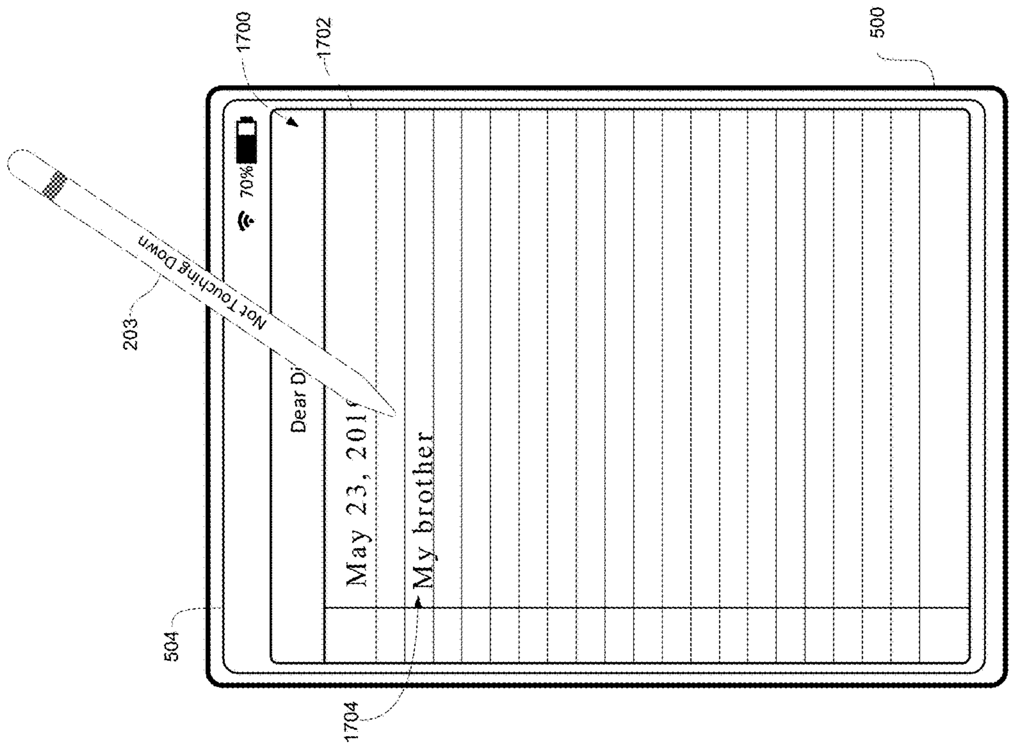

FIGS. 17A-17W illustrate exemplary ways in which an electronic device presents autocomplete suggestions. The embodiments in these figures are used to illustrate the processes described below, including the processes described with reference to FIGS. 18A-18I.

FIGS. 17A-17W illustrate operation of the electronic device 500 presenting autocomplete suggestions. FIG. 17A illustrates an exemplary device 500 that includes touch screen 504. In FIG. 17A, device 500 is displaying user interface 1700 corresponding to a note taking application (e.g., similar to user interfaces 620, 800, 1000, and 1210). In some embodiments, user interface 1700 includes a text entry region 1702 in which a user is able to enter text (e.g., via a soft keyboard or stylus 203 as described above with respect to methods 700, 1100, 1300, and 1800).

In FIG. 17B, handwritten input 1704 is received in text entry region 1702 from stylus 203. In FIG. 17B, a portion of handwritten input 1704 has already been converted into font-based text (e.g., "My") (e.g., such as described above with respect to methods 700, and 1300), while a second portion of handwritten input 1704 has not been converted into font-based text (e.g., "br") (e.g., such as described above with respect to methods 700, and 1300). In FIG. 17C, a lift-off of stylus 203 is detected after writing one or more characters (e.g., "br"). In FIG. 17D, in response to detecting the lift-off of stylus 203, device 500 displays autocomplete suggestion 1706. In some embodiments, autocomplete suggestion 1706 is displayed after the user has stopped performing handwritten input for a threshold amount of time (e.g., 0.5 seconds, 1 second, 2 seconds, 3 seconds, 5 seconds), with or without the user lifting off stylus 203 from touch screen 504. In some embodiments, if the user does not lift-off stylus 203 or stop handwritten input for the threshold amount of time, then autocomplete suggestion 1706 is not displayed. In some embodiments, autocomplete suggestion 1706 comprises one or more characters (e.g., predicted characters, suggested characters) that, when added to the user's handwritten input, results in a given suggested word (e.g., predicted word). In some embodiments, the suggested word is based on the context of the user's handwritten input (e.g., the sentence, the type of text entry field). In some embodiments, the suggested word is the most likely word based on the user's handwritten input. In some embodiments, the suggested word is based on the usage by other users (e.g., other than the user of the device). In some embodiments, autocomplete suggestions are displayed if the suggested word (e.g., the combination of the user's handwritten input and the suggested characters) is a unique word. For example, in some embodiment, if the handwritten input can only become a limited number of words if characters are added to it (e.g., 10 words, 20 words, 50 words), then autocomplete suggestions are provided. In some embodiments, if the word is not a unique word (e.g., greater than a threshold number of potential words), then autocomplete suggestions are not displayed.

In some embodiments, autocomplete suggestion 1706 is displayed with a different visual appearance than handwritten input 1704 (e.g., to indicate that autocomplete suggestion 1706 is a suggestion and has not been entered into text entry field). For example, in FIG. 17D, autocomplete suggestion 1706 is grey (e.g., as compared to handwritten input 1704 being black). In some embodiments, autocomplete suggestion 1706 has a transparency. In some embodiments, autocomplete suggestion 1706 has the font type of the final font-based text (e.g., the font type that handwritten input 1704 will eventually be converted into). In some embodiments, the size of autocomplete suggestion 1706 matches the size of handwritten input 1704 (e.g., height, width, and/or character spacing, etc.).

As shown in FIG. 17D, in some embodiments, autocomplete suggestion 1706 is displayed in-line with handwriting input 1704. For example, if the direction of the handwriting input is left-to-right, then autocomplete suggestion 1706 is displayed just to the right of the handwriting input (e.g., to result in a complete suggested word). In some embodiments, autocomplete suggestion 1706 matches the character spacing of the handwritten input. For example, if the space between characters in the handwritten input 1704 is a narrow spacing, then the space between characters in the autocomplete suggestion 1706 is optionally a narrow spacing (e.g., optionally the same as the spacing in handwritten input 1704), and if the space between characters in the handwritten input 1704 is a wide spacing, then the space between characters in the autocomplete suggestion 1706 is optionally a wide spacing. In some embodiments, the direction of the handwriting input is determined based on the language of the handwriting input 1704 or the direction in which handwriting input 1704 has been writing. In some embodiments, the language is determined based on the handwriting input 1704. In some embodiments, the language is the default input language of the system (e.g., or optionally the keyboard language setting). Thus, in some embodiments, where the autocomplete suggestions are displayed depends on the direction of writing for the particular language. For example, for languages in which the characters are written top-to-bottom (e.g., Chinese) or right-to-left (e.g., Arabic), then the autocomplete suggestions are optionally displayed below or to the left of the handwritten inputs, respectively.

FIGS. 17E-17H illustrate device 500 displaying autocomplete hint 1708. In some embodiments, autocomplete hint 1708 is an underlining animation to indicate that underlining the autocomplete suggestion 1706 will accept the autocomplete suggestion 1706 for entry into text entry region 1702. In some embodiments, autocomplete hint 1708 begins at the left end of, and underneath, autocomplete suggestion 1706 and underlines across to the right end of, and underneath, autocomplete suggestion 1706, as shown in FIGS. 17E-17G. In some embodiments, after the animation of underlining the autocomplete suggestion 1706 is completed, autocomplete hint 1708 is no longer displayed. In some embodiments, autocomplete hint 1708 is displayed every time autocomplete suggestions are displayed. In some embodiments, autocomplete hint 1708 is not displayed every time autocomplete suggestions are displayed. In some embodiments, autocomplete hint 1708 is only displayed once per device. In some embodiments, autocomplete hint 1708 is displayed once per user. In some embodiments, autocomplete hint 1708 is displayed once per device usage session (e.g., from when the device is awoken to when it enters into a sleep state). In some embodiments, autocomplete hint 1708 is displayed once per user interface (e.g., once for each web page, once for each app user interface, etc.). In some embodiments, autocomplete hint 1708 is displayed once per text entry field. In some embodiments, autocomplete hint 1708 is displayed until the user performs the autocomplete acceptance gesture. In some embodiments, autocomplete hint 1708 is displayed only a predetermined number of times (e.g., 5 times, 10 times, etc.).

In FIG. 17I, the user resumes handwritten input 1704 using stylus 203 writing on top of autocomplete suggestion 1706 (e.g., continuing handwritten input 1704). In some embodiments, the previous autocomplete suggestion (e.g., "ief") is removed from display as soon as (e.g., in response to) device 500 detects the user continuing handwritten input. In some embodiments, the previous autocomplete suggestion is maintained on the display (e.g., until autocomplete suggestion 1706 is updated).

In some embodiments, in response to the continued handwritten input, autocomplete suggestion 1706 is updated to suggest new characters based on the new character(s) that the user has written, as shown in FIG. 17J. In some embodiments, autocomplete suggestion 1706 is displayed (e.g., updated) after the user pauses for a threshold amount of time and/or lifts-off stylus 203 (e.g., as described above with respect to FIG. 17D). In some embodiments, autocomplete suggestion 1706 is displayed (e.g., updated) when the user completes writing a respective character (e.g., without waiting for lift-off of stylus 203 and/or without waiting for the user to pause handwritten input for the threshold amount of time). For example, in some embodiments, if autocomplete suggestion 1706 is displayed, then it is continuously displayed (and updated) until the user completes writing a word or accepts the autocomplete suggestion.

As shown in FIG. 17J, autocomplete suggestion 1706 is updated to take into account the new characters that have been written by handwritten input and optionally suggests a different set of characters (e.g., "thers") to result in a different word (e.g., "brothers"). In FIG. 17K, the user continues handwritten input 1704 using stylus 203 writing on top of autocomplete suggestion 1706. In some embodiments, the user's continued handwritten input 1704 is the same character as the character that is suggested to the user. In some embodiments, in response to the user providing handwritten input that is the same character as the next character in the autocomplete suggestion 1706, autocomplete suggestion 1706 is not updated to suggest a new set of characters, as shown in FIG. 17K. In some embodiments, autocomplete suggestion 1706 is re-aligned or otherwise moved to adjust for any changes in word spacing, width, and/or height from the continued handwritten input 1704.

In FIG. 17L, a user input is received from stylus 203 underlining a portion of autocomplete suggestion 1706 (e.g., "h"). In some embodiments, in response to the user underlining a portion of autocomplete suggestion 1706, device 500 updates the visual characteristic of the portion that is underlined. In some embodiments, the visual characteristic is updated to match the visual characteristic of the handwritten input 1704. For example, in FIG. 17L, "h" is changed from grey (e.g., the color of autocomplete suggestion 1706) to black (e.g., the color of handwritten input 1704).

In FIG. 17M, the user input from stylus 203 continues underlining through the remainder of autocomplete suggestion 1706 (e.g., "hers"). In some embodiments, in response to the user input, the visual characteristic of the remainder of autocomplete suggestion 1706 is updated, similarly as described above.

In FIG. 17N, a lift-off of stylus 203 is detected after underlining the entirety of autocomplete suggestion 1706. In some embodiments, in response to detecting the lift-off of stylus 203, device 500 enters the autocomplete suggestion 1706 into text entry region 1702, as shown in FIG. 17N. In some embodiments, device 500 converts handwritten input 1704 into font-based text and inserts the autocomplete suggestion (e.g., as font-based text) aligned with the font-based text corresponding to the handwritten input 1704 (e.g., such that the font-based text corresponding to the handwritten input 1704 and the autocomplete suggestion form a complete word). In some embodiments, the font-based text of both handwritten input 1704 and autocomplete suggestion 1706 is updated such that the visual characteristics (e.g., font type, font size, color, etc.) matches the text in text entry region 1702 (e.g., or optionally the default font type, size, and color of text entry region 1702). It is understood that although the above disclosure describes accepting the autocomplete suggestions using an underline gesture, any gesture directed at the autocomplete suggestion is possible. For example, a strike-through of the autocomplete suggestion, circling the autocomplete suggestion, etc. In some embodiments, striking through the autocomplete suggestion is interpreted as rejecting the autocomplete suggestion (e.g., and in response to the strike-through input, autocomplete suggestions are ceased from displaying).

In some embodiments, accepting any portion of the autocomplete suggestion (e.g., by underlining or other gesture), causes the entire autocomplete suggestion to be accepted. In some embodiments, the user is able to accept a portion, but not other portions, of the autocomplete suggestion (e.g., a subset of the characters). For example, in FIG. 17O, a user input from stylus 203 is received underlining only a portion of autocomplete suggestion 1706 (e.g., "her"). In some embodiments, in response to the user input, device 500 enters (e.g., appends) only the underlined portion into text entry region 1702, as shown in FIG. 17P, while the "s" in the autocomplete suggestion is not entered into text entry region 1702.

FIGS. 17Q-17W illustrate an alternative embodiment in which autocomplete suggestions are provided in a pop-up user interface element (e.g., as opposed to in-line with the handwritten input as described above). In FIG. 17Q, handwritten input 1704 is received in text entry region 1702 from stylus 203 writing the character "b". In some embodiments, in response to the user writing the character "b", pop-up 1712 is displayed on user interface 1700. In some embodiments, pop-up 1712 is displayed adjacent to handwriting input 1704 (e.g., such as above or below). In some embodiments, pop-up 1712 includes font-based characters of the handwritten input (e.g., "b"). In some embodiments, pop-up 1712 is selectable to cause the handwritten input to be converted to font-based text (e.g., as described above with respect to FIG. 6R). In some embodiments, pop-up 1712 is not selectable to cause the handwritten input to be converted to font-based text.

In FIG. 17R, handwritten input 1704 continues and writes additional characters (e.g., "r"). In some embodiments, in response to continued handwritten input 1704, pop-up 1712 is updated to display the interpreted characters written by the user (e.g., "br"). In FIG. 17S, lift-off of stylus 203 is detected. In some embodiments, in response to the lift-off, pop-up 1712 is updated to include two sections (e.g., delineated). In some embodiments, text 1712-1 corresponding to one section of pop-up 1712 is the suggested autocomplete word (e.g., "brief") based on the letters that the user has written so far. In some embodiments, text 1712-2 corresponds to the other section of pop-up 1712 and displays the interpreted characters written by the user so far (e.g., similar to pop-up 1712 described above with respect to FIGS. 17Q-17R). In some embodiments, text 1712-2 is selectable to cause the respective suggested text to be entered into text entry region 1702 and replace the respective letters that have been written by the user (e.g., "br").

In FIG. 17T, the user continues handwritten input and writes "o". In some embodiments, in response to the continued handwritten input, pop-up 1712 is updated such that text 1712-1 displays an updated suggested word (e.g., "brother") based on the user's new characters and text 1712-2 displays the interpreted characters written so far (e.g., "bro").

In FIG. 17U, the user continues handwritten input and writes "t", which is the same character as the next character in the suggested word. In some embodiments, in response to the user writing the same character as the next character in the suggested word, pop-up 1712 is updated such that text 1712-1 continues to display the same suggested word (e.g., "brother") and text 1712-2 is updated to display the interpreted characters written so far (e.g., "brot").

Figure 17V:
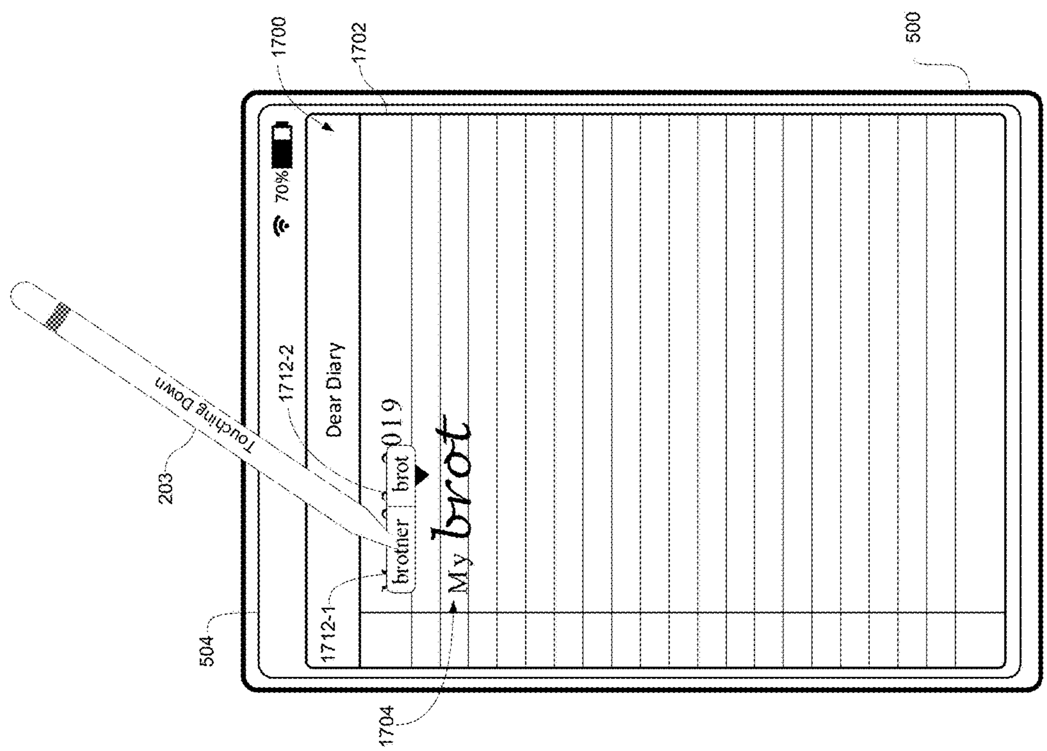
Figure 18A:
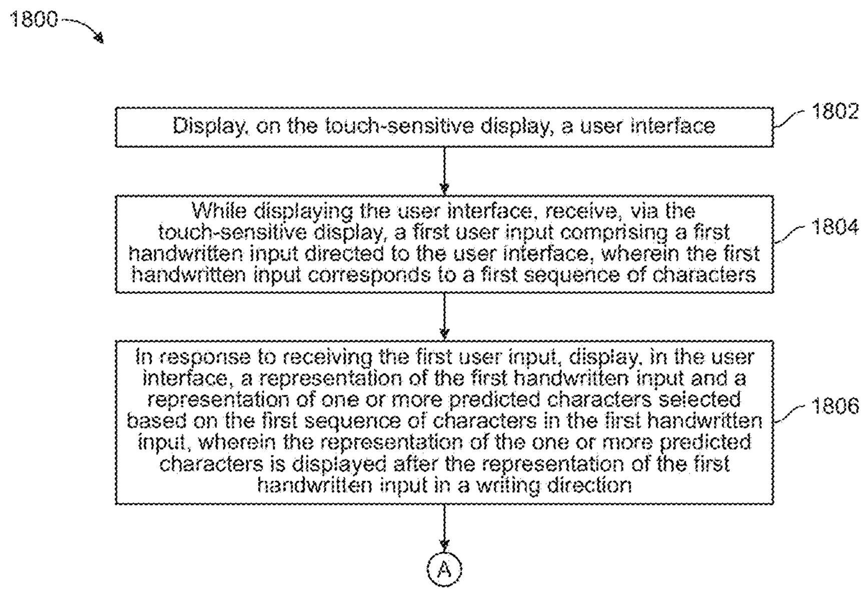
FIGS. 18A-18I are flow diagrams illustrating a method of presenting autocomplete suggestions in accordance with some embodiments.
Figure 18B:
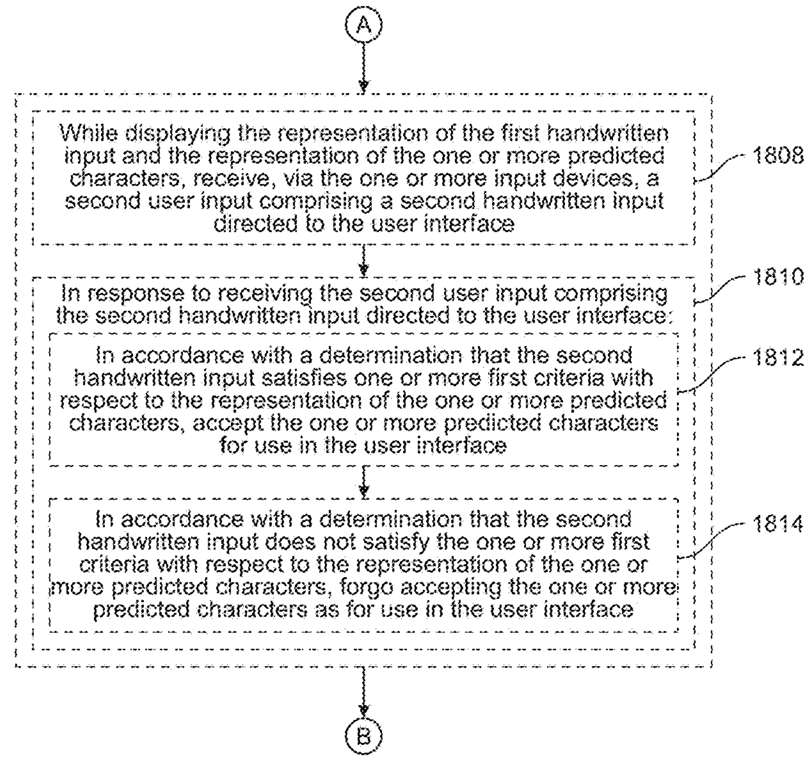
Figure 18C:
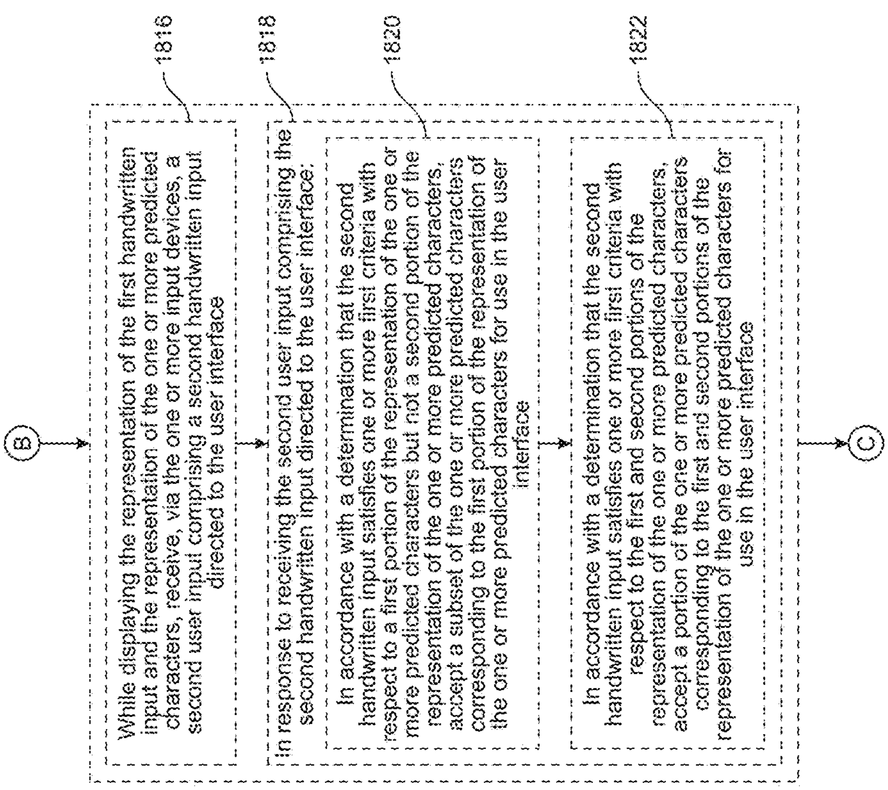
Figure 18D:
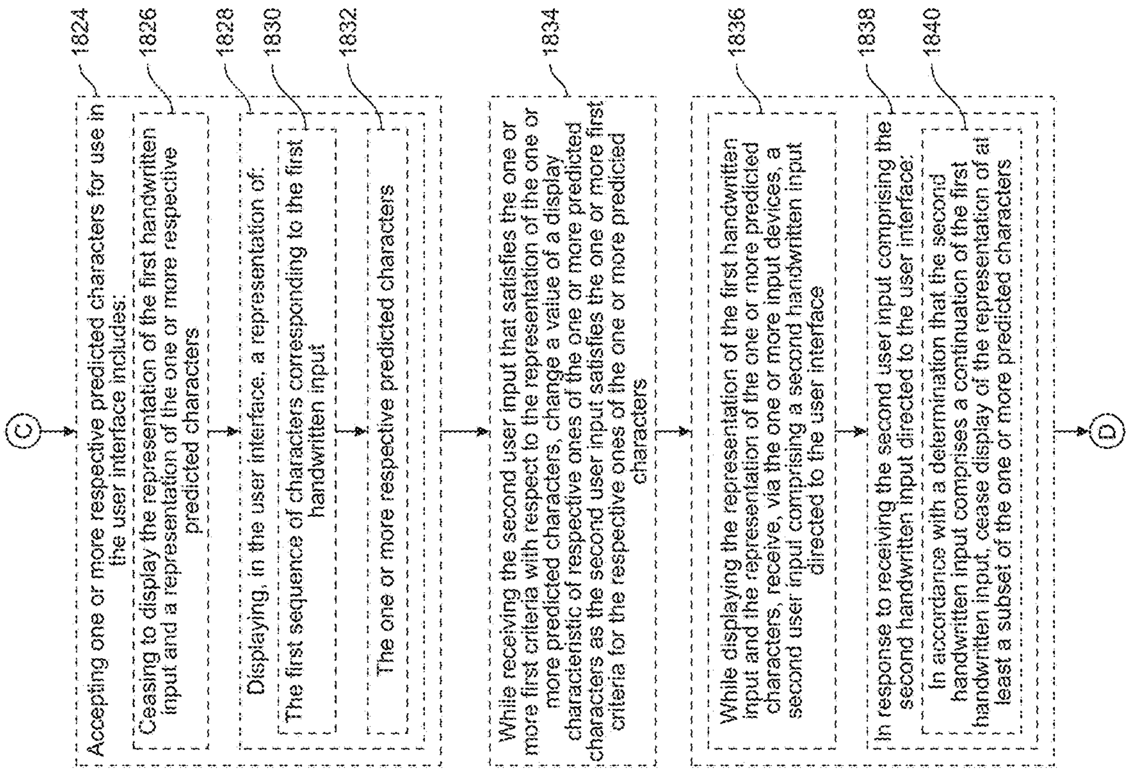
Figure 18E:
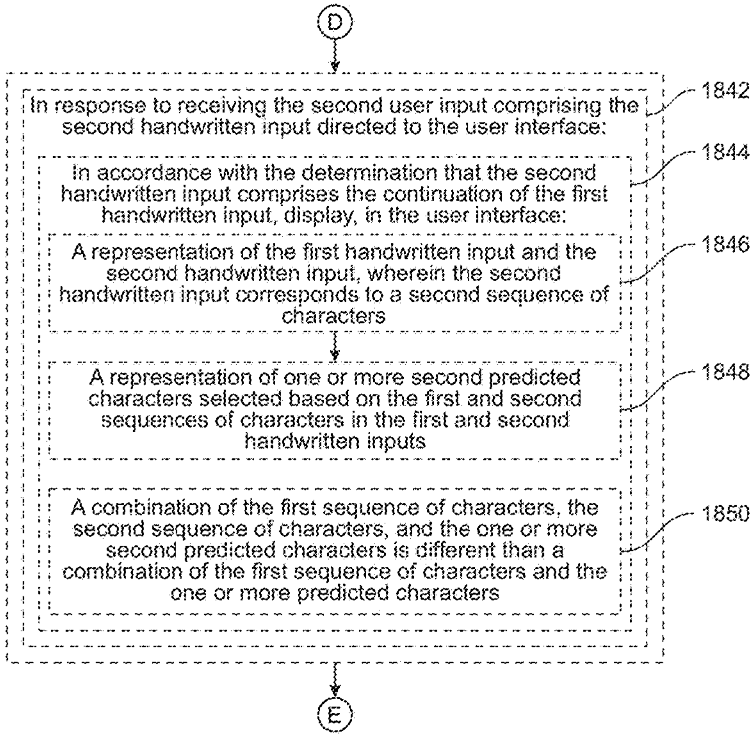
Figure 18F:
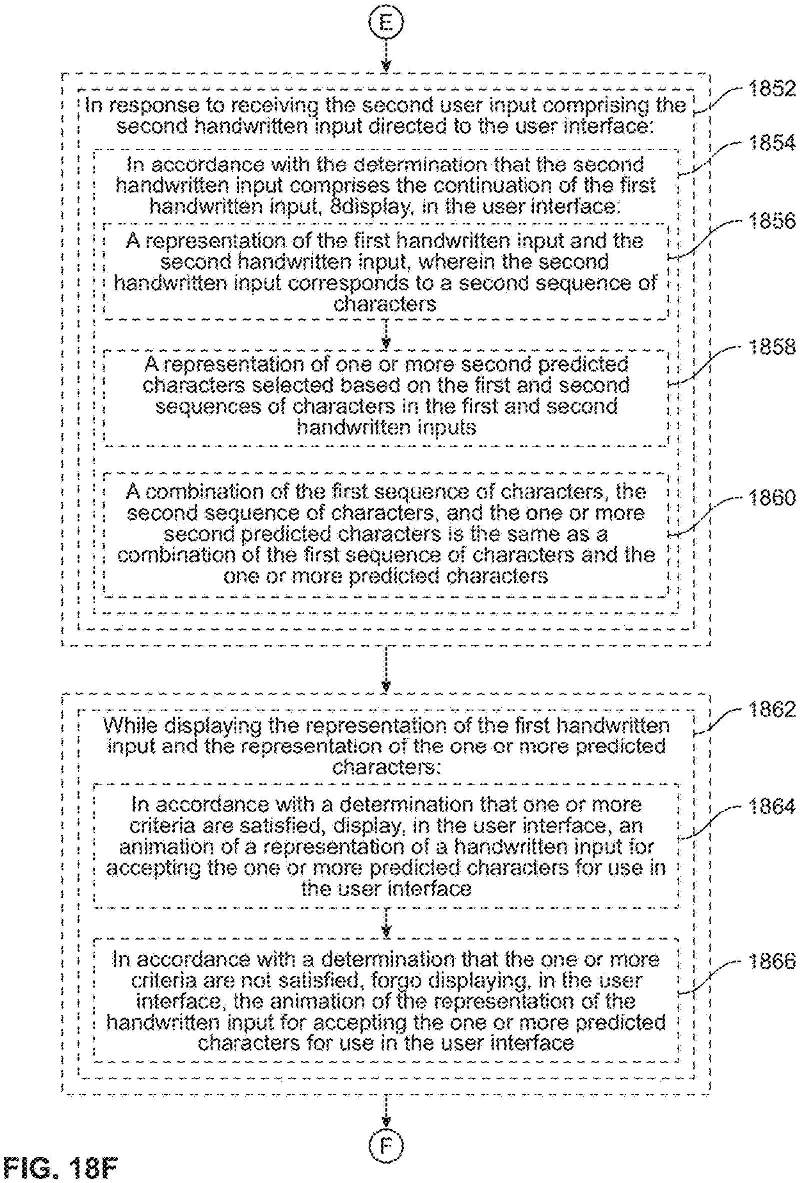
Figure 18G:
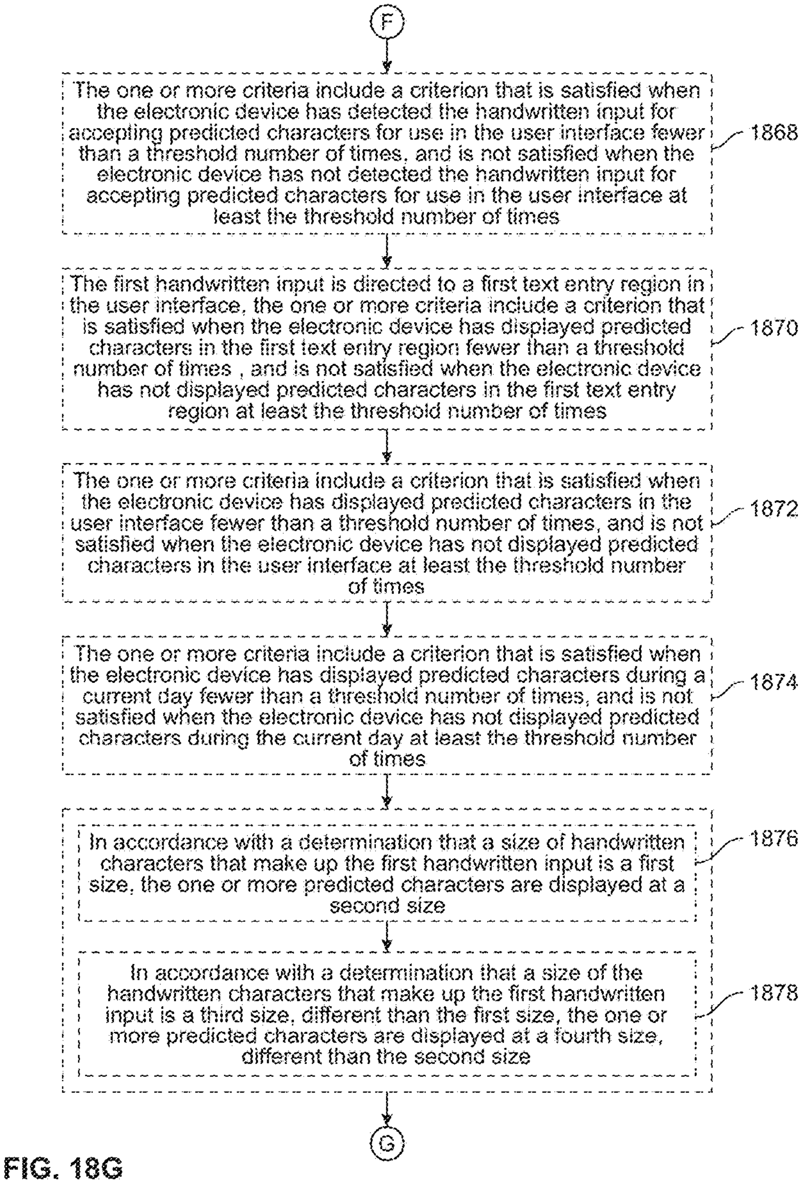
Figure 18H:
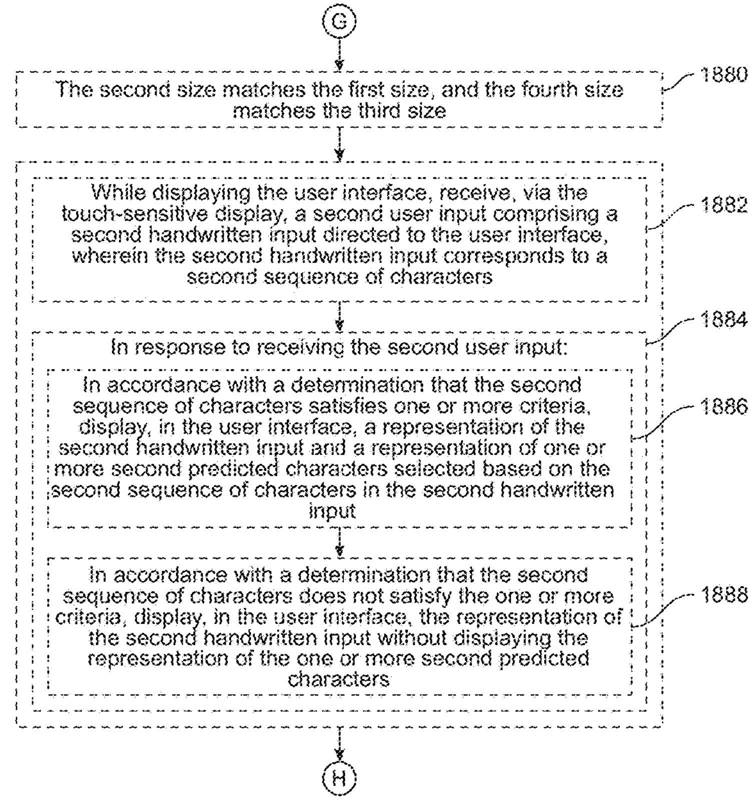
Figure 18I:
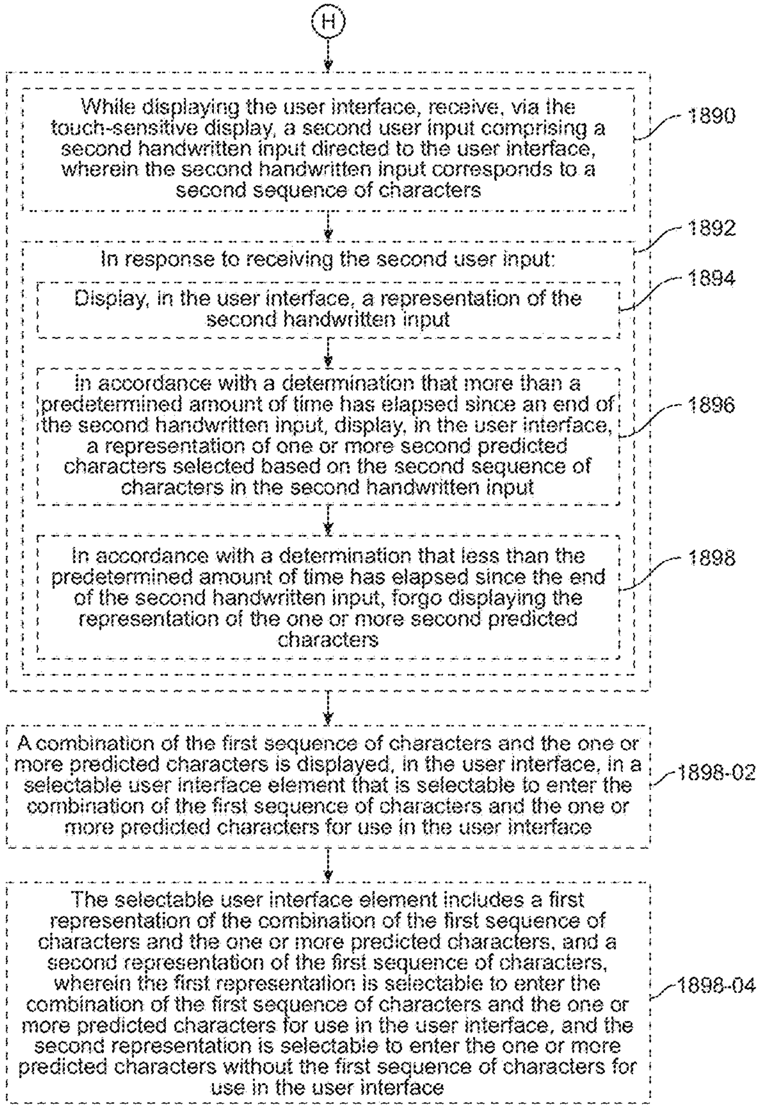

In FIG. 17V, a user input is received from stylus 203 selecting text 1712-1 corresponding to the suggested word (e.g., "brother"). In some embodiments, in response to the user input selecting text 1712-1, device 500 enters the text 1712-1 into text entry region 1702 as font-based text and replaces the characters that have been written by the user so far (e.g., "brot"), as shown in FIG. 17W. In some embodiments, the font-based text that is entered matches the font type, font size, and/or visual characteristics of the other font-based text in the text entry region 1702 (e.g., or optionally the default font type, size, and/or visual characteristics) of the text entry region 1702.

FIGS. 18A-18I are flow diagrams illustrating a method 1800 of presenting autocomplete suggestions. The method 1800 is optionally performed at an electronic device such as device 100, device 300, device 500, device 501, device 510, and device 591 as described above with reference to FIGS. 1A-1B, 2-3, 4A-4B and 5A-5I. Some operations in method 1800 are, optionally combined and/or the order of some operations is, optionally, changed As described below, the method 1800 provides ways of presenting autocomplete suggestions. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 17A, an electronic device (e.g., an electronic device, a mobile device (e.g., a tablet, a smartphone, a media player, or a wearable device) including a touch screen, or a computer including a touch screen, such as device 100, device 300, device 500, device 501, or device 591) in communication with a touch-sensitive display displays (1802), on the touch-sensitive display, a user interface, such as in FIG. 17A (e.g., a user interface with one or more text fields in which a user is able to enter text (e.g., text entry regions)). For example, in some embodiments, the user interface is a form with a plurality of text fields and selection of a particular text field (e.g., with a finger) optionally displays a soft keyboard for entering text into the text field. In some embodiments, the user interface is any user interface or element that is able to receive and display text entry from the user. In some embodiments, a physical keyboard is optionally used to enter text into respective text fields and/or the user interface.

In some embodiments, while displaying the user interface, the electronic device receives (1804), via the touch-sensitive display, a first user input comprising a first handwritten input directed to the user interface (e.g., receiving a handwritten input on or near a text field), wherein the first handwritten input corresponds to a first sequence of characters, such as in FIG. 17B (e.g., characters detected based on the handwritten input).

In some embodiments, the user input is received from a stylus or other writing device. In some embodiments, the user input is received from a finger. In some embodiments, the handwritten input is received at a location on or near the text field that is indicative of a request to enter text into the text entry field. For example, a handwritten input that begins in the text field optionally indicates that the entire sequence of handwritten inputs is intended to be entered into the text field, even if a portion of the handwritten input extends outside of the text field. In some embodiments, a user input that begins outside of the text field but a substantial amount of the handwritten input falls within the text field is optionally considered to be an intent to enter text into the text field (e.g., 30%, 50%, etc.). In some embodiments, the text entry field includes a predetermined margin of error in which handwritten inputs within a certain distance from the text entry field will be considered to be a handwritten input within the text entry field. In some embodiments, the first sequence of characters is a partially written word (e.g., an incomplete word).

In some embodiments, in response to receiving the first user input, the electronic device displays (1806), in the user interface, a representation of the first handwritten input (e.g., displaying a trail of the handwritten input on the display as the input is received) and a representation of one or more predicted characters selected based on the first sequence of characters in the first handwritten input (e.g., displaying concurrently with the handwritten input (e.g., aligned with the handwritten input), font-based text that corresponds to characters that if added to the first sequence of characters would complete a suggested word that is optionally displayed without displaying font-based text of the first portion of the suggested word), wherein the representation of the one or more predicted characters is displayed after the representation of the first handwritten input in a writing direction, such as in FIG. 17D (e.g., the one or more predicted characters are displayed aligned with the handwritten input in a direction of writing determined based on a current language or localization setting of the device such as left to right for English, Spanish, French or right to left for Hebrew or Arabic or top to bottom for Mandarin or Kanji, or based on the general direction in which the first handwritten input progressed).

In some embodiments, as the user "draws" on the touch-sensitive display, the display shows the user's handwritten input at the location where the input was received. In some embodiments, the handwritten input trail is shown wherever on the touch-sensitive display the handwritten input is received. In some embodiments, if the sequence of characters is a partially written word, then the electronic device displays suggested character(s) to complete the user's partially written word into a suggested word. In some embodiments, the one or more predicted characters are the remaining characters of a suggested word to the user (e.g., the characters that are to be added to the handwritten input to result in the predicted word). In some embodiments, the predicted characters are displayed after a pause in the handwritten input (e.g., 0.5 seconds, 1 second, 2 seconds, 3 seconds, 5 seconds). In some embodiments, the predicted word is determined based on one or more factors for predicting the user's desired word, such as popularity of usage by the user or a plurality of users (e.g., other than the user), the commonality of the word, the context of the sentence, etc.

The above-described manner of suggesting words to the user (e.g., by receiving a handwritten input and displaying the remainder of a suggested word to the user) allows the electronic device to provide the user with a suggested word (e.g., by displaying the remainder of the suggested word to the user), which simplifies the interaction between the user and the electronic device and enhances the operability of the electronic device and makes the user-device interface more efficient (e.g., by allowing the user to handwrite text and automatically determining the word that the user is most likely writing and suggesting the word to the user by displaying the remainder of the letters to the user), which additionally reduces power usage and improves battery life of the electronic device by enabling the user to use the electronic device more quickly and efficiency while reducing errors in the usage of the device.

In some embodiments, while displaying the representation of the first handwritten input and the representation of the one or more predicted characters, the electronic device receives (1808), via the one or more input devices, a second user input comprising a second handwritten input directed to the user interface, such as in FIG. 17M (e.g., receiving a user input on or near a text field. In some embodiments, the user input is received from a stylus or other writing device). In some embodiments, the user input is a gesture directed at the first handwritten input and/or the representation of the one or more predicted characters.

In some embodiments, in response to receiving the second user input comprising the second handwritten input directed to the user interface (1810), in accordance with a determination that the second handwritten input satisfies one or more first criteria with respect to the representation of the one or more predicted characters, the electronic device accepts (1812) the one or more predicted characters for use in (e.g., for entry into a text field displayed in) the user interface, such as in FIG. 17N (e.g., if the user input is an underlining gesture beneath the one or more predicted characters, then the user input is interpreted as a request to accept the one or more predicted characters). In some embodiments, in response to the underlining gesture beneath the one or more predicted characters, the predicted characters are entered into the user interface. In some embodiments, concurrently with entering the predicted characters, the handwritten input is converted into font-based text (e.g., and the predicted characters are then aligned with the font-based text).

In some embodiments, in response to receiving the second user input comprising the second handwritten input directed to the user interface (1810), in accordance with a determination that the second handwritten input does not satisfy the one or more first criteria with respect to the representation of the one or more predicted characters, the electronic device forgoes (1814) accepting the one or more predicted characters for use in (e.g., for entry into a text field displayed in) the user interface, such as in FIG. 17J (e.g., if the user input is not an underlining beneath the one or more predicted characters, then the user input is not a request to accept the one or more predicted characters and the predicted characters are not entered into the user interface).

The above-described manner of accepting predicted characters (e.g., by receiving a handwritten input directed at the predicted characters and accepting the predicted characters if the handwritten input satisfies a first criteria) enables the suggested word to be accepted with a quick gesture, which simplifies the interaction between the user and the electronic device and enhances the operability of the electronic device and makes the user-device interface more efficient (e.g., by automatically suggesting words to the user in line with the user's writing and providing the user with an easy method of accepting the suggested word without navigating to a separate user interface or perform additional inputs to accept the suggested word), which additionally reduces power usage and improves battery life of the electronic device by enabling the user to use the electronic device more quickly and efficiency while reducing errors in the usage of the device.

In some embodiments, while displaying the representation of the first handwritten input and the representation of the one or more predicted characters, the electronic device receives (1816), via the one or more input devices, a second user input comprising a second handwritten input directed to the user interface, such as in FIG. 17M (e.g., a user input underlining some or all of the one or more predicted characters).

In some embodiments, in response to receiving the second user input comprising the second handwritten input directed to the user interface (1818), in accordance with a determination that the second handwritten input satisfies one or more first criteria with respect to a first portion of the representation of the one or more predicted characters but not a second portion of the representation of the one or more predicted characters, the electronic device accepts (1820) a subset of the one or more predicted characters corresponding to the first portion of the representation of the one or more predicted characters for use in (e.g., for entry into a text field displayed in) the user interface, such as in FIG. 17P (e.g., if the user input is an underlining gesture under only some of the one or more predicted characters (e.g., the first portion but not the second portion of the predicted characters), then the user input is a request to accept only the some characters that are underlined and only the underlined characters are accepted for entry on the user interface).

In some embodiments, the one or more characters that have been underlined are updated to have a different visual characteristic (e.g., change color, change opacity, etc.) to indicate to the user which characters the user has accepted. For example, the one or more predicted character are displayed as grey text and as the user underlines the characters, the underlined characters become black indicating that the user has accepted that character. In some embodiments, the second portion of the one or more predicted characters cease to be displayed after the first portion has been entered into the text entry region as inputs. In some embodiments, when the first portion of the one or more predicted characters are entered into the text entry region, the handwritten input is converted to font-based text and the first portion of the characters is aligned with the font-based text corresponding to the handwritten input.

In some embodiments, in response to receiving the second user input comprising the second handwritten input directed to the user interface (1818), in accordance with a determination that the second handwritten input satisfies one or more first criteria with respect to the first and second portions of the representation of the one or more predicted characters, the electronic device accepts (1822) a portion of the one or more predicted characters corresponding to the first and second portions of the representation of the one or more predicted characters for use in (e.g., for entry into a text field displayed in) the user interface, such as in FIG. 17N (e.g., if the user input is an underlining gesture under the first and the second portions of the one or more predicted characters (e.g., rather than just the first portion or rather than all of the predicted characters), then the user input is a request to accept only those characters that are underlined (e.g., the first and second portions of predicted characters) and only the underlined characters are accepted for entry on the user interface). In some embodiments, the underlined characters are entered into the user interface and aligned with the handwritten input (e.g., which has optionally been converted into font-based text).

The above-described manner of accepting predicted characters (e.g., by receiving a handwritten input underlining the characters that the user wants to accept) enables a portion of the suggested word to be accepted with a quick gesture, which simplifies the interaction between the user and the electronic device and enhances the operability of the electronic device and makes the user-device interface more efficient (e.g., by providing the user with an easy method of accepting the suggested word without navigating to a separate user interface or perform additional inputs to accept the suggested word), which additionally reduces power usage and improves battery life of the electronic device by enabling the user to use the electronic device more quickly and efficiency while reducing errors in the usage of the device.

In some embodiments, accepting one or more respective predicted characters for use in (e.g., for entry into a text field displayed in) the user interface includes (1824), ceasing to display the representation of the first handwritten input and a representation of the one or more respective predicted characters (1826), such as in FIG. 17N.

In some embodiments, accepting one or more respective predicted characters for use in (e.g., for entry into a text field displayed in) the user interface includes (1824), displaying, in the user interface, a representation of (1828), the first sequence of characters corresponding to the first handwritten input (1830), and the one or more respective predicted characters (1832), such as in FIG. 17N (e.g., converting the handwritten input into font-based text concurrently with accepting the one or more predicted characters). In some embodiments, this comprises removing the display of the handwritten input and the predicted characters and replacing it with font-based text corresponding to the combination of the handwritten input and the accepted predicted characters. In some embodiments, replacing the display includes displaying an animation of the handwritten input and the predicted characters converting into the final font-based text, similar to the animations discussed above with respect to method 700.

The above-described manner of accepting predicted characters (e.g., by replacing both the handwritten input and the predicted characters with font-based text of the combination of the handwritten input and the accepted predicted characters) enables the suggested word to be used in the user interface with a quick gesture, which simplifies the interaction between the user and the electronic device and enhances the operability of the electronic device and makes the user-device interface more efficient (e.g., by converting the handwritten input into font-based text at the same time that the predicted characters are entered into the user interface without requiring the user to wait for the handwritten input to be converted into font-based text separately from accepting the predicted characters), which additionally reduces power usage and improves battery life of the electronic device by enabling the user to use the electronic device more quickly and efficiency while reducing errors in the usage of the device.

In some embodiments, while receiving the second user input that satisfies the one or more first criteria with respect to the representation of the one or more predicted characters, the electronic device changes (1834) a value of a display characteristic of respective ones of the one or more predicted characters as the second user input satisfies the one or more first criteria for the respective ones of the one or more predicted characters, such as in FIG. 17L (e.g., as the user underlines characters of the one or more predicted characters, the one or more characters that have been underlined are updated to have a different visual characteristic (e.g., change color, change opacity, etc.) to indicate to the user which characters the user has accepted). For example, the one or more predicted character are displayed as grey text and as the user underlines the characters, the underlined characters become black indicating that the user has accepted that character.

The above-described manner of accepting predicted characters (e.g., by changing the visual characteristic of the characters that have so-far been selected) allows the electronic device to provide confirmation about what characters have been accepted and will be entered, which simplifies the interaction between the user and the electronic device and enhances the operability of the electronic device and makes the user-device interface more efficient (e.g., providing a live visual indicator of which characters the user has selected), which additionally reduces power usage and improves battery life of the electronic device by enabling the user to use the electronic device more quickly and efficiency while reducing errors in the usage of the device, while reducing errors in the usage of the device.

In some embodiments, while displaying the representation of the first handwritten input and the representation of the one or more predicted characters, the electronic device receives (1836), via the one or more input devices, a second user input comprising a second handwritten input directed to the user interface, such as in FIG. 17K (e.g., further handwritten inputs).

In some embodiments, in response to receiving the second user input comprising the second handwritten input directed to the user interface (1838), in accordance with a determination that the second handwritten input comprises a continuation of the first handwritten input, the electronic device ceases (1840) display of the representation of at least a subset of the one or more predicted characters, such as in FIG. 17K (e.g., if, after displaying the predicted characters, the user continues writing, then the predicted characters are removed from display). In some embodiments, the sequence (or, optionally, the entire sequence) of predicted characters is removed from display. In some embodiments, the sequence (or, optionally, only the sequence) of predicted characters that the user has written over is removed from display. In some embodiments, the device determines whether the user is writing the same characters as the predicted characters and removes from display the characters that the user has written (e.g., while continuing to display some or all of the predicted characters that the user has not written).

The above-described manner of rejecting suggested characters (e.g., by ceasing display of the predicted characters when the user continues handwritten input indicating that the user does not want to accept the predicted characters) enables continued handwritten input to be provided without interruption, which simplifies the interaction between the user and the electronic device and enhances the operability of the electronic device and makes the user-device interface more efficient (e.g., by automatically ceasing display of the characters when the user continues handwritten input without requiring the user to perform additional inputs to dismiss the display of the predicted characters), which additionally reduces power usage and improves battery life of the electronic device by enabling the user to use the electronic device more quickly and efficiency.

In some embodiments, in response to receiving the second user input comprising the second handwritten input directed to the user interface (1842) (e.g., further handwritten inputs), in accordance with the determination that the second handwritten input comprises the continuation of the first handwritten input, the electronic device displays (1844), in the user interface, a representation of the first handwritten input and the second handwritten input, wherein the second handwritten input corresponds to a second sequence of characters (1846), such as in FIG. 17J (e.g., displaying the trail of the second handwritten inputs at the location(s) where the handwritten input is received concurrently with the trail of the first handwritten input.), and a representation of one or more second predicted characters selected based on the first and second sequences of characters in the first and second handwritten inputs (1848), such as in FIG. 17J (e.g., updating the predicted characters to account for the new handwritten inputs and displaying another set of predicted characters).

In some embodiments, a combination of the first sequence of characters, the second sequence of characters, and the one or more second predicted characters is different than a combination of the first sequence of characters and the one or more predicted characters (1850), such as in FIGS. 17H and 17J (e.g., if the combination of the first and second sequence of characters changes the prediction of what the user likely is writing, then display new predicted characters that correspond to a new prediction of what the user is likely writing based on the combination of the first and second sequence of characters). In some embodiments, if the combination of the first and second sequence of characters does not change the prediction of what the user likely is writing (e.g., the second sequence of characters is the same as the prediction), then the new set of predicted characters are the same as the previous set of characters with some characters removed (e.g., the characters that the user has written).

The above-described manner of updating the displayed predicted characters (e.g., by changing the displayed predicted characters based on further handwritten inputs) allows the electronic device to provide updated predicted words based on further handwritten input, which simplifies the interaction between the user and the electronic device and enhances the operability of the electronic device and makes the user-device interface more efficient (e.g., by automatically updating the suggested words in accordance with the user's input to continually provide the user with relevant predicted words without requiring the user to perform an additional input to update the predicted words), which additionally reduces power usage and improves battery life of the electronic device by enabling the user to use the electronic device more quickly and efficiency.

In some embodiments, in response to receiving the second user input comprising the second handwritten input directed to the user interface (1852) (e.g., further handwritten input), in accordance with the determination that the second handwritten input comprises the continuation of the first handwritten input, the electronic device displays (1854), in the user interface, a representation of the first handwritten input and the second handwritten input, wherein the second handwritten input corresponds to a second sequence of characters (1856), such as in FIG. 17J (e.g., displaying the trail of the second handwritten inputs at the location(s) where the handwritten input is received concurrently with the trail of the first handwritten input.), and a representation of one or more second predicted characters selected based on the first and second sequences of characters in the first and second handwritten inputs (1858), such as in FIG. 17J (e.g., updating the predicted characters to account for the new handwritten inputs and displaying another set of predicted characters).

In some embodiments, a combination of the first sequence of characters, the second sequence of characters, and the one or more second predicted characters is the same as a combination of the first sequence of characters and the one or more predicted characters (1860), such as in FIGS. 17J-17K (e.g., if the combination of the first and second sequence of characters does not change the prediction of what the user likely is writing (e.g., the second sequence of characters is the same characters as the prediction), then the new set of predicted characters are the same as the previous set of characters with some characters removed (e.g., the characters that the user has written in the second sequence).

The above-described manner of updating predicted characters (e.g., by updating the predicted characters to remove display of the characters that the user's further handwritten input has written) allows the electronic device to provide the continued ability to accept the suggested word even as the user continues to write the suggested word, which simplifies the interaction between the user and the electronic device and enhances the operability of the electronic device and makes the user-device interface more efficient (e.g., by automatically removing display of the characters that the user has written as the user writes it, without requiring the user to see irrelevant characters that the user is no longer interested in anymore (e.g., because the user has already written them)), which additionally reduces power usage and improves battery life of the electronic device by enabling the user to use the electronic device more quickly and efficiency.

In some embodiments, while displaying the representation of the first handwritten input and the representation of the one or more predicted characters (1862), in accordance with a determination that one or more criteria are satisfied, the electronic device displays (1864), in the user interface, an animation of a representation of a handwritten input for accepting the one or more predicted characters for use in (e.g., for entry into a text field displayed in) the user interface, such as in FIGS. 17E-17H (e.g., displaying an underlining animation under the predicted characters to provide a hint to the user of how to accept the predicted characters). In some embodiments, the animation is an underline that moves across the one or more predicted characters. In some embodiments, the one or more criteria are satisfied if the animation providing the hint of how to accept the predicted characters has not already been displayed on that day, that week, that session, for that user, etc.

In some embodiments, while displaying the representation of the first handwritten input and the representation of the one or more predicted characters (1862), in accordance with a determination that the one or more criteria are not satisfied, the electronic device forgoes (1866) displaying, in the user interface, the animation of the representation of the handwritten input for accepting the one or more predicted characters for use in (e.g., for entry into a text field displayed in) the user interface, such as in FIG. 17E (e.g., not displaying an animation to providing a hint to the user). In some embodiments, the animation is not displayed if the animation has already been displayed to the user during the current handwriting session, during the current day (or any other duration). In some embodiments, the animation is only displayed once on the device or only displayed once for a particular user. In some embodiments, the animation is no longer displayed if the user has performed the underlining gesture to accept predicted characters (e.g., indicating that the user knows how to accept predicted characters).

The above-described manner of displaying a hint of how to accept predicted characters (e.g., by displaying an underlining animation underlining the predicted characters) provides a visual indication of a gesture for accepting suggested words, which simplifies the interaction between the user and the electronic device and enhances the operability of the electronic device and makes the user-device interface more efficient (e.g., by automatically displaying a short tutorial of how to accept predicted words without requiring the user to perform separate research to determine how to accept predicted words), which additionally reduces power usage and improves battery life of the electronic device by enabling the user to use the electronic device more quickly and efficiency.

In some embodiments, the one or more criteria include a criterion that is satisfied when the electronic device has detected the handwritten input for accepting predicted characters for use in the user interface fewer than a threshold number of times (e.g., has never detected the handwritten input for accepting predicted characters, has detected the handwritten input for accepting predicted characters less than five times or another predetermined number of times), and is not satisfied when the electronic device has not detected the handwritten input for accepting predicted characters for use in the user interface at least the threshold number of times (1868), such as in FIG. 17E (e.g., if the user has never performed the gesture for accepting predicted characters, then display the animation, but if the user has previously performed the gesture, then forgo displaying the animation).

The above-described manner of limiting display of the hint of how to accept predicted characters (e.g., by no longer displaying the animation if the user has previously performed the gesture to accept predicted characters indicating that the user knows how to accept predicted characters) allows the electronic device to avoid unnecessarily displaying animations on the display, which simplifies the interaction between the user and the electronic device and enhances the operability of the electronic device and makes the user-device interface more efficient (e.g., by automatically determining that the user likely does not need a hint to learn how to accept predicted characters and forgoing displaying the hint in the future), which additionally reduces power usage and improves battery life of the electronic device by enabling the user to use the electronic device more quickly and efficiency.

In some embodiments, the first handwritten input is directed to a first text entry region in the user interface, the one or more criteria include a criterion that is satisfied when the electronic device has displayed predicted characters in the first text entry region fewer than a threshold number of times (e.g., has never displayed predicted characters in the first text entry region, has displayed predicted characters in the first text entry region fewer than five times or another predetermined number of times), and is not satisfied when the electronic device has not displayed predicted characters in the first text entry region at least the threshold number of times (1870), such as in FIG. 17E (e.g., if the animation has not been displayed for a predicted character in the respective text entry region that the current handwritten input is directed to, then display the animation, but if the animation has previously been displayed for the respective text entry region, then do not display the animation again in that text entry region again).

The above-described manner of limiting display of the hint of how to accept predicted characters (e.g., by only displaying the animation one time for each text entry region) allows the electronic device to indicate that the current text entry region supports accepting predicted characters while avoid unnecessarily displaying animations on the display, which simplifies the interaction between the user and the electronic device and enhances the operability of the electronic device and makes the user-device interface more efficient (e.g., by displaying the hint once for each text entry region and forgoing displaying the hint for that text entry region in the future), which additionally reduces power usage and improves battery life of the electronic device by enabling the user to use the electronic device more quickly and efficiency.

In some embodiments, the one or more criteria include a criterion that is satisfied when the electronic device has displayed predicted characters in the user interface fewer than a threshold number of times (e.g., has never displayed predicted characters in the user interface, has displayed predicted characters in the user interface fewer than five times or another predetermined number of times), and is not satisfied when the electronic device has not displayed predicted characters in the user interface at least the threshold number of times (1872), such as in FIG. 17E (e.g., if the animation has not been displayed for a predicted character on the respective user interface that the current handwritten input is inputting into, then display the animation, but if the animation has previously been displayed on the respective user interface, then do not display the animation on the user interface again).

The above-described manner of limiting display of the hint of how to accept predicted characters (e.g., by only displaying the animation one time for each user interface) allows the electronic device to indicate that the current user interface supports accepting predicted characters while avoid unnecessarily displaying animations on the display, which simplifies the interaction between the user and the electronic device and enhances the operability of the electronic device and makes the user-device interface more efficient (e.g., by displaying the hint once for each user interface and forgoing displaying the hint for that user interface in the future), which additionally reduces power usage and improves battery life of the electronic device by enabling the user to use the electronic device more quickly and efficiency.

In some embodiments, the one or more criteria include a criterion that is satisfied when the electronic device has displayed predicted characters during a current day fewer than a threshold number of times (e.g., has never displayed the predicted characters during the current day, has displayed predicted characters less than five times or another predetermined number of times during the current day), and is not satisfied when the electronic device has not displayed predicted characters during the current day at least the threshold number of times (1874), such as in FIG. 17E (e.g., if the animation has not been displayed that day, then display the animation, but if the animation has already been displayed on that day, then do not display the animation for the rest of the day).

The above-described manner of limiting display of the hint of how to accept predicted characters (e.g., by only displaying the animation one time per day) allows the electronic device to provide a reminder of how to accept predicted characters while avoid unnecessarily displaying animations on the display, which simplifies the interaction between the user and the electronic device and enhances the operability of the electronic device and makes the user-device interface more efficient (e.g., by displaying the hint once per day and forgoing displaying the hint for the rest of the day), which additionally reduces power usage and improves battery life of the electronic device by enabling the user to use the electronic device more quickly and efficiency.

In some embodiments, in accordance with a determination that a size of handwritten characters that make up the first handwritten input is a first size, the one or more predicted characters are displayed at a second size (1876), such as in FIG. 17D (e.g., displaying the predicted characters at a particular size based on the size of the handwritten input). In some embodiments, the predicted characters are displayed at a smaller, larger, or the same size as the handwritten input.

In some embodiments, in accordance with a determination that a size of the handwritten characters that make up the first handwritten input is a third size, different than the first size, the one or more predicted characters are displayed at a fourth size, different than the second size (1878), such as in FIG. 17D (e.g., if the handwritten input is a different size than the first size, then the one or more predicted characters are also displayed at a different size (e.g., based on the size of the handwritten input)).

The above-described manner of displaying predicted characters (e.g., by displaying the predicted character with a respective size that is based on the size of the handwritten input) allows the electronic device to adjust the size of the predicted characters based on the size of the handwritten input to increase the continuity of the characters displayed on the display, which simplifies the interaction between the user and the electronic device and enhances the operability of the electronic device and makes the user-device interface more efficient (e.g., by displaying the predicted characters with a respective size that is based on the size of the handwritten input), which additionally reduces power usage and improves battery life of the electronic device by enabling the user to use the electronic device more quickly and efficiency.

In some embodiments, the second size matches the first size, and the fourth size matches the third size (1880), such as in FIG. 17D (e.g., the size of the predicted characters match the size of the handwriting input for which the predicted characters correspond to). In some embodiments, matching the size includes matching the height, width, character spacing, or any combination of the above.

The above-described manner of displaying predicted characters (e.g., by matching the size of the predicted character with the size of the handwritten input) allows the electronic device to adjust the size of the predicted characters based on the size of the handwritten input to increase the continuity of the characters displayed on the display, which simplifies the interaction between the user and the electronic device and enhances the operability of the electronic device and makes the user-device interface more efficient (e.g., by displaying the predicted characters with a respective size that matches the size of the handwritten input), which additionally reduces power usage and improves battery life of the electronic device by enabling the user to use the electronic device more quickly and efficiency.

In some embodiments, while displaying the user interface, the electronic device receives (1882), via the touch-sensitive display, a second user input comprising a second handwritten input directed to the user interface, wherein the second handwritten input corresponds to a second sequence of characters, such as in FIG. 17B (e.g., receiving a user input on or near a text field. In some embodiments, the user input is received from a stylus or other writing device). In some embodiments, the user input is a gesture directed at the first handwritten input and/or the representation of the one or more predicted characters.

In some embodiments, in response to receiving the second user input (1884), in accordance with a determination that the second sequence of characters satisfies one or more criteria, the electronic device displays (1886), in the user interface, a representation of the second handwritten input and a representation of one or more second predicted characters selected based on the second sequence of characters in the second handwritten input, such as in FIG. 17D (e.g., if the second sequence of characters corresponds to a unique word, then display predicted characters). In some embodiments, a unique word is one such that less than a certain number of words can be created by adding characters to the handwritten input (e.g., 5 words, 10 words, 20 words).

In some embodiments, in response to receiving the second user input (1884), in accordance with a determination that the second sequence of characters does not satisfy the one or more criteria, the electronic device displays (1888), in the user interface, the representation of the second handwritten input without displaying the representation of the one or more second predicted characters, such as in FIG. 17D (e.g., if the second sequence of characters does not correspond to a unique word, then do not display predictions). In some embodiments, if the user input can potentially become a large number of words (e.g., more than 20 potential words, 50 potential words, 100 potential words, etc.), then do not display predictions (e.g., because the likelihood of the prediction to be correct is below a threshold).

The above-described manner of displaying predicted characters (e.g., by displaying predicted characters if the handwritten input satisfies a certain criteria (e.g., the handwritten input corresponds to a unique word)) allows the electronic device to limit the instances in which predictions are provided to the user and avoid providing predictions when the chances that the user will accept the prediction are low, which simplifies the interaction between the user and the electronic device and enhances the operability of the electronic device and makes the user-device interface more efficient (e.g., by displaying predicted characters in certain circumstances when a user is more likely to accept the predicted characters), which additionally reduces power usage and improves battery life of the electronic device by enabling the user to use the electronic device more quickly and efficiency.

In some embodiments, while displaying the user interface, the electronic device receives (1890), via the touch-sensitive display, a second user input comprising a second handwritten input directed to the user interface, wherein the second handwritten input corresponds to a second sequence of characters, such as in FIG. 17B (e.g., receiving a user input on or near a text field. In some embodiments, the user input is received from a stylus or other writing device). In some embodiments, the user input is a gesture directed at the first handwritten input and/or the representation of the one or more predicted characters.

In some embodiments, in response to receiving the second user input (1892), the electronic device displays (1894), in the user interface, a representation of the second handwritten input, such as in FIG. 17B (e.g., displaying the trail of the second handwritten inputs at the location(s) where the handwritten input is received).

In some embodiments, in response to receiving the second user input (1892), in accordance with a determination that more than a predetermined amount of time has elapsed since an end of the second handwritten input, the electronic device displays (1896), in the user interface, a representation of one or more second predicted characters selected based on the second sequence of characters in the second handwritten input, such as in FIG. 17D (e.g., if the user has paused handwritten input for a threshold amount of time (e.g., 0.5 seconds, 1 second, 2 seconds, 3 seconds, 5 seconds), then display the predicted characters).

In some embodiments, in response to receiving the second user input (1892), in accordance with a determination that less than the predetermined amount of time has elapsed since the end of the second handwritten input, the electronic device forgoes displaying (1898) the representation of the one or more second predicted characters, such as in FIG. 17D (e.g., if the user has not paused handwritten input for the threshold amount of time, do not display the predicted characters, and optionally display the predicted characters later once the predetermined amount of time has elapsed since the end of the second handwritten input).

The above-described manner of providing predicted characters (e.g., by displaying the predicted character after the user has paused handwriting input for a threshold amount of time) allows the electronic device to provide predicted characters in a situation in which the user is more likely to see and consider the predicted characters while avoiding displaying the predicted characters while the user is actively performing handwritten input, which could unnecessarily distract the user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, a combination of the first sequence of characters and the one or more predicted characters is displayed, in the user interface, in a selectable user interface element that is selectable to enter the combination of the first sequence of characters and the one or more predicted characters for use in (e.g., for entry into a text field displayed in) the user interface (1898-02), such as in FIG. 17S (e.g., display a pop-up near the representation of the handwriting input). In some embodiments, the pop-up includes a selectable option of the predicted word (e.g., the combination of the handwriting input and the predicted characters into a predicted word) that is selectable to accept the predicted word and convert the handwritten input into the predicted word. In some embodiments, as the user provides further handwritten input, the pop-up updates to display an updated predicted word based on the additional handwritten inputs.

The above-described manner of displaying predicted characters (e.g., by displaying the predicted character in a pop-up near the location of the handwritten input) allows the electronic device to provide predicted words without blocking the user interface where the handwritten input is being detected, which simplifies the interaction between the user and the electronic device and enhances the operability of the electronic device and makes the user-device interface more efficient (e.g., by displaying the predicted characters in a pop-up where the user can see the predicted input while simultaneously providing handwritten input), which additionally reduces power usage and improves battery life of the electronic device by enabling the user to use the electronic device more quickly and efficiency.

In some embodiments, the selectable user interface element includes a first representation of the combination of the first sequence of characters and the one or more predicted characters, and a second representation of the first sequence of characters, wherein the first representation is selectable to enter the combination of the first sequence of characters and the one or more predicted characters for use in (e.g., for entry into a text field displayed in) the user interface, and the second representation is selectable to enter the one or more predicted characters without the first sequence of characters for use in (e.g., for entry into a text field displayed in) the user interface (1898-04), such as in FIG. 17S (e.g., the pop-up also includes a textual display of the handwritten characters that have been written so far). In some embodiments, the textual display of the handwritten characters is displayed as font-based text. In some embodiments, the textual display is not selectable to convert the handwritten input into the font-based text version of the characters written so far. In some embodiments, the textual display is selectable to convert the handwritten input into the font-based text version of the characters written (and interpreted) so far (without also including the predicted characters with the conversion). In some embodiments, the pop-up updates (e.g., the predicted word and/or the textual display of the handwritten characters that have been written so far) as the user continues to provide further handwritten inputs.

The above-described manner of displaying predicted characters concurrently with font-based text corresponding to the handwritten input (e.g., by concurrently displaying the predicted character and the font-based text interpretation of the handwritten input in a pop-up) allows the electronic device to provide the ability to confirm the user's writing and accept a predicted word or accept the handwriting input as written so-far, which simplifies the interaction between the user and the electronic device and enhances the operability of the electronic device and makes the user-device interface more efficient (e.g., by providing the user with the option to accept the predicted word or accept the font-based text of what the user has written so far, without requiring the user to navigate to different user interfaces to select the predicted word or accept the handwriting input as written), which additionally reduces power usage and improves battery life of the electronic device by enabling the user to use the electronic device more quickly and efficiency.

It should be understood that the particular order in which the operations in FIGS. 18A-18I have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1500, 1600, 2000, and 2200) are also applicable in an analogous manner to method 1800 described above with respect to FIGS. 18A-18I. For example, the operations of presenting autocomplete suggestions described above with reference to method 1800 optionally have one or more of the characteristics of the acceptance and/or conversion of handwritten inputs, selection and deletion of text, inserting handwritten inputs into pre-existing text, managing the timing of converting handwritten text into font-based text, presenting handwritten entry menus, controlling the characteristics of handwritten input, and converting handwritten input to font-based text, displaying options in a content entry palette, etc., described herein with reference to other methods described herein (e.g., methods 700, 900, 1100, 1300, 1500, 1600, 2000, and 2200). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 18A-18I are, optionally, implemented by components depicted in FIGS. 1A-1B. For example, displaying operations 1802, 1806, 1844, 1854, 1864, 1886, 1888, 1894, and 1896 and receiving operations 1804, 1808, 1816, 1836, 1882, and 1890 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Converting Handwritten Inputs into Font-Based Text

Users interact with electronic devices in many different manners, including entering text into the electronic device. The embodiments described below provide ways in which an electronic device converts handwritten inputs into font-based text, thus enhancing the user's interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 19A:
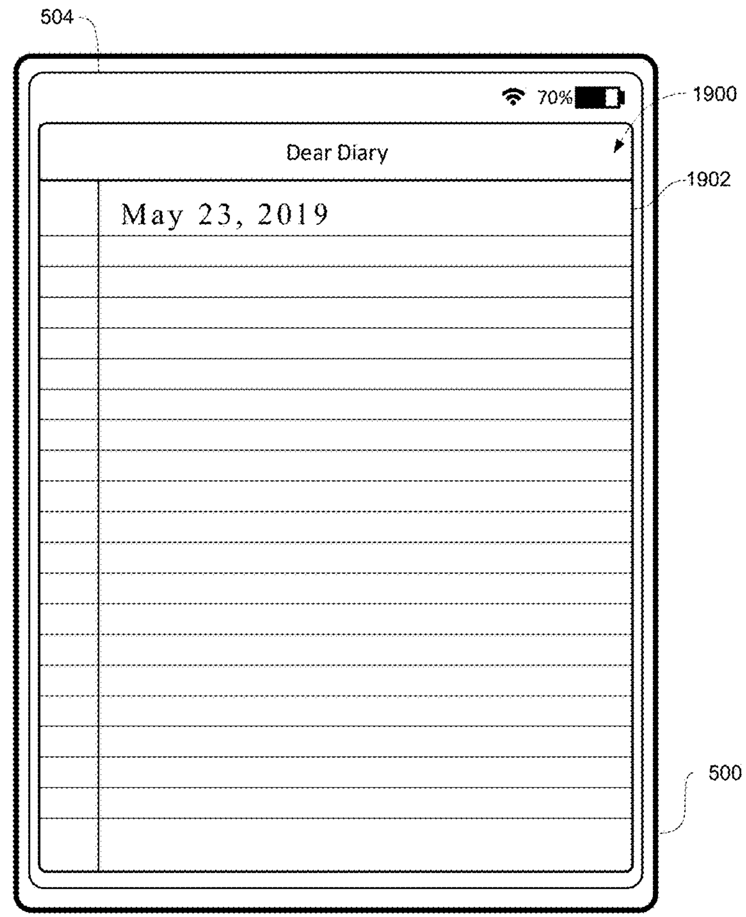
FIGS. 19A-19BB illustrate exemplary ways in which an electronic device converts handwritten input to font-based text in accordance with some embodiments.
Figure 19C:
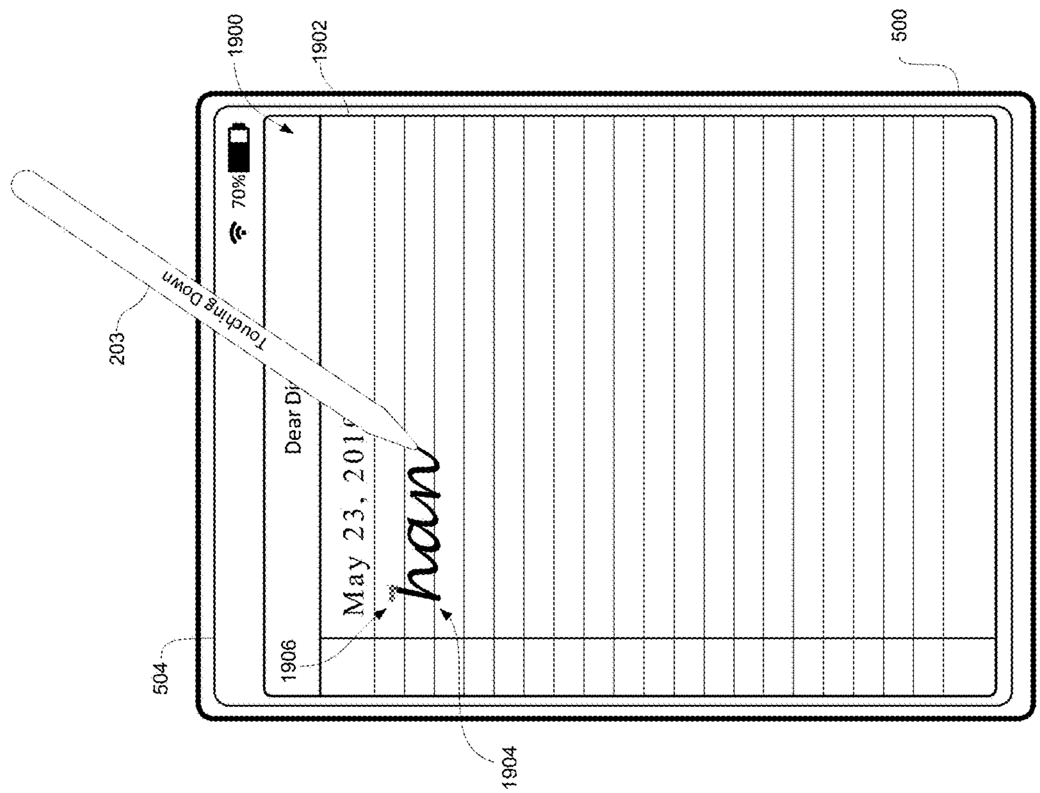
Figure 19B:
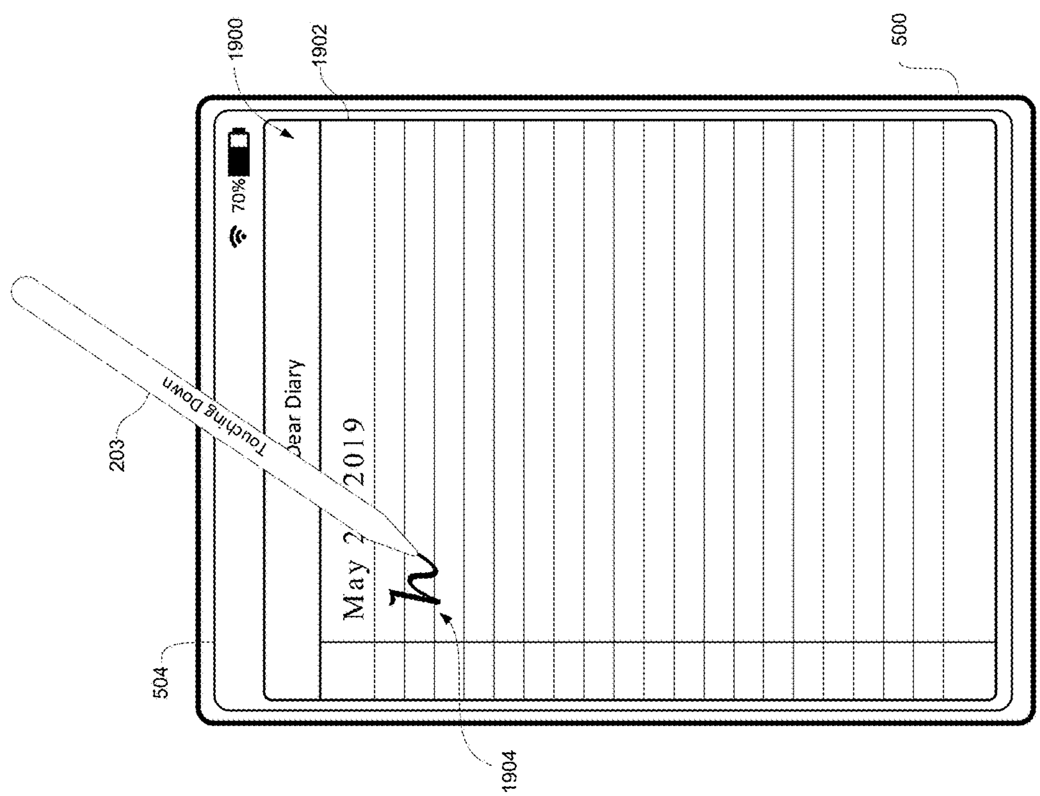

FIGS. 19A-19BB illustrate exemplary ways in which an electronic device converts handwritten inputs into font-based text. The embodiments in these figures are used to illustrate the processes described below, including the processes described with reference to FIGS. 20A-20D.

FIGS. 19A-19BB illustrate the operation of the electronic device 500 converting handwritten inputs into font-based text. FIG. 19A illustrates an exemplary device 500 that includes touch screen 504. In FIG. 19A, device 500 is displaying user interface 1900 corresponding to a note taking application (e.g., similar to user interfaces 620, 800, 1000, 1210, and 1700). In some embodiments, user interface 1900 includes a text entry region 1902 in which a user is able to enter text (e.g., via a soft keyboard or stylus 203 as described above with respect to methods 700, 1100, 1300, and 1800).

In FIG. 19B, handwritten input 1904 is received in text entry region 1902 from stylus 203 writing the character "h".

In FIG. 19C, handwritten input 1904 continues, writing the characters "an". In some embodiments, after the user has written a predetermined number of characters (1 character, 2 characters, 3 characters) or after a predetermined amount of time (0.5 seconds, 1 second, 3 seconds), a portion of handwritten input 1906 (e.g., a portion of the trail left by the handwritten input) begins to change visual characteristics. In some embodiments, the portion of handwritten input 1906 changes color and/or opacity (e.g., from black to grey, from dark blue to light blue, etc.). In some embodiments, the portion of handwritten input 1906 that changes color begins at the beginning of handwritten 1904 (e.g., at the first stroke) and follows the path of the handwritten input. For example, the top of the first vertical stroke of "h" changes from black to grey, then the rest of the vertical stroke turns to grey, then the curve, etc., as shown in FIG. 19D.

Figure 19E:
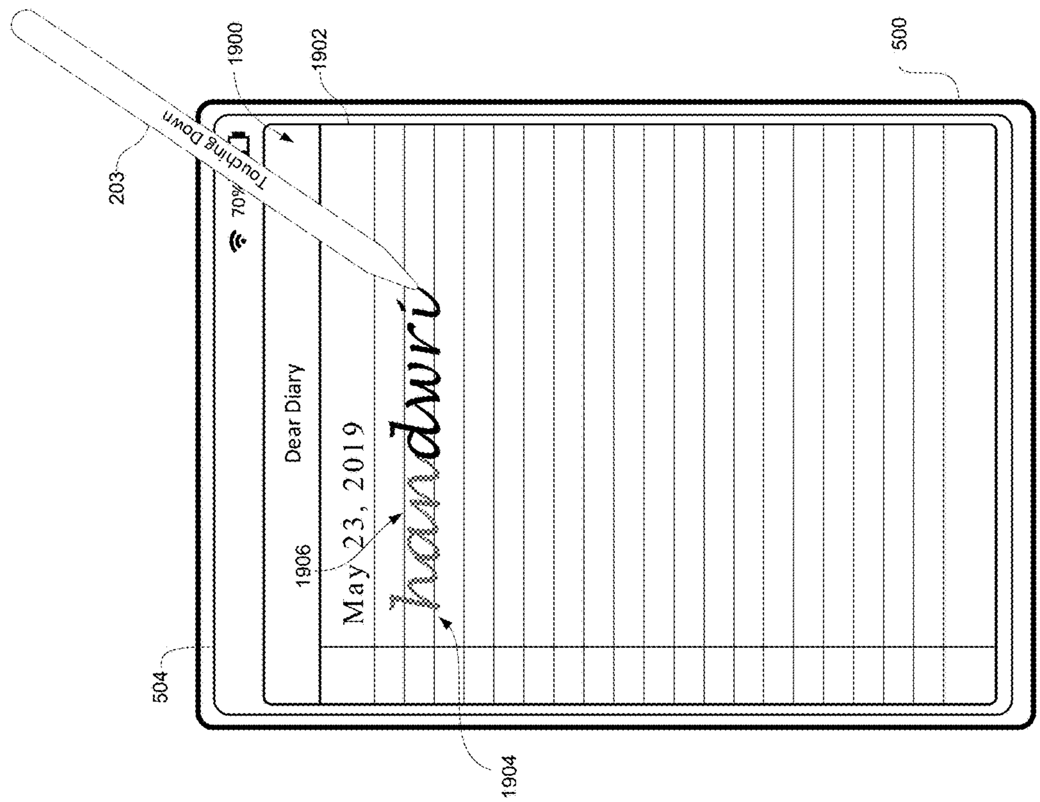
Figure 19D:
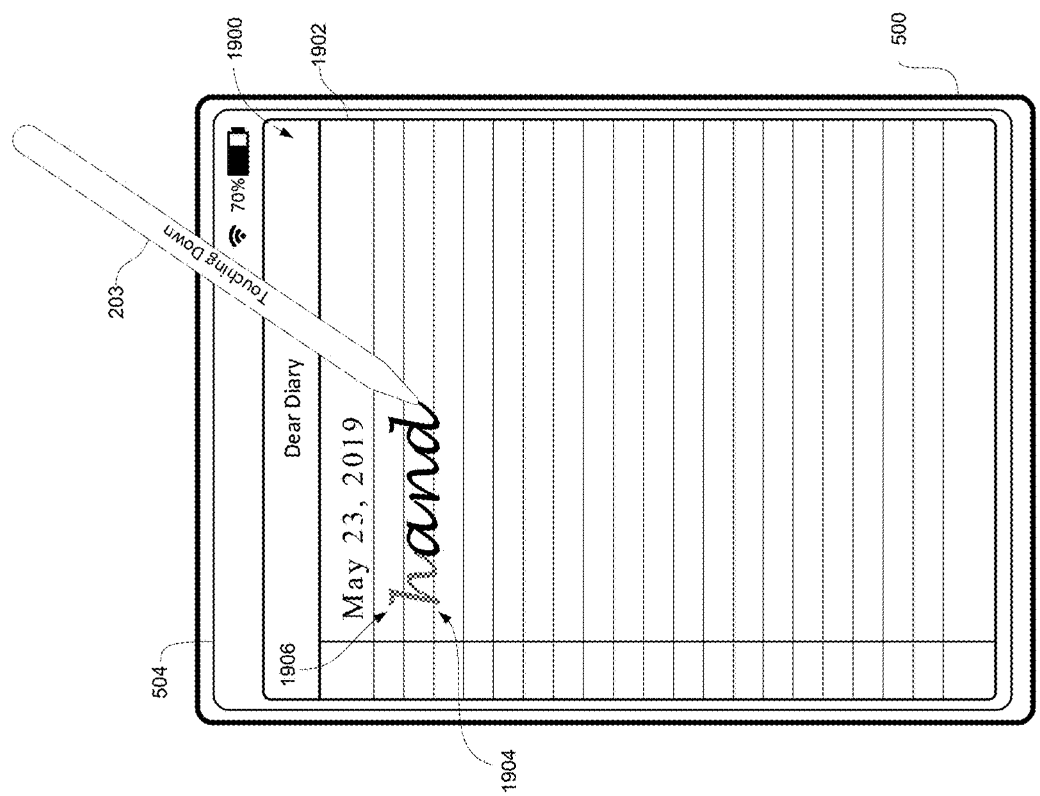

In FIG. 19D, as the user continues the handwritten input, the portion of handwritten input 1906 expands along the path of the handwritten input as described above. In some embodiments, the continued changing of the visual characteristic does not require that the user continue handwritten input (e.g., and optionally will "catch up" to the handwritten input if the handwritten input slows down or stops, as described in further detail below). In some embodiments, the portion of handwritten input 1906 expands along the path based on the speed of the original stroke (e.g., if the user wrote "h" very quickly, then "h" is converted into grey very quickly). In some embodiments, the speed of the conversion is based on the speed of the user's current writing (e.g., if the user writes "and" and subsequent characters quickly, then the speed of conversion is also fast). In some embodiments, the speed of changing the visual characteristic (e.g., of the expansion) matches the speed of the user's handwriting input. In some embodiments, the speed of changing the visual characteristic is based on the speed of the user's handwriting input (e.g., and optionally is slower than the speed of the user's handwriting input). In some embodiments, the speed of changing the visual characteristic is fixed and is not dependent on the speed of the user's handwriting input. In some embodiments, the speed of changing the visual characteristic is based on the amount of time since the user has written the respective portion of the handwritten input (e.g., 0.5 seconds, 1 second, 2 seconds, 3 seconds, etc.). Thus, in some embodiments, changing the visual characteristic of the handwritten input appears as if the "ink" from the user's handwritten input is drying (e.g., those portions of the handwritten trail that were created and displayed earlier are converted earlier than those portions of the handwritten trail that were created and displayed later are converted later).

In FIG. 19E, the user continues performing handwritten input and adds "wri" to "hand". In some embodiments, in response to or while the user is performing handwritten input, the portion of handwritten input 1906 continues to follow the path of handwritten input 1904, thus changing the visual characteristic of further characters in handwritten input 1904. In some embodiments, the change is performed on a stroke-by-stroke basis (e.g., each handwriting stroke for each character is converted at a time). In some embodiments, the change is performed on a character-by-character basis (e.g., each character is converted at a time, without regard to the order of the strokes for the character). In the embodiments, as illustrated in FIG. 19E, the speed of changing the visual characteristic of handwriting input 1904 lags behind the speed of handwriting input 1904 (e.g., two characters have been converted during the time in which the user wrote three characters).

Figure 19G:
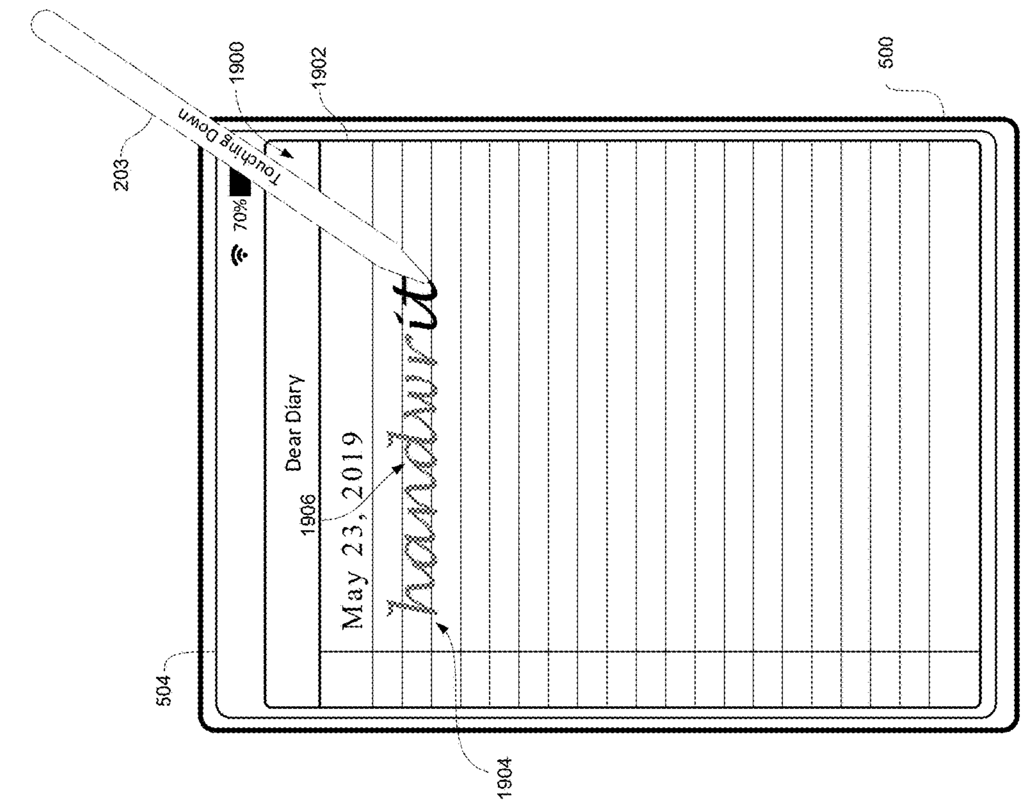
Figure 19F:
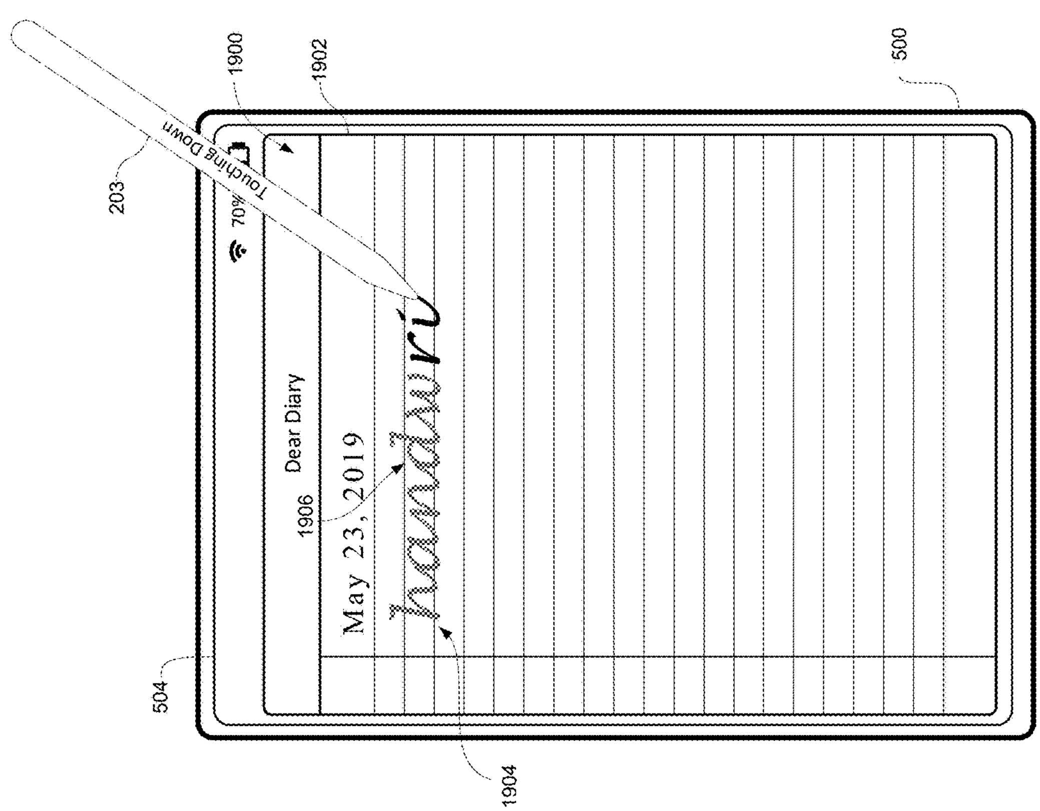

In FIG. 19F, the user pauses handwritten input (e.g., does not write any additional characters) while stylus 203 remains touched-down (e.g., or optionally while stylus 203 is no longer contacting the touch screen, but before a time when device 500 converts the handwritten input into font-based text, such as while a timer is counting, as described above with respect to method 1300). In some embodiments, the conversion of the portion of handwritten input 1906 continues to "catch up" to the current position of the handwritten input 1904/stylus 203. In some embodiments, the portion of handwriting input 1906 does not fully catch up to the current position of the handwriting input 1904. In some embodiments, the portion of handwritten input 1906 that is converted into grey stops a predetermined distance from the furthest position of handwritten input 1904 (e.g., 1 character, 2 characters, etc.). In some embodiments, the conversion pauses if the user has not completed writing the respective word and/or the handwritten input 1904 will not yet be converted to font-based text (e.g., as described above with respect to method 1300). Thus, as shown in FIG. 19F, the characters "r" and "i" corresponding to the most recently written two characters, are not converted to grey.

In FIG. 19G, the user resumes handwritten input 1904 (e.g., by writing "t"). In some embodiments, in response to the user resuming handwritten input, the conversion continues along the path of handwritten input 1904. In some embodiments, while the conversion (e.g., expansion of the grey) continues along the path of handwritten input 1904, the conversion maintains the predetermined distance from the current position of handwritten input 1904 (e.g., the furthest position of the handwritten input).

Figure 19I:
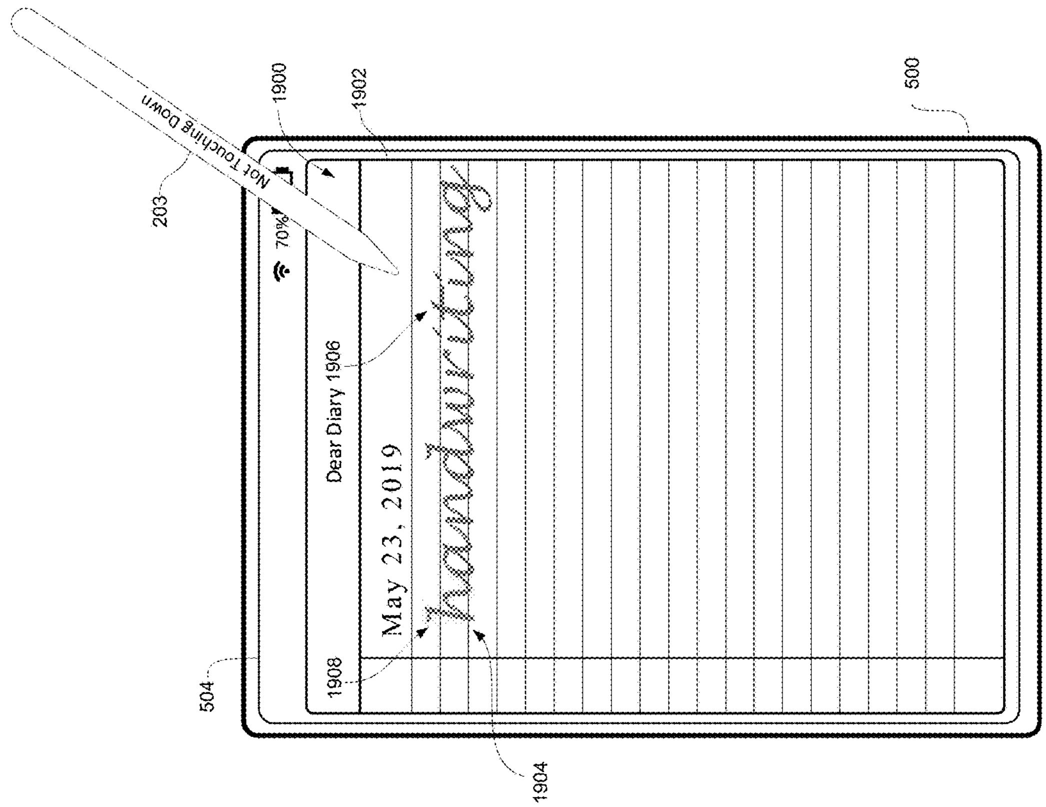
Figure 19H:
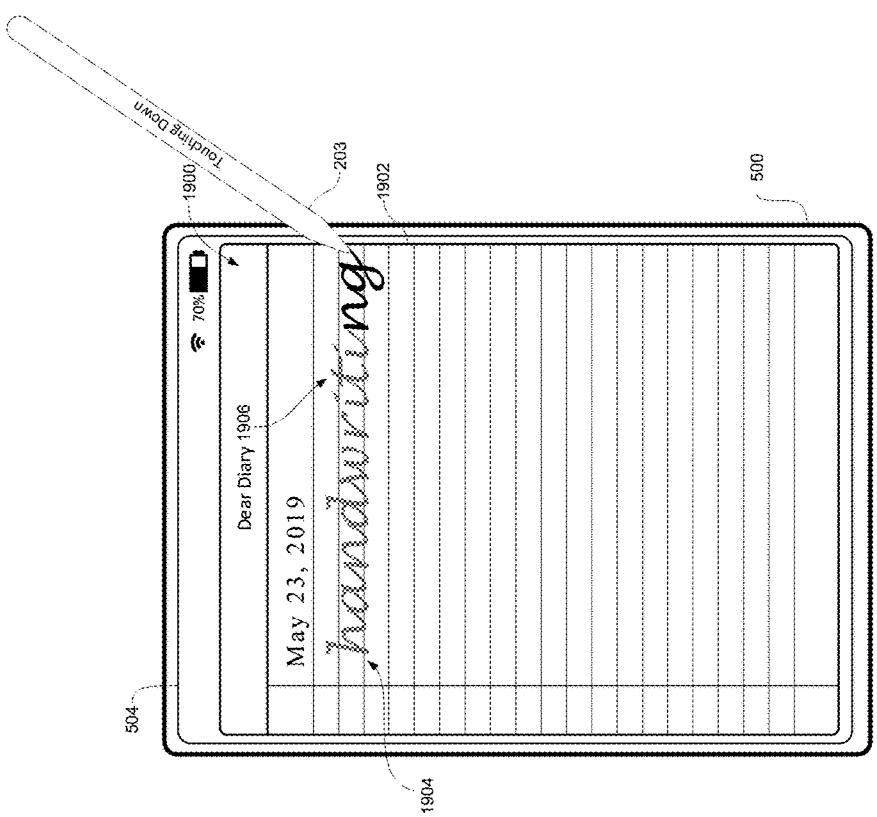

In FIG. 19H, the user continues performing handwritten input 1904 and completes writing the word "handwriting." In some embodiments, in response to the user continuing handwritten input, the conversion continues along the path of handwritten input 1904 up to the predetermined distance from the furthest position of handwritten input 1904 (e.g., the current position of stylus 203).

In FIG. 19I, a lift-off of stylus 203 is detected. In some embodiments, device 500 determines that the user has completed writing handwritten input 1904. In some embodiments, in response to the user completing writing handwritten input 1904, device 500 converts handwritten input 1904 to font-based text (e.g., optionally in accordance with the processes described in methods 700, 1100, and 1300). In some embodiments, in response to device 500 determining that the user has completed writing the respective word (e.g., as opposed to pausing handwritten input mid-word as described above with respect to FIG. 19F), the process of converting handwritten input 1904 to grey converts the rest of the handwritten word (e.g., including the characters that were not converted in FIG. 19H), such that all characters of the handwritten input are changed to grey.

In some embodiments, concurrently with or after handwritten input 1904 is fully converted to grey (e.g., and in response to the determination that the user has completed writing the word "handwriting"), device 500 begins the process of converting handwritten input 1904 into font-based text. In some embodiments, the process of converting handwritten input 1904 includes an animation transforming handwritten input 1904 into font-based text. In some embodiments, the animation includes dissolving a portion of handwritten input 1908, as shown in FIG. 19I. For example, as shown in FIG. 19I, the "h" begins to dissolve and transform into individual discrete particles.

Figure 19K:
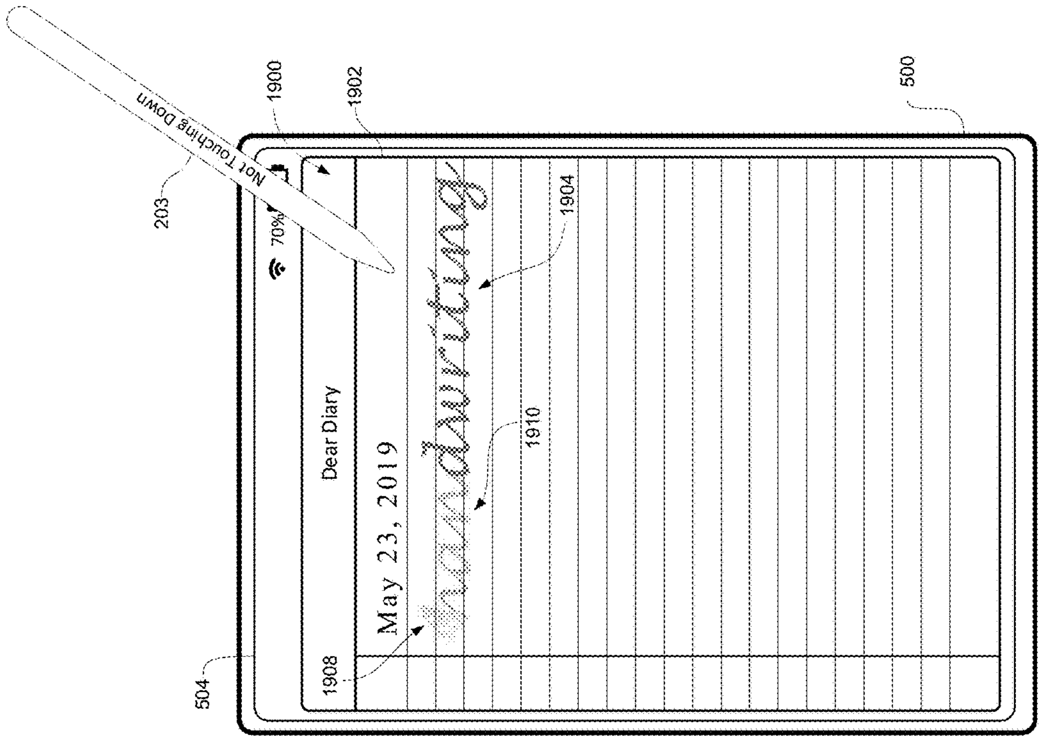
Figure 19J:
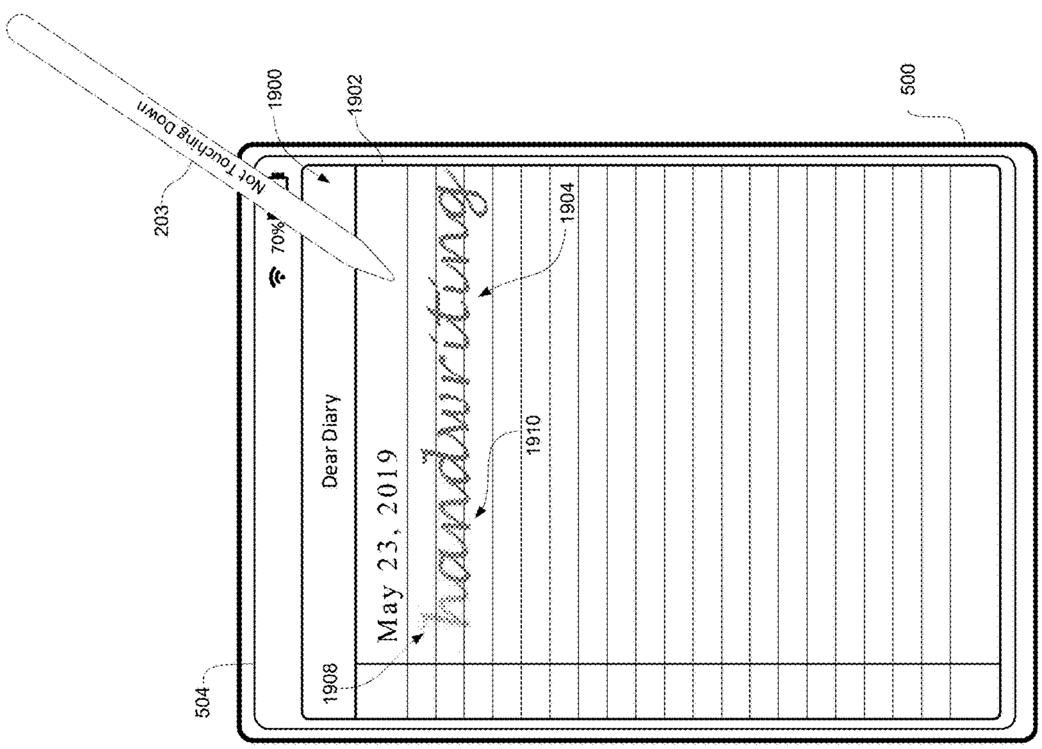

In FIG. 19J, the animation continues and the "h" is further dissolved into particles while the characters "a" and "n"

begin to dissolve. In some embodiments, the particles remain within the original boundary of the character from which the particles were dissolved (e.g., the particles have not started moving towards the final location of the font-based text). Thus, in some embodiments, the animation proceeds from the beginning of the word "handwriting" and moves character-by-character to the final character of the word "handwriting". In some embodiments, the number of particles that a respective character is dissolved into is based on the area of the respective character. For example, a character with longer and/or wider strokes will be dissolved into more particles, while a character with shorter and/or thinner strokes will be dissolved into fewer particles.

In FIG. 19K, the particles from character "h" begin to move towards the final location of font-based text (e.g., left-aligned with text entry region 1902). In some embodiments, the characters "a" and "n" are fully dissolved into particles. In some embodiments, the dissolution animation continues down the word (e.g., "d" and "w" and so on).

Figure 19M:
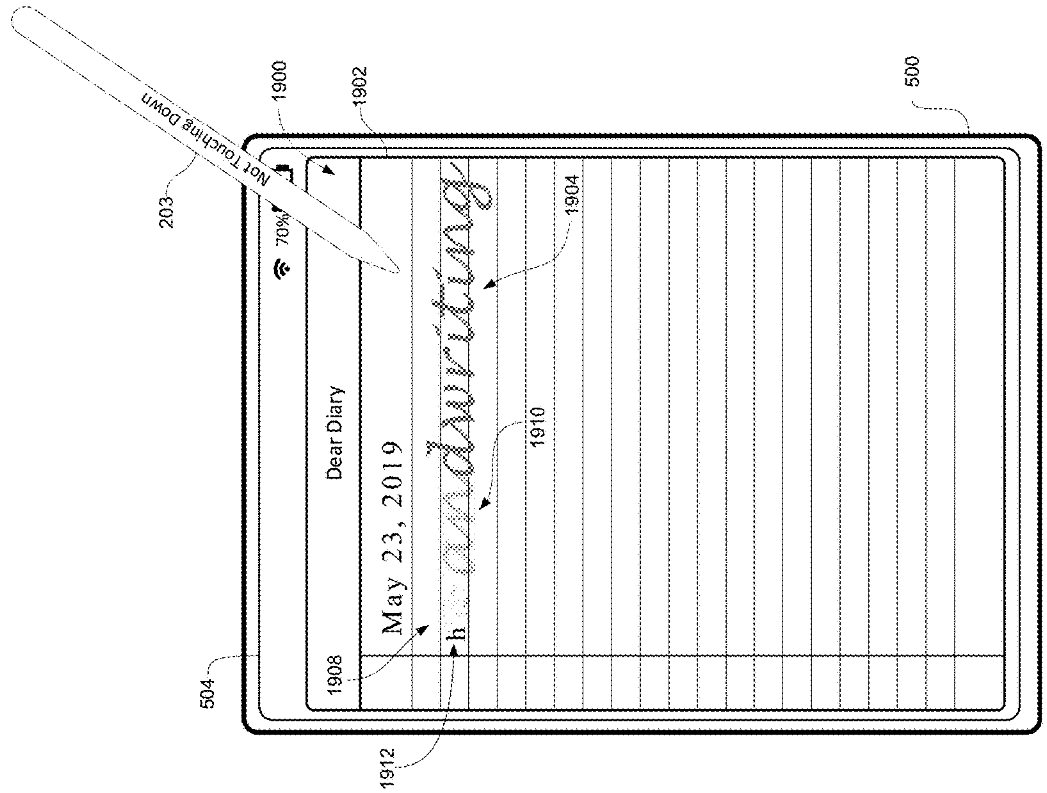
Figure 19L:
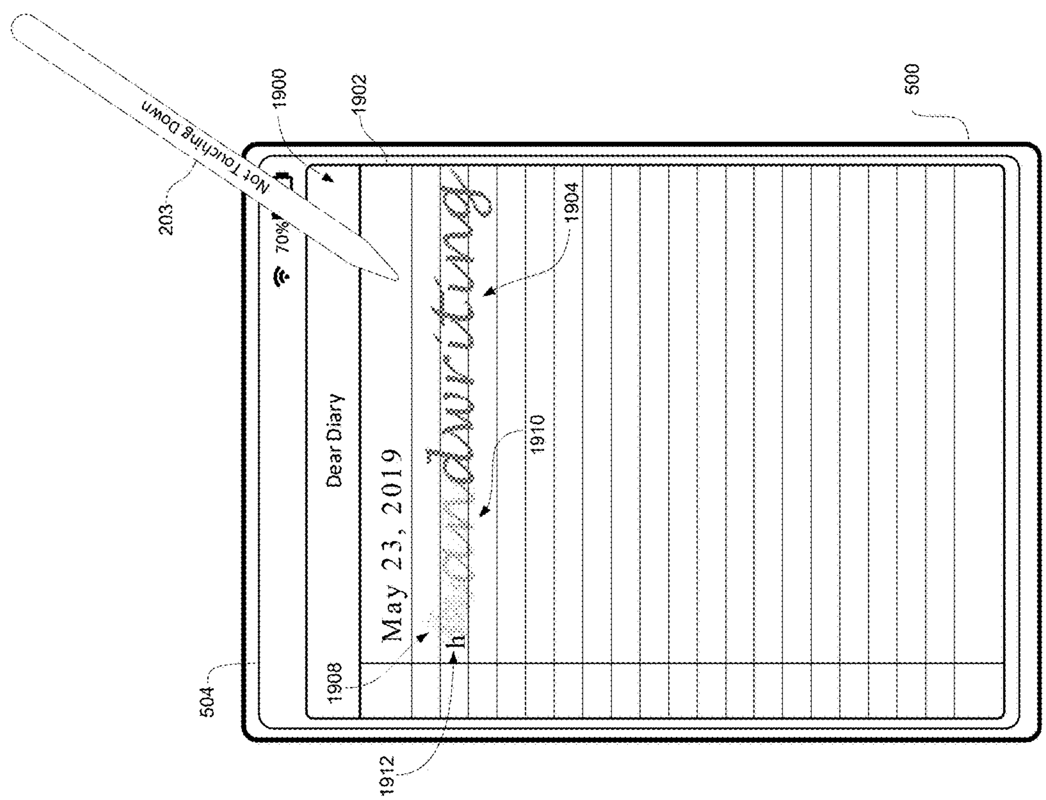

In FIG. 19L, while the particles from character "h" continue moving towards the final location of font-based text, font-based text 1912 is displayed (e.g., "h"). Thus, in some embodiments, the font-based text is displayed before all particles from "h" have moved to the final position. In some embodiments, the particles from character "h" move into and merge with the font-based text. In some embodiments, the particles are removed from display at a predetermined distance before reaching the font-based text (e.g., 1 mm, 2 mm, 5 mm, etc.). In some embodiments, each particle from the character "h" has its own respective trajectory from its original position to a final position (e.g., each particle is removed from display without consideration of other particles being removed from display). In some embodiments, the particles have a momentum such that the particles accelerate as they move towards the final font-based location and then decelerate as they approach the final font-based location (e.g., optionally as they approach the position in which they are removed from display).

For example, in FIG. 19M, the majority of the particles from the character "h" have reached their final location and are removed from display. In some embodiments, some particles are still moving towards their respective final locations (e.g., optionally the particles from the right-most portion of the character "h"). It is understood that although FIGS. 19K-19M do not illustrate the particles from characters "a" and "n" moving towards their respective final locations, the animation of the particles from characters "a" and "n" are optionally concurrently moving towards their respective final locations according to the same process as described for the character "h". Similarly, although FIGS. 19K-19M do not illustrate the dissolution animation of the remaining characters of handwritten input 1904, the animation of the dissolution and moving of particles is optionally performed while the particles from "h" move towards their final location according to the same process as described for the character "h". FIG. 19N illustrates the final result after all characters have dissolved into particles, moved to their final locations, and converted into font-based text 1912.

FIGS. 19A-19M above illustrate an embodiment in which a word is dissolved in a character-by-character process. FIGS. 19O-19V illustrate an alternative embodiment in which all characters of a word are animated at the same time (e.g., the dissolution animation is word-by-word rather than character-by-character).

Figure 19O:
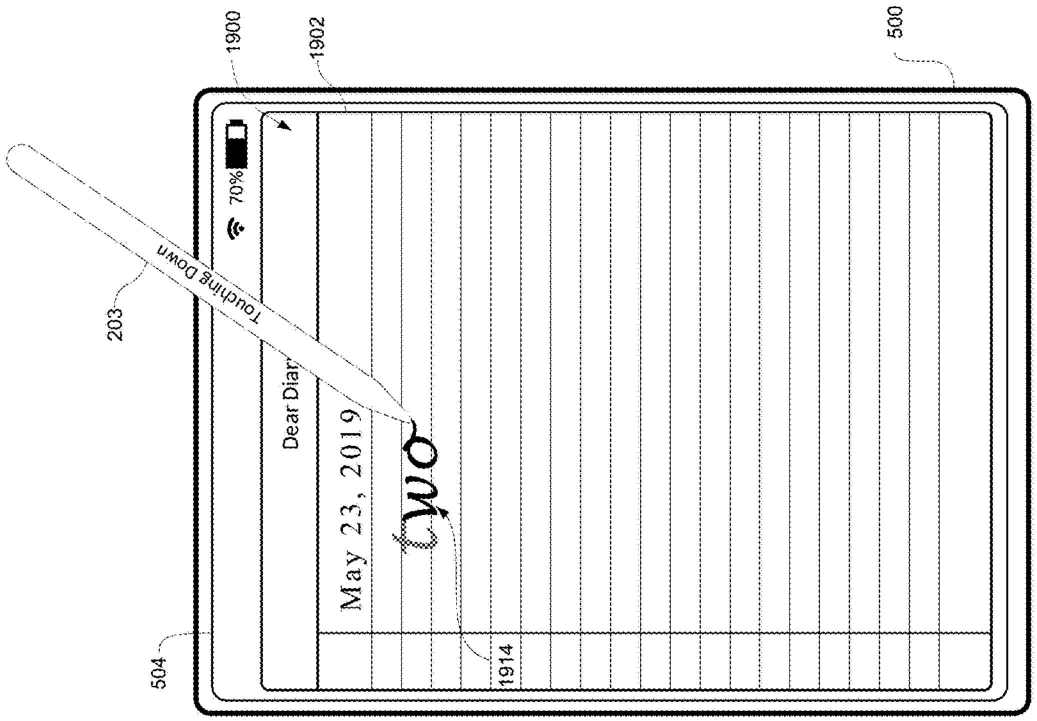
Figure 19N:
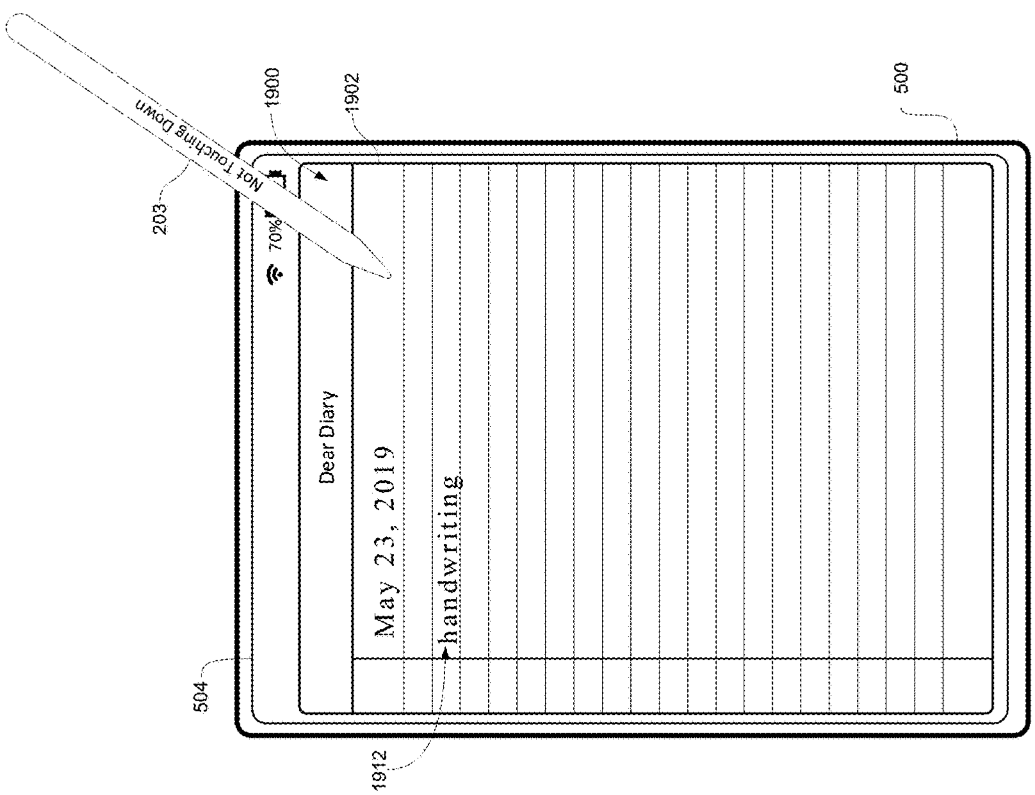
Figure 19Q:
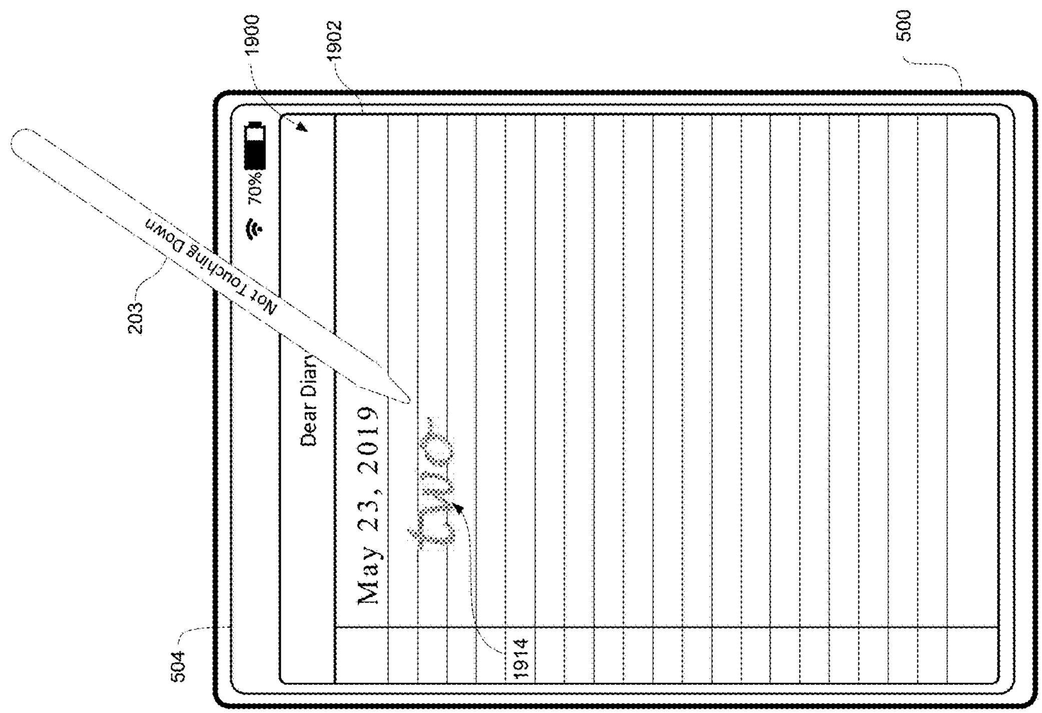
Figure 19P:
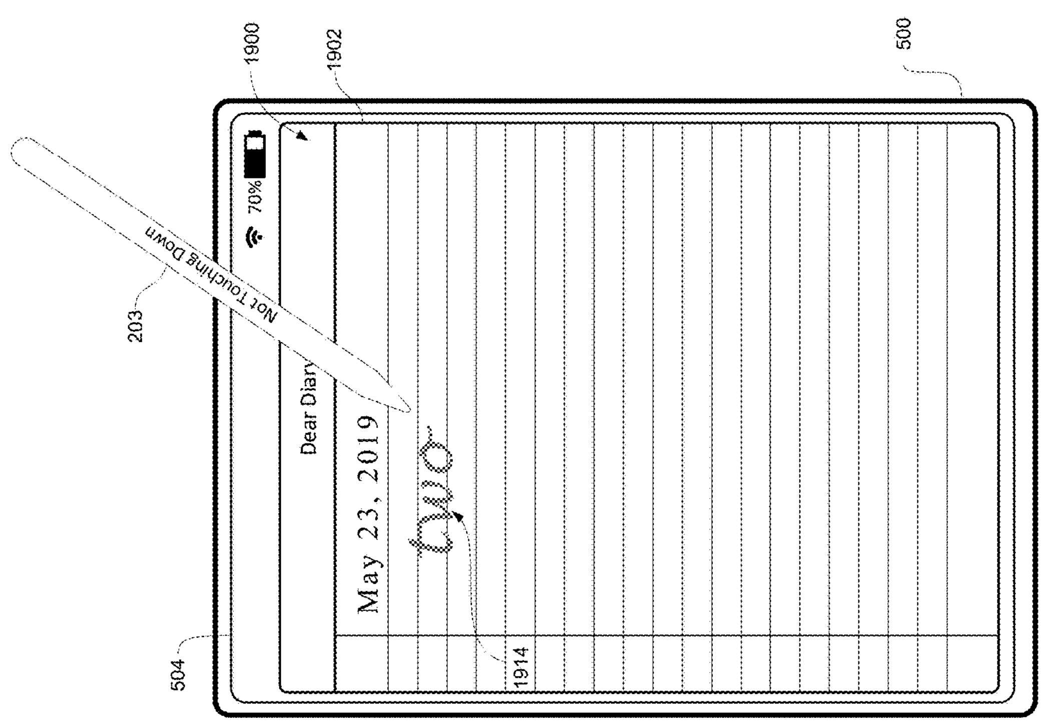

In FIG. 19O, a handwritten input 1914 is received writing the word "two". In some embodiments, while the user is performing handwritten input 1914, the word "two" is converted from black to grey, similarly to the process described above with respect to FIGS. 19A-19I. In FIG. 19P, lift-off of stylus 203 is detected as the user completes writing the word "two" and the entire word is then converted to grey. In FIG. 19Q, the characters of handwritten input 1914 (e.g., optionally every character of handwritten input 1914) begins to dissolve (e.g., as opposed to each sequential character at a time). In FIG. 19R, while the animation of handwritten input 1914 converting into font-based text 1916 is in progress, the user begins handwritten input 1918 of a second word. In some embodiments, as shown in FIG. 19R, the particles from the word "two" are moving towards their respective final locations and font-based text 1916 corresponding to the converted word (e.g., "two") is displayed.

Figure 19S:
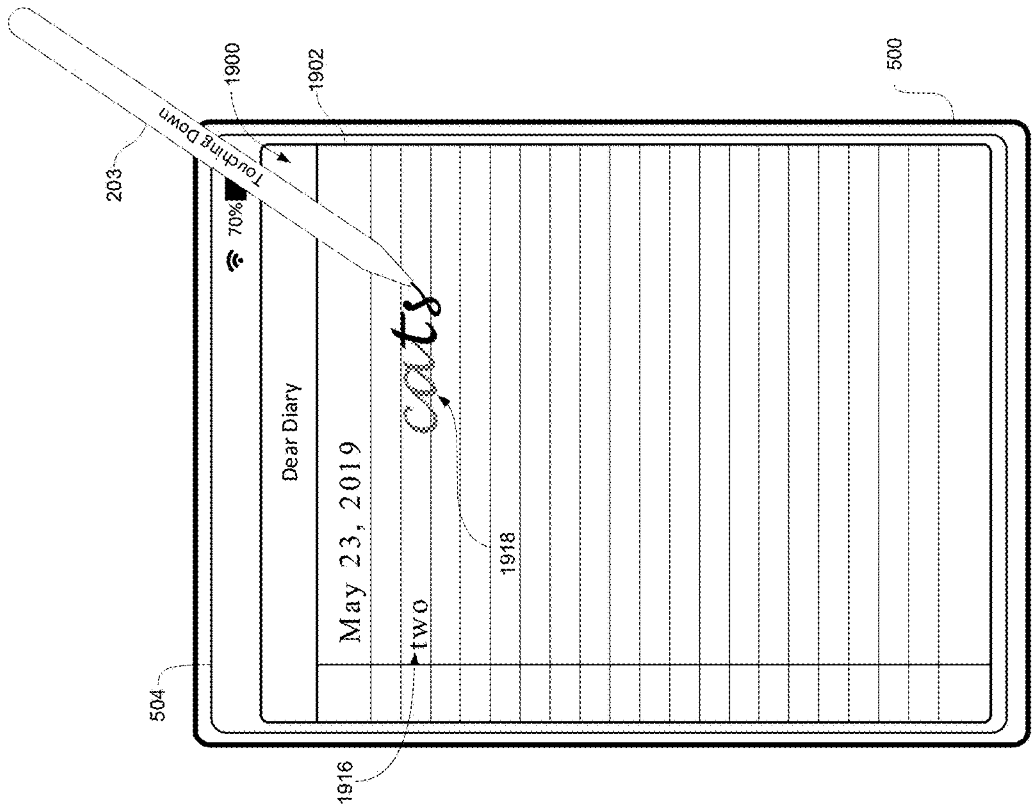
Figure 19R:
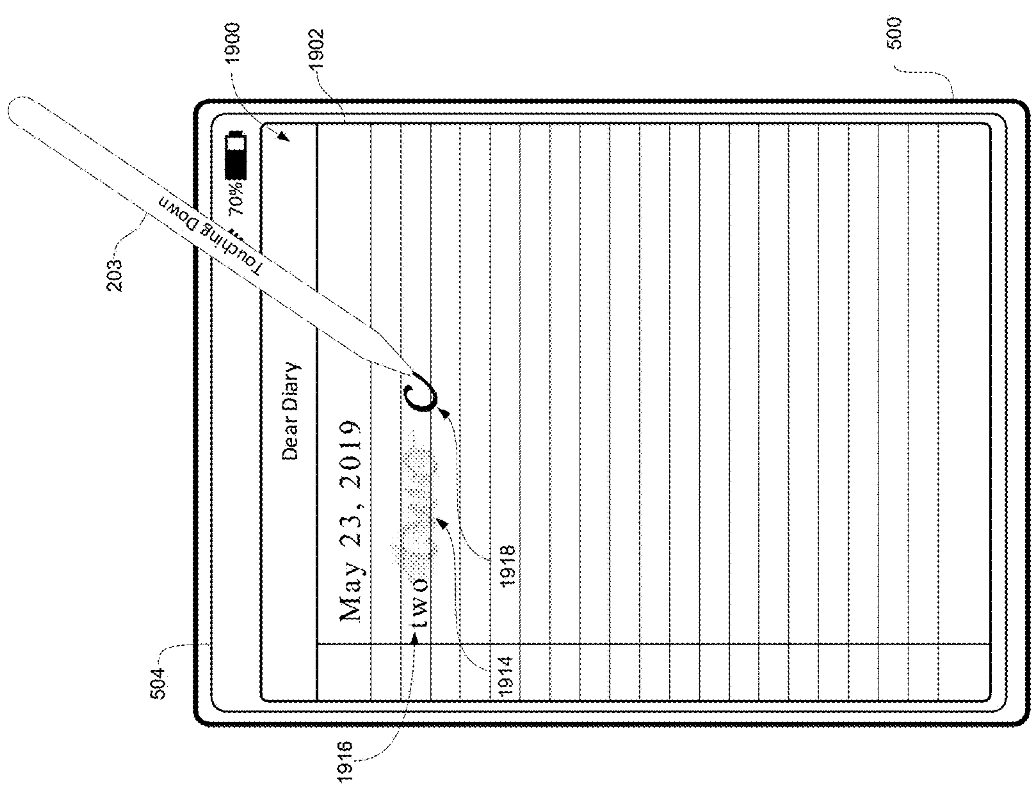

In FIG. 19S, the user continues performing handwritten input 1918. In some embodiments, concurrently with handwritten input 1918, handwritten input 1918 is converted to grey, similarly to the process described above with respect to FIGS. 19A-19I. In FIG. 19S, the animation of converting handwritten input 1914 to font-based text 1916 is completed (e.g., no more particles from the word "two" are displayed).

Figure 19U:
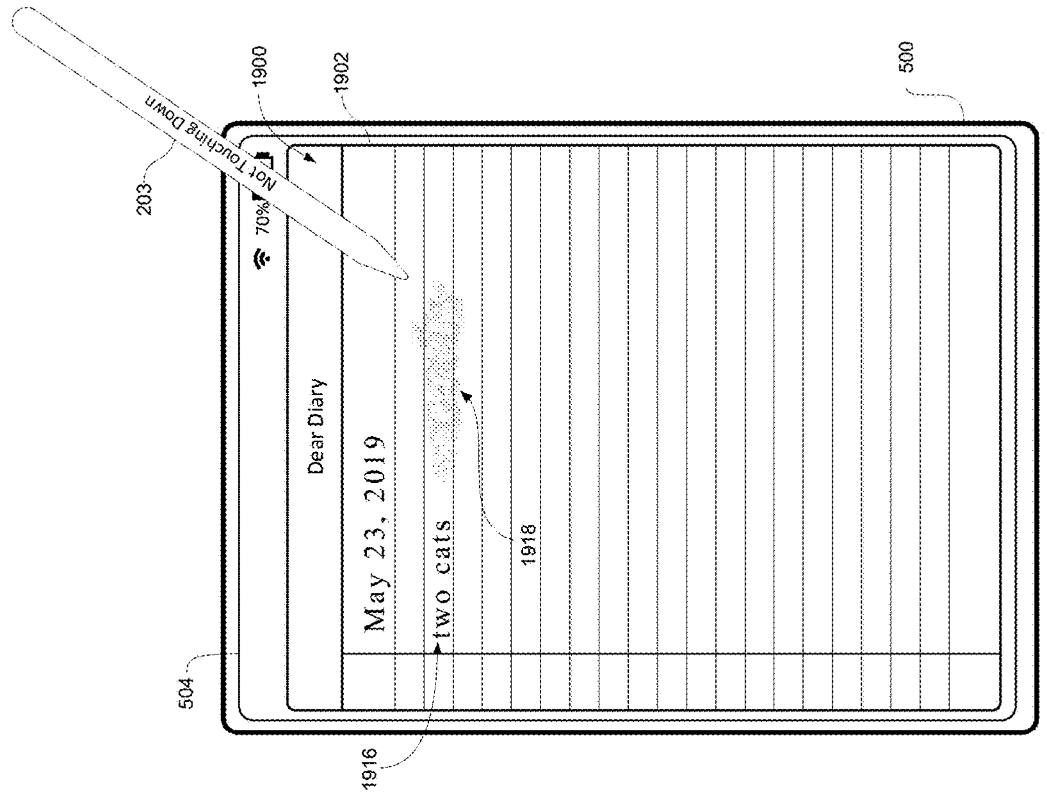
Figure 19T:
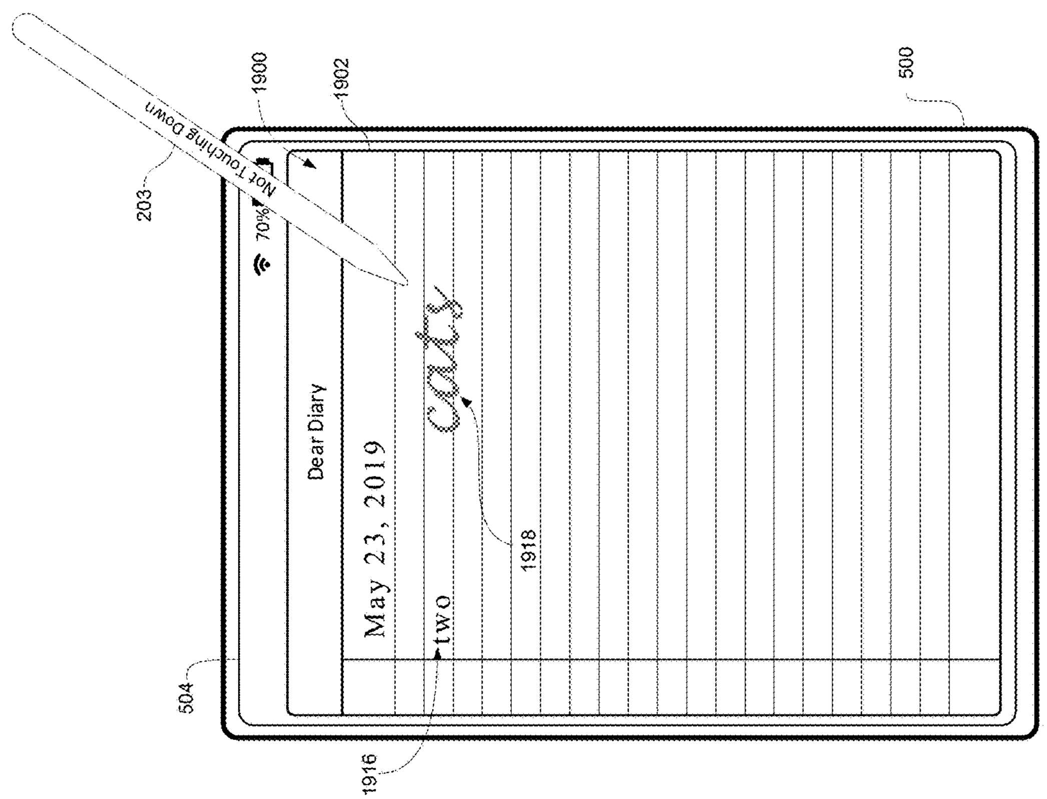

In FIG. 19T, lift-off of stylus 203 is detected as the user completes writing the word "cats". In some embodiments, in response to the user completing writing the word "cats", the word is updated to become grey (e.g., according to the process described above with respect to FIGS. 19A-19I). In some embodiments, in response to or after the user completes writing the word "cats" and converting the word to grey, the word (e.g., every character simultaneously) begins to dissolve into particles and move towards the final location of font-based text, as shown in FIG. 19U. In some embodiments, the final location of the font-based text (e.g., "cats") is aligned with the previously converted font-based text (e.g., "two"). In FIG. 19V, the animation is completed, and handwritten inputs 1914 and 1918 have been converted into font-based text 1916 corresponding to "two cats". Thus, in some embodiments, the animation is performed on a word-by-word basis (e.g., each character in a word simultaneously). In some embodiments, the number of particles for each word is based on the area of each word (e.g., the amount of area taken up by each character of the word). It is understood that the animation converting a respective word into font-based text is not dependent on the user continuing handwritten input (e.g., writing another word) and is optionally performed any time device 500 determines that the user has completed writing a word and converts the handwritten input to font-based text.

Figure 19W:
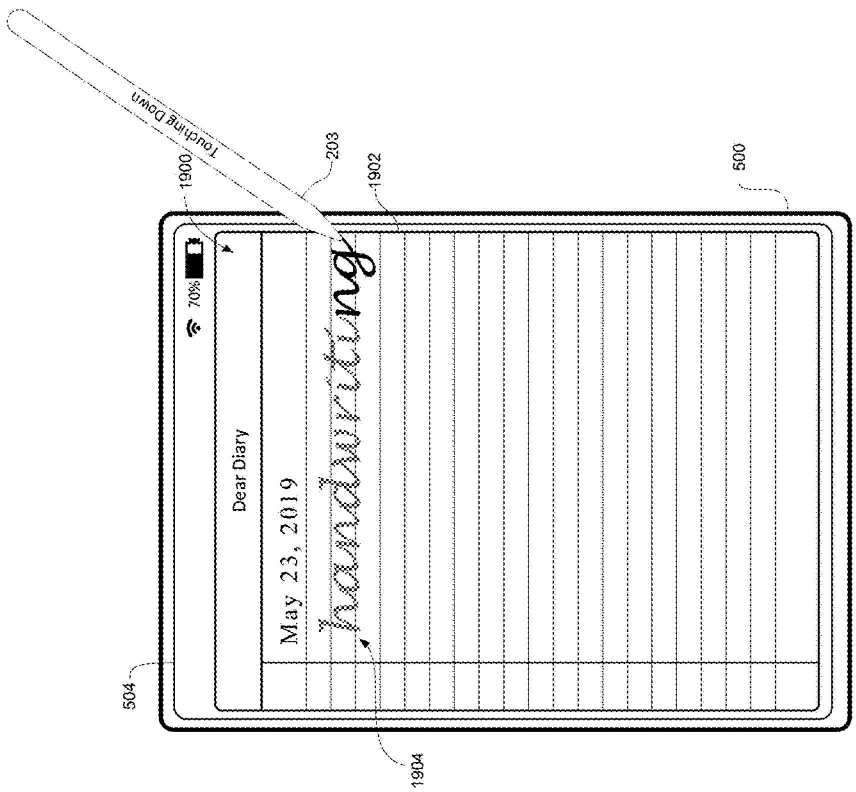
Figure 19V:
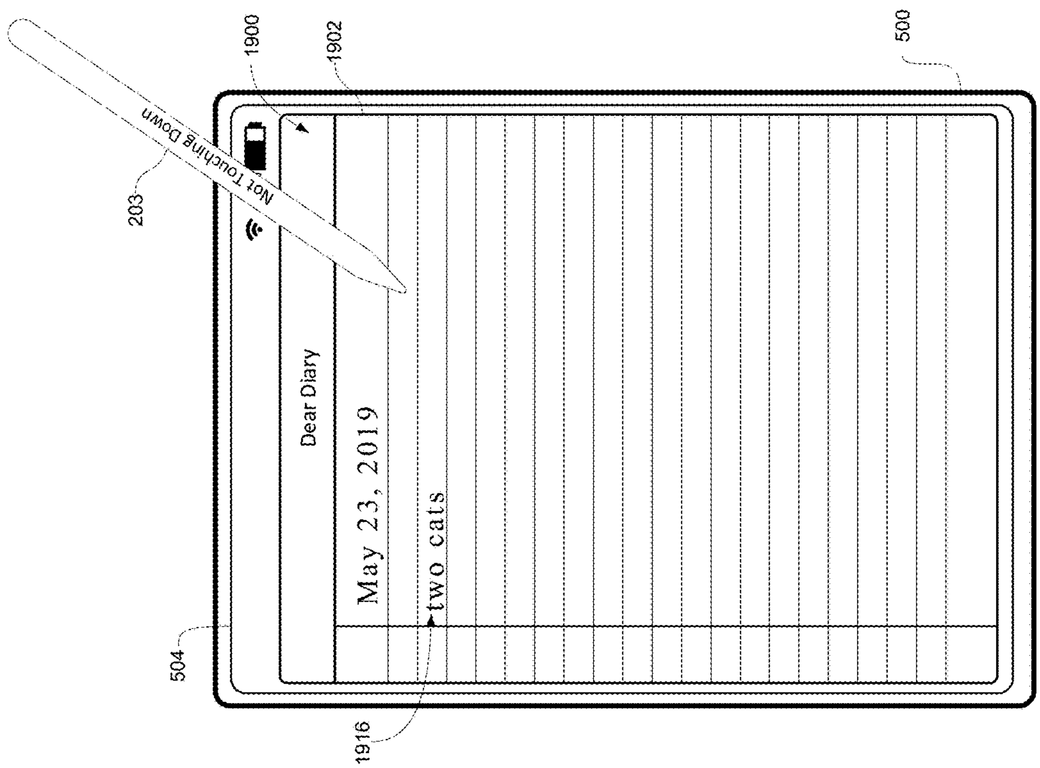
Figure 19Y:
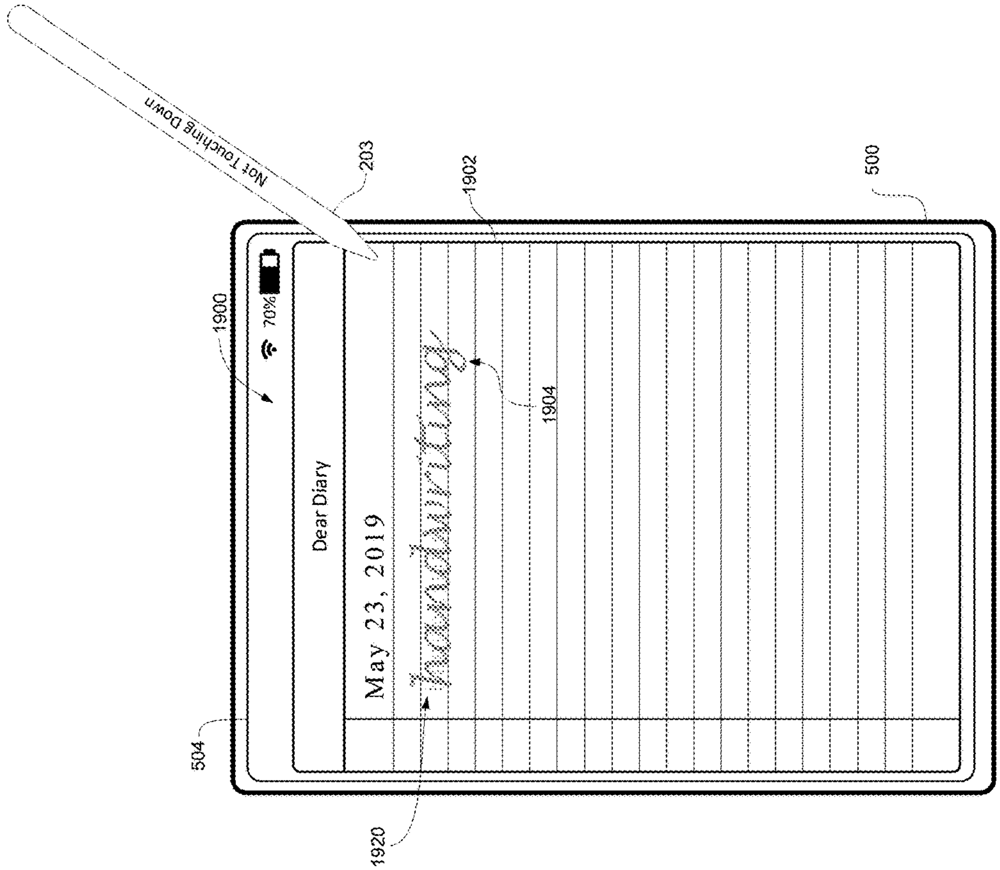
Figure 19X:
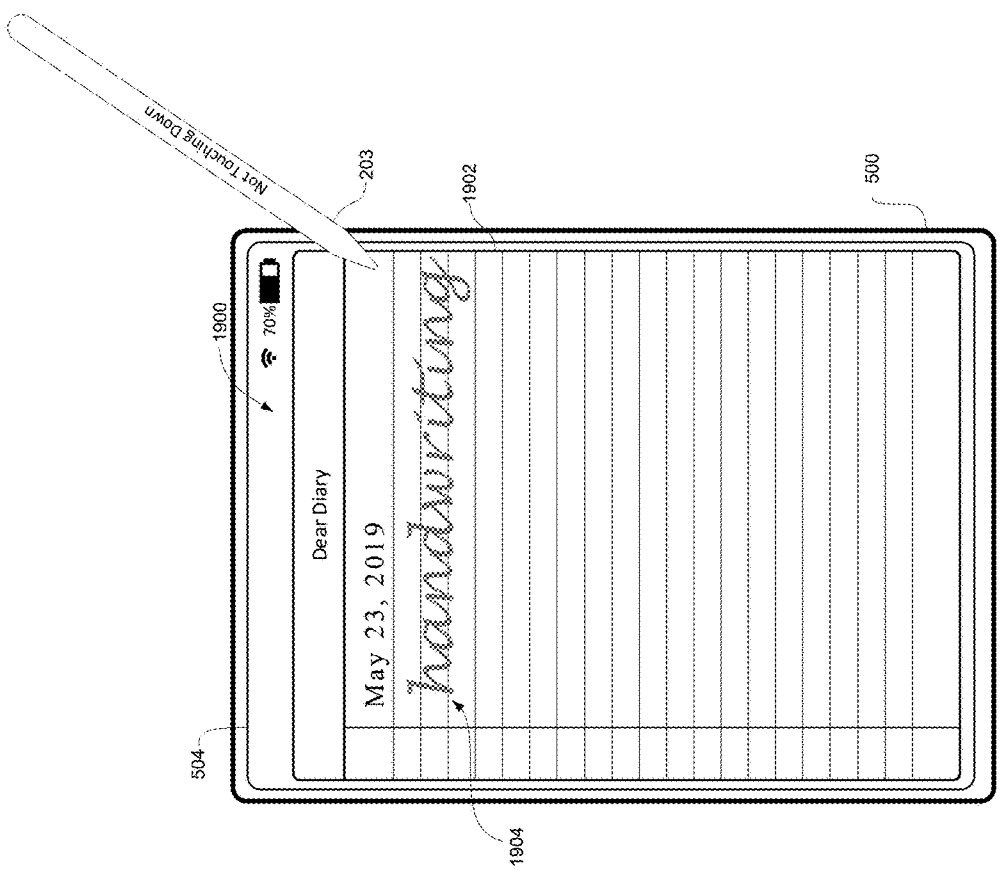
Figure 19A:
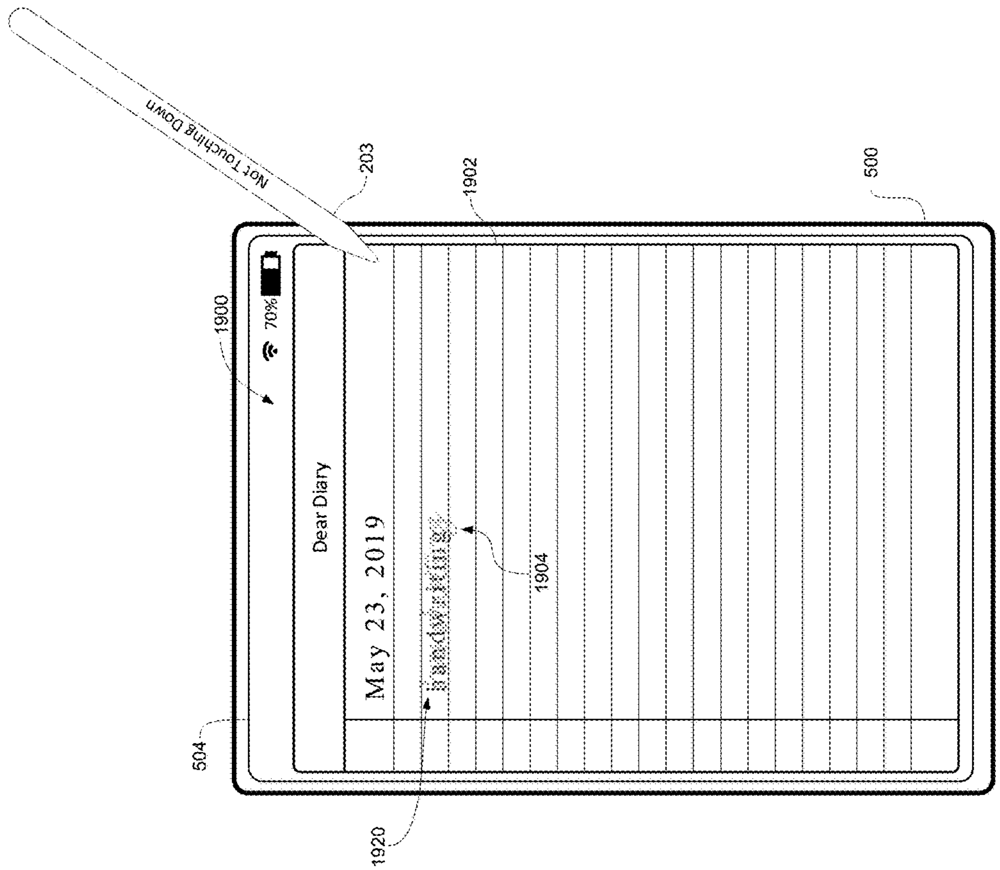

FIGS. 19W-19BB illustrate another embodiment of displaying an animation of the handwritten input converting into font-based text. In FIG. 19W, the user completes writing the word "handwriting" (e.g., similar to as shown in FIG. 19H). In FIG. 19X, a lift-off of stylus 203 is detected. In some embodiments, device 500 determines that the user has completed writing handwritten input 1904. In some embodiments, in response to the user completing writing handwritten input 1904, device 500 converts handwritten input 1904 to font-based text (e.g., optionally in accordance with the processes described in methods 700, 1100, and 1300). In some embodiments, in response to device 500 determining that the user has completed writing the respective word, the process of converting handwritten input 1904 to grey converts the rest of the handwritten word (e.g., including the characters that were not previously converted to grey in FIG. 19W), such that all characters of the handwritten input are changed to grey.

In some embodiments, concurrently with or after handwritten input 1904 is fully converted to grey (e.g., and in response to the determination that the user has completed writing the word "handwriting"), device 500 begins the process of converting handwritten input 1904 into font-based text. In some embodiments, the process of converting handwritten input 1904 includes an animation transforming handwritten input 1904 into font-based text. In some embodiments, the animation includes shrinking handwritten input 1908 to and/or towards the final size of the resulting font-based text and/or fading handwritten input 1908 out of view while concurrently fading the resulting font-based text into view. For example, in FIG. 19Y, handwritten input 1904 has reduced in size as compared to FIG. 19X (e.g., reducing in size horizontally and/or vertically). In FIG. 19Y, handwritten input 1904 additionally or alternatively begins to fade out (e.g., increase in transparency and/or changing to grey). In FIG. 19Y, font-based text 1920 corresponding to the handwritten input begins to fade into view. For example, in FIG. 19Y, font-based text 1920 is displayed grey and with a high transparency value. In some embodiments, the size of font-based text 1920 is the default size of the current font setting for text entry region 1902.

Figure 19Z:
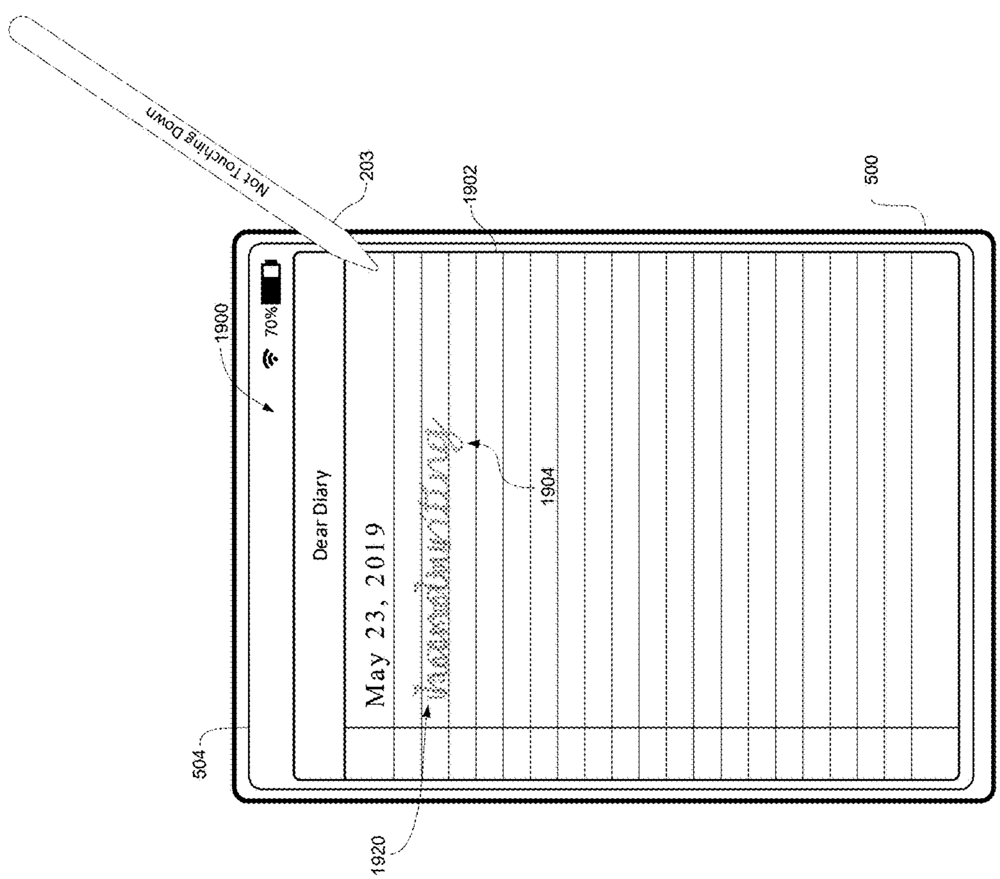
Figure 19B:
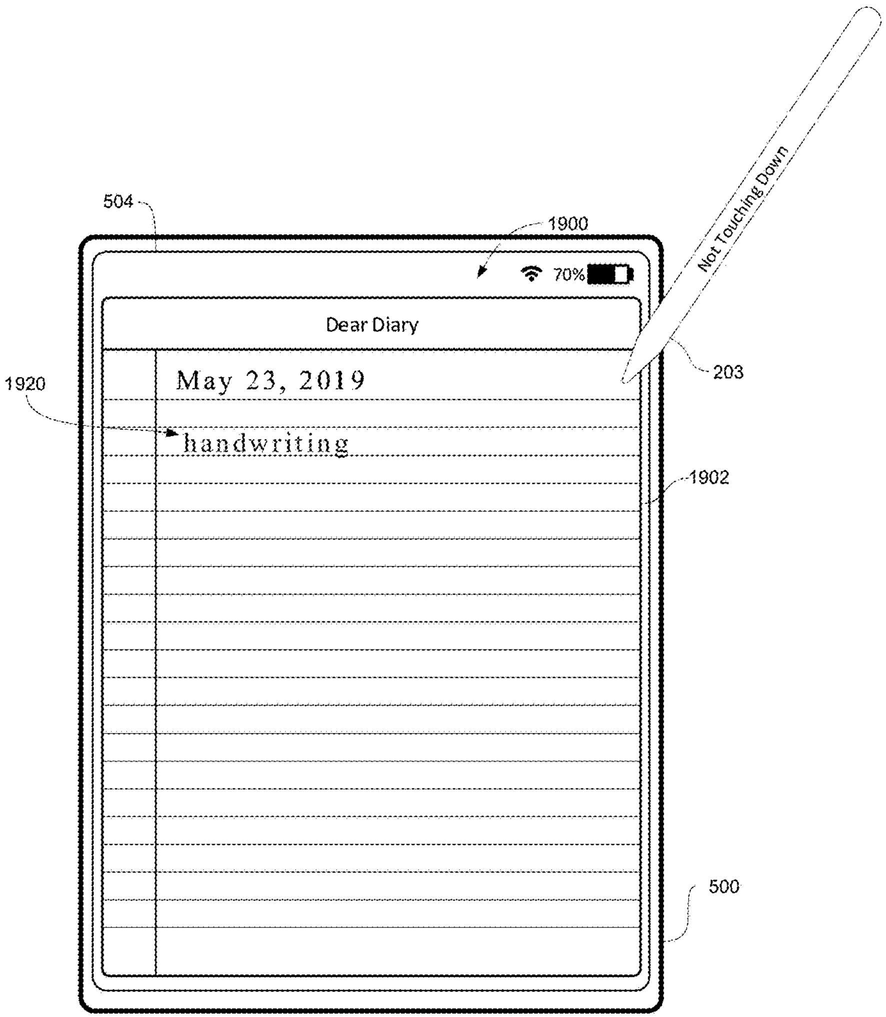
Figure 20A:
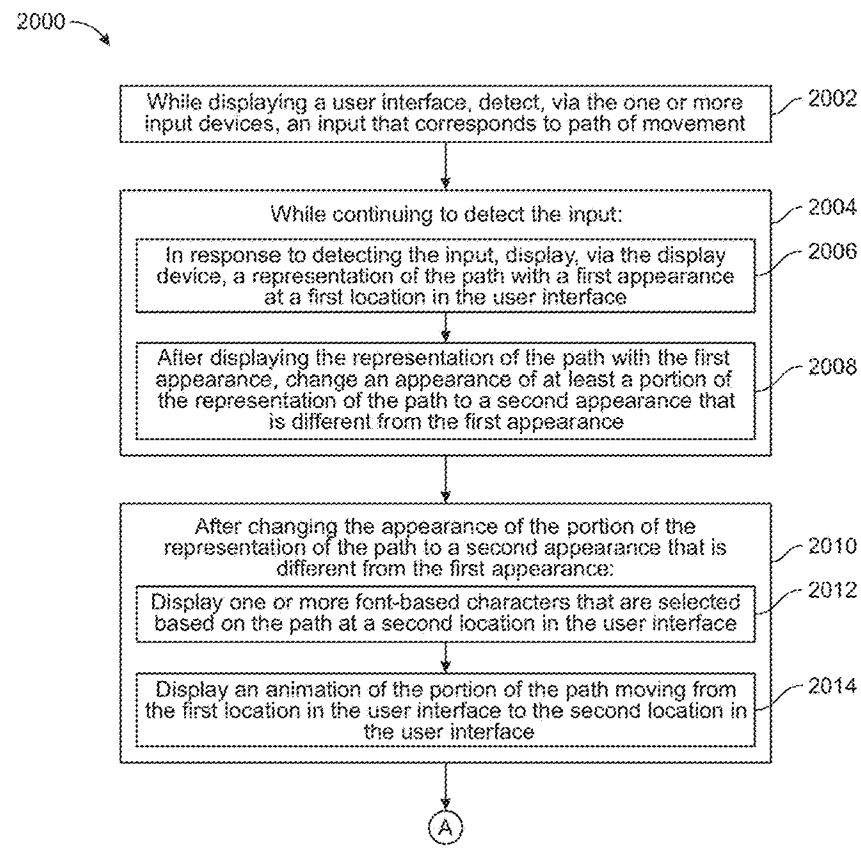
FIGS. 20A-20D are flow diagrams illustrating a method of converting handwritten input to font-based text in accordance with some embodiments.
Figure 20B:
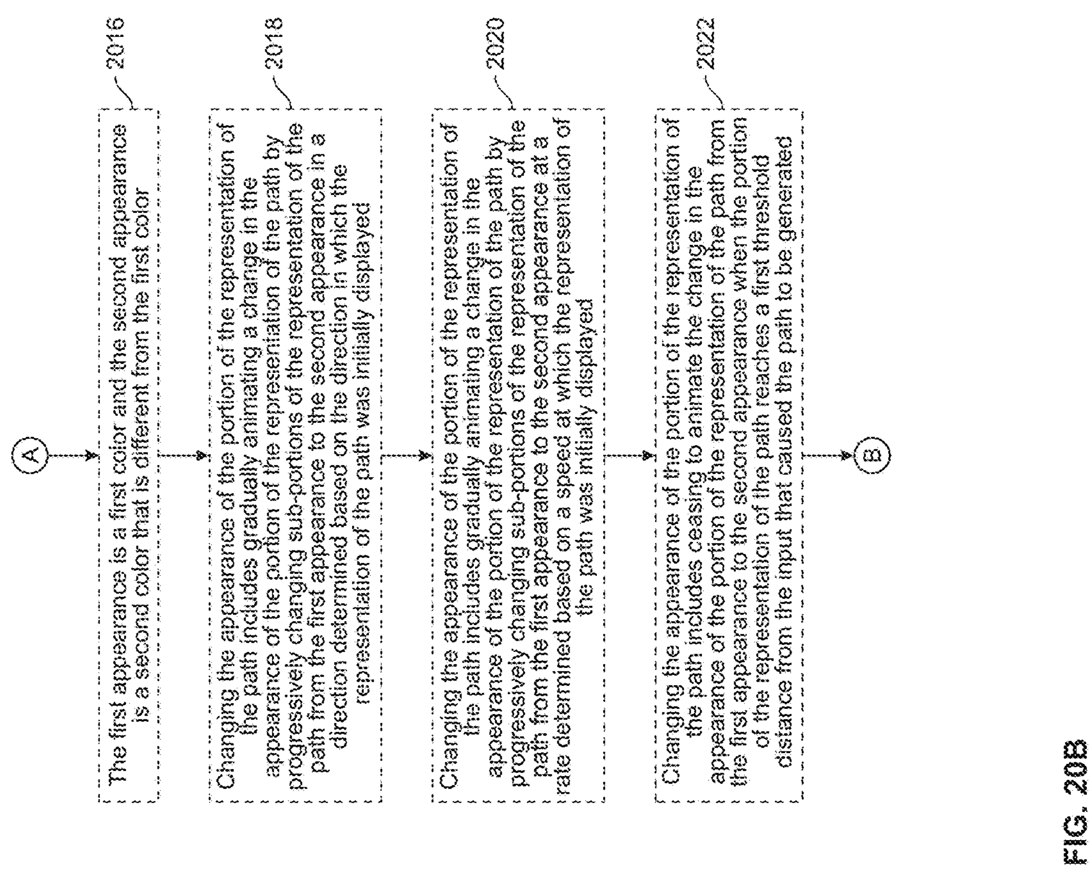
Figure 20C:
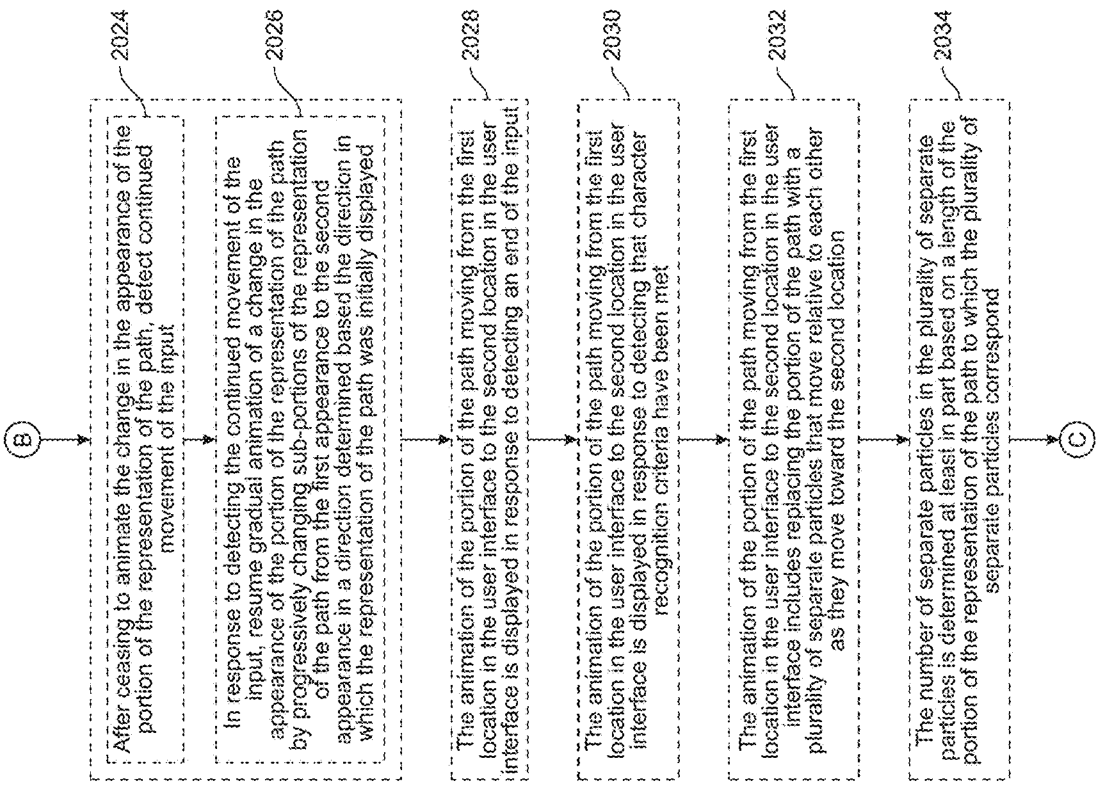

FIG. 19Z illustrates the conversion animation continuing. In FIG. 19Z, handwritten input 1904 continues to reduce in size and fade out. Concurrently, font-based text 1920 continues to fade into view (e.g., become less transparent and/or less grey). In FIG. 19AA, handwritten input 1904 continues to reduce in size and fade out while font-based text 1920 continues to fade into view. As shown in FIG. 19AA, handwritten input 1904 approaches the final size of font-based text 1920 (e.g., height and/or width). In FIG. 19BB, the conversion animation completes and handwritten input 1904 ceases to be displayed (e.g., transparency reaches 100%), and font-based text 1920 is fully displayed (e.g., no transparency and not greyed out).

It is understood that although FIGS. 19W-19BB illustrate the size of handwritten input 1904 changing concurrently with the fading of handwritten input 1904, these two components of the conversion animation are optionally performed consecutively (e.g., as opposed to concurrently). In some embodiments, the size of handwritten input 1904 shrinks to the size of the font-based text (or approximately the size of the font-based text) before fading out (e.g., before completely fading out or before starting to fade out).

It is also understood that the embodiments described herein with respect to the animation of the handwritten input changing visual characteristics as the user writes is optionally performed any or every time handwritten input writing characters and/or words is received (e.g., as described above with respect to any of FIGS. 6-19) and the animation of the handwritten input dissolving into particles and moving to the final location of the font-based text and/or the animation of the handwritten input shrinking in size and fading out while the font-based text fades in is optionally performed any or every time handwritten input is converted into font-based text (e.g., as described above with respect to any of FIGS. 6-19).

FIGS. 20A-20D are flow diagrams illustrating a method 2000 of converting handwritten input to font-based text. The method 2000 is optionally performed at an electronic device such as device 100, device 300, device 500, device 501, device 510, and device 591 as described above with reference to FIGS. 1A-1B, 2-3, 4A-4B and 5A-5I. Some operations in method 2000 are, optionally combined and/or order of some operations is, optionally, changed As described below, the method 2000 provides ways to convert handwritten input to font-based text. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 19B, an electronic device (e.g., an electronic device, a mobile device (e.g., a tablet, a smartphone, a media player, or a wearable device) including a touch screen (e.g., a touch sensitive display), or a computer including a touch screen (e.g., a touch sensitive display), such as device 100, device 300, device 500, device 501, or device 591) with a display device and one or more input devices while displaying a user interface (e.g., a text or character entry user interface on a touch-sensitive display, such as those described with reference to methods 700, 1100, 1300, 1500, and 1800) detects, via the one or more input devices, an input that corresponds to path of movement, such as in FIG. 19B (e.g., an input with a stylus on the display, such as a handwritten input).

In some embodiments, while continuing to detect the input (2004) (e.g., while the contact is maintained on the display), in response to detecting the input, the electronic device displays (2006), via the display device, a representation of the path with a first appearance at a first location in the user interface, such as in FIG. 19B (e.g., a location of the representation of the path). Initially, the path is optionally displayed as black.

In some embodiments, while continuing to detect the input (2004), after displaying the representation of the path with the first appearance, the electronic device changes (2008) an appearance of at least a portion of the representation of the path to a second appearance that is different from the first appearance, such as in FIG. 19C (e.g., changing the portion of the path from black to grey as time passes). In some embodiments, a portion of the path up to some predetermined distance (e.g., 0.5 cm, 1 cm, 2 cm, 5 cm, 1 character, 2 characters, 3 characters) from the current contact position of the stylus with the display changes to grey, and the portion of the path close to the stylus remains black.

In some embodiments, after changing the appearance of the portion of the representation of the path to a second appearance that is different from the first appearance (2010) (e.g., and in response to detection of an animation criteria such as lift off of a contact corresponding to the input or detection of a word or character corresponding to the path), the electronic device displays (2012) one or more font-based characters that are selected based on the path at a second location in the user interface, such as in FIG. 19L (e.g., identifying characters that correspond to the handwritten input, and displaying them at the second location in the display). In some embodiments, the second location is different than the first location. In some embodiments, the second location is the same as the first location.

In some embodiments, after changing the appearance of the portion of the representation of the path to a second appearance that is different from the first appearance (2010), the electronic device displays (2014) an animation of the portion of the path moving from the first location in the user interface to the second location in the user interface, such as in FIGS. 19K-19M (e.g., a location of the font-based characters). In some embodiments, at least a portion of the animation (or the entire animation) is displayed concurrently with displaying the one or more font-based characters. In some embodiments, at least a portion of the animation (or the entire animation) is displayed before displaying the one or more font-based characters. In some embodiments, at least a portion of the animation (or the entire animation) is displayed after displaying the one or more font-based characters.

The above-described manner of changing the appearance of the representation of the handwritten input and then displaying the animation of the path moving from its current location to the location of the font-based characters indicates which parts of the handwritten input will convert into font-based text and indicate what the font-based text will be, which simplifies the interaction between the user and the electronic device and enhances the operability of the electronic device and makes the user-device interface more efficient (e.g., by providing feedback about the operation that is about to occur), which additionally reduces power usage and improves battery life of the electronic device by enabling the user to use the electronic device more quickly and efficiency while reducing errors in the usage of the device.

In some embodiments, the first appearance is a first color (e.g., black) and the second appearance is a second color (e.g., grey) that is different from the first color (2016), such as in FIG. 19C. The above-described manner of changing the appearance of a portion of the representation of the handwritten input indicates which parts of the handwritten input will convert into font-based text, which simplifies the interaction between the user and the electronic device and enhances the operability of the electronic device and makes the user-device interface more efficient (e.g., by providing feedback about the operation that is about to occur), which additionally reduces power usage and improves battery life of the electronic device by enabling the user to use the electronic device more quickly and efficiency while reducing errors in the usage of the device.

In some embodiments, changing the appearance of the portion of the representation of the path includes gradually animating a change in the appearance of the portion of the representation of the path by progressively changing sub-portions of the representation of the path from the first appearance to the second appearance in a direction determined based on the direction in which the representation of the path was initially displayed (2018), such as in FIGS. 19C-19I. For example, as the handwritten input is detected, the portions of the path furthest from the current location of the stylus on the display change appearance first, and gradually change towards the current location of the stylus.

The above-described manner of changing the appearance of the representation of the handwritten input indicates to which part of the previously input handwritten input additional handwritten input can be added, which simplifies the interaction between the user and the electronic device and enhances the operability of the electronic device and makes the user-device interface more efficient (e.g., by providing feedback about the proper location of additional handwritten input), which additionally reduces power usage and improves battery life of the electronic device by enabling the user to use the electronic device more quickly and efficiency while reducing errors in the usage of the device.

In some embodiments, changing the appearance of the portion of the representation of the path includes gradually animating a change in the appearance of the portion of the representation of the path by progressively changing sub-portions of the representation of the path from the first appearance to the second appearance at a rate determined based on a speed at which the representation of the path was initially displayed (2020), such as in FIGS. 19C-19F. For example, the faster the handwritten input, the faster the change in appearance of the sub-portions of the path occurs.

The above-described manner of changing the appearance of the representation of the handwritten input based on the speed of the handwritten input ensures that the presentation of the feedback is not a bottleneck to receiving further input, which simplifies the interaction between the user and the electronic device and enhances the operability of the electronic device and makes the user-device interface more efficient (e.g., by reducing the time needed to provide the path feedback described above), which additionally reduces power usage and improves battery life of the electronic device by enabling the user to use the electronic device more quickly and efficiency while reducing errors in the usage of the device.

In some embodiments, changing the appearance of the portion of the representation of the path includes ceasing to animate the change in the appearance of the portion of the representation of the path from the first appearance to the second appearance when the portion of the representation of the path reaches a first threshold distance from the input that caused the path to be generated (2022), such as in FIG. 19F (e.g., the path gradually changes from a first color to a second color until the portion of the path that is the second color reaches a threshold distance (e.g., 0.25 cm, 0.5 cm, 1 cm, 2 cm, 5 cm, 1 character, 2 characters, 3 characters, etc.) from the contact on the touch-sensitive surface that was used to draw the path).

The above-described manner of not changing the appearance of the representation of the handwritten input in the portion of the representation closest to the current stylus location indicates that further handwritten input can still be accepted and incorporated with the previously detected handwritten input, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency while reducing errors in the usage of the device.

In some embodiments, after ceasing to animate the change in the appearance of the portion of the representation of the path, the electronic device detects (2024) continued movement of the input, such as in FIG. 19G (e.g., detecting additional handwritten input from the last-detected stylus input location). In some embodiments, in response to detecting the continued movement of the input, the electronic device resumes (2026) gradual animation of a change in the appearance of the portion of the representation of the path by progressively changing sub-portions of the representation of the path from the first appearance to the second appearance in a direction determined based the direction in which the representation of the path was initially displayed, such as in FIG. 19G. For example, as additional handwritten input is received, the representation of the handwritten input continues with the animation (resumes the animation) of changing the appearance of the path in the direction following the path created by the additional handwritten input.

The above-described manner of resuming the animation of the change in appearance provides for continued feedback with respect to additional handwritten input, which simplifies the interaction between the user and the electronic device and enhances the operability of the electronic device and makes the user-device interface more efficient (e.g., by not requiring any action other than continued handwritten input to continue providing feedback), which additionally reduces power usage and improves battery life of the electronic device by enabling the user to use the electronic device more quickly and efficiency while reducing errors in the usage of the device.

In some embodiments, the animation of the portion of the path moving from the first location in the user interface to the second location in the user interface is displayed in response to detecting an end of the input (2028), such as in FIG. 19I (e.g., liftoff of the contact from the touch-sensitive surface, or after liftoff without subsequent contact for longer than a time threshold, such as 1, 2, 4 seconds). In some embodiments, performance of the animation is triggered by the same triggers for converting handwritten input to font-based text, such as those described above with respect to methods 700, 1100, and 1300. In some embodiments, the animation described herein is performed whenever handwritten text is converted to font-based text (e.g., as described above with respect to methods 700, 100, and 1300).

The above-described manner of not animating the path to the second location until liftoff prevents the device from needlessly presenting the animation and erroneously ceasing display of the path, which simplifies the interaction between the user and the electronic device and enhances the operability of the electronic device and makes the user-device interface more efficient (e.g., by reducing the likelihood of ceasing display of the path too soon while additional handwritten input directed to the path may be detected), which additionally reduces power usage and improves battery life of the electronic device by enabling the user to use the electronic device more quickly and efficiency while reducing errors in the usage of the device.

In some embodiments, the animation of the portion of the path moving from the first location in the user interface to the second location in the user interface is displayed in response to detecting that character recognition criteria have been met (2030), such as in FIG. 19I. For example, criteria such as described in method 700, 1100, and 1300). Thus, in some embodiments, the animation of the path flying towards the location of the font-based characters only occurs when (and/or occurs in response to) those characters are recognized in the handwritten input.

The above-described manner of not animating the path to the second location until character recognition criteria have been met prevents the device from needlessly presenting the animation and erroneously ceasing display of the path, which simplifies the interaction between the user and the electronic device and enhances the operability of the electronic device and makes the user-device interface more efficient (e.g., by reducing the likelihood of ceasing display of the path too soon while additional handwritten input directed to the path may be detected), which additionally reduces power usage and improves battery life of the electronic device by enabling the user to use the electronic device more quickly and efficiency while reducing errors in the usage of the device.

In some embodiments, the animation of the portion of the path moving from the first location in the user interface to the second location in the user interface includes replacing the portion of the path with a plurality of separate particles that move relative to each other (e.g., toward each other or away from each other) as they move toward the second location (2032), such as in FIGS. 19J-19K (e.g., the plurality of separate particles are initially displayed within the boundary of the handwritten input such as to indicate that the handwritten input is dissolving into the plurality of particles). In some embodiments, the plurality of particles then move or fly towards the final location of the font-based text and re-assemble into the font-based text. In some embodiments, the movement of the plurality of particles has an inertia such that the particles initially accelerate away from the initial position and then decelerate toward the final position. Thus, in some embodiments, the animation reflects the result as if the parts of the path are what morph into/create the font-based characters.

The above-described manner of animating the path moving from the first location to the second location provides immediate feedback about which part of the handwriting corresponds to the font-based characters, which simplifies the interaction between the user and the electronic device and enhances the operability of the electronic device and makes the user-device interface more efficient (e.g., by visually associating the handwriting input with the final corresponding font-based text), which additionally reduces power usage and improves battery life of the electronic device by enabling the user to use the electronic device more quickly and efficiency while reducing errors in the usage of the device.

In some embodiments, the number of separate particles in the plurality of separate particles is determined at least in part based on a length of the portion of the representation of the path to which the plurality of separate particles correspond (2034), such as in FIG. 19J (e.g., more particles for a longer portion of the representation of the path and less particles for a shorter portion of the representation of the path). In some embodiments, other characteristics of the handwritten input and/or the path (e.g., such as width) are also factors that determine the number of particles in the plurality of particles.

The above-described manner of utilizing more or fewer particles based on the length of the portion of the handwritten path provides immediate feedback about which part of the handwritten path corresponds to which character, which simplifies the interaction between the user and the electronic device and enhances the operability of the electronic device and makes the user-device interface more efficient (e.g., by visually associating portions of the handwritten input with portions of the font-based characters), which additionally reduces power usage and improves battery life of the electronic device by enabling the user to use the electronic device more quickly and efficiency while reducing errors in the usage of the device.

In some embodiments, the animation of the portion of the path moving from the first location in the user interface to the second location in the user interface includes ceasing to display the animation before visual elements corresponding to the animation reach the second location (2036), such as in FIG. 19U. For example, the particles gradually fade out as they approach the second location. The above-described manner of preventing visual elements of the animation from reaching the second location prevents the font-based characters at the second location from being obscured by the animation, which simplifies the interaction between the user and the electronic device and enhances the operability of the electronic device and makes the user-device interface more efficient (e.g., by providing for clear display of the font-based characters into which the handwritten input was converted), which additionally reduces power usage and improves battery life of the electronic device by enabling the user to use the electronic device more quickly and efficiency while reducing errors in the usage of the device.

In some embodiments, the one or more font-based characters include a sequence of font-based characters (2038), such as in FIG. 19L (e.g., a multiple character string). In some embodiments, the animation of the portion of the path moving from the first location in the user interface to the second location in the user interface includes sequentially animating a portion of the representation of the path that corresponds to different characters by starting an animation of a first portion of the representation of the path that corresponds to a first font-based character in the sequence of characters (e.g., from the first location to the second location) prior to starting an animation of a second portion of the representation of the path that corresponds to a second font-based character in the sequence of characters (e.g., from the first location to the second location) that occurs after the first font-based character in the sequence of characters (2040), such as in FIG. 19L. For example, the first handwritten character is first shown as animating into the first font-based character, a second handwritten character is shown next as animating into the second font-based character, and so on. In some embodiments, the second animation does not begin until the first animation is complete. In some embodiments, the second animation begins after the first animation begins (though before the first animation completes).

The above-described manner of performing character-by-character animation provides immediate feedback about which character in the handwritten path corresponds to which character in the font-based characters, which simplifies the interaction between the user and the electronic device and enhances the operability of the electronic device and makes the user-device interface more efficient (e.g., by visually associating characters in the handwritten input with characters in the font-based characters, which makes potential errors in the conversion clear), which additionally reduces power usage and improves battery life of the electronic device by enabling the user to use the electronic device more quickly and efficiency while reducing errors in the usage of the device.

In some embodiments, the one or more font-based characters include a sequence of font-based words (2042), such as in FIG. 19R (e.g., a multiple-word character string). In some embodiments, the animation of the portion of the path moving from the first location in the user interface to the second location in the user interface includes sequentially animating a portion of the representation of the path that corresponds to different words by starting an animation of a first portion of the representation of the path that corresponds to a first font-based word in the sequence of words (e.g., from the first location to the second location) prior to starting an animation of a second portion of the representation of the path that corresponds to a second font-based word in the sequence of words (e.g., from the first location to the second location) that occurs after the first font-based word in the sequence of words (2044), such as in FIG. 19R. For example, the first handwritten word is first shown as animating into the first font-based word, a second handwritten word is shown next as animating into the second font-based word, and so on). In some embodiments, the second animation does not begin until the first animation is complete. In some embodiments, the second animation begins after the first animation begins (though before the first animation completes.

The above-described manner of performing word-by-word animation provides immediate feedback about which word in the handwritten path corresponds to which word in the font-based characters, which simplifies the interaction between the user and the electronic device and enhances the operability of the electronic device and makes the user-device interface more efficient (e.g., by visually associating words in the handwritten input with words in the font-based characters, which makes potential errors in the conversion clear), which additionally reduces power usage and improves battery life of the electronic device by enabling the user to use the electronic device more quickly and efficiency while reducing errors in the usage of the device.

It should be understood that the particular order in which the operations in FIGS. 20A-20D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1500, 1600, 1800, and 2200) are also applicable in an analogous manner to method 2000 described above with respect to FIGS. 20A-20D. For example, the operations of converting handwritten input to font-based text described above with reference to method 2000 optionally have one or more of the characteristics of the acceptance and/or conversion of handwritten inputs, selection and deletion of text, inserting handwritten inputs into pre-existing text, managing the timing of converting handwritten text into font-based text, presenting handwritten entry menus, controlling the characteristics of handwritten input, and presenting autocomplete suggestions, displaying options in a content entry palette, etc., described herein with reference to other methods described herein (e.g., methods 700, 900, 1100, 1300, 1500, 1600, 1800, and 2200). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 20A-20D are, optionally, implemented by components depicted in FIGS. 1A-1B. For example, displaying operations 2006, 2012, and 2014 and detecting operations 2002, and 2024 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Dynamic Options on a Content Entry Palette

Users interact with electronic devices in many different manners, including entering text and drawings into the electronic device. In some embodiments, an electronic device provides a content entry palette which includes options for controlling content inserted into content entry regions. The embodiments described below provide ways in which an electronic device dynamically displays different tools and options in the content entry palette based on the current context of the content entry. In some embodiments, displaying different tools and options customizes the user's experience, thus enhancing interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 21A-21DD illustrate exemplary ways in which an electronic device displays options in a content entry palette. The embodiments in these figures are used to illustrate the processes described below, including the processes described with reference to FIGS. 22A-22J.

Figure 21A:
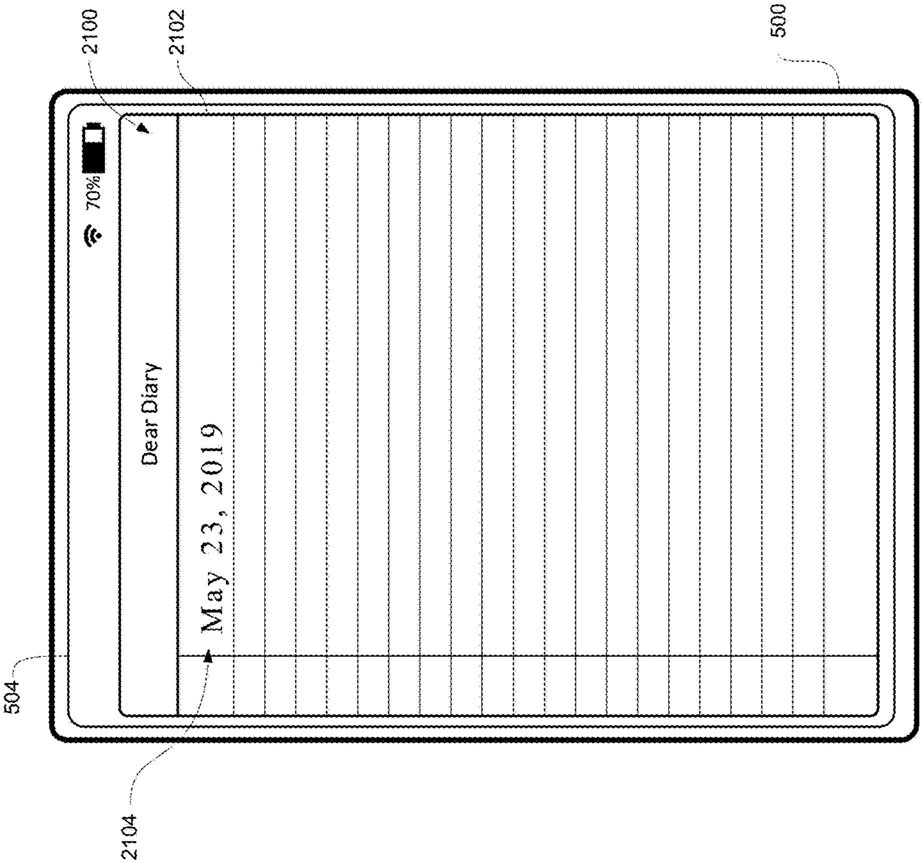
FIGS. 21A-21DD illustrate exemplary ways in which an electronic device displays options in a content entry palette in accordance with some embodiments.
Figure 20D:
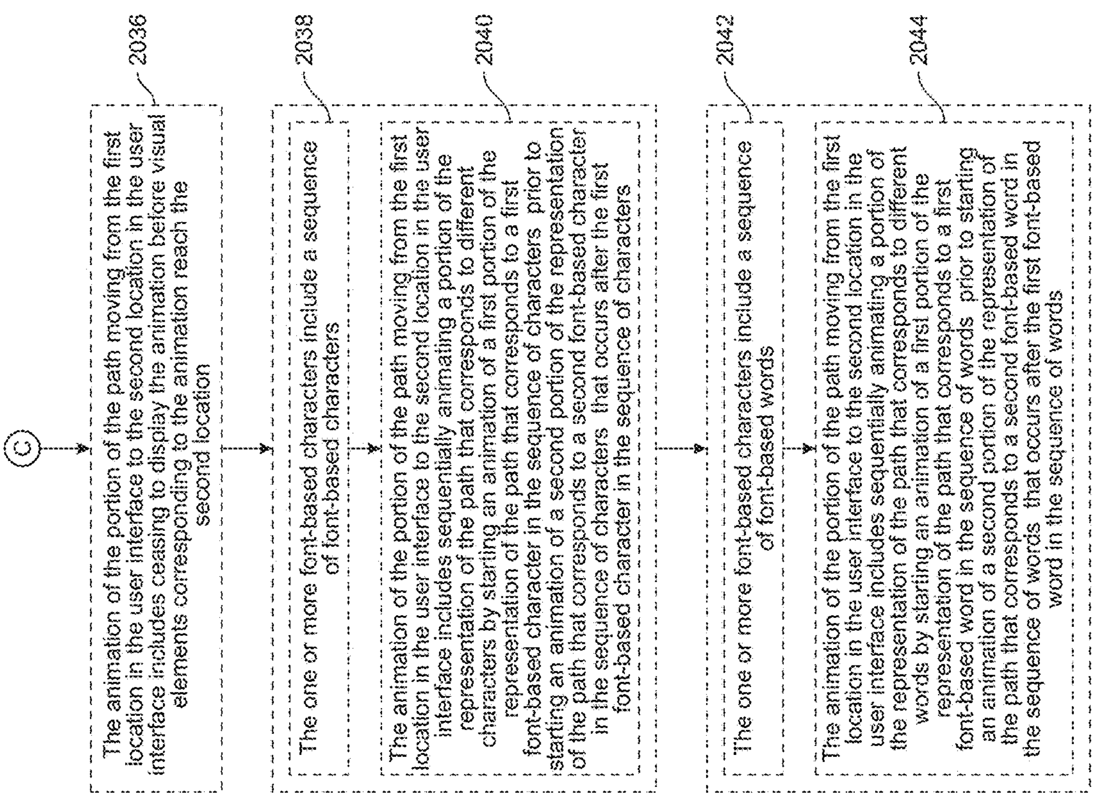

FIG. 21A illustrates an exemplary device 500 that includes touch screen 504. In FIG. 21A, device 500 is displaying user interface 2100 (e.g., via a display device, via a display generation component, etc.). In some embodiments, a display generation component is a hardware component (e.g., including electrical components) capable of receiving display data and displaying a user interface. In some embodiments, examples of a display generation component include a touch screen display (e.g., touch screen 504), a monitor, a television, a projector, an integrated, discrete, or external display device, or any other suitable display device that is in communication with device 500.

In some embodiments, user interface 2100 corresponds to a note taking application (e.g., similar to user interface 800 described above with respect to FIG. 8A). In some embodiments, user interface 2100 includes a content entry region 2102 in which a user is able to enter multiple lines of text. In some embodiments, content entry region 2102 includes one or more pre-existing text characters 2104. In some embodiments, pre-existing text 2104 was previously entered as handwritten inputs and converted into font-based text (such as described above with respect to methods 700, 1100, 1300, 1500, 1600, 1800, and/or 2000). In some embodiments, pre-existing text 2104 was entered using a soft keyboard (e.g., by the user or another user, on this device or another device). In FIG. 8A, pre-existing text 2104 is font-based text, but it is understood that pre-existing text 2104 can be handwritten text.

Figure 21C:
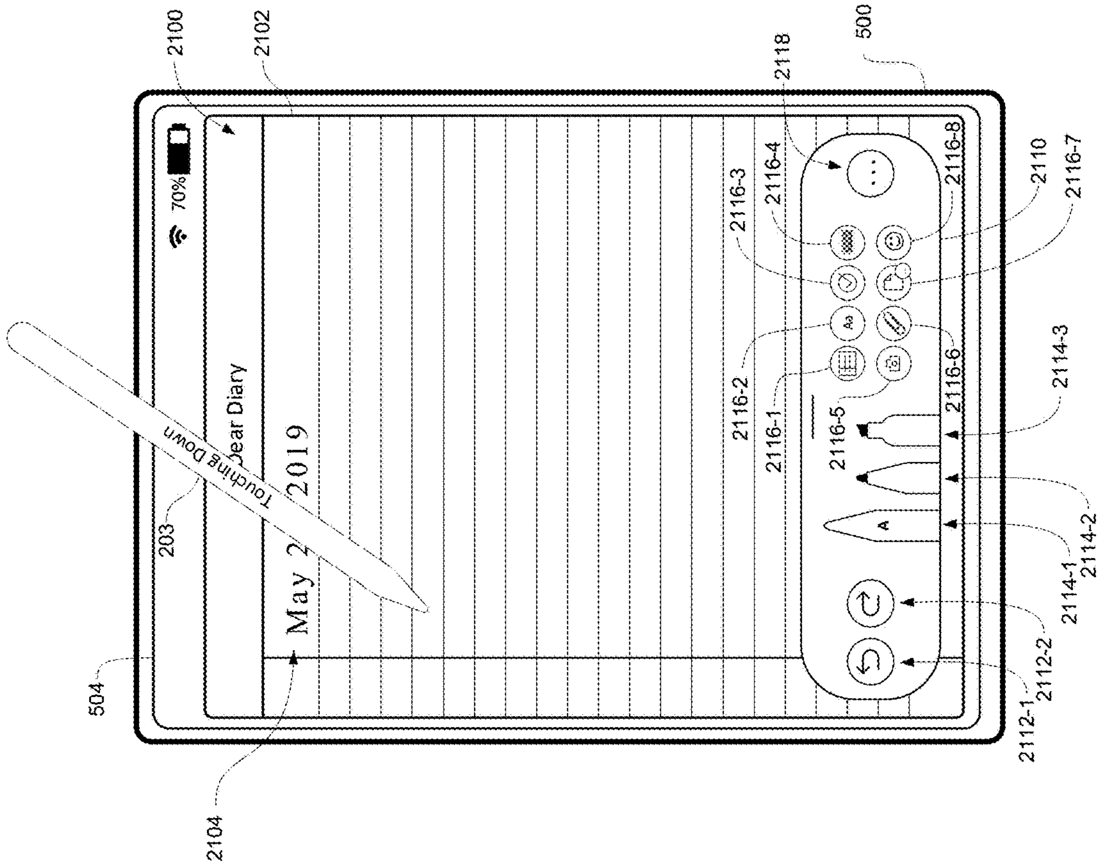
Figure 21B:
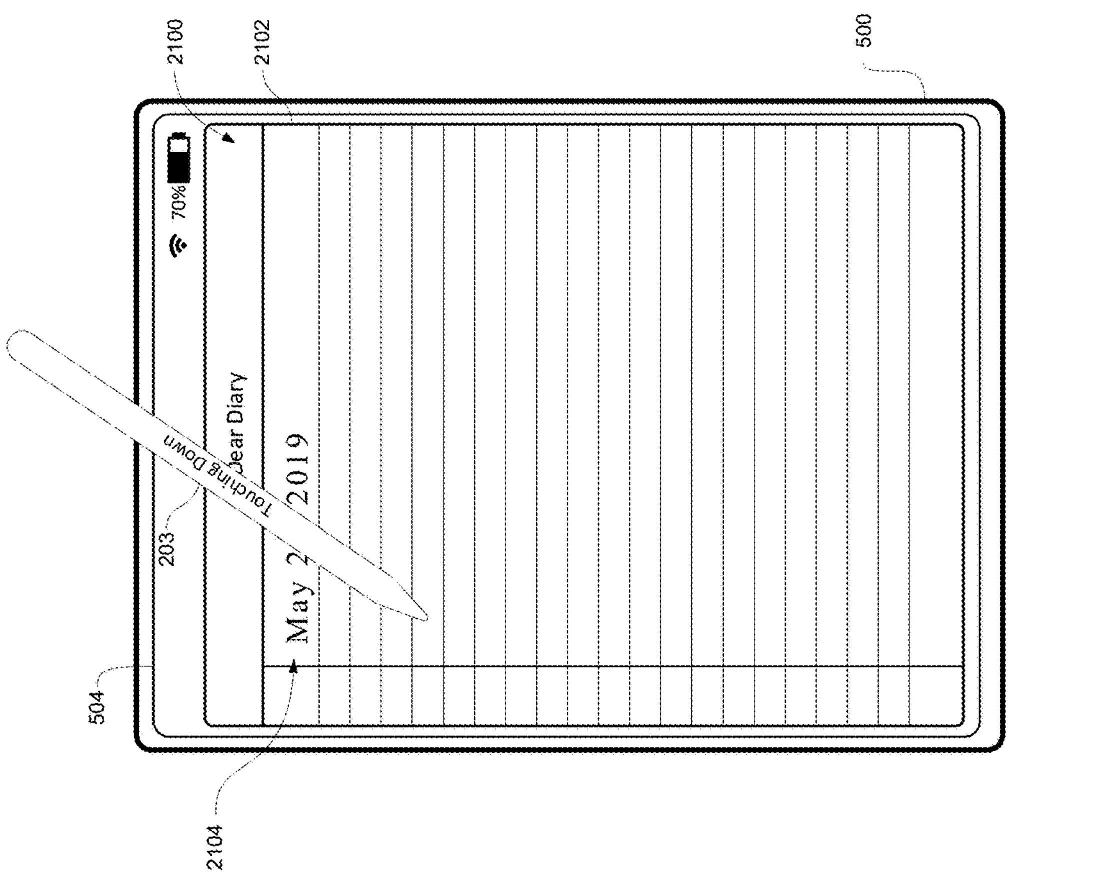

In FIG. 21B, a touch-down of stylus 203 on touch screen 504 (e.g., contact with touch screen 504) at content entry region 2102 is detected. In some embodiments, in response to detecting the touch-down of stylus 203 at content entry region 2102, device 500 displays content entry palette 2110, as shown in FIG. 21C. In some embodiments, content entry palette 2110 is a user interface element that includes one or more selectable options associated with content in the content entry region 2102. For example, content entry palette 2110 includes options for changing a color of content in the content entry region (e.g., changing the color of existing content or changing the content of future content inserted by the user), options for changing the font of text in the content entry region (e.g., changing the font of existing text or changing the font of future text inserted by the user), options for attaching or inserting rich objects (e.g., files, images, etc.), options for selecting the content entry tool, etc.

As shown in FIG. 21C, content entry palette 2110 includes undo option 2112-1 and redo option 2112-2. In some embodiments, undo option 2112-1 is selectable to undo the most recent action (e.g., content entry-related action) and redo option 2112-2 is selectable to perform the most recent action again (e.g., content entry-related action). In some embodiments, content entry palette 2110 includes option 2118 that is selectable to display additional options that are not currently displayed in content entry palette 2110. In some embodiments, in response to the selection of option 2118, the currently displayed tools are removed from content entry palette 2110 and replaced with other options. In some embodiments, the additional options are displayed in a pop-up box and the options currently displayed in content entry palette 2110 are maintained.

In some embodiments, content entry palette 2110 includes text entry tool 2114-1, pen entry tool 2114-2 and marker tool 2114-3. In some embodiments, more or fewer content entry tools can be included in content entry palette 2110. In some embodiments, selection of text entry tool 2114-1 causes the device to enter into text entry mode in which handwritten inputs drawn in the content entry region are analyzed for text characters, identified, and converted into font-based text (such as described above with respect to methods 700, 1100, 1300, 1500, 1600, 1800, and/or 2000). In some embodiments, selection of pen entry tool 2114-2 causes the device to enter into a pen entry mode in which handwritten inputs drawn in the content entry region are stylized as if drawn by a pen (e.g., without converting them to font-based text). In some embodiments, selection of marker entry tool 2114-3 causes the device to enter into a marker entry mode in which handwritten inputs drawn in the content entry region are stylized as if drawn by a marker (e.g., without converting them to font-based text). In some embodiments, content entry tools other than the text entry tool are referred to as drawing tools (e.g., because the tools allow a user to draw in the content entry region and are not converted into font-based text).

In some embodiments, one or more of the options included in content entry palette 2110 depend on the currently active content entry tool. In some embodiments, one or more options included in the content entry palette 2110 are displayed due to being associated with the currently active content entry tool. For example, in FIG. 21C, because text entry tool 2114-1 is currently active (e.g., as shown by text entry tool 2114-1 being displayed extended as compared to the other tools), content entry palette 2110 includes options 2116 (e.g., options 2116-1 to 2116-8) associated with entering font-based text into content entry region 2102. In some embodiments, option 2116-1 is selectable to insert a table into content entry region 2102. In some embodiments, option 2116-2 is selectable to modify the font settings (e.g., of the font-based text that the handwritten input is converted into). In some embodiments, option 2116-3 is selectable to insert checkboxes into content entry region 2102. In some embodiments, option 2116-4 is selectable to display a virtual keyboard. In some embodiments, option 2116-5 is selectable to take a picture using the device's integrated camera and insert the picture into content entry region 2102. In some embodiments, option 2116-6 is selectable to attach a file into content entry region 2102 (e.g., as a selectable icon). In some embodiments, option 2116-7 is selectable to cut/copy/paste content (as will be described in more detail below with respect to FIGS. 21F-21G). In some embodiments, as shown in FIG. 21C, option 2116-7 is selectable to display additional options in a pop-up user interface (e.g., as indicated by the ellipses). In some embodiments, option 2116-8 is selectable to insert an emoji into content entry region 2102 (e.g., by displaying a pop-up user interface that includes a plurality of emojis that are selectable to insert the selected emoji). In some embodiments, the options shown in FIG. 21C are merely exemplary and more, fewer, or other options can be included in the content entry region 2102.

Figure 21E:
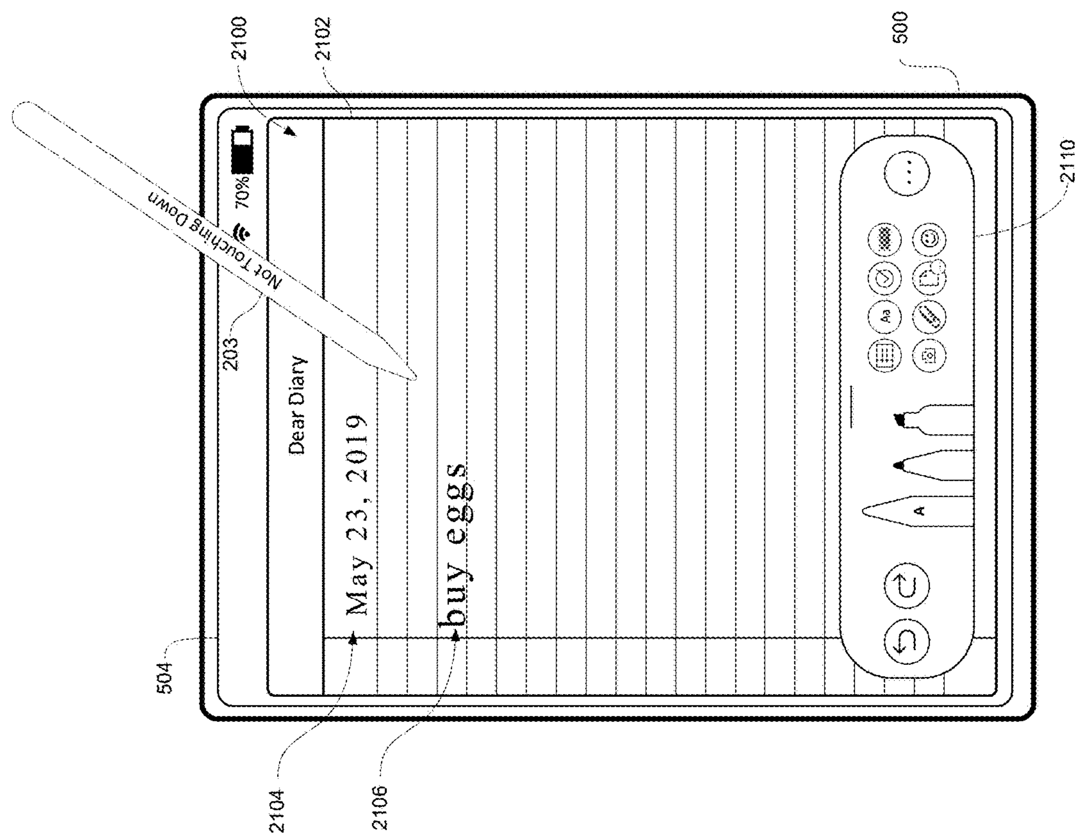
Figure 21D:
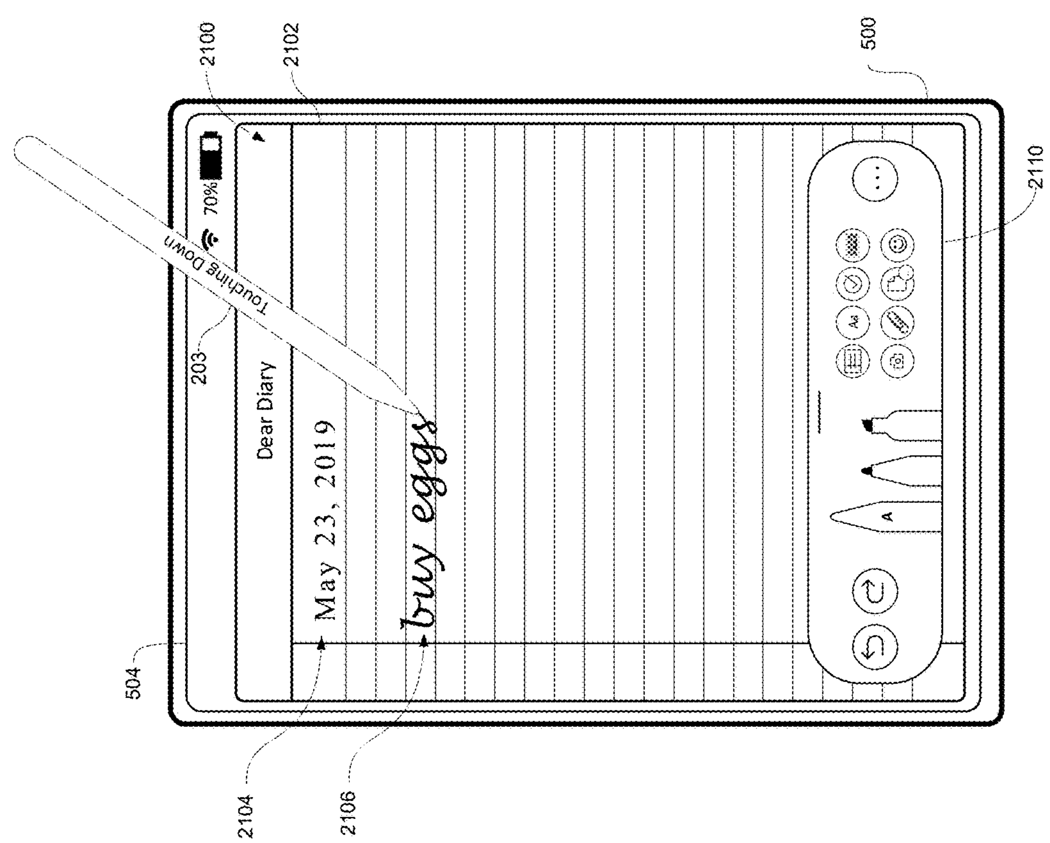

In FIG. 21D, a handwritten input from stylus 203 is detected drawing in content entry region 2102. In some embodiments, in response to the handwritten input, a representation of the handwritten input 2106 is displayed in the content entry region 2102 at the location of the handwritten input. For example, in FIG. 21D, the user wrote "buy eggs"

in content entry region 2102. In FIG. 21E, lift-off of stylus 203 from the touch screen 504 is detected. In some embodiments, in response to detecting the lift-off of stylus 203, representation of the handwritten input 2106 is converted into font-based text, as shown in FIG. 21E. In some embodiments, the process for converting handwritten input into font-based text is described above with respect to methods 700, 1100, 1300, 1500, 1600, 1800, and/or 2000.

Figure 21G:
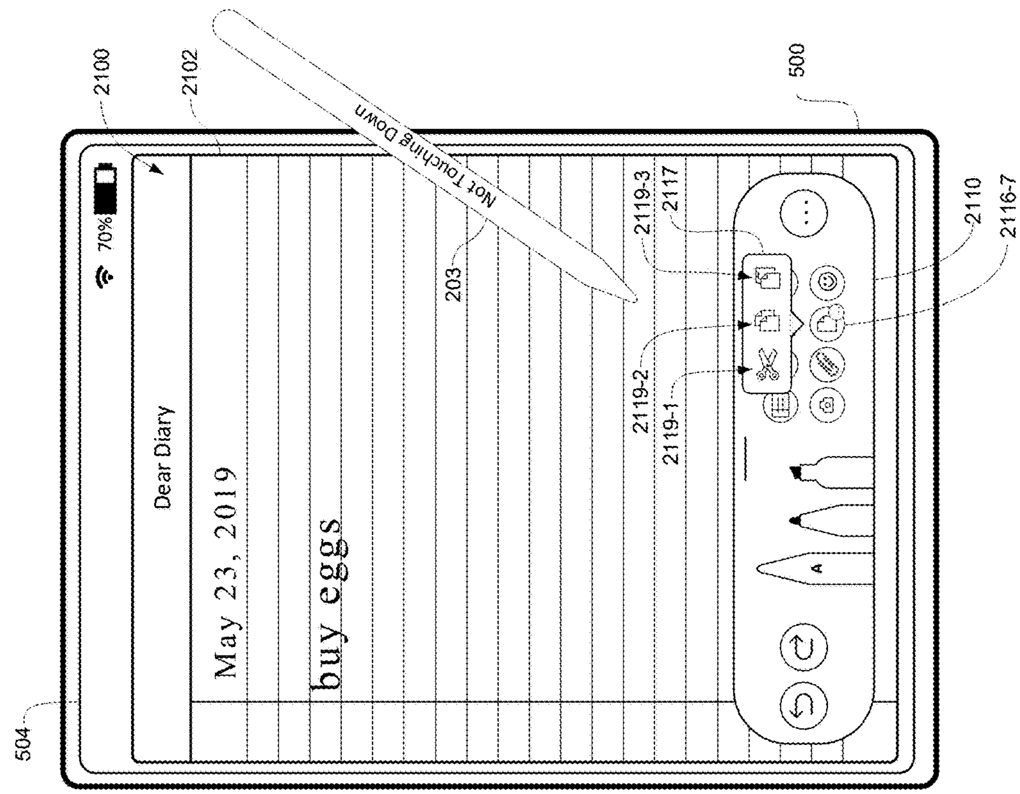
Figure 21F:
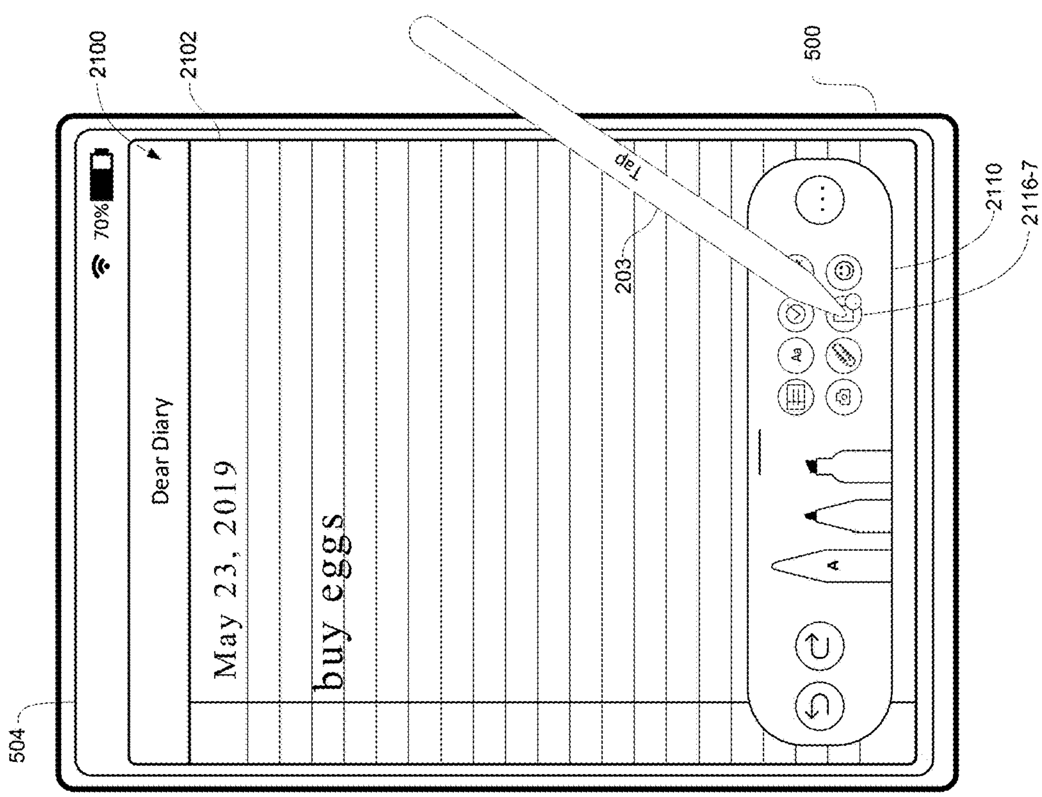

In FIG. 21F, a user input is received from stylus 203 selecting option 2116-7 (e.g., a tap input). In some embodiments, in response to the user input, device 500 displays pop-up 2117. In some embodiments, pop-up 2117 includes one or more additional options. In FIG. 21G, pop-up 2117 includes option 2119-1 that is selectable to perform a cut function (e.g., copy selected content into the device's clipboard while simultaneously removing the selected content from the content entry region), option 2119-2 that is selectable to perform a copy function (e.g., copy selected content into the device's clipboard without removing the content from the content entry region), and option 2119-3 that is selectable to perform a paste function (e.g., insert content that is in the device's clipboard into the content entry region).

Figure 21H:
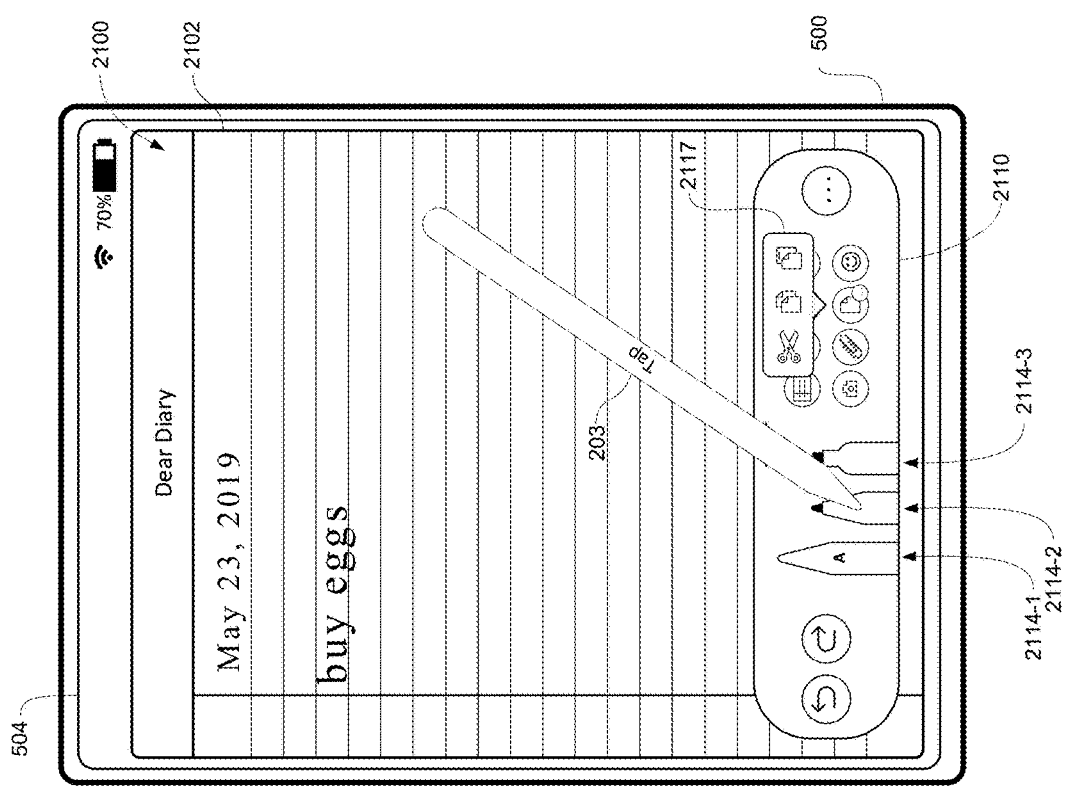
Figure 21I:
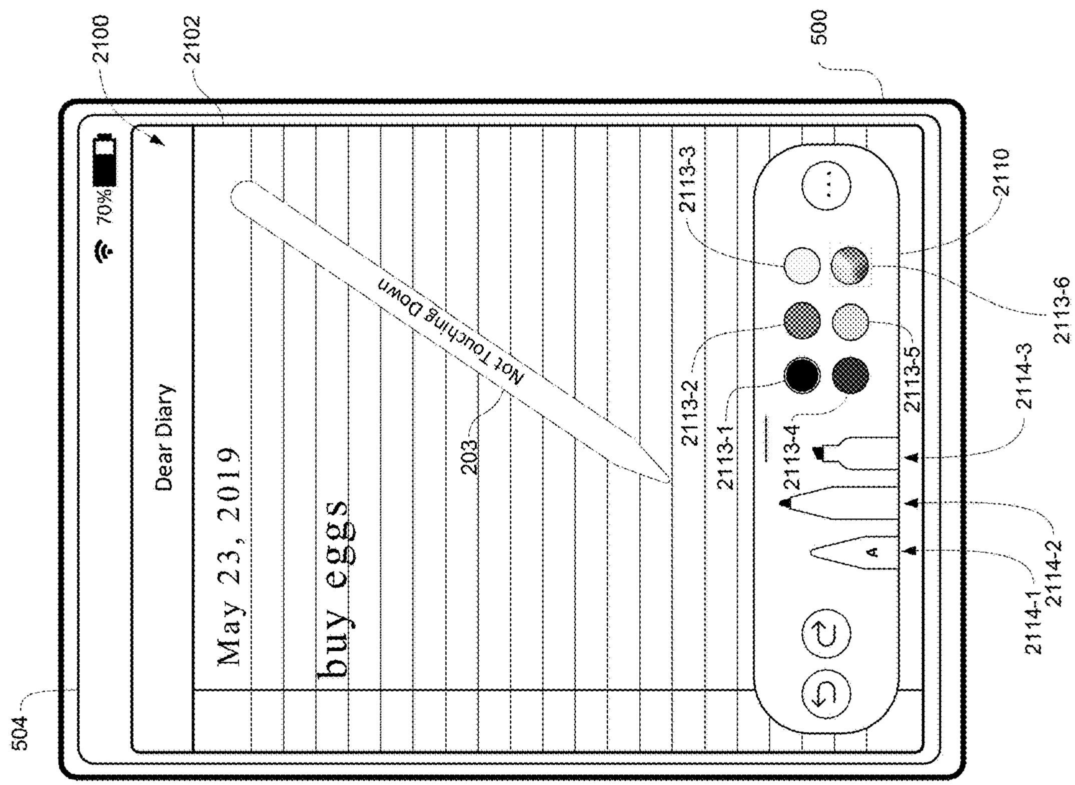

In FIG. 21H, a user input is received from stylus 203 selecting pen entry tool 2114-2 (e.g., a tap input). In some embodiments, in response to the user input, device 500 enters into a pen entry mode in which handwritten inputs in content entry 2102 are styled as if drawn by a pen, as shown in FIG. 21I. In some embodiments, in response to the device entering into the pen entry mode, content entry palette 2110 is updated to include a different set of tools than the set of tools displayed for text entry tool 2114-1. For example, in FIG. 21I, options 2116 are no longer displayed in the content entry palette 2110 and options 2113 (e.g., options 2113-1 to 2113-6) are displayed in content entry palette 2110. In some embodiments, option 2113-1 is selectable to set the color of handwritten input to black, option 2113-2 is selectable to set the color of handwritten input to red, option 2113-3 is selectable to set the color of handwritten input to yellow, option 2113-4 is selectable to set the color of handwritten input to blue, and option 2113-5 is selectable to set the color of handwritten input to green. In some embodiments, option 2113-6 is selectable to display a color palette in which the user is able to select from a plurality of colors, from a color wheel, or to input numerical color parameters.

Figure 21K:
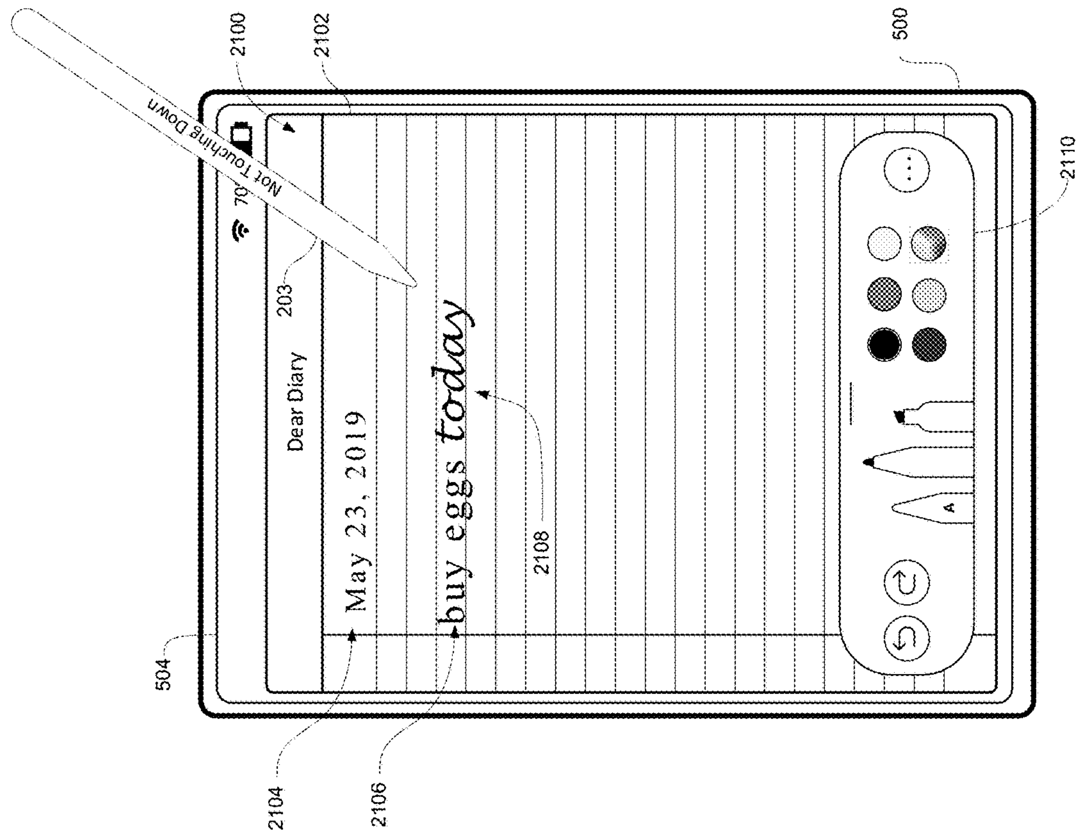
Figure 21J:
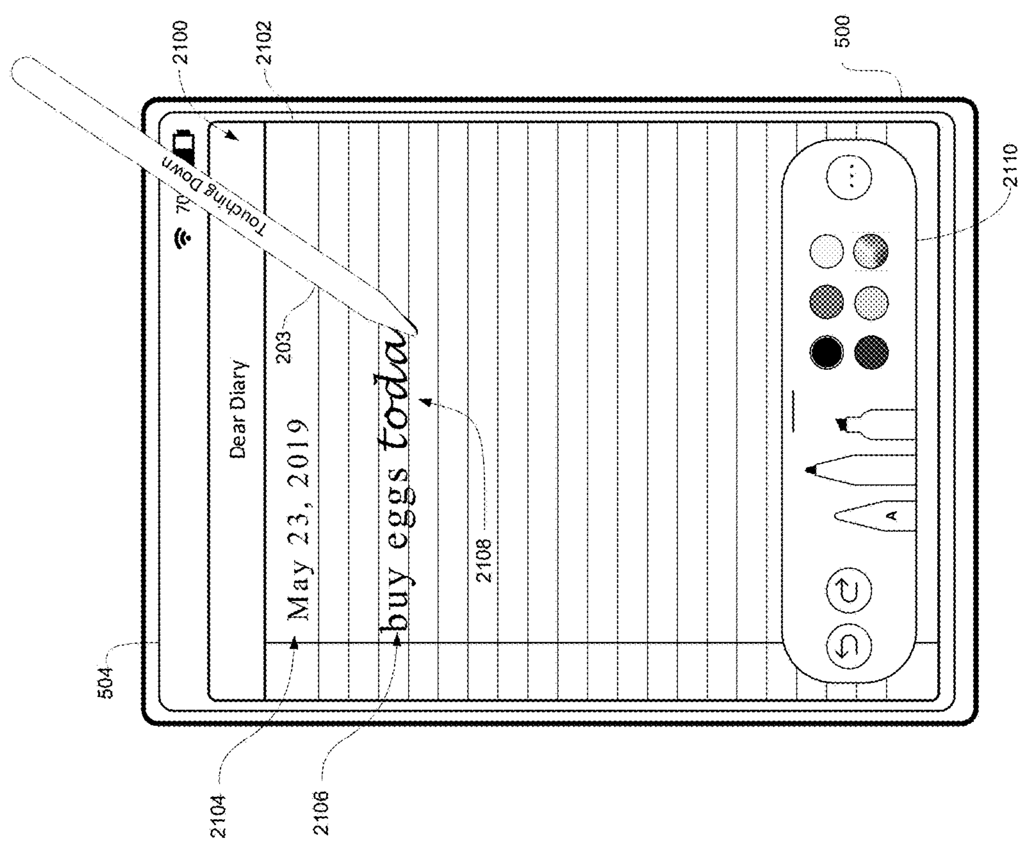

In FIG. 21J, a handwritten input from stylus 203 is detected drawing in content entry region 2102. In some embodiments, in response to the handwritten input, a representation of the handwritten input 2108 is displayed in the content entry region 2102 at the location of the handwritten input. For example, in FIG. 21J, the user wrote "today" in content entry region 2102 while in pen entry mode. In FIG. 21K, lift-off of stylus 203 from the touch screen 504 is detected. In some embodiments, because the device is not in text entry mode, lift-off of stylus 203 does not cause representation 2108 to convert into font-based text and representation 2108 maintains its pen styling.

Thus, in some embodiments, as described above, one or more of the options displayed in content entry palette 2110 are based on the content entry tool that is selected. In some embodiments, if a text entry tool is currently active, then content entry palette 2110 includes tools related to the entry of font-based text. In some embodiments, if a drawing tool is currently active (e.g., pen tool, marker tool, highlighter tool, etc.), then content entry palette 2110 includes tools related to the entry of drawings.

Figure 21M:
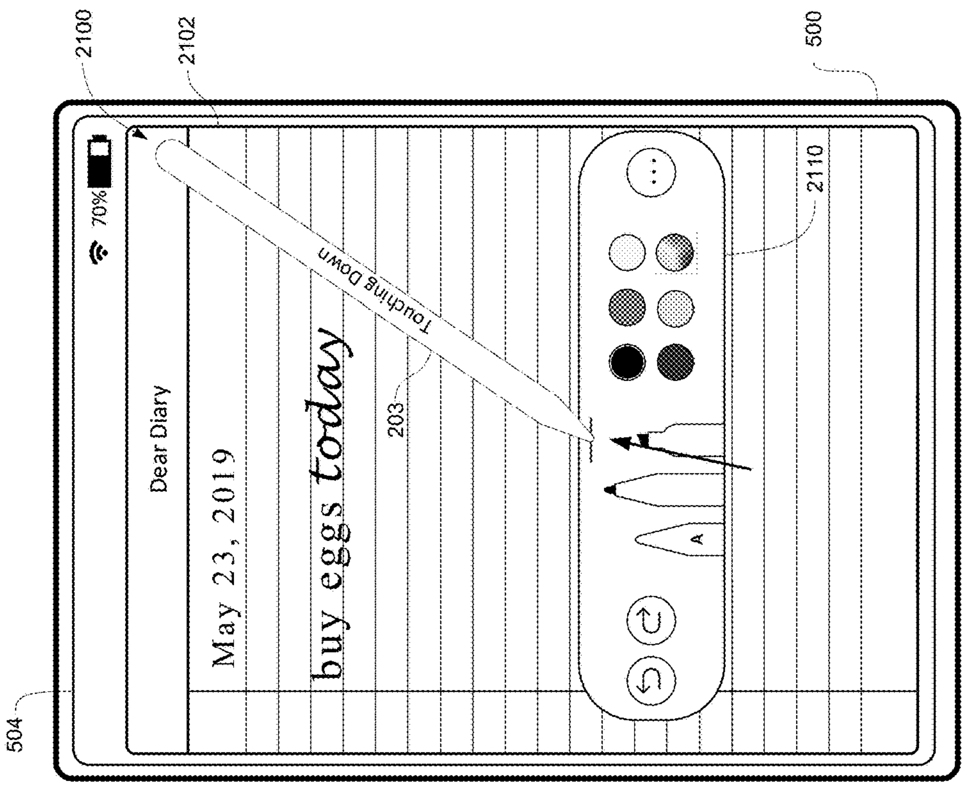
Figure 21L:
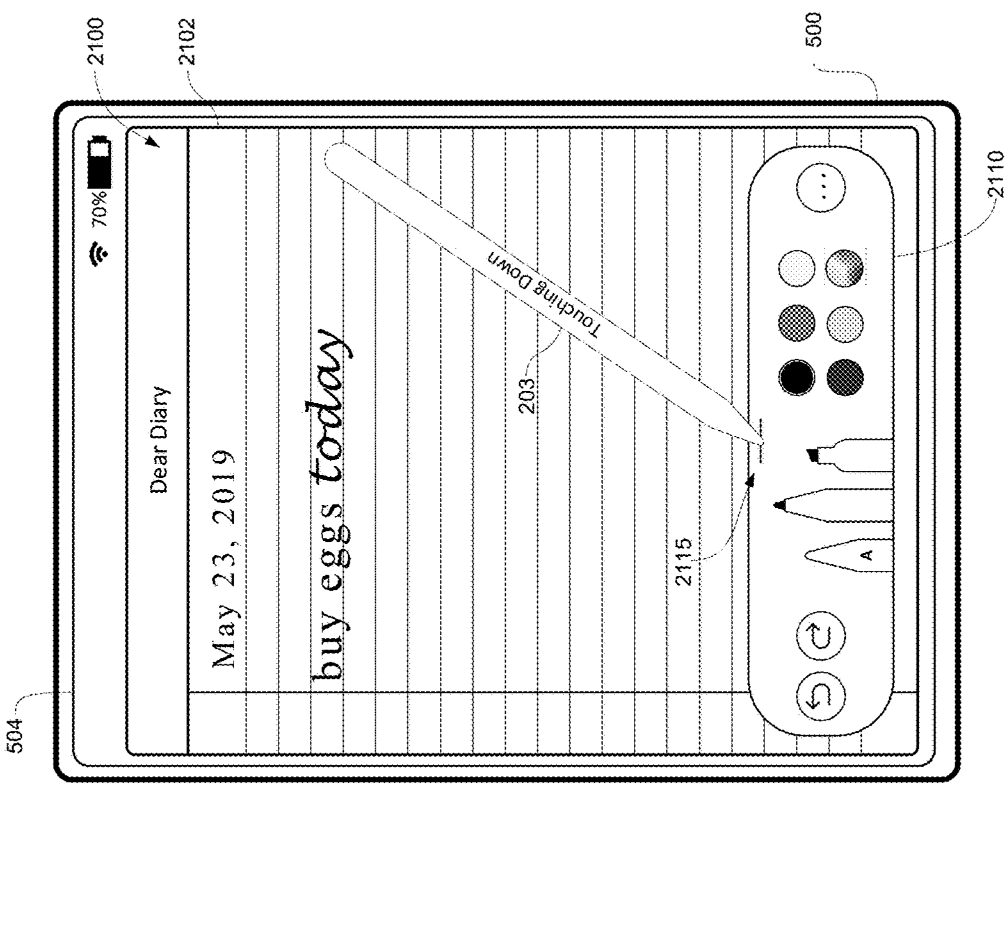

In FIG. 21L, a touch-down of stylus 203 is detected on movement bar 2115. In FIG. 21M, while maintaining contact with touch screen 504, a movement of the stylus 203 is detected. In some embodiments, in response to detecting the movement of stylus 203, content entry palette 2110 moves in accordance with the movement of the stylus 203. In some embodiments, while moving, content entry palette 2110 enters into a miniature display mode (e.g., such as described below in FIG. 21P). In some embodiments, while moving, content entry palette 2110 maintains the full display mode.

Figure 21O:
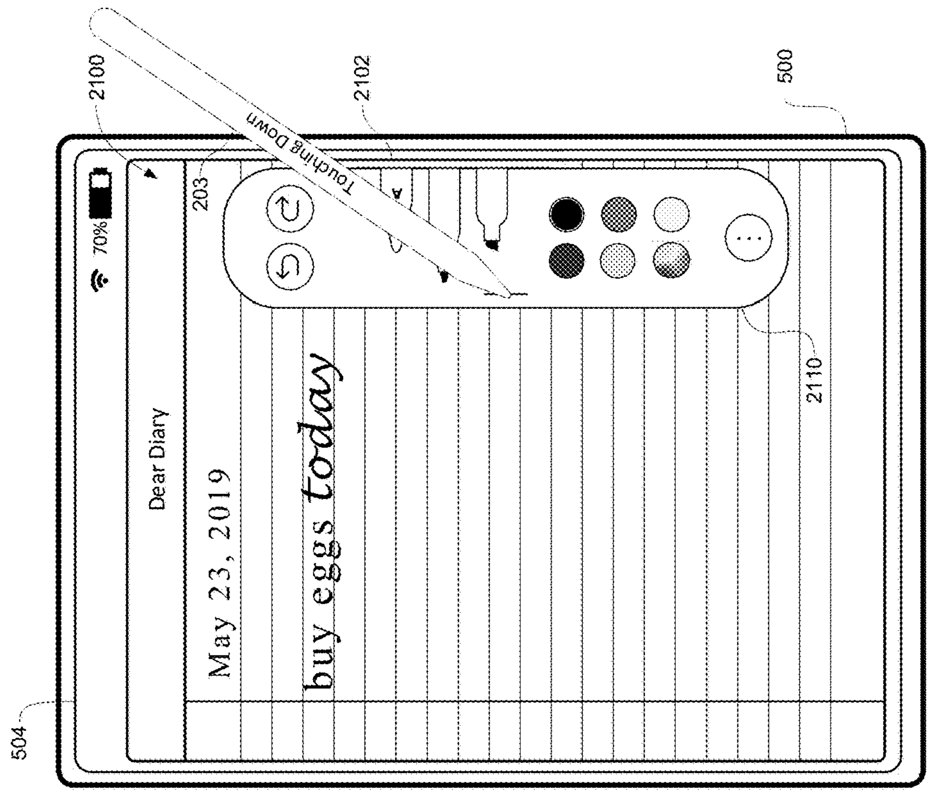
Figure 21N:
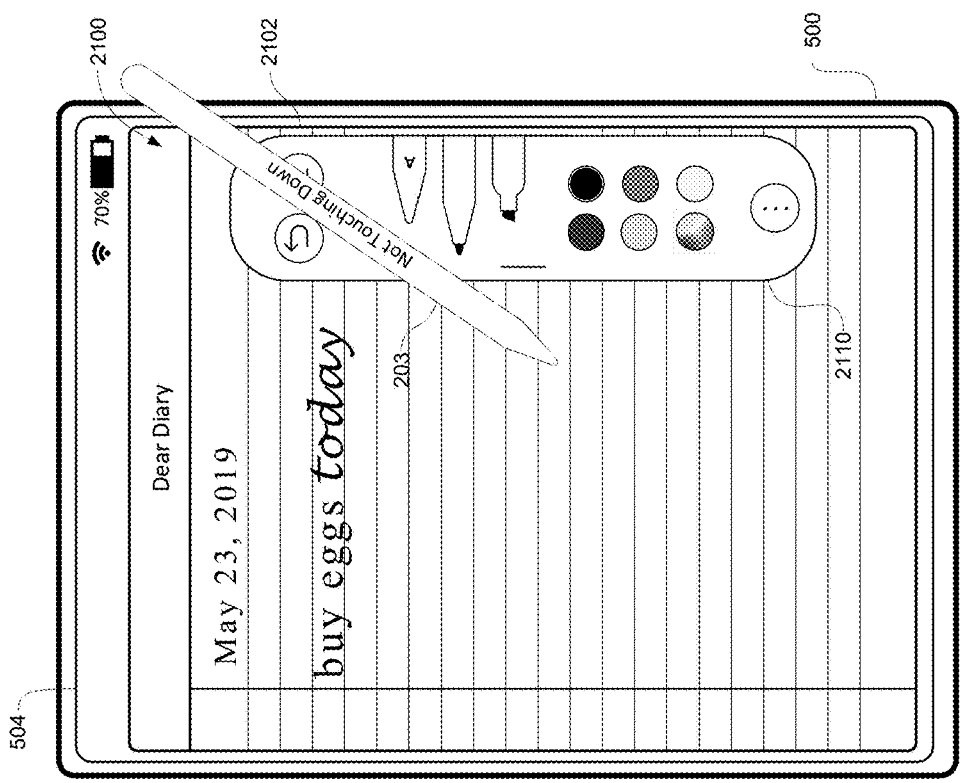

In FIG. 21N, a termination of the touch-down of stylus 203 is detected after moving content entry palette 2110. In some embodiments, in response to detecting the termination of the touch-down of stylus 203, content entry palette 2110 is snapped to the right side of touch screen 504 and is displayed in a portrait mode (e.g., vertically, as opposed to horizontally as shown in FIGS. 21A-21M). In some embodiments, content entry palette 2110 snaps to any of the edges of touch screen 504 (e.g., top, bottom, left, right) if the content entry palette 2110 is moved to within a threshold distance of the respective edge (e.g., within 0.5 inches, 1 inch, 2 inches, closer to the respective edge than the other edges, etc.).

Figure 21P:
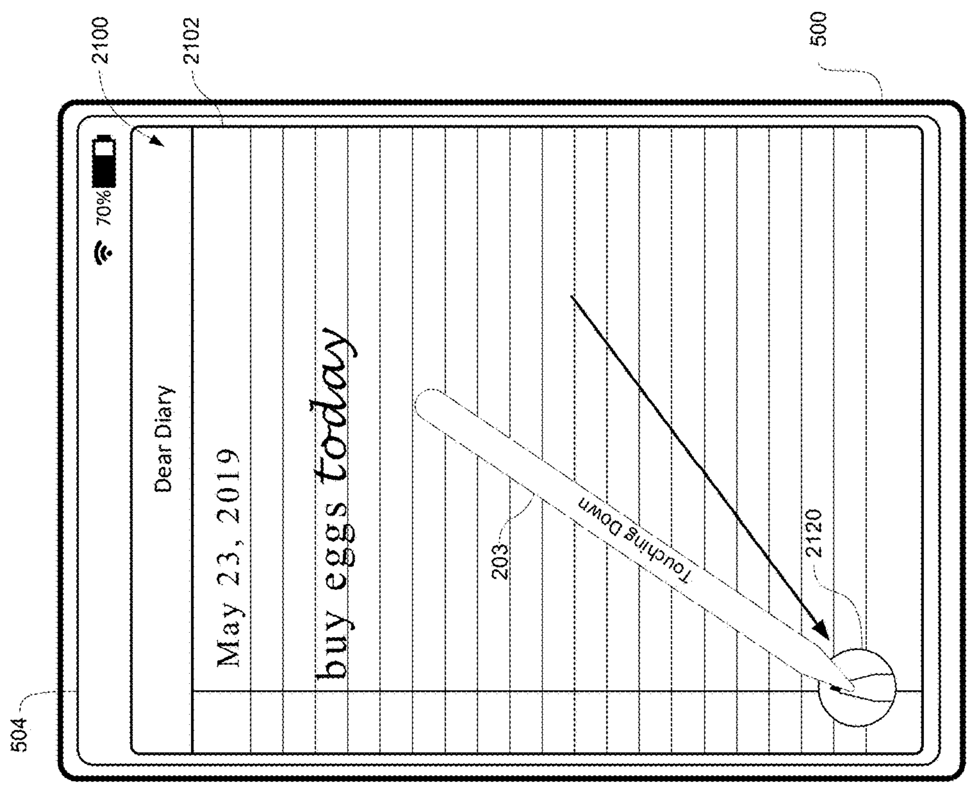

In FIG. 21O, a touch-down of stylus 203 is detected on movement bar 2115. In FIG. 21P, a movement of the stylus 203 is detected moving content entry palette 2110 toward the bottom-left corner of touch screen 504. In some embodiments, in response to being moved to the bottom-left corner of touch screen 504, content entry palette 2110 enters miniature display mode, as shown in FIG. 21P. In some embodiments, the content entry palette in miniature display mode is displayed as icon 2120. In some embodiments, icon 2120 includes a representation of the current active content entry tool. In FIG. 21P, the currently active content entry tool is the pen entry tool and icon 2120 includes a representation of the pen entry tool.

Figure 21Q:
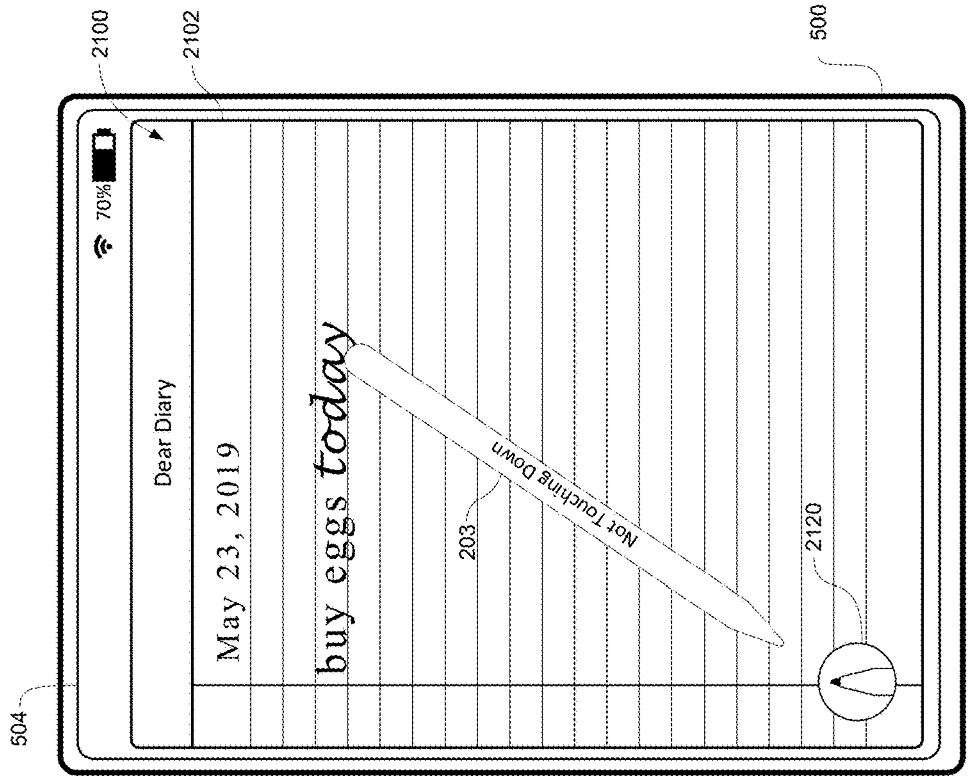

In FIG. 21Q, a termination of the touch-down of stylus 203 is detected after moving content entry palette 2110 to the bottom-left corner. In some embodiments, in response to detecting the termination of the touch-down of stylus 203, the content entry palette remains in miniature display mode in the bottom-left corner of touch screen 504.

Figure 21S:
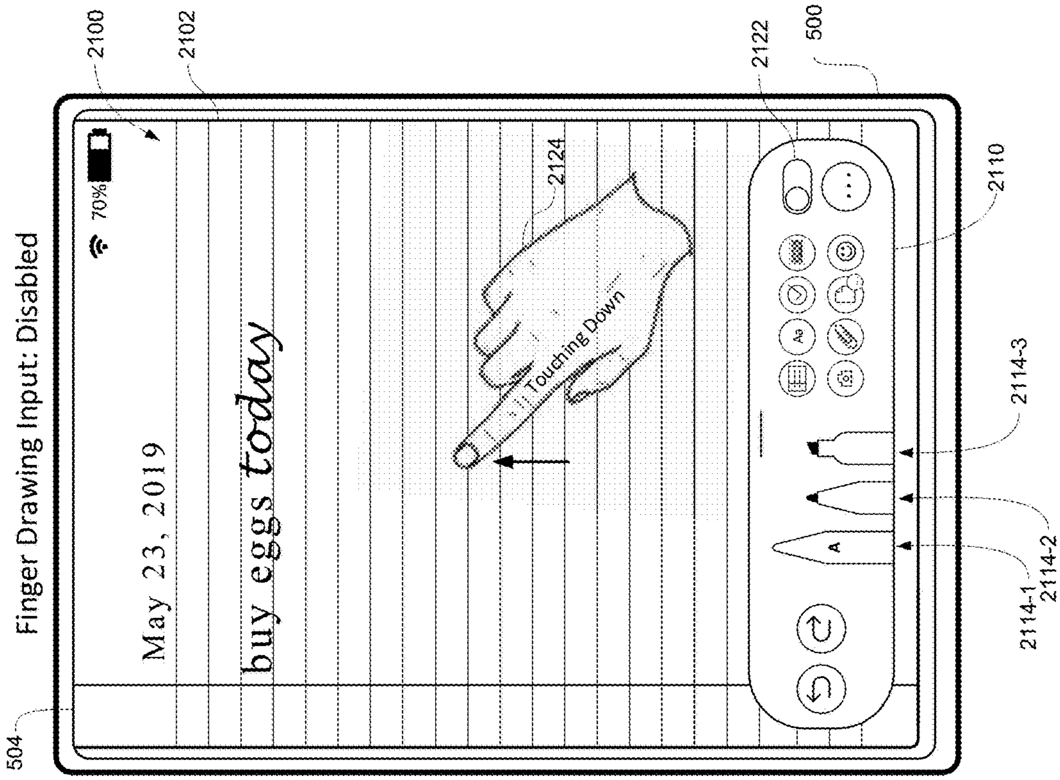
Figure 21R:
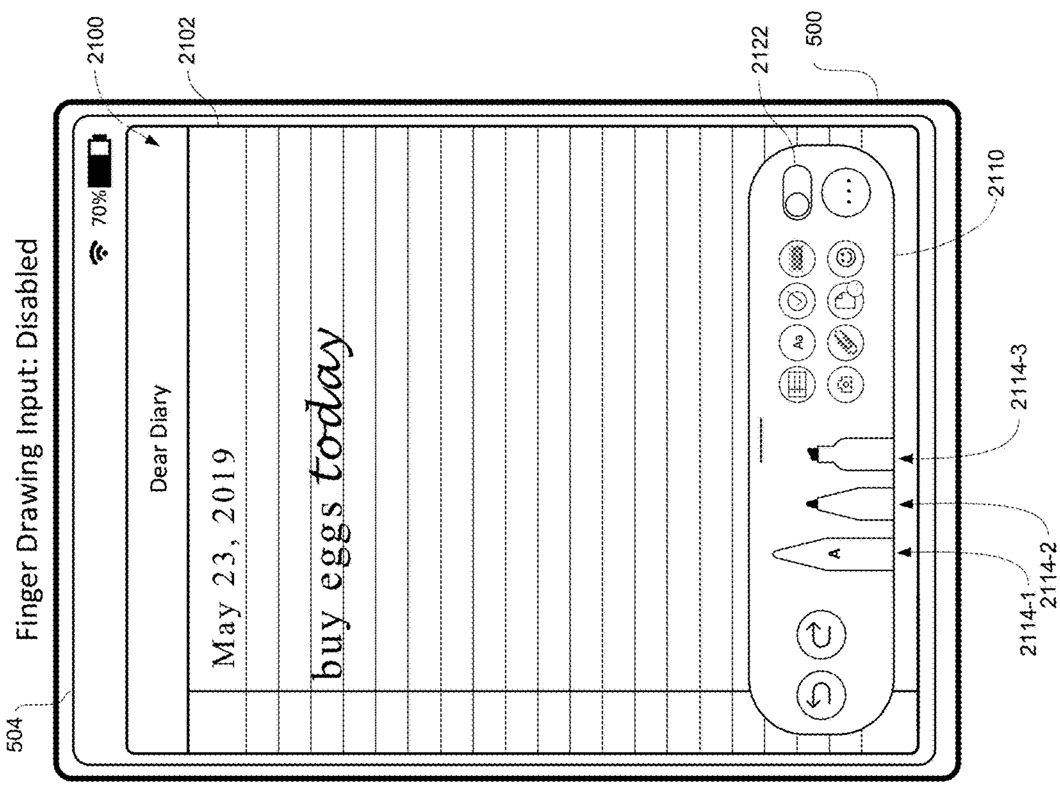

FIGS. 21R-21V illustrate an embodiment in which a finger drawing input setting is enabled. In FIG. 21R, the finger drawing input setting is disabled. In some embodiments, the finger drawing input setting is a global setting that applies to all content entry regions and all applications on device 500. In such embodiments, the global finger drawing input setting continues to apply when the user switches to a different application or begins to input comment into a different content entry region. In some embodiments, the user is able to change (e.g., enable or disable) the global finger drawing input setting from a settings user interface of device 500. In some embodiments, the finger drawing input setting controls whether inputs received in a content entry region from a finger (e.g., as opposed to stylus 203) are interpreted as a drawing input or interpreted as a navigational input. For example, when the finger drawing input setting is enabled, then finger inputs in a content entry region are interpreted as content entry inputs (e.g., similar to inputs received from stylus 203) to draw or otherwise insert content into the respective content entry region. In some embodiments, when the finger drawing input setting is disabled, then finger inputs are interpreted as navigational or selection inputs (e.g., such as to scroll the user interface or select an object in the content entry region) rather than inputs to draw or input content in the respective content entry region. In some embodiments, content entry palette 2110 includes a toggle 2122 for enabling or disabling finger drawing input (e.g., changing the global setting). In some embodiments, toggling toggle 2122 causes the finger drawing input to be enabled or disabled (as the case may be) only for content entry region 2102 or the current application (e.g., overrides the global setting temporarily). In some embodiments, toggling toggle 2122 causes the finger drawing input to be enabled or disabled (as the case may be) for all content entry regions and/or all applications (e.g., changes the global setting). In some embodiments, toggle 2122 overrides the global finger drawing input setting temporarily until the end of a session. For example, the temporary finger drawing input setting is active only for the current drawing session (e.g., until the user selects another content entry region, at which point the global finger drawing input setting is restored). In another example, the temporary finger drawing input setting is active only for the current application session (e.g., until the user switches to another application, at which point the global finger drawing input setting is restored). In another example, the temporary finger drawing input setting is active for the current device session (e.g., until the user locks the device or turns off the display, at which point the global finger drawing input setting is restored).

Figure 21U:
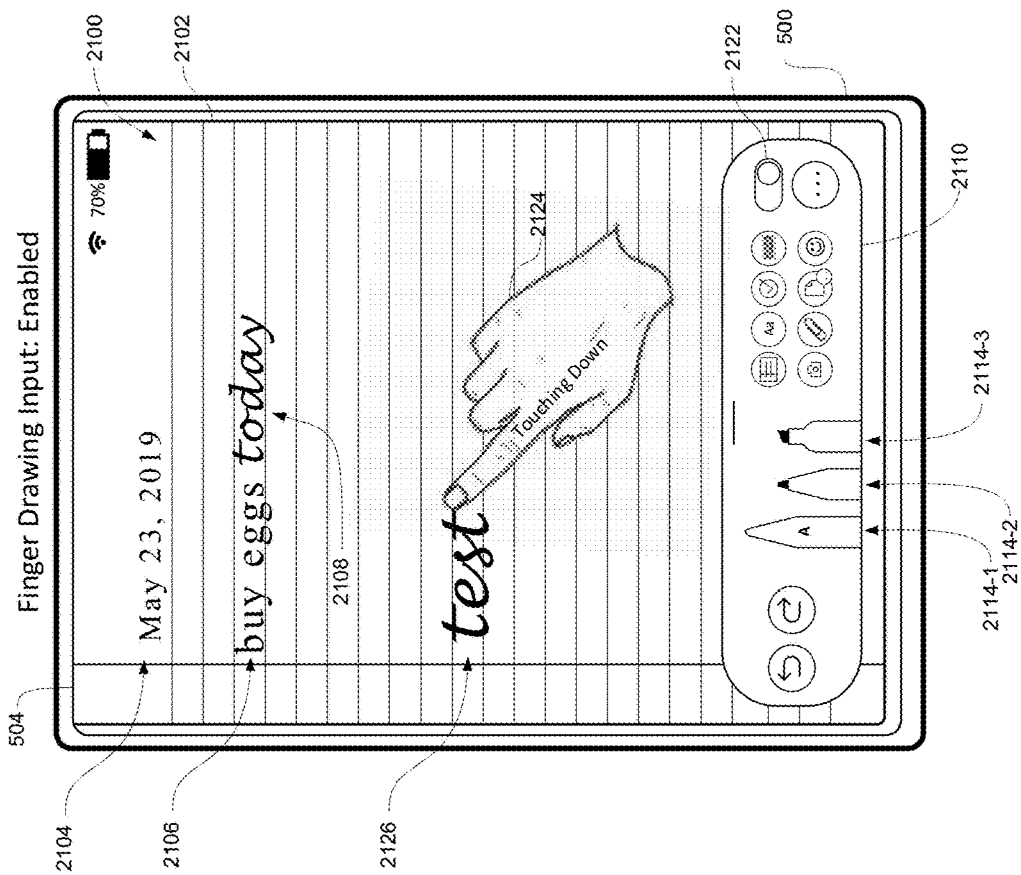
Figure 21T:
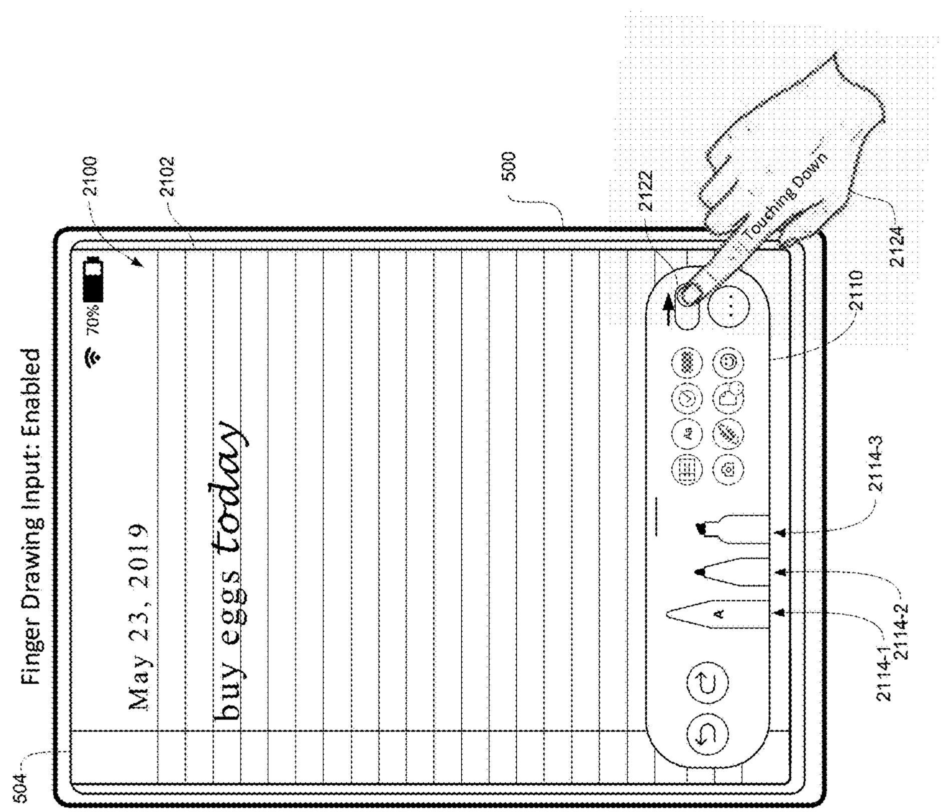

In FIG. 21S, an upward swipe input is received from finger 2124 while the finger drawing input setting is disabled. In some embodiments, in response to the upward swipe input, user interface 2100 is scrolled upwards in accordance with the upward swipe movement, as shown in FIG. 21S. Thus, finger gestures in content entry region 2102 while the finger drawing input setting is disabled causes a navigation of the user interface (e.g., scrolling or selecting objects). In FIG. 21T, a user input is received from finger 2124 toggling toggle 2122, thus enabling finger drawing input. In FIG. 21U, a handwritten input from finger 2124 is detected drawing in content entry region 2102. In some embodiments, in response to the handwritten input, a representation of the handwritten input 2126 is displayed in the content entry region 2102 at the location of the handwritten input. For example, in FIG. 21U, the user wrote "test" in content entry region 2102 using finger 2124. In FIG. 21V, because the text entry tool 2114-1 is active, representation 2126 is converted into font-based text (in a manner similar to described above with respect to methods 700, 1100, 1300, 1500, 1600, 1800, and/or 2000). Thus, while the finger drawing input setting is enabled, finger gestures in content entry regions are treated in the same manner as stylus inputs such that the gestures cause content to be inserted into the content entry regions (optionally converted into font-based text or styled based on the currently active content entry tool).

Figure 21W:
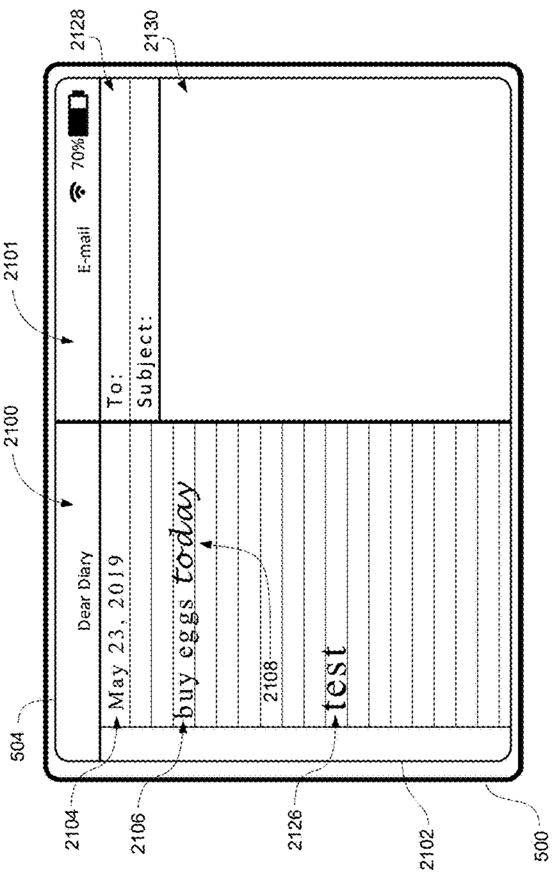
Figure 21V:
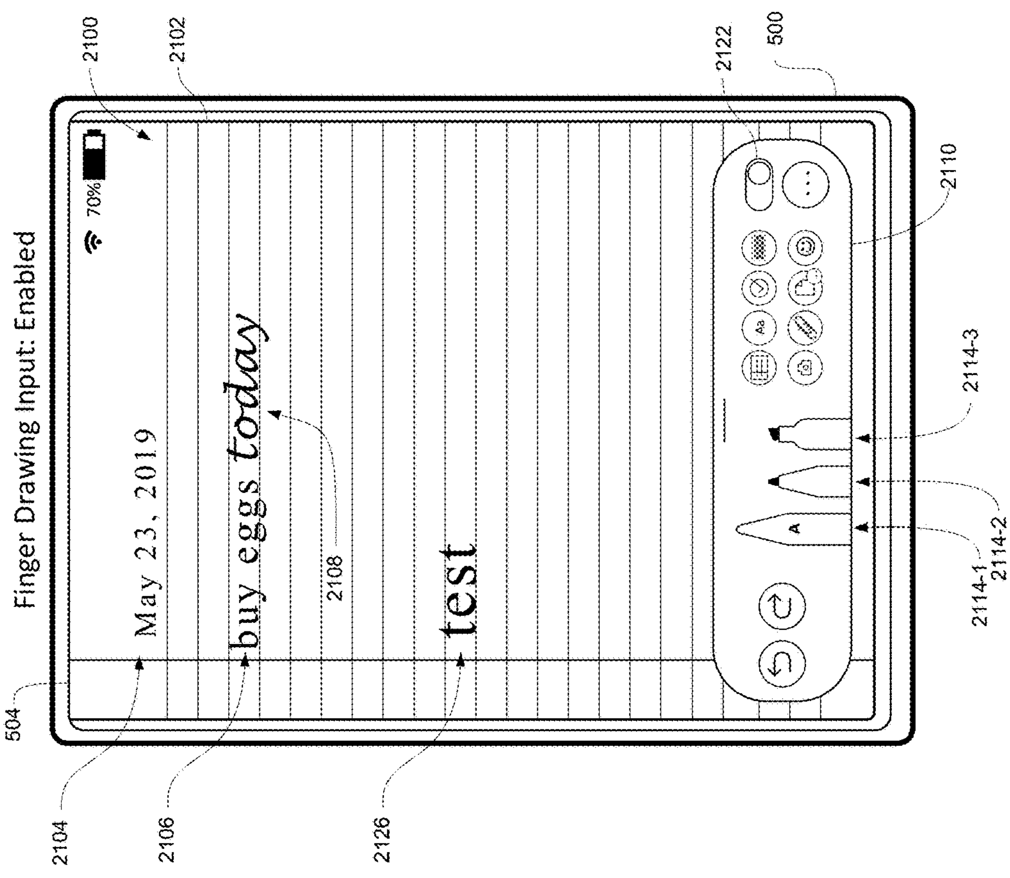

FIGS. 21W-21DD illustrate embodiments in which the content entry palette is displayed while device 500 is concurrently displaying multiple applications. In FIG. 21W, device 500 is in a multitasking mode in which two applications are concurrently displayed. In some embodiments, the two applications are two instances of the same application or one instance of two different applications. In FIG. 21W, user interface 2100 corresponding to the note taking application is displayed on the left side of touch screen 504 and user interface 2101 corresponding to an email application is displayed on the right side of touch screen 504.

In FIG. 21W, content entry region 2102 of user interface 2100 is similar to the content entry region 2102 described above with respect to FIG. 21V and includes pre-existing text 2104, representation of font-based text 2106, representation of handwritten input 2108, and representation of font-based text 2126. In some embodiments, user interface 2101 corresponding to the email application includes a text entry field 2128 corresponding to the recipient field and a content entry field 2130 corresponding to the body of the email.

Figure 21Y:
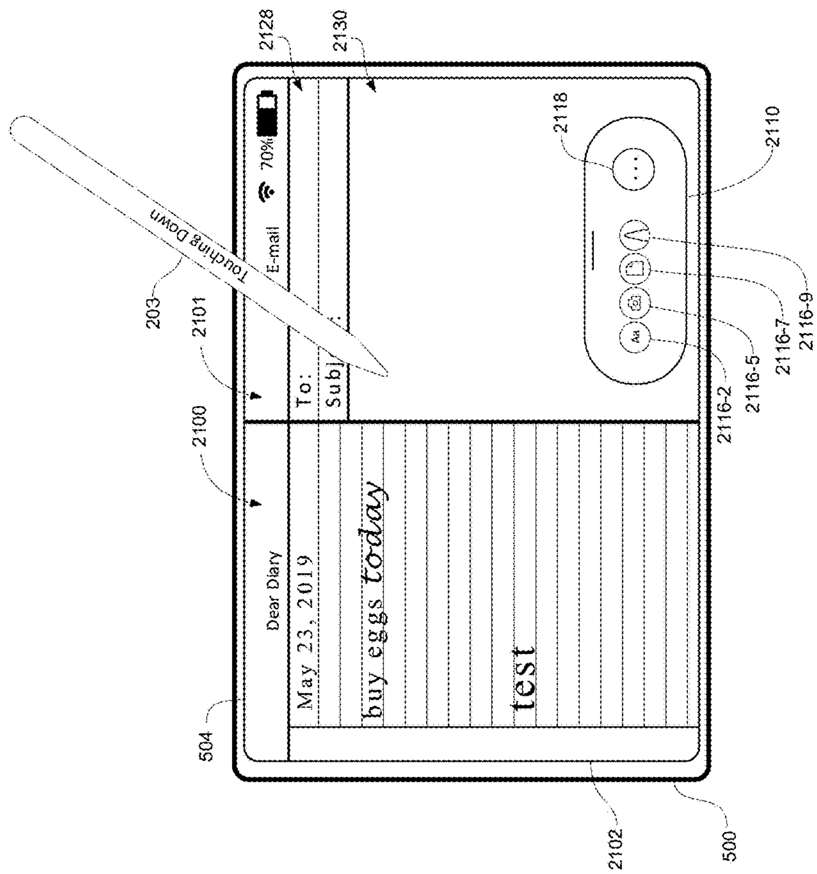
Figure 21X:
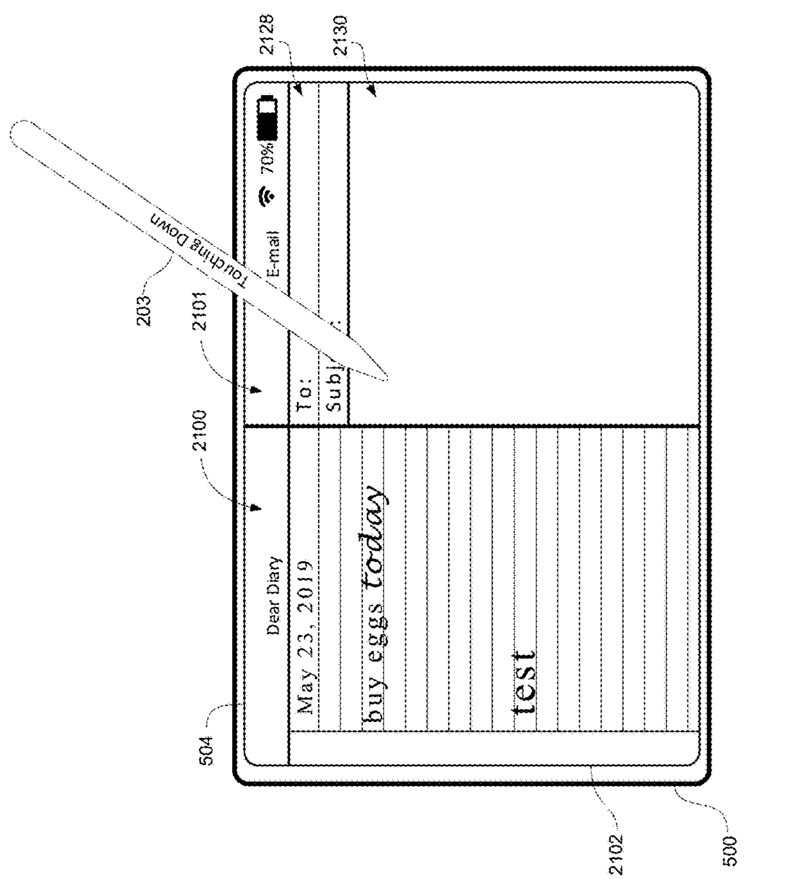
Figure 21A:
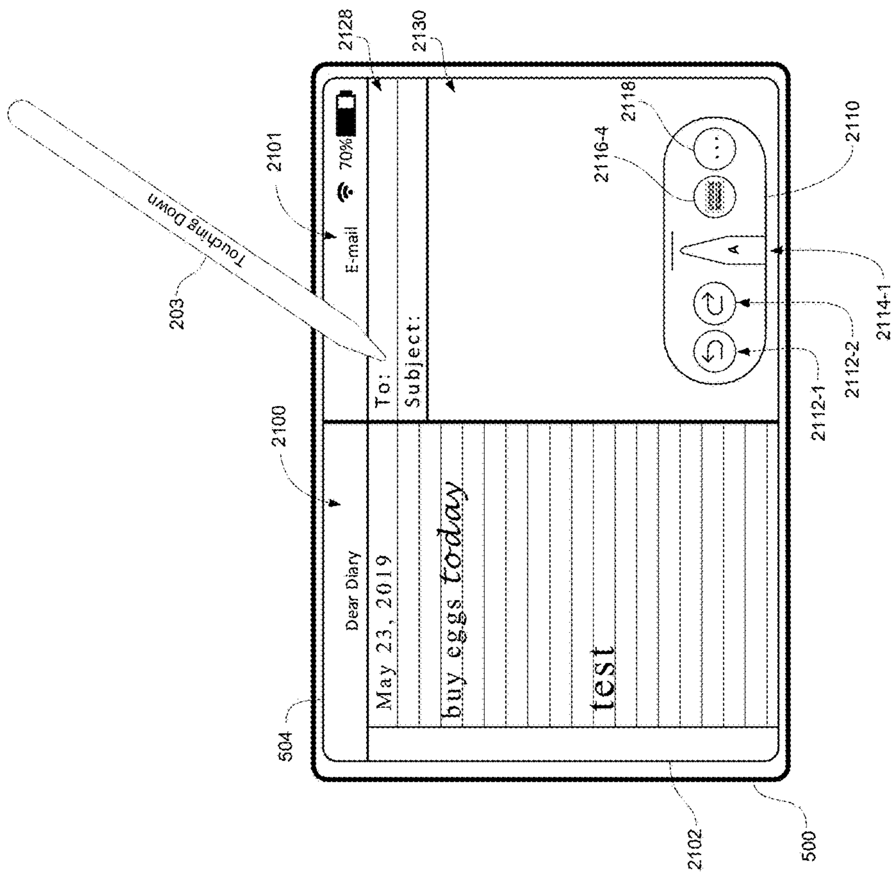

In FIG. 21X, a touch-down of stylus 203 on touch screen 504 (e.g., contact with touch screen 504) at content entry region 2130 is detected. In some embodiments, in response to detecting the touch-down of stylus 203 at content entry region 2130, device 500 displays content entry palette 2110 centered in user interface 2101, as shown in FIG. 21Y. In some embodiments, the options displayed in content entry palette 2110 are based on the application for which it is being displayed. For example, in FIG. 21Y, the content entry palette 2110 includes option 2116-2 that is selectable to modify font settings, option 2116-5 that is selectable to take a picture using the device's integrated camera and insert the picture into content entry region 2102, option 2116-7 that is selectable to cut/copy/paste content (e.g., display a pop-up with options to cut, copy, or paste content), and option 2116-9 that is selectable to select among a plurality of content entry tools (e.g., display a pop-up with content entry tool options). Thus, even though content entry palette 2110 is displayed for content entry region 2130, which accepts both font-based text and drawings (e.g., similarly to content entry region 2102), content entry palette 2110 for content entry region 2130 has different options than content entry palette for content entry region 2102. In some embodiments, a designer of an application is able to select or otherwise customize the options that are displayed in content entry palette 2110 for each content entry region.

In some embodiments, additionally or alternatively to displaying options based on application, content entry palette 2110 is able to be displayed in a smaller mode based on the width of user interface 2101 (e.g., as a result of being in multitasking mode in which multiple applications are concurrently displayed). In some embodiments, when content entry palette 2110 is in a smaller mode, fewer options are displayed in content entry palette 2110. In some embodiments, when content entry palette 2110 is in a smaller mode, certain options are collapsed with other options and displayed in a pop-up).

Figure 21Z:
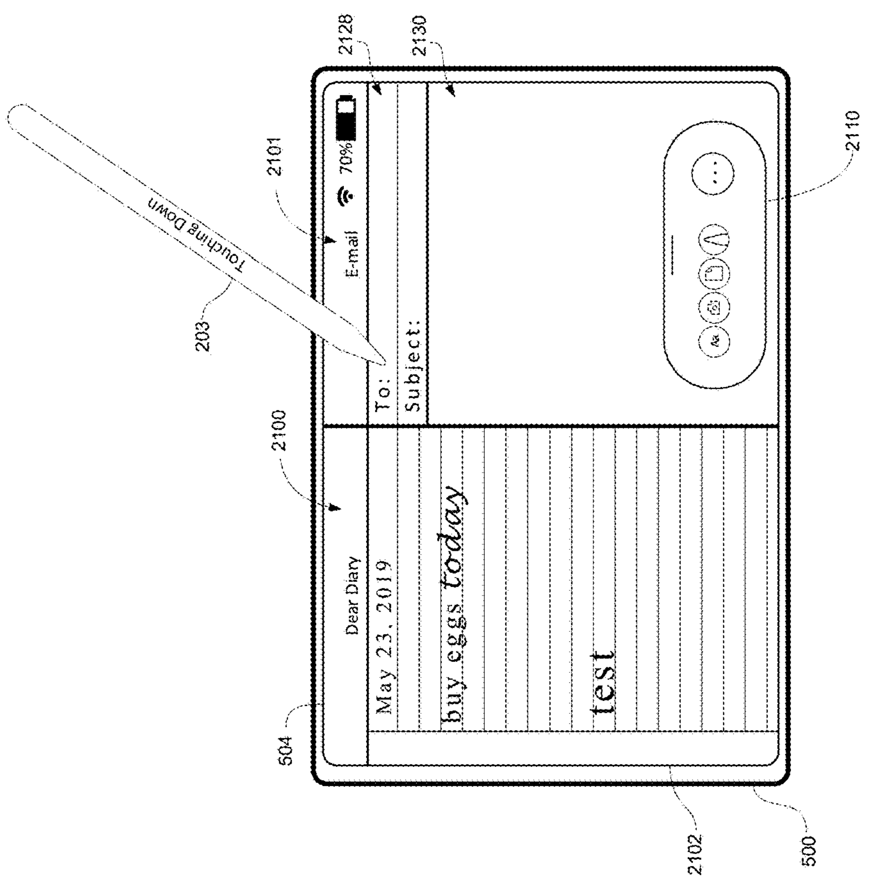
Figure 21C:
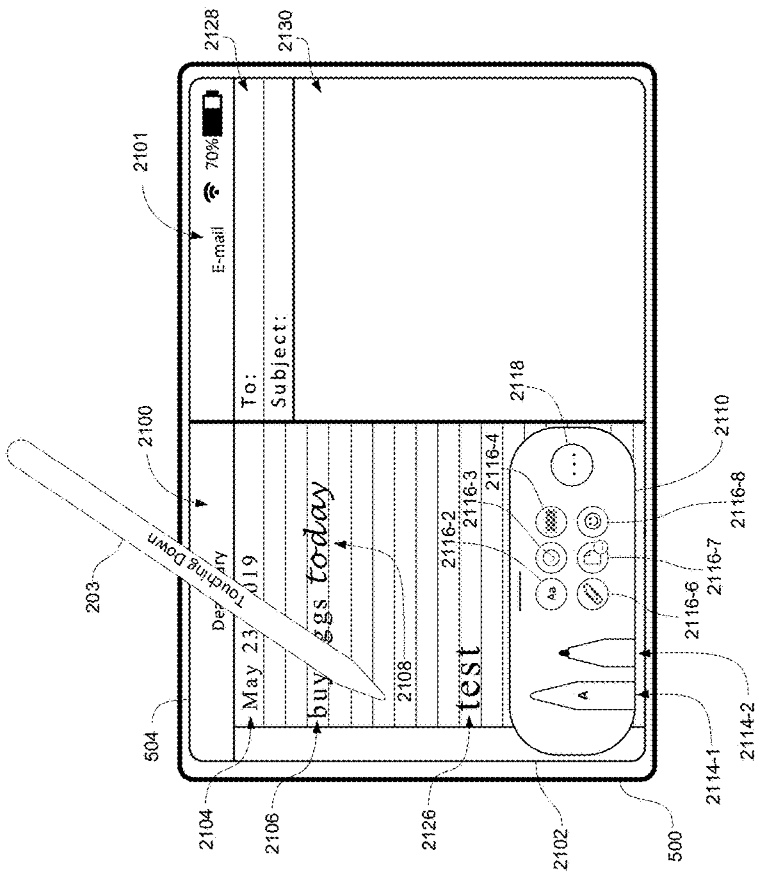
Figure 21B:
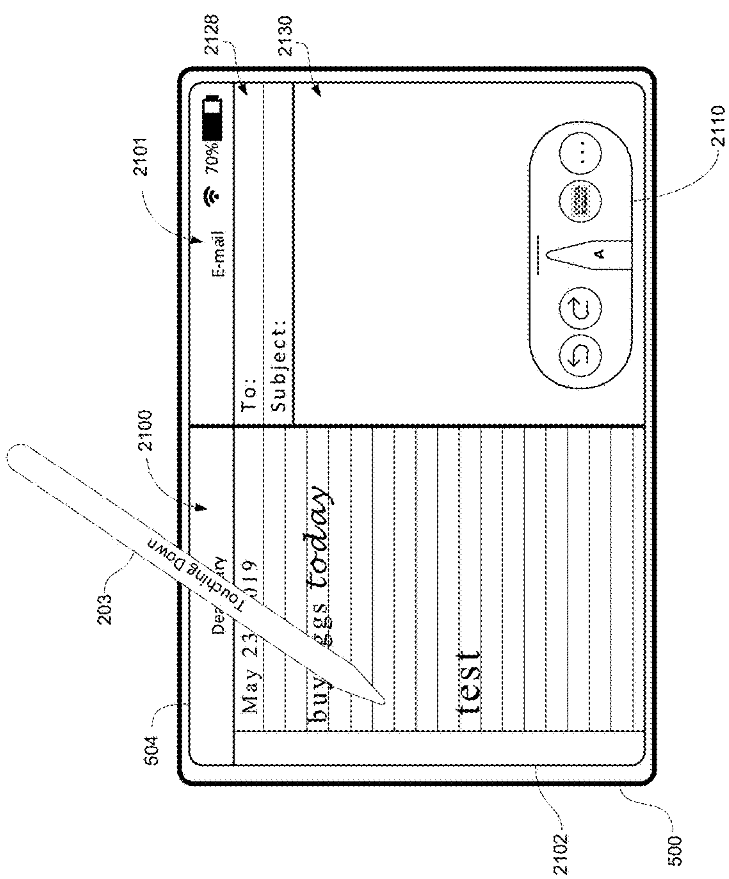
Figure 21D:
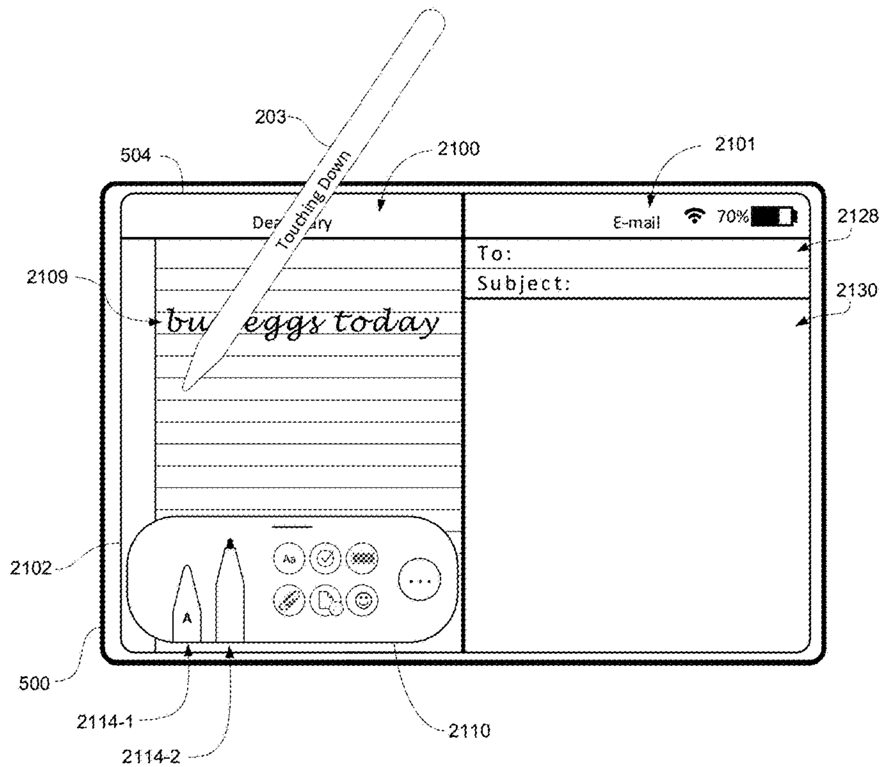
Figure 22A:
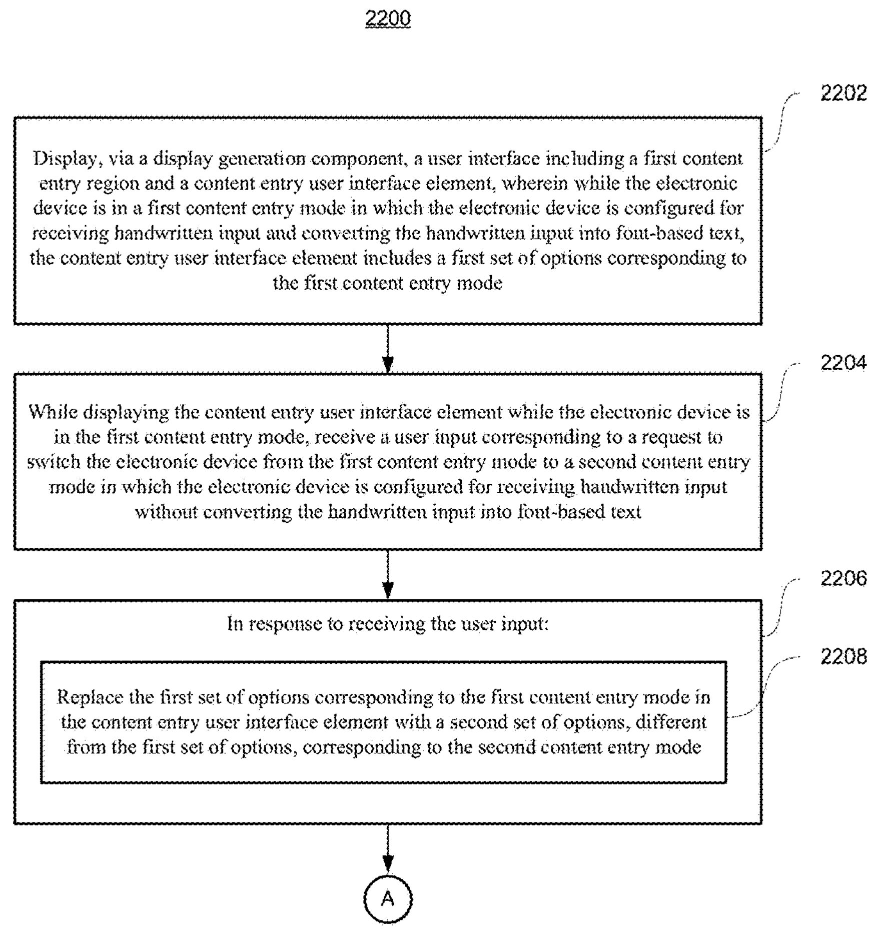
FIGS. 22A-22J are flow diagrams illustrating a method of displaying options in a content entry palette in accordance with some embodiments.
Figure 22B:
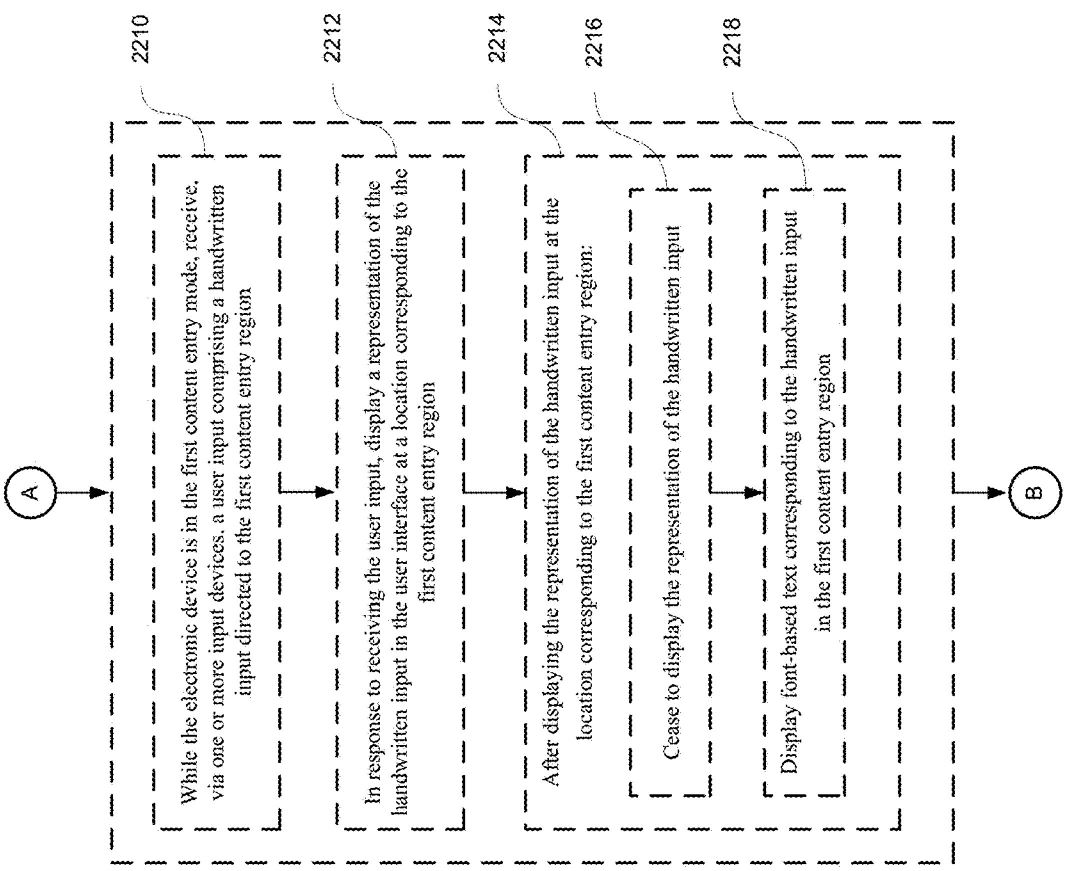
Figure 22C:
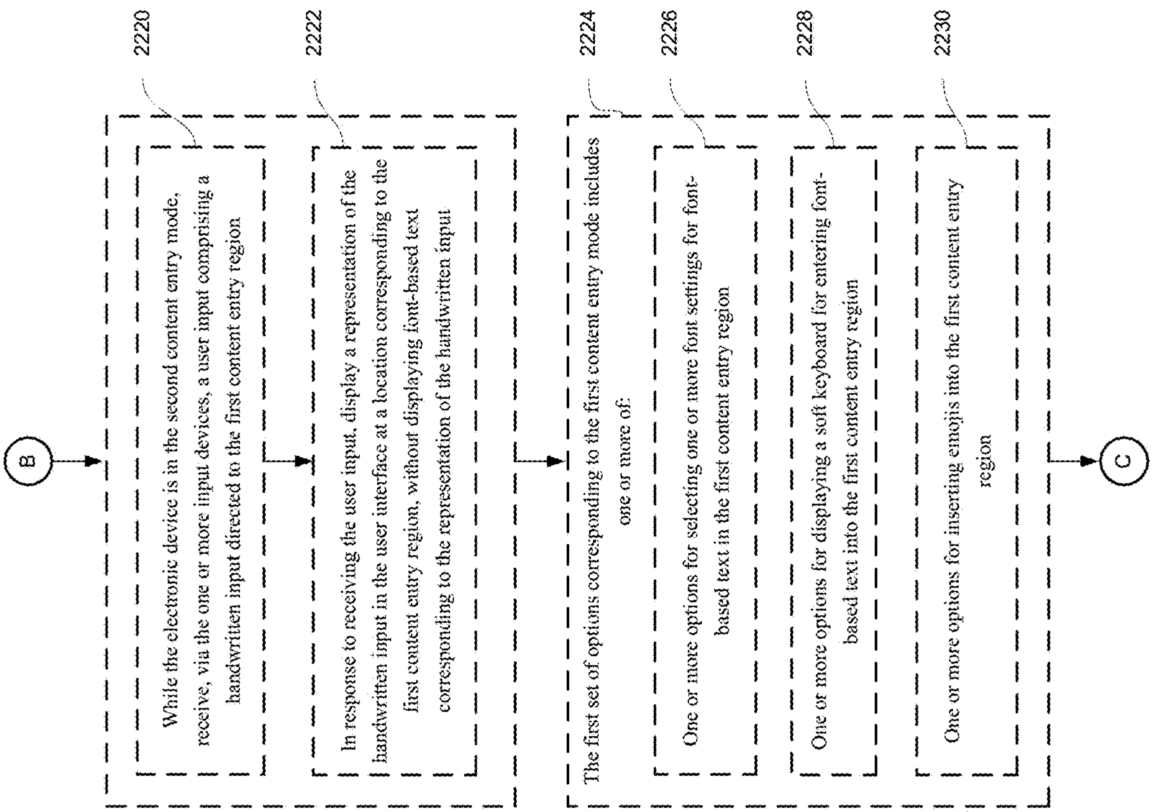
Figure 22D:
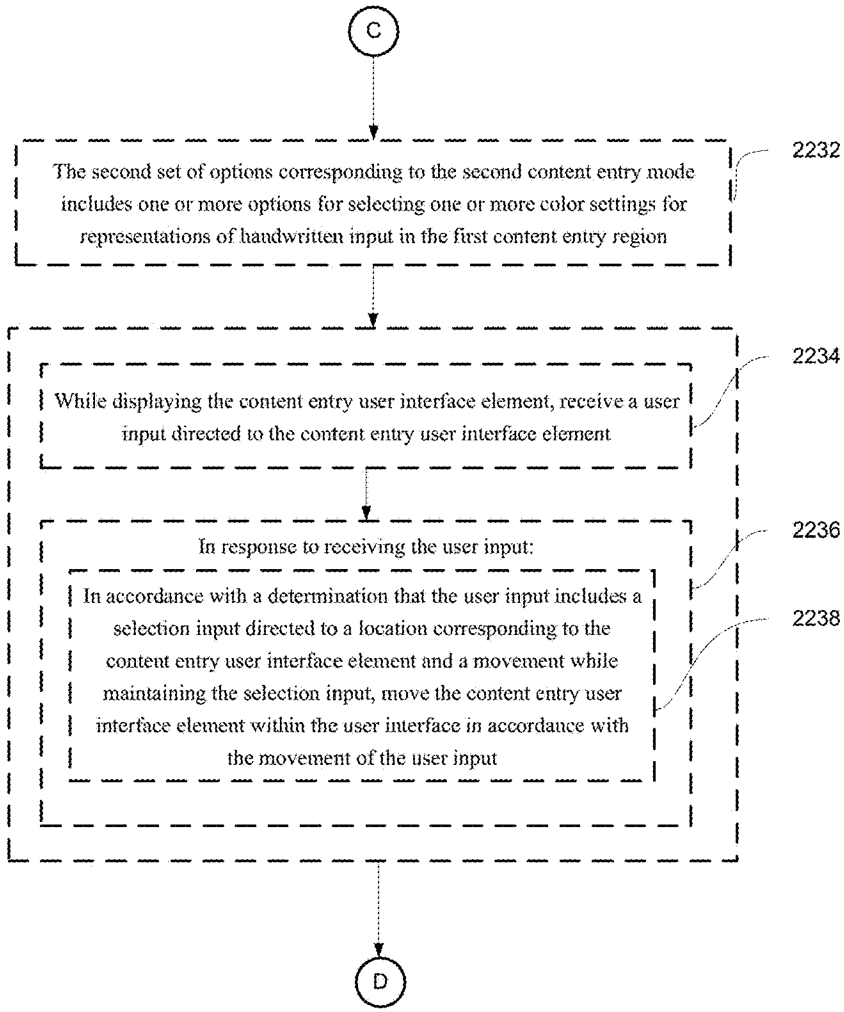
Figure 22E:
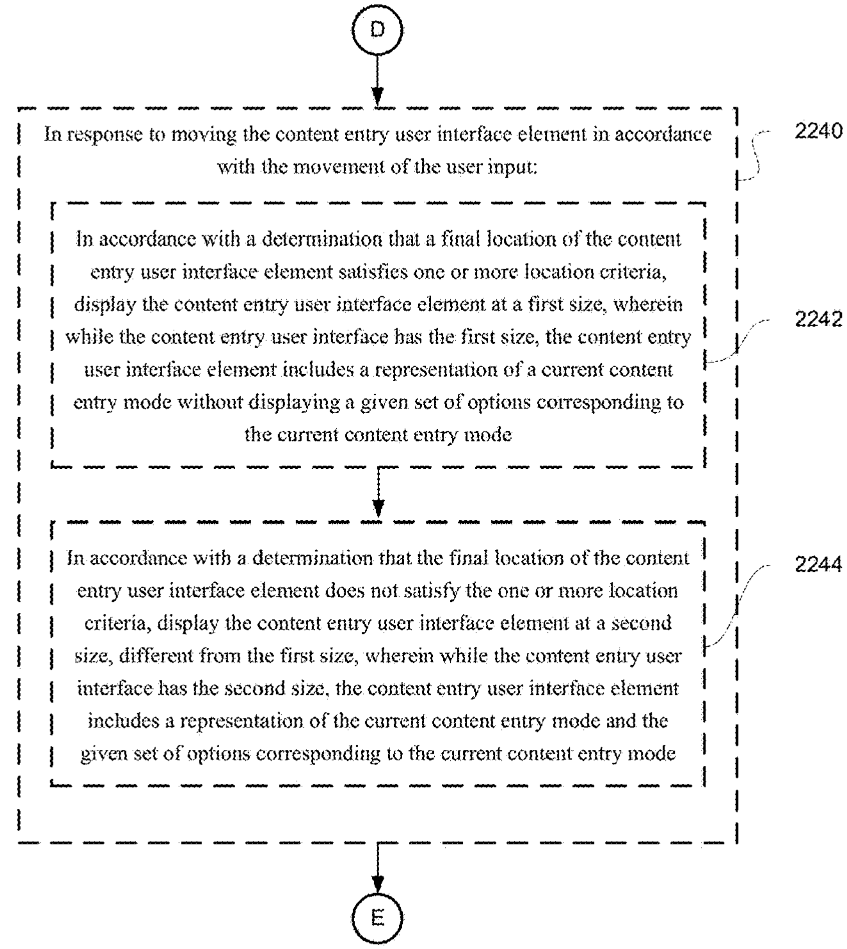
Figure 22F:
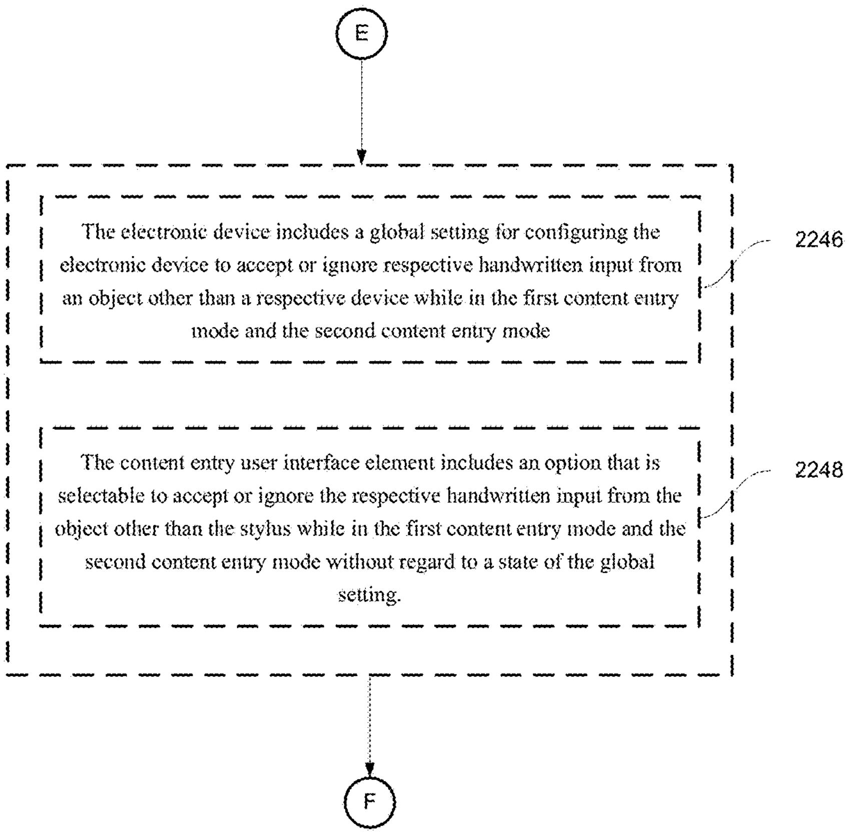
Figure 22G:
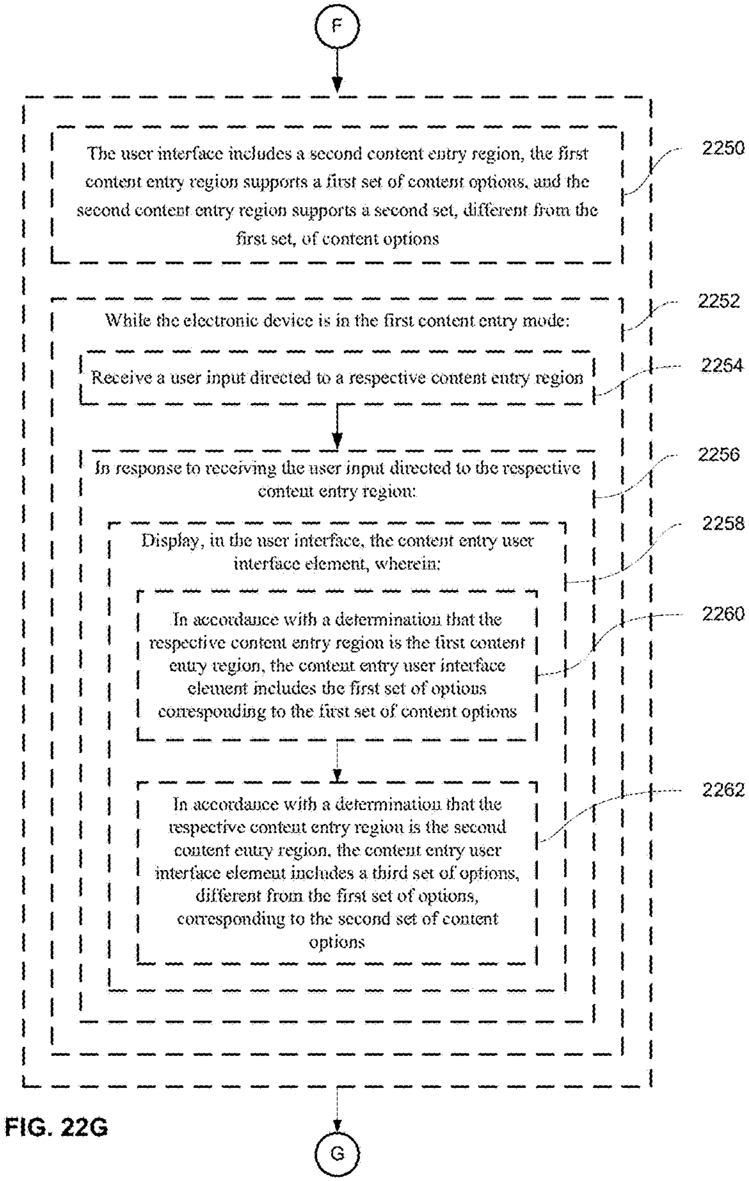
Figure 22I:
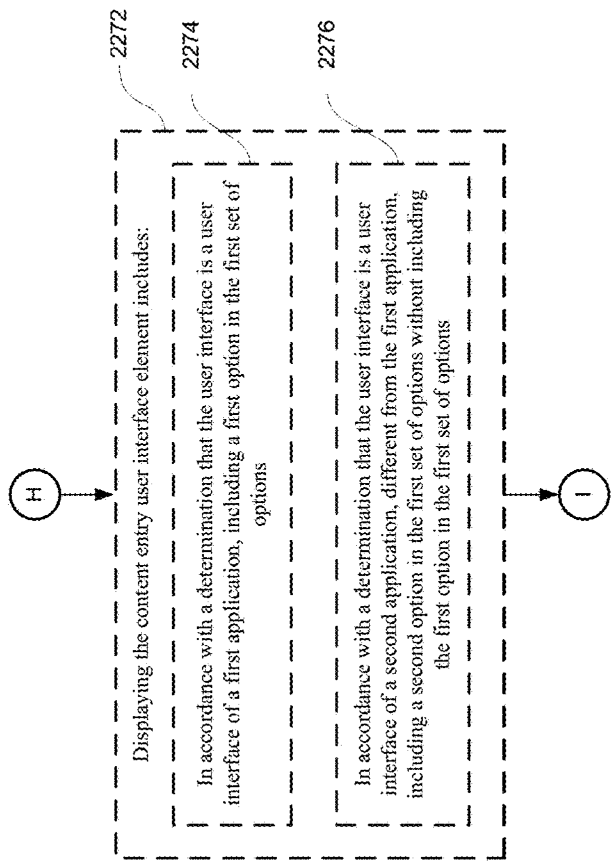
Figure 22H:
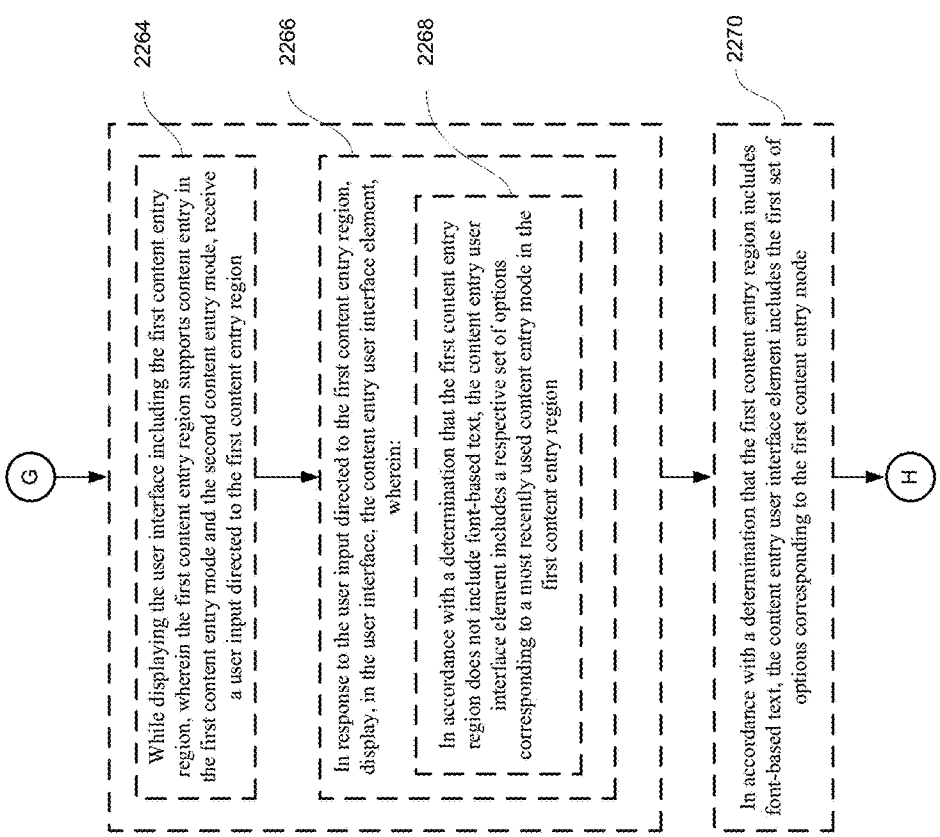
Figure 22J:
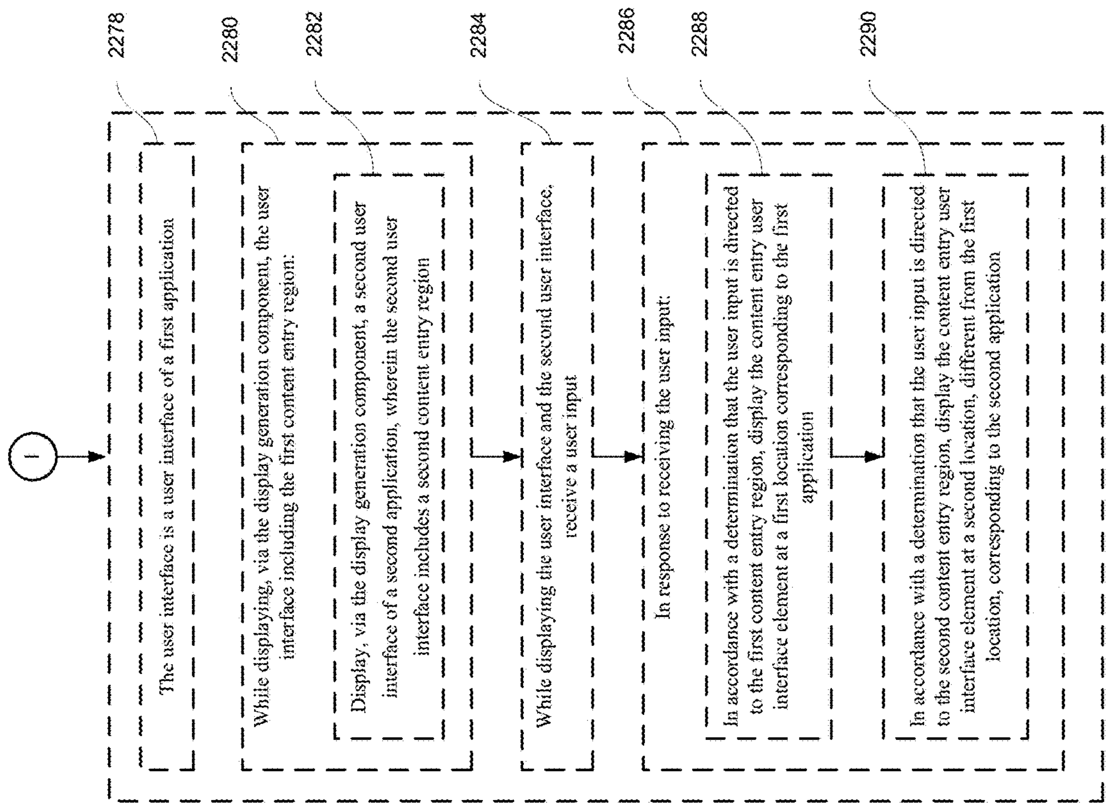

In FIG. 21Z, a touch-down of stylus 203 on touch screen 504 (e.g., contact with touch screen 504) at text entry region 2128 is detected. In some embodiments, in response to detecting the touch-down of stylus 203 at text entry region 2128, device 500 displays content entry palette 2110 centered in user interface 2101, as shown in FIG. 21AA. In some embodiments, text entry region 2128 is compatible only with font-based text and is incompatible with drawings (e.g., text entry region 2128 cannot accept or display drawings input/content, and can only accept or display font-based text input/content). Thus, as shown in FIG. 21AA, content entry palette 2110 includes a set of options based on text entry region 2128 only being compatible with font-based text. For example, in FIG. 21AA, content entry palette 2110 includes undo option 2112-1, redo option 2112-2, text entry tool 2114-1, option 2116-4 for displaying a soft keyboard and option 2118. Thus, content entry palette 2110 includes a limited set of options specific to entering text into text entry region 2128 (e.g., and does not include options such as options to select a marker entry tool, or options to set the color of handwritten input).

Thus, as described above, device 500 is able to display different sets of options in content entry palette 2110 based on the application for which the palette is displayed, the type of content entry region for which content is being entered, and/or the size of the palette (which is optionally based on the width of the user interface).

FIGS. 21BB-21DD illustrate embodiments in which the content entry tool is automatically selected when content entry palette 2110 is displayed. In FIG. 21BB, a touch-down of stylus 203 on touch screen 504 (e.g., contact with touch screen 504) at content entry region 2102 is detected. In some embodiments, in response to detecting the touch-down of stylus 203 at content entry region 2102, device 500 displays content entry palette 2110 centered in user interface 2100, as shown in FIG. 21CC. In some embodiments, because content entry region 2102 includes font-based text (e.g., pre-existing text 2104, representation 2106 and representation 2126), text entry tool 2114-1 is automatically selected such that handwritten inputs in content entry region 2102 are converted into font-based font (e.g., text entry tool 2114-1 is automatically selected without regard to which tool was the most recently used content entry tool). Thus, because content entry region 2102 includes font-based text, it is likely that the user intends to insert more font-based text and text entry tool 2114-1 is automatically selected (e.g., the device is automatically set to text entry mode). In some embodiments, as shown in FIG. 21CC, content entry palette 2110 is displayed in a smaller mode in which fewer options are included in content entry palette 2110. For example, in FIG. 21CC, undo option and redo options are not displayed, only two content entry tools are displayed (e.g., text entry tool 2114-1 and pen entry tool 2114-2) and even though text entry tool 2114-1 is selected, only options 2116-2, 2116-3, 2116-4, 2116-6, 2116-7, and 2116-8 are displayed (e.g., options 2116-1 and 2116-5 are not included).

In FIG. 21DD, content entry region 2102 includes only representations of handwritten input 2109 and no font-based text. In FIG. 21DD, in response to detecting the touch-down of stylus 203 at content entry region 2102, device 500 displays content entry palette 2110 centered in user interface 2100. In some embodiments, because content entry region 2102 does not include any font-based text (and optionally because content entry region 2102 includes hand-drawn content), the previously used tool is automatically selected (e.g., the most recently used content entry tool). In some embodiments, the previously used tool is the tool that was most recently used to insert content into content entry region 2102 (e.g., the same content entry region for which content entry palette 2110 is being displayed). In some embodiments, the previously used tool is the tool that was most recently used to insert content into any content entry region for any application. For example, in FIG. 21DD, pen entry tool 2114-2 is automatically selected (e.g., the device is automatically set to pen entry mode). In some embodiments, the most recently used tool can be the text entry tool (e.g., if the user selected the text entry tool for use in another content entry region).

FIGS. 22A-22J are flow diagrams illustrating a method 2200 of displaying options in a content entry palette. The method 2200 is optionally performed at an electronic device such as device 100, device 300, device 500, device 501, device 510, and device 591 as described above with reference to FIGS. 1A-1B, 2-3, 4A-4B and 5A-5I. Some operations in method 2200 are, optionally combined and/or order of some operations is, optionally, changed As described below, the method 2200 provides ways to display options in a content entry palette. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device in communication with a display generation component and one or more input devices (e.g., a mobile device (e.g., a tablet, a smartphone, a media player, or a wearable device), or a computer, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.) displays (2202), via a display generation component, a user interface including a first content entry region (e.g., a region in the user interface in which a user is able to input and/or enter text, images, multimedia, etc.) and a content entry user interface element, such as content entry region 2102 and content entry palette 2110 in FIG. 21C (e.g., a palette that includes one or more options that control the entry of content into the content entry region), wherein while the electronic device is in a first content entry mode in which the electronic device is configured for receiving handwritten input and converting the handwritten input into font-based text, the content entry user interface element includes a first set of options corresponding to the first content entry mode (e.g., a set of one or more of the options displayed in the content entry user interface element depends on the content entry mode that the device is operating in).

For example, in an email composition user interface, a content entry region for the body of the email is capable of receiving (and transmitting over email) text, still images, videos, attachments, etc., such as described above with respect to user interface 1400. In another example, in a note taking application, a content entry region is capable of receiving handwritten text, drawings, figures, etc. and capable of inserting images, drawings, etc., such as described above with respect to user interface 620, 800, 1000, and 1210.

In some embodiments, the palette includes one or more representations of handwriting devices that correspond to different content entry modes (which are selectable to enter the respective content entry mode). In some embodiments, the palette includes options for changing the color, size, shape, font, etc. of the inserted handwritten content. In some embodiments, the palette includes options for inserting files, attachments, images, font-based text, etc., such as discussed above with respect to method 1500.

For example, while the electronic device is in a handwriting text entry mode, the device is able to receive handwritten inputs, recognize the handwritten inputs, and convert the handwritten input into font-based text (e.g., in a manner similar to the processes described above with respect to method 700, 1100, 1300, 1500, 1600, 1800, and/or 2000). In some embodiments, the handwritten input is received from a stylus, finger, or any other writing device. In some embodiments, only handwritten inputs from a stylus are converted into font-based text. In some embodiments, the first set of options corresponding to the first content entry mode includes one or more of a table entry option (for inserting a table in the content entry region), a font option (for changing the font of the font-based text), a checkbox entry option (for inserting an option button in the content entry region), a virtual keyboard option (for displaying a soft or virtual keyboard in the user interface), a camera option (for taking an image using a camera of the electronic device and inserting the image into the content entry region), a file attachment option (for inserting and/or attaching a file to the content entry region), an emoji option (for inserting an emoji into the content entry region), a copy/paste option (for copying content to a clipboard or inserting content from a clipboard), etc.

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the display generation component is a hardware component (e.g., including electrical components) capable of receiving display data and displaying a user interface.

In some embodiments, while displaying the content entry user interface element while the electronic device is in the first content entry mode, the electronic device receives (2204) a user input corresponding to a request to switch the electronic device from the first content entry mode to a second content entry mode in which the electronic device is configured for receiving handwritten input without converting the handwritten input into font-based text, such as selection pen entry tool 2114-2 in FIG. 21H (e.g., receiving a user input selecting, on the palette, a representation of a handwriting device corresponding to a content entry mode different from the handwriting text entry mode).

For example, the user input selects a representation of a pencil, pen, marker, highlighter, etc. In some embodiments, the user input corresponds to a request to exit the handwriting text entry mode and enter another content entry mode associated with the selected representation. In some embodiments, the content entry modes other than the handwriting text entry mode do not convert handwritten inputs into font-based text. In some embodiments, handwritten input while in the content entry modes other than the handwriting text entry mode causes inserting of content based on the selected handwriting device. For example, while in pencil content entry mode (e.g., when the pencil tool is selected), the handwritten input is displayed with a style corresponding to a pencil drawing. In some embodiments, the handwritten input is received from a stylus, finger, or any other writing device. In some embodiments, the user input corresponding to a request to switch the electronic device is received via a stylus or touch input (e.g., selecting a respective tool on the content entry user interface element), a voice command (e.g., via a microphone), or any other suitable input mechanism.

In some embodiments, in response to receiving the user input (2206), such as in FIG. 21I: the electronic device replaces (2208) the first set of options corresponding to the first content entry mode in the content entry user interface element with a second set of options, different from the first set of options, corresponding to the second content entry mode, such as content entry palette 2110 switching from including options 2116 to including options 2113 in FIG. 21I (e.g., replacing the set of one or more options displayed in the content entry user interface element that is displayed when in the first content entry mode with a different set of one or more options based on being in the second content entry mode).

In some embodiments, one or more options are removed from the content entry user interface element. In some embodiments, one or more options are added to the content entry user interface element. In some embodiments, the options that are removed do not apply to or are irrelevant to the second content entry mode. In some embodiments, the options that are added do not apply to or are irrelevant to the first content entry mode, but apply to and/or are relevant to the second content entry mode. For example, while in the handwriting text entry mode, the content entry user interface element includes a font option (e.g., selectable to change the font of the resulting font-based text, such as font size, font type, color, underline, italics, strike-through, subscript, superscript, etc.), and entering the pencil drawing content entry mode causes the font option to be removed from display and one or more color input options to be displayed (e.g., selectable to change the color of the inserted content and/or handwritten drawing). In some embodiments, in response to receiving the user input, the device is configured to operate in the second content entry mode. For example, if a user selects a drawing tool from the content entry user interface element, then the device enters into drawing mode and handwritten inputs are interpreted as a drawing and the inputs are not converted into computer text (e.g., font-based text).

The above-described manner of providing different content entry options for two content entry modes that are both based on handwritten input (e.g., using a stylus) but operate differently allows the electronic device to provide the user with options tailored for the content entry mode that the user is in, which simplifies the interaction between the user and the electronic device and enhances the operability of the electronic device and makes the user-device interface more efficient (e.g., by automatically providing the user with options that are relevant to the active content entry mode and not providing the user with options that are irrelevant to the active content entry mode, without requiring the user to navigate to a separate menu or perform additional inputs to access the relevant options), which additionally reduces power usage and improves battery life of the electronic device by enabling the user to use the electronic device more quickly and efficiency.

In some embodiments, while the electronic device is in the first content entry mode, the electronic device receives (2210), via the one or more input devices, a user input comprising a handwritten input directed to the first content entry region, such as touch down of stylus 203 in FIG. 21D (e.g., receiving a contact via the touch sensitive display from a finger or a stylus on the first content entry region). In some embodiments, the user input includes a sequence of gestures to form one or more characters of one or more handwritten words.

In some embodiments, in response to receiving the user input, the electronic device displays (2212) a representation of the handwritten input in the user interface at a location corresponding to the first content entry region, such as representation 2106 of the handwritten input in FIG. 21D (e.g., displaying the trail of the handwritten input on the display at the location where the handwritten input was received as the input is received). For example, as the user "draws" on the touch-sensitive display, the display shows the user's handwritten input at the location where the input was received. In some embodiments, displaying the representation of the handwritten input is described in more detail above with respect to method 700.

In some embodiments, after displaying the representation of the handwritten input at the location corresponding to the first content entry region (2214), such as in FIG. 21D, the electronic device ceases (2216) to display the representation of the handwritten input and displays (2218) font-based text corresponding to the handwritten input in the first content entry region, such as in FIG. 21E (e.g., removing at least a portion of the handwritten input on the display and displaying font-based text (e.g., computerized text, digital text)

corresponding to the removed portion of the handwritten input in the text entry field). In some embodiments, the first content entry mode is a text entry mode (e.g., when the text entry tool is selected) such that handwritten inputs are converted into font-based text in the first content entry region, as described in more detail above with respect to method 700, 1100, 1300, 1500, 1600, 1800, and/or 2000.

The above-described manner of converting handwritten inputs to text (e.g., by receiving the input directed to the first content entry region and replacing the handwritten input with font-based text if when the device is in the first content entry mode) allows the user to write directly onto the user interface to enter text if the text entry tool is selected, which simplifies the interaction between the user and the electronic device and enhances the operability of the electronic device and makes the user-device interface more efficient (e.g., without requiring the user to switch to a different input mechanism such as a physical or virtual keyboard to switch between text entry mode and drawing mode), which additionally reduces power usage and improves battery life of the electronic device by enabling the user to use the electronic device more quickly and efficiency.

In some embodiments, while the electronic device is in the second content entry mode, the electronic device receives (2200), via the one or more input devices, a user input comprising a handwritten input directed to the first content entry region, such as touch down of stylus 203 in FIG. 21J (e.g., receiving a contact via the touch sensitive display from a finger or a stylus on the first content entry region). In some embodiments, the user input includes a sequence of gestures to form one or more characters of one or more handwritten words.

In some embodiments, in response to receiving the user input, the electronic device displays (2222) a representation of the handwritten input in the user interface at a location corresponding to the first content entry region, without displaying font-based text corresponding to the representation of the handwritten input, such as representation of the handwritten input 2108 in FIG. 21K (e.g., displaying the trail of the handwritten input on the display at the location where the handwritten input was received as the input is received).

For example, as the user "draws" on the touch-sensitive display, the display shows the user's handwritten input at the location where the input was received (e.g., in the first content entry region). In some embodiments, the representation of the handwritten input is not replaced with font-based text while in the second content entry mode. In some embodiments, the second content entry mode is a drawing mode. In some embodiments, the second content entry mode is a content entry mode other than the text entry mode (e.g., a tool other than the text entry tool is selected), such as described above with respect to methods 1500 and 1600.

The above-described manner of accepting handwritten input as a drawing (e.g., by receiving the input directed to the first content entry region and not replacing the input with font-based text if the device is in the second content entry mode) allows the user to quickly and efficiently switch to a drawing mode and draw in the user interface using the same input device that is used to input font-based text (e.g., without requiring the user to switch to another input device or input mechanism), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the first set of options corresponding to the first content entry mode (2224), such as options 2116 in FIG. 21C, includes one or more of (e.g., includes at least one tool of each of the following categories, includes at least one tool from one of the following categories, includes at least one tool from more than one of the following categories, etc.): one or more options for selecting one or more font settings for font-based text in the first content entry region (2226), such as option 2116-2 in FIG. 21C (e.g., an option selectable for displaying a dialog box or pop-up for selecting different font settings or a plurality of options for selecting different font settings), one or more options for displaying a soft keyboard for entering font-based text into the first content entry region (2228), such as option 2116-4 in FIG. 21C (e.g., an option selectable for displaying a soft or virtual keyboard), or one or more options for inserting emojis into the first content entry region (2230), such as option 2116-8 in FIG. 21C (e.g., an option selectable for displaying a dialog box for selecting one or more emojis for entry into the first content entry region).

In some embodiments, the options affect the visual characteristics of the representations of the handwritten input (e.g., future inputs) while the device is in the first content entry mode. In some embodiments, if text in the first content region is selected (e.g., highlighted), then the options affect the visual characteristics of the selected text. In some embodiments, the font settings includes font size, font type, bold, italics, underline, strikethrough states, color, etc. In some embodiments, a soft or virtual keyboard is a visual representation of a physical keyboard. In some embodiments, user selection of characters on the soft keyboard causes the respective characters to be entered into the first content entry region.

The above-described manner of displaying options associated with the text entry mode in the content entry user interface element (e.g., by including options specific to font-based text when the device is in text entry mode) allows the user to quickly and efficiently configure the font-based text that is entered in the content entry region, which simplifies the interaction between the user and the electronic device and enhances the operability of the electronic device and makes the user-device interface more efficient (e.g., without requiring the user to navigate to a separate user interface or perform additional inputs to change the visual characteristics of the font-based text), which additionally reduces power usage and improves battery life of the electronic device by enabling the user to use the electronic device more quickly and efficiency.

In some embodiments, the second set of options corresponding to the second content entry mode includes one or more options for selecting one or more color settings for representations of handwritten input in the first content entry region (2232), such as options 2113 in FIG. 21I (e.g., options for changing the color of the representations of handwritten input (e.g., future inputs) while the device is in the second content entry mode). In some embodiments, the options include a plurality of recently used colors. In some embodiments, the options include a plurality of predetermined commonly used colors (e.g., blue, red, green, yellow, primary colors, etc.). In some embodiments, the options include an option to display a color palette for selecting colors. In some embodiments, if content in the first content region is selected (e.g., highlighted), then the options affect the visual characteristics of the selected content.

The above-described manner of displaying options associated with drawing mode in the content entry user interface element (e.g., by including options specific to drawings when the device is in drawing mode) allows the user to quickly and efficiently configure the drawings that are entered in the content entry region, which simplifies the interaction between the user and the electronic device and enhances the operability of the electronic device and makes the user-device interface more efficient (e.g., without requiring the user to navigate to a separate user interface or perform additional inputs to change the visual characteristics of the drawings), which additionally reduces power usage and improves battery life of the electronic device by enabling the user to use the electronic device more quickly and efficiency.

In some embodiments, while displaying the content entry user interface element, the electronic device receives (2234) a user input directed to the content entry user interface element, such as in FIG. 21L (e.g., a user input selecting the content entry user interface element).

In some embodiments, in response to receiving the user input (2236), in accordance with a determination that the user input includes a selection input directed to a location corresponding to the content entry user interface element and a movement while maintaining the selection input, the electronic device moves (2238) the content entry user interface element within the user interface in accordance with the movement of the user input, such as in FIG. 21M (e.g., moving the content entry user interface element in accordance with the movement of the user input).

In some embodiments, the user input includes a contact with a manipulation affordance on the content entry user interface. In some embodiments, upon termination of the contact (e.g., lift-off), the content entry user interface element is maintained at the final location of the contact. In some embodiments, the content entry user interface element snaps to predetermined locations on the display. For example, the predetermined locations include the bottom of the display, the left side of the display, the right side of the display, or the top of the display. In some embodiments, the content entry user interface element changes its visual appearance to conform to the new location. For example, while at the top or bottom of the display, the content entry user interface element is horizontal and while at the left or right of the display, the content entry user interface element is vertical.

The above-described manner of moving the content entry user interface element (e.g., by receiving a user input selecting the content entry user interface element and dragging it to a different location) simplifies the interaction between the user and the electronic device and enhances the operability of the electronic device and makes the user-device interface more efficient (e.g., by giving the user the ability to move the content entry user interface element to reveal previously obscured portions of the user interface, without requiring the user to perform additional inputs to scroll the user interface or dismiss the content entry user interface element), which additionally reduces power usage and improves battery life of the electronic device by enabling the user to use the electronic device more quickly and efficiency.

In some embodiments, in response to moving the content entry user interface element in accordance with the movement of the user input (2240), such as in FIG. 21M (e.g., in response to a user input moving the content entry user interface element), in accordance with a determination that a final location of the content entry user interface element satisfies one or more location criteria, the electronic device displays (2242) the content entry user interface element at a first size, wherein while the content entry user interface has the first size, the content entry user interface element includes a representation of a current content entry mode without displaying a given set of options corresponding to the current content entry mode, such as in FIG. 21P (e.g., if the content entry user interface element has been moved to predetermined locations in the display, display the content entry user interface element in a "miniature" mode or a simplified mode).

In some embodiments, in response to moving the content entry user interface element in accordance with the movement of the user input, in accordance with a determination that the final location of the content entry user interface element does not satisfy the one or more location criteria, the electronic device displays (2244) the content entry user interface element at a second size, different from the first size, wherein while the content entry user interface has the second size, the content entry user interface element includes a representation of the current content entry mode and the given set of options corresponding to the current content entry mode, such as in FIG. 21O (e.g., if the final location of the content entry user interface element after moving the content entry user interface element is not at the predetermined locations on the display, display the content entry user interface element in full sized mode).

In some embodiments, the user input includes a touchdown and a movement dragging the content entry user interface element. In some embodiments, miniature or simplified mode comprises displaying a representation of the currently active content entry tool without displaying the other content entry tools and without displaying the set of options that correspond to the active content entry mode. In some embodiments, the predetermined locations in the display that cause the content entry user interface element to be displayed in miniature mode include the corners of the display (e.g., top-left, top-right, bottom-left, and bottom-right corners). In some embodiments, while the content entry user interface element is in the "miniature" mode, selection of the content entry user interface element causes the content entry user interface element to return to its default (e.g., full sized) mode.

The above-described manner of changing the size of the content entry user interface element (e.g., based on the location of the content entry user interface element) quickly and efficiently provides the user with options for inputting content while minimizing obstruction of the user interface (e.g., by allowing the user to move the content entry user interface element and miniaturize the content entry user interface element), which simplifies the interaction between the user and the electronic device and enhances the operability of the electronic device and makes the user-device interface more efficient (e.g., by automatically changing the content entry user interface element to a smaller size if the user requested to move the content entry user interface element to predetermined locations, without requiring the user to perform additional inputs to move and resize the content entry user interface element), which additionally reduces power usage and improves battery life of the electronic device by enabling the user to use the electronic device more quickly and efficiency.

In some embodiments, the electronic device includes a global setting for configuring the electronic device to accept or ignore respective handwritten input from an object (e.g., a global setting to enable or disable content insertion from a finger) other than a respective device (e.g., a stylus) while in the first content entry mode and the second content entry mode (2246), such as in FIG. 21R.

In some embodiments, enabling the global setting results in inputs from the finger being treated similar to inputs from a stylus (e.g., such as to insert handwritten inputs that are converted into font-based text or to insert drawings). In some embodiments, disabling the global setting results in inputs from the finger being treated as a navigation inputs, selection inputs, or any other input other than a content insertion input (e.g., swipe gestures are optionally treated as scrolling inputs, tap inputs are optionally treated as selection inputs, etc.).

In some embodiments, the content entry user interface element includes an option that is selectable to accept or ignore the respective handwritten input from the object other than the stylus while in the first content entry mode and the second content entry mode without regard to a state of the global setting (2248), such as toggle option 2122 in FIG. 21R (e.g., the palette includes an option such as a button or toggle switch that overrides the global setting to either disable or enable, as the case may be, finger inputs to be interpreted similar to stylus inputs with respect to interactions with content entry regions).

The above-described manner of managing handwritten inputs from a finger (e.g., by providing a global setting that can be overridden by a selectable option on the palette) provides a quick and efficient way of overriding the default response to finger inputs, which simplifies the interaction between the user and the electronic device and enhances the operability of the electronic device and makes the user-device interface more efficient (e.g., by providing the user another method to insert content, without requiring the user to switch to using a stylus or perform additional inputs and navigate to a settings user interface to toggle the global setting), which additionally reduces power usage and improves battery life of the electronic device by enabling the user to use the electronic device more quickly and efficiency.

In some embodiments, the user interface includes a second content entry region, the first content entry region supports a first set of content options, and the second content entry region supports a second set, different from the first set, of content options (2250), such as text entry region 2128 and content entry region 2130 in FIG. 21W (e.g., the content entry regions are configured such that only certain options are supported for a given content entry mode).

For example, the first content entry region is configured to only accept a particular font type or font size while the second content entry region is configured to accept any font type or font size. In such embodiments, the content entry user interface element for the first content entry region does not include an option for selecting font type or font size while the content entry user interface element for the second content entry region includes options for font type and font size, even when the device is in the first content entry mode when entering handwritten input into the first and second content entry regions.

In some embodiments, while the electronic device is in the first content entry mode (2252), the electronic device receives (2254) a user input directed to a respective content entry region, such as in FIG. 21X (e.g., a user input tapping or selecting a respective content entry region or a user input drawing in the respective content entry region).

In some embodiments, in response to receiving the user input directed to the respective content entry region (2256), the electronic device displays (2258), in the user interface, the content entry user interface element, such as in FIG. 21Y (e.g., displaying the content entry user interface element with options corresponding to the type of content entry region).

In some embodiments, in accordance with a determination that the respective content entry region is the first content entry region, the content entry user interface element includes the first set of options corresponding to the first set of content options (2260), such as in FIG. 21Y (e.g., the options displayed in the content entry user interface element for the first content entry region correspond to the content options that are supported by the first content entry region). For example, if the first content entry region is configured to not allow a user to change font settings, then the content entry user interface element does not include an option for changing font settings.

In some embodiments, in accordance with a determination that the respective content entry region is the second content entry region, the content entry user interface element includes a third set of options, different from the first set of options, corresponding to the second set of content options (2262), such as in FIG. 21AA (e.g., the options displayed in the content entry user interface element for the second content entry region correspond to the content options that are supported by the second content entry region).

For example, if the second content entry region is configured to allow a user to change font settings, then the content entry user interface element includes option(s) for changing font settings. Thus, in some embodiments, the options included in the content entry user interface element depend on the type of content entry region that the user is inputting content into (e.g., the content entry region that has focus or the content entry region that the user has most recently interacted with or is currently interacting with). In response to the user input directed to the respective content entry region, content is inserted into the respective content entry region in accordance with the user input. For example, in some embodiments, if the user begins drawing in the respective content entry region, the palette is displayed and representations of the user's drawing is displayed in the respective content entry region.

The above-described manner of configuring the options displayed on the content entry user interface element based on the content entry region (e.g., by displaying options that are supported by the content entry region and not displaying options that are not supported by the content entry region) quickly and efficiently provides the user with options that are supported (e.g., by automatically determining what options are supported by the respective content entry region and not displaying options that are not supported), which simplifies the interaction between the user and the electronic device and enhances the operability of the electronic device and makes the user-device interface more efficient (e.g., by not providing the user with options that are inoperable or not supported), which additionally reduces power usage and improves battery life of the electronic device by enabling the user to use the electronic device more quickly and efficiency, while reducing errors in the usage of the device.

In some embodiments, while displaying the user interface including the first content entry region, wherein the first content entry region supports content entry in the first content entry mode and the second content entry mode (e.g., the first content entry region accepts font-based text and drawings such that the first content entry region accepts inputs while in the text entry mode and drawing mode), the electronic device receives (2264) a user input directed to the first content entry region, such as in FIG. 21BB. In some embodiments, different content entry regions can be configured to accept different types of content such that certain content entry modes are disabled.

In some embodiments, in response to the user input directed to the first content entry region, the electronic device displays (2266), in the user interface, the content entry user interface element, such as in FIG. 21CC. In some embodiments, in accordance with a determination that the first content entry region does not include font-based text, the content entry user interface element includes a respective set of options corresponding to a most recently used content entry mode in the first content entry region (2268), such as in FIG. 21DD (e.g., if the content entry region does not include any font-based text (e.g., either entered via a keyboard, a soft keyboard, or handwriting input while using a text entry tool), then the default content entry tool that is selected is the most recently used content entry tool).

In some embodiments, the most recently used content entry tool is the global most recently used content entry tool (e.g., across any content entry region and/or across any application). In some embodiments, the most recently used content entry is the most recently used content entry tool for the first content entry region. In some embodiments, the content entry user interface element includes the set of options corresponding to the content entry tool that is selected. In some embodiments, if the content entry region does not include any font-based text, then the device is configured to operate in the most recently used content entry mode and the content entry user interface element includes the options corresponding to the most recently used content entry mode. For example, if the user previously selected a pencil tool for inserting a pencil styled drawing in a respective content entry region and then dismisses the content entry user interface element, then the next time the user causes display of the content entry user interface element (e.g., causes to be displayed, such as in response to detection of handwritten input directed to the respective content entry region), the pencil tool is automatically selected and the set of options in the content entry user interface element correspond to the pencil tool. In another example, if the user previously selected a marker tool for inserting a marker styled drawing in a first content entry region, dismisses the content entry user interface element, and then displays the content entry user interface element for a second content entry region, then the marker tool is automatically selected and the set of options in the content entry user interface element correspond to the marker tool. In a third example, if a user inserts font-based text in a respective content entry region (e.g., using a virtual keyboard, a physical keyboard, the text entry tool, or any other text insertion function), selects the highlighter tool, and then dismisses the content entry user interface element, then the next time the user displays the content entry user interface element, the text entry tool is automatically selected even though the previously selected tool was the highlighter tool, because the respective content entry region has font-based text. In some embodiments, the tool that is automatically selected when the content entry user interface element is displayed dictates the content entry mode in which the device is configured. For example, if the automatically selected tool is the text entry tool, then the device is configured to operate in the handwriting text entry mode. In another example, if the automatically selected tool is the pencil tool, then the device is configured to operate in the pencil content entry mode. In some embodiments, if the device was configured to operate in a different mode before receiving the user input, then in response to the user input, the device switches to operating in the mode based on the automatically selected tool.

The above-described manner of displaying options associated with the most recently used content entry tool (e.g., if the content entry region does not include any font-based font) quickly and efficiently provides the user with options that the user is most likely to use, which simplifies the interaction between the user and the electronic device and enhances the operability of the electronic device and makes the user-device interface more efficient (e.g., by automatically configuring the device in the content entry mode that the user has most recently used, without requiring the user to perform additional inputs to switch to the desired content entry mode), which additionally reduces power usage and improves battery life of the electronic device by enabling the user to use the electronic device more quickly and efficiency.

In some embodiments, in accordance with a determination that the first content entry region includes font-based text, the content entry user interface element includes the first set of options corresponding to the first content entry mode (2270), such as in FIG. 21CC (e.g., if the content entry region includes font-based text, then the content entry tool that is selected is the text entry tool).

In some embodiments, if the content entry region includes font-based text, then the device is configured (e.g., upon touchdown detected in the content entry region) to operate in the first content entry mode (e.g., text entry mode). In some embodiments, the content entry user interface element includes the first set of options corresponding to the text entry tool. In some embodiments, in response to the user input, because the automatically selected tool is the content entry tool, the device is configured to operate in a respective content entry mode.

The above-described manner of displaying options associated with the text entry tool (e.g., if the content entry region includes font-based font) quickly and efficiently provides the user with options that the user is most likely to use (e.g., the user is likely to enter text due to the content entry region already including font-based font), which simplifies the interaction between the user and the electronic device and enhances the operability of the electronic device and makes the user-device interface more efficient (e.g., by automatically configuring the device in text entry mode, without requiring the user to perform additional inputs to switch to the desired content entry mode), which additionally reduces power usage and improves battery life of the electronic device by enabling the user to use the electronic device more quickly and efficiency.

In some embodiments, displaying the content entry user interface element (2272), such as in FIG. 21CC includes: in accordance with a determination that the user interface is a user interface of a first application, including a first option in the first set of options (2274), such as in FIG. 21CC (e.g., applications can be configured to support different sets of options for their respective content entry regions). For example, for a particular type of content entry region, a first application may allow the user to select all possible colors while a second application restricts the user from being able to select colors. Thus, in some embodiments, if the user interface is a user interface of the first application, then an option for selecting the color of content entered into the first content entry region is included in the options displayed for the first content entry region.

In some embodiments, displaying the content entry user interface element includes: in accordance with a determination that the user interface is a user interface of a second application, different from the first application, including a second option in the first set of options without including the first option in the first set of options (2276), such as in FIG.

21Y (e.g., a second option, different from the first option, is included in the set of options displayed in the content entry user interface element and the option for selecting the color of content entered into the first content entry region is not included in the options displayed in the content entry user interface element, regardless of the fact that the content entry region for the first application and the second application both support the same types of content (font-based text and drawings, in this example)).

In some embodiments, the options that are displayed in the content entry user interface element for a respective application is customized by the developer of the respective application. For example, a developer is able to add or remove options and/or tools from the default or standard list of options and/or tools. In some embodiments, a developer is able to customize the tools for all content entry regions in the respective application or customize the tools for each content entry region in the respective application individually.

The above-described manner of displaying options based on the application (e.g., by displaying options that the respective application is configured to allow) quickly and efficiently provides the user with options that are supported by the respective application (e.g., without providing the user with options that are inoperable or unsupported), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the user interface is a user interface of a first application (2278), such as user interface 2100 in FIG. 21W. In some embodiments, while displaying, via the display generation component, the user interface including the first content entry region (2280), such as in FIG. 21W, the electronic device displays (2282), via the display generation component, a second user interface of a second application, wherein the second user interface includes a second content entry region, such as user interface 2102 in FIG. 21W (e.g., concurrently displaying two user interfaces on the display). In some embodiments, the electronic device is in a multi-tasking mode and the two user interfaces are of the same application (e.g., two instances or windows of the same application), or the two user interfaces are user interfaces for two different applications.

In some embodiments, while displaying the user interface and the second user interface, the electronic device receives (2284) a user input, such as in FIG. 21X. In some embodiments, in response to receiving the user input (2286), in accordance with a determination that the user input is directed to the first content entry region, the electronic device displays (2288) the content entry user interface element at a first location corresponding to the first application, such as in FIG. 21CC (e.g., if the user selects a content entry region of the first user interface, the content entry user interface element is displayed at a location based on the first application). For example, if the user interface of the first application is displayed on the right half of the display, then the content entry user interface element is displayed on the right half of the display and/or centered on the first application.

In some embodiments, in response to receiving the user input, in accordance with a determination that the user input is directed to the second content entry region, the electronic device displays (2290) the content entry user interface element at a second location, different from the first location, corresponding to the second application, such as in FIG. 21Y (e.g., if the user selects a content entry region of the second user interface, the content entry user interface element is displayed at a location based on the second application).

For example, if the user interface of the second application is displayed on the left half of the display, then the content entry user interface element is displayed on the left half of the display and/or centered on the second application. In some embodiments, if the size of the user interface is not the full size of the display, the content entry user interface element is displayed with a size other than full sized and with a set of options other than the full set of options corresponding to the active content entry mode. For example, if the first user interface is 25% of the width of the display (e.g., the second user interface is 75% of the width of the display), then the content entry user interface element displayed for the first user interface is optionally smaller than full size (e.g., 25%, 33%, 50%, 66% of full size, etc.) and one or more options are not displayed in the content entry user interface element. In some embodiments, the one or more options that are not displayed in the content entry user interface element are displayed in a sub-menu that is displayed in response to selection of an option in the content entry user interface element (e.g., one or more options that cannot fit in the content entry user interface element are moved into a sub-menu that is accessible from the content entry user interface element).

The above-described manner of displaying the content entry user interface element (e.g., centered on the application with the content entry region that the user is entering content into) quickly and efficiently indicates to the which user interface the content entry user interface element is associated with (e.g., by placing the content entry user interface element closer to the relevant application and further away from the application into which the user is not inserting content), which simplifies the interaction between the user and the electronic device and enhances the operability of the electronic device and makes the user-device interface more efficient (e.g., by reducing erroneous inputs to the wrong user interface), which additionally reduces power usage and improves battery life of the electronic device by enabling the user to use the electronic device more quickly and efficiency, while reducing errors in the usage of the device.

It should be understood that the particular order in which the operations in FIGS. 22A-22J have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1500, 1600, 1800, and 2000) are also applicable in an analogous manner to method 2200 described above with respect to FIGS. 22A-22J. For example, the operations of displaying options in a content entry palette described above with reference to method 2200 optionally have one or more of the characteristics of the acceptance and/or conversion of handwritten inputs, selection and deletion of text, inserting handwritten inputs into pre-existing text, managing the timing of converting handwritten text into font-based text, presenting handwritten entry menus, controlling the characteristics of handwritten input, and presenting autocomplete suggestions, converting handwritten input to font-based text, etc., described herein with reference to other methods described herein (e.g., methods 700, 900, 1100, 1300, 1500, 1600, 1800, and 2000). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 22A-22J are, optionally, implemented by components depicted in FIGS. 1A-1B. For example, displaying operations 2202, 2212, 2218, 2222, 2242, 2244, 2258, 2266, 2272, 2282, 2288, and 2290 and receiving operations 2204, 2210, 2220, 2234, 2254, 2264, and 2284 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology potentially involves the gathering and use of data available from specific and legitimate sources to facilitate the streaming of content from one electronic device to another. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information, usage history, handwriting styles, etc.

The present disclosure recognizes that the use of such personal information data, in the present technology, can be used to the benefit of users. For example, the personal information data can be used to automatically perform operations with respect to interacting with the electronic device using a stylus (e.g., recognition of handwriting as text). Accordingly, use of such personal information data enables users to enter fewer inputs to perform an action with respect to handwriting inputs. Further, other uses for personal information data that benefit the user are also contemplated by the present disclosure. For instance, handwriting styles may be used to generate suggested font-based text for the user.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the user is able to configure one or more electronic devices to change the discovery or privacy settings of the electronic device. For example, the user can select a setting that only allows an electronic device to access certain of the user's handwriting entry history when providing autocomplete suggestions.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, handwriting can be recognized based on aggregated non-personal information data or a bare minimum amount of personal information, such as the handwriting being handled only on the user's device or other non-personal information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:

at an electronic device in communication with a touch-sensitive display:

displaying, on the touch-sensitive display, a user interface including a first text entry region;

while displaying the user interface, receiving, via the touch-sensitive display, a user input comprising a handwritten input directed to the first text entry region;

while receiving the user input, displaying a representation of the handwritten input in the user interface at a location corresponding to the first text entry region;

after displaying the representation of the handwritten input in the user interface:

in accordance with a determination that the user input satisfies one or more first criteria, ceasing to display at least a portion of the representation of the handwritten input and displaying font-based text corresponding to the at least the portion of the representation of the handwritten input in the first text entry region, wherein the at least the portion of the representation of the handwritten input includes a first portion that is inside a boundary of the first text entry region; and in accordance with a determination that the user input does not satisfy the one or more first criteria, maintaining display of the representation of the handwritten input without displaying the font-based text in the first text entry region;

receiving, via the touch-sensitive display, a second user input comprising a handwritten input directed to a second region, different from the first text entry region, in the user interface outside of the first text entry region; and after receiving the second user input:

in accordance with a determination that the second user input satisfies one or more second criteria, including a criterion that is satisfied when the second user input is detected within a time threshold of the user input, displaying font-based text corresponding to the second user input in the first text entry region; and in accordance with a determination that the second user input does not satisfy the one or more second criteria, forgo displaying font-based text corresponding to the second user input in the first text entry region.

2. The method of claim 1, wherein displaying the font-based text corresponding to the at least the portion of the representation of the handwritten input in the first text entry region occurs while continuing to receive the handwritten input.

3. The method of claim 1, wherein displaying the font-based text corresponding to the at least the portion of the representation of the handwritten input in the first text entry region occurs in response to detecting a pause for longer than a time threshold in the handwritten input.

4. The method of claim 1, further comprising:

after displaying the representation of the handwritten input in the user interface, concurrently displaying, on the touch-sensitive display:

at least the portion of the representation of the handwritten input; and a selectable option corresponding to the font-based text corresponding to the at least the portion of the representation of the handwritten input, wherein ceasing to display the at least the portion of the representation of the handwritten input and displaying the font-based text corresponding to the at least the portion of the representation of the handwritten input in the first text entry region occurs in response to detecting selection of the selectable option.

5. The method of claim 1, wherein the first text entry region comprises a text entry field.

6. The method of claim 1, wherein handwritten input detected within a margin of error region, larger than the first text entry region and surrounding the first text entry region, is eligible to be converted to font-based text in the first text entry region, and handwritten input detected outside of the margin of error region is not eligible to be converted to font-based text in the first text entry region.

7. The method of claim 1, wherein the second region is a second text entry region, the method further comprising:

after receiving the second user input:

in accordance with the determination that the second user input does not satisfy the one or more second criteria, displaying font-based text corresponding to the second user input in the second text entry region.

8. The method of claim 7, wherein the one or more second criteria include a criterion that is satisfied when a majority of the second user input is directed to the first text entry region rather than the second text entry region, and is not satisfied when the majority of the second user input is directed to the second text entry region rather than the first text entry region.

9. The method of claim 1, wherein displaying the font-based text corresponding to the at least the portion of the representation of the handwritten input in the first text entry region includes:

after detecting the font-based text corresponding to the at least the portion of the representation of the handwritten input but before committing the font-based text the first text entry region, displaying the font-based text with a first value for a visual characteristic; and after committing the font-based text to the first text entry region, displaying the font-based text with a second value, different than the first value, for the visual characteristic.

10. The method of claim 9, wherein displaying the font-based text corresponding to the at least the portion of the representation of the handwritten input in the first text entry region includes:

in accordance with a determination that the detection of the font-based text has a first confidence level, displaying the font-based text with a first value for a respective visual characteristic; and in accordance with a determination that the detection of the font-based text has a second confidence level, different than the first confidence level, displaying the font-based text with a second value, different than the first value, for the respective visual characteristic.

11. The method of claim 9, wherein displaying the font-based text corresponding to the at least the portion of the representation of the handwritten input in the first text entry region includes:

in accordance with a determination that the detection of the font-based text has a first confidence level, displaying the font-based text at a first location in the first text entry region; and in accordance with a determination that the detection of the font-based text has a second confidence level, different than the first confidence level, displaying the font-based text at a second location, different than the first location, in the first text entry region.

12. The method of claim 1, wherein the one or more first criteria include one or more criteria that are satisfied based on timing characteristics of the handwritten input, context associated with the handwritten input, punctuation in the handwritten input, distance of a stylus from the touch-sensitive display, input directed to a second text entry region in the user interface, input scrolling the user interface, angle of a stylus, distance of the handwritten input from an edge of the first text entry region, a gesture detected on a stylus, or input from a finger detected on the touch-sensitive display.

13. The method of claim 1, further comprising:

while receiving the user input, in accordance with a determination that one or more second criteria are satisfied, moving at least a portion of the representation of the handwritten input in the user interface to reveal space in the user interface for receiving additional handwritten input.

14. The method of claim 13, further comprising:

while receiving the user input, in accordance with a determination that one or more third criteria are satisfied, expanding the boundary of the first text entry region to create space in the first text entry region for receiving additional handwritten input.

15. The method of claim 14, wherein expanding the boundary of the first text entry region includes:

in accordance with a determination that the first text entry region is at a first location in the user interface, expanding a first boundary of the first text entry region; and in accordance with a determination that the first text entry region is at a second location, different than the first location, in the user interface, expanding a second boundary of the first text entry region without expanding the first boundary of the first text entry region.

16. The method of claim 1, wherein displaying the representation of the handwritten input in the user interface while receiving the user input includes displaying an animation of one or more visual characteristics of the representation of the handwritten input changing as a function of elapsed time since the corresponding handwritten input was received.

17. The method of claim 1, wherein ceasing to display the at least the portion of the representation of the handwritten input and displaying the font-based text corresponding to the at least the portion of the representation of the handwritten input in the first text entry region includes displaying an animation of the representation of the handwritten input morphing into the font-based text.

18. The method of claim 17, wherein the animation of the representation of the handwritten input morphing into the font-based text includes:

in accordance with a determination that the first text entry region does not yet include font-based text, animating the representation of the handwritten input morphing into font-based text at a final location in the first text entry region and at a final size at which the font-based text is going to be displayed.

19. The method of claim 17, wherein the animation of the representation of the handwritten input morphing into the font-based text includes:

in accordance with a determination that the first text entry region does not yet include font-based text, animating the representation of the handwritten input morphing into font-based text at an intermediate size based on a size of the representation of the handwritten input, and subsequently animating the font-based text at the intermediate size morphing into font-based text at a final location in the first text entry region and at a final size, different than the intermediate size, at which the font-based text is going to be displayed.

20. The method of claim 17, wherein the animation of the representation of the handwritten input morphing into the font-based text includes:

in accordance with a determination that the first text entry region does include previously-entered font-based text, animating the representation of the handwritten input morphing into font-based text at an intermediate size based on a size of the representation of the handwritten input, and subsequently animating the font-based text at the intermediate size morphing into font-based text at a final location in the first text entry region and at a final size, different than the intermediate size, at which the font-based text is going to be displayed, wherein the final size of the font-based text corresponding to the handwritten input is the same as a size of the previously-entered font-based text.

21. The method of claim 1, wherein the at least the portion of the handwritten input corresponds to font-based text that includes a typographical error, and displaying the font-based text corresponding to the at least the portion of the representation of the handwritten input in the first text entry region includes displaying the font-based text with the typographical error having been corrected.

22. The method of claim 1, further comprising:

after displaying the representation of the handwritten input in the user interface:

in accordance with the determination that the user input satisfies one or more first criteria:

transmitting the font-based text corresponding to the at least the portion of the representation of the handwritten input to a second electronic device, separate from the electronic device.

23. The method of claim 22, wherein the second electronic device is displaying a user interface that includes one or more respective text entry regions, including a respective text entry region that corresponds to the first text entry region displayed by the electronic device, the method further comprising:

detecting, at the electronic device, the one or more respective text entry regions displayed by the second electronic device; and in response to detecting the one or more respective text entry regions displayed by the second electronic device, displaying, in the user interface, one or more text entry regions, including the first text entry region, corresponding to the one or more respective text entry regions, wherein transmitting the font-based text corresponding to the at least the portion of the representation of the handwritten input to the second electronic device includes transmitting the font-based text to the respective text entry region on the second electronic device.

24. The method of claim 1, wherein the first text entry region is a multi-line text entry region, and the font-based text corresponding to the at least the portion of the representation of the handwritten input is displayed in a first line of the multi-line text entry region, the method further comprising:

while displaying the font-based text corresponding to the at least the portion of the representation of the handwritten input in the first line of the multi-line text entry region, receiving, via the touch-sensitive display, a second user input comprising a handwritten input directed to the first text entry region; and after receiving the second user input:

in accordance with a determination that one or more second criteria are satisfied, displaying font-based text corresponding to the second user input in a second line, different than the first line, of the multi-line text entry region; and in accordance with a determination that the one or more second criteria are not satisfied, displaying the font-based text corresponding to the second user input in the first line of the multi-line text entry region.

25. The method of claim 24, wherein the one or more second criteria are satisfied when the second user input is detected more than a threshold distance below the user input, and the one or more second criteria are not satisfied when the second user input is detected less than the threshold distance below the user input.

26. The method of claim 24, wherein the one or more second criteria are satisfied when the second user input includes a stylus input detected at the second line in the multi-line text entry region, and the one or more second criteria are not satisfied when the second user input does not include a stylus input detected at the second line in the multi-line text entry region.

27. The method of claim 24, wherein a selectable option for moving to the second line is displayed concurrently with the font-based text corresponding to the at least the portion of the representation of the handwritten input, the one or more second criteria are satisfied when the selectable option has been selected, and the one or more second criteria are not satisfied when the selectable option has not been selected.

28. The method of claim 1, further comprising:

receiving, via the touch-sensitive display, a second user input; and in response to receiving the second user input:

in accordance with a determination that the second user input is detected in a region of the user interface corresponding to a respective text entry region, performing a handwritten input operation in the respective text entry region based on the second user input; and in accordance with a determination that the second user input is detected in a region of the user interface not corresponding to a text entry region, performing a scrolling operation in the user interface based on the second user input.

29. An electronic device, comprising:

one or more processors;

memory; and one or more programs, wherein the one or more programs are stored in the memory and configured to be executed by the one or more processors, the one or more programs including instructions for:

displaying, on a touch-sensitive display in communication with the electronic device, a user interface including a first text entry region;

while displaying the user interface, receiving, via the touch-sensitive display, a user input comprising a handwritten input directed to the first text entry region;

while receiving the user input, displaying a representation of the handwritten input in the user interface at a location corresponding to the first text entry region;

after displaying the representation of the handwritten input in the user interface:

in accordance with a determination that the user input satisfies one or more first criteria, ceasing to display at least a portion of the representation of the handwritten input and displaying font-based text corresponding to the at least the portion of the representation of the handwritten input in the first text entry region, wherein the at least the portion of the representation of the handwritten input includes a first portion that is inside a boundary of the first text entry region; and in accordance with a determination that the user input does not satisfy the one or more first criteria, maintaining display of the representation of the handwritten input without displaying the font-based text in the first text entry region;

receiving, via the touch-sensitive display, a second user input comprising a handwritten input directed to a second region in the user interface, different from the first text entry region, outside of the first text entry region; and after receiving the second user input:

in accordance with a determination that the second user input satisfies one or more second criteria, including a criterion that is satisfied when the second user input is detected within a time threshold of the user input, displaying font-based text corresponding to the second user input in the first text entry region; and in accordance with a determination that the second user input does not satisfy the one or more second criteria, forgo displaying font-based text corresponding to the second user input in the first text entry region.

30. A non-transitory computer readable storage medium storing one or more programs, the one or more programs comprising instructions, which when executed by one or more processors of an electronic device, cause the electronic device to perform a method comprising:

displaying, on a touch-sensitive display in communication with the electronic device, a user interface including a first text entry region;

while displaying the user interface, receiving, via the touch-sensitive display, a user input comprising a handwritten input directed to the first text entry region;

while receiving the user input, displaying a representation of the handwritten input in the user interface at a location corresponding to the first text entry region;

after displaying the representation of the handwritten input in the user interface:

in accordance with a determination that the user input satisfies one or more first criteria, ceasing to display at least a portion of the representation of the handwritten input and displaying font-based text corresponding to the at least the portion of the representation of the handwritten input in the first text entry region, wherein the at least the portion of the representation of the handwritten input includes a first portion that is inside a boundary of the first text entry region; and in accordance with a determination that the user input does not satisfy the one or more first criteria, maintaining display of the representation of the handwritten input without displaying the font-based text in the first text entry region;

receiving, via the touch-sensitive display, a second user input comprising a handwritten input directed to a second region in the user interface, different from the first text entry region, outside of the first text entry region; and after receiving the second user input:

in accordance with a determination that the second user input satisfies one or more second criteria, including a criterion that is satisfied when the second user input is detected within a time threshold of the user input, displaying font-based text corresponding to the second user input in the first text entry region; and in accordance with a determination that the second user input does not satisfy the one or more second criteria, forgo displaying font-based text corresponding to the second user input in the first text entry region.

31. The electronic device of claim 29, wherein displaying the font-based text corresponding to the at least the portion of the representation of the handwritten input in the first text entry region occurs while continuing to receive the handwritten input.

32. The electronic device of claim 29, wherein displaying the font-based text corresponding to the at least the portion of the representation of the handwritten input in the first text entry region occurs in response to detecting a pause for longer than a time threshold in the handwritten input.

33. The electronic device of claim 29, the instructions further comprising:

after displaying the representation of the handwritten input in the user interface, concurrently displaying, on the touch-sensitive display:

at least the portion of the representation of the handwritten input; and a selectable option corresponding to the font-based text corresponding to the at least the portion of the representation of the handwritten input, wherein ceasing to display the at least the portion of the representation of the handwritten input and displaying the font-based text corresponding to the at least the portion of the representation of the handwritten input in the first text entry region occurs in response to detecting selection of the selectable option.

34. The electronic device of claim 29, wherein the first text entry region comprises a text entry field.

35. The electronic device of claim 29, wherein handwritten input detected within a margin of error region, larger than the first text entry region and surrounding the first text entry region, is eligible to be converted to font-based text in the first text entry region, and handwritten input detected outside of the margin of error region is not eligible to be converted to font-based text in the first text entry region.

36. The electronic device of claim 29, wherein the second region is a second text entry region, the instructions further comprising:

after receiving the second user input:

in accordance with the determination that the second user input does not satisfy the one or more second criteria, displaying font-based text corresponding to the second user input in the second text entry region.

37. The electronic device of claim 36, wherein the one or more second criteria include a criterion that is satisfied when a majority of the second user input is directed to the first text entry region rather than the second text entry region, and is not satisfied when the majority of the second user input is directed to the second text entry region rather than the first text entry region.

38. The electronic device of claim 29, wherein displaying the font-based text corresponding to the at least the portion of the representation of the handwritten input in the first text entry region includes:

after detecting the font-based text corresponding to the at least the portion of the representation of the handwritten input but before committing the font-based text the first text entry region, displaying the font-based text with a first value for a visual characteristic; and after committing the font-based text to the first text entry region, displaying the font-based text with a second value, different than the first value, for the visual characteristic.

39. The electronic device of claim 38, wherein displaying the font-based text corresponding to the at least the portion of the representation of the handwritten input in the first text entry region includes:

in accordance with a determination that the detection of the font-based text has a first confidence level, displaying the font-based text with a first value for a respective visual characteristic; and in accordance with a determination that the detection of the font-based text has a second confidence level, different than the first confidence level, displaying the font-based text with a second value, different than the first value, for the respective visual characteristic.

40. The electronic device of claim 38, wherein displaying the font-based text corresponding to the at least the portion of the representation of the handwritten input in the first text entry region includes:

in accordance with a determination that the detection of the font-based text has a first confidence level, displaying the font-based text at a first location in the first text entry region; and in accordance with a determination that the detection of the font-based text has a second confidence level, different than the first confidence level, displaying the font-based text at a second location, different than the first location, in the first text entry region.

41. The electronic device of claim 29, wherein the one or more first criteria include one or more criteria that are satisfied based on timing characteristics of the handwritten input, context associated with the handwritten input, punctuation in the handwritten input, distance of a stylus from the touch-sensitive display, input directed to a second text entry region in the user interface, input scrolling the user interface, angle of a stylus, distance of the handwritten input from an edge of the first text entry region, a gesture detected on a stylus, or input from a finger detected on the touch-sensitive display.

42. The electronic device of claim 29, the instructions further comprising:

while receiving the user input, in accordance with a determination that one or more second criteria are satisfied, moving at least a portion of the representation of the handwritten input in the user interface to reveal space in the user interface for receiving additional handwritten input.

43. The electronic device of claim 42, further comprising:

while receiving the user input, in accordance with a determination that one or more third criteria are satisfied, expanding the boundary of the first text entry region to create space in the first text entry region for receiving additional handwritten input.

44. The electronic device of claim 43, wherein expanding the boundary of the first text entry region includes:

in accordance with a determination that the first text entry region is at a first location in the user interface, expanding a first boundary of the first text entry region; and in accordance with a determination that the first text entry region is at a second location, different than the first location, in the user interface, expanding a second boundary of the first text entry region without expanding the first boundary of the first text entry region.

45. The electronic device of claim 29, wherein displaying the representation of the handwritten input in the user interface while receiving the user input includes displaying an animation of one or more visual characteristics of the representation of the handwritten input changing as a function of elapsed time since the corresponding handwritten input was received.

46. The electronic device of claim 29, wherein ceasing to display the at least the portion of the representation of the handwritten input and displaying the font-based text corresponding to the at least the portion of the representation of the handwritten input in the first text entry region includes displaying an animation of the representation of the handwritten input morphing into the font-based text.

47. The electronic device of claim 46, wherein the animation of the representation of the handwritten input morphing into the font-based text includes:

in accordance with a determination that the first text entry region does not yet include font-based text, animating the representation of the handwritten input morphing into font-based text at a final location in the first text entry region and at a final size at which the font-based text is going to be displayed.

48. The electronic device of claim 46, wherein the animation of the representation of the handwritten input morphing into the font-based text includes:

in accordance with a determination that the first text entry region does not yet include font-based text, animating the representation of the handwritten input morphing into font-based text at an intermediate size based on a size of the representation of the handwritten input, and subsequently animating the font-based text at the intermediate size morphing into font-based text at a final location in the first text entry region and at a final size, different than the intermediate size, at which the font-based text is going to be displayed.

49. The electronic device of claim 46, wherein the animation of the representation of the handwritten input morphing into the font-based text includes:

in accordance with a determination that the first text entry region does include previously-entered font-based text, animating the representation of the handwritten input morphing into font-based text at an intermediate size based on a size of the representation of the handwritten input, and subsequently animating the font-based text at the intermediate size morphing into font-based text at a final location in the first text entry region and at a final size, different than the intermediate size, at which the font-based text is going to be displayed, wherein the final size of the font-based text corresponding to the handwritten input is the same as a size of the previously-entered font-based text.

50. The electronic device of claim 29, wherein the at least the portion of the handwritten input corresponds to font-based text that includes a typographical error, and displaying the font- based text corresponding to the at least the portion of the representation of the handwritten input in the first text entry region includes displaying the font-based text with the typographical error having been corrected.

51. The electronic device of claim 29, the instructions further comprising:

after displaying the representation of the handwritten input in the user interface:

in accordance with the determination that the user input satisfies one or more first criteria:

transmitting the font-based text corresponding to the at least the portion of the representation of the handwritten input to a second electronic device, separate from the electronic device.

52. The electronic device of claim 51, wherein the second electronic device is displaying a user interface that includes one or more respective text entry regions, including a respective text entry region that corresponds to the first text entry region displayed by the electronic device, the instructions further comprising:

detecting, at the electronic device, the one or more respective text entry regions displayed by the second electronic device; and in response to detecting the one or more respective text entry regions displayed by the second electronic device, displaying, in the user interface, one or more text entry regions, including the first text entry region, corresponding to the one or more respective text entry regions, wherein transmitting the font-based text corresponding to the at least the portion of the representation of the handwritten input to the second electronic device includes transmitting the font-based text to the respective text entry region on the second electronic device.

53. The electronic device of claim 29, wherein the first text entry region is a multi-line text entry region, and the font-based text corresponding to the at least the portion of the representation of the handwritten input is displayed in a first line of the multi-line text entry region, the instructions further comprising:

while displaying the font-based text corresponding to the at least the portion of the representation of the handwritten input in the first line of the multi-line text entry region, receiving, via the touch-sensitive display, a second user input comprising a handwritten input directed to the first text entry region; and after receiving the second user input:

in accordance with a determination that one or more second criteria are satisfied, displaying font-based text corresponding to the second user input in a second line, different than the first line, of the multi-line text entry region; and in accordance with a determination that the one or more second criteria are not satisfied, displaying the font-based text corresponding to the second user input in the first line of the multi-line text entry region.

54. The electronic device of claim 53, wherein the one or more second criteria are satisfied when the second user input is detected more than a threshold distance below the user input, and the one or more second criteria are not satisfied when the second user input is detected less than the threshold distance below the user input.

55. The electronic device of claim 53, wherein the one or more second criteria are satisfied when the second user input includes a stylus input detected at the second line in the multi-line text entry region, and the one or more second criteria are not satisfied when the second user input does not include a stylus input detected at the second line in the multi-line text entry region.

56. The electronic device of claim 53, wherein a selectable option for moving to the second line is displayed concurrently with the font-based text corresponding to the at least the portion of the representation of the handwritten input, the one or more second criteria are satisfied when the selectable option has been selected, and the one or more second criteria are not satisfied when the selectable option has not been selected.

57. The electronic device of claim 29, the instructions further comprising:
receiving, via the touch-sensitive display, a second user input; and
in response to receiving the second user input:
in accordance with a determination that the second user input is detected in a region of the user interface corresponding to a respective text entry region, performing a handwritten input operation in the respective text entry region based on the second user input; and
in accordance with a determination that the second user input is detected in a region of the user interface not corresponding to a text entry region, performing a scrolling operation in the user interface based on the second user input.

58. The non-transitory computer readable storage medium of claim 30, wherein displaying the font-based text corresponding to the at least the portion of the representation of the handwritten input in the first text entry region occurs while continuing to receive the handwritten input.

59. The non-transitory computer readable storage medium of claim 30, wherein displaying the font-based text corresponding to the at least the portion of the representation of the handwritten input in the first text entry region occurs in response to detecting a pause for longer than a time threshold in the handwritten input.

60. The non-transitory computer readable storage medium of claim 30, the method further comprising:
after displaying the representation of the handwritten input in the user interface, concurrently displaying, on the touch-sensitive display:
at least the portion of the representation of the handwritten input; and
a selectable option corresponding to the font-based text corresponding to the at least the portion of the representation of the handwritten input,
wherein ceasing to display the at least the portion of the representation of the handwritten input and displaying the font-based text corresponding to the at least the portion of the representation of the handwritten input in the first text entry region occurs in response to detecting selection of the selectable option.

61. The non-transitory computer readable storage medium of claim 30, wherein the first text entry region comprises a text entry field.

62. The non-transitory computer readable storage medium of claim 30, wherein handwritten input detected within a margin of error region, larger than the first text entry region and surrounding the first text entry region, is eligible to be converted to font-based text in the first text entry region, and handwritten input detected outside of the margin of error region is not eligible to be converted to font-based text in the first text entry region.

63. The non-transitory computer readable storage medium of claim 30, wherein the second region is a second text entry region, the method further comprising:
after receiving the second user input:
in accordance with the determination that the second user input does not satisfy the one or more second criteria, displaying font-based text corresponding to the second user input in the second text entry region.

64. The non-transitory computer readable storage medium of claim 63, wherein the one or more second criteria include a criterion that is satisfied when a majority of the second user input is directed to the first text entry region rather than the second text entry region, and is not satisfied when the majority of the second user input is directed to the second text entry region rather than the first text entry region.

65. The non-transitory computer readable storage medium of claim 30, wherein displaying the font-based text corresponding to the at least the portion of the representation of the handwritten input in the first text entry region includes:
after detecting the font-based text corresponding to the at least the portion of the representation of the handwritten input but before committing the font-based text the first text entry region, displaying the font-based text with a first value for a visual characteristic; and
after committing the font-based text to the first text entry region, displaying the font-based text with a second value, different than the first value, for the visual characteristic.

66. The non-transitory computer readable storage medium of claim 65, wherein displaying the font-based text corresponding to the at least the portion of the representation of the handwritten input in the first text entry region includes:
in accordance with a determination that the detection of the font-based text has a first confidence level, displaying the font-based text with a first value for a respective visual characteristic; and
in accordance with a determination that the detection of the font-based text has a second confidence level, different than the first confidence level, displaying the font-based text with a second value, different than the first value, for the respective visual characteristic.

67. The non-transitory computer readable storage medium of claim 65, wherein displaying the font-based text corresponding to the at least the portion of the representation of the handwritten input in the first text entry region includes:
in accordance with a determination that the detection of the font-based text has a first confidence level, displaying the font-based text at a first location in the first text entry region; and
in accordance with a determination that the detection of the font-based text has a second confidence level, different than the first confidence level, displaying the font-based text at a second location, different than the first location, in the first text entry region.

68. The non-transitory computer readable storage medium of claim 30, wherein the one or more first criteria include one or more criteria that are satisfied based on timing characteristics of the handwritten input, context associated with the handwritten input, punctuation in the handwritten input, distance of a stylus from the touch-sensitive display, input directed to a second text entry region in the user interface, input scrolling the user interface, angle of a stylus, distance of the handwritten input from an edge of the first text entry region, a gesture detected on a stylus, or input from a finger detected on the touch-sensitive display.

69. The non-transitory computer readable storage medium of claim 30, the method further comprising:
while receiving the user input, in accordance with a determination that one or more second criteria are satisfied, moving at least a portion of the representation of the handwritten input in the user interface to reveal space in the user interface for receiving additional handwritten input.

70. The non-transitory computer readable storage medium of claim 69, the method further comprising:

while receiving the user input, in accordance with a determination that one or more third criteria are satisfied, expanding the boundary of the first text entry region to create space in the first text entry region for receiving additional handwritten input.

71. The non-transitory computer readable storage medium of claim 70, wherein expanding the boundary of the first text entry region includes:

in accordance with a determination that the first text entry region is at a first location in the user interface, expanding a first boundary of the first text entry region; and in accordance with a determination that the first text entry region is at a second location, different than the first location, in the user interface, expanding a second boundary of the first text entry region without expanding the first boundary of the first text entry region.

72. The non-transitory computer readable storage medium of claim 30, wherein displaying the representation of the handwritten input in the user interface while receiving the user input includes displaying an animation of one or more visual characteristics of the representation of the handwritten input changing as a function of elapsed time since the corresponding handwritten input was received.

73. The non-transitory computer readable storage medium of claim 30, wherein ceasing to display the at least the portion of the representation of the handwritten input and displaying the font-based text corresponding to the at least the portion of the representation of the handwritten input in the first text entry region includes displaying an animation of the representation of the handwritten input morphing into the font-based text.

74. The non-transitory computer readable storage medium of claim 73, wherein the animation of the representation of the handwritten input morphing into the font-based text includes:

in accordance with a determination that the first text entry region does not yet include font-based text, animating the representation of the handwritten input morphing into font-based text at a final location in the first text entry region and at a final size at which the font-based text is going to be displayed.

75. The non-transitory computer readable storage medium of claim 73, wherein the animation of the representation of the handwritten input morphing into the font-based text includes:

in accordance with a determination that the first text entry region does not yet include font-based text, animating the representation of the handwritten input morphing into font-based text at an intermediate size based on a size of the representation of the handwritten input, and subsequently animating the font-based text at the intermediate size morphing into font-based text at a final location in the first text entry region and at a final size, different than the intermediate size, at which the font-based text is going to be displayed.

76. The non-transitory computer readable storage medium of claim 73, wherein the animation of the representation of the handwritten input morphing into the font-based text includes:

in accordance with a determination that the first text entry region does include previously-entered font-based text, animating the representation of the handwritten input morphing into font-based text at an intermediate size based on a size of the representation of the handwritten input, and subsequently animating the font-based text at the intermediate size morphing into font-based text at a final location in the first text entry region and at a final size, different than the intermediate size, at which the font-based text is going to be displayed, wherein the final size of the font-based text corresponding to the handwritten input is the same as a size of the previously-entered font-based text.

77. The non-transitory computer readable storage medium of claim 30, wherein the at least the portion of the handwritten input corresponds to font-based text that includes a typographical error, and displaying the font-based text corresponding to the at least the portion of the representation of the handwritten input in the first text entry region includes displaying the font-based text with the typographical error having been corrected.

78. The non-transitory computer readable storage medium of claim 30, the method further comprising:

after displaying the representation of the handwritten input in the user interface:

in accordance with the determination that the user input satisfies one or more first criteria:

transmitting the font-based text corresponding to the at least the portion of the representation of the handwritten input to a second electronic device, separate from the electronic device.

79. The non-transitory computer readable storage medium of claim 78, wherein the second electronic device is displaying a user interface that includes one or more respective text entry regions, including a respective text entry region that corresponds to the first text entry region displayed by the electronic device, the method further comprising:

detecting, at the electronic device, the one or more respective text entry regions displayed by the second electronic device; and in response to detecting the one or more respective text entry regions displayed by the second electronic device, displaying, in the user interface, one or more text entry regions, including the first text entry region, corresponding to the one or more respective text entry regions, wherein transmitting the font-based text corresponding to the at least the portion of the representation of the handwritten input to the second electronic device includes transmitting the font-based text to the respective text entry region on the second electronic device.

80. The non-transitory computer readable storage medium of claim 30, wherein the first text entry region is a multi-line text entry region, and the font-based text corresponding to the at least the portion of the representation of the handwritten input is displayed in a first line of the multi-line text entry region, the method further comprising:

while displaying the font-based text corresponding to the at least the portion of the representation of the handwritten input in the first line of the multi-line text entry region, receiving, via the touch-sensitive display, a second user input comprising a handwritten input directed to the first text entry region; and after receiving the second user input:

in accordance with a determination that one or more second criteria are satisfied, displaying font-based text corresponding to the second user input in a second line, different than the first line, of the multi-line text entry region; and in accordance with a determination that the one or more second criteria are not satisfied, displaying the font-based text corresponding to the second user input in the first line of the multi-line text entry region.

81. The non-transitory computer readable storage medium of claim 80, wherein the one or more second criteria are satisfied when the second user input is detected more than a threshold distance below the user input, and the one or more second criteria are not satisfied when the second user input is detected less than the threshold distance below the user input.

82. The non-transitory computer readable storage medium of claim 80, wherein the one or more second criteria are satisfied when the second user input includes a stylus input detected at the second line in the multi-line text entry region, and the one or more second criteria are not satisfied when the second user input does not include a stylus input detected at the second line in the multi-line text entry region.

83. The non-transitory computer readable storage medium of claim 80, wherein a selectable option for moving to the second line is displayed concurrently with the font-based text corresponding to the at least the portion of the representation of the handwritten input, the one or more second criteria are satisfied when the selectable option has been selected, and the one or more second criteria are not satisfied when the selectable option has not been selected.

84. The non-transitory computer readable storage medium of claim 30, the method further comprising:

receiving, via the touch-sensitive display, a second user input; and in response to receiving the second user input:

in accordance with a determination that the second user input is detected in a region of the user interface corresponding to a respective text entry region, performing a handwritten input operation in the respective text entry region based on the second user input; and in accordance with a determination that the second user input is detected in a region of the user interface not corresponding to a text entry region, performing a scrolling operation in the user interface based on the second user input.

* * * * *